US005995560A

United States Patent [19]

Shukhman et al.

[11] Patent Number: 5,995,560

[45] Date of Patent: Nov. 30, 1999

[54] PATH STORAGE ELEMENT OF A VECTOR DECODER

[75] Inventors: Tzvi Shukhman, Ramat Aviv; Avi Kliger, Givatayim; Amir Ilevitzky, Ramat Aviv, all of Israel

[73] Assignee: Metalink Ltd., Tel Aviv, Israel

[21] Appl. No.: 09/113,343

[22] Filed: Jul. 10, 1998

Related U.S. Application Data

[62] Division of application No. 08/518,119, Aug. 22, 1995.

[30] Foreign Application Priority Data

May 1, 1995 [IL] Israel ........................................ 113572

[51] Int. Cl.[6] .............................. H03D 1/00; H04L 27/06

[52] U.S. Cl. .......................... 375/340; 375/346; 375/348; 375/265

[58] Field of Search .................................... 375/340, 346, 375/348, 265, 229, 230, 233

[56] References Cited

U.S. PATENT DOCUMENTS

| | | | |
|---|---|---|---|
| 5,546,430 | 8/1996 | Liao et al. | 375/341 |
| 5,872,801 | 2/1999 | Mobin | 371/43 |
| 5,907,586 | 5/1999 | Katsuragawa et al. | 375/341 |

OTHER PUBLICATIONS

Sistanizadeh, K., "A Comparison of Passband and Baseband Transmission Schemes for HDSL." IEEE Journal on Selected Area in Communications, vol. 9, No. 6, (Aug. 1991) pp. 885–894.

Joshi, V., et al., "Sequence Estimation Techniques for Digital Subscriber Loop Transmission with Crosstalk Interference." IEEE Transactions on Communications, vol. 38, No. 9, (Sep. 1990) pp. 1367–1374.

Seshadri, N., et al. "Decoding of Severly Filtered Modulation Codes Using the (M,L) Algorithm." IEEE Journal on Selected Area in Communications, vol. 7, No. 6, (Aug. 1989) pp. 1007–1016.

Lee, W. U., et al. "A Maximum–Likelihood Sequence Estimator with Decision Feed–Back Equalization." IEEE Transactions on Communications, vol. COM–25, No. 9, (Sep. 1977) pp. 971–979.

*Primary Examiner*—Stephen Chin
*Assistant Examiner*—Mohammad Ghayour
*Attorney, Agent, or Firm*—Ladas & Parry

[57] ABSTRACT

A vector decoder for detecting symbols transmitted along a communication channel is disclosed, as is a method for decoding symbols. The decoder includes at least two pairs of decision feedback equalizers and noise predictors operating on a plurality M of vectors of symbols being detected, a path storage unit, a metric determiner a sorter and a path builder. The vectors are ordered in accordance with quality levels and each noise predictor estimates the noise associated with its associated vector. The path storage unit stores M of the ordered vectors, each vector being of length L. The metric determiner is connected to the output of all of the decision feedback equalizers and the noise predictors and produces a performance metric for each of Q branches extending from each vector. Each branch is associated with one of Q possible symbol values. The sorter is connected to the output of the metric determiner and sorts data, formed of a) the symbol values and b) the vectors which they extend, in accordance with their performance metrics. The sorter also orders, from the M*Q performance metrics, the data having the M best performance metrics. The path builder is connected to the output of the sorter and associates the ordered data with the appropriate ones of the previously stored ordered vectors.

4 Claims, 4 Drawing Sheets

FIG.1
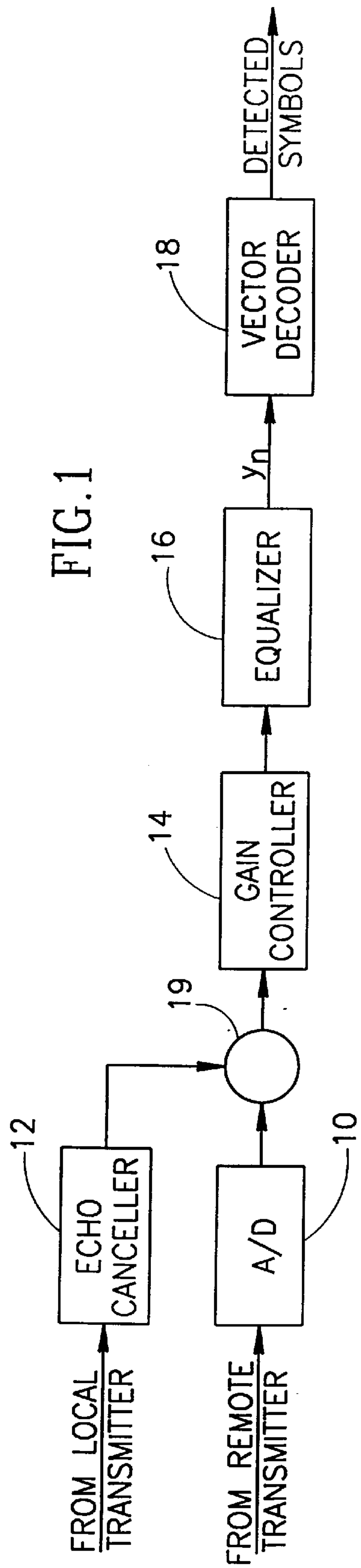
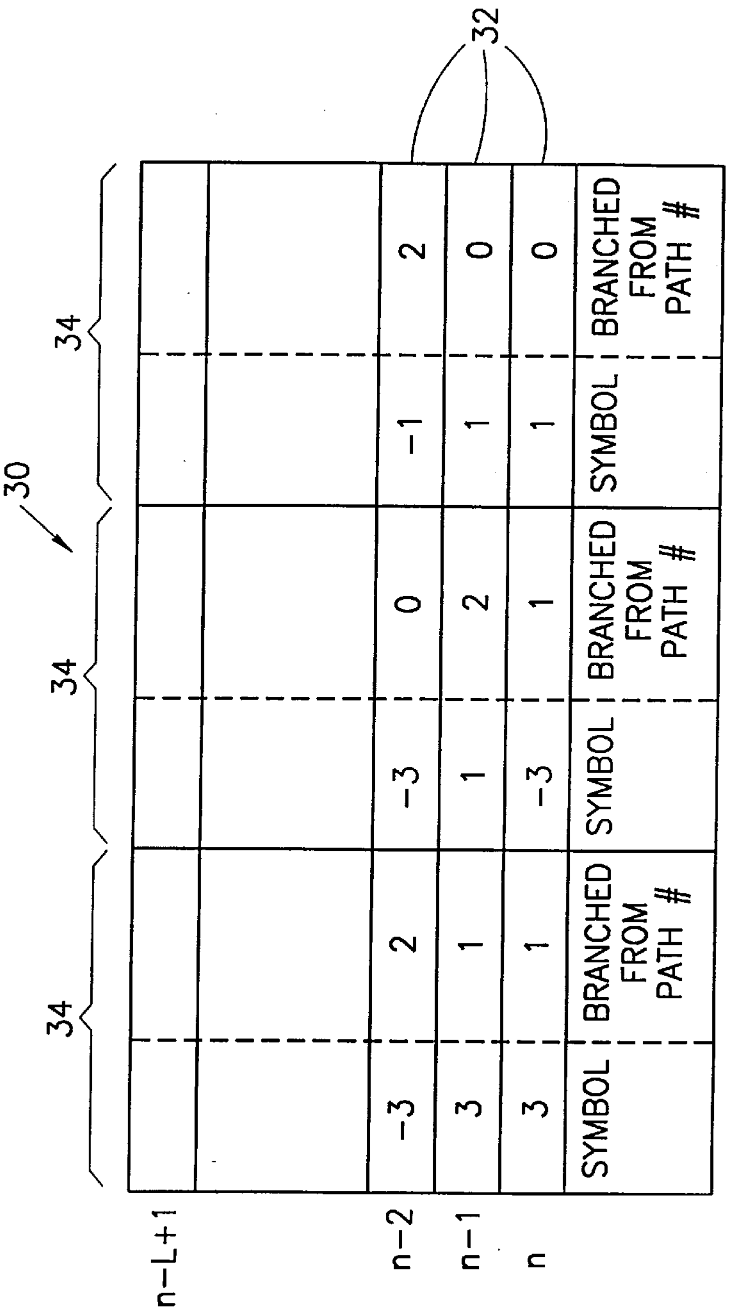
FIG.3

PATH STORAGE ELEMENT OF A VECTOR DECODER

This application is a division of application Ser. No. 08/518,119 filed Aug. 22, 1995.

FIELD OF THE INVENTION

The present invention relates to symbol decoders in data communication receivers and to symbol decoders for high bit rate digital subscriber loop (HDSL) receivers.

BACKGROUND OF THE INVENTION

The demand for fast and reliable transmission of digital information has encouraged the development of many different types of communication transceivers (a transmitter and receiver in one element) which efficiently employ the minimal bandwidth of telephone lines. One such communication technique is quadrature amplitude modulation (QAM) and another is pulse-amplitude modulation (PAM).

For both techniques, a sequence of equally likely data symbols is transmitted as pulses over the communication channel at a fixed symbol rate which is significantly above than the bandwidth of the communication channel. As a result, the pulses are delayed and also spread out in time which means that their amplitude diminishes over time. The signal which is received by the receiver is a superposition of the pulses over time. The "memory" of a channel, known as the intersymbol interference (ISI), is then the amount of time, in symbols, in which the transmitted pulse still affects the subsequent pulses.

Furthermore, the communication channel is noisy, typically from cross-talk due to the fact that many conversations are carried over the same telephone cable. The cross-talk is often referred to as "near end Xtalk (NEXT)". Furthermore, the communication transceiver both transmits and receives at the same time. The transmission causes an echo within the signal received by the receiver.

One technique for reducing the effect of the intersymbol interference is the decision-feedback equalizer (DFE). This equalizer assumes that the signal at any one time is the sum of the previous N stretched pulses, where N is the memory of the channel. If the equalizer somehow knows the symbol values for all the previous N-1 stretched pulses, it can remove the influence of the previous N-1 pulses and, from the result, can determine the Nth symbol value. However, if any one decision was incorrect, the later decisions may be incorrect.

For integrated subscriber digital network (ISDN) signals, which are transmitted at 160 Kbits/sec, the memory of the channel is typically 40 symbols. For high bit rate digital subscriber loop (HDSL) signals, which are transmitted at 784 Kbits/sec in the US and at 1168 Kbits/sec in Europe, the memory of the channel is typically 160 symbols. For 2 Mbit/sec channels, the memory of the channel is over 200 symbols.

A maximum likelihood sequence estimator (MLSE), implemented by the Viterbi algorithm, has been suggested to overcome the noise and intersymbol interference problems of high transmission rates over communication channels. The MLSE is the optimal receiver for channels with ISI; however, the MLSE increases in complexity as a function of the channel memory and the size Q of the symbol alphabet. Therefore, the MLSE is not practical for implementation in a real-time, high data rate communication channels with large channel memories and a symbol alphabet larger than 2.

The following three articles discuss different methods for implementing reduced state sequence estimators (RSSE) which reduce the complexity of the Viterbi algorithm but still offer the performance quality of the MLSE.

Vilas Joshi and David D. Falconer, "Sequence Estimation Techniques for Digital Subscriber Loop Transmission with Crosstalk Interference", *IEEE Transactions on Communications*, Vol. 38, No. 9, September 1990, pp. 1367–1374;

Nambirajan Seshadri and John B. Anderson, "Decoding of Severely Filtered Modulation Codes Using the (M, L) Algorithm", *IEEE Journal on Selected Areas in Communication*, Vol. 7, No. 6, August 1989, pp. 1007–1016; and Won U. Lee and F. S. Hill, Jr., "A Maximum-Likelihood Sequence Estimator with Decision-Feedback Equalizer", *IEEE Transactions on Communications*, Vol. COM-25, No. 9, September 1977, pp. 971–979.

The above literature propose several RSSE estimators. One of them is the (M, L) algorithm which, at every symbol interval, saves M symbol sequences of L symbols which represent M hypotheses of the actual sequence of symbols transmitted by the remote transmitter. At each interval, the algorithm determines which sequence provides the best match to the received signal and outputs the oldest symbol from the best sequence.

At every symbol interval, the sequences are branched to include one of the Q possible symbol levels (i.e. Q*M new sequences are produced). The new sequences are compared and the M best ones are selected.

The methods described in the above articles are complex where the complexity is a function of the sizes of M and L and of the alphabet size as indicated by Q. For example, the signal can be binary modulated and thus, symbols can have two levels (1 and −1). 2B1Q modulation is also popular which has four levels (−3, −1, 1, 3) or more levels. One of the above articles presents results for L=40, M varying from 8 to 32, both binary and quaternary symbol levels and for an ISDN channel (for whom the channel memory is of length 40). Another article presents results for L=30, M=4 or 8, binary symbol level signals. All of these RSSE estimators are complex due to the number and size of the sequences to be calculated. Furthermore, the estimators described do not provide significantly better results to compensate for their increased complexity over standard ISI reducing units.

SUMMARY OF THE PRESENT INVENTION

It is an object of the present invention to provide an improved, high bit rate receiver for telephone conversations which operates on signals having intersymbol interference, NeXT cross-talk and any uncancelled echo information.

Applicants have realized that an (M, L) reduced state sequence estimator can provide reasonable results without being as complex as in the prior art. For 2B1Q modulation and HDSL channels, Applicants show herein such a reduced state sequence estimator wherein M is 3 and L is 40 or 24. Unlike other (M, L) estimators discussed in the prior art, the estimator of the present invention is implementable in real-time.

The present invention is a symbol decoder which comprises a decision feedback equalizer (DFE) and a noise predictor for each of the M sequences. At each symbol interval, each DFE determines the intersymbol interference (ISI) for its corresponding sequence and each noise predictor estimates the noise for its associated sequence. The output of the corresponding DFE and noise predictor is removed from the incoming signal for the present the symbol interval. The resultant signal represents the newest symbol transmitted by the remote transmitter.

The present invention then determines the error between each possible symbol and the resultant signal. For each of the Q branched sequences, the present invention determines the accumulated error for that sequence.

The metrics are provided to a sorter which selects the M best metrics and provides a) the symbol values and b) the sequences from which they branch which are associated with the M best metrics to a path builder. The path builder associates the output of the sorter (which contains the M best branches) with the appropriate ones of the previously stored sequences.

The sorter also produces the oldest symbol from the sequence which produced the best metric. This symbol is the output of the decoder of the present invention.

Moreover, in accordance with a preferred embodiment of the present invention, the path storage unit includes M groups of columns and L rows. The M groups of columns are ordered in accordance with the quality levels and, for each row n, each group of columns stores a) the symbol, added at time n, which is associated with the quality level of the group of columns and b) the vector from which the symbol branched. For example, M can be three, L ranges from 20–60 and there are four branches.

Furthermore, in accordance with a preferred embodiment of the present invention, the sorter includes a plurality M of sorting units and a processing unit, wherein each sorting unit M is associated with one of the quality levels. Each sorting unit includes a magnitude determiner and a level orderer. The magnitude determiner determines if the received performance metric is larger than a performance metric previously stored therein, sets a binary flag F accordingly, and provides the binary flag F to the processing unit for processing. The level orderer changes the level associated with the sorting unit only if the binary flag indicates that the received performance metric is smaller than the stored performance metric. The level orderer includes an increaser, for increasing the level associated with the sorting unit if the level is not the highest level and a decreaser for decreasing the level associated with the sorting unit if the level is the highest level, the decreasing means setting the level to the output of the processing unit.

The present invention also incorporates the methods implemented by the vector decoder and by the sorter.

BRIEF DESCRIPTION OF THE DRAWINGS AND APPENDIX

The present invention will be understood and appreciated more fully from the following detailed description taken in conjunction with the drawings in which:

FIG. 1 is a block diagram illustration of a data communication channel receiver;

FIG. 3 is a schematic illustration of a path storage element forming part of the decoder of FIG. 2;

DETAILED DESCRIPTION OF A PREFERRED EMBODIMENT

Figure 2:
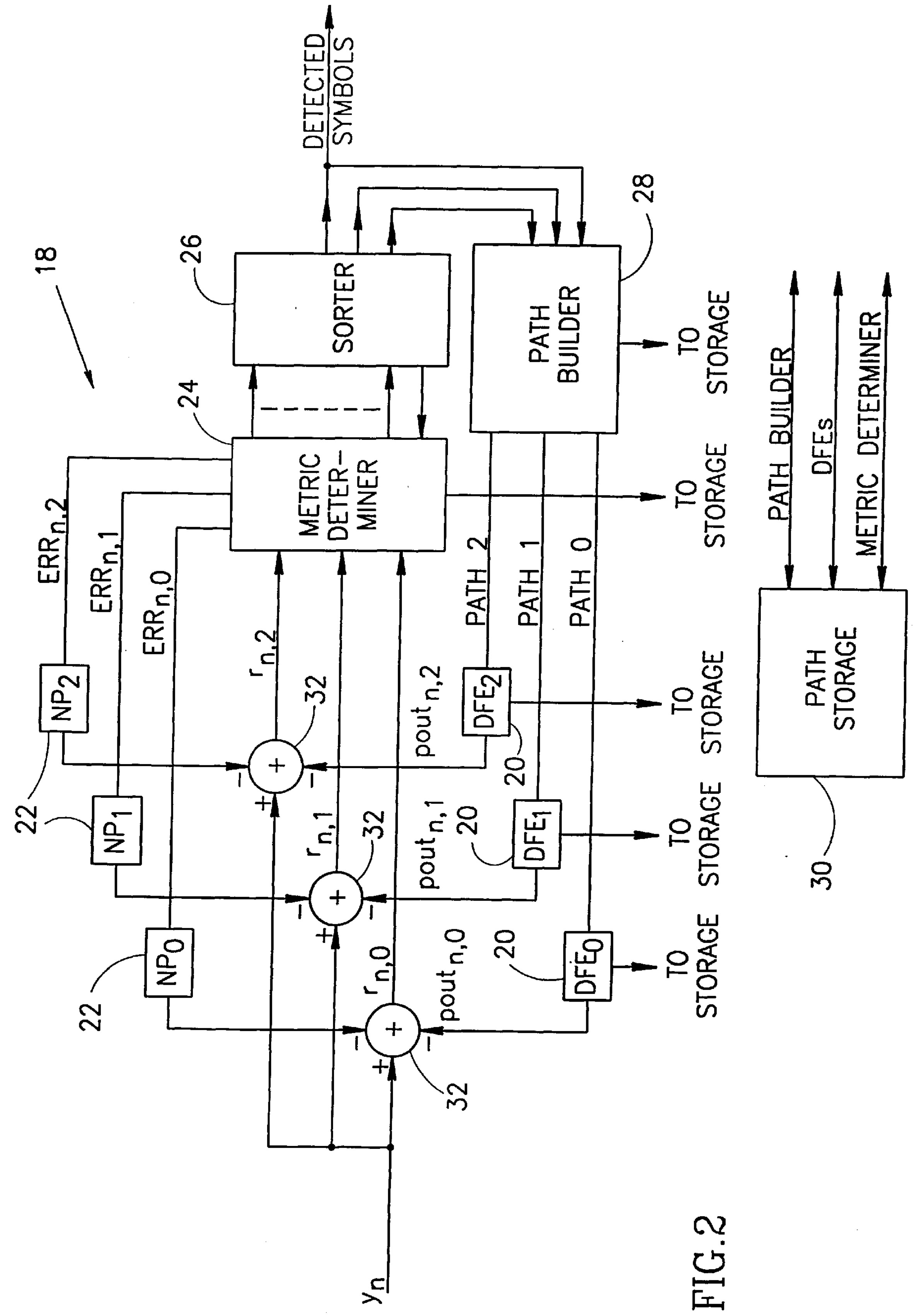
FIG. 2 is a block diagram illustration of a symbol decoder, constructed and operative in accordance with a preferred embodiment of the present invention.

Reference is now briefly made to FIG. 1 which illustrates a standard, full duplex, data communications receiver. The receiver comprises an analog-to-digital converter 10, an echo canceller 12, a gain controller 14, a linear equalizer 16 and a vector decoder 18.

The A/D converter 10 receives an analog, modulated signal from a remote transmitter (the signal to be decoded) and converts it to a digital modulated signal. The analog signal comprises the symbols to be decoded as well as echoes and noises. The analog signal can be sent along any type of communication channel; for example, it can be sent along copper loops or via satellite. The communication can be with binary modulation (symbol values of 1 and −1), 2B1Q modulation (e.g. symbol values of −3, −1, 1, 3) or any other Q-ary modulation method.

The local transmitter, not shown, transmits a signal at the same time that the receiver receives a signal. Since the two signals (incoming and outgoing) travel along is the same physical line, the incoming signal may include echoes of the outgoing signal. Therefore, the echo canceller 12 receives the symbols transmitted by the local transmitter, and from them, reproduces the echo portion of the input signal. A subtractor 20 removes the output of the echo canceller 12 from the digital modulated signal, thereby producing an "echo-free" signal. The gain controller 14 detects the signal level of the remote transmitter and adjusts the signal level to an optimal level for processing by the remaining elements of the receiver. The linear equalizer 16 is an adaptive finite impulse response (FIR) filter which removes the pre-cursor intersymbol interference in the echo-free and gain adjusted digital signal and produces a signal $y_n$. The vector decoder 18 produces a vector of detected symbols and is the subject of the present invention. The remaining elements are known in the art and therefore, are not described in detail hereinbelow.

Reference is now made to FIGS. 2–6 which illustrate the vector decoder 18 of the present invention. The vector decoder 18 is a reduced state sequence estimator which determines a plurality M of possible sequences and determines the value of a symbol received L symbol intervals previously from the sequence (of the M sequences) which has the best performance metric L symbol intervals later.

As shown in FIG. 2, the vector decoder 18 comprises a plurality M of decision feedback equalizers (DFEs) 20, a plurality M of noise predictors (NP) 22, a metric determiner 24, a path sorter 26, a path builder 28 and a path storage unit 30. The DFEs 20 and noise predictors 22 are formed into pairs where each pair operates on one of the M possible paths. The path storage unit 30 is accessible by all elements and stores each of the M possible paths, where each path is of length L.

FIG. 2 illustrates that M is three. Applicants have realized that there is no need to store many possible paths to produce reasonable results. The present application illustrates that M is three and Q is 4. Furthermore, Applicants have realized that there is no need to utilize long paths; a path which is generally one-sixth the size of the channel memory will provide reasonable results. Thus, for HDSL channels (whose channel memory is of length 120–240 symbols), the present invention utilizes L of length from 24 to 40. This combination of values is operative for many types of communication channels, such as for carrier service areas (CSA) communication channels at HDSL transmission rates and 2B1Q symbol modulation. Other values for M, L and Q are possible and are incorporated into the present invention, it being recognized that the vector decoder 18 increases in complexity with every increase in M and L.

Furthermore, in accordance with a preferred embodiment of the present invention, the present invention incorporates noise predictors for each of the M possible paths in order to improve the likelihood that the symbol selected is the correct one.

For each path k, the associated DFE 20 produces an estimate of the ISI utilizing the L symbols of the path up to, but not including the symbol $A_n$ which is new at the symbol interval n. The noise predictor 22 associated with the path k produces an estimate of the noise due to the previous L symbols. A subtractor 32 associated with the path k removes the output of the associated DFE 20 and NP 22 from the signal $y_n$, thereby producing a single symbol signal $r_{n,k}$ for the associated path k. $R_{n,k}$ is the symbol value if the ISI estimate and the noise estimate, for the kth path, is correct.

The symbol which was received at symbol interval n, and which should be represented in $r_{n,k}$, can be any of the Q possible symbol values. The metric determiner 24 produces Q possible branches of each path k, one for each of the Q symbol values, and determines a performance metric for each branch. The performance metric $m_{k,j}$ is a function of the single symbol signal $r_{n,k}$ for the path k and for the symbol j of the branch and is a function of the difference in magnitude between the single symbol signal $r_{n,k}$ and the symbol j.

The sorter 26 sorts the performance metrics $m_{k,j}$ to select the M lowest valued ones and associates the performance metrics with the path numbers k in accordance with their values. Thus, the lowest valued performance metric $m_{k,j}$ is associated with the lowest valued path number k (e.g. path number k=0), etc. The sorter 26 then provides the path numbers k, their associated new symbols j and the numbers of the old paths from which they branch, to the path builder 28. The sorter 26 also provides the error calculations, for each of the three new paths k, to the associated noise predictors 22 which, in turn, predict the noise for each of the new paths. Finally, the sorter 26 selects, as the detected symbol, the last symbol j of the new path which had the smallest performance metric $m_{k,j}$.

The path builder 28 updates the paths k stored in the path storage unit 30. The DFEs 20 then operate on the new paths and the noise predictors 22 operate on the new error values.

The path storage unit 30 is detailed in FIG. 3. It is formed of a circular random access memory (RAM) having L rows, labeled 32, and M groups, labeled 34, of columns. The groups 34 are ordered according to the quality of the relevant performance metric for the (n-i)th symbol interval and each row 32 comprises the necessary path information for the (n-i)th symbol interval, where i=0 to L. The first group, labeled 0, stores the symbols of the paths having the smallest performance metric and the last group, labeled, for example, 2, stores the symbols of the paths having the third smallest performance metric. Each group 34 also stores a previous path number indicating the path number at the time (n-i)-1 from which the path at time n-i branched.

For example, assume that the symbol modulation is 2B1Q having possible symbol values (−3, −1, 1, 3), and that M=3. The values in the nth, (n-1)th and (n-2)th rows are as shown in FIG. 3. At time n, the path with the best performance metric was the one which branched from the previous path k=1 with the symbol value 3. The symbol at time n-1 for the best path is the one stored with path k=1 at time n−1. Thus, the previous symbol along the best path is 1, as stored in row n-1, column k =1. In row n-1, k=1, the previous path number is 2, indicating that the best path branched from the one that was previously third best. In row n-2, column k=2, the symbol −1 is stored and a notation that the path was previously third best (k=2). Thus, from n-2 to n, the best path has the symbols (−1, 1, 3).

It will be appreciated that the path storage unit 30 stores the multiple path information generally efficiently. At each symbol interval, the newly added symbol and the path from which it branched are stored. The symbols of any path can easily be determined, just by traversing backwards through path storage unit 30. Furthermore, since the path storage unit 30 is formed from circular RAM, the data at the current time is always written over the oldest data. Finally, the value of the detected symbol for time n, is easily determined. It is the symbol value produced when traversing the path storage unit 30 from the first column (k=0) at symbol interval n back to row n-L+1. It is not, necessarily, the symbol value stored in the first column at time n-L+1.

Each DFE 20 traverses path storage unit 30 backwards to determine the path symbols for its associate path. It then performs a filtering operation, as follows, to produce its output signal, labeled $pout_{n,k}$.

$$pout_{n,k} = \sum_{i=0}^{L-1} D_{n,i} A_{n-i,k} \tag{1}$$

where the variables $D_{n,j}$ are defined by:

$$D_{n,i}=D_{n-1,i}+\mu_d A_{n-i,0} err_n \tag{2}$$

$\mu_d$ is the DFE step size and $err_n$ is the smallest error value (of the Q*M errors produced by the metric determiner 24) for the nth symbol interval, as defined hereinbelow.

The noise predictors 22 predict the noise from the error signals $err_{n,k}$ produced by the metric determiner 24, where each one operates on the error signal appropriate for its path k. The operation of each noise predictor 22 is as follows:

$$npout_{n,k}=P_n err_{n-1,k} \tag{3}$$

where the variables $P_{n,j}$ are defined by:

$$P_{n,i}=P_{n-1}+\mu_d err_n err_{n-1} \tag{4}$$

and where $\mu_p$ is the noise predictor step size.

Subtractors 32 then subtract the outputs of their associated DFEs 20 and noise predictors 22 from the incoming signal $y_n$, as follows:

$$r_{n,k}=y_n-npout_{n,k}-pout_{n,k} \tag{5}$$

As mentioned hereinabove, the metric determiner 24 receives the difference signals $r_{n,k}$ and determines the performance metrics $m_{k,j}$ for each branch j of each path k. The performance metrics are calculated as follows:

$$m_{k,j}=m_k+(r_{n,k}-S_j)^2 \quad (6)$$

where $m_k$ is the accumulated value of the path k, as defined hereinbelow.

Once the sorter 26 determines which are the k best branches of the M*Q possibilities, it provides this information to the metric determiner 24 which, in turn, updates the signals $m_k$ and $err_k$ as follows:

$$m_k=m_{k,j} \text{ for the chosen branch } j \quad (7)$$

$$m_k=m_k-m_0 \quad (8)$$

where $m_0$ is the best metric.

Equation 8 normalizes the metrics to indicate only their difference from the best one.

$$err_{n,k}=err_{k,j} \text{ for the chosen branch } j \quad (9)$$

$$err_n=err_{n,0}=err \text{ of the best branch} \quad (10)$$

The signals $err_{n,k}$ are provided to their respective noise predictors 22 and the signal $err_n$ is provided to the DFEs 20 and to the noise predictors 22. It will be appreciated that the parameters, defined by $err_n$, of the DFE 20 and noise predictor 22 of each path are the same.

Figure 4:
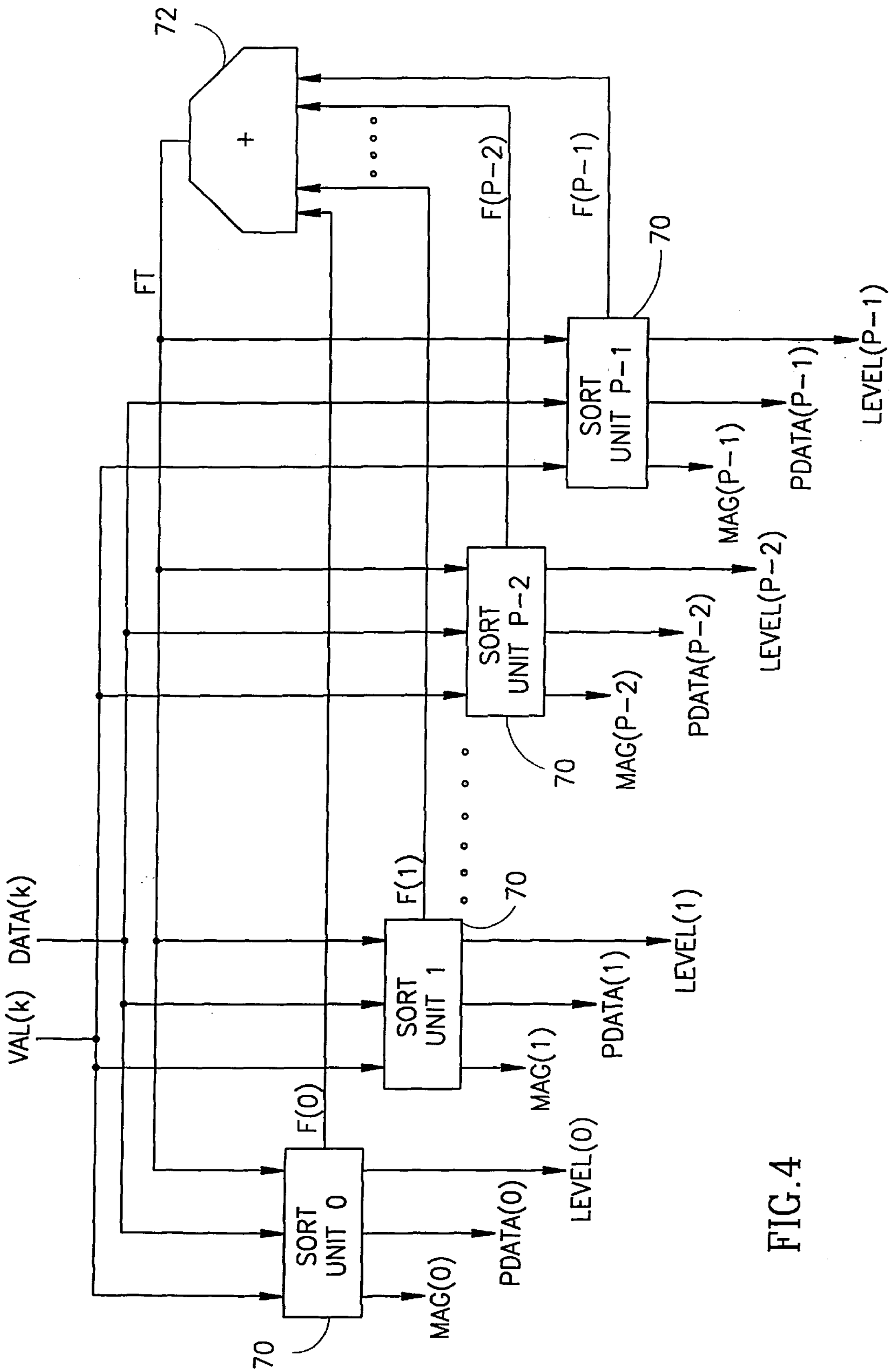
FIG. 4 is a block diagram illustration of a sorter forming part of the decoder of FIG. 2.

The sorter 26 is illustrated in FIG. 4 and its operation is illustrated in FIGS. 5A–5C and 6. The sorter 26 comprises a plurality P of sorting units 70, labeled 0 to P-1, and a summer 72. The sorting units 70 are arranged such that the one with the lowest number or level always stores the smallest performance metric, etc.

Each sorting unit 70 receives the performance metric $m_{k,j}$, labeled VAL(k), and any associated data (DATA(k)), such as the symbol j and path k associated with the performance metric. Each ith sorting unit 70 then determines if the new performance metric VAL(k) is larger or smaller than the performance metric $MAG_i$ previously associated therewith. The sorting units 70 then reorder themselves (i.e. change their levels) to ensure that the smallest performance metric is stored within the sorting unit 70 with the lowest level.

Figure 5A:
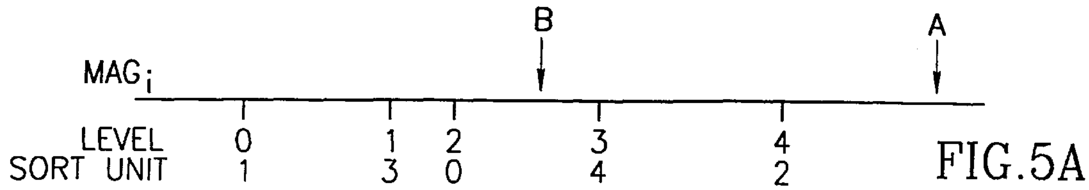
FIGS. 5A, 5B and 5C are schematic illustrations useful in understanding the operation of the sorter of FIG. 4.
Figure 5B:
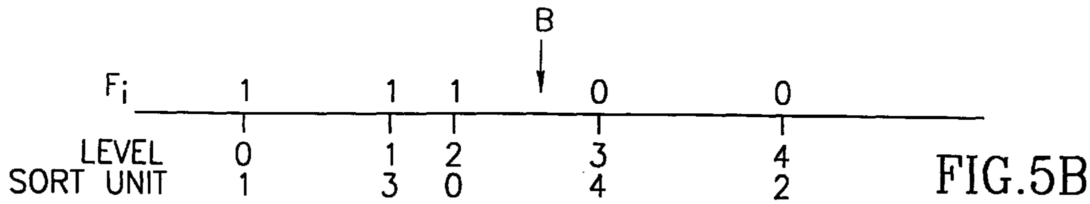
Figure 5C:
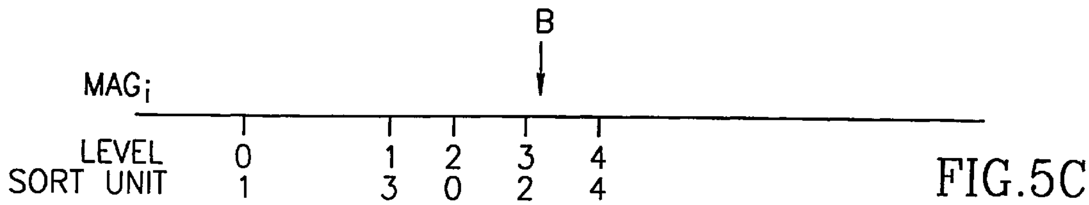

The operation of the sorter 26 is illustrated in FIGS. 5A–5C. In FIG. 5A, five MAG values, with their associated levels and the sorting units 70 in which they are stored, are shown on a line. If VAL(k) has the value A, all of the sorting units 70 will indicate that it is larger than the values $MAG_i$ stored within them and none of the sorting units 70 will change their order.

If VAL(k) has the value B, whose value is between that of levels 2 and 3, the levels will have to be reordered. The comparison of the values $MAG_i$ with the input value VAL(k) affects flags $F_i$ where $F_i$ becomes 1 only if VAL(k) is larger than the $MAG_i$ stored in the ith sorting unit 70. FIG. 5B shows the values of $F_i$ for each of the levels 0–4. As can be seen, $F_i$ is set to 1 for the levels whose $MAG_i$ is smaller than the value B and is 0 for all the other levels.

For those sorting units 70 whose $F_i$ was 1 (e.g. sorting units 1, 3 and 0), their levels do not change. However, for those whose $F_i$ was 0 (e.g. sorting units 4 and 2), their levels are increased by one. Thus, the old level three, of sorting unit 4, becomes the new level four.

The summer 72 sums the values of $F_i$ to produce FT which, in the illustrated case, is 3. The level associated with B is set to FT=3. The sorting unit 70 which previously had the largest level (i.e. sorting unit 2) stores the value of B and receives the new level FT=3. This sorting unit 70 also stores the data associated with the value B.

Figure 6:
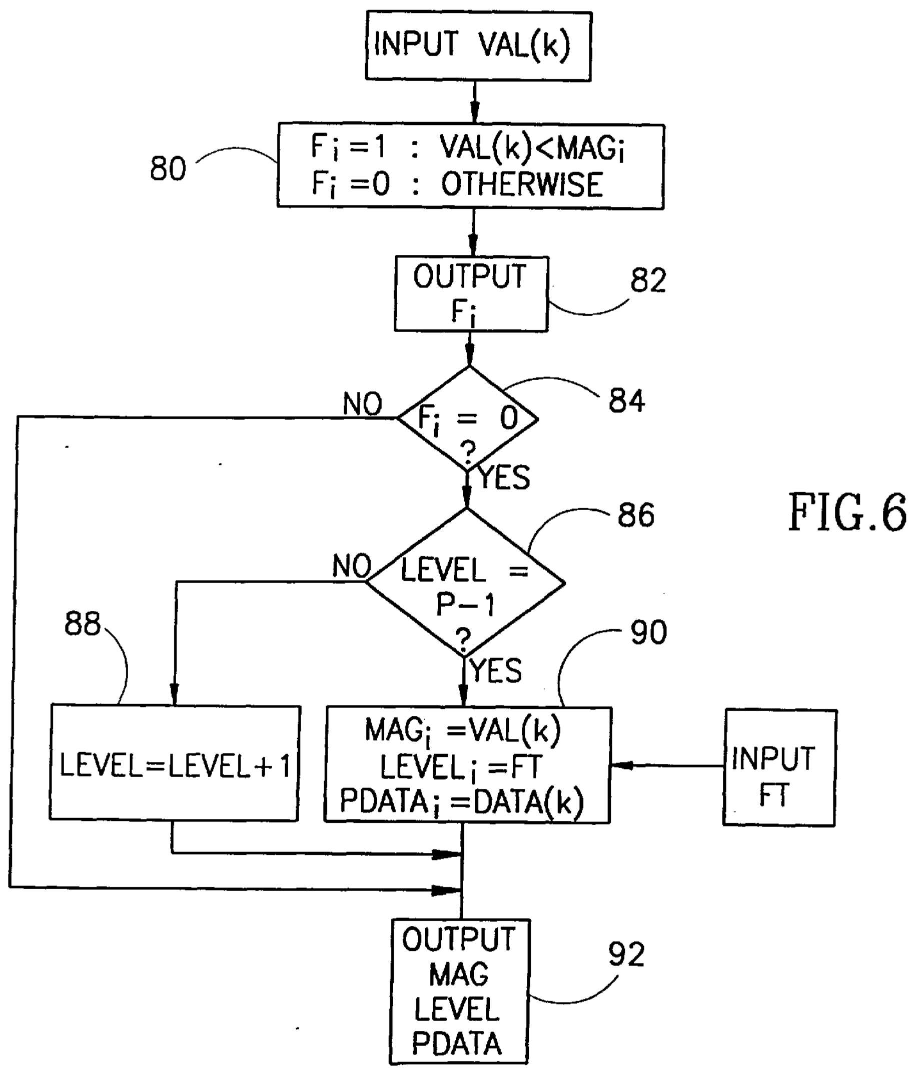
FIG. 6 is a flow chart illustration of the operations of a single sort mechanism forming part of the sorter of FIG. 4; and Appendix A is a net list of an exemplary implementation of the decoder of the present invention.

FIG. 6 is a flow chart of the operations of the ith sorting unit 70; it being understood that each sorting unit 70 performs the same operations. In step 80, the flag $F_i$ is set by comparing the internal value $MAG_i$ with the input VAL(k). In step 82, the value of the flag $F_i$ is provided to the summer 72. In step 84, the value of $F_i$ is checked. If it is 0, the sorting unit 70 makes no changes to its internal data or to its level and continues at the output step 92. If $F_i$ is 1, the previous level is checked (step 86). If the level is not the highest possible (P-1), then the sorting unit 70 only needs to increase its level (step 88). If the level is the highest possible, then the sorting unit 70 receives the input value of VAL(k) and the data, DATA(k), associated therewith (step 90). These are stored in $MAG_i$ and $PDATA_i$. Additionally, the level is set to FT as determined by the summer 72 (step 90).

It will be appreciated that the sorter 26 determines whether or not to save a performance metric $m_{mk,j}$ at each clock cycle, which is typically much higher than the symbol interval rate. Therefore, in M*Q clock cycles, the sorter 26 can sort the M*Q performance metrics.

The sorter 26 sorts the M*Q performance metric values $m_{k,j}$ and saves only the P best ones, where typically P=M. Once all the performance metrics $m_{k,j}$ have been provided to the sorter 26, it outputs the information stored in each of the P sorting units 70. This information is provided to the path builder 28 which, in turn, stores the symbol and previous path information in the path storage unit 30. Specifically, the path builder 28 stores the information from the sorting unit 70 with the lowest level in the first column of path storage unit 30, stores the information from the sorting unit 70 with the next lowest level in the second column of path storage unit 30, etc.

It will be appreciated by persons skilled in the art that the DFEs 20 and noise predictors 22 do not have to be separately implemented, as shown in FIG. 2. They can, alternatively, be implemented as a single DFE 20 and a single noise predictor 22 which operate on each path separately.

The symbol decoder of the present invention has been implemented, for example, on an integrated circuit operative to decode symbols from twisted pair copper loops at HDSL symbol rates and for 2B1Q modulation. In the implementation, the netlists of which are provided herein in Appendix A, M=3, L is programmable to 24 or 40 and Q =4. Furthermore, the chip is produced using 0.6 $\mu$m technologies and the internal clock rate is 45 MHz for data rates of 1.168 Mbps and 62 MHz for data rates of 1.5 Mbps. It will be appreciated that the implementation is provided for exemplary purposes only and is not intended to be limiting.

It is noted that the netlists of the Appendix were produced with version v8r4.6.2 of the COMPASS circuit design program, manufactured by COMPASS Design Automation of San Jose, Calif., USA.

It will be appreciated by persons skilled in the art that the present invention is not limited to what has been particularly shown and described hereinabove. Rather the scope of the present invention is defined by the claims which follow after the Appendix:

APPENDIX A

NetList data base for the patent application

Software:

The software used to create this data base and to transfer it to silicon is COMPASS version v8r4.6.2 (by COMPASS Design Automation, San Jose, California, USA.)

---

Contents:

This data base covers the following blocks:

1)multiplexer unit (MU)
2)sorter unit (SU)
3)decoder unit (DU)

---

Data base read:

The database is separate for each block.

Using the COMPASS software only the top level of each block is called. The software automaticly calls the sub-blocks needed to complete the block description.

Top levels files:
1)for MU : mu_p.nls
2)for SU : su_p.nls
3)for DU : du_p.nls

The following is a list of the files in the database:

du_ctl_p.nls*
du_p.nls*
dugr_p.nls*
mu_ctl_p.nls*
mu_p.nls*
mugr_p.nls*
mulx.la*
mulx.nls*
nm16_p.nls*
nm16a.la*
nm16a.pcl*
nm16a_dp.la*
nm16a_dp.nls*
nm16c_p.nls*
nm16x_p.nls*
nm40c_p.nls*
nm40d_p.nls*
nm4c_p.nls*
nm60_p.nls*
nm60a.la*
nm60a.pcl*
nm60a_dp.la*

EE6.560766.33US nm60a_dp.nls*
nm60c_p.nls*
nma_ctl_p.nls*
nmb_ctl_p.nls*
nmm_p.nls*
nmmc_p.nls*
nmmsto.la*
nmmsto.pcl*
nmmsto_dp.la*
nmmsto_dp.nls*
nmmt.la*
nmmt.pcl*
nmmt_dp.la*
nmmt_dp.nls*
nmmtc_p.nls*
nmux8_p.nls*
nmux8x2_p.nls*
npulsw2_p.nls*
npulsw3_p.nls*
su_ctl_p.nls*
su_p.nls*
sugr_p.nls*
tcram32x16.la*
tcram32x16.pcl*
tcram32x24.la*
tcram32x24.pcl*
tcram40x12.la*
tcram40x12.pcl*
tcram40x24.la*
tcram40x24.pcl*

DU_CTL_P NLS

#cell2 * du_ctl_p nls * 34 any 0 v8r4.6.2
"13-Oct-94 GMT" "20:39:03 GMT" "13-Oct-94 GMT" "20:39:03 GMT" amir * .
writer 1
file_version 1
sections 1
netlist 1: 83 du_ctl_p B contents: du_ctl_p
netlist 250
cells 30780
switches 0
attributes 0
physical 0
history 0
E contents B netlist
X 1 reset_ i;
X 2 drst_n i;
X 3 dtict o;
X 4 dtfrm o;
X 5 tdinit i;
X 6 tdfrz i;
X 7 tdtst i;
X 8 tdmod i;
X 9 tdmot i;
X 10 tdshrt i;
X 11 clk i;
X 12 rx_ck i;
X 13 tstwb i;
X 14 du_send o;
X 15 rd_du i;
X 16 badd[3] o;
X 17 badd[2] o;
X 18 badd[1] o;
X 19 badd[0] o;
X 20 dbrd0 o;
X 21 dbrd1 o;
X 22 dbrd2 o;
X 23 du_free_ o;
X 24 wr_du i;
X 25 aadd[3] i;
X 26 aadd[2] i;

X 27 aadd[1] i;
X 28 aadd[0] i;
X 29 drda o;
X 30 dwrb o;
X 31 dwcof_add[5] o;
X 32 dwcof_add[4] o;
X 33 dwcof_add[3] o;
X 34 dwcof_add[2] o;
X 35 dwcof_add[1] o;
X 36 dwcof_add[0] o;
X 37 drcof_add[5] o;
X 38 drcof_add[4] o;
X 39 drcof_add[3] o;
X 40 drcof_add[2] o;
X 41 drcof_add[1] o;
X 42 drcof_add[0] o;
X 43 dcof_we1 o;
X 44 da_rec1dp o;
X 45 dsym_add[5] o;
X 46 dsym_add[4] o;
X 47 dsym_add[3] o;
X 48 dsym_add[2] o;
X 49 dsym_add[1] o;
X 50 dsym_add[0] o;
X 51 dsym_en o;
X 52 dbrl[5] o;
X 53 dbrl[4] o;
X 54 dbrl[3] o;
X 55 dbrl[2] o;
X 56 dbrl[1] o;
X 57 dbrl[0] o;
X 58 dshiftnt o;
X 59 da_rec4 o;
X 60 clk_ i;
X 61 dmclk i;
X 62 dmclk_ i;
X 63 dmins o;
X 64 dacc00 o;
X 65 dacc01 o;
X 66 dacc10 o;
X 67 dbest0 o;
X 68 dbest1 o;
X 69 dbest2 o;
X 70 dupd[2] o;
X 71 dupd[1] o;
X 72 dupd[0] o;
X 73 dsav_clk o;
X 74 dsmp0 o;

X 75 dsmp1 o;
X 76 dsmp2 o;
X 77 dh10 o;
X 78 drdacc0 o;
X 79 drdacc1 o;
X 80 drdacc2 o;
X 81 dbestp[1] i;
X 82 dbestp[0] i;
X 83 dbestd[1] i;
X 84 dbestd[0] i;
X 85 dbestd_add[1] o;
X 86 dbestd_add[0] o;
X 87 dst_path o;
X 88 dcofsel[2] o;
X 89 dcofsel[1] o;
X 90 dcofsel[0] o;
X 91 dcalc o;
X 92 dmv_d[1] o;
X 93 dmv_d[0] o;
X 94 dsxn o;
X 95 dxn o;
X 96 db_dat_tst[1] i;
X 97 db_dat_tst[0] i;
X 98 den o;
X 99 dhltd_ o;
X 100 clk_dis i;
G 101 VDD;
G 102 VSS;
N 110 dbrd2d;
N 111 dbrd1d;
N 112 dbrd0d;
N 114 ddisd;
N 115 das;
N 117 dhltdsxd;
N 118 dmotd;
N 119 dbestps[0];
N 120 dbestps[1];
N 122 dstt2;
N 123 dmcnt[1];
N 124 dmcnt[0];
N 125 dlcnt[1];
N 126 dlcnt_dnx;
N 127 dncnt[0];
N 128 dstt3;
N 129 baddrg[3];
N 130 baddrg[2];
N 131 dncnt_dnp;
N 132 dlcnt[0];

N 133 baddrg[1];
N 134 dncnt[1];
N 135 dlcnt_dnp;
N 136 dstt4;
N 137 dstt5;
N 138 dwrbx_;
N 139 baddrg[0];
N 140 da_rec1d;
N 141 dstt10;
N 142 dstt11;
N 143 dkrcnt[3];
N 144 dkrcnt[4];
N 145 dkrcnt[5];
N 146 dkrcnt[2];
N 147 dkrcnt[1];
N 148 dkrcnt[0];
N 149 dstt6;
N 150 dccnt[3];
N 151 dccnt[4];
N 152 dccnt[5];
N 153 dccnt[2];
N 154 dccnt[1];
N 155 dccnt[0];
N 156 dstt1;
N 157 dstt0;
N 158 dwrbd_;
N 159 dhltds;
N 160 soid;
N 162 da_rec0;
N 163 dhltdt;
N 164 dshrtd;
N 165 dstt8;
N 166 dstt12;
N 167 dstt15;
N 168 db_send;
N 169 dstt15d;
N 170 dhlt_;
N 171 dccnt_n[0];
N 172 dccnt_n[1];
N 173 dccnt_n[2];
N 174 dccnt_n[3];
N 175 dccnt_n[4];
N 176 dccnt_n[5];
N 177 dkrcnt_n[0];
N 178 dkrcnt_n[1];
N 179 dkrcnt_n[2];
N 180 dkrcnt_n[3];
N 181 dkrcnt_n[4];

N 182 dkrcnt_n[5];
N 183 dkwcnt_n[0];
N 184 dkwcnt_n[1];
N 185 dkwcnt_n[2];
N 186 dkwcnt_n[3];
N 187 dkwcnt_n[4];
N 188 dkwcnt_n[5];
N 196 dstt5d;
N 198 dmcnt_n[0];
N 199 dmcnt_n[1];
N 202 dstt0d;
N 203 dstt1d;
N 204 dstt3d;
N 205 dstt4d;
N 206 dstt6d;
N 207 dstt9d;
N 208 da_rec0_n;
N 209 da_rec1_n;
N 210 soid_n;
N 211 dbrd0en;
N 212 dbrd1en;
N 213 dbrd2en;
N 215 dhltdsx;
N 216 dhltdt_n;
N 217 du_send__n;
N 218 dtfrm_n;
N 219 dsym_add_n[0];
N 220 dsym_add_n[1];
N 221 dsym_add_n[2];
N 222 dsym_add_n[3];
N 223 dsym_add_n[4];
N 224 dsym_add_n[5];
N 225 da_rec4_n;
N 226 dsmp0d;
N 227 dsmp1d;
N 228 dsmp2d;
N 229 drdacc0d;
N 230 drdacc1d;
N 231 drdacc2d;
N 233 den_n;
N 234 db_send_n;
N 235 dcof_we1en;
N 99 dhltd__1_q;
N 59 da_rec4_1_q;
N 51 dsym_en_1_q;
N 76 dsmp2_1_q;
N 74 dsmp0_1_q;
N 43 dpulsw_wr_[0];

```
N 16 badd_1[3];
N 17 badd_1[2];
N 18 badd_1[1];
N 19 badd_1[0];
N 44 da_rec1d_n;
N 44 da_rec1dp_1_q;
N 75 dsmp1_1_q;
N 78 drdacc0_1_q;
N 79 drdacc1_1_q;
N 80 drdacc2_1_q;
N 110 dbrd2d_1_q;
N 111 dbrd1d_1_q;
N 112 dbrd0d_1_q;
N 114 ddisd_1_q;
N 115 das_1_q;
N 115 dbs_n;
N 82 dbestps_n[0];
N 81 dbestps_n[1];
N 77 dh10_1_q;
N 14 du_send_buf_1[0];
N 117 dhltdsxd_1_q;
N 117 dhltds_n;
N 50 dsym_add_1_q[0];
N 49 dsym_add_1_q[1];
N 48 dsym_add_1_q[2];
N 47 dsym_add_1_q[3];
N 46 dsym_add_1_q[4];
N 45 dsym_add_1_q[5];
N 4 dtfrm_1_q;
N 118 dmotd_1_q;
N 71 dstt9;
N 71 dstt9_1_q;
N 71 dstt10_n;
N 119 dbestps_1_q[0];
N 120 dbestps_1_q[1];
N 87 dst_path_1_q;
N 122 dstt2_1_q;
N 123 dmcnt_1_q[1];
N 124 dmcnt_1_q[0];
N 125 dlcnt_1_q[1];
N 126 dlcnt_dnx_1_q;
N 127 dncnt_1_q[0];
N 128 dstt3_1_q;
N 129 baddrg_1_q[3];
N 130 baddrg_1_q[2];
N 131 dncnt_dnp_1_q;
N 132 dlcnt_1_q[0];
N 133 baddrg_1_q[1];
```

```
N 134 dncnt_1_q[1];
N 135 dlcnt_dnp_1_q;
N 135 dlcnt_dnx_n;
N 136 dstt4_1_q;
N 137 dstt5_1_q;
N 30 dwrb_buf_1[0];
N 138 dwrbx__1_q;
N 139 baddrg_1_q[0];
N 33 dkwcnt[3];
N 33 dkwcnt_1_q[3];
N 32 dkwcnt[4];
N 32 dkwcnt_1_q[4];
N 31 dkwcnt[5];
N 31 dkwcnt_1_q[5];
N 34 dkwcnt[2];
N 34 dkwcnt_1_q[2];
N 35 dkwcnt[1];
N 35 dkwcnt_1_q[1];
N 36 dkwcnt[0];
N 36 dkwcnt_1_q[0];
N 140 da_rec1d_1_q;
N 141 dstt10_1_q;
N 141 dstt11_n;
N 142 dstt11_1_q;
N 142 dstt12_n;
N 143 dkrcnt_1_q[3];
N 144 dkrcnt_1_q[4];
N 145 dkrcnt_1_q[5];
N 146 dkrcnt_1_q[2];
N 147 dkrcnt_1_q[1];
N 148 dkrcnt_1_q[0];
N 149 dstt6_1_q;
N 149 dstt7_n;
N 94 dstt7;
N 94 dstt7_1_q;
N 94 dstt8_n;
N 94 dsym_en_n;
N 94 dsxn_1[0];
N 150 dccnt_1_q[3];
N 151 dccnt_1_q[4];
N 152 dccnt_1_q[5];
N 153 dccnt_1_q[2];
N 154 dccnt_1_q[1];
N 155 dccnt_1_q[0];
N 156 dstt1_1_q;
N 157 dstt0_1_q;
N 158 dwrbx__n;
N 159 dhltds_1_q;
```

```
N 160 soid_1_q;
N 162 da_rec0_1_q;
N 163 dhltdt_1_q;
N 164 dshrtd_1_q;
N 165 dstt8_1_q;
N 166 dstt12_1_q;
N 12 das_n;
N 98 den_1_q;
N 167 dstt15_1_q;
N 168 db_send_1_q;
N 3 dtict_buf_1[0];
N 169 dstt15d_1[0];
N 169 dstt15_n;
N 170 dhltd__n;
N 196 dstt5d_1[0];
N 196 dstt5_n;
N 202 dstt0d_1[0];
N 202 dstt0_n;
N 203 dstt1d_1[0];
N 203 dstt1_n;
N 95 dstt2d;
N 95 dstt2d_1[0];
N 95 dstt2_n;
N 95 dxn_1[0];
N 204 dstt3d_1[0];
N 204 dstt3_n;
N 205 dstt4d_1[0];
N 205 dstt4_n;
N 206 dstt6d_1[0];
N 206 dstt6_n;
N 207 dstt9d_1[0];
N 207 dstt9_n;
N 29 drda_1[0];
N 211 dbrd0d_n;
N 212 dbrd1d_n;
N 213 dbrd2d_n;
N 215 dhltdsxd_n;
N 226 dsmp0_n;
N 227 dsmp1_n;
N 228 dsmp2_n;
N 229 drdacc0_n;
N 230 drdacc1_n;
N 231 drdacc2_n;
N 20 dbrd0_1[0];
N 21 dbrd1_1[0];
N 22 dbrd2_1[0];
N 235 dcof_we1en_1[0];
N 52 dshifti;
```

```
N 52 dshifti_1[0];
N 53 dshift2;
N 53 dshift2_1[0];
N 54 dshift1;
N 54 dshift1_1[0];
N 55 dshiftt;
N 55 dshiftt_1[0];
N 56 dshiftr;
N 56 dshiftr_1[0];
N 57 dshiftn;
N 57 dshiftn_1[0];
N 58 dshiftnt_1[0];
N 63 dmins_1[0];
N 64 dacc00_1[0];
N 65 dacc01_1[0];
N 66 dacc10_1[0];
N 90 done;
N 90 done_1[0];
N 89 derr_oe;
N 89 derr_oe_1[0];
N 91 dcalc_1[0];
V badd 3 0 ¦ 16 17 18 19;
V aadd 3 0 ¦ 25 26 27 28;
V dwcof_add 5 0 ¦ 31 32 33 34 35 36;
V drcof_add 5 0 ¦ 37 38 39 40 41 42;
V dsym_add 5 0 ¦ 45 46 47 48 49 50;
V dbrl 5 0 ¦ 52 53 54 55 56 57;
V dupd 2 0 ¦ 70 71 72;
V dbestp 1 0 ¦ 81 82;
V dbestd 1 0 ¦ 83 84;
V dbestd_add 1 0 ¦ 85 86;
V dcofsel 2 0 ¦ 88 89 90;
V dmv_d 1 0 ¦ 92 93;
V db_dat_tst 1 0 ¦ 96 97;
V dccnt 5 0 ¦ 152 151 150 153 154 155;
V dkrcnt 5 0 ¦ 145 144 143 146 147 148;
V dkwcnt 5 0 ¦ 31 32 33 34 35 36;
V baddrg 3 0 ¦ 129 130 133 139;
V dbestps 1 0 ¦ 120 119;
V dncnt 1 0 ¦ 134 127;
V dlcnt 1 0 ¦ 125 132;
V dmcnt 1 0 ¦ 123 124;
V dstt0d_1 0 0 ¦ 202;
V dstt1d_1 0 0 ¦ 203;
V dstt2d_1 0 0 ¦ 95;
V dstt3d_1 0 0 ¦ 204;
V dstt4d_1 0 0 ¦ 205;
V dstt5d_1 0 0 ¦ 196;
```

```
V dstt6d_1 0 0 ¦ 206;
V dstt9d_1 0 0 ¦ 207;
V dstt15d_1 0 0 ¦ 169;
V drda_1 0 0 ¦ 29;
V dcof_we1en_1 0 0 ¦ 235;
V dpulsw_wr_ 0 0 ¦ 43;
V dshift1_1 0 0 ¦ 54;
V dshift2_1 0 0 ¦ 53;
V dshifti_1 0 0 ¦ 52;
V dshiftn_1 0 0 ¦ 57;
V dshiftt_1 0 0 ¦ 55;
V dshiftr_1 0 0 ¦ 56;
V dshiftnt_1 0 0 ¦ 58;
V done_1 0 0 ¦ 90;
V derr_oe_1 0 0 ¦ 89;
V dmins_1 0 0 ¦ 63;
V dacc00_1 0 0 ¦ 64;
V dacc01_1 0 0 ¦ 65;
V dacc10_1 0 0 ¦ 66;
V dsxn_1 0 0 ¦ 94;
V dxn_1 0 0 ¦ 95;
V dwrb_buf_1 0 0 ¦ 30;
V dcalc_1 0 0 ¦ 91;
V dtict_buf_1 0 0 ¦ 3;
V dbrd0_1 0 0 ¦ 20;
V dbrd1_1 0 0 ¦ 21;
V dbrd2_1 0 0 ¦ 22;
V du_send_buf_1 0 0 ¦ 14;
V dccnt_n 5 0 ¦ 176 175 174 173 172 171;
V dccnt_1_q 5 0 ¦ 152 151 150 153 154 155;
V dkrcnt_n 5 0 ¦ 182 181 180 179 178 177;
V dkrcnt_1_q 5 0 ¦ 145 144 143 146 147 148;
V dkwcnt_n 5 0 ¦ 188 187 186 185 184 183;
V dkwcnt_1_q 5 0 ¦ 31 32 33 34 35 36;
V baddrg_1_q 3 0 ¦ 129 130 133 139;
V dbestps_n 1 0 ¦ 81 82;
V dbestps_1_q 1 0 ¦ 120 119;
V dncnt_1_q 1 0 ¦ 134 127;
V dlcnt_1_q 1 0 ¦ 125 132;
V dmcnt_n 1 0 ¦ 199 198;
V dmcnt_1_q 1 0 ¦ 123 124;
V dsym_add_n 5 0 ¦ 224 223 222 221 220 219;
V dsym_add_1_q 5 0 ¦ 45 46 47 48 49 50;
V badd_1 3 0 ¦ 16 17 18 19;
M NLS npulsw3_p * ¦ wrd clk clk_ wr_ reset_ ¦ iiioi;
M MDE nt02d3 vsc653 ¦ I Z OEN ¦ ;
M MDE an02d1 vsc653 ¦ A1 A2 Z ¦ ;
M MDE or02d1 vsc653 ¦ A1 A2 Z ¦ ;
```

```
M MDE ao04d1 vsc653 ¦ A1 A2 B ZN ¦ ;
M MDE oa05d1 vsc653 ¦ A1 A2 B C ZN ¦ ;
M MDE in01d1 vsc653 ¦ I ZN ¦ ;
M MDE an03d1 vsc653 ¦ A1 A2 A3 Z ¦ ;
M MDE oa03d1 vsc653 ¦ A1 A2 B1 B2 C ZN ¦ ;
M MDE ao07d1 vsc653 ¦ A1 A2 A3 B1 B2 ZN ¦ ;
M MDE xn02d1 vsc653 ¦ A1 A2 ZN ¦ ;
M MDE an05d1 vsc653 ¦ A1 A2 A3 A4 A5 Z ¦ ;
M MDE mx21d1 vsc653 ¦ I0 I1 S Z ¦ ;
M MDE nr02d1 vsc653 ¦ A1 A2 ZN ¦ ;
M MDE ao08d1 vsc653 ¦ A1 A2 A3 B ZN ¦ ;
M MDE xo02d1 vsc653 ¦ A1 A2 Z ¦ ;
M MDE or05d1 vsc653 ¦ A1 A2 A3 A4 A5 Z ¦ ;
M MDE ao01d1 vsc653 ¦ A1 A2 B1 B2 ZN ¦ ;
M MDE oa04d1 vsc653 ¦ A1 A2 B ZN ¦ ;
M MDE fn05d1 vsc653 ¦ A1 B1 ZN ¦ ;
M MDE an04d1 vsc653 ¦ A1 A2 A3 A4 Z ¦ ;
M MDE oa07d1 vsc653 ¦ A1 A2 A3 B1 B2 ZN ¦ ;
M MDE oa02d1 vsc653 ¦ A1 A2 A3 B1 B2 B3 ZN ¦ ;
M MDE nr03d1 vsc653 ¦ A1 A2 A3 ZN ¦ ;
M MDE fn03d1 vsc653 ¦ A1 A2 B1 B2 ZN ¦ ;
M MDE or03d1 vsc653 ¦ A1 A2 A3 Z ¦ ;
M MDE nd03d1 vsc653 ¦ A1 A2 A3 ZN ¦ ;
M MDE or04d1 vsc653 ¦ A1 A2 A3 A4 Z ¦ ;
M MDE nd08d1 vsc653 ¦ A1 A2 A3 A4 A5 A6 A7 A8 ZN ¦ ;
M MDE ao03d1 vsc653 ¦ A1 A2 B1 B2 C ZN ¦ ;
M MDE ao05d1 vsc653 ¦ A1 A2 B C ZN ¦ ;
M MDE nd04d1 vsc653 ¦ A1 A3 A4 A2 ZN ¦ ;
M MDE oa08d1 vsc653 ¦ A1 A2 A3 B ZN ¦ ;
M MDE or06d1 vsc653 ¦ A1 A2 A3 A4 A5 A6 Z ¦ ;
M MDE an06d1 vsc653 ¦ A1 A2 A3 A4 A5 A6 Z ¦ ;
M MDE mfptnh vsc653 ¦ DA DB SA CP SDN Q QN ¦ ;
M MDE mfctnh vsc653 ¦ DA DB SA CP CDN Q QN ¦ ;
M MDE mfntnb vsc653 ¦ DA DB SA CP Q QN ¦ ;
M MDE dfctnb vsc653 ¦ D CP CDN Q QN ¦ ;
M MDE dfptnb vsc653 ¦ D CP SDN Q QN ¦ ;
M MDE dfctnh vsc653 ¦ D CP CDN Q QN ¦ ;
M MDE dfptnh vsc653 ¦ D CP SDN Q QN ¦ ;
M MDE dfntnb vsc653 ¦ D CP Q QN ¦ ;
I NLS npulsw3_p * * 1 dpulsw ¦ 235 61 62 43 2;
I MDE nt02d3 vsc653 * 2 u660 ¦ 129 16 431;
I MDE nt02d3 vsc653 * 3 u659 ¦ 130 17 431;
I MDE nt02d3 vsc653 * 4 u658 ¦ 133 18 431;
I MDE nt02d3 vsc653 * 5 u657 ¦ 139 19 431;
I MDE an02d1 vsc653 * 6 i_1819 ¦ 237 238 3;
I MDE or02d1 vsc653 * 7 i_1820 ¦ 169 240 238;
I MDE ao04d1 vsc653 * 8 i_1821 ¦ 12 98 243 240;
I MDE oa05d1 vsc653 * 9 i_1822 ¦ 243 244 245 246 169;
```

I MDE or02d1 vsc653 * 10 i_1823 ¦ 164 248 245;
I MDE in01d1 vsc653 * 11 i_1824 ¦ 249 244;
I MDE an03d1 vsc653 * 12 i_1825 ¦ 250 6 5 249;
I MDE in01d1 vsc653 * 13 i_1826 ¦ 7 250;
I MDE or02d1 vsc653 * 14 i_1827 ¦ 15 251 237;
I MDE oa03d1 vsc653 * 15 i_1828 ¦ 253 254 255 158 257 170;
I MDE ao07d1 vsc653 * 16 i_1829 ¦ 158 258 254 159 160 257;
I MDE in01d1 vsc653 * 17 i_1830 ¦ 237 255;
I MDE an02d1 vsc653 * 18 i_1831 ¦ 262 263 171;
I MDE xn02d1 vsc653 * 19 i_1832 ¦ 155 265 263;
I MDE or02d1 vsc653 * 20 i_1833 ¦ 266 267 265;
I MDE an05d1 vsc653 * 21 i_1834 ¦ 155 268 153 154 271 267;
I MDE mx21d1 vsc653 * 22 i_1835 ¦ 152 164 151 271;
I MDE an05d1 vsc653 * 23 i_1836 ¦ 245 246 274 275 276 266;
I MDE in01d1 vsc653 * 24 i_1837 ¦ 277 276;
I MDE an02d1 vsc653 * 25 i_1838 ¦ 156 279 277;
I MDE in01d1 vsc653 * 26 i_1839 ¦ 267 279;
I MDE or02d1 vsc653 * 27 i_1840 ¦ 249 243 274;
I MDE or02d1 vsc653 * 28 i_1841 ¦ 266 279 262;
I MDE an02d1 vsc653 * 29 i_1842 ¦ 262 281 172;
I MDE xn02d1 vsc653 * 30 i_1843 ¦ 282 154 281;
I MDE or02d1 vsc653 * 31 i_1844 ¦ 265 283 282;
I MDE an02d1 vsc653 * 32 i_1845 ¦ 262 285 173;
I MDE xn02d1 vsc653 * 33 i_1846 ¦ 286 153 285;
I MDE or02d1 vsc653 * 34 i_1847 ¦ 282 287 286;
I MDE an02d1 vsc653 * 35 i_1848 ¦ 262 289 174;
I MDE xn02d1 vsc653 * 36 i_1849 ¦ 290 150 289;
I MDE or02d1 vsc653 * 37 i_1850 ¦ 286 292 290;
I MDE an02d1 vsc653 * 38 i_1851 ¦ 262 294 175;
I MDE xn02d1 vsc653 * 39 i_1852 ¦ 295 151 294;
I MDE or02d1 vsc653 * 40 i_1853 ¦ 290 268 295;
I MDE an02d1 vsc653 * 41 i_1854 ¦ 262 297 176;
I MDE xn02d1 vsc653 * 42 i_1855 ¦ 298 152 297;
I MDE or02d1 vsc653 * 43 i_1856 ¦ 295 299 298;
I MDE an02d1 vsc653 * 44 i_1857 ¦ 300 301 177;
I MDE xn02d1 vsc653 * 45 i_1858 ¦ 148 303 301;
I MDE or02d1 vsc653 * 46 i_1859 ¦ 304 305 303;
I MDE an05d1 vsc653 * 47 i_1860 ¦ 148 306 146 147 309 305;
I MDE mx21d1 vsc653 * 48 i_1861 ¦ 145 164 144 309;
I MDE nr02d1 vsc653 * 49 i_1862 ¦ 312 165 304;
I MDE ao08d1 vsc653 * 50 i_1863 ¦ 246 314 315 316 312;
I MDE or02d1 vsc653 * 51 i_1864 ¦ 304 317 300;
I MDE in01d1 vsc653 * 52 i_1865 ¦ 305 317;
I MDE an02d1 vsc653 * 53 i_1866 ¦ 300 321 178;
I MDE xn02d1 vsc653 * 54 i_1867 ¦ 322 147 321;
I MDE or02d1 vsc653 * 55 i_1868 ¦ 303 323 322;
I MDE an02d1 vsc653 * 56 i_1869 ¦ 300 324 179;
I MDE xn02d1 vsc653 * 57 i_1870 ¦ 325 146 324;

I MDE or02d1 vsc653 * 58 i_1871 ¦ 322 326 325;
I MDE an02d1 vsc653 * 59 i_1872 ¦ 300 328 180;
I MDE xn02d1 vsc653 * 60 i_1873 ¦ 329 143 328;
I MDE or02d1 vsc653 * 61 i_1874 ¦ 325 331 329;
I MDE an02d1 vsc653 * 62 i_1875 ¦ 300 333 181;
I MDE xn02d1 vsc653 * 63 i_1876 ¦ 334 144 333;
I MDE or02d1 vsc653 * 64 i_1877 ¦ 329 306 334;
I MDE an02d1 vsc653 * 65 i_1878 ¦ 300 336 182;
I MDE xn02d1 vsc653 * 66 i_1879 ¦ 337 145 336;
I MDE or02d1 vsc653 * 67 i_1880 ¦ 334 338 337;
I MDE an02d1 vsc653 * 68 i_1881 ¦ 340 341 183;
I MDE xo02d1 vsc653 * 69 i_1882 ¦ 342 343 341;
I MDE or02d1 vsc653 * 70 i_1883 ¦ 344 345 342;
I MDE in01d1 vsc653 * 71 i_1884 ¦ 346 345;
I MDE or05d1 vsc653 * 72 i_1885 ¦ 33 343 348 349 350 346;
I MDE mx21d1 vsc653 * 73 i_1886 ¦ 316 351 352 350;
I MDE ao01d1 vsc653 * 74 i_1887 ¦ 170 353 249 140 344;
I MDE or02d1 vsc653 * 75 i_1888 ¦ 165 354 353;
I MDE ao08d1 vsc653 * 76 i_1889 ¦ 246 355 356 316 354;
I MDE or02d1 vsc653 * 77 i_1890 ¦ 344 346 340;
I MDE an02d1 vsc653 * 78 i_1891 ¦ 340 363 184;
I MDE xo02d1 vsc653 * 79 i_1892 ¦ 364 349 363;
I MDE or02d1 vsc653 * 80 i_1893 ¦ 342 343 364;
I MDE an02d1 vsc653 * 81 i_1894 ¦ 340 366 185;
I MDE xo02d1 vsc653 * 82 i_1895 ¦ 367 348 366;
I MDE or02d1 vsc653 * 83 i_1896 ¦ 349 364 367;
I MDE an02d1 vsc653 * 84 i_1897 ¦ 340 369 186;
I MDE xo02d1 vsc653 * 85 i_1898 ¦ 370 371 369;
I MDE or02d1 vsc653 * 86 i_1899 ¦ 348 367 370;
I MDE an02d1 vsc653 * 87 i_1900 ¦ 340 373 187;
I MDE xo02d1 vsc653 * 88 i_1901 ¦ 374 352 373;
I MDE or02d1 vsc653 * 89 i_1902 ¦ 371 370 374;
I MDE an02d1 vsc653 * 90 i_1903 ¦ 340 376 188;
I MDE xo02d1 vsc653 * 91 i_1904 ¦ 377 351 376;
I MDE or02d1 vsc653 * 92 i_1905 ¦ 352 374 377;
I MDE an02d1 vsc653 * 93 i_1907 ¦ 30 237 381;
I MDE oa04d1 vsc653 * 94 i_1908 ¦ 382 383 384 380;
I MDE ao07d1 vsc653 * 95 i_1909 ¦ 135 137 387 136 134 384;
I MDE in01d1 vsc653 * 96 i_1910 ¦ 390 383;
I MDE an02d1 vsc653 * 97 i_1911 ¦ 387 391 390;
I MDE fn05d1 vsc653 * 98 i_1912 ¦ 7 392 382;
I MDE an04d1 vsc653 * 99 i_1913 ¦ 393 315 356 355 392;
I MDE in01d1 vsc653 * 100 i_1914 ¦ 394 393;
I MDE an02d1 vsc653 * 101 i_1915 ¦ 164 165 394;
I MDE oa07d1 vsc653 * 102 i_1917 ¦ 391 398 399 400 387 397;
I MDE in01d1 vsc653 * 103 i_1918 ¦ 387 399;
I MDE or02d1 vsc653 * 104 i_1920 ¦ 390 387 403;
I MDE or02d1 vsc653 * 105 i_1923 ¦ 409 128 408;

I MDE nr02d1 vsc653 * 106 i_1924 ¦ 160 387 409;
I MDE oa04d1 vsc653 * 107 i_1927 ¦ 413 387 414 196;
I MDE or02d1 vsc653 * 108 i_1928 ¦ 391 126 414;
I MDE xn02d1 vsc653 * 109 i_1930 ¦ 418 419 198;
I MDE nr02d1 vsc653 * 110 i_1931 ¦ 420 387 418;
I MDE xo02d1 vsc653 * 111 i_1932 ¦ 422 423 199;
I MDE or02d1 vsc653 * 112 i_1933 ¦ 419 424 422;
I MDE in01d1 vsc653 * 113 i_1934 ¦ 418 424;
I MDE nr02d1 vsc653 * 114 i_1937 ¦ 243 249 202;
I MDE or02d1 vsc653 * 115 i_1938 ¦ 277 157 203;
I MDE nr02d1 vsc653 * 116 i_1939 ¦ 430 279 95;
I MDE or02d1 vsc653 * 117 i_1940 ¦ 432 122 204;
I MDE an02d1 vsc653 * 118 i_1941 ¦ 128 400 432;
I MDE or02d1 vsc653 * 119 i_1942 ¦ 409 434 205;
I MDE in01d1 vsc653 * 120 i_1943 ¦ 435 434;
I MDE or02d1 vsc653 * 121 i_1944 ¦ 400 436 435;
I MDE nr02d1 vsc653 * 122 i_1945 ¦ 391 196 206;
I MDE an02d1 vsc653 * 123 i_1946 ¦ 164 165 207;
I MDE oa02d1 vsc653 * 124 i_1947 ¦ 440 28 25 441 253 442 208;
I MDE an02d1 vsc653 * 125 i_1948 ¦ 2 24 442;
I MDE or02d1 vsc653 * 126 i_1949 ¦ 443 444 441;
I MDE in01d1 vsc653 * 127 i_1950 ¦ 2 444;
I MDE nr03d1 vsc653 * 128 i_1951 ¦ 445 24 446 443;
I MDE an03d1 vsc653 * 129 i_1952 ¦ 447 448 449 446;
I MDE or02d1 vsc653 * 130 i_1953 ¦ 450 243 448;
I MDE fn03d1 vsc653 * 131 i_1954 ¦ 162 128 452 253 447;
I MDE an02d1 vsc653 * 132 i_1955 ¦ 253 450 445;
I MDE or03d1 vsc653 * 133 i_1956 ¦ 453 26 27 440;
I MDE in01d1 vsc653 * 134 i_1957 ¦ 442 453;
I MDE in01d1 vsc653 * 135 i_1958 ¦ 446 29;
I MDE oa02d1 vsc653 * 136 i_1959 ¦ 455 27 26 441 450 442 209;
I MDE nd03d1 vsc653 * 137 i_1960 ¦ 456 28 442 455;
I MDE in01d1 vsc653 * 138 i_1961 ¦ 25 456;
I MDE oa02d1 vsc653 * 139 i_1962 ¦ 458 444 443 459 28 26 210;
I MDE nd03d1 vsc653 * 140 i_1963 ¦ 456 27 442 459;
I MDE or03d1 vsc653 * 141 i_1964 ¦ 87 413 442 458;
I MDE oa07d1 vsc653 * 142 i_1965 ¦ 461 462 316 463 464 211;
I MDE nr02d1 vsc653 * 143 i_1966 ¦ 465 316 464;
I MDE an04d1 vsc653 * 144 i_1967 ¦ 466 467 355 356 465;
I MDE an03d1 vsc653 * 145 i_1968 ¦ 248 314 315 467;
I MDE or02d1 vsc653 * 146 i_1969 ¦ 468 469 463;
I MDE in01d1 vsc653 * 147 i_1970 ¦ 470 469;
I MDE mx21d1 vsc653 * 148 i_1971 ¦ 471 420 472 470;
I MDE or02d1 vsc653 * 149 i_1972 ¦ 128 399 472;
I MDE ao01d1 vsc653 * 150 i_1973 ¦ 473 97 474 119 471;
I MDE nr02d1 vsc653 * 151 i_1974 ¦ 473 472 474;
I MDE or04d1 vsc653 * 152 i_1975 ¦ 122 156 167 157 473;
I MDE in01d1 vsc653 * 153 i_1976 ¦ 476 468;

I MDE mx21d1 vsc653 * 154 i_1977 ¦ 477 400 472 476;
I MDE ao01d1 vsc653 * 155 i_1978 ¦ 473 96 474 120 477;
I MDE in01d1 vsc653 * 156 i_1979 ¦ 463 462;
I MDE an02d1 vsc653 * 157 i_1980 ¦ 356 315 461;
I MDE oa02d1 vsc653 * 158 i_1981 ¦ 481 316 469 468 470 464 212;
I MDE mx21d1 vsc653 * 159 i_1982 ¦ 482 461 476 481;
I MDE nr02d1 vsc653 * 160 i_1983 ¦ 142 165 482;
I MDE oa07d1 vsc653 * 161 i_1984 ¦ 482 316 483 464 484 213;
I MDE or02d1 vsc653 * 162 i_1985 ¦ 476 469 484;
I MDE in01d1 vsc653 * 163 i_1986 ¦ 484 483;
I MDE nd08d1 vsc653 * 164 i_1988 ¦ 486 4 487 488 489 490 167 491 485;
I MDE in01d1 vsc653 * 165 i_1989 ¦ 495 494;
I MDE ao03d1 vsc653 * 166 i_1990 ¦ 267 156 127 496 122 495;
I MDE in01d1 vsc653 * 167 i_1991 ¦ 436 496;
I MDE an04d1 vsc653 * 168 i_1992 ¦ 134 136 123 124 215;
I MDE an03d1 vsc653 * 169 i_1993 ¦ 500 501 495 216;
I MDE or05d1 vsc653 * 170 i_1994 ¦ 502 399 503 434 504 500;
I MDE fn05d1 vsc653 * 171 i_1995 ¦ 7 505 504;
I MDE an04d1 vsc653 * 172 i_1996 ¦ 466 314 356 506 505;
I MDE or02d1 vsc653 * 173 i_1997 ¦ 315 316 506;
I MDE in01d1 vsc653 * 174 i_1998 ¦ 414 503;
I MDE an03d1 vsc653 * 175 i_1999 ¦ 246 7 5 502;
I MDE or02d1 vsc653 * 176 i_2000 ¦ 166 510 508;
I MDE in01d1 vsc653 * 177 i_2001 ¦ 245 510;
I MDE ao07d1 vsc653 * 178 i_2002 ¦ 237 163 170 14 194 217;
I MDE in01d1 vsc653 * 179 i_2003 ¦ 15 194;
I MDE oa07d1 vsc653 * 180 i_2004 ¦ 239 241 444 242 346 218;
I MDE in01d1 vsc653 * 181 i_2005 ¦ 241 242;
I MDE or02d1 vsc653 * 182 i_2006 ¦ 165 166 241;
I MDE in01d1 vsc653 * 183 i_2007 ¦ 448 247;
I MDE an02d1 vsc653 * 184 i_2008 ¦ 256 259 219;
I MDE xo02d1 vsc653 * 185 i_2009 ¦ 260 487 259;
I MDE or02d1 vsc653 * 186 i_2010 ¦ 261 264 260;
I MDE in01d1 vsc653 * 187 i_2011 ¦ 269 264;
I MDE or05d1 vsc653 * 188 i_2012 ¦ 47 487 488 486 270 269;
I MDE mx21d1 vsc653 * 189 i_2013 ¦ 316 489 490 270;
I MDE an03d1 vsc653 * 190 i_2014 ¦ 275 276 274 261;
I MDE or02d1 vsc653 * 191 i_2015 ¦ 269 261 256;
I MDE an02d1 vsc653 * 192 i_2016 ¦ 256 273 220;
I MDE xo02d1 vsc653 * 193 i_2017 ¦ 278 486 273;
I MDE or02d1 vsc653 * 194 i_2018 ¦ 260 487 278;
I MDE an02d1 vsc653 * 195 i_2019 ¦ 256 284 221;
I MDE xo02d1 vsc653 * 196 i_2020 ¦ 288 488 284;
I MDE or02d1 vsc653 * 197 i_2021 ¦ 486 278 288;
I MDE an02d1 vsc653 * 198 i_2022 ¦ 256 293 222;
I MDE xo02d1 vsc653 * 199 i_2023 ¦ 296 491 293;
I MDE or02d1 vsc653 * 200 i_2024 ¦ 488 288 296;
I MDE an02d1 vsc653 * 201 i_2025 ¦ 256 302 223;

```
I MDE xo02d1 vsc653 * 202 i_2026 ¦ 307 490 302;
I MDE or02d1 vsc653 * 203 i_2027 ¦ 491 296 307;
I MDE an02d1 vsc653 * 204 i_2028 ¦ 256 310 224;
I MDE xo02d1 vsc653 * 205 i_2029 ¦ 311 489 310;
I MDE or02d1 vsc653 * 206 i_2030 ¦ 490 307 311;
I MDE an04d1 vsc653 * 207 i_2031 ¦ 318 456 26 442 225;
I MDE nr02d1 vsc653 * 208 i_2032 ¦ 28 27 318;
I MDE ao03d1 vsc653 * 209 i_2033 ¦ 320 496 67 327 330 226;
I MDE in01d1 vsc653 * 210 i_2034 ¦ 332 330;
I MDE an02d1 vsc653 * 211 i_2035 ¦ 387 414 332;
I MDE an02d1 vsc653 * 212 i_2036 ¦ 164 335 327;
I MDE in01d1 vsc653 * 213 i_2037 ¦ 467 335;
I MDE an02d1 vsc653 * 214 i_2038 ¦ 339 347 67;
I MDE an03d1 vsc653 * 215 i_2039 ¦ 357 358 332 227;
I MDE or02d1 vsc653 * 216 i_2040 ¦ 436 134 358;
I MDE ao07d1 vsc653 * 217 i_2041 ¦ 335 68 164 71 69 357;
I MDE in01d1 vsc653 * 218 i_2042 ¦ 359 69;
I MDE or02d1 vsc653 * 219 i_2043 ¦ 339 119 359;
I MDE an02d1 vsc653 * 220 i_2044 ¦ 339 119 68;
I MDE an03d1 vsc653 * 221 i_2045 ¦ 361 362 332 228;
I MDE in01d1 vsc653 * 222 i_2046 ¦ 432 362;
I MDE mx21d1 vsc653 * 223 i_2047 ¦ 365 466 359 361;
I MDE or02d1 vsc653 * 224 i_2048 ¦ 467 316 365;
I MDE in01d1 vsc653 * 225 i_2049 ¦ 372 368;
I MDE ao07d1 vsc653 * 226 i_2050 ¦ 375 7 30 138 77 372;
I MDE or02d1 vsc653 * 227 i_2051 ¦ 94 379 375;
I MDE ao08d1 vsc653 * 228 i_2052 ¦ 248 355 356 316 379;
I MDE oa07d1 vsc653 * 229 i_2053 ¦ 461 316 386 388 389 229;
I MDE ao05d1 vsc653 * 230 i_2054 ¦ 94 316 395 394 389;
I MDE in01d1 vsc653 * 231 i_2055 ¦ 396 395;
I MDE or02d1 vsc653 * 232 i_2056 ¦ 401 391 396;
I MDE or02d1 vsc653 * 233 i_2057 ¦ 81 82 388;
I MDE in01d1 vsc653 * 234 i_2058 ¦ 388 386;
I MDE oa02d1 vsc653 * 235 i_2059 ¦ 405 316 82 406 81 389 230;
I MDE in01d1 vsc653 * 236 i_2060 ¦ 82 406;
I MDE mx21d1 vsc653 * 237 i_2061 ¦ 461 407 81 405;
I MDE nr02d1 vsc653 * 238 i_2062 ¦ 142 71 407;
I MDE oa07d1 vsc653 * 239 i_2063 ¦ 410 407 316 411 389 231;
I MDE in01d1 vsc653 * 240 i_2064 ¦ 410 411;
I MDE fn05d1 vsc653 * 241 i_2065 ¦ 81 82 410;
I MDE oa07d1 vsc653 * 242 i_2067 ¦ 415 114 417 421 425 233;
I MDE in01d1 vsc653 * 243 i_2068 ¦ 415 425;
I MDE fn05d1 vsc653 * 244 i_2069 ¦ 100 7 421;
I MDE an03d1 vsc653 * 245 i_2070 ¦ 426 115 428 415;
I MDE or02d1 vsc653 * 246 i_2071 ¦ 30 255 234;
I MDE or02d1 vsc653 * 247 i_2072 ¦ 13 194 431;
I MDE an04d1 vsc653 * 248 i_2073 ¦ 112 438 15 168 20;
I MDE in01d1 vsc653 * 249 i_2074 ¦ 13 438;
```

I MDE an04d1 vsc653 * 250 i_2075 ¦ 111 438 15 168 21;
I MDE an04d1 vsc653 * 251 i_2076 ¦ 110 438 15 168 22;
I MDE an02d1 vsc653 * 252 i_2077 ¦ 446 460 23;
I MDE in01d1 vsc653 * 253 i_2078 ¦ 445 460;
I MDE mx21d1 vsc653 * 254 i_2079 ¦ 145 152 475 37;
I MDE nd04d1 vsc653 * 255 i_2080 ¦ 275 478 479 480 475;
I MDE nr02d1 vsc653 * 256 i_2081 ¦ 122 136 480;
I MDE nr02d1 vsc653 * 257 i_2082 ¦ 156 128 479;
I MDE nd03d1 vsc653 * 258 i_2083 ¦ 167 450 449 478;
I MDE mx21d1 vsc653 * 259 i_2084 ¦ 144 151 475 38;
I MDE mx21d1 vsc653 * 260 i_2085 ¦ 143 150 475 39;
I MDE mx21d1 vsc653 * 261 i_2086 ¦ 146 153 475 40;
I MDE mx21d1 vsc653 * 262 i_2087 ¦ 147 154 475 41;
I MDE mx21d1 vsc653 * 263 i_2088 ¦ 148 155 475 42;
I MDE ao04d1 vsc653 * 264 i_2089 ¦ 492 315 6 235;
I MDE oa08d1 vsc653 * 265 i_2090 ¦ 71 141 142 164 492;
I MDE an03d1 vsc653 * 266 i_2091 ¦ 118 493 8 52;
I MDE or02d1 vsc653 * 267 i_2092 ¦ 71 149 493;
I MDE an03d1 vsc653 * 268 i_2093 ¦ 493 8 498 53;
I MDE nr02d1 vsc653 * 269 i_2094 ¦ 499 8 54;
I MDE in01d1 vsc653 * 270 i_2095 ¦ 493 499;
I MDE an02d1 vsc653 * 271 i_2096 ¦ 162 29 55;
I MDE an05d1 vsc653 * 272 i_2097 ¦ 511 512 513 236 252 56;
I MDE in01d1 vsc653 * 273 i_2098 ¦ 54 252;
I MDE in01d1 vsc653 * 274 i_2099 ¦ 53 236;
I MDE an04d1 vsc653 * 275 i_2100 ¦ 248 356 315 396 513;
I MDE in01d1 vsc653 * 276 i_2101 ¦ 52 512;
I MDE in01d1 vsc653 * 277 i_2102 ¦ 55 511;
I MDE in01d1 vsc653 * 278 i_2103 ¦ 513 57;
I MDE or02d1 vsc653 * 279 i_2104 ¦ 55 57 58;
I MDE or06d1 vsc653 * 280 i_2105 ¦ 434 399 156 157 167 503 63;
I MDE oa08d1 vsc653 * 281 i_2106 ¦ 308 313 316 319 64;
I MDE an04d1 vsc653 * 282 i_2107 ¦ 275 243 466 314 319;
I MDE in01d1 vsc653 * 283 i_2108 ¦ 67 313;
I MDE nr02d1 vsc653 * 284 i_2109 ¦ 94 165 308;
I MDE oa03d1 vsc653 * 285 i_2110 ¦ 359 461 308 360 319 65;
I MDE or02d1 vsc653 * 286 i_2111 ¦ 316 378 360;
I MDE in01d1 vsc653 * 287 i_2112 ¦ 68 378;
I MDE or04d1 vsc653 * 288 i_2113 ¦ 385 402 404 141 66;
I MDE in01d1 vsc653 * 289 i_2114 ¦ 319 404;
I MDE in01d1 vsc653 * 290 i_2115 ¦ 506 402;
I MDE an03d1 vsc653 * 291 i_2116 ¦ 69 165 164 385;
I MDE nr02d1 vsc653 * 292 i_2117 ¦ 316 314 70;
I MDE nr02d1 vsc653 * 293 i_2118 ¦ 314 164 72;
I MDE an06d1 vsc653 * 294 i_2119 ¦ 412 416 427 429 433 437 73;
I MDE oa04d1 vsc653 * 295 i_2120 ¦ 439 451 316 437;
I MDE xo02d1 vsc653 * 296 i_2121 ¦ 147 154 451;
I MDE xo02d1 vsc653 * 297 i_2122 ¦ 148 155 439;

I MDE xn02d1 vsc653 * 298 i_2123 ¦ 144 151 433;
I MDE xn02d1 vsc653 * 299 i_2124 ¦ 145 152 429;
I MDE or03d1 vsc653 * 300 i_2125 ¦ 167 157 156 427;
I MDE xn02d1 vsc653 * 301 i_2126 ¦ 146 153 416;
I MDE xn02d1 vsc653 * 302 i_2127 ¦ 143 150 412;
I MDE an02d1 vsc653 * 303 i_2128 ¦ 454 125 85;
I MDE or06d1 vsc653 * 304 i_2129 ¦ 399 122 457 157 496 503 454;
I MDE in01d1 vsc653 * 305 i_2130 ¦ 430 457;
I MDE an02d1 vsc653 * 306 i_2131 ¦ 454 132 86;
I MDE nr02d1 vsc653 * 307 i_2132 ¦ 497 90 88;
I MDE nd03d1 vsc653 * 308 i_2133 ¦ 414 387 435 90;
I MDE in01d1 vsc653 * 309 i_2134 ¦ 507 497;
I MDE or06d1 vsc653 * 310 i_2135 ¦ 94 141 166 165 142 509 507;
I MDE an04d1 vsc653 * 311 i_2136 ¦ 272 280 291 446 509;
I MDE nr02d1 vsc653 * 312 i_2137 ¦ 507 90 89;
I MDE nd03d1 vsc653 * 313 i_2138 ¦ 436 391 387 91;
I MDE mx21d1 vsc653 * 314 i_2139 ¦ 83 123 413 92;
I MDE mx21d1 vsc653 * 315 i_2140 ¦ 84 124 413 93;
I MDE mfptnh vsc653 * 316 dncnt_ff_b0 ¦ 131 127 408 61 2 127 320;
I MDE mfctnh vsc653 * 317 dncnt_ff_b1 ¦ 127 134 408 61 2 134 420;
I MDE mfctnh vsc653 * 318 dlcnt_ff_b0 ¦ 125 132 196 61 2 132 398;
I MDE mfptnh vsc653 * 319 dlcnt_ff_b1 ¦ 135 125 196 61 2 125 515;
I MDE mfctnh vsc653 * 320 dncnt_dnp_ff ¦ 134 131 408 61 2 131 400;
I MDE mfctnh vsc653 * 321 dlcnt_dnp_ff ¦ 132 135 196 61 2 135 193;
I MDE mfptnh vsc653 * 322 dshrtd_ff ¦ 164 10 485 11 1 164 316;
I MDE mfptnh vsc653 * 323 dmotd_ff ¦ 118 9 485 11 1 118 498;
I MDE mfntnb vsc653 * 324 baddrg_ff_b3 ¦ 383 129 381 11 129 514;
I MDE mfntnb vsc653 * 325 baddrg_ff_b2 ¦ 403 130 381 11 130 192;
I MDE mfntnb vsc653 * 326 baddrg_ff_b1 ¦ 397 133 381 11 133 191;
I MDE mfntnb vsc653 * 327 baddrg_ff_b0 ¦ 380 139 381 11 139 189;
I MDE dfctnb vsc653 * 328 dccnt_ff_b0 ¦ 171 61 2 155 283;
I MDE dfctnb vsc653 * 329 dccnt_ff_b1 ¦ 172 61 2 154 287;
I MDE dfctnb vsc653 * 330 dccnt_ff_b2 ¦ 173 61 2 153 292;
I MDE dfctnb vsc653 * 331 dccnt_ff_b3 ¦ 174 61 2 150 268;
I MDE dfctnb vsc653 * 332 dccnt_ff_b4 ¦ 175 61 2 151 299;
I MDE dfctnb vsc653 * 333 dccnt_ff_b5 ¦ 176 61 2 152 190;
I MDE dfctnb vsc653 * 334 dkrcnt_ff_b0 ¦ 177 61 2 148 323;
I MDE dfctnb vsc653 * 335 dkrcnt_ff_b1 ¦ 178 61 2 147 326;
I MDE dfctnb vsc653 * 336 dkrcnt_ff_b2 ¦ 179 61 2 146 331;
I MDE dfctnb vsc653 * 337 dkrcnt_ff_b3 ¦ 180 61 2 143 306;
I MDE dfctnb vsc653 * 338 dkrcnt_ff_b4 ¦ 181 61 2 144 338;
I MDE dfctnb vsc653 * 339 dkrcnt_ff_b5 ¦ 182 61 2 145 121;
I MDE dfctnb vsc653 * 340 dkwcnt_ff_b0 ¦ 183 11 2 36 343;
I MDE dfctnb vsc653 * 341 dkwcnt_ff_b1 ¦ 184 11 2 35 349;
I MDE dfctnb vsc653 * 342 dkwcnt_ff_b2 ¦ 185 11 2 34 348;
I MDE dfctnb vsc653 * 343 dkwcnt_ff_b3 ¦ 186 11 2 33 371;
I MDE dfctnb vsc653 * 344 dkwcnt_ff_b4 ¦ 187 11 2 32 352;
I MDE dfctnb vsc653 * 345 dkwcnt_ff_b5 ¦ 188 11 2 31 351;

```
I MDE dfptnb vsc653 * 346 dwrbx__ff ¦ 158 62 2 138 30;
I MDE dfctnb vsc653 * 347 dbestps_ff_b0 ¦ 82 61 2 119 347;
I MDE dfctnb vsc653 * 348 dbestps_ff_b1 ¦ 81 61 2 120 339;
I MDE dfctnb vsc653 * 349 dmcnt_ff_b0 ¦ 198 61 2 124 419;
I MDE dfctnb vsc653 * 350 dmcnt_ff_b1 ¦ 199 61 2 123 423;
I MDE dfctnb vsc653 * 351 dlcnt_dnx_ff ¦ 135 61 2 126 401;
I MDE dfctnb vsc653 * 352 dstt0_ff ¦ 202 61 2 157 275;
I MDE dfctnh vsc653 * 353 dstt1_ff ¦ 203 61 2 156 430;
I MDE dfctnh vsc653 * 354 dstt2_ff ¦ 95 61 2 122 452;
I MDE dfctnh vsc653 * 355 dstt3_ff ¦ 204 61 2 128 436;
I MDE dfctnh vsc653 * 356 dstt4_ff ¦ 205 61 2 136 387;
I MDE dfctnb vsc653 * 357 dstt5_ff ¦ 196 61 2 137 391;
I MDE dfctnb vsc653 * 358 dstt6_ff ¦ 206 61 2 149 314;
I MDE dfctnb vsc653 * 359 dstt7_ff ¦ 149 61 2 94 315;
I MDE dfctnb vsc653 * 360 dstt8_ff ¦ 94 61 2 165 248;
I MDE dfctnb vsc653 * 361 dstt9_ff ¦ 207 61 2 71 466;
I MDE dfctnb vsc653 * 362 dstt10_ff ¦ 71 61 2 141 356;
I MDE dfctnb vsc653 * 363 dstt11_ff ¦ 141 61 2 142 355;
I MDE dfctnb vsc653 * 364 dstt12_ff ¦ 142 61 2 166 246;
I MDE dfptnh vsc653 * 365 dstt15_ff ¦ 169 61 2 167 243;
I MDE dfctnb vsc653 * 366 da_rec0_ff ¦ 208 11 1 162 253;
I MDE dfctnb vsc653 * 367 da_rec1_ff ¦ 209 11 1 200 450;
I MDE dfctnb vsc653 * 368 soid_ff ¦ 210 11 1 160 413;
I MDE dfctnb vsc653 * 369 db_send_ff ¦ 234 11 1 168 251;
I MDE dfntnb vsc653 * 370 dbrd0d_ff ¦ 211 11 112 201;
I MDE dfntnb vsc653 * 371 dbrd1d_ff ¦ 212 11 111 232;
I MDE dfntnb vsc653 * 372 dbrd2d_ff ¦ 213 11 110 161;
I MDE dfntnb vsc653 * 373 da_rec1d_ff ¦ 44 11 140 449;
I MDE dfctnb vsc653 * 374 dhltdr_ff ¦ 494 61 2 214 254;
I MDE dfctnb vsc653 * 375 dhltdsxd_ff ¦ 215 61 2 117 501;
I MDE dfctnb vsc653 * 376 dhltdt_ff ¦ 216 61 2 163 158;
I MDE dfctnb vsc653 * 377 dhltds_ff ¦ 117 61 2 159 258;
I MDE dfntnb vsc653 * 378 das_ff ¦ 12 11 115 113;
I MDE dfntnb vsc653 * 379 dbs_ff ¦ 115 11 116 428;
I MDE dfntnb vsc653 * 380 ddisd_ff ¦ 508 11 114 426;
I MDE dfptnb vsc653 * 381 du_send__ff ¦ 217 60 2 108 14;
I MDE dfntnb vsc653 * 382 dtfrm_ff ¦ 218 11 4 239;
I MDE dfntnb vsc653 * 383 da_rec1dp_ff ¦ 247 60 44 104;
I MDE dfctnb vsc653 * 384 dsym_add_ff_b0 ¦ 219 61 2 50 487;
I MDE dfctnb vsc653 * 385 dsym_add_ff_b1 ¦ 220 61 2 49 486;
I MDE dfctnb vsc653 * 386 dsym_add_ff_b2 ¦ 221 61 2 48 488;
I MDE dfctnb vsc653 * 387 dsym_add_ff_b3 ¦ 222 61 2 47 491;
I MDE dfctnb vsc653 * 388 dsym_add_ff_b4 ¦ 223 61 2 46 490;
I MDE dfctnb vsc653 * 389 dsym_add_ff_b5 ¦ 224 61 2 45 489;
I MDE dfctnb vsc653 * 390 dsym_en_ff ¦ 94 62 2 51 106;
I MDE dfntnb vsc653 * 391 da_rec4_ff ¦ 225 11 59 109;
I MDE dfptnb vsc653 * 392 dsmp0_ff ¦ 226 62 2 74 105;
I MDE dfptnb vsc653 * 393 dsmp1_ff ¦ 227 62 2 75 103;
```

```
I MDE dfptnb vsc653 * 394 dsmp2_ff ¦ 228 62 2 76 197;
I MDE dfctnb vsc653 * 395 dh10_ff ¦ 368 61 2 77 195;
I MDE dfctnb vsc653 * 396 drdacc0_ff ¦ 229 61 2 78 272;
I MDE dfctnb vsc653 * 397 drdacc1_ff ¦ 230 61 2 79 280;
I MDE dfctnb vsc653 * 398 drdacc2_ff ¦ 231 61 2 80 291;
I MDE dfntnb vsc653 * 399 dst_path_ff ¦ 508 60 87 107;
I MDE dfctnb vsc653 * 400 den_ff ¦ 233 60 1 98 417;
I MDE dfntnb vsc653 * 401 dhltd__ff ¦ 170 60 99 516;
E netlist


B subcells
NLS npulsw3_p *
MDE nt02d3 vsc653
MDE an02d1 vsc653
MDE or02d1 vsc653
MDE ao04d1 vsc653
MDE oa05d1 vsc653
MDE in01d1 vsc653
MDE an03d1 vsc653
MDE oa03d1 vsc653
MDE ao07d1 vsc653
MDE xn02d1 vsc653
MDE an05d1 vsc653
MDE mx21d1 vsc653
MDE nr02d1 vsc653
MDE ao08d1 vsc653
MDE xo02d1 vsc653
MDE or05d1 vsc653
MDE ao01d1 vsc653
MDE oa04d1 vsc653
MDE fn05d1 vsc653
MDE an04d1 vsc653
MDE oa07d1 vsc653
MDE oa02d1 vsc653
MDE nr03d1 vsc653
MDE fn03d1 vsc653
MDE or03d1 vsc653
MDE nd03d1 vsc653
MDE or04d1 vsc653
MDE nd08d1 vsc653
MDE ao03d1 vsc653
MDE ao05d1 vsc653
MDE nd04d1 vsc653
MDE oa08d1 vsc653
MDE or06d1 vsc653
MDE an06d1 vsc653
MDE mfptnh vsc653
```

MDE mfctnh vsc653
MDE mfntnb vsc653
MDE dfctnb vsc653
MDE dfptnb vsc653
MDE dfctnh vsc653
MDE dfptnh vsc653
MDE dfntnb vsc653
E subcells

DU_P NLS

```
#cell2 * du_p nls * 35 any 0 v8r4.6.2
# "5-Oct-94 GMT" "13:18:05 GMT" "5-Oct-94 GMT" "13:18:05 GMT" amir * .
writer        1
file_version  1
sections      1
netlist   1:        79 du_p


B contents:  du_p
netlist          242
cells          19155
switches           0
attributes     19392
physical           0
history            0
E contents


B netlist
X 1 reset_ i;
X 2 tdinit i;
X 3 tdfrz i;
X 4 tdtst i;
X 5 tdmod i;
X 6 tdmot i;
X 7 tdshrt i;
X 8 clk i;
X 9 rxqck i;
X 10 srxqck i;
X 11 rx_ck i;
X 12 wr_du i;
X 13 abus[15] i;
X 14 abus[14] i;
X 15 abus[13] i;
X 16 abus[12] i;
X 17 abus[11] i;
X 18 abus[10] i;
X 19 abus[9] i;
X 20 abus[8] i;
X 21 abus[7] i;
X 22 abus[6] i;
X 23 abus[5] i;
X 24 abus[4] i;
X 25 abus[3] i;
X 26 abus[2] i;
```

X 27 abus[1] i;
X 28 abus[0] i;
X 29 aadd[3] i;
X 30 aadd[2] i;
X 31 aadd[1] i;
X 32 aadd[0] i;
X 33 rd_du i;
X 34 tstwb i;
X 35 dtict o;
X 36 dtfrm o;
X 37 rx_sym[1] o;
X 38 rx_sym[0] o;
X 39 du_free_ o;
X 40 bbus[15] o;
X 41 bbus[14] o;
X 42 bbus[13] o;
X 43 bbus[12] o;
X 44 bbus[11] o;
X 45 bbus[10] o;
X 46 bbus[9] o;
X 47 bbus[8] o;
X 48 bbus[7] o;
X 49 bbus[6] o;
X 50 bbus[5] o;
X 51 bbus[4] o;
X 52 bbus[3] o;
X 53 bbus[2] o;
X 54 bbus[1] o;
X 55 bbus[0] o;
X 56 badd[3] o;
X 57 badd[2] o;
X 58 badd[1] o;
X 59 badd[0] o;
X 60 tdbp i;
X 61 tsidad i;
X 62 du_send o;
X 63 clk_dis i;
G 64 VDD;
G 65 VSS;
N 66 dcof[0];
N 67 dcof[1];
N 68 dcof[2];
N 69 dcof[3];
N 70 dcof[4];
N 71 dcof[5];
N 72 dcof[6];
N 73 dcof[7];
N 74 dcof[8];

N 75 dcof[9];
N 76 dcof[10];
N 77 dcof[11];
N 78 dcof[12];
N 79 dcof[13];
N 80 dcof[14];
N 81 dcof[15];
N 82 dcof[16];
N 83 dcof[17];
N 84 dcof[18];
N 85 dcof[19];
N 86 dcof[20];
N 87 dcof[21];
N 88 dcof[22];
N 89 dcof[23];
N 90 dcof_do[0];
N 91 dcof_do[1];
N 92 dcof_do[2];
N 93 dcof_do[3];
N 94 dcof_do[4];
N 95 dcof_do[5];
N 96 dcof_do[6];
N 97 dcof_do[7];
N 98 dcof_do[8];
N 99 dcof_do[9];
N 100 dcof_do[10];
N 101 dcof_do[11];
N 102 dcof_do[12];
N 103 dcof_do[13];
N 104 dcof_do[14];
N 105 dcof_do[15];
N 106 dcof_do[16];
N 107 dcof_do[17];
N 108 dcof_do[18];
N 109 dcof_do[19];
N 110 dcof_do[20];
N 111 dcof_do[21];
N 112 dcof_do[22];
N 113 dcof_do[23];
N 114 dsym_do_0[0];
N 115 dsym_do_0[1];
N 116 dsym_do_1[0];
N 117 dsym_do_1[1];
N 118 dsym_do_2[0];
N 119 dsym_do_2[1];
N 120 db_dat_tst[0];
N 121 db_dat_tst[1];
N 122 dsym_do[0];

N 123 dsym_do[1];
N 124 dsym_do[2];
N 125 dsym_do[3];
N 126 dsym_do[4];
N 127 dsym_do[5];
N 128 dpath_do[0];
N 129 dpath_do[1];
N 130 dpath_do[2];
N 131 dpath_do[3];
N 132 dpath_do[4];
N 133 dpath_do[5];
N 134 dsym_add[0];
N 135 dsym_add[1];
N 136 dsym_add[2];
N 137 dsym_add[3];
N 138 dsym_add[4];
N 139 dsym_add[5];
N 140 drcof_add[0];
N 141 drcof_add[1];
N 142 drcof_add[2];
N 143 drcof_add[3];
N 144 drcof_add[4];
N 145 drcof_add[5];
N 146 dwcof_add[0];
N 147 dwcof_add[1];
N 148 dwcof_add[2];
N 149 dwcof_add[3];
N 150 dwcof_add[4];
N 151 dwcof_add[5];
N 152 dmv_d[0];
N 153 dmv_d[1];
N 154 dbestp[0];
N 155 dbestp[1];
N 156 dbestd[0];
N 157 dbestd[1];
N 158 dbestd_add[0];
N 159 dbestd_add[1];
N 160 dbrl[0];
N 161 dbrl[1];
N 162 dbrl[2];
N 163 dbrl[3];
N 164 dbrl[4];
N 165 dbrl[5];
N 166 dcofsel[0];
N 167 dcofsel[1];
N 168 dcofsel[2];
N 169 dupd[0];
N 170 dupd[1];

N 171 dupd[2];
N 172 dsympath[0];
N 173 dsympath[1];
N 174 dsympath[2];
N 175 dsympath[3];
N 176 dsympath[4];
N 177 dsympath[5];
N 178 dsympath[6];
N 179 dsympath[7];
N 180 dsympath[8];
N 181 dsympath[9];
N 182 dsympath[10];
N 183 dsympath[11];
N 184 drst_n;
N 185 drst_ndp;
N 186 dmclk;
N 187 dmclk_;
N 188 dmclkdp;
N 189 clk_;
N 190 dawr;
N 191 den;
N 192 dhltd_;
N 193 da_rec4;
N 194 dmod_we;
N 195 dsym_en;
N 196 dsym_we;
N 197 dcof_we1;
N 198 da_rec1dp;
N 199 dcof_we;
N 200 i_111_z;
N 201 dst_path;
N 202 i_108_z;
N 203 i_65_zn;
N 204 i_60_zn;
N 205 i_54_zn;
N 206 i_48_zn;
N 207 i_42_zn;
N 208 i_36_zn;
N 209 i_96_z;
N 210 i_93_z;
N 211 i_90_z;
N 212 i_87_z;
N 213 i_84_z;
N 214 i_81_z;
N 215 dsxn;
N 216 i_114_z;
N 217 dwrb;
N 218 dmins;

```
N 219 dacc00;
N 220 dacc01;
N 221 dacc10;
N 222 dbest0;
N 223 dbest1;
N 224 dbest2;
N 225 dsav_clk;
N 226 i_99_z;
N 227 drda;
N 228 dbrd0;
N 229 dbrd1;
N 230 dbrd2;
N 231 drdacc0;
N 232 drdacc1;
N 233 drdacc2;
N 234 dsmp0;
N 235 dsmp1;
N 236 dsmp2;
N 237 i_105_z;
N 238 dshiftnt;
N 239 dh10;
N 240 dcalc;
N 241 dxn;
N 242 i_37_zn;
N 243 i_43_zn;
N 244 i_49_zn;
N 245 i_55_zn;
N 246 i_61_zn;
N 247 i_66_zn;
N 66 dnm60_cof[0];
N 67 dnm60_cof[1];
N 68 dnm60_cof[2];
N 69 dnm60_cof[3];
N 70 dnm60_cof[4];
N 71 dnm60_cof[5];
N 72 dnm60_cof[6];
N 73 dnm60_cof[7];
N 74 dnm60_cof[8];
N 75 dnm60_cof[9];
N 76 dnm60_cof[10];
N 77 dnm60_cof[11];
N 78 dnm60_cof[12];
N 79 dnm60_cof[13];
N 80 dnm60_cof[14];
N 81 dnm60_cof[15];
N 82 dnm60_cof[16];
N 83 dnm60_cof[17];
N 84 dnm60_cof[18];
```

N 85 dnm60_cof[19];
N 86 dnm60_cof[20];
N 87 dnm60_cof[21];
N 88 dnm60_cof[22];
N 89 dnm60_cof[23];
N 90 dcof_ram_DO[23];
N 91 dcof_ram_DO[22];
N 92 dcof_ram_DO[21];
N 93 dcof_ram_DO[20];
N 94 dcof_ram_DO[19];
N 95 dcof_ram_DO[18];
N 96 dcof_ram_DO[17];
N 97 dcof_ram_DO[16];
N 98 dcof_ram_DO[15];
N 99 dcof_ram_DO[14];
N 100 dcof_ram_DO[13];
N 101 dcof_ram_DO[12];
N 102 dcof_ram_DO[11];
N 103 dcof_ram_DO[10];
N 104 dcof_ram_DO[9];
N 105 dcof_ram_DO[8];
N 106 dcof_ram_DO[7];
N 107 dcof_ram_DO[6];
N 108 dcof_ram_DO[5];
N 109 dcof_ram_DO[4];
N 110 dcof_ram_DO[3];
N 111 dcof_ram_DO[2];
N 112 dcof_ram_DO[1];
N 113 dcof_ram_DO[0];
N 114 dmux8_sym_0[0];
N 115 dmux8_sym_0[1];
N 116 dmux8_sym_1[0];
N 117 dmux8_sym_1[1];
N 118 dmux8_sym_2[0];
N 119 dmux8_sym_2[1];
N 120 dnm60_tst[0];
N 121 dnm60_tst[1];
N 122 dsym_ram_DO[6];
N 123 dsym_ram_DO[7];
N 124 dsym_ram_DO[8];
N 125 dsym_ram_DO[9];
N 126 dsym_ram_DO[10];
N 127 dsym_ram_DO[11];
N 128 dsym_ram_DO[0];
N 129 dsym_ram_DO[1];
N 130 dsym_ram_DO[2];
N 131 dsym_ram_DO[3];
N 132 dsym_ram_DO[4];

N 133 dsym_ram_DO[5];
N 134 du_ctl_dsym_add[0];
N 135 du_ctl_dsym_add[1];
N 136 du_ctl_dsym_add[2];
N 137 du_ctl_dsym_add[3];
N 138 du_ctl_dsym_add[4];
N 139 du_ctl_dsym_add[5];
N 140 du_ctl_drcof_add[0];
N 141 du_ctl_drcof_add[1];
N 142 du_ctl_drcof_add[2];
N 143 du_ctl_drcof_add[3];
N 144 du_ctl_drcof_add[4];
N 145 du_ctl_drcof_add[5];
N 146 du_ctl_dwcof_add[0];
N 147 du_ctl_dwcof_add[1];
N 148 du_ctl_dwcof_add[2];
N 149 du_ctl_dwcof_add[3];
N 150 du_ctl_dwcof_add[4];
N 151 du_ctl_dwcof_add[5];
N 152 du_ctl_dmv_d[0];
N 153 du_ctl_dmv_d[1];
N 154 dmux8_dbestp[0];
N 155 dmux8_dbestp[1];
N 156 dmux8_dbestd[0];
N 157 dmux8_dbestd[1];
N 158 du_ctl_dbestd_add[0];
N 159 du_ctl_dbestd_add[1];
N 160 du_ctl_dbrl[0];
N 161 du_ctl_dbrl[1];
N 162 du_ctl_dbrl[2];
N 163 du_ctl_dbrl[3];
N 164 du_ctl_dbrl[4];
N 165 du_ctl_dbrl[5];
N 166 du_ctl_dcofsel[0];
N 167 du_ctl_dcofsel[1];
N 168 du_ctl_dcofsel[2];
N 169 du_ctl_dupd[0];
N 170 du_ctl_dupd[1];
N 171 du_ctl_dupd[2];
N 172 dnm60_sympath[0];
N 173 dnm60_sympath[1];
N 174 dnm60_sympath[2];
N 175 dnm60_sympath[3];
N 176 dnm60_sympath[4];
N 177 dnm60_sympath[5];
N 178 dnm60_sympath[6];
N 179 dnm60_sympath[7];
N 180 dnm60_sympath[8];

N 181 dnm60_sympath[9];
N 182 dnm60_sympath[10];
N 183 dnm60_sympath[11];
N 184 dugr_drst_n[0];
N 185 dugr_drst_ndp[0];
N 186 dugr_dmclk[0];
N 187 dugr_dmclk_[0];
N 188 dugr_dmclkdp[0];
N 189 dugr_clk_[0];
N 190 dugr_dawr[0];
N 191 du_ctl_den[0];
N 192 du_ctl_dhltd_[0];
N 193 du_ctl_da_rec4[0];
N 194 dugr_dmod_we[0];
N 195 du_ctl_dsym_en[0];
N 196 dugr_dsym_we[0];
N 197 du_ctl_dcof_we1[0];
N 198 du_ctl_da_rec1dp[0];
N 199 dugr_dcof_we[0];
N 200 i_111_Z_1[0];
N 201 du_ctl_dst_path[0];
N 202 i_108_Z_1[0];
N 203 i_65_ZN_1[0];
N 204 i_60_ZN_1[0];
N 205 i_54_ZN_1[0];
N 206 i_48_ZN_1[0];
N 207 i_42_ZN_1[0];
N 208 i_36_ZN_1[0];
N 209 i_96_Z_1[0];
N 210 i_93_Z_1[0];
N 211 i_90_Z_1[0];
N 212 i_87_Z_1[0];
N 213 i_84_Z_1[0];
N 214 i_81_Z_1[0];
N 215 du_ctl_dsxn[0];
N 216 i_114_Z_1[0];
N 217 du_ctl_dwrb[0];
N 218 du_ctl_dmins[0];
N 219 du_ctl_dacc00[0];
N 220 du_ctl_dacc01[0];
N 221 du_ctl_dacc10[0];
N 222 du_ctl_dbest0[0];
N 223 du_ctl_dbest1[0];
N 224 du_ctl_dbest2[0];
N 225 du_ctl_dsav_clk[0];
N 226 i_99_Z_1[0];
N 227 du_ctl_drda[0];
N 228 du_ctl_dbrd0[0];

```
N 229 du_ctl_dbrd1[0];
N 230 du_ctl_dbrd2[0];
N 231 du_ctl_drdacc0[0];
N 232 du_ctl_drdacc1[0];
N 233 du_ctl_drdacc2[0];
N 234 du_ctl_dsmp0[0];
N 235 du_ctl_dsmp1[0];
N 236 du_ctl_dsmp2[0];
N 237 i_105_Z_1[0];
N 238 du_ctl_dshiftnt[0];
N 239 du_ctl_dh10[0];
N 240 du_ctl_dcalc[0];
N 241 du_ctl_dxn[0];
N 242 i_37_ZN_1[0];
N 243 i_43_ZN_1[0];
N 244 i_49_ZN_1[0];
N 245 i_55_ZN_1[0];
N 246 i_61_ZN_1[0];
N 247 i_66_ZN_1[0];
N 55 dnm60_bbus[0];
N 54 dnm60_bbus[1];
N 53 dnm60_bbus[2];
N 52 dnm60_bbus[3];
N 51 dnm60_bbus[4];
N 50 dnm60_bbus[5];
N 49 dnm60_bbus[6];
N 48 dnm60_bbus[7];
N 47 dnm60_bbus[8];
N 46 dnm60_bbus[9];
N 45 dnm60_bbus[10];
N 44 dnm60_bbus[11];
N 43 dnm60_bbus[12];
N 42 dnm60_bbus[13];
N 41 dnm60_bbus[14];
N 40 dnm60_bbus[15];
N 35 du_ctl_dtict[0];
N 36 du_ctl_dtfrm[0];
N 62 du_ctl_du_send[0];
N 59 du_ctl_badd[0];
N 58 du_ctl_badd[1];
N 57 du_ctl_badd[2];
N 56 du_ctl_badd[3];
N 38 dmux8_rx_sym[0];
N 37 dmux8_rx_sym[1];
N 39 du_ctl_du_free_[0];
V abus 15 0 ¦ 13 14 15 16 17 18 19 20 21 22 23 24 25 26 27 28;
V aadd 3 0 ¦ 29 30 31 32;
V rx_sym 1 0 ¦ 37 38;
```

V bbus 15 0 ¦ 40 41 42 43 44 45 46 47 48 49 50 51 52 53 54 55;
V badd 3 0 ¦ 56 57 58 59;
V dcof 23 0 ¦ 89 88 87 86 85 84 83 82 81 80 79 78 77 76 75 74 73 72 71 70 69 68 -
67 66;
V dcof_do 23 0 ¦ 113 112 111 110 109 108 107 106 105 104 103 102 101 100 99 98 9-
7 96 95 94 93 92 91 90;
V dsym_do_0 1 0 ¦ 115 114;
V dsym_do_1 1 0 ¦ 117 116;
V dsym_do_2 1 0 ¦ 119 118;
V db_dat_tst 1 0 ¦ 121 120;
V dsym_do 5 0 ¦ 127 126 125 124 123 122;
V dpath_do 5 0 ¦ 133 132 131 130 129 128;
V dsym_add 5 0 ¦ 139 138 137 136 135 134;
V drcof_add 5 0 ¦ 145 144 143 142 141 140;
V dwcof_add 5 0 ¦ 151 150 149 148 147 146;
V dmv_d 1 0 ¦ 153 152;
V dbestp 1 0 ¦ 155 154;
V dbestd 1 0 ¦ 157 156;
V dbestd_add 1 0 ¦ 159 158;
V dbrl 5 0 ¦ 165 164 163 162 161 160;
V dcofsel 2 0 ¦ 168 167 166;
V dupd 2 0 ¦ 171 170 169;
V dsympath 11 0 ¦ 183 182 181 180 179 178 177 176 175 174 173 172;
V dugr_drst_n 0 0 ¦ 184;
V dugr_drst_ndp 0 0 ¦ 185;
V dugr_dmclk 0 0 ¦ 186;
V dugr_dmclk_ 0 0 ¦ 187;
V dugr_dmclkdp 0 0 ¦ 188;
V dugr_clk_ 0 0 ¦ 189;
V dugr_dawr 0 0 ¦ 190;
V dugr_dmod_we 0 0 ¦ 194;
V dugr_dsym_we 0 0 ¦ 196;
V dugr_dcof_we 0 0 ¦ 199;
V dcof_ram_DO 23 0 ¦ 90 91 92 93 94 95 96 97 98 99 100 101 102 103 104 105 106 1-
07 108 109 110 111 112 113;
V dsym_ram_DO 11 0 ¦ 127 126 125 124 123 122 133 132 131 130 129 128;
V dmux8_sym_2 1 0 ¦ 119 118;
V dmux8_sym_1 1 0 ¦ 117 116;
V dmux8_sym_0 1 0 ¦ 115 114;
V dmux8_dbestp 1 0 ¦ 155 154;
V dmux8_dbestd 1 0 ¦ 157 156;
V dmux8_rx_sym 1 0 ¦ 37 38;
V dnm60_tst 1 0 ¦ 121 120;
V dnm60_sympath 11 0 ¦ 183 182 181 180 179 178 177 176 175 174 173 172;
V dnm60_cof 23 0 ¦ 89 88 87 86 85 84 83 82 81 80 79 78 77 76 75 74 73 72 71 70 6-
9 68 67 66;
V dnm60_bbus 15 0 ¦ 40 41 42 43 44 45 46 47 48 49 50 51 52 53 54 55;
V du_ctl_dtict 0 0 ¦ 35;

```
V du_ctl_dtfrm 0 0 ¦ 36;
V du_ctl_du_send 0 0 ¦ 62;
V du_ctl_badd 3 0 ¦ 56 57 58 59;
V du_ctl_dbrd0 0 0 ¦ 228;
V du_ctl_dbrd1 0 0 ¦ 229;
V du_ctl_dbrd2 0 0 ¦ 230;
V du_ctl_du_free_ 0 0 ¦ 39;
V du_ctl_drda 0 0 ¦ 227;
V du_ctl_dwrb 0 0 ¦ 217;
V du_ctl_dwcof_add 5 0 ¦ 151 150 149 148 147 146;
V du_ctl_drcof_add 5 0 ¦ 145 144 143 142 141 140;
V du_ctl_dcof_we1 0 0 ¦ 197;
V du_ctl_da_rec1dp 0 0 ¦ 198;
V du_ctl_dsym_add 5 0 ¦ 139 138 137 136 135 134;
V du_ctl_dsym_en 0 0 ¦ 195;
V du_ctl_dbrl 5 0 ¦ 165 164 163 162 161 160;
V du_ctl_dshiftnt 0 0 ¦ 238;
V du_ctl_da_rec4 0 0 ¦ 193;
V du_ctl_dmins 0 0 ¦ 218;
V du_ctl_dacc00 0 0 ¦ 219;
V du_ctl_dacc01 0 0 ¦ 220;
V du_ctl_dacc10 0 0 ¦ 221;
V du_ctl_dbest0 0 0 ¦ 222;
V du_ctl_dbest1 0 0 ¦ 223;
V du_ctl_dbest2 0 0 ¦ 224;
V du_ctl_dupd 2 0 ¦ 171 170 169;
V du_ctl_dsav_clk 0 0 ¦ 225;
V du_ctl_dsmp0 0 0 ¦ 234;
V du_ctl_dsmp1 0 0 ¦ 235;
V du_ctl_dsmp2 0 0 ¦ 236;
V du_ctl_dh10 0 0 ¦ 239;
V du_ctl_drdacc0 0 0 ¦ 231;
V du_ctl_drdacc1 0 0 ¦ 232;
V du_ctl_drdacc2 0 0 ¦ 233;
V du_ctl_dbestd_add 1 0 ¦ 159 158;
V du_ctl_dst_path 0 0 ¦ 201;
V du_ctl_dcofsel 2 0 ¦ 168 167 166;
V du_ctl_dcalc 0 0 ¦ 240;
V du_ctl_dmv_d 1 0 ¦ 153 152;
V du_ctl_dsxn 0 0 ¦ 215;
V du_ctl_dxn 0 0 ¦ 241;
V du_ctl_den 0 0 ¦ 191;
V du_ctl_dhltd_ 0 0 ¦ 192;
V i_36_ZN_1 0 0 ¦ 208;
V i_37_ZN_1 0 0 ¦ 242;
V i_42_ZN_1 0 0 ¦ 207;
V i_43_ZN_1 0 0 ¦ 243;
V i_48_ZN_1 0 0 ¦ 206;
```

V i_49_ZN_1 0 0 ¦ 244;
V i_54_ZN_1 0 0 ¦ 205;
V i_55_ZN_1 0 0 ¦ 245;
V i_60_ZN_1 0 0 ¦ 204;
V i_61_ZN_1 0 0 ¦ 246;
V i_65_ZN_1 0 0 ¦ 203;
V i_66_ZN_1 0 0 ¦ 247;
V i_81_Z_1 0 0 ¦ 214;
V i_84_Z_1 0 0 ¦ 213;
V i_87_Z_1 0 0 ¦ 212;
V i_90_Z_1 0 0 ¦ 211;
V i_93_Z_1 0 0 ¦ 210;
V i_96_Z_1 0 0 ¦ 209;
V i_99_Z_1 0 0 ¦ 226;
V i_105_Z_1 0 0 ¦ 237;
V i_108_Z_1 0 0 ¦ 202;
V i_111_Z_1 0 0 ¦ 200;
V i_114_Z_1 0 0 ¦ 216;
M NLS dugr_p * ¦ drst_n drst_ndp dmclk dmclk_ dmclkdp clk_ dawr wr_du tdtst tdin-
it tdfrz reset_ clk den dhltd_ da_rec4 dmod_we dsym_en dsym_we dcof_we1 da_rec1d-
p dcof_we ¦ oooooooiiiiiiiiioioiio;
M MDE tcram2(tcram40x24) * ¦ AR[5] AR[4] AR[3] AR[2] AR[1] AR[0] AW[5] AW[4] AW[-
3] AW[2] AW[1] AW[0] CLB DI[23] DI[22] DI[21] DI[20] DI[19] DI[18] DI[17] DI[16]-
DI[15] DI[14] DI[13] DI[12] DI[11] DI[10] DI[9] DI[8] DI[7] DI[6] DI[5] DI[4] D-
I[3] DI[2] DI[1] DI[0] DO[23] DO[22] DO[21] DO[20] DO[19] DO[18] DO[17] DO[16] D-
O[15] DO[14] DO[13] DO[12] DO[11] DO[10] DO[9] DO[8] DO[7] DO[6] DO[5] DO[4] DO[-
3] DO[2] DO[1] DO[0] WEB ¦ ;
M MDE tcram2(tcram40x12) * ¦ AR[5] AR[4] AR[3] AR[2] AR[1] AR[0] AW[5] AW[4] AW[-
3] AW[2] AW[1] AW[0] CLB DI[11] DI[10] DI[9] DI[8] DI[7] DI[6] DI[5] DI[4] DI[3]-
DI[2] DI[1] DI[0] DO[11] DO[10] DO[9] DO[8] DO[7] DO[6] DO[5] DO[4] DO[3] DO[2]-
DO[1] DO[0] WEB ¦ ;
M NLS nmux8_p * ¦ clk mclk reset_ tdbp dxn set_path sym_do[5] sym_do[4] sym_do[3-
] sym_do[2] sym_do[1] sym_do[0] path_do[5] path_do[4] path_do[3] path_do[2] path-
_do[1] path_do[0] sym_2[1] sym_2[0] sym_1[1] sym_1[0] sym_0[1] sym_0[0] calc cal-
c_d[1] calc_d[0] dbestd_add[1] dbestd_add[0] dbestp[1] dbestp[0] dbestd[1] dbest-
d[0] sympath[11] sympath[10] sympath[9] sympath[8] sympath[7] sympath[6] sympath-
[5] sympath[4] sympath[3] sympath[2] sympath[1] sympath[0] rxqck srxqck tsidad d-
sxn rx_sym[1] rx_sym[0] ¦ iiiiiiiiiiiiiiiiiooooooiiiiioooiiiiiiiiiiiiiiioo;
M NLS nm60_p * ¦ mclk reset_ cofsel[2] cofsel[1] cofsel[0] brl[5] brl[4] brl[3] -
brl[2] brl[1] brl[0] shiftnt ureg_cp mwrb mins acc00 acc01 acc10 best0 best1 bes-
t2 upd[2] upd[1] upd[0] sav_clk h10 tst[1] tst[0] abus[15] abus[14] abus[13] abu-
s[12] abus[11] abus[10] abus[9] abus[8] abus[7] abus[6] abus[5] abus[4] abus[3] -
abus[2] abus[1] abus[0] awr rda sympath[11] sympath[10] sympath[9] sympath[8] sympath[7] sympath[6] sympath[5] sympath[4] sympath[3] sympath[2] sympath[1] sympath[0] cof[23] cof[22] cof[21] cof[20] cof[19] cof[18] cof[17] cof[16] cof[15] cof[14] cof[13] cof[12] cof[11] cof[10] cof[9] cof[8] cof[7] cof[6] cof[5] cof[4] - cof[3] cof[2] cof[1] cof[0] din[23] din[22] din[21] din[20] din[19] din[18] din[17] din[16] din[15] din[14] din[13] din[12] din[11] din[10] din[9] din[8] din[7]- din[6] din[5] din[4] din[3] din[2] din[1] din[0] bbus[15] bbus[14] bbus[13] bbus[12] bbus[11] bbus[10] bbus[9] bbus[8] bbus[7] bbus[6] bbus[5] bbus[4] bbus[3] - bbus[2] bbus[1] bbus[0] brd00 brd01 brd10 sym00[1] sym00[0] sym01[1] sym01[0] sym10[1] sym10[0] rdacc00 rdacc01 rdacc10 smp00 smp01 smp10 ¦ iiiiiiiiiiiiiiiiiii-iiiiiiooiiiiiiiiiiiiiiiiiiooooooooooooooooooooooooooooooooooooooiiiiiiiiiiiiiiii-iiiiiioooooooooooooooooooiiiiiiiiiiiiii;
M NLS du_ctl_p * ¦ reset_ drst_n dtict dtfrm tdinit tdfrz tdtst tdmod tdmot tdshrt clk rx_ck tstwb du_send rd_du badd[3] badd[2] badd[1] badd[0] dbrd0 dbrd1 dbrd2 du_free_ wr_du aadd[3] aadd[2] aadd[1] aadd[0] drda dwrb dwcof_add[5] dwcof_add[4] dwcof_add[3] dwcof_add[2] dwcof_add[1] dwcof_add[0] drcof_add[5] drcof_add[4] drcof_add[3] drcof_add[2] drcof_add[1] drcof_add[0] dcof_we1 da_rec1dp dsym_-add[5] dsym_add[4] dsym_add[3] dsym_add[2] dsym_add[1] dsym_add[0] dsym_en dbrl[5] dbrl[4] dbrl[3] dbrl[2] dbrl[1] dbrl[0] dshiftnt da_rec4 clk_ dmclk dmclk_ dmins dacc00 dacc01 dacc10 dbest0 dbest1 dbest2 dupd[2] dupd[1] dupd[0] dsav_clk dsmp0 dsmp1 dsmp2 dh10 drdacc0 drdacc1 drdacc2 dbestp[1] dbestp[0] dbestd[1] dbestd[0] dbestd_add[1] dbestd_add[0] dst_path dcofsel[2] dcofsel[1] dcofsel[0] dcalc dmv_d[1] dmv_d[0] dsxn dxn db_dat_tst[1] db_dat_tst[0] den dhltd_ clk_dis ¦ iiooiiiiiiiiiioiooooooooiiiiiooooooooooooooooooooooooooooooooiiioooooooooooooooooooii-iioooooooooooiiooi;
M MDE in01d2 vsc653 ¦ I ZN ¦ ;
M MDE in01d1 vsc653 ¦ I ZN ¦ ;
M MDE ni01d2 vsc653 ¦ I Z ¦ ;
M MDE ni01d1 vsc653 ¦ I Z ¦ ;
M MDE ni01d5 vsc653 ¦ I Z ¦ ;
M MDE ni01d4 vsc653 ¦ I Z ¦ ;
I NLS dugr_p * * 1 dugr ¦ 184 185 186 187 188 189 190 12 4 2 3 1 8 191 192 193 194 195 196 197 198 199;
I MDE tcram2(tcram40x24) * * 2 dcof_ram ¦ 145 144 143 142 141 140 151 150 149 148 147 146 184 66 67 68 69 70 71 72 73 74 75 76 77 78 79 80 81 82 83 84 85 86 87 - 88 89 90 91 92 93 94 95 96 97 98 99 100 101 102 103 104 105 106 107 108 109 110 - 111 112 113 199;
I MDE tcram2(tcram40x12) * * 3 dsym_ram ¦ 139 138 137 136 135 134 139 138 137 136 135 134 185 183 182 181 180 179 178 177 176 175 174 173 172 127 126 125 124 123 122 133 132 131 130 129 128 196;
I NLS nmux8_p * * 4 dmux8 ¦ 8 188 185 60 200 201 127 126 125 124 123 122 133 132- 131 130 129 128 119 118 117 116 115 114 202 153 152 159 158 155 154 157 156 203- 204 205 206 207 208 209 210 211 212 213 214 9 10 61 215 37 38;
I NLS nm60_p * * 5 dnm60 ¦ 188 185 168 167 166 165 164 163 162 161 160 216 194 217 218 219 220 221 222 223 224 171 170 169 225 226 121 120 13 14 15 16 17 18 19 - 20 21 22 23 24 25 26 27 28 190 227 183 182 181 180 179 178 177 176 175 174 173 172 89 88 87 86 85 84 83 82 81 80 79 78 77 76 75 74 73 72 71 70 69 68 67 66 113 112 111 110 109 108 107 106 105 104 103 102 101 100 99 98 97 96 95 94 93 92 91 90- 40 41 42 43 44 45 46 47 48 49 50 51 52 53 54 55 228 229 230 115 114 117 116 119-

```
118 231 232 233 234 235 236;
I NLS du_ctl_p * * 6 du_ctl ¦ 237 184 35 36 2 3 4 5 6 7 8 11 34 62 33 56 57 58 5-
9 228 229 230 39 12 29 30 31 32 227 217 151 150 149 148 147 146 145 144 143 142 -
141 140 197 198 139 138 137 136 135 134 195 165 164 163 162 161 160 238 193 189 -
186 187 218 219 220 221 222 223 224 171 170 169 225 234 235 236 239 231 232 233 -
155 154 157 156 159 158 201 168 167 166 240 153 152 215 241 121 120 191 192 63;
I MDE in01d2 vsc653 * 7 i_36 ¦ 242 208;
I MDE in01d1 vsc653 * 8 i_37 ¦ 178 242;
I MDE in01d2 vsc653 * 9 i_42 ¦ 243 207;
I MDE in01d1 vsc653 * 10 i_43 ¦ 179 243;
I MDE in01d2 vsc653 * 11 i_48 ¦ 244 206;
I MDE in01d1 vsc653 * 12 i_49 ¦ 180 244;
I MDE in01d2 vsc653 * 13 i_54 ¦ 245 205;
I MDE in01d1 vsc653 * 14 i_55 ¦ 181 245;
I MDE in01d2 vsc653 * 15 i_60 ¦ 246 204;
I MDE in01d1 vsc653 * 16 i_61 ¦ 182 246;
I MDE in01d2 vsc653 * 17 i_65 ¦ 247 203;
I MDE in01d1 vsc653 * 18 i_66 ¦ 183 247;
I MDE ni01d2 vsc653 * 19 i_81 ¦ 172 214;
I MDE ni01d2 vsc653 * 20 i_84 ¦ 173 213;
I MDE ni01d1 vsc653 * 21 i_87 ¦ 174 212;
I MDE ni01d1 vsc653 * 22 i_90 ¦ 175 211;
I MDE ni01d1 vsc653 * 23 i_93 ¦ 176 210;
I MDE ni01d1 vsc653 * 24 i_96 ¦ 177 209;
I MDE ni01d5 vsc653 * 25 i_99 ¦ 239 226;
I MDE ni01d4 vsc653 * 26 i_105 ¦ 1 237;
I MDE ni01d5 vsc653 * 27 i_108 ¦ 240 202;
I MDE ni01d5 vsc653 * 28 i_111 ¦ 241 200;
I MDE ni01d4 vsc653 * 29 i_114 ¦ 238 216;
E netlist


B subcells
NLS dugr_p *
MDE tcram2(tcram40x24) *
MDE tcram2(tcram40x12) *
NLS nmux8_p *
NLS nm60_p *
NLS du_ctl_p *
MDE in01d2 vsc653
MDE in01d1 vsc653
MDE ni01d2 vsc653
MDE ni01d1 vsc653
MDE ni01d5 vsc653
MDE ni01d4 vsc653
E subcells
```

B attribute_list
    19464 chip
    19477 frequency
E attribute_list

B A: chip
E

B A: frequency
E

DUGR_P NLS

```
#cell2 * dugr_p nls * 4 any 0 v8r4.6.2
# "16-Oct-94 GMT" "15:22:23 GMT" "16-Oct-94 GMT" "15:22:23 GMT" amir * .
writer        1
file_version  1
sections      1
netlist   1:      81 dugr_p


B contents:  dugr_p
netlist        246
cells         3028
switches         0
attributes       0
physical         0
history          0
E contents


B netlist
X 1 drst_n o;
X 2 drst_ndp o;
X 3 dmclk o;
X 4 dmclk_ o;
X 5 dmclkdp o;
X 6 clk_ o;
X 7 dawr o;
X 8 wr_du i;
X 9 tdtst i;
X 10 tdinit i;
X 11 tdfrz i;
X 12 reset_ i;
X 13 clk i;
X 14 den i;
X 15 dhltd_ i;
X 16 da_rec4 i;
X 17 dmod_we o;
X 18 dsym_en i;
X 19 dsym_we o;
X 20 dcof_we1 i;
X 21 da_rec1dp i;
X 22 dcof_we o;
G 23 VDD;
G 24 VSS;
N 25 i_135_zn;
N 26 i_139_zn;
```

```
N 27 i_136_zn;
N 28 i_138_zn;
N 29 i_137_zn;
N 30 wr_dud;
N 31 i_144_zn;
N 32 i_145_zn;
N 33 i_149_zn;
N 34 i_151_zn;
N 35 i_153_zn;
N 36 i_154_zn;
N 37 wr_dud_ff_qn;
N 25 i_135_ZN_1[0];
N 26 i_139_ZN_1[0];
N 27 i_136_ZN_1[0];
N 28 i_138_ZN_1[0];
N 29 i_137_ZN_1[0];
N 30 wr_dud_ff_Q[0];
N 31 i_144_ZN_1[0];
N 32 i_145_ZN_1[0];
N 33 i_149_ZN_1[0];
N 34 i_151_ZN_1[0];
N 35 i_153_ZN_1[0];
N 36 i_154_ZN_1[0];
N 37 wr_dud_ff_QN_1[0];
N 1 i_134_ZN[0];
N 2 i_1134_ZN[0];
N 7 i_140_Z[0];
N 6 i_141_ZN[0];
N 5 i_142_ZN[0];
N 4 i_146_ZN[0];
N 3 i_147_ZN[0];
N 17 i_148_ZN[0];
N 19 i_150_Z[0];
N 22 i_152_Z[0];
V i_134_ZN 0 0 ¦ 1;
V i_1134_ZN 0 0 ¦ 2;
V i_135_ZN_1 0 0 ¦ 25;
V i_136_ZN_1 0 0 ¦ 27;
V i_137_ZN_1 0 0 ¦ 29;
V i_138_ZN_1 0 0 ¦ 28;
V i_139_ZN_1 0 0 ¦ 26;
V i_140_Z 0 0 ¦ 7;
V i_141_ZN 0 0 ¦ 6;
V i_142_ZN 0 0 ¦ 5;
V i_144_ZN_1 0 0 ¦ 31;
V i_145_ZN_1 0 0 ¦ 32;
V i_146_ZN 0 0 ¦ 4;
V i_147_ZN 0 0 ¦ 3;
```

```
V i_148_ZN 0 0 ¦ 17;
V i_149_ZN_1 0 0 ¦ 33;
V i_150_Z 0 0 ¦ 19;
V i_151_ZN_1 0 0 ¦ 34;
V i_152_Z 0 0 ¦ 22;
V i_153_ZN_1 0 0 ¦ 35;
V i_154_ZN_1 0 0 ¦ 36;
V wr_dud_ff_Q 0 0 ¦ 30;
V wr_dud_ff_QN_1 0 0 ¦ 37;
M MDE in01d5 vsc653 ¦ I ZN ¦ ;
M MDE fn01d2 vsc653 ¦ A1 B1 ZN ¦ ;
M MDE nd03d1 vsc653 ¦ A1 A2 A3 ZN ¦ ;
M MDE in02d2 vsc653 ¦ I ZN ¦ ;
M MDE in01d1 vsc653 ¦ I ZN ¦ ;
M MDE an03d1 vsc653 ¦ A1 A2 A3 Z ¦ ;
M MDE nd02d1 vsc653 ¦ A1 A2 ZN ¦ ;
M MDE nr02d1 vsc653 ¦ A1 A2 ZN ¦ ;
M MDE or02d1 vsc653 ¦ A1 A2 Z ¦ ;
M MDE an02d1 vsc653 ¦ A1 A2 Z ¦ ;
M MDE lanfnb vsc653 ¦ D EN Q QN ¦ ;
I MDE in01d5 vsc653 * 1 i_134 ¦ 25 1;
I MDE in01d5 vsc653 * 2 i_1134 ¦ 25 2;
I MDE fn01d2 vsc653 * 3 i_135 ¦ 26 27 25;
I MDE nd03d1 vsc653 * 4 i_136 ¦ 28 29 10 27;
I MDE in02d2 vsc653 * 5 i_137 ¦ 9 29;
I MDE in02d2 vsc653 * 6 i_138 ¦ 11 28;
I MDE in01d1 vsc653 * 7 i_139 ¦ 12 26;
I MDE an03d1 vsc653 * 8 i_140 ¦ 30 1 13 7;
I MDE in01d1 vsc653 * 9 i_141 ¦ 13 6;
I MDE in01d5 vsc653 * 10 i_142 ¦ 31 5;
I MDE fn01d2 vsc653 * 11 i_144 ¦ 32 13 31;
I MDE nd02d1 vsc653 * 12 i_145 ¦ 14 15 32;
I MDE in01d5 vsc653 * 13 i_146 ¦ 3 4;
I MDE in01d5 vsc653 * 14 i_147 ¦ 31 3;
I MDE nr02d1 vsc653 * 15 i_148 ¦ 13 33 17;
I MDE in01d1 vsc653 * 16 i_149 ¦ 16 33;
I MDE or02d1 vsc653 * 17 i_150 ¦ 34 4 19;
I MDE nd02d1 vsc653 * 18 i_151 ¦ 1 18 34;
I MDE an02d1 vsc653 * 19 i_152 ¦ 20 35 22;
I MDE fn01d2 vsc653 * 20 i_153 ¦ 36 13 35;
I MDE in01d1 vsc653 * 21 i_154 ¦ 21 36;
I MDE lanfnb vsc653 * 22 wr_dud_ff ¦ 8 13 30 37;
E netlist


B subcells
MDE in01d5 vsc653
MDE fn01d2 vsc653
```

MDE nd03d1 vsc653
MDE in02d2 vsc653
MDE in01d1 vsc653
MDE an03d1 vsc653
MDE nd02d1 vsc653
MDE nr02d1 vsc653
MDE or02d1 vsc653
MDE an02d1 vsc653
MDE lanfnb vsc653
E subcells

MU_CTL_P NLS

```
#cell2 * mu_ctl_p nls * 43 any 0 v8r4.6.2
# "13-Oct-94 GMT" "21:08:31 GMT" "13-Oct-94 GMT" "21:08:31 GMT" amir * .
writer        1
file_version  1
sections      1
netlist   1:        83 mu_ctl_p


B contents:  mu_ctl_p
netlist        250
cells          30401
switches         0
attributes       0
physical         0
history          0
E contents


B netlist
X 1 reset_ i;
X 2 mrst_n i;
X 3 clk i;
X 4 rx_ck i;
X 5 clk_ i;
X 6 mmclk i;
X 7 mmclk_ i;
X 8 tmtst i;
X 9 tlfrz i;
X 10 tlmod i;
X 11 tminit i;
X 12 mtict o;
X 13 ltfrm o;
X 14 tgmod i;
X 15 tgfrz i;
X 16 tpmod i;
X 17 tpfrz i;
X 18 modc_we i;
X 19 mmvck i;
X 20 mmv_rec i;
X 21 mb_rech i;
X 22 modr6_we i;
X 23 modr7_we i;
X 24 mfe i;
X 25 mff_ i;
X 26 mwra o;
```

X 27 maadd[7] o;
X 28 maadd[6] o;
X 29 maadd[5] o;
X 30 maadd[4] o;
X 31 maadd[3] o;
X 32 maadd[2] o;
X 33 maadd[1] o;
X 34 maadd[0] o;
X 35 mcof_we o;
X 36 mcfadd[4] o;
X 37 mcfadd[3] o;
X 38 mcfadd[2] o;
X 39 mcfadd[1] o;
X 40 mcfadd[0] o;
X 41 mdat_we o;
X 42 mdtadd[4] o;
X 43 mdtadd[3] o;
X 44 mdtadd[2] o;
X 45 mdtadd[1] o;
X 46 mdtadd[0] o;
X 47 minp3 o;
X 48 minmul o;
X 49 maxone[3] o;
X 50 maxone[2] o;
X 51 maxone[1] o;
X 52 maxone[0] o;
X 53 mckonst o;
X 54 macc0[3] o;
X 55 macc0[2] o;
X 56 macc0[1] o;
X 57 macc0[0] o;
X 58 macc_smp o;
X 59 mv_tr o;
X 60 mrdacc o;
X 61 mwrbadd[4] o;
X 62 mwrbadd[3] o;
X 63 mwrbadd[2] o;
X 64 mwrbadd[1] o;
X 65 mwrbadd[0] o;
X 66 mu_send o;
X 67 mbrl[10] o;
X 68 mbrl[9] o;
X 69 mbrl[8] o;
X 70 mbrl[7] o;
X 71 mbrl[6] o;
X 72 mbrl[5] o;
X 73 mbrl[4] o;
X 74 mbrl[3] o;

X 75 mbrl[2] o;
X 76 mbrl[1] o;
X 77 mbrl[0] o;
X 78 men o;
X 79 mhltd_ o;
X 80 clk_dis i;
G 81 VDD;
G 82 VSS;
N 92 mmv_rc;
N 93 vmcntxd_1_q[1];
N 101 mmv_rcv;
N 103 vmcntxd_1_q[0];
N 107 vstt1;
N 113 mc_en;
N 114 vmcntx[0];
N 115 vmcntx[1];
N 116 mr7_en;
N 117 mr6_en;
N 118 mbs;
N 119 mas;
N 120 mdisd;
N 121 mhltdt;
N 122 mb_rechd;
N 123 lscnt[3];
N 124 lscnt[2];
N 125 lscnt[1];
N 126 lscnt[0];
N 127 pstt0;
N 128 vmcntxd_n[0];
N 129 vstt0;
N 130 vmcntxd_n[1];
N 131 lstt1;
N 132 lpcnt[1];
N 133 lpcnt[0];
N 134 lccnt[3];
N 135 lccnt[2];
N 136 lccnt[1];
N 137 lccnt[0];
N 138 lstt0;
N 139 lstt2;
N 140 pstt6;
N 141 pstt11;
N 142 pstt9;
N 143 pstt2;
N 145 lkcnt[1];
N 146 lkcnt[3];
N 147 lkcnt[2];
N 148 lkcnt[0];

N 149 lonerg;
N 150 pstt1;
N 151 pstt3;
N 152 pstt5;
N 153 pstt7;
N 154 pstt8;
N 155 pstt4;
N 156 pstt10;
N 157 lstt3;
N 158 vstt3;
N 159 vstt4;
N 160 last;
N 161 maadd_d[5];
N 162 minp3_n;
N 163 maadd_d[0];
N 164 macc0d[0];
N 165 macc0d[1];
N 166 maadd_d[1];
N 167 maadd_d[6];
N 168 maadd_d[4];
N 169 maadd_d[7];
N 170 maadd_d[3];
N 171 maadd_d[2];
N 172 macc_smp_n;
N 173 macc0d[3];
N 174 macc0d[2];
N 175 mu_sendd;
N 176 mu_send_n;
N 177 lmac_n;
N 178 lstt0d;
N 179 lstt1d;
N 180 lstt2d;
N 181 mv_tr_n;
N 182 vmcnt_n[1];
N 183 vmcnt_n[0];
N 184 mhltdtd;
N 185 lastd;
N 186 lpcnt_n[0];
N 187 lpcnt_n[1];
N 188 lscnt_n[0];
N 189 lscnt_n[1];
N 190 lscnt_n[2];
N 191 lscnt_n[3];
N 192 lccnt_n[0];
N 193 lccnt_n[1];
N 194 lccnt_n[2];
N 195 lccnt_n[3];
N 196 lkcnt_n[0];

N 197 mhlt_;
N 198 mwrad_;
N 199 lkcnt_n[1];
N 200 lkcnt_n[2];
N 201 lkcnt_n[3];
N 202 lonerg_n;
N 203 ltfrm_n;
N 204 men_n;
N 4 mas_n;
N 92 mmv_rc_1_q;
N 92 vstt0_n;
N 93 vmcntxd[1];
N 93 vmcntx_n[1];
N 20 mmv_rcv_n;
N 27 maadd_1_q[7];
N 28 maadd_1_q[6];
N 29 maadd_1_q[5];
N 30 maadd_1_q[4];
N 31 maadd_1_q[3];
N 32 maadd_1_q[2];
N 33 maadd_1_q[1];
N 34 maadd_1_q[0];
N 66 mu_send_1_q;
N 79 mhltd__1_q;
N 101 mmv_rcv_1_q;
N 101 mmv_rc_n;
N 103 vmcntxd[0];
N 103 vmcntx_n[0];
N 47 minp3_1_q;
N 107 vstt1_1_q;
N 107 vstt2_n;
N 54 macc0_1_q[3];
N 55 macc0_1_q[2];
N 56 macc0_1_q[1];
N 57 macc0_1_q[0];
N 58 macc_smp_1_q;
N 60 mrdacc_1_q;
N 113 mc_en_1_q;
N 114 vmcntx_1_q[0];
N 115 vmcntx_1_q[1];
N 116 mr7_en_1_q;
N 117 mr6_en_1_q;
N 118 mbs_1_q;
N 119 mas_1_q;
N 119 mbs_n;
N 120 mdisd_1_q;
N 13 ltfrm_1_q;
N 121 mhltdt_1_q;

N 122 mb_rechd_1_q;
N 123 lscnt_1_q[3];
N 124 lscnt_1_q[2];
N 125 lscnt_1_q[1];
N 126 lscnt_1_q[0];
N 127 pstt0_1_q;
N 127 pstt1_n;
N 128 vmcnt[0];
N 128 vmcnt_1_q[0];
N 129 vstt0_1_q;
N 129 vstt1_n;
N 130 vmcnt[1];
N 130 vmcnt_1_q[1];
N 59 mv_tr_1_q;
N 131 lstt1_1_q;
N 132 lpcnt_1_q[1];
N 133 lpcnt_1_q[0];
N 134 lccnt_1_q[3];
N 135 lccnt_1_q[2];
N 136 lccnt_1_q[1];
N 137 lccnt_1_q[0];
N 138 lstt0_1_q;
N 139 lstt2_1_q;
N 139 lstt3_n;
N 140 pstt6_1_q;
N 140 pstt7_n;
N 21 mb_rechd_n;
N 141 pstt11_1_q;
N 142 pstt9_1_q;
N 142 pstt10_n;
N 143 pstt2_1_q;
N 143 pstt3_n;
N 145 lkcnt_1_q[1];
N 146 lkcnt_1_q[3];
N 147 lkcnt_1_q[2];
N 148 lkcnt_1_q[0];
N 149 lonerg_1_q;
N 77 vstt2;
N 77 vstt2_1_q;
N 77 vstt3_n;
N 150 pstt1_1_q;
N 150 pstt2_n;
N 151 pstt3_1_q;
N 151 pstt4_n;
N 152 pstt5_1_q;
N 152 pstt6_n;
N 153 pstt7_1_q;
N 153 pstt8_n;

N 154 pstt8_1_q;
N 154 pstt9_n;
N 155 pstt4_1_q;
N 155 pstt5_n;
N 156 pstt10_1_q;
N 156 pstt11_n;
N 157 lstt3_1_q;
N 158 vstt3_1_q;
N 158 vstt4_n;
N 159 vstt4_1_q;
N 78 men_1_q;
N 160 last_1_q;
N 160 pstt0_n;
N 12 mtict_buf_1[0];
N 161 maadd_n[5];
N 163 maadd_n[0];
N 164 macc0_n[0];
N 165 macc0_n[1];
N 166 maadd_n[1];
N 167 maadd_n[6];
N 168 maadd_n[4];
N 169 maadd_n[7];
N 170 maadd_n[3];
N 171 maadd_n[2];
N 173 macc0_n[3];
N 174 macc0_n[2];
N 175 mrdacc_n;
N 178 lstt0d_1[0];
N 178 lstt0_n;
N 179 lstt1d_1[0];
N 179 lstt1_n;
N 180 lstt2d_1[0];
N 180 lstt2_n;
N 184 mhltdt_n;
N 185 lastd_1[0];
N 185 last_n;
N 185 mdis;
N 185 mdisd_n;
N 197 mhltd__n;
N 198 mwrax__n;
N 35 mcof_we_1[0];
N 41 mdat_we_1[0];
N 48 minmul_1[0];
N 53 mckonst_1[0];
N 26 mwra_buf_1[0];
V maadd 7 0 ¦ 27 28 29 30 31 32 33 34;
V mcfadd 4 0 ¦ 36 37 38 39 40;
V mdtadd 4 0 ¦ 42 43 44 45 46;

```
V maxone 3 0 ¦ 49 50 51 52;
V macc0 3 0 ¦ 54 55 56 57;
V mwrbadd 4 0 ¦ 61 62 63 64 65;
V mbrl 10 0 ¦ 67 68 69 70 71 72 73 74 75 76 77;
V vmcntxd_n 1 0 ¦ 130 128;
V vmcntxd_1_q 1 0 ¦ 93 103;
V maadd_d 7 0 ¦ 169 167 161 168 170 171 166 163;
V vmcntx 1 0 ¦ 115 114;
V vmcntxd 1 0 ¦ 93 103;
V lpcnt 1 0 ¦ 132 133;
V lscnt 3 0 ¦ 123 124 125 126;
V lccnt 3 0 ¦ 134 135 136 137;
V lkcnt 3 0 ¦ 146 147 145 148;
V macc0d 3 0 ¦ 173 174 165 164;
V lastd_1 0 0 ¦ 185;
V lstt0d_1 0 0 ¦ 178;
V lstt1d_1 0 0 ¦ 179;
V lstt2d_1 0 0 ¦ 180;
V minmul_1 0 0 ¦ 48;
V mwra_buf_1 0 0 ¦ 26;
V mcof_we_1 0 0 ¦ 35;
V mdat_we_1 0 0 ¦ 41;
V mckonst_1 0 0 ¦ 53;
V mtict_buf_1 0 0 ¦ 12;
V vmcntx_n 1 0 ¦ 93 103;
V vmcntx_1_q 1 0 ¦ 115 114;
V lpcnt_n 1 0 ¦ 187 186;
V lpcnt_1_q 1 0 ¦ 132 133;
V lscnt_n 3 0 ¦ 191 190 189 188;
V lscnt_1_q 3 0 ¦ 123 124 125 126;
V lccnt_n 3 0 ¦ 195 194 193 192;
V lccnt_1_q 3 0 ¦ 134 135 136 137;
V lkcnt_n 3 0 ¦ 201 200 199 196;
V lkcnt_1_q 3 0 ¦ 146 147 145 148;
V maadd_n 7 0 ¦ 169 167 161 168 170 171 166 163;
V maadd_1_q 7 0 ¦ 27 28 29 30 31 32 33 34;
V macc0_n 3 0 ¦ 173 174 165 164;
V macc0_1_q 3 0 ¦ 54 55 56 57;
M MDE in01d1 vsc653 ¦ I ZN ¦ ;
M MDE ao07d1 vsc653 ¦ A1 A2 A3 B1 B2 ZN ¦ ;
M MDE an02d1 vsc653 ¦ A1 A2 Z ¦ ;
M MDE in01d2 vsc653 ¦ I ZN ¦ ;
M MDE in01d5 vsc653 ¦ I ZN ¦ ;
M MDE ni01d4 vsc653 ¦ I Z ¦ ;
M MDE nr02d1 vsc653 ¦ A1 A2 ZN ¦ ;
M MDE oa04d1 vsc653 ¦ A1 A2 B ZN ¦ ;
M MDE or08d1 vsc653 ¦ A1 A2 A3 A4 A5 A6 A7 A8 Z ¦ ;
M MDE an03d1 vsc653 ¦ A1 A2 A3 Z ¦ ;
```

```
M MDE ni01d3 vsc653 ¦ I Z ¦ ;
M MDE or04d1 vsc653 ¦ A1 A2 A3 A4 Z ¦ ;
M MDE or02d1 vsc653 ¦ A1 A2 Z ¦ ;
M MDE an04d1 vsc653 ¦ A1 A2 A3 A4 Z ¦ ;
M MDE nd03d1 vsc653 ¦ A1 A2 A3 ZN ¦ ;
M MDE or05d1 vsc653 ¦ A1 A2 A3 A4 A5 Z ¦ ;
M MDE oa03d1 vsc653 ¦ A1 A2 B1 B2 C ZN ¦ ;
M MDE ao02d1 vsc653 ¦ A1 A2 A3 B1 B2 B3 ZN ¦ ;
M MDE an05d1 vsc653 ¦ A1 A2 A3 A4 A5 Z ¦ ;
M MDE fn05d1 vsc653 ¦ A1 B1 ZN ¦ ;
M MDE nd04d1 vsc653 ¦ A1 A3 A4 A2 ZN ¦ ;
M MDE ao08d1 vsc653 ¦ A1 A2 A3 B ZN ¦ ;
M MDE or03d1 vsc653 ¦ A1 A2 A3 Z ¦ ;
M MDE an06d1 vsc653 ¦ A1 A2 A3 A4 A5 A6 Z ¦ ;
M MDE or06d1 vsc653 ¦ A1 A2 A3 A4 A5 A6 Z ¦ ;
M MDE fn03d1 vsc653 ¦ A1 A2 B1 B2 ZN ¦ ;
M MDE oa01d1 vsc653 ¦ A1 A2 B1 B2 ZN ¦ ;
M MDE oa05d1 vsc653 ¦ A1 A2 B C ZN ¦ ;
M MDE in01d3 vsc653 ¦ I ZN ¦ ;
M MDE ni01d2 vsc653 ¦ I Z ¦ ;
M MDE oa07d1 vsc653 ¦ A1 A2 A3 B1 B2 ZN ¦ ;
M MDE nd06d1 vsc653 ¦ A1 A2 A3 A4 A5 A6 ZN ¦ ;
M MDE ao05d1 vsc653 ¦ A1 A2 B C ZN ¦ ;
M MDE ao01d1 vsc653 ¦ A1 A2 B1 B2 ZN ¦ ;
M MDE fn01d1 vsc653 ¦ A1 B1 ZN ¦ ;
M MDE xn02d1 vsc653 ¦ A1 A2 ZN ¦ ;
M MDE xo02d1 vsc653 ¦ A1 A2 Z ¦ ;
M MDE nd02d1 vsc653 ¦ A1 A2 ZN ¦ ;
M MDE ao03d1 vsc653 ¦ A1 A2 B1 B2 C ZN ¦ ;
M MDE oa02d1 vsc653 ¦ A1 A2 A3 B1 B2 B3 ZN ¦ ;
M MDE fn01d2 vsc653 ¦ A1 B1 ZN ¦ ;
M MDE in01d4 vsc653 ¦ I ZN ¦ ;
M MDE ao06d2 vsc653 ¦ A1 A2 B1 B2 C1 C2 ZN ¦ ;
M MDE an07d1 vsc653 ¦ A1 A2 A3 A4 A5 A6 A7 Z ¦ ;
M MDE an03d2 vsc653 ¦ A1 A2 A3 Z ¦ ;
M MDE ao02d2 vsc653 ¦ A1 A2 A3 B1 B2 B3 ZN ¦ ;
M MDE ni01d1 vsc653 ¦ I Z ¦ ;
M MDE nr03d1 vsc653 ¦ A1 A2 A3 ZN ¦ ;
M MDE dfntnb vsc653 ¦ D CP Q QN ¦ ;
M MDE dfctnb vsc653 ¦ D CP CDN Q QN ¦ ;
M MDE dfptnb vsc653 ¦ D CP SDN Q QN ¦ ;
M MDE lactnb vsc653 ¦ E D CDN Q QN ¦ ;
M MDE dfctnh vsc653 ¦ D CP CDN Q QN ¦ ;
I MDE in01d1 vsc653 * 1 i_1881 ¦ 205 12;
I MDE ao07d1 vsc653 * 2 i_1882 ¦ 206 24 207 208 24 205;
I MDE an02d1 vsc653 * 3 i_1883 ¦ 159 210 208;
I MDE in01d1 vsc653 * 4 i_1884 ¦ 211 207;
I MDE in01d1 vsc653 * 5 i_1885 ¦ 212 211;
```

```
I MDE in01d2 vsc653 * 6 i_1886 ¦ 213 212;
I MDE in01d5 vsc653 * 7 i_1887 ¦ 214 213;
I MDE ni01d4 vsc653 * 8 i_1888 ¦ 160 214;
I MDE nr02d1 vsc653 * 9 i_1889 ¦ 217 158 216;
I MDE oa04d1 vsc653 * 10 i_1890 ¦ 151 222 223 161;
I MDE or08d1 vsc653 * 11 i_1891 ¦ 156 225 154 151 155 157 229 158 223;
I MDE in01d1 vsc653 * 12 i_1892 ¦ 230 229;
I MDE in01d1 vsc653 * 13 i_1893 ¦ 153 230;
I MDE in01d1 vsc653 * 14 i_1894 ¦ 232 225;
I MDE an03d1 vsc653 * 15 i_1895 ¦ 233 8 11 232;
I MDE in01d1 vsc653 * 16 i_1896 ¦ 208 233;
I MDE in01d5 vsc653 * 17 i_1897 ¦ 235 234;
I MDE ni01d3 vsc653 * 18 i_1898 ¦ 236 235;
I MDE in01d1 vsc653 * 19 i_1899 ¦ 152 236;
I MDE or04d1 vsc653 * 20 i_1900 ¦ 150 77 229 154 162;
I MDE in01d1 vsc653 * 21 i_1901 ¦ 242 241;
I MDE or02d1 vsc653 * 22 i_1902 ¦ 151 244 163;
I MDE an04d1 vsc653 * 23 i_1903 ¦ 245 246 247 158 244;
I MDE in01d1 vsc653 * 24 i_1904 ¦ 155 245;
I MDE nd03d1 vsc653 * 25 i_1905 ¦ 249 250 251 164;
I MDE or05d1 vsc653 * 26 i_1906 ¦ 155 77 154 229 252 250;
I MDE or05d1 vsc653 * 27 i_1907 ¦ 155 77 154 229 253 249;
I MDE oa03d1 vsc653 * 28 i_1908 ¦ 142 256 245 142 257 165;
I MDE ao02d1 vsc653 * 29 i_1909 ¦ 258 251 154 259 229 251 257;
I MDE in01d1 vsc653 * 30 i_1910 ¦ 260 259;
I MDE an05d1 vsc653 * 31 i_1911 ¦ 149 261 147 148 264 260;
I MDE in01d1 vsc653 * 32 i_1912 ¦ 265 258;
I MDE fn05d1 vsc653 * 33 i_1913 ¦ 15 14 265;
I MDE an04d1 vsc653 * 34 i_1914 ¦ 245 268 269 157 166;
I MDE an03d1 vsc653 * 35 i_1915 ¦ 270 271 272 268;
I MDE nd04d1 vsc653 * 36 i_1916 ¦ 8 247 233 11 272;
I MDE ao08d1 vsc653 * 37 i_1917 ¦ 247 234 8 156 271;
I MDE ao02d1 vsc653 * 38 i_1918 ¦ 247 154 8 247 8 229 270;
I MDE or02d1 vsc653 * 39 i_1919 ¦ 274 151 167;
I MDE or03d1 vsc653 * 40 i_1920 ¦ 275 229 234 274;
I MDE or02d1 vsc653 * 41 i_1921 ¦ 154 276 275;
I MDE an05d1 vsc653 * 42 i_1922 ¦ 247 210 232 246 245 276;
I MDE an04d1 vsc653 * 43 i_1923 ¦ 230 222 275 269 168;
I MDE an02d1 vsc653 * 44 i_1924 ¦ 274 269 169;
I MDE or03d1 vsc653 * 45 i_1925 ¦ 280 281 282 170;
I MDE an04d1 vsc653 * 46 i_1926 ¦ 245 283 269 157 282;
I MDE in01d1 vsc653 * 47 i_1927 ¦ 268 283;
I MDE an04d1 vsc653 * 48 i_1928 ¦ 245 283 269 156 281;
I MDE an04d1 vsc653 * 49 i_1929 ¦ 210 245 283 269 280;
I MDE an02d1 vsc653 * 50 i_1930 ¦ 269 155 171;
I MDE an03d1 vsc653 * 51 i_1931 ¦ 210 247 286 172;
I MDE an06d1 vsc653 * 52 i_1932 ¦ 245 229 260 251 288 256 173;
I MDE or02d1 vsc653 * 53 i_1933 ¦ 290 291 174;
```

I MDE an06d1 vsc653 * 54 i_1934 ¦ 251 260 265 154 245 256 291;
I MDE an06d1 vsc653 * 55 i_1935 ¦ 245 154 265 251 256 230 290;
I MDE or08d1 vsc653 * 56 i_1936 ¦ 234 140 229 151 141 154 155 156 175;
I MDE or06d1 vsc653 * 57 i_1937 ¦ 156 141 21 234 229 294 176;
I MDE or04d1 vsc653 * 58 i_1938 ¦ 140 154 155 151 294;
I MDE in01d1 vsc653 * 59 i_1939 ¦ 296 295;
I MDE oa03d1 vsc653 * 60 i_1940 ¦ 298 252 157 252 299 177;
I MDE fn03d1 vsc653 * 61 i_1941 ¦ 139 141 157 286 299;
I MDE oa04d1 vsc653 * 62 i_1942 ¦ 302 303 288 178;
I MDE an04d1 vsc653 * 63 i_1943 ¦ 134 135 136 137 303;
I MDE oa01d1 vsc653 * 64 i_1944 ¦ 308 302 309 310 179;
I MDE in01d1 vsc653 * 65 i_1945 ¦ 131 310;
I MDE in01d1 vsc653 * 66 i_1946 ¦ 312 309;
I MDE or02d1 vsc653 * 67 i_1947 ¦ 133 314 312;
I MDE in01d1 vsc653 * 68 i_1948 ¦ 303 308;
I MDE oa03d1 vsc653 * 69 i_1949 ¦ 133 298 298 314 316 180;
I MDE nd03d1 vsc653 * 70 i_1950 ¦ 314 131 133 316;
I MDE oa05d1 vsc653 * 71 i_1951 ¦ 318 131 319 320 181;
I MDE in01d3 vsc653 * 72 i_1952 ¦ 321 320;
I MDE ni01d2 vsc653 * 73 i_1953 ¦ 127 321;
I MDE or02d1 vsc653 * 74 i_1954 ¦ 324 325 182;
I MDE oa07d1 vsc653 * 75 i_1955 ¦ 326 128 328 129 326 325;
I MDE in01d1 vsc653 * 76 i_1956 ¦ 329 328;
I MDE or02d1 vsc653 * 77 i_1957 ¦ 128 326 329;
I MDE an04d1 vsc653 * 78 i_1958 ¦ 129 128 326 329 324;
I MDE oa07d1 vsc653 * 79 i_1959 ¦ 319 128 328 332 129 183;
I MDE in01d1 vsc653 * 80 i_1960 ¦ 320 333;
I MDE nd06d1 vsc653 * 81 i_1961 ¦ 251 334 335 298 253 269 184;
I MDE ao05d1 vsc653 * 82 i_1962 ¦ 229 8 77 336 335;
I MDE an04d1 vsc653 * 83 i_1963 ¦ 210 217 8 11 336;
I MDE ao01d1 vsc653 * 84 i_1964 ¦ 8 140 155 8 334;
I MDE nr02d1 vsc653 * 85 i_1965 ¦ 217 158 185;
I MDE oa07d1 vsc653 * 86 i_1966 ¦ 133 309 338 339 340 186;
I MDE or02d1 vsc653 * 87 i_1967 ¦ 131 157 340;
I MDE in01d1 vsc653 * 88 i_1968 ¦ 340 338;
I MDE fn01d1 vsc653 * 89 i_1969 ¦ 342 343 187;
I MDE ao07d1 vsc653 * 90 i_1970 ¦ 339 132 312 132 338 343;
I MDE an04d1 vsc653 * 91 i_1971 ¦ 314 312 133 340 342;
I MDE xn02d1 vsc653 * 92 i_1972 ¦ 346 347 188;
I MDE in01d1 vsc653 * 93 i_1973 ¦ 126 347;
I MDE an02d1 vsc653 * 94 i_1974 ¦ 349 308 346;
I MDE in01d1 vsc653 * 95 i_1975 ¦ 302 349;
I MDE xo02d1 vsc653 * 96 i_1976 ¦ 350 351 189;
I MDE or02d1 vsc653 * 97 i_1977 ¦ 347 352 350;
I MDE in01d1 vsc653 * 98 i_1978 ¦ 346 352;
I MDE xo02d1 vsc653 * 99 i_1979 ¦ 354 355 190;
I MDE or02d1 vsc653 * 100 i_1980 ¦ 350 351 354;
I MDE xo02d1 vsc653 * 101 i_1981 ¦ 357 358 191;

I MDE or02d1 vsc653 * 102 i_1982 ¦ 354 355 357;
I MDE xo02d1 vsc653 * 103 i_1983 ¦ 302 360 192;
I MDE xo02d1 vsc653 * 104 i_1984 ¦ 362 363 193;
I MDE or02d1 vsc653 * 105 i_1985 ¦ 360 302 362;
I MDE xo02d1 vsc653 * 106 i_1986 ¦ 364 365 194;
I MDE or02d1 vsc653 * 107 i_1987 ¦ 362 363 364;
I MDE xo02d1 vsc653 * 108 i_1988 ¦ 367 368 195;
I MDE or02d1 vsc653 * 109 i_1989 ¦ 364 365 367;
I MDE xo02d1 vsc653 * 110 i_1990 ¦ 370 148 196;
I MDE in01d1 vsc653 * 111 i_1991 ¦ 371 370;
I MDE ao07d1 vsc653 * 112 i_1992 ¦ 372 122 374 142 375 371;
I MDE or02d1 vsc653 * 113 i_1993 ¦ 25 376 375;
I MDE in01d1 vsc653 * 114 i_1994 ¦ 8 374;
I MDE an03d1 vsc653 * 115 i_1995 ¦ 11 9 207 372;
I MDE or02d1 vsc653 * 116 i_1996 ¦ 25 376 197;
I MDE nd02d1 vsc653 * 117 i_1997 ¦ 121 25 198;
I MDE xn02d1 vsc653 * 118 i_1998 ¦ 380 145 199;
I MDE or02d1 vsc653 * 119 i_1999 ¦ 371 381 380;
I MDE xn02d1 vsc653 * 120 i_2000 ¦ 383 147 200;
I MDE or02d1 vsc653 * 121 i_2001 ¦ 380 261 383;
I MDE xn02d1 vsc653 * 122 i_2002 ¦ 385 146 201;
I MDE or02d1 vsc653 * 123 i_2003 ¦ 383 387 385;
I MDE nd03d1 vsc653 * 124 i_2004 ¦ 388 389 390 202;
I MDE ao02d1 vsc653 * 125 i_2005 ¦ 391 9 149 288 149 391 390;
I MDE in01d1 vsc653 * 126 i_2006 ¦ 392 391;
I MDE an02d1 vsc653 * 127 i_2007 ¦ 207 21 392;
I MDE ao02d1 vsc653 * 128 i_2008 ¦ 393 9 149 8 149 9 389;
I MDE in01d1 vsc653 * 129 i_2009 ¦ 11 393;
I MDE ao03d1 vsc653 * 130 i_2010 ¦ 146 149 149 145 394 388;
I MDE oa01d1 vsc653 * 131 i_2011 ¦ 395 148 147 395 394;
I MDE oa02d1 vsc653 * 132 i_2012 ¦ 397 381 387 398 142 399 203;
I MDE in01d1 vsc653 * 133 i_2013 ¦ 2 398;
I MDE nd03d1 vsc653 * 134 i_2014 ¦ 142 146 145 397;
I MDE nd03d1 vsc653 * 135 i_2015 ¦ 402 403 404 204;
I MDE or04d1 vsc653 * 136 i_2016 ¦ 405 118 80 120 404;
I MDE or04d1 vsc653 * 137 i_2017 ¦ 118 374 405 120 403;
I MDE ao02d1 vsc653 * 138 i_2018 ¦ 405 78 408 118 408 78 402;
I MDE or06d1 vsc653 * 139 i_2019 ¦ 411 412 392 155 413 414 35;
I MDE oa01d1 vsc653 * 140 i_2020 ¦ 222 17 15 246 414;
I MDE an03d1 vsc653 * 141 i_2021 ¦ 141 415 14 413;
I MDE in01d1 vsc653 * 142 i_2022 ¦ 15 415;
I MDE oa01d1 vsc653 * 143 i_2023 ¦ 246 14 9 288 412;
I MDE an03d1 vsc653 * 144 i_2024 ¦ 141 416 15 411;
I MDE in01d1 vsc653 * 145 i_2025 ¦ 14 416;
I MDE nd02d1 vsc653 * 146 i_2026 ¦ 417 418 36;
I MDE nd04d1 vsc653 * 147 i_2027 ¦ 419 420 421 422 418;
I MDE nr02d1 vsc653 * 148 i_2028 ¦ 155 77 422;
I MDE in01d2 vsc653 * 149 i_2029 ¦ 423 421;

I MDE fn01d2 vsc653 * 150 i_2030 ¦ 152 253 423;
I MDE fn01d2 vsc653 * 151 i_2031 ¦ 153 424 420;
I MDE fn01d2 vsc653 * 152 i_2032 ¦ 117 160 424;
I MDE in01d4 vsc653 * 153 i_2033 ¦ 426 419;
I MDE fn01d2 vsc653 * 154 i_2034 ¦ 150 427 426;
I MDE or05d1 vsc653 * 155 i_2035 ¦ 428 423 155 429 430 417;
I MDE in01d3 vsc653 * 156 i_2036 ¦ 431 430;
I MDE ao01d1 vsc653 * 157 i_2037 ¦ 117 160 116 127 431;
I MDE nd02d1 vsc653 * 158 i_2038 ¦ 138 256 429;
I MDE ni01d4 vsc653 * 159 i_2039 ¦ 426 428;
I MDE nd03d1 vsc653 * 160 i_2040 ¦ 432 433 256 37;
I MDE nd04d1 vsc653 * 161 i_2041 ¦ 434 421 435 420 433;
I MDE ni01d4 vsc653 * 162 i_2042 ¦ 419 435;
I MDE nr02d1 vsc653 * 163 i_2043 ¦ 155 264 434;
I MDE or06d1 vsc653 * 164 i_2044 ¦ 428 430 155 423 436 420 432;
I MDE nd02d1 vsc653 * 165 i_2045 ¦ 138 134 436;
I MDE nd03d1 vsc653 * 166 i_2046 ¦ 437 438 439 38;
I MDE or05d1 vsc653 * 167 i_2047 ¦ 440 431 426 423 420 439;
I MDE nd02d1 vsc653 * 168 i_2048 ¦ 256 441 440;
I MDE or04d1 vsc653 * 169 i_2049 ¦ 420 442 423 428 438;
I MDE nd04d1 vsc653 * 170 i_2050 ¦ 135 256 138 441 442;
I MDE nd04d1 vsc653 * 171 i_2051 ¦ 441 435 443 420 437;
I MDE nr02d1 vsc653 * 172 i_2052 ¦ 444 423 443;
I MDE nd02d1 vsc653 * 173 i_2053 ¦ 256 147 444;
I MDE nd04d1 vsc653 * 174 i_2054 ¦ 445 446 447 448 39;
I MDE or05d1 vsc653 * 175 i_2055 ¦ 155 302 363 77 420 448;
I MDE nd03d1 vsc653 * 176 i_2056 ¦ 449 450 451 447;
I MDE nr02d1 vsc653 * 177 i_2057 ¦ 155 77 451;
I MDE in01d3 vsc653 * 178 i_2058 ¦ 420 450;
I MDE ni01d3 vsc653 * 179 i_2059 ¦ 430 449;
I MDE ao06d2 vsc653 * 180 i_2060 ¦ 256 428 256 423 77 115 446;
I MDE nd04d1 vsc653 * 181 i_2061 ¦ 145 256 420 441 445;
I MDE nd04d1 vsc653 * 182 i_2062 ¦ 452 453 454 455 40;
I MDE or05d1 vsc653 * 183 i_2063 ¦ 430 456 77 428 420 455;
I MDE nd02d1 vsc653 * 184 i_2064 ¦ 138 137 456;
I MDE nd04d1 vsc653 * 185 i_2065 ¦ 419 457 450 430 454;
I MDE nr02d1 vsc653 * 186 i_2066 ¦ 320 77 457;
I MDE nd04d1 vsc653 * 187 i_2067 ¦ 148 420 435 256 453;
I MDE ao06d2 vsc653 * 188 i_2068 ¦ 256 423 114 77 458 419 452;
I MDE nr02d1 vsc653 * 189 i_2069 ¦ 77 441 458;
I MDE or02d1 vsc653 * 190 i_2070 ¦ 229 140 41;
I MDE or04d1 vsc653 * 191 i_2071 ¦ 212 459 349 234 42;
I MDE in01d5 vsc653 * 192 i_2072 ¦ 460 459;
I MDE ni01d4 vsc653 * 193 i_2073 ¦ 461 460;
I MDE or06d1 vsc653 * 194 i_2074 ¦ 462 463 464 465 466 467 43;
I MDE nd02d1 vsc653 * 195 i_2075 ¦ 468 469 467;
I MDE nd04d1 vsc653 * 196 i_2076 ¦ 470 471 472 473 469;
I MDE nr02d1 vsc653 * 197 i_2077 ¦ 474 152 473;

I MDE in01d2 vsc653 * 198 i_2078 ¦ 475 474;
I MDE nr02d1 vsc653 * 199 i_2079 ¦ 476 319 472;
I MDE in01d5 vsc653 * 200 i_2080 ¦ 460 476;
I MDE nr02d1 vsc653 * 201 i_2081 ¦ 477 138 471;
I MDE in01d5 vsc653 * 202 i_2082 ¦ 478 477;
I MDE ni01d4 vsc653 * 203 i_2083 ¦ 479 478;
I MDE nd02d1 vsc653 * 204 i_2084 ¦ 140 113 470;
I MDE nd04d1 vsc653 * 205 i_2085 ¦ 470 480 481 482 468;
I MDE nr02d1 vsc653 * 206 i_2086 ¦ 138 427 482;
I MDE nr02d1 vsc653 * 207 i_2087 ¦ 476 483 481;
I MDE in01d2 vsc653 * 208 i_2088 ¦ 222 483;
I MDE nr02d1 vsc653 * 209 i_2089 ¦ 477 474 480;
I MDE an04d1 vsc653 * 210 i_2090 ¦ 484 485 486 355 466;
I MDE in01d1 vsc653 * 211 i_2091 ¦ 487 486;
I MDE or02d1 vsc653 * 212 i_2092 ¦ 126 125 487;
I MDE in01d1 vsc653 * 213 i_2093 ¦ 488 485;
I MDE in01d1 vsc653 * 214 i_2094 ¦ 321 488;
I MDE nr02d1 vsc653 * 215 i_2095 ¦ 489 358 484;
I MDE in01d5 vsc653 * 216 i_2096 ¦ 478 489;
I MDE nd02d1 vsc653 * 217 i_2097 ¦ 490 491 465;
I MDE nd03d1 vsc653 * 218 i_2098 ¦ 489 358 124 491;
I MDE nd03d1 vsc653 * 219 i_2099 ¦ 459 358 124 490;
I MDE nd02d1 vsc653 * 220 i_2100 ¦ 492 493 464;
I MDE nd04d1 vsc653 * 221 i_2101 ¦ 123 489 495 355 493;
I MDE or02d1 vsc653 * 222 i_2102 ¦ 496 351 495;
I MDE nd04d1 vsc653 * 223 i_2103 ¦ 358 497 459 487 492;
I MDE in01d5 vsc653 * 224 i_2104 ¦ 214 497;
I MDE fn01d2 vsc653 * 225 i_2105 ¦ 498 499 463;
I MDE or03d1 vsc653 * 226 i_2106 ¦ 500 495 123 499;
I MDE in01d1 vsc653 * 227 i_2107 ¦ 477 500;
I MDE an04d1 vsc653 * 228 i_2108 ¦ 488 213 138 123 498;
I MDE an07d1 vsc653 * 229 i_2109 ¦ 501 302 475 222 213 470 502 462;
I MDE in01d1 vsc653 * 230 i_2110 ¦ 503 502;
I MDE in01d5 vsc653 * 231 i_2111 ¦ 460 503;
I MDE fn01d2 vsc653 * 232 i_2112 ¦ 143 242 501;
I MDE or05d1 vsc653 * 233 i_2113 ¦ 504 505 506 507 508 44;
I MDE nr02d1 vsc653 * 234 i_2114 ¦ 509 510 508;
I MDE nd03d1 vsc653 * 235 i_2115 ¦ 470 302 131 510;
I MDE or04d1 vsc653 * 236 i_2116 ¦ 489 474 483 503 509;
I MDE nd02d1 vsc653 * 237 i_2117 ¦ 511 512 507;
I MDE nd03d1 vsc653 * 238 i_2118 ¦ 459 497 513 512;
I MDE an02d1 vsc653 * 239 i_2119 ¦ 126 124 513;
I MDE nd04d1 vsc653 * 240 i_2120 ¦ 355 459 486 497 511;
I MDE nd02d1 vsc653 * 241 i_2121 ¦ 514 515 506;
I MDE nd04d1 vsc653 * 242 i_2122 ¦ 124 320 497 138 515;
I MDE nd03d1 vsc653 * 243 i_2123 ¦ 459 497 516 514;
I MDE an02d1 vsc653 * 244 i_2124 ¦ 125 124 516;
I MDE nd02d1 vsc653 * 245 i_2125 ¦ 517 518 505;

I MDE nd04d1 vsc653 * 246 i_2126 ¦ 124 519 489 520 518;
I MDE in01d1 vsc653 * 247 i_2127 ¦ 496 520;
I MDE in01d1 vsc653 * 248 i_2128 ¦ 351 519;
I MDE nd03d1 vsc653 * 249 i_2129 ¦ 495 489 355 517;
I MDE nr02d1 vsc653 * 250 i_2130 ¦ 521 522 504;
I MDE nd04d1 vsc653 * 251 i_2131 ¦ 475 213 470 302 522;
I MDE or03d1 vsc653 * 252 i_2132 ¦ 523 503 483 521;
I MDE in01d2 vsc653 * 253 i_2133 ¦ 501 523;
I MDE nd04d1 vsc653 * 254 i_2134 ¦ 209 215 218 219 45;
I MDE an03d2 vsc653 * 255 i_2135 ¦ 220 221 224 219;
I MDE nd03d1 vsc653 * 256 i_2136 ¦ 489 520 351 224;
I MDE nd03d1 vsc653 * 257 i_2137 ¦ 489 519 347 221;
I MDE or05d1 vsc653 * 258 i_2138 ¦ 477 483 475 138 476 220;
I MDE an03d2 vsc653 * 259 i_2139 ¦ 226 227 228 218;
I MDE nd04d1 vsc653 * 260 i_2140 ¦ 125 320 497 138 228;
I MDE nd04d1 vsc653 * 261 i_2141 ¦ 351 497 459 347 227;
I MDE nd04d1 vsc653 * 262 i_2142 ¦ 231 237 238 523 226;
I MDE nr02d1 vsc653 * 263 i_2143 ¦ 503 483 238;
I MDE nr02d1 vsc653 * 264 i_2144 ¦ 477 138 237;
I MDE an02d1 vsc653 * 265 i_2145 ¦ 132 131 231;
I MDE ao02d2 vsc653 * 266 i_2146 ¦ 459 497 239 240 243 248 215;
I MDE in01d1 vsc653 * 267 i_2147 ¦ 470 248;
I MDE nr02d1 vsc653 * 268 i_2148 ¦ 489 138 243;
I MDE nr02d1 vsc653 * 269 i_2149 ¦ 234 459 240;
I MDE an02d1 vsc653 * 270 i_2150 ¦ 126 125 239;
I MDE or06d1 vsc653 * 271 i_2151 ¦ 254 476 319 501 255 212 209;
I MDE or02d1 vsc653 * 272 i_2152 ¦ 326 131 255;
I MDE nd02d1 vsc653 * 273 i_2153 ¦ 302 222 254;
I MDE nd04d1 vsc653 * 274 i_2154 ¦ 262 263 266 267 46;
I MDE or06d1 vsc653 * 275 i_2155 ¦ 234 212 273 501 277 278 267;
I MDE in01d1 vsc653 * 276 i_2156 ¦ 320 278;
I MDE nd02d1 vsc653 * 277 i_2157 ¦ 302 475 277;
I MDE or02d1 vsc653 * 278 i_2158 ¦ 339 427 273;
I MDE an03d1 vsc653 * 279 i_2159 ¦ 279 284 285 266;
I MDE nd02d1 vsc653 * 280 i_2160 ¦ 489 347 285;
I MDE nd04d1 vsc653 * 281 i_2161 ¦ 138 320 497 520 284;
I MDE nd02d1 vsc653 * 282 i_2162 ¦ 459 347 279;
I MDE or05d1 vsc653 * 283 i_2163 ¦ 287 501 319 503 289 263;
I MDE nd02d1 vsc653 * 284 i_2164 ¦ 497 475 289;
I MDE or04d1 vsc653 * 285 i_2165 ¦ 138 332 152 131 287;
I MDE or06d1 vsc653 * 286 i_2166 ¦ 459 234 474 138 470 212 262;
I MDE or04d1 vsc653 * 287 i_2167 ¦ 142 139 229 143 48;
I MDE an02d1 vsc653 * 288 i_2168 ¦ 292 293 49;
I MDE in01d1 vsc653 * 289 i_2169 ¦ 497 293;
I MDE an02d1 vsc653 * 290 i_2170 ¦ 297 300 50;
I MDE in01d1 vsc653 * 291 i_2171 ¦ 301 300;
I MDE in01d1 vsc653 * 292 i_2172 ¦ 424 301;
I MDE or02d1 vsc653 * 293 i_2173 ¦ 229 129 297;

I MDE an03d1 vsc653 * 294 i_2174 ¦ 304 305 306 51;
I MDE in01d1 vsc653 * 295 i_2175 ¦ 307 306;
I MDE ni01d1 vsc653 * 296 i_2176 ¦ 301 307;
I MDE or04d1 vsc653 * 297 i_2177 ¦ 311 150 140 313 305;
I MDE an02d1 vsc653 * 298 i_2178 ¦ 315 333 313;
I MDE an06d1 vsc653 * 299 i_2179 ¦ 349 363 149 368 135 137 311;
I MDE in01d1 vsc653 * 300 i_2180 ¦ 297 304;
I MDE nd03d1 vsc653 * 301 i_2181 ¦ 317 322 323 52;
I MDE or04d1 vsc653 * 302 i_2182 ¦ 327 305 16 297 323;
I MDE in01d1 vsc653 * 303 i_2183 ¦ 306 327;
I MDE or04d1 vsc653 * 304 i_2184 ¦ 330 305 131 297 322;
I MDE in01d1 vsc653 * 305 i_2185 ¦ 306 330;
I MDE or04d1 vsc653 * 306 i_2186 ¦ 331 305 17 297 317;
I MDE in01d1 vsc653 * 307 i_2187 ¦ 306 331;
I MDE an02d1 vsc653 * 308 i_2188 ¦ 337 295 53;
I MDE oa02d1 vsc653 * 309 i_2189 ¦ 230 341 155 344 155 341 61;
I MDE in01d1 vsc653 * 310 i_2190 ¦ 345 344;
I MDE or02d1 vsc653 * 311 i_2191 ¦ 348 154 345;
I MDE in01d1 vsc653 * 312 i_2192 ¦ 497 348;
I MDE or02d1 vsc653 * 313 i_2193 ¦ 234 295 341;
I MDE or03d1 vsc653 * 314 i_2194 ¦ 353 356 359 62;
I MDE an04d1 vsc653 * 315 i_2195 ¦ 123 245 361 229 359;
I MDE in01d1 vsc653 * 316 i_2196 ¦ 341 361;
I MDE an05d1 vsc653 * 317 i_2197 ¦ 146 230 345 361 245 356;
I MDE an06d1 vsc653 * 318 i_2198 ¦ 344 361 286 245 246 230 353;
I MDE or03d1 vsc653 * 319 i_2199 ¦ 366 369 373 63;
I MDE an04d1 vsc653 * 320 i_2200 ¦ 124 245 361 229 373;
I MDE an05d1 vsc653 * 321 i_2201 ¦ 147 230 345 361 245 369;
I MDE an06d1 vsc653 * 322 i_2202 ¦ 344 361 286 245 246 230 366;
I MDE or05d1 vsc653 * 323 i_2203 ¦ 377 341 155 378 379 64;
I MDE an04d1 vsc653 * 324 i_2204 ¦ 246 230 344 286 379;
I MDE an02d1 vsc653 * 325 i_2205 ¦ 229 519 378;
I MDE an03d1 vsc653 * 326 i_2206 ¦ 230 145 345 377;
I MDE or04d1 vsc653 * 327 i_2207 ¦ 382 384 155 386 65;
I MDE an04d1 vsc653 * 328 i_2208 ¦ 230 361 148 345 386;
I MDE an03d1 vsc653 * 329 i_2209 ¦ 520 361 229 384;
I MDE an04d1 vsc653 * 330 i_2210 ¦ 230 246 344 361 382;
I MDE an03d1 vsc653 * 331 i_2211 ¦ 151 396 400 67;
I MDE an02d1 vsc653 * 332 i_2212 ¦ 401 406 400;
I MDE in01d1 vsc653 * 333 i_2213 ¦ 407 406;
I MDE or02d1 vsc653 * 334 i_2214 ¦ 154 142 407;
I MDE nr02d1 vsc653 * 335 i_2215 ¦ 409 229 401;
I MDE in01d1 vsc653 * 336 i_2216 ¦ 410 409;
I MDE an02d1 vsc653 * 337 i_2217 ¦ 425 245 410;
I MDE nr02d1 vsc653 * 338 i_2218 ¦ 77 341 425;
I MDE ni01d1 vsc653 * 339 i_2219 ¦ 523 396;
I MDE an04d1 vsc653 * 340 i_2220 ¦ 139 396 400 269 68;
I MDE nr02d1 vsc653 * 341 i_2221 ¦ 361 77 69;

I MDE an02d1 vsc653 * 342 i_2222 ¦ 407 401 70;
I MDE an03d1 vsc653 * 343 i_2223 ¦ 410 229 10 71;
I MDE nr03d1 vsc653 * 344 i_2224 ¦ 409 10 230 72;
I MDE an03d1 vsc653 * 345 i_2225 ¦ 425 155 16 73;
I MDE nr03d1 vsc653 * 346 i_2226 ¦ 494 16 245 74;
I MDE in01d1 vsc653 * 347 i_2227 ¦ 425 494;
I MDE an02d1 vsc653 * 348 i_2228 ¦ 400 501 75;
I MDE an04d1 vsc653 * 349 i_2229 ¦ 396 400 298 269 76;
I MDE dfntnb vsc653 * 350 mu_send_ff ¦ 176 5 66 96;
I MDE dfntnb vsc653 * 351 vmcntx_ff_b0 ¦ 103 6 114 109;
I MDE dfntnb vsc653 * 352 vmcntx_ff_b1 ¦ 93 6 115 85;
I MDE dfntnb vsc653 * 353 vmcntxd_ff_b0 ¦ 128 6 103 99;
I MDE dfntnb vsc653 * 354 vmcntxd_ff_b1 ¦ 130 6 93 144;
I MDE dfctnb vsc653 * 355 mr6_en_ff ¦ 81 22 2 117 292;
I MDE dfctnb vsc653 * 356 mr7_en_ff ¦ 81 23 2 116 315;
I MDE dfctnb vsc653 * 357 mc_en_ff ¦ 81 18 2 113 337;
I MDE dfptnb vsc653 * 358 last_ff ¦ 216 6 2 160 479;
I MDE dfctnb vsc653 * 359 lmac_ff ¦ 177 6 2 111 252;
I MDE lactnb vsc653 * 360 mmv_rcv_ff ¦ 19 20 1 101 91;
I MDE lactnb vsc653 * 361 mmv_rc_ff ¦ 7 101 2 92 102;
I MDE dfntnb vsc653 * 362 mb_rechd_ff ¦ 21 3 122 90;
I MDE dfctnb vsc653 * 363 vstt0_ff ¦ 92 6 2 129 319;
I MDE dfctnb vsc653 * 364 vstt1_ff ¦ 129 6 2 107 110;
I MDE dfctnh vsc653 * 365 vstt2_ff ¦ 107 6 2 77 256;
I MDE dfctnb vsc653 * 366 vstt3_ff ¦ 77 6 2 158 210;
I MDE dfctnb vsc653 * 367 vstt4_ff ¦ 158 6 2 159 217;
I MDE dfctnb vsc653 * 368 pstt0_ff ¦ 207 6 2 127 461;
I MDE dfctnb vsc653 * 369 pstt1_ff ¦ 333 6 2 150 242;
I MDE dfctnb vsc653 * 370 pstt2_ff ¦ 241 6 2 143 253;
I MDE dfctnb vsc653 * 371 pstt3_ff ¦ 143 6 2 151 269;
I MDE dfctnh vsc653 * 372 pstt4_ff ¦ 151 6 2 155 441;
I MDE dfctnh vsc653 * 373 pstt5_ff ¦ 155 6 2 152 222;
I MDE dfctnh vsc653 * 374 pstt6_ff ¦ 234 6 2 140 296;
I MDE dfctnh vsc653 * 375 pstt7_ff ¦ 295 6 2 153 475;
I MDE dfctnb vsc653 * 376 pstt8_ff ¦ 229 6 2 154 288;
I MDE dfctnb vsc653 * 377 pstt9_ff ¦ 154 6 2 142 251;
I MDE dfctnb vsc653 * 378 pstt10_ff ¦ 142 6 2 156 246;
I MDE dfctnb vsc653 * 379 pstt11_ff ¦ 156 6 2 141 286;
I MDE dfctnb vsc653 * 380 men_ff ¦ 204 5 1 78 206;
I MDE dfctnh vsc653 * 381 lstt0_ff ¦ 178 6 2 138 302;
I MDE dfctnb vsc653 * 382 lstt1_ff ¦ 179 6 2 131 427;
I MDE dfctnb vsc653 * 383 lstt2_ff ¦ 180 6 2 139 298;
I MDE dfctnb vsc653 * 384 lstt3_ff ¦ 139 6 2 157 247;
I MDE dfntnb vsc653 * 385 mhltd__ff ¦ 197 5 79 86;
I MDE dfctnb vsc653 * 386 vmcnt_ff_b0 ¦ 183 6 2 128 332;
I MDE dfctnb vsc653 * 387 vmcnt_ff_b1 ¦ 182 6 2 130 326;
I MDE dfptnb vsc653 * 388 mwrax__ff ¦ 198 7 2 524 26;
I MDE dfctnb vsc653 * 389 mhltdt_ff ¦ 184 7 2 121 376;

I MDE dfntnb vsc653 * 390 mas_ff ¦ 4 3 119 405;
I MDE dfntnb vsc653 * 391 mbs_ff ¦ 119 3 118 106;
I MDE dfntnb vsc653 * 392 mdisd_ff ¦ 185 3 120 408;
I MDE dfctnb vsc653 * 393 lpcnt_ff_b0 ¦ 186 6 2 133 339;
I MDE dfctnb vsc653 * 394 lpcnt_ff_b1 ¦ 187 6 2 132 314;
I MDE dfctnb vsc653 * 395 lscnt_ff_b0 ¦ 188 6 2 126 496;
I MDE dfctnh vsc653 * 396 lscnt_ff_b1 ¦ 189 6 2 125 351;
I MDE dfctnb vsc653 * 397 lscnt_ff_b2 ¦ 190 6 2 124 355;
I MDE dfctnb vsc653 * 398 lscnt_ff_b3 ¦ 191 6 2 123 358;
I MDE dfctnb vsc653 * 399 lccnt_ff_b0 ¦ 192 6 2 137 360;
I MDE dfctnb vsc653 * 400 lccnt_ff_b1 ¦ 193 6 2 136 363;
I MDE dfctnb vsc653 * 401 lccnt_ff_b2 ¦ 194 6 2 135 365;
I MDE dfctnb vsc653 * 402 lccnt_ff_b3 ¦ 195 6 2 134 368;
I MDE dfptnb vsc653 * 403 lkcnt_ff_b0 ¦ 196 3 2 148 381;
I MDE dfptnb vsc653 * 404 lkcnt_ff_b1 ¦ 199 3 2 145 261;
I MDE dfptnb vsc653 * 405 lkcnt_ff_b2 ¦ 200 3 2 147 387;
I MDE dfptnb vsc653 * 406 lkcnt_ff_b3 ¦ 201 3 2 146 264;
I MDE dfptnb vsc653 * 407 lonerg_ff ¦ 202 3 2 149 395;
I MDE dfntnb vsc653 * 408 ltfrm_ff ¦ 203 3 13 399;
I MDE dfctnb vsc653 * 409 maadd_ff_b0 ¦ 163 6 2 34 94;
I MDE dfctnb vsc653 * 410 maadd_ff_b1 ¦ 166 6 2 33 105;
I MDE dfctnb vsc653 * 411 maadd_ff_b2 ¦ 171 6 2 32 83;
I MDE dfctnb vsc653 * 412 maadd_ff_b3 ¦ 170 6 2 31 104;
I MDE dfctnb vsc653 * 413 maadd_ff_b4 ¦ 168 6 2 30 98;
I MDE dfctnb vsc653 * 414 maadd_ff_b5 ¦ 161 6 2 29 88;
I MDE dfctnb vsc653 * 415 maadd_ff_b6 ¦ 167 6 2 28 95;
I MDE dfctnb vsc653 * 416 maadd_ff_b7 ¦ 169 6 2 27 108;
I MDE dfctnb vsc653 * 417 minp3_ff ¦ 162 7 2 47 100;
I MDE dfctnb vsc653 * 418 macc0_ff_b0 ¦ 164 6 2 57 89;
I MDE dfctnb vsc653 * 419 macc0_ff_b1 ¦ 165 6 2 56 112;
I MDE dfctnb vsc653 * 420 macc0_ff_b2 ¦ 174 6 2 55 87;
I MDE dfctnb vsc653 * 421 macc0_ff_b3 ¦ 173 6 2 54 84;
I MDE dfptnb vsc653 * 422 macc_smp_ff ¦ 172 7 2 58 97;
I MDE dfctnb vsc653 * 423 mv_tr_ff ¦ 181 6 2 59 318;
I MDE dfctnb vsc653 * 424 mrdacc_ff ¦ 175 6 2 60 525;
E netlist B subcells
MDE in01d1 vsc653
MDE ao07d1 vsc653
MDE an02d1 vsc653
MDE in01d2 vsc653
MDE in01d5 vsc653
MDE ni01d4 vsc653
MDE nr02d1 vsc653
MDE oa04d1 vsc653
MDE or08d1 vsc653

MDE an03d1 vsc653
MDE ni01d3 vsc653
MDE or04d1 vsc653
MDE or02d1 vsc653
MDE an04d1 vsc653
MDE nd03d1 vsc653
MDE or05d1 vsc653
MDE oa03d1 vsc653
MDE ao02d1 vsc653
MDE an05d1 vsc653
MDE fn05d1 vsc653
MDE nd04d1 vsc653
MDE ao08d1 vsc653
MDE or03d1 vsc653
MDE an06d1 vsc653
MDE or06d1 vsc653
MDE fn03d1 vsc653
MDE oa01d1 vsc653
MDE oa05d1 vsc653
MDE in01d3 vsc653
MDE ni01d2 vsc653
MDE oa07d1 vsc653
MDE nd06d1 vsc653
MDE ao05d1 vsc653
MDE ao01d1 vsc653
MDE fn01d1 vsc653
MDE xn02d1 vsc653
MDE xo02d1 vsc653
MDE nd02d1 vsc653
MDE ao03d1 vsc653
MDE oa02d1 vsc653
MDE fn01d2 vsc653
MDE in01d4 vsc653
MDE ao06d2 vsc653
MDE an07d1 vsc653
MDE an03d2 vsc653
MDE ao02d2 vsc653
MDE ni01d1 vsc653
MDE nr03d1 vsc653
MDE dfntnb vsc653
MDE dfctnb vsc653
MDE dfptnb vsc653
MDE lactnb vsc653
MDE dfctnh vsc653
E subcells

MU_P NLS

#cell2 * mu_p nls * 37 any 0 v8r4.6.2
"5-Oct-94 GMT" "14:31:39 GMT" "5-Oct-94 GMT" "14:31:39 GMT" amir * .
writer 1
file_version 1
sections 1
netlist 1: 79 mu_p B contents: mu_p
netlist 242
cells 17959
switches 0
attributes 18124
physical 0
history 0
E contents B netlist
X 1 reset_ i;
X 2 clk i;
X 3 rx_ck i;
X 4 tmtst i;
X 5 tlfrz i;
X 6 tlmod i;
X 7 tminit i;
X 8 mtict o;
X 9 ltfrm o;
X 10 tgmod i;
X 11 tgfrz i;
X 12 tpmod i;
X 13 tpfrz i;
X 14 tstwa i;
X 15 tstuaa[1] o;
X 16 tstuaa[0] o;
X 17 tstwb i;
X 18 tstuab[1] o;
X 19 tstuab[0] o;
X 20 abus[15] o;
X 21 abus[14] o;
X 22 abus[13] o;
X 23 abus[12] o;
X 24 abus[11] o;
X 25 abus[10] o;
X 26 abus[9] o;

```
X 27 abus[8] o;
X 28 abus[7] o;
X 29 abus[6] o;
X 30 abus[5] o;
X 31 abus[4] o;
X 32 abus[3] o;
X 33 abus[2] o;
X 34 abus[1] o;
X 35 abus[0] o;
X 36 aadd[3] o;
X 37 aadd[2] o;
X 38 aadd[1] o;
X 39 aadd[0] o;
X 40 wr_eu o;
X 41 wr_pu o;
X 42 wr_du o;
X 43 wr_su o;
X 44 eu_free_ i;
X 45 pu_free_ i;
X 46 du_free_ i;
X 47 su_free_ i;
X 48 ssoid i;
X 49 bbus[15] i;
X 50 bbus[14] i;
X 51 bbus[13] i;
X 52 bbus[12] i;
X 53 bbus[11] i;
X 54 bbus[10] i;
X 55 bbus[9] i;
X 56 bbus[8] i;
X 57 bbus[7] i;
X 58 bbus[6] i;
X 59 bbus[5] i;
X 60 bbus[4] i;
X 61 bbus[3] i;
X 62 bbus[2] i;
X 63 bbus[1] i;
X 64 bbus[0] i;
X 65 badd[3] i;
X 66 badd[2] i;
X 67 badd[1] i;
X 68 badd[0] i;
X 69 rd_eu o;
X 70 rd_du o;
X 71 rd_su o;
X 72 eu_send i;
X 73 du_send i;
X 74 su_send i;
```

X 75 rd_ad i;
X 76 clk_dis i;
G 77 VDD;
G 78 VSS;
N 79 mdat_do[0];
N 80 mdat_do[1];
N 81 mdat_do[2];
N 82 mdat_do[3];
N 83 mdat_do[4];
N 84 mdat_do[5];
N 85 mdat_do[6];
N 86 mdat_do[7];
N 87 mdat_do[8];
N 88 mdat_do[9];
N 89 mdat_do[10];
N 90 mdat_do[11];
N 91 mdat_do[12];
N 92 mdat_do[13];
N 93 mdat_do[14];
N 94 mdat_do[15];
N 95 mbbus[0];
N 96 mbbus[1];
N 97 mbbus[2];
N 98 mbbus[3];
N 99 mbbus[4];
N 100 mbbus[5];
N 101 mbbus[6];
N 102 mbbus[7];
N 103 mbbus[8];
N 104 mbbus[9];
N 105 mbbus[10];
N 106 mbbus[11];
N 107 mbbus[12];
N 108 mbbus[13];
N 109 mbbus[14];
N 110 mbbus[15];
N 111 mbbus[16];
N 112 mbbus[17];
N 113 mbbus[18];
N 114 mbbus[19];
N 115 mbbus[20];
N 116 mbbus[21];
N 117 mbbus[22];
N 118 mbbus[23];
N 119 mcof_do[0];
N 120 mcof_do[1];
N 121 mcof_do[2];
N 122 mcof_do[3];

N 123 mcof_do[4];
N 124 mcof_do[5];
N 125 mcof_do[6];
N 126 mcof_do[7];
N 127 mcof_do[8];
N 128 mcof_do[9];
N 129 mcof_do[10];
N 130 mcof_do[11];
N 131 mcof_do[12];
N 132 mcof_do[13];
N 133 mcof_do[14];
N 134 mcof_do[15];
N 135 mcof_do[16];
N 136 mcof_do[17];
N 137 mcof_do[18];
N 138 mcof_do[19];
N 139 mcof_do[20];
N 140 mcof_do[21];
N 141 mcof_do[22];
N 142 mcof_do[23];
N 143 muaadd[0];
N 144 muaadd[1];
N 145 muaadd[2];
N 146 muaadd[3];
N 147 mcfadd[0];
N 148 mcfadd[1];
N 149 mcfadd[2];
N 150 mcfadd[3];
N 151 mcfadd[4];
N 152 mdtadd[0];
N 153 mdtadd[1];
N 154 mdtadd[2];
N 155 mdtadd[3];
N 156 mdtadd[4];
N 157 mwrbadd[0];
N 158 mwrbadd[1];
N 159 mwrbadd[2];
N 160 mwrbadd[3];
N 161 mwrbadd[4];
N 162 mbddw[0];
N 163 mbddw[1];
N 164 mbddw[2];
N 165 mbddw[3];
N 166 mbddw[4];
N 167 maadd[0];
N 168 maadd[1];
N 169 maadd[2];
N 170 maadd[3];

N 171 maadd[4];
N 172 maadd[5];
N 173 maadd[6];
N 174 maadd[7];
N 175 mbrl[0];
N 176 mbrl[1];
N 177 mbrl[2];
N 178 mbrl[3];
N 179 mbrl[4];
N 180 mbrl[5];
N 181 mbrl[6];
N 182 mbrl[7];
N 183 mbrl[8];
N 184 mbrl[9];
N 185 mbrl[10];
N 186 maxone[0];
N 187 maxone[1];
N 188 maxone[2];
N 189 maxone[3];
N 190 macc0[0];
N 191 macc0[1];
N 192 macc0[2];
N 193 macc0[3];
N 194 mrgw[0];
N 195 mrgw[1];
N 196 mrgw[2];
N 197 mrgw[3];
N 198 mrgw[4];
N 199 mrgw[5];
N 200 mrgw[6];
N 201 mrgw[7];
N 202 mrgr[0];
N 203 mrgr[1];
N 204 mrgr[2];
N 205 mrgr[3];
N 206 mrst_n;
N 207 mrst_ndp;
N 208 mrst_nr;
N 209 mmclk;
N 210 mmclk_;
N 211 mmclkdp;
N 212 clk_;
N 213 mbwr;
N 214 mbwrc;
N 215 men;
N 216 mhltd_;
N 217 mb_recc;
N 218 mb_recd;

N 219 mb_rec6;
N 220 mb_rec7;
N 221 mb_rec3;
N 222 modph_we;
N 223 modg_we;
N 224 modr6_we;
N 225 modr7_we;
N 226 modc_we;
N 227 i_37_z;
N 228 mmvck;
N 229 mff_;
N 230 mcof_we;
N 231 mdat_we;
N 232 mu_send;
N 233 mwrr;
N 234 mwrl;
N 235 mmv_rec;
N 236 mb_rech;
N 237 minp3;
N 238 minmul;
N 239 mckonst;
N 240 macc_smp;
N 241 mv_tr;
N 242 mrdacc;
N 243 mwra;
N 244 mrgs;
N 245 mrda;
N 246 mfe;
N 79 mdat_ram_DO[0];
N 80 mdat_ram_DO[1];
N 81 mdat_ram_DO[2];
N 82 mdat_ram_DO[3];
N 83 mdat_ram_DO[4];
N 84 mdat_ram_DO[5];
N 85 mdat_ram_DO[6];
N 86 mdat_ram_DO[7];
N 87 mdat_ram_DO[8];
N 88 mdat_ram_DO[9];
N 89 mdat_ram_DO[10];
N 90 mdat_ram_DO[11];
N 91 mdat_ram_DO[12];
N 92 mdat_ram_DO[13];
N 93 mdat_ram_DO[14];
N 94 mdat_ram_DO[15];
N 95 mac_mbbus[0];
N 96 mac_mbbus[1];
N 97 mac_mbbus[2];
N 98 mac_mbbus[3];

```
N 99 mac_mbbus[4];
N 100 mac_mbbus[5];
N 101 mac_mbbus[6];
N 102 mac_mbbus[7];
N 103 mac_mbbus[8];
N 104 mac_mbbus[9];
N 105 mac_mbbus[10];
N 106 mac_mbbus[11];
N 107 mac_mbbus[12];
N 108 mac_mbbus[13];
N 109 mac_mbbus[14];
N 110 mac_mbbus[15];
N 111 mac_mbbus[16];
N 112 mac_mbbus[17];
N 113 mac_mbbus[18];
N 114 mac_mbbus[19];
N 115 mac_mbbus[20];
N 116 mac_mbbus[21];
N 117 mac_mbbus[22];
N 118 mac_mbbus[23];
N 119 mcof_ram_DO[0];
N 120 mcof_ram_DO[1];
N 121 mcof_ram_DO[2];
N 122 mcof_ram_DO[3];
N 123 mcof_ram_DO[4];
N 124 mcof_ram_DO[5];
N 125 mcof_ram_DO[6];
N 126 mcof_ram_DO[7];
N 127 mcof_ram_DO[8];
N 128 mcof_ram_DO[9];
N 129 mcof_ram_DO[10];
N 130 mcof_ram_DO[11];
N 131 mcof_ram_DO[12];
N 132 mcof_ram_DO[13];
N 133 mcof_ram_DO[14];
N 134 mcof_ram_DO[15];
N 135 mcof_ram_DO[16];
N 136 mcof_ram_DO[17];
N 137 mcof_ram_DO[18];
N 138 mcof_ram_DO[19];
N 139 mcof_ram_DO[20];
N 140 mcof_ram_DO[21];
N 141 mcof_ram_DO[22];
N 142 mcof_ram_DO[23];
N 143 mac_muaadd[0];
N 144 mac_muaadd[1];
N 145 mac_muaadd[2];
N 146 mac_muaadd[3];
```

N 147 mu_ctl_mcfadd[0];
N 148 mu_ctl_mcfadd[1];
N 149 mu_ctl_mcfadd[2];
N 150 mu_ctl_mcfadd[3];
N 151 mu_ctl_mcfadd[4];
N 152 mu_ctl_mdtadd[0];
N 153 mu_ctl_mdtadd[1];
N 154 mu_ctl_mdtadd[2];
N 155 mu_ctl_mdtadd[3];
N 156 mu_ctl_mdtadd[4];
N 157 mu_ctl_mwrbadd[0];
N 158 mu_ctl_mwrbadd[1];
N 159 mu_ctl_mwrbadd[2];
N 160 mu_ctl_mwrbadd[3];
N 161 mu_ctl_mwrbadd[4];
N 162 mb_ctl_mbddw[0];
N 163 mb_ctl_mbddw[1];
N 164 mb_ctl_mbddw[2];
N 165 mb_ctl_mbddw[3];
N 166 mb_ctl_mbddw[4];
N 167 mu_ctl_maadd[0];
N 168 mu_ctl_maadd[1];
N 169 mu_ctl_maadd[2];
N 170 mu_ctl_maadd[3];
N 171 mu_ctl_maadd[4];
N 172 mu_ctl_maadd[5];
N 173 mu_ctl_maadd[6];
N 174 mu_ctl_maadd[7];
N 175 mu_ctl_mbrl[0];
N 176 mu_ctl_mbrl[1];
N 177 mu_ctl_mbrl[2];
N 178 mu_ctl_mbrl[3];
N 179 mu_ctl_mbrl[4];
N 180 mu_ctl_mbrl[5];
N 181 mu_ctl_mbrl[6];
N 182 mu_ctl_mbrl[7];
N 183 mu_ctl_mbrl[8];
N 184 mu_ctl_mbrl[9];
N 185 mu_ctl_mbrl[10];
N 186 mu_ctl_maxone[0];
N 187 mu_ctl_maxone[1];
N 188 mu_ctl_maxone[2];
N 189 mu_ctl_maxone[3];
N 190 mu_ctl_macc0[0];
N 191 mu_ctl_macc0[1];
N 192 mu_ctl_macc0[2];
N 193 mu_ctl_macc0[3];
N 194 ma_ctl_mrgw[0];

N 195 ma_ctl_mrgw[1];
N 196 ma_ctl_mrgw[2];
N 197 ma_ctl_mrgw[3];
N 198 ma_ctl_mrgw[4];
N 199 ma_ctl_mrgw[5];
N 200 ma_ctl_mrgw[6];
N 201 ma_ctl_mrgw[7];
N 202 ma_ctl_mrgr[0];
N 203 ma_ctl_mrgr[1];
N 204 ma_ctl_mrgr[2];
N 205 ma_ctl_mrgr[3];
N 206 mugr_mrst_n[0];
N 207 mugr_mrst_ndp[0];
N 208 mugr_mrst_nr[0];
N 209 mugr_mmclk[0];
N 210 mugr_mmclk_[0];
N 211 mugr_mmclkdp[0];
N 212 mugr_clk_[0];
N 213 mb_ctl_mbwr[0];
N 214 mugr_mbwrc[0];
N 215 mu_ctl_men[0];
N 216 mu_ctl_mhltd_[0];
N 217 mb_ctl_mb_recc[0];
N 218 mb_ctl_mb_recd[0];
N 219 mb_ctl_mb_rec6[0];
N 220 mb_ctl_mb_rec7[0];
N 221 mb_ctl_mb_rec3[0];
N 222 mugr_modph_we[0];
N 223 mugr_modg_we[0];
N 224 mugr_modr6_we[0];
N 225 mugr_modr7_we[0];
N 226 mugr_modc_we[0];
N 227 i_37_Z_1[0];
N 228 mugr_mmvck[0];
N 229 ma_ctl_mff_[0];
N 230 mu_ctl_mcof_we[0];
N 231 mu_ctl_mdat_we[0];
N 232 mu_ctl_mu_send[0];
N 233 mb_ctl_mwrr[0];
N 234 mb_ctl_mwrl[0];
N 235 mb_ctl_mmv_rec[0];
N 236 mb_ctl_mb_rech[0];
N 237 mu_ctl_minp3[0];
N 238 mu_ctl_minmul[0];
N 239 mu_ctl_mckonst[0];
N 240 mu_ctl_macc_smp[0];
N 241 mu_ctl_mv_tr[0];
N 242 mu_ctl_mrdacc[0];

```
N 243 mu_ctl_mwra[0];
N 244 ma_ctl_mrgs[0];
N 245 ma_ctl_mrda[0];
N 246 ma_ctl_mfe[0];
N 15 ma_ctl_tstuaa[1];
N 8 mu_ctl_mtict[0];
N 9 mu_ctl_ltfrm[0];
N 19 mb_ctl_tstuab[0];
N 18 mb_ctl_tstuab[1];
N 69 mb_ctl_rd_eu[0];
N 70 mb_ctl_rd_du[0];
N 71 mb_ctl_rd_su[0];
N 35 mac_abus[0];
N 34 mac_abus[1];
N 33 mac_abus[2];
N 32 mac_abus[3];
N 31 mac_abus[4];
N 30 mac_abus[5];
N 29 mac_abus[6];
N 28 mac_abus[7];
N 27 mac_abus[8];
N 26 mac_abus[9];
N 25 mac_abus[10];
N 24 mac_abus[11];
N 23 mac_abus[12];
N 22 mac_abus[13];
N 21 mac_abus[14];
N 20 mac_abus[15];
N 39 mac_aadd[0];
N 39 ma_ctl_aadd[0];
N 38 mac_aadd[1];
N 38 ma_ctl_aadd[1];
N 37 mac_aadd[2];
N 37 ma_ctl_aadd[2];
N 36 mac_aadd[3];
N 36 ma_ctl_aadd[3];
N 40 ma_ctl_wr_eu[0];
N 41 ma_ctl_wr_pu[0];
N 42 ma_ctl_wr_du[0];
N 43 ma_ctl_wr_su[0];
N 16 ma_ctl_tstuaa[0];
V tstuaa 1 0 ¦ 15 16;
V tstuab 1 0 ¦ 18 19;
V abus 15 0 ¦ 20 21 22 23 24 25 26 27 28 29 30 31 32 33 34 35;
V aadd 3 0 ¦ 36 37 38 39;
V bbus 15 0 ¦ 49 50 51 52 53 54 55 56 57 58 59 60 61 62 63 64;
V badd 3 0 ¦ 65 66 67 68;
V mdat_do 15 0 ¦ 94 93 92 91 90 89 88 87 86 85 84 83 82 81 80 79;
```

V mbbus 23 0 ¦ 118 117 116 115 114 113 112 111 110 109 108 107 106 105 104 103 1-
02 101 100 99 98 97 96 95;
V mcof_do 23 0 ¦ 142 141 140 139 138 137 136 135 134 133 132 131 130 129 128 127-
126 125 124 123 122 121 120 119;
V muaadd 3 0 ¦ 146 145 144 143;
V mcfadd 4 0 ¦ 151 150 149 148 147;
V mdtadd 4 0 ¦ 156 155 154 153 152;
V mwrbadd 4 0 ¦ 161 160 159 158 157;
V mbddw 4 0 ¦ 166 165 164 163 162;
V maadd 7 0 ¦ 174 173 172 171 170 169 168 167;
V mbrl 10 0 ¦ 185 184 183 182 181 180 179 178 177 176 175;
V maxone 3 0 ¦ 189 188 187 186;
V macc0 3 0 ¦ 193 192 191 190;
V mrgw 7 0 ¦ 201 200 199 198 197 196 195 194;
V mrgr 3 0 ¦ 205 204 203 202;
V mugr_mrst_n 0 0 ¦ 206;
V mugr_mrst_ndp 0 0 ¦ 207;
V mugr_mrst_nr 0 0 ¦ 208;
V mugr_mmclk 0 0 ¦ 209;
V mugr_mmclk_ 0 0 ¦ 210;
V mugr_mmclkdp 0 0 ¦ 211;
V mugr_clk_ 0 0 ¦ 212;
V mugr_mbwrc 0 0 ¦ 214;
V mugr_modph_we 0 0 ¦ 222;
V mugr_modg_we 0 0 ¦ 223;
V mugr_modr6_we 0 0 ¦ 224;
V mugr_modr7_we 0 0 ¦ 225;
V mugr_modc_we 0 0 ¦ 226;
V mugr_mmvck 0 0 ¦ 228;
V mb_ctl_mbwr 0 0 ¦ 213;
V mb_ctl_tstuab 1 0 ¦ 18 19;
V mb_ctl_rd_eu 0 0 ¦ 69;
V mb_ctl_rd_du 0 0 ¦ 70;
V mb_ctl_rd_su 0 0 ¦ 71;
V mb_ctl_mbddw 4 0 ¦ 166 165 164 163 162;
V mb_ctl_mwrr 0 0 ¦ 233;
V mb_ctl_mwrl 0 0 ¦ 234;
V mb_ctl_mmv_rec 0 0 ¦ 235;
V mb_ctl_mb_recc 0 0 ¦ 217;
V mb_ctl_mb_recd 0 0 ¦ 218;
V mb_ctl_mb_rech 0 0 ¦ 236;
V mb_ctl_mb_rec6 0 0 ¦ 219;
V mb_ctl_mb_rec7 0 0 ¦ 220;
V mb_ctl_mb_rec3 0 0 ¦ 221;
V mcof_ram_DO 23 0 ¦ 142 141 140 139 138 137 136 135 134 133 132 131 130 129
128-
127 126 125 124 123 122 121 120 119;
V mdat_ram_DO 15 0 ¦ 94 93 92 91 90 89 88 87 86 85 84 83 82 81 80 79;

V mac_mbbus 23 0 ¦ 118 117 116 115 114 113 112 111 110 109 108 107 106 105 104 1-
03 102 101 100 99 98 97 96 95;
V mac_muaadd 3 0 ¦ 146 145 144 143;
V mac_abus 15 0 ¦ 20 21 22 23 24 25 26 27 28 29 30 31 32 33 34 35;
V mac_aadd 3 0 ¦ 36 37 38 39;
V ma_ctl_aadd 3 0 ¦ 36 37 38 39;
V ma_ctl_mrgw 7 0 ¦ 201 200 199 198 197 196 195 194;
V ma_ctl_mrgr 3 0 ¦ 205 204 203 202;
V ma_ctl_mrgs 0 0 ¦ 244;
V ma_ctl_mrda 0 0 ¦ 245;
V ma_ctl_wr_eu 0 0 ¦ 40;
V ma_ctl_wr_pu 0 0 ¦ 41;
V ma_ctl_wr_du 0 0 ¦ 42;
V ma_ctl_wr_su 0 0 ¦ 43;
V ma_ctl_mfe 0 0 ¦ 246;
V ma_ctl_mff_ 0 0 ¦ 229;
V ma_ctl_tstuaa 1 0 ¦ 15 16;
V mu_ctl_mtict 0 0 ¦ 8;
V mu_ctl_ltfrm 0 0 ¦ 9;
V mu_ctl_mwra 0 0 ¦ 243;
V mu_ctl_maadd 7 0 ¦ 174 173 172 171 170 169 168 167;
V mu_ctl_mcof_we 0 0 ¦ 230;
V mu_ctl_mcfadd 4 0 ¦ 151 150 149 148 147;
V mu_ctl_mdat_we 0 0 ¦ 231;
V mu_ctl_mdtadd 4 0 ¦ 156 155 154 153 152;
V mu_ctl_minp3 0 0 ¦ 237;
V mu_ctl_minmul 0 0 ¦ 238;
V mu_ctl_maxone 3 0 ¦ 189 188 187 186;
V mu_ctl_mckonst 0 0 ¦ 239;
V mu_ctl_macc0 3 0 ¦ 193 192 191 190;
V mu_ctl_macc_smp 0 0 ¦ 240;
V mu_ctl_mv_tr 0 0 ¦ 241;
V mu_ctl_mrdacc 0 0 ¦ 242;
V mu_ctl_mwrbadd 4 0 ¦ 161 160 159 158 157;
V mu_ctl_mu_send 0 0 ¦ 232;
V mu_ctl_mbrl 10 0 ¦ 185 184 183 182 181 180 179 178 177 176 175;
V mu_ctl_men 0 0 ¦ 215;
V mu_ctl_mhltd_ 0 0 ¦ 216;
V i_37_Z_1 0 0 ¦ 227;
M NLS mugr_p * ¦ mrst_n mrst_ndp mrst_nr mmclk mmclk_ mmclkdp clk_ mbwr mbwrc
tm-
tst tminit tlfrz reset_ clk men mhltd_ mb_recc mb_recd mb_rec6 mb_rec7 mb_rec3 m-
odph_we modg_we modr6_we modr7_we modc_we mff_ mmvck ¦
ooooooooioiiiiiiiiiiiioooo-
oio;
M NLS nmb_ctl_p * ¦ clk clk_ mrst_n mff_ mwrbadd[4] mwrbadd[3] mwrbadd[2]
mwrbad-
d[1] mwrbadd[0] mcof_we mdat_we mbwr badd[3] badd[2] badd[1] badd[0] tstwb tstuab[1] tstuab[0] mu_send eu_send du_send su_send rd_eu rd_du rd_su mbddw[4] mbddw[-3] mbddw[2] mbddw[1] mbddw[0] mwrr mwrl mmv_rec mb_recc mb_recd mb_rech mb_rec6 -
mb_rec7 mb_rec3 ¦ iiiiiiiiiioiiiiibbiiiioooooooooooooooooo;
M MDE tcram2(tcram32x24) * ¦ AR[4] AR[3] AR[2] AR[1] AR[0] AW[4] AW[3] AW[2] AW[-1] AW[0] CLB DI[23] DI[22] DI[21] DI[20] DI[19] DI[18] DI[17] DI[16] DI[15] DI[1-4] DI[13] DI[12] DI[11] DI[10] DI[9] DI[8] DI[7] DI[6] DI[5] DI[4] DI[3] DI[2] D-I[1] DI[0] DO[23] DO[22] DO[21] DO[20] DO[19] DO[18] DO[17] DO[16] DO[15] DO[14]-
DO[13] DO[12] DO[11] DO[10] DO[9] DO[8] DO[7] DO[6] DO[5] DO[4] DO[3] DO[2] DO[-1] DO[0] WEB ¦ ;
M MDE tcram2(tcram32x16) * ¦ AR[4] AR[3] AR[2] AR[1] AR[0] AW[4] AW[3] AW[2] AW[-1] AW[0] CLB DI[15] DI[14] DI[13] DI[12] DI[11] DI[10] DI[9] DI[8] DI[7] DI[6] D-I[5] DI[4] DI[3] DI[2] DI[1] DI[0] DO[15] DO[14] DO[13] DO[12] DO[11] DO[10] DO[-9] DO[8] DO[7] DO[6] DO[5] DO[4] DO[3] DO[2] DO[1] DO[0] WEB ¦ ;
M NLS nm16_p * ¦ mclk reset_ minp3 minmul maxone[3] maxone[2] maxone[1] maxone[0-] mckonst macc0[3] macc0[2] macc0[1] macc0[0] macc_smp mv_tr mrdacc mbrl[10] mbr-l[9] mbrl[8] mbrl[7] mbrl[6] mbrl[5] mbrl[4] mbrl[3] mbrl[2] mbrl[1] mbrl[0] mda-t[15] mdat[14] mdat[13] mdat[12] mdat[11] mdat[10] mdat[9] mdat[8] mdat[7] mdat[-6] mdat[5] mdat[4] mdat[3] mdat[2] mdat[1] mdat[0] mcof[23] mcof[22] mcof[21] mc-of[20] mcof[19] mcof[18] mcof[17] mcof[16] mcof[15] mcof[14] mcof[13] mcof[12] m-cof[11] mcof[10] mcof[9] mcof[8] mcof[7] mcof[6] mcof[5] mcof[4] mcof[3] mcof[2]-
mcof[1] mcof[0] mbbus[23] mbbus[22] mbbus[21] mbbus[20] mbbus[19] mbbus[18] mbb-
us[17] mbbus[16] mbbus[15] mbbus[14] mbbus[13] mbbus[12] mbbus[11] mbbus[10] mbb-
us[9] mbbus[8] mbbus[7] mbbus[6] mbbus[5] mbbus[4] mbbus[3] mbbus[2] mbbus[1] mb-bus[0] mwra modph_we modg_we maadd[7] maadd[6] maadd[5] maadd[4] maadd[3] maadd[-
2] maadd[1] maadd[0] muaadd[3] muaadd[2] muaadd[1] muaadd[0] abus[15] abus[14] a-bus[13] abus[12] abus[11] abus[10] abus[9] abus[8] abus[7] abus[6] abus[5] abus[-4] abus[3] abus[2] abus[1] abus[0] aadd[3] aadd[2] aadd[1] aadd[0] mrgw[7] mrgw[-6] mrgw[5] mrgw[4] mrgw[3] mrgw[2] mrgw[1] mrgw[0] mrgr[3] mrgr[2] mrgr[1] mrgr[-0] mrgs mrda bbus[15] bbus[14] bbus[13] bbus[12] bbus[11] bbus[10] bbus[9] bbus[-8] bbus[7] bbus[6] bbus[5] bbus[4] bbus[3] bbus[2] bbus[1] bbus[0] mbwrc ¦ iiiii-iiiiiiiiiiiiiiiiiiiiiiiiiiiiiiiiiiiiiiiiiiiiiiiiiiiiiiiiiiiiioooooooooooooooooo-ooooooiiiiiiiiiiioooooooooooooooooooooooooiiiiiiiiiiiiiiiiiiiiiiiiiii;
M NLS nma_ctl_p * ¦ clk clk_ reset_ mwra aadd[3] aadd[2] aadd[1] aadd[0] mrgw[7]-
mrgw[6] mrgw[5] mrgw[4] mrgw[3] mrgw[2] mrgw[1] mrgw[0] mrgr[3] mrgr[2] mrgr[1]-
mrgr[0] mrgs mrda eu_free_ pu_free_ du_free_ su_free_ ssoid wr_eu wr_pu wr_du w-r_su rd_ad muaadd[3] muaadd[2] muaadd[1] muaadd[0] mfe mff_ tstwa tstuaa[1] tstu-aa[0] ¦ iiiiooooooooooooooooooiiiiiooooiiiiiooibb;
M NLS mu_ctl_p * ¦ reset_ mrst_n clk rx_ck clk_ mmclk mmclk_ tmtst tlfrz tlmod t- minit mtict ltfrm tgmod tgfrz tpmod tpfrz modc_we mmvck mmv_rec mb_rech modr6_we-modr7_we mfe mff_ mwra maadd[7] maadd[6] maadd[5] maadd[4] maadd[3] maadd[2] ma-
add[1] maadd[0] mcof_we mcfadd[4] mcfadd[3] mcfadd[2] mcfadd[1] mcfadd[0] mdat_w-e mdtadd[4] mdtadd[3] mdtadd[2] mdtadd[1] mdtadd[0] minp3 minmul maxone[3] maxon-e[2] maxone[1] maxone[0] mckonst macc0[3] macc0[2] macc0[1] macc0[0] macc_smp mv-
_tr mrdacc mwrbadd[4] mwrbadd[3] mwrbadd[2] mwrbadd[1] mwrbadd[0] mu_send mbrl[1-
0] mbrl[9] mbrl[8] mbrl[7] mbrl[6] mbrl[5] mbrl[4] mbrl[3] mbrl[2] mbrl[1] mbrl[-0] men mhltd_ clk_dis ¦ iiiiiiiiiiooiiiiiiiiiiiiooooooooooooooooooooooooooooooo-ooooooooooooooooooooooooi;
M MDE ni01d1 vsc653 ¦ I Z ¦ ;
I NLS mugr_p * * 1 mugr ¦ 206 207 208 209 210 211 212 213 214 4 7 5 1 2 215 216 -217 218 219 220 221 222 223 224 225 226 227 228;
I NLS nmb_ctl_p * * 2 mb_ctl ¦ 2 212 206 229 161 160 159 158 157 230 231 213 65 -66 67 68 17 18 19 232 72 73 74 69 70 71 166 165 164 163 162 233 234 235 217 218 -236 219 220 221;
I MDE tcram2(tcram32x24) * * 3 mcof_ram ¦ 151 150 149 148 147 166 165 164 163 16-2 208 118 117 116 115 114 113 112 111 110 109 108 107 106 105 104 103 102 101 10-0 99 98 97 96 95 142 141 140 139 138 137 136 135 134 133 132 131 130 129 128 127-126 125 124 123 122 121 120 119 233;
I MDE tcram2(tcram32x16) * * 4 mdat_ram ¦ 156 155 154 153 152 166 165 164 163 16-2 208 118 117 116 115 114 113 112 111 110 109 108 107 106 105 104 103 94 93 92 9-1 90 89 88 87 86 85 84 83 82 81 80 79 234;
I NLS nm16_p * * 5 mac ¦ 211 207 237 238 189 188 187 186 239 193 192 191 190 240-241 242 185 184 183 182 181 180 179 178 177 176 175 94 93 92 91 90 89 88 87 86 -85 84 83 82 81 80 79 142 141 140 139 138 137 136 135 134 133 132 131 130 129 128-127 126 125 124 123 122 121 120 119 118 117 116 115 114 113 112 111 110 109 108-107 106 105 104 103 102 101 100 99 98 97 96 95 243 222 223 174 173 172 171 170 -169 168 167 146 145 144 143 20 21 22 23 24 25 26 27 28 29 30 31 32 33 34 35 36 3-7 38 39 201 200 199 198 197 196 195 194 205 204 203 202 244 245 49 50 51 52 53 5-4 55 56 57 58 59 60 61 62 63 64 214;
I NLS nma_ctl_p * * 6 ma_ctl ¦ 2 212 207 243 36 37 38 39 201 200 199 198 197 196-195 194 205 204 203 202 244 245 44 45 46 47 48 40 41 42 43 75 146 145 144 143 2-46 229 14 15 16;
I NLS mu_ctl_p * * 7 mu_ctl ¦ 1 206 2 3 212 209 210 4 5 6 7 8 9 10 11 12 13 226 -228 235 236 224 225 246 227 243 174 173 172 171 170 169 168 167 230 151 150 149 -148 147 231 156 155 154 153 152 237 238 189 188 187 186 239 193 192 191 190 240 -241 242 161 160 159 158 157 232 185 184 183 182 181 180 179 178 177 176 175 215 -216 76;
I MDE ni01d1 vsc653 * 8 i_37 ¦ 229 227;
E netlist B subcells
NLS mugr_p *
NLS nmb_ctl_p *

```
MDE tcram2(tcram32x24) *
MDE tcram2(tcram32x16) *
NLS nm16_p *
NLS nma_ctl_p *
NLS mu_ctl_p *
MDE ni01d1 vsc653
E subcells


B attribute_list
    18196 chip
    18209 frequency
E attribute_list

B A: chip
E

B A: frequency
E
```

MUGR_P NLS

```
#cell2 * mugr_p nls * 4 any 0 v8r4.6.2
# "16-Oct-94 GMT" "15:22:14 GMT" "16-Oct-94 GMT" "15:22:14 GMT" amir * .
writer       1
file_version 1
sections     1
netlist   1:      81 mugr_p


B contents:  mugr_p
netlist        246
cells         3487
switches         0
attributes       0
physical         0
history          0
E contents


B netlist
X 1 mrst_n o;
X 2 mrst_ndp o;
X 3 mrst_nr o;
X 4 mmclk o;
X 5 mmclk_ o;
X 6 mmclkdp o;
X 7 clk_ o;
X 8 mbwr i;
X 9 mbwrc o;
X 10 tmtst i;
X 11 tminit i;
X 12 tlfrz i;
X 13 reset_ i;
X 14 clk i;
X 15 men i;
X 16 mhltd_ i;
X 17 mb_recc i;
X 18 mb_recd i;
X 19 mb_rec6 i;
X 20 mb_rec7 i;
X 21 mb_rec3 i;
X 22 modph_we o;
X 23 modg_we o;
X 24 modr6_we o;
X 25 modr7_we o;
X 26 modc_we o;
```

```
X 27 mff_ i;
X 28 mmvck o;
G 29 VDD;
G 30 VSS;
N 31 i_67_zn;
N 32 i_68_zn;
N 33 i_63_z;
N 34 i_73_zn;
N 35 i_75_zn;
N 36 i_76_zn;
N 37 i_84_zn;
N 38 i_86_zn;
N 39 i_88_zn;
N 40 i_90_zn;
N 41 i_96_zn;
N 42 i_95_zn;
N 43 i_94_zn;
N 44 mrst_nd;
N 31 i_67_ZN_1[0];
N 32 i_68_ZN_1[0];
N 33 i_63_Z_1[0];
N 34 i_73_ZN_1[0];
N 35 i_75_ZN_1[0];
N 36 i_76_ZN_1[0];
N 37 i_84_ZN_1[0];
N 38 i_86_ZN_1[0];
N 39 i_88_ZN_1[0];
N 40 i_90_ZN_1[0];
N 41 i_96_ZN_1[0];
N 42 i_95_ZN_1[0];
N 43 i_94_ZN_1[0];
N 44 i_93_ZN[0];
N 4 i_64_ZN[0];
N 6 i_65_ZN[0];
N 5 i_69_ZN[0];
N 7 i_70_ZN[0];
N 9 i_71_Z[0];
N 22 i_72_ZN[0];
N 23 i_74_Z[0];
N 24 i_83_ZN[0];
N 25 i_85_ZN[0];
N 26 i_87_ZN[0];
N 28 i_89_ZN[0];
N 1 mrst_n_buf_Z[0];
N 2 mrst_ndp_buf_Z[0];
N 3 mrst_nr_buf_Z[0];
V i_64_ZN 0 0 ¦ 4;
V i_65_ZN 0 0 ¦ 6;
```

```
V i_67_ZN_1 0 0 ¦ 31;
V i_68_ZN_1 0 0 ¦ 32;
V i_69_ZN 0 0 ¦ 5;
V i_63_Z_1 0 0 ¦ 33;
V i_70_ZN 0 0 ¦ 7;
V i_71_Z 0 0 ¦ 9;
V i_72_ZN 0 0 ¦ 22;
V i_73_ZN_1 0 0 ¦ 34;
V i_74_Z 0 0 ¦ 23;
V i_75_ZN_1 0 0 ¦ 35;
V i_76_ZN_1 0 0 ¦ 36;
V i_83_ZN 0 0 ¦ 24;
V i_84_ZN_1 0 0 ¦ 37;
V i_85_ZN 0 0 ¦ 25;
V i_86_ZN_1 0 0 ¦ 38;
V i_87_ZN 0 0 ¦ 26;
V i_88_ZN_1 0 0 ¦ 39;
V i_89_ZN 0 0 ¦ 28;
V i_90_ZN_1 0 0 ¦ 40;
V i_93_ZN 0 0 ¦ 44;
V mrst_n_buf_Z 0 0 ¦ 1;
V mrst_ndp_buf_Z 0 0 ¦ 2;
V mrst_nr_buf_Z 0 0 ¦ 3;
V i_94_ZN_1 0 0 ¦ 43;
V i_95_ZN_1 0 0 ¦ 42;
V i_96_ZN_1 0 0 ¦ 41;
M MDE in01d5 vsc653 ¦ I ZN ¦ ;
M MDE fn01d2 vsc653 ¦ A1 B1 ZN ¦ ;
M MDE nd02d1 vsc653 ¦ A1 A2 ZN ¦ ;
M MDE ni01d1 vsc653 ¦ I Z ¦ ;
M MDE in01d1 vsc653 ¦ I ZN ¦ ;
M MDE an02d1 vsc653 ¦ A1 A2 Z ¦ ;
M MDE nr02d1 vsc653 ¦ A1 A2 ZN ¦ ;
M MDE ni01d5 vsc653 ¦ I Z ¦ ;
M MDE ao08d2 vsc653 ¦ A1 A2 A3 B ZN ¦ ;
M MDE ni01d3 vsc653 ¦ I Z ¦ ;
M MDE in02d2 vsc653 ¦ I ZN ¦ ;
I MDE in01d5 vsc653 * 1 i_64 ¦ 31 4;
I MDE in01d5 vsc653 * 2 i_65 ¦ 31 6;
I MDE fn01d2 vsc653 * 3 i_67 ¦ 32 14 31;
I MDE nd02d1 vsc653 * 4 i_68 ¦ 15 16 32;
I MDE in01d5 vsc653 * 5 i_69 ¦ 4 5;
I MDE ni01d1 vsc653 * 6 i_63 ¦ 14 33;
I MDE in01d1 vsc653 * 7 i_70 ¦ 33 7;
I MDE an02d1 vsc653 * 8 i_71 ¦ 14 8 9;
I MDE nr02d1 vsc653 * 9 i_72 ¦ 14 34 22;
I MDE in01d1 vsc653 * 10 i_73 ¦ 17 34;
I MDE ni01d5 vsc653 * 11 i_74 ¦ 35 23;
```

```
I MDE nr02d1 vsc653 * 12 i_75 ¦ 14 36 35;
I MDE in01d1 vsc653 * 13 i_76 ¦ 18 36;
I MDE nr02d1 vsc653 * 14 i_83 ¦ 14 37 24;
I MDE in01d1 vsc653 * 15 i_84 ¦ 19 37;
I MDE nr02d1 vsc653 * 16 i_85 ¦ 14 38 25;
I MDE in01d1 vsc653 * 17 i_86 ¦ 20 38;
I MDE nr02d1 vsc653 * 18 i_87 ¦ 14 39 26;
I MDE in01d1 vsc653 * 19 i_88 ¦ 21 39;
I MDE nr02d1 vsc653 * 20 i_89 ¦ 14 40 28;
I MDE in01d1 vsc653 * 21 i_90 ¦ 27 40;
I MDE ao08d2 vsc653 * 22 i_93 ¦ 41 42 11 43 44;
I MDE ni01d5 vsc653 * 23 mrst_n_buf ¦ 44 1;
I MDE ni01d5 vsc653 * 24 mrst_ndp_buf ¦ 44 2;
I MDE ni01d3 vsc653 * 25 mrst_nr_buf ¦ 1 3;
I MDE in01d1 vsc653 * 26 i_94 ¦ 13 43;
I MDE in02d2 vsc653 * 27 i_95 ¦ 10 42;
I MDE in02d2 vsc653 * 28 i_96 ¦ 12 41;
E netlist

B subcells
MDE in01d5 vsc653
MDE fn01d2 vsc653
MDE nd02d1 vsc653
MDE ni01d1 vsc653
MDE in01d1 vsc653
MDE an02d1 vsc653
MDE nr02d1 vsc653
MDE ni01d5 vsc653
MDE ao08d2 vsc653
MDE ni01d3 vsc653
MDE in02d2 vsc653
E subcells
```

MULX LA

```
#cell2 * mulx la * 44 any 1053696 v8r4.6.2
# "22-May-94 GMT" "13:35:58 GMT" "29-Dec-93 GMT" "19:50:57 GMT" amir * .la
alias VDD VSS ad01d1:portable in01d5:portable nr02d1:portable .
V 15 COMPASSlogicAssist
T C
L ""
I 489
B 70 18 9378 2547
M 1073791174 1073756116 0 0
F micej
D "" "" "" "0" "0" "0" "0" "0" "0"
C 70 860 1 5 20 "A[15:0]" small LC B NSCI 0 20 1
N 80 863 "A[15:0]" normal LC B
C 70 900 2 5 40 "B[15:0]" small LC B NSCI 0 40 1
N 80 903 "B[15:0]" normal LC B
C 9340 860 3 75 20 "P[0]" small RC B NSCO 80 20 1
N 9330 863 "P[0]" normal RC B
C 9310 90 4 75 10 "P1[31:1]" small RC B NSCO 80 10 1
N 9320 90 "P1[31:1]" normal LC B
C 9310 110 5 75 30 "P2[31:1]" small RC B NSCO 80 30 1
N 9320 110 "P2[31:1]" normal LC B
V 4 *
B 0 0 80 70 1 0
T 40 75 "@@InstName" normal CB B I
T 40 -15 "@@Label" normal CB B L
T 40 50 "mulx" normal CB B T
E
O "asheet" 0 0 9410 2600 *
I NORA14B13 225 1 3980 1310 0 "[la]nr02d1:portable" "" 5 * * 0
I NORA14B14 241 1 4250 1310 0 "[la]nr02d1:portable" "" 5 * * 0
I NORA14B15 257 1 4520 1310 0 "[la]nr02d1:portable" "" 5 * * 0
I NORA14B5 97 1 1820 1310 0 "[la]nr02d1:portable" "" 5 * * 0
I NORA14B4 81 1 1550 1310 0 "[la]nr02d1:portable" "" 5 * * 0
I NORA14B3 65 1 1280 1310 0 "[la]nr02d1:portable" "" 5 * * 0
I NORA14B2 49 1 1010 1310 0 "[la]nr02d1:portable" "" 5 * * 0
I NORA14B6 113 1 2090 1310 0 "[la]nr02d1:portable" "" 5 * * 0
I NORA14B7 129 1 2360 1310 0 "[la]nr02d1:portable" "" 5 * * 0
I NORA14B8 145 1 2630 1310 0 "[la]nr02d1:portable" "" 5 * * 0
I NORA14B9 161 1 2900 1310 0 "[la]nr02d1:portable" "" 5 * * 0
I NORA14B10 177 1 3170 1310 0 "[la]nr02d1:portable" "" 5 * * 0
I NORA14B11 193 1 3440 1310 0 "[la]nr02d1:portable" "" 5 * * 0
I NORA14B12 209 1 3710 1310 0 "[la]nr02d1:portable" "" 5 * * 0
I NORA14B0 17 1 470 1310 0 "[la]nr02d1:portable" "" 5 * * 0
I NORA14B1 33 1 740 1310 0 "[la]nr02d1:portable" "" 5 * * 0
I NORA6B5 89 1 1820 590 0 "[la]nr02d1:portable" "" 5 * * 0
```

```
I NORA7B5 90 1 1820 680 0 "[la]nr02d1:portable" "" 5 * * 0
I NORA8B5 91 1 1820 770 0 "[la]nr02d1:portable" "" 5 * * 0
I NORA3B5 86 1 1820 320 0 "[la]nr02d1:portable" "" 5 * * 0
I NORA4B5 87 1 1820 410 0 "[la]nr02d1:portable" "" 5 * * 0
I NORA5B5 88 1 1820 500 0 "[la]nr02d1:portable" "" 5 * * 0
I NORA0B5 83 1 1820 50 0 "[la]nr02d1:portable" "" 5 * * 0
I NORA1B5 84 1 1820 140 0 "[la]nr02d1:portable" "" 5 * * 0
I NORA2B5 85 1 1820 230 0 "[la]nr02d1:portable" "" 5 * * 0
I NORA13B5 96 1 1820 1220 0 "[la]nr02d1:portable" "" 5 * * 0
I NORA12B5 95 1 1820 1130 0 "[la]nr02d1:portable" "" 5 * * 0
I NORA11B5 94 1 1820 1040 0 "[la]nr02d1:portable" "" 5 * * 0
I NORA10B5 93 1 1820 950 0 "[la]nr02d1:portable" "" 5 * * 0
I NORA9B5 92 1 1820 860 0 "[la]nr02d1:portable" "" 5 * * 0
I AINV[1:16] 1 16 210 50 0 "[la]in01d5:portable" "" 5 * * 0
I NORA0B2 35 1 1010 50 0 "[la]nr02d1:portable" "" 5 * * 0
I NORA0B0 3 1 470 50 0 "[la]nr02d1:portable" "" 5 * * 0
I NORA0B1 19 1 740 50 0 "[la]nr02d1:portable" "" 5 * * 0
I NORA0B3 51 1 1280 50 0 "[la]nr02d1:portable" "" 5 * * 0
I NORA0B4 67 1 1550 50 0 "[la]nr02d1:portable" "" 5 * * 0
I NORA0B10 163 1 3170 50 0 "[la]nr02d1:portable" "" 5 * * 0
I NORA0B6 99 1 2090 50 0 "[la]nr02d1:portable" "" 5 * * 0
I NORA0B7 115 1 2360 50 0 "[la]nr02d1:portable" "" 5 * * 0
I NORA0B8 131 1 2630 50 0 "[la]nr02d1:portable" "" 5 * * 0
I NORA0B9 147 1 2900 50 0 "[la]nr02d1:portable" "" 5 * * 0
I NORA0B13 211 1 3980 50 0 "[la]nr02d1:portable" "" 5 * * 0
I NORA0B12 195 1 3710 50 0 "[la]nr02d1:portable" "" 5 * * 0
I NORA0B11 179 1 3440 50 0 "[la]nr02d1:portable" "" 5 * * 0
I NORA0B15 243 1 4520 50 0 "[la]nr02d1:portable" "" 5 * * 0
I NORA0B14 227 1 4250 50 0 "[la]nr02d1:portable" "" 5 * * 0
P 150 50 S
P 320 50 S
P 400 50 S
P 590 60 S
P 670 50 S
P 860 60 S
P 940 50 S
P 1670 60 S
P 1480 50 S
P 1400 60 S
P 1130 60 S
P 1210 50 S
P 1750 50 S
P 2480 60 S
P 2290 50 S
P 2210 60 S
P 1940 60 S
P 2020 50 S
P 3020 60 S
```

```
P 2830 50 S
P 2750 60 S
P 2560 50 S
P 3100 50 S
P 3290 60 S
P 3370 50 S
P 3560 60 S
P 3640 50 S
P 3830 60 S
P 3910 50 S
P 4100 60 S
P 4180 50 S
P 4370 60 S
P 4450 50 S
P 4640 60 S
P 4720 50 S
I NORA7B4 74 1 1550 680 0 "[la]nr02d1:portable" "" 5 * * 0
I NORA7B3 58 1 1280 680 0 "[la]nr02d1:portable" "" 5 * * 0
I NORA7B2 42 1 1010 680 0 "[la]nr02d1:portable" "" 5 * * 0
I NORA7B1 26 1 740 680 0 "[la]nr02d1:portable" "" 5 * * 0
I NORA7B0 10 1 470 680 0 "[la]nr02d1:portable" "" 5 * * 0
P 320 140 S
P 150 140 S
I BINV[1:16] 2 16 210 140 0 "[la]in01d5:portable" "" 5 * * 0
I NORA4B2 39 1 1010 410 0 "[la]nr02d1:portable" "" 5 * * 0
I NORA3B2 38 1 1010 320 0 "[la]nr02d1:portable" "" 5 * * 0
I NORA2B2 37 1 1010 230 0 "[la]nr02d1:portable" "" 5 * * 0
I NORA5B2 40 1 1010 500 0 "[la]nr02d1:portable" "" 5 * * 0
I NORA6B2 41 1 1010 590 0 "[la]nr02d1:portable" "" 5 * * 0
I NORA1B2 36 1 1010 140 0 "[la]nr02d1:portable" "" 5 * * 0
I NORA2B0 5 1 470 230 0 "[la]nr02d1:portable" "" 5 * * 0
I NORA2B1 21 1 740 230 0 "[la]nr02d1:portable" "" 5 * * 0
P 590 150 S
P 400 140 S
I NORA1B0 4 1 470 140 0 "[la]nr02d1:portable" "" 5 * * 0
P 670 140 S
P 460 160 S
P 670 70 S
P 460 70 S
P 400 70 S
P 730 70 S
P 940 70 S
P 1000 70 S
P 1000 160 S
P 730 160 S
P 940 140 S
P 860 150 S
I NORA1B1 20 1 740 140 0 "[la]nr02d1:portable" "" 5 * * 0
```

```
P 460 250 S
P 460 340 S
P 590 240 S
P 400 230 S
P 670 230 S
P 590 330 S
P 400 320 S
I NORA3B0 6 1 470 320 0 "[la]nr02d1:portable" "" 5 * * 0
P 670 320 S
P 860 240 S
P 940 230 S
I NORA3B1 22 1 740 320 0 "[la]nr02d1:portable" "" 5 * * 0
P 860 330 S
P 940 320 S
P 730 250 S
P 730 340 S
P 1000 340 S
P 1000 250 S
I NORA2B3 53 1 1280 230 0 "[la]nr02d1:portable" "" 5 * * 0
I NORA2B4 69 1 1550 230 0 "[la]nr02d1:portable" "" 5 * * 0
P 1210 70 S
P 1270 70 S
P 1270 160 S
I NORA1B3 52 1 1280 140 0 "[la]nr02d1:portable" "" 5 * * 0
P 1130 150 S
P 1210 140 S
P 1400 150 S
P 1810 160 S
P 1480 70 S
P 1540 70 S
P 1750 70 S
P 1810 70 S
P 1540 160 S
P 1750 140 S
I NORA1B4 68 1 1550 140 0 "[la]nr02d1:portable" "" 5 * * 0
P 1480 140 S
P 1670 150 S
P 1130 240 S
P 1210 230 S
P 1400 240 S
P 1270 340 S
P 1270 250 S
I NORA3B3 54 1 1280 320 0 "[la]nr02d1:portable" "" 5 * * 0
P 1130 330 S
P 1210 320 S
P 1400 330 S
P 1540 250 S
P 1540 340 S
```

```
P 1480 230 S
P 1670 240 S
P 1750 230 S
P 1750 320 S
P 1670 330 S
P 1480 320 S
I NORA3B4 70 1 1550 320 0 "[la]nr02d1:portable" "" 5 * * 0
P 1810 250 S
P 1810 340 S
I NORA5B0 8 1 470 500 0 "[la]nr02d1:portable" "" 5 * * 0
I NORA5B1 24 1 740 500 0 "[la]nr02d1:portable" "" 5 * * 0
I NORA4B0 7 1 470 410 0 "[la]nr02d1:portable" "" 5 * * 0
P 460 520 S
P 460 430 S
P 670 500 S
P 670 410 S
P 400 410 S
P 590 420 S
P 400 500 S
P 590 510 S
I NORA4B1 23 1 740 410 0 "[la]nr02d1:portable" "" 5 * * 0
P 1000 520 S
P 1000 430 S
P 730 520 S
P 730 430 S
P 940 500 S
P 940 410 S
P 860 510 S
P 860 420 S
I NORA6B0 9 1 470 590 0 "[la]nr02d1:portable" "" 5 * * 0
P 400 590 S
P 590 600 S
P 460 610 S
P 670 590 S
I NORA6B1 25 1 740 590 0 "[la]nr02d1:portable" "" 5 * * 0
P 860 600 S
P 940 590 S
P 730 610 S
P 1000 610 S
I NORA5B3 56 1 1280 500 0 "[la]nr02d1:portable" "" 5 * * 0
I NORA5B4 72 1 1550 500 0 "[la]nr02d1:portable" "" 5 * * 0
I NORA4B3 55 1 1280 410 0 "[la]nr02d1:portable" "" 5 * * 0
P 1270 520 S
P 1270 430 S
P 1130 420 S
P 1130 510 S
P 1210 410 S
P 1400 420 S
```

```
P 1210 500 S
P 1400 510 S
P 1810 430 S
I NORA4B4 71 1 1550 410 0 "[la]nr02d1:portable" "" 5 * * 0
P 1540 520 S
P 1540 430 S
P 1750 500 S
P 1750 410 S
P 1670 510 S
P 1480 500 S
P 1670 420 S
P 1480 410 S
P 1810 520 S
P 1270 610 S
I NORA6B3 57 1 1280 590 0 "[la]nr02d1:portable" "" 5 * * 0
P 1130 600 S
P 1210 590 S
P 1400 600 S
P 1750 590 S
P 1540 610 S
P 1810 610 S
I NORA6B4 73 1 1550 590 0 "[la]nr02d1:portable" "" 5 * * 0
P 1480 590 S
P 1670 600 S
I NORA8B2 43 1 1010 770 0 "[la]nr02d1:portable" "" 5 * * 0
I NORA13B2 48 1 1010 1220 0 "[la]nr02d1:portable" "" 5 * * 0
I NORA12B2 47 1 1010 1130 0 "[la]nr02d1:portable" "" 5 * * 0
I NORA11B2 46 1 1010 1040 0 "[la]nr02d1:portable" "" 5 * * 0
I NORA10B2 45 1 1010 950 0 "[la]nr02d1:portable" "" 5 * * 0
I NORA9B2 44 1 1010 860 0 "[la]nr02d1:portable" "" 5 * * 0
I NORA10B0 13 1 470 950 0 "[la]nr02d1:portable" "" 5 * * 0
I NORA10B1 29 1 740 950 0 "[la]nr02d1:portable" "" 5 * * 0
I NORA10B4 77 1 1550 950 0 "[la]nr02d1:portable" "" 5 * * 0
I NORA10B3 61 1 1280 950 0 "[la]nr02d1:portable" "" 5 * * 0
P 590 690 S
P 670 680 S
P 400 680 S
P 590 780 S
P 400 770 S
I NORA8B0 11 1 470 770 0 "[la]nr02d1:portable" "" 5 * * 0
P 670 770 S
P 460 700 S
P 460 790 S
I NORA8B1 27 1 740 770 0 "[la]nr02d1:portable" "" 5 * * 0
P 940 680 S
P 860 690 S
P 730 790 S
P 1000 700 S
```

```
P 1000 790 S
P 730 700 S
P 940 770 S
P 860 780 S
I NORA9B0 12 1 470 860 0 "[la]nr02d1:portable" "" 5 * * 0
P 400 950 S
P 590 870 S
P 460 970 S
P 460 880 S
P 670 950 S
P 670 860 S
P 590 960 S
P 400 860 S
I NORA9B1 28 1 740 860 0 "[la]nr02d1:portable" "" 5 * * 0
P 860 870 S
P 860 960 S
P 940 860 S
P 940 950 S
P 730 880 S
P 730 970 S
P 1000 880 S
P 1000 970 S
P 1210 680 S
P 1130 690 S
P 1400 690 S
P 1270 790 S
P 1270 700 S
I NORA8B3 59 1 1280 770 0 "[la]nr02d1:portable" "" 5 * * 0
P 1130 780 S
P 1210 770 S
P 1400 780 S
P 1810 700 S
P 1810 790 S
P 1670 690 S
P 1750 680 S
P 1480 680 S
P 1540 790 S
P 1540 700 S
P 1750 770 S
P 1670 780 S
I NORA8B4 75 1 1550 770 0 "[la]nr02d1:portable" "" 5 * * 0
P 1480 770 S
P 1400 960 S
I NORA9B3 60 1 1280 860 0 "[la]nr02d1:portable" "" 5 * * 0
P 1270 970 S
P 1270 880 S
P 1130 870 S
P 1130 960 S
```

09743583.072099

```
P 1210 860 S
P 1400 870 S
P 1210 950 S
I NORA9B4 76 1 1550 860 0 "[la]nr02d1:portable" "" 5 * * 0
P 1540 970 S
P 1540 880 S
P 1750 950 S
P 1750 860 S
P 1670 960 S
P 1480 950 S
P 1670 870 S
P 1480 860 S
P 1810 970 S
P 1810 880 S
I NORA12B1 31 1 740 1130 0 "[la]nr02d1:portable" "" 5 * * 0
I NORA12B0 15 1 470 1130 0 "[la]nr02d1:portable" "" 5 * * 0
P 670 1130 S
P 400 1130 S
P 940 1130 S
P 460 1060 S
P 670 1040 S
I NORA11B0 14 1 470 1040 0 "[la]nr02d1:portable" "" 5 * * 0
P 400 1040 S
P 590 1050 S
P 1000 1060 S
P 730 1060 S
P 940 1040 S
P 860 1050 S
I NORA11B1 30 1 740 1040 0 "[la]nr02d1:portable" "" 5 * * 0
P 590 1140 S
P 460 1240 S
P 460 1150 S
P 670 1220 S
I NORA13B0 16 1 470 1220 0 "[la]nr02d1:portable" "" 5 * * 0
P 400 1220 S
P 590 1230 S
P 860 1140 S
I NORA13B1 32 1 740 1220 0 "[la]nr02d1:portable" "" 5 * * 0
P 860 1230 S
P 940 1220 S
P 730 1150 S
P 1000 1150 S
P 1000 1240 S
P 730 1240 S
I NORA12B3 63 1 1280 1130 0 "[la]nr02d1:portable" "" 5 * * 0
I NORA12B4 79 1 1550 1130 0 "[la]nr02d1:portable" "" 5 * * 0
P 1210 1130 S
P 1750 1130 S
```

```
P 1480 1130 S
P 1270 1060 S
I NORA11B3 62 1 1280 1040 0 "[la]nr02d1:portable" "" 5 * * 0
P 1130 1050 S
P 1210 1040 S
P 1400 1050 S
P 1540 1060 S
P 1750 1040 S
I NORA11B4 78 1 1550 1040 0 "[la]nr02d1:portable" "" 5 * * 0
P 1480 1040 S
P 1670 1050 S
P 1810 1060 S
P 1130 1140 S
P 1400 1140 S
P 1270 1240 S
P 1270 1150 S
I NORA13B3 64 1 1280 1220 0 "[la]nr02d1:portable" "" 5 * * 0
P 1130 1230 S
P 1210 1220 S
P 1400 1230 S
I NORA13B4 80 1 1550 1220 0 "[la]nr02d1:portable" "" 5 * * 0
P 1810 1150 S
P 1810 1240 S
P 1670 1140 S
P 1540 1240 S
P 1540 1150 S
P 1750 1220 S
P 1670 1230 S
P 1480 1220 S
I NORA1B10 164 1 3170 140 0 "[la]nr02d1:portable" "" 5 * * 0
I NORA2B10 165 1 3170 230 0 "[la]nr02d1:portable" "" 5 * * 0
I NORA3B10 166 1 3170 320 0 "[la]nr02d1:portable" "" 5 * * 0
I NORA4B10 167 1 3170 410 0 "[la]nr02d1:portable" "" 5 * * 0
I NORA5B10 168 1 3170 500 0 "[la]nr02d1:portable" "" 5 * * 0
I NORA6B10 169 1 3170 590 0 "[la]nr02d1:portable" "" 5 * * 0
I NORA7B10 170 1 3170 680 0 "[la]nr02d1:portable" "" 5 * * 0
I NORA8B10 171 1 3170 770 0 "[la]nr02d1:portable" "" 5 * * 0
I NORA9B10 172 1 3170 860 0 "[la]nr02d1:portable" "" 5 * * 0
I NORA10B10 173 1 3170 950 0 "[la]nr02d1:portable" "" 5 * * 0
I NORA11B10 174 1 3170 1040 0 "[la]nr02d1:portable" "" 5 * * 0
I NORA13B10 176 1 3170 1220 0 "[la]nr02d1:portable" "" 5 * * 0
I NORA12B10 175 1 3170 1130 0 "[la]nr02d1:portable" "" 5 * * 0
I NORA7B6 106 1 2090 680 0 "[la]nr02d1:portable" "" 5 * * 0
I NORA7B7 122 1 2360 680 0 "[la]nr02d1:portable" "" 5 * * 0
I NORA7B8 138 1 2630 680 0 "[la]nr02d1:portable" "" 5 * * 0
I NORA7B9 154 1 2900 680 0 "[la]nr02d1:portable" "" 5 * * 0
I NORA7B11 186 1 3440 680 0 "[la]nr02d1:portable" "" 5 * * 0
I NORA7B12 202 1 3710 680 0 "[la]nr02d1:portable" "" 5 * * 0
```

```
I NORA7B13 218 1 3980 680 0 "[la]nr02d1:portable" "" 5 * * 0
I NORA7B14 234 1 4250 680 0 "[la]nr02d1:portable" "" 5 * * 0
I NORA7B15 250 1 4520 680 0 "[la]nr02d1:portable" "" 5 * * 0
I NORA3B6 102 1 2090 320 0 "[la]nr02d1:portable" "" 5 * * 0
I NORA1B6 100 1 2090 140 0 "[la]nr02d1:portable" "" 5 * * 0
I NORA2B6 101 1 2090 230 0 "[la]nr02d1:portable" "" 5 * * 0
I NORA2B7 117 1 2360 230 0 "[la]nr02d1:portable" "" 5 * * 0
P 2020 70 S
P 2080 70 S
P 2080 160 S
P 1940 150 S
P 2020 140 S
P 2290 70 S
P 2350 70 S
P 2350 160 S
P 2480 150 S
P 2290 140 S
I NORA1B7 116 1 2360 140 0 "[la]nr02d1:portable" "" 5 * * 0
P 2210 150 S
P 1940 330 S
P 2020 320 S
P 2080 250 S
P 1940 240 S
P 2020 230 S
P 2080 340 S
P 2210 240 S
P 2290 230 S
P 2480 240 S
I NORA3B7 118 1 2360 320 0 "[la]nr02d1:portable" "" 5 * * 0
P 2210 330 S
P 2290 320 S
P 2480 330 S
P 2350 250 S
P 2350 340 S
I NORA1B9 148 1 2900 140 0 "[la]nr02d1:portable" "" 5 * * 0
I NORA2B9 149 1 2900 230 0 "[la]nr02d1:portable" "" 5 * * 0
I NORA3B9 150 1 2900 320 0 "[la]nr02d1:portable" "" 5 * * 0
I NORA2B8 133 1 2630 230 0 "[la]nr02d1:portable" "" 5 * * 0
P 2890 70 S
P 2830 70 S
P 2620 70 S
P 2560 70 S
P 2890 160 S
P 2620 160 S
P 2830 140 S
I NORA1B8 132 1 2630 140 0 "[la]nr02d1:portable" "" 5 * * 0
P 2560 140 S
P 2750 150 S
```

```
P 3020 150 S
P 3160 70 S
P 3100 70 S
P 3160 160 S
P 3100 140 S
P 2750 240 S
P 2560 230 S
P 2830 230 S
P 2750 330 S
P 2560 320 S
I NORA3B8 134 1 2630 320 0 "[la]nr02d1:portable" "" 5 * * 0
P 2890 340 S
P 2890 250 S
P 2830 320 S
P 2620 250 S
P 2620 340 S
P 3100 230 S
P 3020 240 S
P 3020 330 S
P 3100 320 S
P 3160 250 S
P 3160 340 S
I NORA4B6 103 1 2090 410 0 "[la]nr02d1:portable" "" 5 * * 0
I NORA6B6 105 1 2090 590 0 "[la]nr02d1:portable" "" 5 * * 0
I NORA5B6 104 1 2090 500 0 "[la]nr02d1:portable" "" 5 * * 0
I NORA5B7 120 1 2360 500 0 "[la]nr02d1:portable" "" 5 * * 0
P 2080 520 S
P 2080 430 S
P 2020 500 S
P 1940 420 S
P 1940 510 S
P 2020 410 S
I NORA4B7 119 1 2360 410 0 "[la]nr02d1:portable" "" 5 * * 0
P 2350 520 S
P 2350 430 S
P 2480 510 S
P 2290 500 S
P 2480 420 S
P 2290 410 S
P 2210 510 S
P 2210 420 S
P 1940 600 S
P 2020 590 S
P 2080 610 S
I NORA6B7 121 1 2360 590 0 "[la]nr02d1:portable" "" 5 * * 0
P 2210 600 S
P 2350 610 S
P 2480 600 S
```

P 2290 590 S
I NORA4B9 151 1 2900 410 0 "[la]nr02d1:portable" "" 5 * * 0
I NORA5B9 152 1 2900 500 0 "[la]nr02d1:portable" "" 5 * * 0
I NORA6B9 153 1 2900 590 0 "[la]nr02d1:portable" "" 5 * * 0
I NORA5B8 136 1 2630 500 0 "[la]nr02d1:portable" "" 5 * * 0
I NORA4B8 135 1 2630 410 0 "[la]nr02d1:portable" "" 5 * * 0
P 2890 520 S
P 2890 430 S
P 2620 520 S
P 2620 430 S
P 2830 500 S
P 2830 410 S
P 2560 410 S
P 2750 420 S
P 2560 500 S
P 2750 510 S
P 3160 520 S
P 3160 430 S
P 3100 500 S
P 3100 410 S
P 3020 510 S
P 3020 420 S
I NORA6B8 137 1 2630 590 0 "[la]nr02d1:portable" "" 5 * * 0
P 2560 590 S
P 2890 610 S
P 2620 610 S
P 2830 590 S
P 2750 600 S
P 3020 600 S
P 3100 590 S
P 3160 610 S
I NORA6B13 217 1 3980 590 0 "[la]nr02d1:portable" "" 5 * * 0
I NORA5B13 216 1 3980 500 0 "[la]nr02d1:portable" "" 5 * * 0
I NORA4B13 215 1 3980 410 0 "[la]nr02d1:portable" "" 5 * * 0
I NORA3B13 214 1 3980 320 0 "[la]nr02d1:portable" "" 5 * * 0
I NORA2B13 213 1 3980 230 0 "[la]nr02d1:portable" "" 5 * * 0
I NORA1B13 212 1 3980 140 0 "[la]nr02d1:portable" "" 5 * * 0
I NORA2B11 181 1 3440 230 0 "[la]nr02d1:portable" "" 5 * * 0
I NORA2B12 197 1 3710 230 0 "[la]nr02d1:portable" "" 5 * * 0
P 3560 150 S
P 3370 140 S
P 3290 150 S
I NORA1B11 180 1 3440 140 0 "[la]nr02d1:portable" "" 5 * * 0
P 3430 160 S
P 3430 70 S
P 3370 70 S
P 3700 70 S
P 3640 70 S

```
P 3910 70 S
P 3970 70 S
P 3970 160 S
P 3700 160 S
P 3910 140 S
I NORA1B12 196 1 3710 140 0 "[la]nr02d1:portable" "" 5 * * 0
P 3640 140 S
P 3830 150 S
P 3430 250 S
P 3430 340 S
P 3560 240 S
P 3560 330 S
P 3370 320 S
P 3290 330 S
I NORA3B11 182 1 3440 320 0 "[la]nr02d1:portable" "" 5 * * 0
P 3290 240 S
P 3370 230 S
P 3640 230 S
P 3830 240 S
P 3910 230 S
I NORA3B12 198 1 3710 320 0 "[la]nr02d1:portable" "" 5 * * 0
P 3970 340 S
P 3970 250 S
P 3700 340 S
P 3700 250 S
P 3910 320 S
P 3830 330 S
P 3640 320 S
I NORA1B14 228 1 4250 140 0 "[la]nr02d1:portable" "" 5 * * 0
I NORA2B14 229 1 4250 230 0 "[la]nr02d1:portable" "" 5 * * 0
I NORA3B14 230 1 4250 320 0 "[la]nr02d1:portable" "" 5 * * 0
I NORA2B15 245 1 4520 230 0 "[la]nr02d1:portable" "" 5 * * 0
P 4180 70 S
P 4240 70 S
P 4240 160 S
P 4100 150 S
P 4180 140 S
P 4720 210 S
P 4720 90 S
P 4450 70 S
P 4510 70 S
P 4510 160 S
P 4640 150 S
P 4450 140 S
I NORA1B15 244 1 4520 140 0 "[la]nr02d1:portable" "" 5 * * 0
P 4370 150 S
P 4100 240 S
P 4180 230 S
```

```
P 4240 340 S
P 4240 250 S
P 4100 330 S
P 4180 320 S
P 4450 320 S
P 4640 330 S
P 4510 250 S
P 4510 340 S
P 4370 240 S
P 4450 230 S
P 4640 240 S
P 4370 330 S
I NORA3B15 246 1 4520 320 0 "[la]nr02d1:portable" "" 5 * * 0
P 4720 370 S
P 4720 250 S
I NORA5B11 184 1 3440 500 0 "[la]nr02d1:portable" "" 5 * * 0
I NORA5B12 200 1 3710 500 0 "[la]nr02d1:portable" "" 5 * * 0
I NORA4B11 183 1 3440 410 0 "[la]nr02d1:portable" "" 5 * * 0
P 3430 520 S
P 3430 430 S
P 3290 420 S
P 3290 510 S
P 3370 410 S
P 3560 420 S
P 3370 500 S
P 3560 510 S
I NORA4B12 199 1 3710 410 0 "[la]nr02d1:portable" "" 5 * * 0
P 3970 520 S
P 3970 430 S
P 3700 520 S
P 3700 430 S
P 3910 500 S
P 3910 410 S
P 3830 510 S
P 3640 500 S
P 3830 420 S
P 3640 410 S
P 3430 610 S
I NORA6B11 185 1 3440 590 0 "[la]nr02d1:portable" "" 5 * * 0
P 3290 600 S
P 3370 590 S
P 3560 600 S
I NORA6B12 201 1 3710 590 0 "[la]nr02d1:portable" "" 5 * * 0
P 3640 590 S
P 3830 600 S
P 3910 590 S
P 3970 610 S
P 3700 610 S
```

```
I NORA4B14 231 1 4250 410 0 "[la]nr02d1:portable" "" 5 * * 0
I NORA5B14 232 1 4250 500 0 "[la]nr02d1:portable" "" 5 * * 0
I NORA6B14 233 1 4250 590 0 "[la]nr02d1:portable" "" 5 * * 0
I NORA5B15 248 1 4520 500 0 "[la]nr02d1:portable" "" 5 * * 0
P 4240 520 S
P 4240 430 S
P 4100 420 S
P 4100 510 S
P 4180 410 S
P 4180 500 S
P 4720 450 S
I NORA4B15 247 1 4520 410 0 "[la]nr02d1:portable" "" 5 * * 0
P 4510 520 S
P 4510 430 S
P 4640 510 S
P 4450 500 S
P 4640 420 S
P 4450 410 S
P 4370 510 S
P 4370 420 S
P 4720 410 S
P 4240 610 S
P 4180 590 S
P 4100 600 S
P 4640 600 S
P 4510 610 S
P 4450 590 S
P 4720 570 S
P 4720 530 S
I NORA6B15 249 1 4520 590 0 "[la]nr02d1:portable" "" 5 * * 0
P 4370 600 S
I NORA10B6 109 1 2090 950 0 "[la]nr02d1:portable" "" 5 * * 0
I NORA10B7 125 1 2360 950 0 "[la]nr02d1:portable" "" 5 * * 0
I NORA10B9 157 1 2900 950 0 "[la]nr02d1:portable" "" 5 * * 0
I NORA10B8 141 1 2630 950 0 "[la]nr02d1:portable" "" 5 * * 0
I NORA9B6 108 1 2090 860 0 "[la]nr02d1:portable" "" 5 * * 0
I NORA8B6 107 1 2090 770 0 "[la]nr02d1:portable" "" 5 * * 0
P 1940 690 S
P 2020 680 S
P 2080 790 S
P 2080 700 S
P 1940 780 S
P 2020 770 S
P 2290 770 S
P 2210 780 S
I NORA8B7 123 1 2360 770 0 "[la]nr02d1:portable" "" 5 * * 0
P 2210 690 S
P 2290 680 S
```

```
P 2480 690 S
P 2350 790 S
P 2350 700 S
P 2480 780 S
P 1940 960 S
P 1940 870 S
P 2080 970 S
P 2080 880 S
P 2020 950 S
P 2020 860 S
I NORA9B7 124 1 2360 860 0 "[la]nr02d1:portable" "" 5 * * 0
P 2210 870 S
P 2210 960 S
P 2290 860 S
P 2480 870 S
P 2290 950 S
P 2480 960 S
P 2350 880 S
P 2350 970 S
I NORA8B9 155 1 2900 770 0 "[la]nr02d1:portable" "" 5 * * 0
I NORA9B9 156 1 2900 860 0 "[la]nr02d1:portable" "" 5 * * 0
P 2560 680 S
P 2750 690 S
P 2830 680 S
P 2890 790 S
P 2890 700 S
P 2620 790 S
P 2620 700 S
P 2830 770 S
I NORA8B8 139 1 2630 770 0 "[la]nr02d1:portable" "" 5 * * 0
P 2560 770 S
P 2750 780 S
P 3100 680 S
P 3020 690 S
P 3160 790 S
P 3020 780 S
P 3100 770 S
P 3160 700 S
I NORA9B8 140 1 2630 860 0 "[la]nr02d1:portable" "" 5 * * 0
P 2560 950 S
P 2750 870 S
P 2560 860 S
P 2750 960 S
P 2890 970 S
P 2890 880 S
P 2620 970 S
P 2620 880 S
P 2830 950 S
```

```
P 2830 860 S
P 3020 870 S
P 3020 960 S
P 3100 860 S
P 3100 950 S
P 3160 880 S
P 3160 970 S
I NORA13B6 112 1 2090 1220 0 "[la]nr02d1:portable" "" 5 * * 0
I NORA12B6 111 1 2090 1130 0 "[la]nr02d1:portable" "" 5 * * 0
I NORA11B6 110 1 2090 1040 0 "[la]nr02d1:portable" "" 5 * * 0
I NORA12B7 127 1 2360 1130 0 "[la]nr02d1:portable" "" 5 * * 0
P 2020 1130 S
P 2290 1130 S
P 2080 1060 S
P 1940 1050 S
P 2020 1040 S
P 2350 1060 S
P 2480 1050 S
P 2290 1040 S
I NORA11B7 126 1 2360 1040 0 "[la]nr02d1:portable" "" 5 * * 0
P 2210 1050 S
P 1940 1140 S
P 2080 1240 S
P 2080 1150 S
P 2020 1220 S
P 1940 1230 S
I NORA13B7 128 1 2360 1220 0 "[la]nr02d1:portable" "" 5 * * 0
P 2210 1140 S
P 2350 1240 S
P 2350 1150 S
P 2480 1230 S
P 2290 1220 S
P 2210 1230 S
P 2480 1140 S
I NORA11B9 158 1 2900 1040 0 "[la]nr02d1:portable" "" 5 * * 0
I NORA12B9 159 1 2900 1130 0 "[la]nr02d1:portable" "" 5 * * 0
I NORA13B9 160 1 2900 1220 0 "[la]nr02d1:portable" "" 5 * * 0
I NORA12B8 143 1 2630 1130 0 "[la]nr02d1:portable" "" 5 * * 0
P 2830 1130 S
P 2560 1130 S
P 3100 1130 S
P 2890 1060 S
P 2620 1060 S
P 2830 1040 S
I NORA11B8 142 1 2630 1040 0 "[la]nr02d1:portable" "" 5 * * 0
P 2560 1040 S
P 2750 1050 S
P 3160 1060 S
```

```
P 3100 1040 S
P 3020 1050 S
P 2890 1240 S
I NORA13B8 144 1 2630 1220 0 "[la]nr02d1:portable" "" 5 * * 0
P 2830 1220 S
P 2620 1150 S
P 2620 1240 S
P 2890 1150 S
P 2750 1140 S
P 2750 1230 S
P 2560 1220 S
P 3020 1140 S
P 3020 1230 S
P 3100 1220 S
P 3160 1150 S
P 3160 1240 S
I NORA8B13 219 1 3980 770 0 "[la]nr02d1:portable" "" 5 * * 0
I NORA13B13 224 1 3980 1220 0 "[la]nr02d1:portable" "" 5 * * 0
I NORA12B13 223 1 3980 1130 0 "[la]nr02d1:portable" "" 5 * * 0
I NORA11B13 222 1 3980 1040 0 "[la]nr02d1:portable" "" 5 * * 0
I NORA10B13 221 1 3980 950 0 "[la]nr02d1:portable" "" 5 * * 0
I NORA9B13 220 1 3980 860 0 "[la]nr02d1:portable" "" 5 * * 0
I NORA10B11 189 1 3440 950 0 "[la]nr02d1:portable" "" 5 * * 0
I NORA10B12 205 1 3710 950 0 "[la]nr02d1:portable" "" 5 * * 0
I NORA10B15 253 1 4520 950 0 "[la]nr02d1:portable" "" 5 * * 0
I NORA10B14 237 1 4250 950 0 "[la]nr02d1:portable" "" 5 * * 0
P 3370 680 S
P 3290 690 S
P 3560 690 S
P 3560 780 S
P 3370 770 S
P 3290 780 S
I NORA8B11 187 1 3440 770 0 "[la]nr02d1:portable" "" 5 * * 0
P 3430 700 S
P 3430 790 S
P 3910 680 S
P 3830 690 S
P 3640 680 S
P 3700 790 S
P 3970 700 S
P 3970 790 S
P 3700 700 S
P 3910 770 S
P 3830 780 S
I NORA8B12 203 1 3710 770 0 "[la]nr02d1:portable" "" 5 * * 0
P 3640 770 S
P 3430 970 S
I NORA9B11 188 1 3440 860 0 "[la]nr02d1:portable" "" 5 * * 0
```

P 3430 880 S
P 3290 870 S
P 3290 960 S
P 3370 860 S
P 3560 960 S
P 3370 950 S
P 3560 870 S
I NORA9B12 204 1 3710 860 0 "[la]nr02d1:portable" "" 5 * * 0
P 3640 860 S
P 3830 870 S
P 3640 950 S
P 3970 970 S
P 3970 880 S
P 3700 970 S
P 3700 880 S
P 3910 950 S
P 3910 860 S
P 3830 960 S
I NORA8B14 235 1 4250 770 0 "[la]nr02d1:portable" "" 5 * * 0
I NORA9B14 236 1 4250 860 0 "[la]nr02d1:portable" "" 5 * * 0
P 4100 690 S
P 4180 680 S
P 4240 790 S
P 4240 700 S
P 4100 780 S
P 4180 770 S
P 4720 730 S
P 4720 770 S
P 4720 690 S
P 4450 680 S
P 4640 690 S
P 4370 690 S
P 4510 790 S
P 4510 700 S
P 4640 780 S
P 4450 770 S
I NORA8B15 251 1 4520 770 0 "[la]nr02d1:portable" "" 5 * * 0
P 4370 780 S
P 4180 860 S
P 4100 960 S
P 4240 970 S
P 4240 880 S
P 4180 950 S
P 4100 870 S
I NORA9B15 252 1 4520 860 0 "[la]nr02d1:portable" "" 5 * * 0
P 4370 870 S
P 4510 970 S
P 4510 880 S

```
P 4640 960 S
P 4450 950 S
P 4640 870 S
P 4450 860 S
P 4370 960 S
P 4720 850 S
P 4720 890 S
P 4720 930 S
I NORA12B12 207 1 3710 1130 0 "[la]nr02d1:portable" "" 5 * * 0
I NORA12B11 191 1 3440 1130 0 "[la]nr02d1:portable" "" 5 * * 0
P 3370 1130 S
P 3910 1130 S
P 3640 1130 S
P 3430 1060 S
I NORA11B11 190 1 3440 1040 0 "[la]nr02d1:portable" "" 5 * * 0
P 3290 1050 S
P 3370 1040 S
P 3560 1050 S
P 3970 1060 S
P 3700 1060 S
P 3910 1040 S
I NORA11B12 206 1 3710 1040 0 "[la]nr02d1:portable" "" 5 * * 0
P 3640 1040 S
P 3830 1050 S
P 3290 1140 S
P 3560 1140 S
P 3430 1240 S
P 3430 1150 S
I NORA13B11 192 1 3440 1220 0 "[la]nr02d1:portable" "" 5 * * 0
P 3290 1230 S
P 3370 1220 S
P 3560 1230 S
P 3830 1140 S
I NORA13B12 208 1 3710 1220 0 "[la]nr02d1:portable" "" 5 * * 0
P 3970 1240 S
P 3970 1150 S
P 3700 1240 S
P 3640 1220 S
P 3830 1230 S
P 3910 1220 S
P 3700 1150 S
I NORA11B14 238 1 4250 1040 0 "[la]nr02d1:portable" "" 5 * * 0
I NORA12B14 239 1 4250 1130 0 "[la]nr02d1:portable" "" 5 * * 0
I NORA13B14 240 1 4250 1220 0 "[la]nr02d1:portable" "" 5 * * 0
I NORA12B15 255 1 4520 1130 0 "[la]nr02d1:portable" "" 5 * * 0
P 4180 1130 S
P 4450 1130 S
P 4240 1060 S
```

```
P 4100 1050 S
P 4180 1040 S
P 4720 1090 S
P 4720 1050 S
P 4510 1060 S
P 4640 1050 S
P 4450 1040 S
I NORA11B15 254 1 4520 1040 0 "[la]nr02d1:portable" "" 5 * * 0
P 4370 1050 S
P 4720 1010 S
P 4100 1140 S
P 4240 1240 S
P 4240 1150 S
P 4100 1230 S
P 4180 1220 S
I NORA13B15 256 1 4520 1220 0 "[la]nr02d1:portable" "" 5 * * 0
P 4370 1230 S
P 4720 1210 S
P 4720 1170 S
P 4720 1250 S
P 4640 1140 S
P 4370 1140 S
P 4510 1240 S
P 4510 1150 S
P 4640 1230 S
P 4450 1220 S
I ADD333 348 1 6520 50 0 "[la]ad01d1:portable" "" 5 C * 0
I ADD317 332 1 6240 50 0 "[la]ad01d1:portable" "" 5 C * 0
I ADD31 316 1 5960 50 0 "[la]ad01d1:portable" "" 5 C * 0
I ADD233 304 1 5660 50 0 "[la]ad01d1:portable" "" 5 C * 0
I ADD217 288 1 5380 50 0 "[la]ad01d1:portable" "" 5 C * 0
I ADD21 272 1 5100 50 0 "[la]ad01d1:portable" "" 5 C * 0
I ADD11 259 1 4800 50 0 "[la]ad01d1:portable" "" 5 C * 0
I ADD349 364 1 6800 50 0 "[la]ad01d1:portable" "" 5 C * 0
I ADD417 386 1 7380 50 0 "[la]ad01d1:portable" "" 5 C * 0
I ADD433 402 1 7660 50 0 "[la]ad01d1:portable" "" 5 C * 0
I ADD51 416 1 7960 50 0 "[la]ad01d1:portable" "" 5 C * 0
I ADD517 432 1 8240 50 0 "[la]ad01d1:portable" "" 5 C * 0
I ADD61 442 1 8540 50 0 "[la]ad01d1:portable" "" 5 C * 0
I ADD617 458 1 8820 50 0 "[la]ad01d1:portable" "" 5 C * 0
I ADD41 370 1 7100 50 0 "[la]ad01d1:portable" "" 5 C * 0
P 4940 50 S
P 5020 50 S
P 5240 50 S
P 5320 50 S
P 5880 50 S
P 5800 50 S
P 5600 50 S
```

```
P 5520 50 S
P 6100 50 S
P 6460 50 S
P 6380 50 S
P 6180 50 S
P 6660 50 S
P 6740 50 S
P 7600 50 S
P 7520 50 S
P 6940 50 S
P 7020 50 S
P 7240 50 S
P 7320 50 S
P 7800 50 S
P 7880 50 S
P 8100 50 S
P 8180 50 S
P 8960 50 S
P 8380 50 S
P 8460 50 S
P 8680 50 S
P 8760 50 S
I ADD218 289 1 5380 210 0 "[la]ad01d1:portable" "" 5 C * 0
I ADD219 290 1 5380 370 0 "[la]ad01d1:portable" "" 5 C * 0
I ADD220 291 1 5380 530 0 "[la]ad01d1:portable" "" 5 C * 0
I ADD13 261 1 4800 370 0 "[la]ad01d1:portable" "" 5 C * 0
I ADD23 274 1 5100 370 0 "[la]ad01d1:portable" "" 5 C * 0
I ADD33 318 1 5960 370 0 "[la]ad01d1:portable" "" 5 C * 0
I ADD235 306 1 5660 370 0 "[la]ad01d1:portable" "" 5 C * 0
I ADD22 273 1 5100 210 0 "[la]ad01d1:portable" "" 5 C * 0
I VS3 476 1 5080 130 0 "[la]VSS" "" 5 * * 0
I VS4 477 1 5080 290 0 "[la]VSS" "" 5 * * 0
I ADD12 260 1 4800 210 0 "[la]ad01d1:portable" "" 5 C * 0
P 5020 90 S
P 5020 210 S
I VS0 473 1 4780 130 0 "[la]VSS" "" 5 * * 0
P 4940 130 S
P 4940 210 S
P 5320 90 S
P 5320 210 S
P 5320 130 S
P 5240 210 S
P 5240 130 S
P 5020 370 S
P 5020 250 S
P 4940 370 S
I VS1 474 1 4780 290 0 "[la]VSS" "" 5 * * 0
P 4940 290 S
```

P 5240 290 S
P 5320 370 S
P 5320 290 S
P 5320 250 S
P 5240 370 S
I ADD234 305 1 5660 210 0 "[la]ad01d1:portable" "" 5 C * 0
I ADD32 317 1 5960 210 0 "[la]ad01d1:portable" "" 5 C * 0
P 5600 90 S
P 5520 130 S
P 5520 210 S
P 5600 130 S
P 5600 210 S
P 5800 210 S
P 5800 130 S
P 5880 90 S
P 6100 210 S
P 5880 210 S
P 6100 130 S
I VS7 480 1 5940 130 0 "[la]VSS" "" 5 * * 0
P 5800 290 S
P 5800 370 S
P 5600 370 S
P 5520 290 S
P 5520 370 S
P 5600 250 S
P 5600 290 S
I VS8 481 1 5940 290 0 "[la]VSS" "" 5 * * 0
P 6100 290 S
P 5880 250 S
P 6100 370 S
P 5880 370 S
I ADD24 275 1 5100 530 0 "[la]ad01d1:portable" "" 5 C * 0
I VS5 478 1 5080 610 0 "[la]VSS" "" 5 * * 0
I ADD14 262 1 4800 530 0 "[la]ad01d1:portable" "" 5 C * 0
P 5020 450 S
P 5020 410 S
P 4940 450 S
P 5320 450 S
P 5320 410 S
P 5240 450 S
P 5020 530 S
P 4940 530 S
P 5020 570 S
P 4940 610 S
I VS2 475 1 4780 610 0 "[la]VSS" "" 5 * * 0
P 5320 530 S
P 5240 530 S
P 5240 610 S

```
P 5320 570 S
P 5320 610 S
I ADD236 307 1 5660 530 0 "[la]ad01d1:portable" "" 5 C * 0
I ADD34 319 1 5960 530 0 "[la]ad01d1:portable" "" 5 C * 0
P 5520 450 S
P 5600 410 S
P 5600 450 S
P 5800 450 S
P 6100 450 S
P 5880 450 S
P 5880 410 S
P 5520 530 S
P 5600 530 S
P 5800 530 S
P 5600 610 S
P 5600 570 S
P 5520 610 S
P 5800 610 S
P 6100 530 S
P 5880 530 S
P 6100 610 S
I VS9 482 1 5940 610 0 "[la]VSS" "" 5 * * 0
P 5880 570 S
I ADD419 388 1 7380 370 0 "[la]ad01d1:portable" "" 5 C * 0
I ADD43 372 1 7100 370 0 "[la]ad01d1:portable" "" 5 C * 0
I ADD319 334 1 6240 370 0 "[la]ad01d1:portable" "" 5 C * 0
I ADD351 366 1 6800 370 0 "[la]ad01d1:portable" "" 5 C * 0
I ADD335 350 1 6520 370 0 "[la]ad01d1:portable" "" 5 C * 0
I ADD334 349 1 6520 210 0 "[la]ad01d1:portable" "" 5 C * 0
I ADD350 365 1 6800 210 0 "[la]ad01d1:portable" "" 5 C * 0
I ADD318 333 1 6240 210 0 "[la]ad01d1:portable" "" 5 C * 0
P 6180 90 S
P 6460 90 S
P 6460 210 S
P 6460 130 S
P 6180 130 S
P 6380 130 S
P 6180 210 S
P 6380 210 S
P 6740 90 S
P 6740 210 S
P 6740 130 S
P 6660 210 S
P 6660 130 S
P 6460 250 S
P 6460 290 S
P 6460 370 S
P 6380 370 S
```

P 6180 250 S
P 6180 370 S
P 6380 290 S
P 6180 290 S
P 6740 370 S
P 6740 290 S
P 6740 250 S
P 6660 370 S
P 6660 290 S
I ADD42 371 1 7100 210 0 "[la]ad01d1:portable" "" 5 C * 0
I ADD418 387 1 7380 210 0 "[la]ad01d1:portable" "" 5 C * 0
P 7020 90 S
P 6940 130 S
P 6940 210 S
I VS10 483 1 7080 130 0 "[la]VSS" "" 5 * * 0
P 7020 210 S
P 7240 210 S
P 7240 130 S
P 7600 90 S
P 7320 90 S
P 7600 210 S
P 7600 130 S
P 7520 210 S
P 7320 210 S
P 7520 130 S
P 7320 130 S
P 7020 370 S
I VS11 484 1 7080 290 0 "[la]VSS" "" 5 * * 0
P 6940 290 S
P 6940 370 S
P 7020 250 S
P 7240 290 S
P 7240 370 S
P 7600 370 S
P 7320 290 S
P 7320 250 S
P 7600 290 S
P 7600 250 S
P 7520 290 S
P 7320 370 S
P 7520 370 S
I ADD336 351 1 6520 530 0 "[la]ad01d1:portable" "" 5 C * 0
I ADD352 367 1 6800 530 0 "[la]ad01d1:portable" "" 5 C * 0
I ADD320 335 1 6240 530 0 "[la]ad01d1:portable" "" 5 C * 0
P 6460 450 S
P 6460 410 S
P 6180 410 S
P 6180 450 S

```
P 6380 450 S
P 6740 450 S
P 6740 410 S
P 6660 450 S
P 6460 530 S
P 6180 530 S
P 6380 530 S
P 6460 610 S
P 6460 570 S
P 6380 610 S
P 6180 570 S
P 6180 610 S
P 6740 530 S
P 6660 530 S
P 6660 610 S
P 6740 570 S
P 6740 610 S
I ADD44 373 1 7100 530 0 "[la]ad01d1:portable" "" 5 C * 0
I ADD420 389 1 7380 530 0 "[la]ad01d1:portable" "" 5 C * 0
P 6940 450 S
P 7020 410 S
P 7020 450 S
P 7240 450 S
P 7600 450 S
P 7600 410 S
P 7520 450 S
P 7320 450 S
P 7320 410 S
P 6940 530 S
P 7020 530 S
P 7240 530 S
P 7020 610 S
P 7020 570 S
P 6940 610 S
P 7240 610 S
P 7600 530 S
P 7520 530 S
P 7320 530 S
P 7320 570 S
P 7320 610 S
P 7520 610 S
P 7600 610 S
P 7600 570 S
I ADD222 293 1 5380 850 0 "[la]ad01d1:portable" "" 5 C * 0
I ADD223 294 1 5380 1010 0 "[la]ad01d1:portable" "" 5 C * 0
I ADD221 292 1 5380 690 0 "[la]ad01d1:portable" "" 5 C * 0
I ADD224 295 1 5380 1170 0 "[la]ad01d1:portable" "" 5 C * 0
I ADD26 277 1 5100 850 0 "[la]ad01d1:portable" "" 5 C * 0
```

```
I ADD25 276 1 5100 690 0 "[la]ad01d1:portable" "" 5 C * 0
P 5020 730 S
P 5020 770 S
P 4940 770 S
I ADD15 263 1 4800 690 0 "[la]ad01d1:portable" "" 5 C * 0
P 5020 690 S
P 4940 690 S
P 5240 690 S
P 5320 690 S
P 5320 770 S
P 5320 730 S
P 5240 770 S
I ADD16 264 1 4800 850 0 "[la]ad01d1:portable" "" 5 C * 0
P 5020 930 S
P 5020 890 S
P 5020 850 S
P 4940 850 S
P 4940 930 S
P 5240 930 S
P 5240 850 S
P 5320 930 S
P 5320 890 S
P 5320 850 S
P 5800 690 S
P 5520 690 S
P 5600 690 S
I ADD237 308 1 5660 690 0 "[la]ad01d1:portable" "" 5 C * 0
P 5520 770 S
P 5600 730 S
P 5600 770 S
P 5800 770 S
P 5880 690 S
P 6100 690 S
I ADD35 320 1 5960 690 0 "[la]ad01d1:portable" "" 5 C * 0
P 6100 770 S
P 5880 770 S
P 5880 730 S
P 5800 850 S
P 5800 930 S
I ADD238 309 1 5660 850 0 "[la]ad01d1:portable" "" 5 C * 0
P 5520 850 S
P 5520 930 S
P 5600 850 S
P 5600 890 S
P 5600 930 S
P 5880 890 S
P 5880 930 S
P 6100 850 S
```

```
P 5880 850 S
I ADD36 321 1 5960 850 0 "[la]ad01d1:portable" "" 5 C * 0
P 6100 930 S
I VS6 479 1 5080 1090 0 "[la]VSS" "" 5 * * 0
I ADD27 278 1 5100 1010 0 "[la]ad01d1:portable" "" 5 C * 0
I ADD28 279 1 5100 1170 0 "[la]ad01d1:portable" "" 5 C * 0
P 5020 1050 S
P 5020 1010 S
I ADD17 265 1 4800 1010 0 "[la]ad01d1:portable" "" 5 C * 0
P 4940 1010 S
P 4940 1090 S
P 5320 1090 S
P 5320 1050 S
P 5320 1010 S
P 5240 1090 S
P 5240 1010 S
P 5020 1250 S
P 5020 1210 S
P 5020 1170 S
P 4940 1250 S
P 4940 1170 S
I ADD18 266 1 4800 1170 0 "[la]ad01d1:portable" "" 5 C * 0
P 5320 1250 S
P 5240 1250 S
P 5320 1170 S
P 5320 1210 S
P 5240 1170 S
I ADD239 310 1 5660 1010 0 "[la]ad01d1:portable" "" 5 C * 0
P 5520 1010 S
P 5520 1090 S
P 5600 1010 S
P 5600 1050 S
P 5600 1090 S
P 5800 1090 S
P 5800 1010 S
P 6100 1090 S
P 6100 1010 S
P 5880 1090 S
P 5880 1050 S
P 5880 1010 S
I ADD37 322 1 5960 1010 0 "[la]ad01d1:portable" "" 5 C * 0
P 5800 1170 S
P 5800 1250 S
P 5600 1250 S
P 5600 1210 S
P 5600 1170 S
I ADD240 311 1 5660 1170 0 "[la]ad01d1:portable" "" 5 C * 0
P 5520 1170 S
```

P 5520 1250 S
P 5880 1210 S
P 5880 1250 S
P 6100 1170 S
P 5880 1170 S
I ADD38 323 1 5960 1170 0 "[la]ad01d1:portable" "" 5 C * 0
P 6100 1250 S
I ADD338 353 1 6520 850 0 "[la]ad01d1:portable" "" 5 C * 0
I ADD337 352 1 6520 690 0 "[la]ad01d1:portable" "" 5 C * 0
P 6460 770 S
P 6180 730 S
P 6180 770 S
P 6380 770 S
P 6460 730 S
I ADD321 336 1 6240 690 0 "[la]ad01d1:portable" "" 5 C * 0
P 6460 690 S
P 6380 690 S
P 6180 690 S
P 6740 770 S
P 6740 730 S
P 6660 770 S
I ADD353 368 1 6800 690 0 "[la]ad01d1:portable" "" 5 C * 0
P 6660 690 S
P 6740 690 S
I ADD322 337 1 6240 850 0 "[la]ad01d1:portable" "" 5 C * 0
P 6380 930 S
P 6380 850 S
P 6180 930 S
P 6180 890 S
P 6180 850 S
P 6460 850 S
P 6460 890 S
P 6460 930 S
I ADD354 369 1 6800 850 0 "[la]ad01d1:portable" "" 5 C * 0
P 6740 930 S
P 6740 890 S
P 6740 850 S
P 6660 930 S
P 6660 850 S
P 7240 690 S
P 6940 690 S
P 7020 690 S
I ADD45 374 1 7100 690 0 "[la]ad01d1:portable" "" 5 C * 0
P 6940 770 S
P 7020 730 S
P 7020 770 S
P 7240 770 S
P 7600 690 S P 7520 690 S
P 7320 690 S
I ADD421 390 1 7380 690 0 "[la]ad01d1:portable" "" 5 C * 0
P 7600 770 S
P 7600 730 S
P 7520 770 S
P 7320 770 S
P 7320 730 S
P 7240 850 S
P 7240 930 S
I ADD46 375 1 7100 850 0 "[la]ad01d1:portable" "" 5 C * 0
P 6940 850 S
P 6940 930 S
P 7020 850 S
P 7020 890 S
P 7020 930 S
P 7520 850 S
P 7520 930 S
P 7600 850 S
P 7600 890 S
P 7600 930 S
P 7320 850 S
P 7320 890 S
P 7320 930 S
I ADD422 391 1 7380 850 0 "[la]ad01d1:portable" "" 5 C * 0
I ADD340 355 1 6520 1170 0 "[la]ad01d1:portable" "" 5 C * 0
I ADD339 354 1 6520 1010 0 "[la]ad01d1:portable" "" 5 C * 0
P 6460 1090 S
P 6460 1050 S
P 6460 1010 S
I ADD323 338 1 6240 1010 0 "[la]ad01d1:portable" "" 5 C * 0
P 6180 1010 S
P 6180 1050 S
P 6180 1090 S
P 6380 1010 S
P 6380 1090 S
P 6660 1090 S
P 6660 1010 S
P 6460 1250 S
P 6460 1210 S
P 6460 1170 S
P 6380 1250 S
I ADD324 339 1 6240 1170 0 "[la]ad01d1:portable" "" 5 C * 0
P 6180 1170 S
P 6180 1210 S
P 6180 1250 S
P 6380 1170 S
P 6660 1250 S

```
P 6660 1170 S
I ADD47 376 1 7100 1010 0 "[la]ad01d1:portable" "" 5 C * 0
P 7020 1010 S
P 7020 1050 S
P 7020 1090 S
P 7240 1010 S
P 7240 1090 S
P 7600 1090 S
P 7600 1050 S
P 7600 1010 S
P 7520 1090 S
P 7520 1010 S
P 7320 1090 S
P 7320 1050 S
P 7320 1010 S
I ADD423 392 1 7380 1010 0 "[la]ad01d1:portable" "" 5 C * 0
I ADD48 377 1 7100 1170 0 "[la]ad01d1:portable" "" 5 C * 0
P 7020 1170 S
P 7020 1210 S
P 7020 1250 S
P 7240 1170 S
P 7240 1250 S
P 7320 1170 S
I ADD424 393 1 7380 1170 0 "[la]ad01d1:portable" "" 5 C * 0
P 7600 1250 S
P 7600 1210 S
P 7600 1170 S
P 7520 1250 S
P 7520 1170 S
P 7320 1250 S
P 7320 1210 S
I ADD519 434 1 8240 370 0 "[la]ad01d1:portable" "" 5 C * 0
I ADD435 404 1 7660 370 0 "[la]ad01d1:portable" "" 5 C * 0
I ADD63 444 1 8540 370 0 "[la]ad01d1:portable" "" 5 C * 0
I ADD619 460 1 8820 370 0 "[la]ad01d1:portable" "" 5 C * 0
I ADD53 418 1 7960 370 0 "[la]ad01d1:portable" "" 5 C * 0
I ADD52 417 1 7960 210 0 "[la]ad01d1:portable" "" 5 C * 0
I ADD518 433 1 8240 210 0 "[la]ad01d1:portable" "" 5 C * 0
I ADD434 403 1 7660 210 0 "[la]ad01d1:portable" "" 5 C * 0
P 7880 90 S
P 7880 210 S
P 7800 130 S
P 7800 210 S
I VS12 485 1 7940 130 0 "[la]VSS" "" 5 * * 0
P 8180 90 S
P 8180 210 S
P 8180 130 S
P 8100 210 S
```

```
P 8100 130 S
P 7880 370 S
P 7880 290 S
P 7880 250 S
P 7800 290 S
P 7800 370 S
P 8180 370 S
P 8180 290 S
P 8180 250 S
P 8100 370 S
P 8100 290 S
I ADD62 443 1 8540 210 0 "[la]ad01d1:portable" "" 5 C * 0
I ADD618 459 1 8820 210 0 "[la]ad01d1:portable" "" 5 C * 0
P 8460 90 S
P 8380 130 S
P 8380 210 S
I VS13 486 1 8520 130 0 "[la]VSS" "" 5 * * 0
P 8680 130 S
P 8460 210 S
P 8680 210 S
P 8760 90 S
P 9040 90 S
P 9040 110 S
P 8960 210 S
P 8760 210 S
P 8960 130 S
P 8760 130 S
P 8380 290 S
P 8380 370 S
P 8460 250 S
P 8460 290 S
P 8680 290 S
P 8460 370 S
P 8680 370 S
P 8960 370 S
P 8760 370 S
P 8960 290 S
P 8760 290 S
P 8760 250 S
I ADD54 419 1 7960 530 0 "[la]ad01d1:portable" "" 5 C * 0
I ADD520 435 1 8240 530 0 "[la]ad01d1:portable" "" 5 C * 0
I ADD436 405 1 7660 530 0 "[la]ad01d1:portable" "" 5 C * 0
P 7880 450 S
P 7800 450 S
P 7880 410 S
P 8180 450 S
P 8180 410 S
P 8100 450 S
```

P 7880 530 S
P 7800 530 S
P 7880 610 S
P 7880 570 S
P 7800 610 S
P 8180 530 S
P 8100 530 S
P 8100 610 S
P 8180 570 S
P 8180 610 S
I ADD64 445 1 8540 530 0 "[la]ad01d1:portable" "" 5 C * 0
I ADD620 461 1 8820 530 0 "[la]ad01d1:portable" "" 5 C * 0
P 8380 450 S
P 8460 410 S
P 8460 450 S
P 8680 450 S
P 8960 450 S
P 8760 450 S
P 8760 410 S
P 8380 530 S
P 8460 530 S
P 8680 530 S
P 8380 610 S
P 8460 570 S
P 8460 610 S
P 8680 610 S
P 8960 530 S
P 8760 530 S
P 8960 610 S
P 8760 610 S
P 8760 570 S
I ALIAS 472 1 9150 200 0 "[la]alias" "" 5 * * 0
I VD0 488 1 9130 200 0 "[la]VDD" "" 5 * * 0
P 9210 200 S
I ADD56 421 1 7960 850 0 "[la]ad01d1:portable" "" 5 C * 0
I ADD55 420 1 7960 690 0 "[la]ad01d1:portable" "" 5 C * 0
P 7800 770 S
P 7880 730 S
P 7880 770 S
I ADD437 406 1 7660 690 0 "[la]ad01d1:portable" "" 5 C * 0
P 7880 690 S
P 7800 690 S
P 8100 770 S
P 8180 730 S
P 8180 770 S
I ADD521 436 1 8240 690 0 "[la]ad01d1:portable" "" 5 C * 0
P 8100 690 S
P 8180 690 S P 7880 850 S
P 7880 890 S
P 7880 930 S
I ADD438 407 1 7660 850 0 "[la]ad01d1:portable" "" 5 C * 0
P 7800 850 S
P 7800 930 S
I ADD522 437 1 8240 850 0 "[la]ad01d1:portable" "" 5 C * 0
P 8180 930 S
P 8180 890 S
P 8180 850 S
P 8100 930 S
P 8100 850 S
P 8380 690 S
P 8460 690 S
P 8680 690 S
I ADD65 446 1 8540 690 0 "[la]ad01d1:portable" "" 5 C * 0
P 8380 770 S
P 8460 730 S
P 8460 770 S
P 8680 770 S
P 8760 690 S
P 8960 690 S
I ADD621 462 1 8820 690 0 "[la]ad01d1:portable" "" 5 C * 0
P 8960 770 S
P 8760 730 S
P 8760 770 S
I ADD66 447 1 8540 850 0 "[la]ad01d1:portable" "" 5 C * 0
P 8380 850 S
P 8380 930 S
P 8460 850 S
P 8460 890 S
P 8460 930 S
P 8680 850 S
P 8680 930 S
I ADD622 463 1 8820 850 0 "[la]ad01d1:portable" "" 5 C * 0
P 8960 930 S
P 8960 850 S
P 8760 930 S
P 8760 890 S
P 8760 850 S
I ADD58 423 1 7960 1170 0 "[la]ad01d1:portable" "" 5 C * 0
I ADD57 422 1 7960 1010 0 "[la]ad01d1:portable" "" 5 C * 0
P 7880 1090 S
P 7880 1050 S
P 7880 1010 S
I ADD439 408 1 7660 1010 0 "[la]ad01d1:portable" "" 5 C * 0
P 7800 1010 S
P 7800 1090 S

```
I ADD523 438 1 8240 1010 0 "[la]ad01d1:portable" "" 5 C * 0
P 8180 1090 S
P 8180 1050 S
P 8180 1010 S
P 8100 1090 S
P 8100 1010 S
P 7800 1170 S
I ADD440 409 1 7660 1170 0 "[la]ad01d1:portable" "" 5 C * 0
P 7880 1250 S
P 7880 1210 S
P 7880 1170 S
P 7800 1250 S
I ADD524 439 1 8240 1170 0 "[la]ad01d1:portable" "" 5 C * 0
P 8100 1170 S
P 8180 1250 S
P 8180 1210 S
P 8180 1170 S
P 8100 1250 S
I ADD67 448 1 8540 1010 0 "[la]ad01d1:portable" "" 5 C * 0
P 8380 1010 S
P 8380 1090 S
P 8460 1010 S
P 8460 1050 S
P 8460 1090 S
P 8680 1010 S
P 8680 1090 S
P 8960 1090 S
P 8960 1010 S
P 8760 1090 S
P 8760 1050 S
P 8760 1010 S
I ADD623 464 1 8820 1010 0 "[la]ad01d1:portable" "" 5 C * 0
P 8680 1250 S
P 8680 1170 S
P 8460 1250 S
I ADD68 449 1 8540 1170 0 "[la]ad01d1:portable" "" 5 C * 0
P 8380 1170 S
P 8380 1250 S
P 8460 1170 S
P 8460 1210 S
P 8960 1250 S
P 8960 1170 S
P 8760 1250 S
P 8760 1210 S
P 8760 1170 S
I ADD624 465 1 8820 1170 0 "[la]ad01d1:portable" "" 5 C * 0
I NORA15B5 98 1 1820 1400 0 "[la]nr02d1:portable" "" 5 * * 0
I NORA15B2 50 1 1010 1400 0 "[la]nr02d1:portable" "" 5 * * 0
```

```
I NORA15B0 18 1 470 1400 0 "[la]nr02d1:portable" "" 5 * * 0
I NORA15B1 34 1 740 1400 0 "[la]nr02d1:portable" "" 5 * * 0
P 460 1330 S
P 400 1310 S
P 590 1320 S
P 400 1400 S
P 400 1420 S
P 590 1410 S
P 670 1310 S
P 670 1400 S
P 670 1420 S
P 1000 1330 S
P 730 1330 S
P 940 1420 S
P 940 1400 S
P 940 1310 S
P 860 1320 S
P 860 1410 S
I NORA15B3 66 1 1280 1400 0 "[la]nr02d1:portable" "" 5 * * 0
I NORA15B4 82 1 1550 1400 0 "[la]nr02d1:portable" "" 5 * * 0
P 1270 1330 S
P 1130 1320 S
P 1130 1410 S
P 1210 1310 S
P 1400 1320 S
P 1210 1400 S
P 1210 1420 S
P 1400 1410 S
P 1540 1330 S
P 1750 1420 S
P 1480 1310 S
P 1670 1320 S
P 1480 1400 S
P 1480 1420 S
P 1670 1410 S
P 1750 1310 S
P 1750 1400 S
P 1810 1330 S
I NORA15B10 178 1 3170 1400 0 "[la]nr02d1:portable" "" 5 * * 0
I NORA15B6 114 1 2090 1400 0 "[la]nr02d1:portable" "" 5 * * 0
I NORA15B7 130 1 2360 1400 0 "[la]nr02d1:portable" "" 5 * * 0
P 1940 1410 S
P 2020 1310 S
P 2080 1330 S
P 2020 1400 S
P 2020 1420 S
P 1940 1320 S
P 2290 1400 S
```

```
P 2480 1320 S
P 2290 1310 S
P 2210 1410 S
P 2210 1320 S
P 2290 1420 S
P 2480 1410 S
P 2350 1330 S
I NORA15B9 162 1 2900 1400 0 "[la]nr02d1:portable" "" 5 * * 0
I NORA15B8 146 1 2630 1400 0 "[la]nr02d1:portable" "" 5 * * 0
P 2890 1330 S
P 2620 1330 S
P 2560 1310 S
P 2750 1320 S
P 2560 1400 S
P 2560 1420 S
P 2750 1410 S
P 2830 1310 S
P 2830 1400 S
P 2830 1420 S
P 3160 1330 S
P 3100 1420 S
P 3100 1400 S
P 3100 1310 S
P 3020 1320 S
P 3020 1410 S
I NORA15B13 226 1 3980 1400 0 "[la]nr02d1:portable" "" 5 * * 0
I NORA15B11 194 1 3440 1400 0 "[la]nr02d1:portable" "" 5 * * 0
I NORA15B12 210 1 3710 1400 0 "[la]nr02d1:portable" "" 5 * * 0
P 3560 1410 S
P 3290 1320 S
P 3290 1410 S
P 3370 1310 S
P 3560 1320 S
P 3370 1400 S
P 3370 1420 S
P 3430 1330 S
P 3910 1400 S
P 3910 1310 S
P 3830 1410 S
P 3640 1420 S
P 3640 1400 S
P 3830 1320 S
P 3640 1310 S
P 3910 1420 S
P 3700 1330 S
P 3970 1330 S
I NORA15B14 242 1 4250 1400 0 "[la]nr02d1:portable" "" 5 * * 0
I NORA15B15 258 1 4520 1400 0 "[la]nr02d1:portable" "" 5 * * 0
```

```
P 4240 1330 S
P 4100 1320 S
P 4100 1410 S
P 4180 1310 S
P 4180 1400 S
P 4180 1420 S
P 4510 1420 S
P 4510 1330 S
P 4370 1320 S
P 4370 1410 S
P 4450 1310 S
P 4640 1320 S
P 4450 1400 S
P 4640 1410 S
P 4720 1410 S
P 4720 1370 S
P 4720 1330 S
P 4720 1570 S
P 4720 1490 S
P 4720 1530 S
P 4720 1650 S
P 4720 1690 S
P 4720 1730 S
P 4720 1810 S
P 4720 1850 S
P 4720 1890 S
P 4720 1970 S
P 4720 2010 S
P 4720 2050 S
I ADD316 331 1 5960 2450 0 "[la]ad01d1:portable" "" 5 C * 0
I ADD232 303 1 5380 2450 0 "[la]ad01d1:portable" "" 5 C * 0
I ADD216 287 1 5100 2450 0 "[la]ad01d1:portable" "" 5 C * 0
I ADD616 457 1 8540 2450 0 "[la]ad01d1:portable" "" 5 C * 0
I ADD516 431 1 7960 2450 0 "[la]ad01d1:portable" "" 5 C * 0
I ADD432 401 1 7380 2450 0 "[la]ad01d1:portable" "" 5 C * 0
I ADD416 385 1 7100 2450 0 "[la]ad01d1:portable" "" 5 C * 0
I ADD348 363 1 6520 2450 0 "[la]ad01d1:portable" "" 5 C * 0
I ADD332 347 1 6240 2450 0 "[la]ad01d1:portable" "" 5 C * 0
I ADD228 299 1 5380 1810 0 "[la]ad01d1:portable" "" 5 C * 0
I ADD112 270 1 4800 1810 0 "[la]ad01d1:portable" "" 5 C * 0
I ADD212 283 1 5100 1810 0 "[la]ad01d1:portable" "" 5 C * 0
I ADD244 315 1 5660 1810 0 "[la]ad01d1:portable" "" 5 C * 0
I ADD312 327 1 5960 1810 0 "[la]ad01d1:portable" "" 5 C * 0
I ADD428 397 1 7380 1810 0 "[la]ad01d1:portable" "" 5 C * 0
I ADD412 381 1 7100 1810 0 "[la]ad01d1:portable" "" 5 C * 0
I ADD328 343 1 6240 1810 0 "[la]ad01d1:portable" "" 5 C * 0
I ADD344 359 1 6520 1810 0 "[la]ad01d1:portable" "" 5 C * 0
I ADD227 298 1 5380 1650 0 "[la]ad01d1:portable" "" 5 C * 0
```

```
I ADD226 297 1 5380 1490 0 "[la]ad01d1:portable" "" 5 C * 0
I ADD225 296 1 5380 1330 0 "[la]ad01d1:portable" "" 5 C * 0
I ADD210 281 1 5100 1490 0 "[la]ad01d1:portable" "" 5 C * 0
I ADD29 280 1 5100 1330 0 "[la]ad01d1:portable" "" 5 C * 0
P 5020 1410 S
P 5020 1370 S
P 5020 1330 S
I ADD19 267 1 4800 1330 0 "[la]ad01d1:portable" "" 5 C * 0
P 4940 1410 S
P 4940 1330 S
P 5320 1410 S
P 5320 1370 S
P 5320 1330 S
P 5240 1410 S
P 5240 1330 S
P 4940 1490 S
P 4940 1570 S
P 5020 1490 S
P 5020 1530 S
P 5020 1570 S
I ADD110 268 1 4800 1490 0 "[la]ad01d1:portable" "" 5 C * 0
P 5320 1490 S
P 5240 1570 S
P 5240 1490 S
P 5320 1570 S
P 5320 1530 S
I ADD241 312 1 5660 1330 0 "[la]ad01d1:portable" "" 5 C * 0
P 5520 1330 S
P 5520 1410 S
P 5600 1330 S
P 5600 1370 S
P 5600 1410 S
P 5800 1410 S
P 5800 1330 S
P 6100 1410 S
P 6100 1330 S
P 5880 1410 S
P 5880 1370 S
P 5880 1330 S
I ADD39 324 1 5960 1330 0 "[la]ad01d1:portable" "" 5 C * 0
P 5800 1490 S
P 5800 1570 S
P 5600 1570 S
P 5600 1530 S
P 5600 1490 S
I ADD242 313 1 5660 1490 0 "[la]ad01d1:portable" "" 5 C * 0
P 5520 1490 S
P 5520 1570 S
```

```
P 5880 1530 S
P 5880 1570 S
P 6100 1490 S
P 5880 1490 S
I ADD310 325 1 5960 1490 0 "[la]ad01d1:portable" "" 5 C * 0
P 6100 1570 S
I ADD211 282 1 5100 1650 0 "[la]ad01d1:portable" "" 5 C * 0
I ADD111 269 1 4800 1650 0 "[la]ad01d1:portable" "" 5 C * 0
P 5020 1730 S
P 5020 1690 S
P 5020 1650 S
P 4940 1650 S
P 4940 1730 S
P 5320 1730 S
P 5320 1690 S
P 5320 1650 S
P 5240 1730 S
P 5240 1650 S
P 5020 1850 S
P 5020 1810 S
P 4940 1810 S
P 5240 1810 S
P 5320 1850 S
P 5320 1810 S
I ADD243 314 1 5660 1650 0 "[la]ad01d1:portable" "" 5 C * 0
I ADD311 326 1 5960 1650 0 "[la]ad01d1:portable" "" 5 C * 0
P 5520 1650 S
P 5520 1730 S
P 5600 1650 S
P 5600 1690 S
P 5600 1730 S
P 5800 1730 S
P 5800 1650 S
P 6100 1730 S
P 6100 1650 S
P 5880 1730 S
P 5880 1690 S
P 5880 1650 S
P 5600 1850 S
P 5600 1810 S
P 5520 1810 S
P 5800 1810 S
P 6100 1810 S
P 5880 1850 S
P 5880 1810 S
I ADD341 356 1 6520 1330 0 "[la]ad01d1:portable" "" 5 C * 0
I ADD342 357 1 6520 1490 0 "[la]ad01d1:portable" "" 5 C * 0
P 6380 1410 S
```

```
P 6380 1330 S
P 6180 1410 S
P 6180 1370 S
P 6180 1330 S
I ADD325 340 1 6240 1330 0 "[la]ad01d1:portable" "" 5 C * 0
P 6460 1330 S
P 6460 1370 S
P 6460 1410 S
P 6660 1330 S
P 6660 1410 S
P 6380 1570 S
P 6460 1490 S
P 6460 1530 S
P 6460 1570 S
I ADD326 341 1 6240 1490 0 "[la]ad01d1:portable" "" 5 C * 0
P 6180 1490 S
P 6180 1530 S
P 6180 1570 S
P 6380 1490 S
P 6660 1570 S
P 6660 1490 S
I ADD49 378 1 7100 1330 0 "[la]ad01d1:portable" "" 5 C * 0
P 7020 1330 S
P 7020 1370 S
P 7020 1410 S
P 7240 1330 S
P 7240 1410 S
P 7600 1410 S
P 7600 1370 S
P 7600 1330 S
P 7520 1410 S
P 7520 1330 S
P 7320 1410 S
P 7320 1370 S
P 7320 1330 S
I ADD425 394 1 7380 1330 0 "[la]ad01d1:portable" "" 5 C * 0
I ADD410 379 1 7100 1490 0 "[la]ad01d1:portable" "" 5 C * 0
P 7020 1490 S
P 7020 1530 S
P 7020 1570 S
P 7240 1490 S
P 7240 1570 S
P 7320 1490 S
I ADD426 395 1 7380 1490 0 "[la]ad01d1:portable" "" 5 C * 0
P 7600 1570 S
P 7600 1530 S
P 7600 1490 S
P 7520 1570 S
```

```
P 7520 1490 S
P 7320 1570 S
P 7320 1530 S
I ADD343 358 1 6520 1650 0 "[la]ad01d1:portable" "" 5 C * 0
I ADD327 342 1 6240 1650 0 "[la]ad01d1:portable" "" 5 C * 0
P 6460 1730 S
P 6460 1690 S
P 6460 1650 S
P 6180 1650 S
P 6180 1690 S
P 6180 1730 S
P 6380 1650 S
P 6380 1730 S
P 6660 1730 S
P 6660 1650 S
P 6460 1850 S
P 6460 1810 S
P 6180 1810 S
P 6180 1850 S
P 6380 1810 S
P 6660 1810 S
I ADD411 380 1 7100 1650 0 "[la]ad01d1:portable" "" 5 C * 0
I ADD427 396 1 7380 1650 0 "[la]ad01d1:portable" "" 5 C * 0
P 7020 1650 S
P 7020 1690 S
P 7020 1730 S
P 7240 1650 S
P 7240 1730 S
P 7600 1730 S
P 7600 1690 S
P 7600 1650 S
P 7520 1730 S
P 7520 1650 S
P 7320 1730 S
P 7320 1690 S
P 7320 1650 S
P 7020 1810 S
P 7020 1850 S
P 7240 1810 S
P 7600 1850 S
P 7600 1810 S
P 7520 1810 S
P 7320 1850 S
P 7320 1810 S
I ADD229 300 1 5380 1970 0 "[la]ad01d1:portable" "" 5 C * 0
I ADD230 301 1 5380 2130 0 "[la]ad01d1:portable" "" 5 C * 0
I ADD231 302 1 5380 2290 0 "[la]ad01d1:portable" "" 5 C * 0
I ADD214 285 1 5100 2130 0 "[la]ad01d1:portable" "" 5 C * 0
```

```
I ADD314 329 1 5960 2130 0 "[la]ad01d1:portable" "" 5 C * 0
I ADD213 284 1 5100 1970 0 "[la]ad01d1:portable" "" 5 C * 0
I ADD113 271 1 4800 1970 0 "[la]ad01d1:portable" "" 5 C * 0
P 4940 1890 S
P 5020 1890 S
P 4940 1970 S
P 5020 1970 S
P 5020 2010 S
P 5240 1890 S
P 5320 1890 S
P 5320 2010 S
P 5320 1970 S
P 5240 1970 S
P 4940 2050 S
P 5020 2050 S
P 5020 2170 S
P 5020 2130 S
P 5320 2050 S
P 5240 2050 S
P 5320 2170 S
P 5320 2130 S
P 5240 2130 S
I ADD313 328 1 5960 1970 0 "[la]ad01d1:portable" "" 5 C * 0
P 5800 1890 S
P 5520 1890 S
P 5600 1890 S
P 5520 1970 S
P 5880 1890 S
P 6100 1890 S
P 5880 1970 S
P 5880 2010 S
P 6100 1970 S
P 5520 2050 S
P 5520 2130 S
P 5880 2050 S
P 6100 2050 S
P 5880 2130 S
P 5880 2170 S
P 6100 2130 S
I ADD215 286 1 5100 2290 0 "[la]ad01d1:portable" "" 5 C * 0
P 5020 2210 S
P 5020 2290 S
P 5020 2330 S
P 5320 2330 S
P 5320 2290 S
P 5240 2210 S
P 5240 2290 S
P 5320 2210 S
```

```
P 5020 2370 S
P 5020 2450 S
P 5020 2490 S
P 5320 2490 S
P 5320 2450 S
P 5320 2370 S
P 5240 2370 S
P 5240 2450 S
I ADD315 330 1 5960 2290 0 "[la]ad01d1:portable" "" 5 C * 0
P 5520 2210 S
P 5520 2290 S
P 5880 2210 S
P 6100 2210 S
P 5880 2290 S
P 5880 2330 S
P 6100 2290 S
P 5520 2370 S
P 5520 2450 S
P 6100 2450 S
P 5880 2490 S
P 5880 2370 S
P 6100 2370 S
P 5880 2450 S
I ADD346 361 1 6520 2130 0 "[la]ad01d1:portable" "" 5 C * 0
I ADD430 399 1 7380 2130 0 "[la]ad01d1:portable" "" 5 C * 0
I ADD414 383 1 7100 2130 0 "[la]ad01d1:portable" "" 5 C * 0
I ADD330 345 1 6240 2130 0 "[la]ad01d1:portable" "" 5 C * 0
I ADD345 360 1 6520 1970 0 "[la]ad01d1:portable" "" 5 C * 0
I ADD329 344 1 6240 1970 0 "[la]ad01d1:portable" "" 5 C * 0
P 6180 1890 S
P 6380 1890 S
P 6460 1890 S
P 6180 1970 S
P 6180 2010 S
P 6380 1970 S
P 6460 1970 S
P 6460 2010 S
P 6660 1890 S
P 6660 1970 S
P 6180 2050 S
P 6380 2050 S
P 6460 2050 S
P 6460 2170 S
P 6460 2130 S
P 6180 2130 S
P 6180 2170 S
P 6380 2130 S
P 6660 2050 S
```

```
P 6660 2130 S
I ADD413 382 1 7100 1970 0 "[la]ad01d1:portable" "" 5 C * 0
I ADD429 398 1 7380 1970 0 "[la]ad01d1:portable" "" 5 C * 0
P 7240 1890 S
P 7020 1890 S
P 7020 1970 S
P 7020 2010 S
P 7240 1970 S
P 7320 1890 S
P 7520 1890 S
P 7600 1890 S
P 7600 2010 S
P 7600 1970 S
P 7520 1970 S
P 7320 1970 S
P 7320 2010 S
P 7020 2050 S
P 7240 2050 S
P 7020 2130 S
P 7020 2170 S
P 7240 2130 S
P 7600 2050 S
P 7520 2050 S
P 7320 2050 S
P 7600 2170 S
P 7600 2130 S
P 7520 2130 S
P 7320 2170 S
P 7320 2130 S
I ADD347 362 1 6520 2290 0 "[la]ad01d1:portable" "" 5 C * 0
I ADD331 346 1 6240 2290 0 "[la]ad01d1:portable" "" 5 C * 0
P 6460 2330 S
P 6460 2290 S
P 6460 2210 S
P 6180 2210 S
P 6380 2210 S
P 6180 2290 S
P 6180 2330 S
P 6380 2290 S
P 6660 2290 S
P 6660 2210 S
P 6460 2490 S
P 6460 2450 S
P 6460 2370 S
P 6180 2370 S
P 6380 2370 S
P 6180 2450 S
P 6180 2490 S
```

```
P 6380 2450 S
P 6660 2450 S
P 6660 2370 S
I ADD415 384 1 7100 2290 0 "[la]ad01d1:portable" "" 5 C * 0
I ADD431 400 1 7380 2290 0 "[la]ad01d1:portable" "" 5 C * 0
P 7020 2210 S
P 7020 2290 S
P 7020 2330 S
P 7240 2210 S
P 7240 2290 S
P 7600 2210 S
P 7520 2290 S
P 7320 2330 S
P 7320 2290 S
P 7520 2210 S
P 7320 2210 S
P 7020 2370 S
P 7020 2450 S
P 7020 2490 S
P 7240 2370 S
P 7240 2450 S
P 7520 2450 S
P 7320 2490 S
P 7320 2450 S
P 7520 2370 S
P 7320 2370 S
I ADD628 469 1 8820 1810 0 "[la]ad01d1:portable" "" 5 C * 0
I ADD612 453 1 8540 1810 0 "[la]ad01d1:portable" "" 5 C * 0
I ADD444 413 1 7660 1810 0 "[la]ad01d1:portable" "" 5 C * 0
I ADD512 427 1 7960 1810 0 "[la]ad01d1:portable" "" 5 C * 0
I ADD59 424 1 7960 1330 0 "[la]ad01d1:portable" "" 5 C * 0
I ADD510 425 1 7960 1490 0 "[la]ad01d1:portable" "" 5 C * 0
P 7800 1410 S
P 7800 1330 S
I ADD441 410 1 7660 1330 0 "[la]ad01d1:portable" "" 5 C * 0
P 7880 1410 S
P 7880 1370 S
P 7880 1330 S
P 8100 1330 S
P 8100 1410 S
P 8180 1330 S
P 8180 1370 S
P 8180 1410 S
I ADD525 440 1 8240 1330 0 "[la]ad01d1:portable" "" 5 C * 0
P 7800 1490 S
I ADD442 411 1 7660 1490 0 "[la]ad01d1:portable" "" 5 C * 0
P 7880 1490 S
P 7800 1570 S
```

```
P 7880 1570 S
P 7880 1530 S
I ADD526 441 1 8240 1490 0 "[la]ad01d1:portable" "" 5 C * 0
P 8100 1490 S
P 8180 1570 S
P 8180 1530 S
P 8180 1490 S
P 8100 1570 S
I ADD69 450 1 8540 1330 0 "[la]ad01d1:portable" "" 5 C * 0
P 8380 1330 S
P 8380 1410 S
P 8460 1330 S
P 8460 1370 S
P 8460 1410 S
P 8680 1330 S
P 8680 1410 S
P 8960 1410 S
P 8960 1330 S
P 8760 1410 S
P 8760 1370 S
P 8760 1330 S
I ADD625 466 1 8820 1330 0 "[la]ad01d1:portable" "" 5 C * 0
P 8680 1570 S
P 8680 1490 S
P 8460 1570 S
I ADD610 451 1 8540 1490 0 "[la]ad01d1:portable" "" 5 C * 0
P 8380 1490 S
P 8380 1570 S
P 8460 1490 S
P 8460 1530 S
P 8960 1570 S
P 8960 1490 S
P 8760 1570 S
P 8760 1530 S
P 8760 1490 S
I ADD626 467 1 8820 1490 0 "[la]ad01d1:portable" "" 5 C * 0
I ADD511 426 1 7960 1650 0 "[la]ad01d1:portable" "" 5 C * 0
I ADD443 412 1 7660 1650 0 "[la]ad01d1:portable" "" 5 C * 0
P 7800 1650 S
P 7800 1730 S
P 7880 1650 S
P 7880 1690 S
P 7880 1730 S
P 8100 1730 S
P 8100 1650 S
P 7880 1850 S
P 7880 1810 S
P 7800 1810 S
```

P 8100 1810 S
I ADD611 452 1 8540 1650 0 "[la]ad01d1:portable" "" 5 C * 0
I ADD627 468 1 8820 1650 0 "[la]ad01d1:portable" "" 5 C * 0
P 8460 1650 S
P 8460 1690 S
P 8460 1730 S
P 8680 1650 S
P 8680 1730 S
P 8960 1730 S
P 8960 1650 S
P 8760 1730 S
P 8760 1690 S
P 8760 1650 S
P 8460 1810 S
P 8460 1850 S
P 8680 1810 S
P 8960 1810 S
P 8760 1850 S
P 8760 1810 S
I ADD446 415 1 7660 2130 0 "[la]ad01d1:portable" "" 5 C * 0
I ADD514 429 1 7960 2130 0 "[la]ad01d1:portable" "" 5 C * 0
I ADD614 455 1 8540 2130 0 "[la]ad01d1:portable" "" 5 C * 0
I ADD513 428 1 7960 1970 0 "[la]ad01d1:portable" "" 5 C * 0
I ADD445 414 1 7660 1970 0 "[la]ad01d1:portable" "" 5 C * 0
P 7800 1970 S
P 7880 1970 S
P 7880 2010 S
P 7880 1890 S
P 7800 1890 S
P 8100 1890 S
P 8100 1970 S
P 7880 2050 S
P 7800 2050 S
P 7880 2130 S
P 7800 2130 S
P 7880 2170 S
P 8100 2050 S
P 8100 2130 S
I ADD613 454 1 8540 1970 0 "[la]ad01d1:portable" "" 5 C * 0
I ADD629 470 1 8820 1970 0 "[la]ad01d1:portable" "" 5 C * 0
P 8460 1890 S
P 8680 1890 S
P 8460 1970 S
P 8460 2010 S
P 8680 1970 S
P 8760 1890 S
P 8960 1890 S
P 8760 1970 S

```
P 8760 2010 S
P 8960 1970 S
P 8460 2050 S
P 8680 2050 S
P 8460 2130 S
P 8460 2170 S
P 8680 2130 S
P 8960 2050 S
P 8760 2050 S
I ADD515 430 1 7960 2290 0 "[la]ad01d1:portable" "" 5 C * 0
P 7800 2210 S
P 7880 2210 S
P 8100 2210 S
P 7880 2290 S
P 7880 2330 S
P 7880 2370 S
P 8100 2290 S
P 8100 2370 S
P 7880 2450 S
P 7880 2490 S
P 8100 2450 S
I ADD615 456 1 8540 2290 0 "[la]ad01d1:portable" "" 5 C * 0
P 8460 2210 S
P 8680 2210 S
P 8460 2290 S
P 8460 2330 S
P 8460 2370 S
P 8680 2290 S
P 8680 2370 S
P 8460 2450 S
P 8460 2490 S
P 8680 2450 S
P 5020 2530 S
P 5240 2530 S
P 5320 2530 S
P 5520 2530 S
P 5880 2530 S
P 6100 2530 S
P 7520 2530 S
P 7320 2530 S
P 6180 2530 S
P 6380 2530 S
P 6460 2530 S
P 6660 2530 S
P 7020 2530 S
P 7240 2530 S
P 7880 2530 S
P 8100 2530 S
```

```
P 8460 2530 S
P 8680 2530 S
S 589 967 ADD11 2 "B" 1 SH
N 4725 95 "C13[0]" normal LB B
S 86 967 ADD11 1 "CI" 1 SH
N 4725 55 "C13[1]" normal LB B
S 588 1015 ADD12 1 "CI" 1 SH
N 4725 215 "C14[1]" normal LB B
S 612 1008 ADD13 1 "CI" 1 SH
N 4725 375 "C14[4]" normal LB B
S 613 1015 ADD12 2 "B" 1 SH
N 4725 255 "C14[0]" normal LB B
S 675 1064 ADD14 1 "CI" 1 SH
N 4725 535 "B[15]" normal LB B
S 657 1008 ADD13 3 "A" 1 SH
N 4725 455 "C14[2]" normal LB B
S 667 1008 ADD13 2 "B" 1 SH
N 4725 415 "C14[3]" normal LB B
S 674 1064 ADD14 2 "B" 1 SH
N 4725 575 "A[15]" normal LB B
S 867 1227 ADD15 1 "CI" 1 SH
N 4725 695 "C15[2]" normal LB B
S 866 1227 ADD15 3 "A" 1 SH
N 4725 775 "C15[0]" normal LB B
S 865 1227 ADD15 2 "B" 1 SH
N 4725 735 "C15[1]" normal LB B
S 894 1235 ADD16 3 "A" 1 SH
N 4725 935 "C15[3]" normal LB B
S 893 1235 ADD16 2 "B" 1 SH
N 4725 895 "C15[4]" normal LB B
S 892 1235 ADD16 1 "CI" 1 SH
N 4725 855 "C15[5]" normal LB B
S 937 1279 ADD17 3 "A" 1 SH
N 4725 1095 "C15[6]" normal LB B
S 938 1279 ADD17 2 "B" 1 SH
N 4725 1055 "C15[7]" normal LB B
S 944 1279 ADD17 1 "CI" 1 SH
N 4725 1015 "C15[8]" normal LB B
S 953 1292 ADD18 1 "CI" 1 SH
N 4725 1175 "C16[2]" normal LB B
S 952 1292 ADD18 2 "B" 1 SH
N 4725 1215 "C16[1]" normal LB B
S 954 1292 ADD18 3 "A" 1 SH
N 4725 1255 "C16[0]" normal LB B
S 1765 1806 ADD19 3 "A" 1 SH
N 4725 1415 "C16[3]" normal LB B
S 1766 1806 ADD19 2 "B" 1 SH
N 4725 1375 "C16[4]" normal LB B
```

```
S 1767 1806 ADD19 1 "CI" 1 SH
N 4725 1335 "C16[5]" normal LB B
S 1769 1819 ADD110 1 "CI" 1 SH
N 4725 1495 "C16[8]" normal LB B
S 1770 1819 ADD110 2 "B" 1 SH
N 4725 1535 "C16[7]" normal LB B
S 1768 1819 ADD110 3 "A" 1 SH
N 4725 1575 "C16[6]" normal LB B
S 1773 1854 ADD111 3 "A" 1 SH
N 4725 1735 "C17[0]" normal LB B
S 1772 1854 ADD111 2 "B" 1 SH
N 4725 1695 "C17[1]" normal LB B
S 1771 1854 ADD111 1 "CI" 1 SH
N 4725 1655 "C17[2]" normal LB B
S 1774 1790 ADD112 1 "CI" 1 SH
N 4725 1815 "C17[5]" normal LB B
S 1775 1790 ADD112 2 "B" 1 SH
N 4725 1855 "C17[4]" normal LB B
S 1776 1790 ADD112 3 "A" 1 SH
N 4725 1895 "C17[3]" normal LB B
S 1779 1993 ADD113 3 "A" 1 SH
N 4725 2055 "C18[0]" normal LB B
S 1778 1993 ADD113 2 "B" 1 SH
N 4725 2015 "C18[1]" normal LB B
S 1777 1993 ADD113 1 "CI" 1 SH
N 4725 1975 "C18[2]" normal LB B
S 341 1657 1 SV
S 354 1667 1 SV
S 353 1666 1 SV
S 373 1675 1 SV
S 383 1683 1 SV
S 381 1692 1 SV
S 765 1698 1 SV
S 771 1709 1 SV
S 797 1713 1 SV
S 793 1712 1 SV
S 806 1722 1 SV
S 913 1738 1 SV
S 923 1747 1 SV
S 921 1748 1 SV
S 946 1751 1 SV
S 957 1758 1 SV
S 64 28 NORA0B5 1 "A2" 1 SH
N 1755 55 "NA[0]" normal LB B
S 152 29 NORA1B5 1 "A2" 1 SH
N 1755 145 "NA[1]" normal LB B
S 169 30 NORA2B5 1 "A2" 1 SH
N 1755 235 "NA[2]" normal LB B
```

S 170 25 NORA3B5 1 "A2" 1 SH
N 1755 325 "NA[3]" normal LB B
S 222 26 NORA4B5 1 "A2" 1 SH
N 1755 415 "NA[4]" normal LB B
S 221 27 NORA5B5 1 "A2" 1 SH
N 1755 505 "NA[5]" normal LB B
S 233 22 NORA6B5 1 "A2" 1 SH
N 1755 595 "NA[6]" normal LB B
S 297 23 NORA7B5 1 "A2" 1 SH
N 1755 685 "NA[7]" normal LB B
S 301 24 NORA8B5 1 "A2" 1 SH
N 1755 775 "NA[8]" normal LB B
S 318 35 NORA9B5 1 "A2" 1 SH
N 1755 865 "NA[9]" normal LB B
S 317 34 NORA10B5 1 "A2" 1 SH
N 1755 955 "NA[10]" normal LB B
S 366 33 NORA11B5 1 "A2" 1 SH
N 1755 1045 "NA[11]" normal LB B
S 358 32 NORA12B5 1 "A2" 1 SH
N 1755 1135 "NA[12]" normal LB B
S 385 31 NORA13B5 1 "A2" 1 SH
N 1755 1225 "NA[13]" normal LB B
S 150 28 NORA0B5 2 "A1" 1 SH
S 146 29 NORA1B5 2 "A1" 1 SH
S 174 30 NORA2B5 2 "A1" 1 SH
S 175 25 NORA3B5 2 "A1" 1 SH
S 217 26 NORA4B5 2 "A1" 1 SH
S 227 27 NORA5B5 2 "A1" 1 SH
S 235 22 NORA6B5 2 "A1" 1 SH
S 294 23 NORA7B5 2 "A1" 1 SH
S 295 24 NORA8B5 2 "A1" 1 SH
S 324 35 NORA9B5 2 "A1" 1 SH
S 323 34 NORA10B5 2 "A1" 1 SH
S 370 33 NORA11B5 2 "A1" 1 SH
S 380 32 NORA12B5 2 "A1" 1 SH
S 381 31 NORA13B5 2 "A1" 1 SH
S 36 AINV 2 "ZN" 53 1 SHM
N 265 55 "NA[15:0]" normal LB B
S 52 36 AINV 1 "I" 1 SHM
N 155 55 "A[15:0]" normal LB B
S 37 NORA0B2 3 "ZN" 62 1 SH
N 1075 65 "P1[2]" normal LB B
S 54 38 NORA0B0 1 "A2" 1 SH
N 405 55 "NA[0]" normal LB B
S 38 NORA0B0 3 "ZN" 55 1 SH
N 535 65 "P[0]" normal LB B
S 56 39 NORA0B1 1 "A2" 1 SH
N 675 55 "NA[0]" normal LB B

```
S 39 NORA0B1 3 "ZN" 57 1 SH
N 805 65 "P2[1]" normal LB B
S 58 37 NORA0B2 1 "A2" 1 SH
N 945 55 "NA[0]" normal LB B
S 41 NORA0B4 3 "ZN" 59 1 SH
N 1615 65 "C4[4]" normal LB B
S 60 41 NORA0B4 1 "A2" 1 SH
N 1485 55 "NA[0]" normal LB B
S 40 NORA0B3 3 "ZN" 61 1 SH
N 1345 65 "C3[3]" normal LB B
S 63 40 NORA0B3 1 "A2" 1 SH
N 1215 55 "NA[0]" normal LB B
S 42 NORA0B10 3 "ZN" 75 1 SH
N 3235 65 "C10[10]" normal LB B
S 43 NORA0B6 3 "ZN" 67 1 SH
N 2155 65 "C6[6]" normal LB B
S 66 44 NORA0B7 1 "A2" 1 SH
N 2295 55 "NA[0]" normal LB B
S 44 NORA0B7 3 "ZN" 65 1 SH
N 2425 65 "C7[7]" normal LB B
S 28 NORA0B5 3 "ZN" 68 1 SH
N 1885 65 "C5[5]" normal LB B
S 69 43 NORA0B6 1 "A2" 1 SH
N 2025 55 "NA[0]" normal LB B
S 46 NORA0B9 3 "ZN" 70 1 SH
N 2965 65 "C9[9]" normal LB B
S 71 46 NORA0B9 1 "A2" 1 SH
N 2835 55 "NA[0]" normal LB B
S 45 NORA0B8 3 "ZN" 72 1 SH
N 2695 65 "C8[8]" normal LB B
S 74 42 NORA0B10 1 "A2" 1 SH
N 3105 55 "NA[0]" normal LB B
S 73 45 NORA0B8 1 "A2" 1 SH
N 2565 55 "NA[0]" normal LB B
S 80 47 NORA0B13 1 "A2" 1 SH
N 3915 55 "NA[0]" normal LB B
S 48 NORA0B12 3 "ZN" 79 1 SH
N 3775 65 "C12[12]" normal LB B
S 78 48 NORA0B12 1 "A2" 1 SH
N 3645 55 "NA[0]" normal LB B
S 49 NORA0B11 3 "ZN" 77 1 SH
N 3505 65 "C11[11]" normal LB B
S 76 49 NORA0B11 1 "A2" 1 SH
N 3375 55 "NA[0]" normal LB B
S 84 50 NORA0B15 1 "A2" 1 SH
N 4455 55 "A[0]" normal LB B
S 51 NORA0B14 3 "ZN" 83 1 SH
N 4315 65 "C14[14]" normal LB B
```

```
S 82 51 NORA0B14 1 "A2" 1 SH
N 4185 55 "NA[0]" normal LB B
S 47 NORA0B13 3 "ZN" 81 1 SH
N 4045 65 "C13[13]" normal LB B
S 50 NORA0B15 3 "ZN" 85 1 SH
N 4585 65 "C15[15]" normal LB B
S 199 256 1 SV
S 204 264 1 SV
S 205 262 1 SV
S 228 289 1 SV
S 234 300 1 SV
S 235 294 1 SV
S 93 94 BINV 1 "I" 1 SHM
N 155 145 "B[15:0]" normal LB B
S 94 BINV 2 "ZN" 92 1 SHM
N 265 145 "NB[15:0]" normal LB B
S 100 NORA1B2 3 "ZN" 143 1 SH
N 1075 155 "C3[2]" normal LB B
S 97 NORA2B2 3 "ZN" 156 1 SH
N 1075 245 "C4[2]" normal LB B
S 96 NORA3B2 3 "ZN" 162 1 SH
N 1075 335 "C5[2]" normal LB B
S 95 NORA4B2 3 "ZN" 211 1 SH
N 1075 425 "C6[2]" normal LB B
S 98 NORA5B2 3 "ZN" 212 1 SH
N 1075 515 "C7[2]" normal LB B
S 99 NORA6B2 3 "ZN" 230 1 SH
N 1075 605 "C8[2]" normal LB B
S 120 180 1 SV
S 134 191 1 SV
S 135 189 1 SV
S 159 210 1 SV
S 166 220 1 SV
S 175 217 1 SV
S 108 111 1 SH
N 675 75 "NB[1]" normal LB B
S 106 118 NORA1B1 1 "A2" 1 SH
N 675 145 "NA[1]" normal LB B
S 123 102 NORA2B1 1 "A2" 1 SH
N 675 235 "NA[2]" normal LB B
S 127 130 NORA3B1 1 "A2" 1 SH
N 675 325 "NA[3]" normal LB B
S 107 119 1 SV
S 115 133 1 SV
S 114 136 1 SV
S 109 107 1 SV
S 110 109 1 SH
N 405 75 "NB[0]" normal LB B
```

S 109 38 NORA0B0 2 "A1" 1 SH
S 105 NORA1B0 3 "ZN" 103 1 SH
N 535 155 "P1[1]" normal LB B
S 104 105 NORA1B0 1 "A2" 1 SH
N 405 145 "NA[1]" normal LB B
S 107 105 NORA1B0 2 "A1" 1 SH
S 111 115 1 SV
S 113 114 1 SV
S 111 39 NORA0B1 2 "A1" 1 SH
S 113 37 NORA0B2 2 "A1" 1 SH
S 112 113 1 SH
N 945 75 "NB[2]" normal LB B
S 118 NORA1B1 3 "ZN" 117 1 SH
N 805 155 "C2[1]" normal LB B
S 116 100 NORA1B2 1 "A2" 1 SH
N 945 145 "NA[1]" normal LB B
S 115 118 NORA1B1 2 "A1" 1 SH
S 114 100 NORA1B2 2 "A1" 1 SH
S 101 NORA2B0 3 "ZN" 121 1 SH
N 535 245 "C2[0]" normal LB B
S 122 101 NORA2B0 1 "A2" 1 SH
N 405 235 "NA[2]" normal LB B
S 125 126 NORA3B0 1 "A2" 1 SH
N 405 325 "NA[3]" normal LB B
S 126 NORA3B0 3 "ZN" 124 1 SH
N 535 335 "C3[0]" normal LB B
S 119 101 NORA2B0 2 "A1" 1 SH
S 120 126 NORA3B0 2 "A1" 1 SH
S 119 120 1 SV
S 102 NORA2B1 3 "ZN" 128 1 SH
N 805 245 "C3[1]" normal LB B
S 129 97 NORA2B2 1 "A2" 1 SH
N 945 235 "NA[2]" normal LB B
S 130 NORA3B1 3 "ZN" 131 1 SH
N 805 335 "C4[1]" normal LB B
S 132 96 NORA3B2 1 "A2" 1 SH
N 945 325 "NA[3]" normal LB B
S 133 102 NORA2B1 2 "A1" 1 SH
S 134 130 NORA3B1 2 "A1" 1 SH
S 133 134 1 SV
S 136 97 NORA2B2 2 "A1" 1 SH
S 135 96 NORA3B2 2 "A1" 1 SH
S 136 135 1 SV
S 141 160 1 SV
S 151 165 1 SV
S 146 174 1 SV
S 140 141 1 SV
S 139 140 1 SH N 1215 75 "NB[3]" normal LB B
S 140 40 NORA0B3 2 "A1" 1 SH
S 142 NORA1B3 3 "ZN" 145 1 SH
N 1345 155 "C4[3]" normal LB B
S 144 142 NORA1B3 1 "A2" 1 SH
N 1215 145 "NA[1]" normal LB B
S 141 142 NORA1B3 2 "A1" 1 SH
S 149 150 1 SH
N 1755 75 "NB[5]" normal LB B
S 148 151 1 SV
S 150 146 1 SV
S 147 148 1 SH
N 1485 75 "NB[4]" normal LB B
S 148 41 NORA0B4 2 "A1" 1 SH
S 154 153 NORA1B4 1 "A2" 1 SH
N 1485 145 "NA[1]" normal LB B
S 153 NORA1B4 3 "ZN" 155 1 SH
N 1615 155 "C5[4]" normal LB B
S 151 153 NORA1B4 2 "A1" 1 SH
S 137 NORA2B3 3 "ZN" 158 1 SH
N 1345 245 "C5[3]" normal LB B
S 157 137 NORA2B3 1 "A2" 1 SH
N 1215 235 "NA[2]" normal LB B
S 161 NORA3B3 3 "ZN" 164 1 SH
N 1345 335 "C6[3]" normal LB B
S 163 161 NORA3B3 1 "A2" 1 SH
N 1215 325 "NA[3]" normal LB B
S 160 137 NORA2B3 2 "A1" 1 SH
S 159 161 NORA3B3 2 "A1" 1 SH
S 160 159 1 SV
S 167 138 NORA2B4 1 "A2" 1 SH
N 1485 235 "NA[2]" normal LB B
S 138 NORA2B4 3 "ZN" 168 1 SH
N 1615 245 "C6[4]" normal LB B
S 172 173 NORA3B4 1 "A2" 1 SH
N 1485 325 "NA[3]" normal LB B
S 173 NORA3B4 3 "ZN" 171 1 SH
N 1615 335 "C7[4]" normal LB B
S 165 138 NORA2B4 2 "A1" 1 SH
S 166 173 NORA3B4 2 "A1" 1 SH
S 165 166 1 SV
S 174 175 1 SV
S 182 187 NORA4B1 1 "A2" 1 SH
N 675 415 "NA[4]" normal LB B
S 181 177 NORA5B1 1 "A2" 1 SH
N 675 505 "NA[5]" normal LB B
S 200 201 NORA6B1 1 "A2" 1 SH
N 675 595 "NA[6]" normal LB B

```
S 179 199 1 SV
S 190 204 1 SV
S 188 205 1 SV
S 176 NORA5B0 3 "ZN" 186 1 SH
N 535 515 "C5[0]" normal LB B
S 185 176 NORA5B0 1 "A2" 1 SH
N 405 505 "NA[5]" normal LB B
S 178 NORA4B0 3 "ZN" 184 1 SH
N 535 425 "C4[0]" normal LB B
S 183 178 NORA4B0 1 "A2" 1 SH
N 405 415 "NA[4]" normal LB B
S 180 178 NORA4B0 2 "A1" 1 SH
S 179 176 NORA5B0 2 "A1" 1 SH
S 180 179 1 SV
S 187 NORA4B1 3 "ZN" 195 1 SH
N 805 425 "C5[1]" normal LB B
S 177 NORA5B1 3 "ZN" 194 1 SH
N 805 515 "C6[1]" normal LB B
S 193 95 NORA4B2 1 "A2" 1 SH
N 945 415 "NA[4]" normal LB B
S 192 98 NORA5B2 1 "A2" 1 SH
N 945 505 "NA[5]" normal LB B
S 191 187 NORA4B1 2 "A1" 1 SH
S 190 177 NORA5B1 2 "A1" 1 SH
S 191 190 1 SV
S 189 95 NORA4B2 2 "A1" 1 SH
S 188 98 NORA5B2 2 "A1" 1 SH
S 189 188 1 SV
S 197 196 NORA6B0 1 "A2" 1 SH
N 405 595 "NA[6]" normal LB B
S 196 NORA6B0 3 "ZN" 198 1 SH
N 535 605 "C6[0]" normal LB B
S 199 196 NORA6B0 2 "A1" 1 SH
S 201 NORA6B1 3 "ZN" 202 1 SH
N 805 605 "C7[1]" normal LB B
S 203 99 NORA6B2 1 "A2" 1 SH
N 945 595 "NA[6]" normal LB B
S 204 201 NORA6B1 2 "A1" 1 SH
S 205 99 NORA6B2 2 "A1" 1 SH
S 209 228 1 SV
S 219 234 1 SV
S 227 235 1 SV
S 206 NORA5B3 3 "ZN" 216 1 SH
N 1345 515 "C8[3]" normal LB B
S 215 206 NORA5B3 1 "A2" 1 SH
N 1215 505 "NA[5]" normal LB B
S 208 NORA4B3 3 "ZN" 214 1 SH
N 1345 425 "C7[3]" normal LB B
```

S 213 208 NORA4B3 1 "A2" 1 SH
N 1215 415 "NA[4]" normal LB B
S 210 208 NORA4B3 2 "A1" 1 SH
S 209 206 NORA5B3 2 "A1" 1 SH
S 210 209 1 SV
S 226 218 NORA4B4 1 "A2" 1 SH
N 1485 415 "NA[4]" normal LB B
S 218 NORA4B4 3 "ZN" 225 1 SH
N 1615 425 "C8[4]" normal LB B
S 224 207 NORA5B4 1 "A2" 1 SH
N 1485 505 "NA[5]" normal LB B
S 207 NORA5B4 3 "ZN" 223 1 SH
N 1615 515 "C9[4]" normal LB B
S 220 218 NORA4B4 2 "A1" 1 SH
S 219 207 NORA5B4 2 "A1" 1 SH
S 220 219 1 SV
S 217 227 1 SV
S 229 NORA6B3 3 "ZN" 232 1 SH
N 1345 605 "C9[3]" normal LB B
S 231 229 NORA6B3 1 "A2" 1 SH
N 1215 595 "NA[6]" normal LB B
S 228 229 NORA6B3 2 "A1" 1 SH
S 237 236 NORA6B4 1 "A2" 1 SH
N 1485 595 "NA[6]" normal LB B
S 236 NORA6B4 3 "ZN" 238 1 SH
N 1615 605 "C10[4]" normal LB B
S 234 236 NORA6B4 2 "A1" 1 SH
S 89 NORA7B2 3 "ZN" 286 1 SH
N 1075 695 "C9[2]" normal LB B
S 239 NORA8B2 3 "ZN" 291 1 SH
N 1075 785 "C10[2]" normal LB B
S 244 NORA9B2 3 "ZN" 309 1 SH
N 1075 875 "C11[2]" normal LB B
S 243 NORA10B2 3 "ZN" 310 1 SH
N 1075 965 "C12[2]" normal LB B
S 242 NORA11B2 3 "ZN" 362 1 SH
N 1075 1055 "C13[2]" normal LB B
S 241 NORA12B2 3 "ZN" 371 1 SH
N 1075 1145 "C14[2]" normal LB B
S 240 NORA13B2 3 "ZN" 376 1 SH
N 1075 1235 "C15[2]" normal LB B
S 270 330 1 SV
S 282 336 1 SV
S 284 335 1 SV
S 307 360 1 SV
S 315 365 1 SV
S 323 370 1 SV
S 250 90 NORA7B1 1 "A2" 1 SH N 675 685 "NA[7]" normal LB B
S 255 258 NORA8B1 1 "A2" 1 SH
N 675 775 "NA[8]" normal LB B
S 273 276 NORA9B1 1 "A2" 1 SH
N 675 865 "NA[9]" normal LB B
S 272 246 NORA10B1 1 "A2" 1 SH
N 675 955 "NA[10]" normal LB B
S 257 271 1 SV
S 261 281 1 SV
S 263 283 1 SV
S 251 91 NORA7B0 1 "A2" 1 SH
N 405 685 "NA[7]" normal LB B
S 91 NORA7B0 3 "ZN" 249 1 SH
N 535 695 "C7[0]" normal LB B
S 254 NORA8B0 3 "ZN" 252 1 SH
N 535 785 "C8[0]" normal LB B
S 253 254 NORA8B0 1 "A2" 1 SH
N 405 775 "NA[8]" normal LB B
S 256 91 NORA7B0 2 "A1" 1 SH
S 257 254 NORA8B0 2 "A1" 1 SH
S 256 257 1 SV
S 90 NORA7B1 3 "ZN" 260 1 SH
N 805 695 "C8[1]" normal LB B
S 259 89 NORA7B2 1 "A2" 1 SH
N 945 685 "NA[7]" normal LB B
S 258 NORA8B1 3 "ZN" 266 1 SH
N 805 785 "C9[1]" normal LB B
S 265 239 NORA8B2 1 "A2" 1 SH
N 945 775 "NA[8]" normal LB B
S 264 90 NORA7B1 2 "A1" 1 SH
S 261 258 NORA8B1 2 "A1" 1 SH
S 264 261 1 SV
S 262 89 NORA7B2 2 "A1" 1 SH
S 263 239 NORA8B2 2 "A1" 1 SH
S 262 263 1 SV
S 267 NORA9B0 3 "ZN" 269 1 SH
N 535 875 "C9[0]" normal LB B
S 275 267 NORA9B0 1 "A2" 1 SH
N 405 865 "NA[9]" normal LB B
S 268 245 NORA10B0 1 "A2" 1 SH
N 405 955 "NA[10]" normal LB B
S 245 NORA10B0 3 "ZN" 274 1 SH
N 535 965 "C10[0]" normal LB B
S 271 267 NORA9B0 2 "A1" 1 SH
S 270 245 NORA10B0 2 "A1" 1 SH
S 271 270 1 SV
S 276 NORA9B1 3 "ZN" 277 1 SH
N 805 875 "C10[1]" normal LB B S 246 NORA10B1 3 "ZN" 278 1 SH
N 805 965 "C11[1]" normal LB B
S 279 244 NORA9B2 1 "A2" 1 SH
N 945 865 "NA[9]" normal LB B
S 280 243 NORA10B2 1 "A2" 1 SH
N 945 955 "NA[10]" normal LB B
S 281 276 NORA9B1 2 "A1" 1 SH
S 282 246 NORA10B1 2 "A1" 1 SH
S 281 282 1 SV
S 283 244 NORA9B2 2 "A1" 1 SH
S 284 243 NORA10B2 2 "A1" 1 SH
S 283 284 1 SV
S 288 308 1 SV
S 299 316 1 SV
S 295 324 1 SV
S 285 88 NORA7B3 1 "A2" 1 SH
N 1215 685 "NA[7]" normal LB B
S 88 NORA7B3 3 "ZN" 287 1 SH
N 1345 695 "C10[3]" normal LB B
S 290 NORA8B3 3 "ZN" 293 1 SH
N 1345 785 "C11[3]" normal LB B
S 292 290 NORA8B3 1 "A2" 1 SH
N 1215 775 "NA[8]" normal LB B
S 289 88 NORA7B3 2 "A1" 1 SH
S 288 290 NORA8B3 2 "A1" 1 SH
S 289 288 1 SV
S 298 87 NORA7B4 1 "A2" 1 SH
N 1485 685 "NA[7]" normal LB B
S 87 NORA7B4 3 "ZN" 296 1 SH
N 1615 695 "C11[4]" normal LB B
S 304 303 NORA8B4 1 "A2" 1 SH
N 1485 775 "NA[8]" normal LB B
S 303 NORA8B4 3 "ZN" 302 1 SH
N 1615 785 "C12[4]" normal LB B
S 300 87 NORA7B4 2 "A1" 1 SH
S 299 303 NORA8B4 2 "A1" 1 SH
S 300 299 1 SV
S 294 295 1 SV
S 248 NORA10B3 3 "ZN" 305 1 SH
N 1345 965 "C13[3]" normal LB B
S 313 248 NORA10B3 1 "A2" 1 SH
N 1215 955 "NA[10]" normal LB B
S 306 NORA9B3 3 "ZN" 312 1 SH
N 1345 875 "C12[3]" normal LB B
S 311 306 NORA9B3 1 "A2" 1 SH
N 1215 865 "NA[9]" normal LB B
S 308 306 NORA9B3 2 "A1" 1 SH
S 307 248 NORA10B3 2 "A1" 1 SH

```
S 308 307 1 SV
S 322 314 NORA9B4 1 "A2" 1 SH
N 1485 865 "NA[9]" normal LB B
S 314 NORA9B4 3 "ZN" 321 1 SH
N 1615 875 "C13[4]" normal LB B
S 320 247 NORA10B4 1 "A2" 1 SH
N 1485 955 "NA[10]" normal LB B
S 247 NORA10B4 3 "ZN" 319 1 SH
N 1615 965 "C14[4]" normal LB B
S 316 314 NORA9B4 2 "A1" 1 SH
S 315 247 NORA10B4 2 "A1" 1 SH
S 316 315 1 SV
S 324 323 1 SV
S 331 339 NORA11B1 1 "A2" 1 SH
N 675 1045 "NA[11]" normal LB B
S 327 325 NORA12B1 1 "A2" 1 SH
N 675 1135 "NA[12]" normal LB B
S 343 348 NORA13B1 1 "A2" 1 SH
N 675 1225 "NA[13]" normal LB B
S 330 342 1 SV
S 336 351 1 SV
S 335 352 1 SV
S 328 326 NORA12B0 1 "A2" 1 SH
N 405 1135 "NA[12]" normal LB B
S 329 241 NORA12B2 1 "A2" 1 SH
N 945 1135 "NA[12]" normal LB B
S 332 NORA11B0 3 "ZN" 334 1 SH
N 535 1055 "C11[0]" normal LB B
S 333 332 NORA11B0 1 "A2" 1 SH
N 405 1045 "NA[11]" normal LB B
S 330 332 NORA11B0 2 "A1" 1 SH
S 339 NORA11B1 3 "ZN" 338 1 SH
N 805 1055 "C12[1]" normal LB B
S 337 242 NORA11B2 1 "A2" 1 SH
N 945 1045 "NA[11]" normal LB B
S 336 339 NORA11B1 2 "A1" 1 SH
S 335 242 NORA11B2 2 "A1" 1 SH
S 326 NORA12B0 3 "ZN" 340 1 SH
N 535 1145 "C12[0]" normal LB B
S 345 344 NORA13B0 1 "A2" 1 SH
N 405 1225 "NA[13]" normal LB B
S 344 NORA13B0 3 "ZN" 346 1 SH
N 535 1235 "C13[0]" normal LB B
S 342 326 NORA12B0 2 "A1" 1 SH
S 341 344 NORA13B0 2 "A1" 1 SH
S 342 341 1 SV
S 325 NORA12B1 3 "ZN" 347 1 SH
N 805 1145 "C13[1]" normal LB B
```

S 348 NORA13B1 3 "ZN" 349 1 SH
N 805 1235 "C14[1]" normal LB B
S 350 240 NORA13B2 1 "A2" 1 SH
N 945 1225 "NA[13]" normal LB B
S 351 325 NORA12B1 2 "A1" 1 SH
S 354 348 NORA13B1 2 "A1" 1 SH
S 351 354 1 SV
S 352 241 NORA12B2 2 "A1" 1 SH
S 353 240 NORA13B2 2 "A1" 1 SH
S 352 353 1 SV
S 360 374 1 SV
S 365 384 1 SV
S 357 355 NORA12B3 1 "A2" 1 SH
N 1215 1135 "NA[12]" normal LB B
S 359 356 NORA12B4 1 "A2" 1 SH
N 1485 1135 "NA[12]" normal LB B
S 370 380 1 SV
S 361 NORA11B3 3 "ZN" 364 1 SH
N 1345 1055 "C14[3]" normal LB B
S 363 361 NORA11B3 1 "A2" 1 SH
N 1215 1045 "NA[11]" normal LB B
S 360 361 NORA11B3 2 "A1" 1 SH
S 368 367 NORA11B4 1 "A2" 1 SH
N 1485 1045 "NA[11]" normal LB B
S 367 NORA11B4 3 "ZN" 369 1 SH
N 1615 1055 "C15[4]" normal LB B
S 365 367 NORA11B4 2 "A1" 1 SH
S 355 NORA12B3 3 "ZN" 372 1 SH
N 1345 1145 "C15[3]" normal LB B
S 375 NORA13B3 3 "ZN" 378 1 SH
N 1345 1235 "C16[2]" normal LB B
S 377 375 NORA13B3 1 "A2" 1 SH
N 1215 1225 "NA[13]" normal LB B
S 374 355 NORA12B3 2 "A1" 1 SH
S 373 375 NORA13B3 2 "A1" 1 SH
S 374 373 1 SV
S 356 NORA12B4 3 "ZN" 382 1 SH
N 1615 1145 "C16[3]" normal LB B
S 387 379 NORA13B4 1 "A2" 1 SH
N 1485 1225 "NA[13]" normal LB B
S 379 NORA13B4 3 "ZN" 386 1 SH
N 1615 1235 "C17[2]" normal LB B
S 384 356 NORA12B4 2 "A1" 1 SH
S 383 379 NORA13B4 2 "A1" 1 SH
S 384 383 1 SV
S 380 381 1 SV
S 388 NORA1B10 3 "ZN" 544 1 SH
N 3235 155 "C11[10]" normal LB B S 389 NORA2B10 3 "ZN" 566 1 SH
N 3235 245 "C12[10]" normal LB B
S 390 NORA3B10 3 "ZN" 564 1 SH
N 3235 335 "C13[10]" normal LB B
S 391 NORA4B10 3 "ZN" 619 1 SH
N 3235 425 "C14[10]" normal LB B
S 392 NORA5B10 3 "ZN" 620 1 SH
N 3235 515 "C15[10]" normal LB B
S 393 NORA6B10 3 "ZN" 638 1 SH
N 3235 605 "C16[9]" normal LB B
S 394 NORA7B10 3 "ZN" 818 1 SH
N 3235 695 "C17[8]" normal LB B
S 395 NORA8B10 3 "ZN" 822 1 SH
N 3235 785 "C18[7]" normal LB B
S 396 NORA9B10 3 "ZN" 840 1 SH
N 3235 875 "C19[6]" normal LB B
S 397 NORA10B10 3 "ZN" 841 1 SH
N 3235 965 "C20[5]" normal LB B
S 398 NORA11B10 3 "ZN" 902 1 SH
N 3235 1055 "C21[4]" normal LB B
S 400 NORA12B10 3 "ZN" 911 1 SH
N 3235 1145 "C22[3]" normal LB B
S 399 NORA13B10 3 "ZN" 916 1 SH
N 3235 1235 "C23[2]" normal LB B
S 498 687 1 SV
S 501 697 1 SV
S 528 722 1 SV
S 527 720 1 SV
S 533 732 1 SV
S 636 824 1 SV
S 646 832 1 SV
S 645 830 1 SV
S 668 862 1 SV
S 672 872 1 SV
S 431 482 1 SV
S 440 489 1 SV
S 470 512 1 SV
S 466 510 1 SV
S 476 520 1 SV
S 411 NORA1B6 3 "ZN" 425 1 SH
N 2155 155 "C7[6]" normal LB B
S 412 NORA2B6 3 "ZN" 432 1 SH
N 2155 245 "C8[6]" normal LB B
S 410 NORA3B6 3 "ZN" 436 1 SH
N 2155 335 "C9[6]" normal LB B
S 416 428 1 SV
S 421 439 1 SV
S 415 416 1 SV S 415 43 NORA0B6 2 "A1" 1 SH
S 414 415 1 SH
N 2025 75 "NB[6]" normal LB B
S 418 411 NORA1B6 1 "A2" 1 SH
N 2025 145 "NA[1]" normal LB B
S 29 NORA1B5 3 "ZN" 417 1 SH
N 1885 155 "C6[5]" normal LB B
S 416 411 NORA1B6 2 "A1" 1 SH
S 420 421 1 SV
S 420 44 NORA0B7 2 "A1" 1 SH
S 419 420 1 SH
N 2295 75 "NB[7]" normal LB B
S 423 424 NORA1B7 1 "A2" 1 SH
N 2295 145 "NA[1]" normal LB B
S 424 NORA1B7 3 "ZN" 422 1 SH
N 2425 155 "C8[7]" normal LB B
S 421 424 NORA1B7 2 "A1" 1 SH
S 30 NORA2B5 3 "ZN" 429 1 SH
N 1885 245 "C7[5]" normal LB B
S 430 412 NORA2B6 1 "A2" 1 SH
N 2025 235 "NA[2]" normal LB B
S 25 NORA3B5 3 "ZN" 426 1 SH
N 1885 335 "C8[5]" normal LB B
S 427 410 NORA3B6 1 "A2" 1 SH
N 2025 325 "NA[3]" normal LB B
S 428 412 NORA2B6 2 "A1" 1 SH
S 431 410 NORA3B6 2 "A1" 1 SH
S 428 431 1 SV
S 433 413 NORA2B7 1 "A2" 1 SH
N 2295 235 "NA[2]" normal LB B
S 413 NORA2B7 3 "ZN" 434 1 SH
N 2425 245 "C9[7]" normal LB B
S 437 435 NORA3B7 1 "A2" 1 SH
N 2295 325 "NA[3]" normal LB B
S 435 NORA3B7 3 "ZN" 438 1 SH
N 2425 335 "C10[7]" normal LB B
S 439 413 NORA2B7 2 "A1" 1 SH
S 440 435 NORA3B7 2 "A1" 1 SH
S 439 440 1 SV
S 450 469 1 SV
S 449 467 1 SV
S 458 475 1 SV
S 447 450 1 SV
S 445 449 1 SV
S 448 447 1 SH
N 2565 75 "NB[8]" normal LB B
S 447 45 NORA0B8 2 "A1" 1 SH
S 446 445 1 SH N 2835 75 "NB[9]" normal LB B
S 445 46 NORA0B9 2 "A1" 1 SH
S 451 441 NORA1B9 1 "A2" 1 SH
N 2835 145 "NA[1]" normal LB B
S 449 441 NORA1B9 2 "A1" 1 SH
S 452 NORA1B8 3 "ZN" 454 1 SH
N 2695 155 "C9[8]" normal LB B
S 453 452 NORA1B8 1 "A2" 1 SH
N 2565 145 "NA[1]" normal LB B
S 450 452 NORA1B8 2 "A1" 1 SH
S 456 458 1 SV
S 457 456 1 SH
N 3105 75 "NB[10]" normal LB B
S 456 42 NORA0B10 2 "A1" 1 SH
S 441 NORA1B9 3 "ZN" 455 1 SH
N 2965 155 "C10[9]" normal LB B
S 459 388 NORA1B10 1 "A2" 1 SH
N 3105 145 "NA[1]" normal LB B
S 458 388 NORA1B10 2 "A1" 1 SH
S 462 442 NORA2B9 1 "A2" 1 SH
N 2835 235 "NA[2]" normal LB B
S 468 443 NORA3B9 1 "A2" 1 SH
N 2835 325 "NA[3]" normal LB B
S 467 442 NORA2B9 2 "A1" 1 SH
S 466 443 NORA3B9 2 "A1" 1 SH
S 444 NORA2B8 3 "ZN" 460 1 SH
N 2695 245 "C10[8]" normal LB B
S 461 444 NORA2B8 1 "A2" 1 SH
N 2565 235 "NA[2]" normal LB B
S 464 465 NORA3B8 1 "A2" 1 SH
N 2565 325 "NA[3]" normal LB B
S 465 NORA3B8 3 "ZN" 463 1 SH
N 2695 335 "C11[8]" normal LB B
S 469 444 NORA2B8 2 "A1" 1 SH
S 470 465 NORA3B8 2 "A1" 1 SH
S 469 470 1 SV
S 467 466 1 SV
S 442 NORA2B9 3 "ZN" 472 1 SH
N 2965 245 "C11[9]" normal LB B
S 471 389 NORA2B10 1 "A2" 1 SH
N 3105 235 "NA[2]" normal LB B
S 443 NORA3B9 3 "ZN" 473 1 SH
N 2965 335 "C12[9]" normal LB B
S 474 390 NORA3B10 1 "A2" 1 SH
N 3105 325 "NA[3]" normal LB B
S 475 389 NORA2B10 2 "A1" 1 SH
S 476 390 NORA3B10 2 "A1" 1 SH
S 475 476 1 SV S 477 NORA4B6 3 "ZN" 495 1 SH
N 2155 425 "C10[6]" normal LB B
S 479 NORA5B6 3 "ZN" 494 1 SH
N 2155 515 "C11[6]" normal LB B
S 478 NORA6B6 3 "ZN" 500 1 SH
N 2155 605 "C12[6]" normal LB B
S 481 498 1 SV
S 488 501 1 SV
S 27 NORA5B5 3 "ZN" 485 1 SH
N 1885 515 "C10[5]" normal LB B
S 26 NORA4B5 3 "ZN" 484 1 SH
N 1885 425 "C9[5]" normal LB B
S 486 477 NORA4B6 1 "A2" 1 SH
N 2025 415 "NA[4]" normal LB B
S 483 479 NORA5B6 1 "A2" 1 SH
N 2025 505 "NA[5]" normal LB B
S 482 477 NORA4B6 2 "A1" 1 SH
S 481 479 NORA5B6 2 "A1" 1 SH
S 482 481 1 SV
S 493 487 NORA4B7 1 "A2" 1 SH
N 2295 415 "NA[4]" normal LB B
S 487 NORA4B7 3 "ZN" 492 1 SH
N 2425 425 "C11[7]" normal LB B
S 491 480 NORA5B7 1 "A2" 1 SH
N 2295 505 "NA[5]" normal LB B
S 480 NORA5B7 3 "ZN" 490 1 SH
N 2425 515 "C12[7]" normal LB B
S 489 487 NORA4B7 2 "A1" 1 SH
S 488 480 NORA5B7 2 "A1" 1 SH
S 489 488 1 SV
S 22 NORA6B5 3 "ZN" 496 1 SH
N 1885 605 "C11[5]" normal LB B
S 497 478 NORA6B6 1 "A2" 1 SH
N 2025 595 "NA[6]" normal LB B
S 498 478 NORA6B6 2 "A1" 1 SH
S 503 499 NORA6B7 1 "A2" 1 SH
N 2295 595 "NA[6]" normal LB B
S 499 NORA6B7 3 "ZN" 502 1 SH
N 2425 605 "C13[7]" normal LB B
S 501 499 NORA6B7 2 "A1" 1 SH
S 511 528 1 SV
S 509 527 1 SV
S 519 533 1 SV
S 514 504 NORA4B9 1 "A2" 1 SH
N 2835 415 "NA[4]" normal LB B
S 513 505 NORA5B9 1 "A2" 1 SH
N 2835 505 "NA[5]" normal LB B
S 510 504 NORA4B9 2 "A1" 1 SH S 509 505 NORA5B9 2 "A1" 1 SH
S 507 NORA5B8 3 "ZN" 518 1 SH
N 2695 515 "C13[8]" normal LB B
S 517 507 NORA5B8 1 "A2" 1 SH
N 2565 505 "NA[5]" normal LB B
S 508 NORA4B8 3 "ZN" 516 1 SH
N 2695 425 "C12[8]" normal LB B
S 515 508 NORA4B8 1 "A2" 1 SH
N 2565 415 "NA[4]" normal LB B
S 512 508 NORA4B8 2 "A1" 1 SH
S 511 507 NORA5B8 2 "A1" 1 SH
S 512 511 1 SV
S 510 509 1 SV
S 504 NORA4B9 3 "ZN" 524 1 SH
N 2965 425 "C13[9]" normal LB B
S 505 NORA5B9 3 "ZN" 523 1 SH
N 2965 515 "C14[9]" normal LB B
S 522 391 NORA4B10 1 "A2" 1 SH
N 3105 415 "NA[4]" normal LB B
S 521 392 NORA5B10 1 "A2" 1 SH
N 3105 505 "NA[5]" normal LB B
S 520 391 NORA4B10 2 "A1" 1 SH
S 519 392 NORA5B10 2 "A1" 1 SH
S 520 519 1 SV
S 529 506 NORA6B9 1 "A2" 1 SH
N 2835 595 "NA[6]" normal LB B
S 527 506 NORA6B9 2 "A1" 1 SH
S 526 525 NORA6B8 1 "A2" 1 SH
N 2565 595 "NA[6]" normal LB B
S 525 NORA6B8 3 "ZN" 530 1 SH
N 2695 605 "C14[8]" normal LB B
S 528 525 NORA6B8 2 "A1" 1 SH
S 506 NORA6B9 3 "ZN" 531 1 SH
N 2965 605 "C15[9]" normal LB B
S 532 393 NORA6B10 1 "A2" 1 SH
N 3105 595 "NA[6]" normal LB B
S 533 393 NORA6B10 2 "A1" 1 SH
S 560 618 1 SV
S 574 629 1 SV
S 572 627 1 SV
S 599 652 1 SV
S 606 660 1 SV
S 546 559 1 SV
S 554 575 1 SV
S 553 573 1 SV
S 547 546 1 SV
S 548 547 1 SH
N 3375 75 "NB[11]" normal LB B S 547 49 NORA0B11 2 "A1" 1 SH
S 545 NORA1B11 3 "ZN" 542 1 SH
N 3505 155 "C12[11]" normal LB B
S 543 545 NORA1B11 1 "A2" 1 SH
N 3375 145 "NA[1]" normal LB B
S 546 545 NORA1B11 2 "A1" 1 SH
S 549 554 1 SV
S 552 553 1 SV
S 552 47 NORA0B13 2 "A1" 1 SH
S 551 552 1 SH
N 3915 75 "NB[13]" normal LB B
S 549 48 NORA0B12 2 "A1" 1 SH
S 550 549 1 SH
N 3645 75 "NB[12]" normal LB B
S 555 539 NORA1B13 1 "A2" 1 SH
N 3915 145 "NA[1]" normal LB B
S 553 539 NORA1B13 2 "A1" 1 SH
S 557 556 NORA1B12 1 "A2" 1 SH
N 3645 145 "NA[1]" normal LB B
S 556 NORA1B12 3 "ZN" 558 1 SH
N 3775 155 "C13[12]" normal LB B
S 554 556 NORA1B12 2 "A1" 1 SH
S 540 NORA2B11 3 "ZN" 561 1 SH
N 3505 245 "C13[11]" normal LB B
S 567 540 NORA2B11 1 "A2" 1 SH
N 3375 235 "NA[2]" normal LB B
S 565 NORA3B11 3 "ZN" 562 1 SH
N 3505 335 "C14[11]" normal LB B
S 563 565 NORA3B11 1 "A2" 1 SH
N 3375 325 "NA[3]" normal LB B
S 559 540 NORA2B11 2 "A1" 1 SH
S 560 565 NORA3B11 2 "A1" 1 SH
S 559 560 1 SV
S 570 538 NORA2B13 1 "A2" 1 SH
N 3915 235 "NA[2]" normal LB B
S 576 537 NORA3B13 1 "A2" 1 SH
N 3915 325 "NA[3]" normal LB B
S 573 538 NORA2B13 2 "A1" 1 SH
S 572 537 NORA3B13 2 "A1" 1 SH
S 568 541 NORA2B12 1 "A2" 1 SH
N 3645 235 "NA[2]" normal LB B
S 541 NORA2B12 3 "ZN" 569 1 SH
N 3775 245 "C14[12]" normal LB B
S 578 571 NORA3B12 1 "A2" 1 SH
N 3645 325 "NA[3]" normal LB B
S 571 NORA3B12 3 "ZN" 577 1 SH
N 3775 335 "C15[12]" normal LB B
S 575 541 NORA2B12 2 "A1" 1 SH S 574 571 NORA3B12 2 "A1" 1 SH
S 575 574 1 SV
S 573 572 1 SV
S 580 NORA2B14 3 "ZN" 607 1 SH
N 4315 245 "C16[13]" normal LB B
S 579 NORA1B14 3 "ZN" 596 1 SH
N 4315 155 "C15[14]" normal LB B
S 581 NORA3B14 3 "ZN" 610 1 SH
N 4315 335 "C17[12]" normal LB B
S 585 600 1 SV
S 592 605 1 SV
S 584 585 1 SV
S 583 584 1 SH
N 4185 75 "NB[14]" normal LB B
S 584 51 NORA0B14 2 "A1" 1 SH
S 587 579 NORA1B14 1 "A2" 1 SH
N 4185 145 "NA[1]" normal LB B
S 539 NORA1B13 3 "ZN" 586 1 SH
N 4045 155 "C14[13]" normal LB B
S 585 579 NORA1B14 2 "A1" 1 SH
S 591 592 1 SV
S 590 591 1 SH
N 4455 75 "NB[15]" normal LB B
S 591 50 NORA0B15 2 "A1" 1 SH
S 594 595 NORA1B15 1 "A2" 1 SH
N 4455 145 "A[1]" normal LB B
S 595 NORA1B15 3 "ZN" 593 1 SH
N 4585 155 "C16[14]" normal LB B
S 592 595 NORA1B15 2 "A1" 1 SH
S 598 580 NORA2B14 1 "A2" 1 SH
N 4185 235 "NA[2]" normal LB B
S 538 NORA2B13 3 "ZN" 597 1 SH
N 4045 245 "C15[13]" normal LB B
S 537 NORA3B13 3 "ZN" 601 1 SH
N 4045 335 "C16[12]" normal LB B
S 602 581 NORA3B14 1 "A2" 1 SH
N 4185 325 "NA[3]" normal LB B
S 600 580 NORA2B14 2 "A1" 1 SH
S 599 581 NORA3B14 2 "A1" 1 SH
S 600 599 1 SV
S 608 582 NORA2B15 1 "A2" 1 SH
N 4455 235 "A[2]" normal LB B
S 582 NORA2B15 3 "ZN" 609 1 SH
N 4585 245 "C17[13]" normal LB B
S 603 611 NORA3B15 1 "A2" 1 SH
N 4455 325 "A[3]" normal LB B
S 611 NORA3B15 3 "ZN" 604 1 SH
N 4585 335 "C18[12]" normal LB B

```
S 605 582 NORA2B15 2 "A1" 1 SH
S 606 611 NORA3B15 2 "A1" 1 SH
S 605 606 1 SV
S 617 636 1 SV
S 628 646 1 SV
S 626 645 1 SV
S 614 NORA5B11 3 "ZN" 624 1 SH
N 3505 515 "C16[10]" normal LB B
S 623 614 NORA5B11 1 "A2" 1 SH
N 3375 505 "NA[5]" normal LB B
S 616 NORA4B11 3 "ZN" 622 1 SH
N 3505 425 "C15[11]" normal LB B
S 621 616 NORA4B11 1 "A2" 1 SH
N 3375 415 "NA[4]" normal LB B
S 618 616 NORA4B11 2 "A1" 1 SH
S 617 614 NORA5B11 2 "A1" 1 SH
S 618 617 1 SV
S 631 536 NORA4B13 1 "A2" 1 SH
N 3915 415 "NA[4]" normal LB B
S 630 535 NORA5B13 1 "A2" 1 SH
N 3915 505 "NA[5]" normal LB B
S 627 536 NORA4B13 2 "A1" 1 SH
S 626 535 NORA5B13 2 "A1" 1 SH
S 635 625 NORA4B12 1 "A2" 1 SH
N 3645 415 "NA[4]" normal LB B
S 625 NORA4B12 3 "ZN" 634 1 SH
N 3775 425 "C16[11]" normal LB B
S 633 615 NORA5B12 1 "A2" 1 SH
N 3645 505 "NA[5]" normal LB B
S 615 NORA5B12 3 "ZN" 632 1 SH
N 3775 515 "C17[10]" normal LB B
S 629 625 NORA4B12 2 "A1" 1 SH
S 628 615 NORA5B12 2 "A1" 1 SH
S 629 628 1 SV
S 627 626 1 SV
S 637 NORA6B11 3 "ZN" 640 1 SH
N 3505 605 "C17[9]" normal LB B
S 639 637 NORA6B11 1 "A2" 1 SH
N 3375 595 "NA[6]" normal LB B
S 636 637 NORA6B11 2 "A1" 1 SH
S 644 534 NORA6B13 1 "A2" 1 SH
N 3915 595 "NA[6]" normal LB B
S 645 534 NORA6B13 2 "A1" 1 SH
S 642 641 NORA6B12 1 "A2" 1 SH
N 3645 595 "NA[6]" normal LB B
S 641 NORA6B12 3 "ZN" 643 1 SH
N 3775 605 "C18[9]" normal LB B
S 646 641 NORA6B12 2 "A1" 1 SH
```

S 647 NORA4B14 3 "ZN" 666 1 SH
N 4315 425 "C18[11]" normal LB B
S 648 NORA5B14 3 "ZN" 665 1 SH
N 4315 515 "C19[10]" normal LB B
S 649 NORA6B14 3 "ZN" 677 1 SH
N 4315 605 "C20[9]" normal LB B
S 651 668 1 SV
S 659 672 1 SV
S 656 648 NORA5B14 1 "A2" 1 SH
N 4185 505 "NA[5]" normal LB B
S 655 647 NORA4B14 1 "A2" 1 SH
N 4185 415 "NA[4]" normal LB B
S 535 NORA5B13 3 "ZN" 654 1 SH
N 4045 515 "C18[10]" normal LB B
S 536 NORA4B13 3 "ZN" 653 1 SH
N 4045 425 "C17[11]" normal LB B
S 652 647 NORA4B14 2 "A1" 1 SH
S 651 648 NORA5B14 2 "A1" 1 SH
S 652 651 1 SV
S 664 658 NORA4B15 1 "A2" 1 SH
N 4455 415 "A[4]" normal LB B
S 658 NORA4B15 3 "ZN" 663 1 SH
N 4585 425 "C19[11]" normal LB B
S 662 650 NORA5B15 1 "A2" 1 SH
N 4455 505 "A[5]" normal LB B
S 650 NORA5B15 3 "ZN" 661 1 SH
N 4585 515 "C20[10]" normal LB B
S 660 658 NORA4B15 2 "A1" 1 SH
S 659 650 NORA5B15 2 "A1" 1 SH
S 660 659 1 SV
S 534 NORA6B13 3 "ZN" 670 1 SH
N 4045 605 "C19[9]" normal LB B
S 669 649 NORA6B14 1 "A2" 1 SH
N 4185 595 "NA[6]" normal LB B
S 668 649 NORA6B14 2 "A1" 1 SH
S 673 676 NORA6B15 1 "A2" 1 SH
N 4455 595 "A[6]" normal LB B
S 676 NORA6B15 3 "ZN" 671 1 SH
N 4585 605 "C21[9]" normal LB B
S 672 676 NORA6B15 2 "A1" 1 SH
S 701 756 1 SV
S 713 759 1 SV
S 740 785 1 SV
S 738 784 1 SV
S 749 790 1 SV
S 401 NORA7B6 3 "ZN" 693 1 SH
N 2155 695 "C13[6]" normal LB B
S 683 NORA8B6 3 "ZN" 691 1 SH N 2155 785 "C14[6]" normal LB B
S 682 NORA9B6 3 "ZN" 706 1 SH
N 2155 875 "C15[6]" normal LB B
S 678 NORA10B6 3 "ZN" 707 1 SH
N 2155 965 "C16[5]" normal LB B
S 686 702 1 SV
S 696 712 1 SV
S 23 NORA7B5 3 "ZN" 684 1 SH
N 1885 695 "C12[5]" normal LB B
S 685 401 NORA7B6 1 "A2" 1 SH
N 2025 685 "NA[7]" normal LB B
S 689 683 NORA8B6 1 "A2" 1 SH
N 2025 775 "NA[8]" normal LB B
S 24 NORA8B5 3 "ZN" 688 1 SH
N 1885 785 "C13[5]" normal LB B
S 687 401 NORA7B6 2 "A1" 1 SH
S 686 683 NORA8B6 2 "A1" 1 SH
S 687 686 1 SV
S 694 402 NORA7B7 1 "A2" 1 SH
N 2295 685 "NA[7]" normal LB B
S 402 NORA7B7 3 "ZN" 695 1 SH
N 2425 695 "C14[7]" normal LB B
S 690 692 NORA8B7 1 "A2" 1 SH
N 2295 775 "NA[8]" normal LB B
S 692 NORA8B7 3 "ZN" 698 1 SH
N 2425 785 "C15[7]" normal LB B
S 697 402 NORA7B7 2 "A1" 1 SH
S 696 692 NORA8B7 2 "A1" 1 SH
S 697 696 1 SV
S 34 NORA10B5 3 "ZN" 699 1 SH
N 1885 965 "C15[5]" normal LB B
S 35 NORA9B5 3 "ZN" 700 1 SH
N 1885 875 "C14[5]" normal LB B
S 704 682 NORA9B6 1 "A2" 1 SH
N 2025 865 "NA[9]" normal LB B
S 703 678 NORA10B6 1 "A2" 1 SH
N 2025 955 "NA[10]" normal LB B
S 702 682 NORA9B6 2 "A1" 1 SH
S 701 678 NORA10B6 2 "A1" 1 SH
S 702 701 1 SV
S 708 705 NORA9B7 1 "A2" 1 SH
N 2295 865 "NA[9]" normal LB B
S 705 NORA9B7 3 "ZN" 709 1 SH
N 2425 875 "C16[6]" normal LB B
S 710 679 NORA10B7 1 "A2" 1 SH
N 2295 955 "NA[10]" normal LB B
S 679 NORA10B7 3 "ZN" 711 1 SH
N 2425 965 "C17[5]" normal LB B S 712 705 NORA9B7 2 "A1" 1 SH
S 713 679 NORA10B7 2 "A1" 1 SH
S 712 713 1 SV
S 721 741 1 SV
S 719 739 1 SV
S 729 748 1 SV
S 718 404 NORA7B9 1 "A2" 1 SH
N 2835 685 "NA[7]" normal LB B
S 716 403 NORA7B8 1 "A2" 1 SH
N 2565 685 "NA[7]" normal LB B
S 403 NORA7B8 3 "ZN" 717 1 SH
N 2695 695 "C15[8]" normal LB B
S 723 714 NORA8B9 1 "A2" 1 SH
N 2835 775 "NA[8]" normal LB B
S 720 404 NORA7B9 2 "A1" 1 SH
S 719 714 NORA8B9 2 "A1" 1 SH
S 724 NORA8B8 3 "ZN" 726 1 SH
N 2695 785 "C16[7]" normal LB B
S 725 724 NORA8B8 1 "A2" 1 SH
N 2565 775 "NA[8]" normal LB B
S 722 403 NORA7B8 2 "A1" 1 SH
S 721 724 NORA8B8 2 "A1" 1 SH
S 722 721 1 SV
S 720 719 1 SV
S 404 NORA7B9 3 "ZN" 728 1 SH
N 2965 695 "C16[8]" normal LB B
S 727 394 NORA7B10 1 "A2" 1 SH
N 3105 685 "NA[7]" normal LB B
S 714 NORA8B9 3 "ZN" 730 1 SH
N 2965 785 "C17[7]" normal LB B
S 731 395 NORA8B10 1 "A2" 1 SH
N 3105 775 "NA[8]" normal LB B
S 732 394 NORA7B10 2 "A1" 1 SH
S 729 395 NORA8B10 2 "A1" 1 SH
S 732 729 1 SV
S 743 715 NORA9B9 1 "A2" 1 SH
N 2835 865 "NA[9]" normal LB B
S 742 680 NORA10B9 1 "A2" 1 SH
N 2835 955 "NA[10]" normal LB B
S 739 715 NORA9B9 2 "A1" 1 SH
S 738 680 NORA10B9 2 "A1" 1 SH
S 733 NORA9B8 3 "ZN" 735 1 SH
N 2695 875 "C17[6]" normal LB B
S 736 733 NORA9B8 1 "A2" 1 SH
N 2565 865 "NA[9]" normal LB B
S 734 681 NORA10B8 1 "A2" 1 SH
N 2565 955 "NA[10]" normal LB B
S 681 NORA10B8 3 "ZN" 737 1 SH N 2695 965 "C18[5]" normal LB B
S 741 733 NORA9B8 2 "A1" 1 SH
S 740 681 NORA10B8 2 "A1" 1 SH
S 741 740 1 SV
S 739 738 1 SV
S 715 NORA9B9 3 "ZN" 744 1 SH
N 2965 875 "C18[6]" normal LB B
S 680 NORA10B9 3 "ZN" 745 1 SH
N 2965 965 "C19[5]" normal LB B
S 746 396 NORA9B10 1 "A2" 1 SH
N 3105 865 "NA[9]" normal LB B
S 747 397 NORA10B10 1 "A2" 1 SH
N 3105 955 "NA[10]" normal LB B
S 748 396 NORA9B10 2 "A1" 1 SH
S 749 397 NORA10B10 2 "A1" 1 SH
S 748 749 1 SV
S 752 NORA11B6 3 "ZN" 763 1 SH
N 2155 1055 "C17[4]" normal LB B
S 751 NORA12B6 3 "ZN" 770 1 SH
N 2155 1145 "C18[3]" normal LB B
S 750 NORA13B6 3 "ZN" 775 1 SH
N 2155 1235 "C19[2]" normal LB B
S 756 766 1 SV
S 759 772 1 SV
S 754 751 NORA12B6 1 "A2" 1 SH
N 2025 1135 "NA[12]" normal LB B
S 755 753 NORA12B7 1 "A2" 1 SH
N 2295 1135 "NA[12]" normal LB B
S 758 752 NORA11B6 1 "A2" 1 SH
N 2025 1045 "NA[11]" normal LB B
S 33 NORA11B5 3 "ZN" 757 1 SH
N 1885 1055 "C16[4]" normal LB B
S 756 752 NORA11B6 2 "A1" 1 SH
S 761 762 NORA11B7 1 "A2" 1 SH
N 2295 1045 "NA[11]" normal LB B
S 762 NORA11B7 3 "ZN" 760 1 SH
N 2425 1055 "C18[4]" normal LB B
S 759 762 NORA11B7 2 "A1" 1 SH
S 32 NORA12B5 3 "ZN" 764 1 SH
N 1885 1145 "C17[3]" normal LB B
S 31 NORA13B5 3 "ZN" 768 1 SH
N 1885 1235 "C18[2]" normal LB B
S 767 750 NORA13B6 1 "A2" 1 SH
N 2025 1225 "NA[13]" normal LB B
S 766 751 NORA12B6 2 "A1" 1 SH
S 765 750 NORA13B6 2 "A1" 1 SH
S 766 765 1 SV
S 753 NORA12B7 3 "ZN" 776 1 SH N 2425 1145 "C19[3]" normal LB B
S 774 769 NORA13B7 1 "A2" 1 SH
N 2295 1225 "NA[13]" normal LB B
S 769 NORA13B7 3 "ZN" 773 1 SH
N 2425 1235 "C20[2]" normal LB B
S 772 753 NORA12B7 2 "A1" 1 SH
S 771 769 NORA13B7 2 "A1" 1 SH
S 772 771 1 SV
S 781 778 NORA12B9 1 "A2" 1 SH
N 2835 1135 "NA[12]" normal LB B
S 785 796 1 SV
S 784 798 1 SV
S 790 805 1 SV
S 782 780 NORA12B8 1 "A2" 1 SH
N 2565 1135 "NA[12]" normal LB B
S 783 400 NORA12B10 1 "A2" 1 SH
N 3105 1135 "NA[12]" normal LB B
S 786 777 NORA11B9 1 "A2" 1 SH
N 2835 1045 "NA[11]" normal LB B
S 784 777 NORA11B9 2 "A1" 1 SH
S 787 NORA11B8 3 "ZN" 789 1 SH
N 2695 1055 "C19[4]" normal LB B
S 788 787 NORA11B8 1 "A2" 1 SH
N 2565 1045 "NA[11]" normal LB B
S 785 787 NORA11B8 2 "A1" 1 SH
S 777 NORA11B9 3 "ZN" 792 1 SH
N 2965 1055 "C20[4]" normal LB B
S 791 398 NORA11B10 1 "A2" 1 SH
N 3105 1045 "NA[11]" normal LB B
S 790 398 NORA11B10 2 "A1" 1 SH
S 795 779 NORA13B9 1 "A2" 1 SH
N 2835 1225 "NA[13]" normal LB B
S 798 778 NORA12B9 2 "A1" 1 SH
S 793 779 NORA13B9 2 "A1" 1 SH
S 780 NORA12B8 3 "ZN" 799 1 SH
N 2695 1145 "C20[3]" normal LB B
S 801 794 NORA13B8 1 "A2" 1 SH
N 2565 1225 "NA[13]" normal LB B
S 794 NORA13B8 3 "ZN" 800 1 SH
N 2695 1235 "C21[2]" normal LB B
S 796 780 NORA12B8 2 "A1" 1 SH
S 797 794 NORA13B8 2 "A1" 1 SH
S 796 797 1 SV
S 798 793 1 SV
S 778 NORA12B9 3 "ZN" 802 1 SH
N 2965 1145 "C21[3]" normal LB B
S 779 NORA13B9 3 "ZN" 803 1 SH
N 2965 1235 "C22[2]" normal LB B S 804 399 NORA13B10 1 "A2" 1 SH
N 3105 1225 "NA[13]" normal LB B
S 805 400 NORA12B10 2 "A1" 1 SH
S 806 399 NORA13B10 2 "A1" 1 SH
S 805 806 1 SV
S 837 900 1 SV
S 852 906 1 SV
S 850 905 1 SV
S 879 934 1 SV
S 885 939 1 SV
S 825 839 1 SV
S 829 853 1 SV
S 831 851 1 SV
S 817 405 NORA7B11 1 "A2" 1 SH
N 3375 685 "NA[7]" normal LB B
S 405 NORA7B11 3 "ZN" 819 1 SH
N 3505 695 "C18[8]" normal LB B
S 823 NORA8B11 3 "ZN" 820 1 SH
N 3505 785 "C19[7]" normal LB B
S 821 823 NORA8B11 1 "A2" 1 SH
N 3375 775 "NA[8]" normal LB B
S 824 405 NORA7B11 2 "A1" 1 SH
S 825 823 NORA8B11 2 "A1" 1 SH
S 824 825 1 SV
S 826 407 NORA7B13 1 "A2" 1 SH
N 3915 685 "NA[7]" normal LB B
S 828 406 NORA7B12 1 "A2" 1 SH
N 3645 685 "NA[7]" normal LB B
S 406 NORA7B12 3 "ZN" 827 1 SH
N 3775 695 "C19[8]" normal LB B
S 833 807 NORA8B13 1 "A2" 1 SH
N 3915 775 "NA[8]" normal LB B
S 830 407 NORA7B13 2 "A1" 1 SH
S 831 807 NORA8B13 2 "A1" 1 SH
S 836 835 NORA8B12 1 "A2" 1 SH
N 3645 775 "NA[8]" normal LB B
S 835 NORA8B12 3 "ZN" 834 1 SH
N 3775 785 "C20[7]" normal LB B
S 832 406 NORA7B12 2 "A1" 1 SH
S 829 835 NORA8B12 2 "A1" 1 SH
S 832 829 1 SV
S 830 831 1 SV
S 813 NORA10B11 3 "ZN" 843 1 SH
N 3505 965 "C21[5]" normal LB B
S 844 813 NORA10B11 1 "A2" 1 SH
N 3375 955 "NA[10]" normal LB B
S 838 NORA9B11 3 "ZN" 845 1 SH
N 3505 875 "C20[6]" normal LB B S 842 838 NORA9B11 1 "A2" 1 SH
N 3375 865 "NA[9]" normal LB B
S 839 838 NORA9B11 2 "A1" 1 SH
S 837 813 NORA10B11 2 "A1" 1 SH
S 839 837 1 SV
S 855 812 NORA9B13 1 "A2" 1 SH
N 3915 865 "NA[9]" normal LB B
S 854 811 NORA10B13 1 "A2" 1 SH
N 3915 955 "NA[10]" normal LB B
S 851 812 NORA9B13 2 "A1" 1 SH
S 850 811 NORA10B13 2 "A1" 1 SH
S 847 846 NORA9B12 1 "A2" 1 SH
N 3645 865 "NA[9]" normal LB B
S 846 NORA9B12 3 "ZN" 848 1 SH
N 3775 875 "C21[6]" normal LB B
S 849 814 NORA10B12 1 "A2" 1 SH
N 3645 955 "NA[10]" normal LB B
S 814 NORA10B12 3 "ZN" 856 1 SH
N 3775 965 "C22[5]" normal LB B
S 853 846 NORA9B12 2 "A1" 1 SH
S 852 814 NORA10B12 2 "A1" 1 SH
S 853 852 1 SV
S 851 850 1 SV
S 408 NORA7B14 3 "ZN" 870 1 SH
N 4315 695 "C21[8]" normal LB B
S 858 NORA9B14 3 "ZN" 884 1 SH
N 4315 875 "C23[6]" normal LB B
S 857 NORA8B14 3 "ZN" 876 1 SH
N 4315 785 "C22[7]" normal LB B
S 816 NORA10B14 3 "ZN" 891 1 SH
N 4315 965 "C24[5]" normal LB B
S 861 880 1 SV
S 871 886 1 SV
S 407 NORA7B13 3 "ZN" 859 1 SH
N 4045 695 "C20[8]" normal LB B
S 860 408 NORA7B14 1 "A2" 1 SH
N 4185 685 "NA[7]" normal LB B
S 864 857 NORA8B14 1 "A2" 1 SH
N 4185 775 "NA[8]" normal LB B
S 807 NORA8B13 3 "ZN" 863 1 SH
N 4045 785 "C21[7]" normal LB B
S 862 408 NORA7B14 2 "A1" 1 SH
S 861 857 NORA8B14 2 "A1" 1 SH
S 862 861 1 SV
S 868 409 NORA7B15 1 "A2" 1 SH
N 4455 685 "A[7]" normal LB B
S 409 NORA7B15 3 "ZN" 869 1 SH
N 4585 695 "C22[8]" normal LB B S 874 875 NORA8B15 1 "A2" 1 SH
N 4455 775 "A[8]" normal LB B
S 875 NORA8B15 3 "ZN" 873 1 SH
N 4585 785 "C23[7]" normal LB B
S 872 409 NORA7B15 2 "A1" 1 SH
S 871 875 NORA8B15 2 "A1" 1 SH
S 872 871 1 SV
S 877 858 NORA9B14 1 "A2" 1 SH
N 4185 865 "NA[9]" normal LB B
S 811 NORA10B13 3 "ZN" 878 1 SH
N 4045 965 "C23[5]" normal LB B
S 812 NORA9B13 3 "ZN" 882 1 SH
N 4045 875 "C22[6]" normal LB B
S 881 816 NORA10B14 1 "A2" 1 SH
N 4185 955 "NA[10]" normal LB B
S 880 858 NORA9B14 2 "A1" 1 SH
S 879 816 NORA10B14 2 "A1" 1 SH
S 880 879 1 SV
S 890 883 NORA9B15 1 "A2" 1 SH
N 4455 865 "A[9]" normal LB B
S 883 NORA9B15 3 "ZN" 889 1 SH
N 4585 875 "C24[6]" normal LB B
S 888 815 NORA10B15 1 "A2" 1 SH
N 4455 955 "A[10]" normal LB B
S 815 NORA10B15 3 "ZN" 887 1 SH
N 4585 965 "C25[5]" normal LB B
S 886 883 NORA9B15 2 "A1" 1 SH
S 885 815 NORA10B15 2 "A1" 1 SH
S 886 885 1 SV
S 898 809 NORA12B13 1 "A2" 1 SH
N 3915 1135 "NA[12]" normal LB B
S 900 914 1 SV
S 906 927 1 SV
S 905 922 1 SV
S 897 896 NORA12B11 1 "A2" 1 SH
N 3375 1135 "NA[12]" normal LB B
S 899 895 NORA12B12 1 "A2" 1 SH
N 3645 1135 "NA[12]" normal LB B
S 901 NORA11B11 3 "ZN" 904 1 SH
N 3505 1055 "C22[4]" normal LB B
S 903 901 NORA11B11 1 "A2" 1 SH
N 3375 1045 "NA[11]" normal LB B
S 900 901 NORA11B11 2 "A1" 1 SH
S 907 810 NORA11B13 1 "A2" 1 SH
N 3915 1045 "NA[11]" normal LB B
S 905 810 NORA11B13 2 "A1" 1 SH
S 909 908 NORA11B12 1 "A2" 1 SH
N 3645 1045 "NA[11]" normal LB B S 908 NORA11B12 3 "ZN" 910 1 SH
N 3775 1055 "C23[4]" normal LB B
S 906 908 NORA11B12 2 "A1" 1 SH
S 896 NORA12B11 3 "ZN" 912 1 SH
N 3505 1145 "C23[3]" normal LB B
S 915 NORA13B11 3 "ZN" 918 1 SH
N 3505 1235 "C24[2]" normal LB B
S 917 915 NORA13B11 1 "A2" 1 SH
N 3375 1225 "NA[13]" normal LB B
S 914 896 NORA12B11 2 "A1" 1 SH
S 913 915 NORA13B11 2 "A1" 1 SH
S 914 913 1 SV
S 926 808 NORA13B13 1 "A2" 1 SH
N 3915 1225 "NA[13]" normal LB B
S 922 809 NORA12B13 2 "A1" 1 SH
S 921 808 NORA13B13 2 "A1" 1 SH
S 895 NORA12B12 3 "ZN" 919 1 SH
N 3775 1145 "C24[3]" normal LB B
S 924 920 NORA13B12 1 "A2" 1 SH
N 3645 1225 "NA[13]" normal LB B
S 920 NORA13B12 3 "ZN" 925 1 SH
N 3775 1235 "C25[2]" normal LB B
S 927 895 NORA12B12 2 "A1" 1 SH
S 923 920 NORA13B12 2 "A1" 1 SH
S 927 923 1 SV
S 922 921 1 SV
S 929 NORA12B14 3 "ZN" 956 1 SH
N 4315 1145 "C26[3]" normal LB B
S 928 NORA11B14 3 "ZN" 943 1 SH
N 4315 1055 "C25[4]" normal LB B
S 930 NORA13B14 3 "ZN" 951 1 SH
N 4315 1235 "C27[2]" normal LB B
S 934 947 1 SV
S 939 958 1 SV
S 932 929 NORA12B14 1 "A2" 1 SH
N 4185 1135 "NA[12]" normal LB B
S 933 931 NORA12B15 1 "A2" 1 SH
N 4455 1135 "A[12]" normal LB B
S 936 928 NORA11B14 1 "A2" 1 SH
N 4185 1045 "NA[11]" normal LB B
S 810 NORA11B13 3 "ZN" 935 1 SH
N 4045 1055 "C24[4]" normal LB B
S 934 928 NORA11B14 2 "A1" 1 SH
S 941 942 NORA11B15 1 "A2" 1 SH
N 4455 1045 "A[11]" normal LB B
S 942 NORA11B15 3 "ZN" 940 1 SH
N 4585 1055 "C26[4]" normal LB B
S 939 942 NORA11B15 2 "A1" 1 SH

```
S 809 NORA12B13 3 "ZN" 945 1 SH
N 4045 1145 "C25[3]" normal LB B
S 808 NORA13B13 3 "ZN" 948 1 SH
N 4045 1235 "C26[2]" normal LB B
S 949 930 NORA13B14 1 "A2" 1 SH
N 4185 1225 "NA[13]" normal LB B
S 947 929 NORA12B14 2 "A1" 1 SH
S 946 930 NORA13B14 2 "A1" 1 SH
S 947 946 1 SV
S 931 NORA12B15 3 "ZN" 955 1 SH
N 4585 1145 "C27[3]" normal LB B
S 960 950 NORA13B15 1 "A2" 1 SH
N 4455 1225 "A[13]" normal LB B
S 950 NORA13B15 3 "ZN" 959 1 SH
N 4585 1235 "C28[2]" normal LB B
S 958 931 NORA12B15 2 "A1" 1 SH
S 957 950 NORA13B15 2 "A1" 1 SH
S 958 957 1 SV
S 990 970 ADD433 1 "CI" 1 SH
N 7605 55 "C20[23]" normal LB B
S 1145 970 ADD433 2 "B" 1 SH
N 7605 95 "C20[22]" normal LB B
S 1148 970 ADD433 3 "A" 1 SH
N 7605 135 "C20[21]" normal LB B
S 1147 1453 ADD434 1 "CI" 1 SH
N 7605 215 "C21[17]" normal LB B
S 1164 1453 ADD434 2 "B" 1 SH
N 7605 255 "C21[16]" normal LB B
S 1163 1453 ADD434 3 "A" 1 SH
N 7605 295 "C21[15]" normal LB B
S 1160 1447 ADD435 1 "CI" 1 SH
N 7605 375 "C21[20]" normal LB B
S 1199 1447 ADD435 2 "B" 1 SH
N 7605 415 "C21[19]" normal LB B
S 1198 1447 ADD435 3 "A" 1 SH
N 7605 455 "C21[18]" normal LB B
S 1210 1504 ADD436 1 "CI" 1 SH
N 7605 535 "C22[14]" normal LB B
S 1217 1504 ADD436 2 "B" 1 SH
N 7605 575 "C22[13]" normal LB B
S 1216 1504 ADD436 3 "A" 1 SH
N 7605 615 "C22[12]" normal LB B
S 1366 1550 ADD437 1 "CI" 1 SH
N 7605 695 "C22[17]" normal LB B
S 1371 1550 ADD437 2 "B" 1 SH
N 7605 735 "C22[16]" normal LB B
S 1370 1550 ADD437 3 "A" 1 SH
N 7605 775 "C22[15]" normal LB B
```

S 1385 1562 ADD438 1 "CI" 1 SH
N 7605 855 "C23[11]" normal LB B
S 1386 1562 ADD438 2 "B" 1 SH
N 7605 895 "C23[10]" normal LB B
S 1387 1562 ADD438 3 "A" 1 SH
N 7605 935 "C23[9]" normal LB B
S 1424 1604 ADD439 1 "CI" 1 SH
N 7605 1015 "C23[14]" normal LB B
S 1423 1604 ADD439 2 "B" 1 SH
N 7605 1055 "C23[13]" normal LB B
S 1422 1604 ADD439 3 "A" 1 SH
N 7605 1095 "C23[12]" normal LB B
S 1441 1614 ADD440 1 "CI" 1 SH
N 7605 1175 "C24[8]" normal LB B
S 1440 1614 ADD440 2 "B" 1 SH
N 7605 1215 "C24[7]" normal LB B
S 1439 1614 ADD440 3 "A" 1 SH
N 7605 1255 "C24[6]" normal LB B
S 967 ADD11 4 "CO" 976 1 SH
N 4885 55 "C14[15]" normal LB B
S 977 966 ADD21 1 "CI" 1 SH
N 5025 55 "C9[1]" normal LB B
S 966 ADD21 4 "CO" 978 1 SH
N 5185 55 "C10[11]" normal LB B
S 979 965 ADD217 1 "CI" 1 SH
N 5325 55 "C14[13]" normal LB B
S 980 963 ADD31 1 "CI" 1 SH
N 5885 55 "C6[1]" normal LB B
S 982 964 ADD233 1 "CI" 1 SH
N 5605 55 "C18[11]" normal LB B
S 965 ADD217 4 "CO" 983 1 SH
N 5465 55 "C15[26]" normal LB B
S 963 ADD31 4 "CO" 984 1 SH
N 6045 55 "C7[8]" normal LB B
S 964 ADD233 4 "CO" 981 1 SH
N 5745 55 "C19[15]" normal LB B
S 987 962 ADD317 1 "CI" 1 SH
N 6185 55 "C12[16]" normal LB B
S 962 ADD317 4 "CO" 986 1 SH
N 6325 55 "C13[24]" normal LB B
S 985 961 ADD333 1 "CI" 1 SH
N 6465 55 "C17[26]" normal LB B
S 961 ADD333 4 "CO" 988 1 SH
N 6605 55 "C18[26]" normal LB B
S 989 968 ADD349 1 "CI" 1 SH
N 6745 55 "C23[2]" normal LB B
S 995 969 ADD417 1 "CI" 1 SH
N 7325 55 "C12[25]" normal LB B S 975 ADD41 4 "CO" 994 1 SH
N 7185 55 "C5[6]" normal LB B
S 993 975 ADD41 1 "CI" 1 SH
N 7025 55 "C4[1]" normal LB B
S 969 ADD417 4 "CO" 991 1 SH
N 7465 55 "C13[30]" normal LB B
S 968 ADD349 4 "CO" 992 1 SH
N 6885 55 "C24[7]" normal LB B
S 972 ADD517 4 "CO" 1001 1 SH
N 8325 55 "C20[28]" normal LB B
S 970 ADD433 4 "CO" 996 1 SH
N 7745 55 "C21[22]" normal LB B
S 997 971 ADD51 1 "CI" 1 SH
N 7885 55 "C3[1]" normal LB B
S 971 ADD51 4 "CO" 998 1 SH
N 8045 55 "C4[6]" normal LB B
S 999 972 ADD517 1 "CI" 1 SH
N 8185 55 "C19[29]" normal LB B
S 1002 973 ADD61 1 "CI" 1 SH
N 8465 55 "C2[1]" normal LB B
S 974 ADD617 4 "CO" 1000 1 SH
N 8905 55 "P1[19]" normal LB B
S 1004 974 ADD617 1 "CI" 1 SH
N 8765 55 "C18[35]" normal LB B
S 973 ADD61 4 "CO" 1003 1 SH
N 8625 55 "P1[3]" normal LB B
S 1016 966 ADD21 2 "B" 1 SH
N 5025 95 "C9[0]" normal LB B
S 1017 1012 ADD22 1 "CI" 1 SH
N 5025 215 "C10[1]" normal LB B
S 1027 1012 ADD22 2 "B" 1 SH
N 5025 255 "C10[0]" normal LB B
S 1026 1009 ADD23 1 "CI" 1 SH
N 5025 375 "C10[4]" normal LB B
S 1013 VS3 1 "VSS" 966 ADD21 3 "A" 1 SH
S 1014 VS4 1 "VSS" 1012 ADD22 3 "A" 1 SH
S 1015 ADD12 4 "CO" 1020 1 SH
N 4885 215 "C15[18]" normal LB B
S 967 ADD11 5 "S" 1019 1 SH
N 4885 135 "C13[14]" normal LB B
S 1018 VS0 1 "VSS" 967 ADD11 3 "A" 1 SH
S 1021 965 ADD217 2 "B" 1 SH
N 5325 95 "C14[12]" normal LB B
S 966 ADD21 5 "S" 1025 1 SH
N 5185 135 "C9[10]" normal LB B
S 1012 ADD22 4 "CO" 1024 1 SH
N 5185 215 "C11[12]" normal LB B
S 1023 965 ADD217 3 "A" 1 SH N 5325 135 "C14[11]" normal LB B
S 1022 1005 ADD218 1 "CI" 1 SH
N 5325 215 "C14[16]" normal LB B
S 1015 ADD12 5 "S" 1030 1 SH
N 4885 295 "C14[16]" normal LB B
S 1029 VS1 1 "VSS" 1015 ADD12 3 "A" 1 SH
S 1008 ADD13 4 "CO" 1028 1 SH
N 4885 375 "C15[19]" normal LB B
S 1012 ADD22 5 "S" 1031 1 SH
N 5185 295 "C10[12]" normal LB B
S 1009 ADD23 4 "CO" 1035 1 SH
N 5185 375 "C11[13]" normal LB B
S 1034 1005 ADD218 2 "B" 1 SH
N 5325 255 "C14[15]" normal LB B
S 1033 1005 ADD218 3 "A" 1 SH
N 5325 295 "C14[14]" normal LB B
S 1032 1006 ADD219 1 "CI" 1 SH
N 5325 375 "C15[11]" normal LB B
S 1038 964 ADD233 2 "B" 1 SH
N 5605 95 "C18[10]" normal LB B
S 964 ADD233 5 "S" 1044 1 SH
N 5745 135 "C18[22]" normal LB B
S 1036 ADD234 4 "CO" 1043 1 SH
N 5745 215 "C19[16]" normal LB B
S 1042 1036 ADD234 1 "CI" 1 SH
N 5605 215 "C18[14]" normal LB B
S 1041 964 ADD233 3 "A" 1 SH
N 5605 135 "C18[9]" normal LB B
S 1005 ADD218 4 "CO" 1040 1 SH
N 5465 215 "C15[27]" normal LB B
S 965 ADD217 5 "S" 1039 1 SH
N 5465 135 "C14[24]" normal LB B
S 1045 963 ADD31 2 "B" 1 SH
N 5885 95 "C6[0]" normal LB B
S 1049 VS7 1 "VSS" 963 ADD31 3 "A" 1 SH
S 963 ADD31 5 "S" 1048 1 SH
N 6045 135 "C6[7]" normal LB B
S 1047 1037 ADD32 1 "CI" 1 SH
N 5885 215 "C7[1]" normal LB B
S 1037 ADD32 4 "CO" 1046 1 SH
N 6045 215 "C8[9]" normal LB B
S 1036 ADD234 5 "S" 1050 1 SH
N 5745 295 "C18[23]" normal LB B
S 1011 ADD235 4 "CO" 1051 1 SH
N 5745 375 "C20[11]" normal LB B
S 1055 1036 ADD234 2 "B" 1 SH
N 5605 255 "C18[13]" normal LB B
S 1006 ADD219 4 "CO" 1054 1 SH N 5465 375 "C16[22]" normal LB B
S 1005 ADD218 5 "S" 1053 1 SH
N 5465 295 "C14[25]" normal LB B
S 1056 1036 ADD234 3 "A" 1 SH
N 5605 295 "C18[12]" normal LB B
S 1052 1011 ADD235 1 "CI" 1 SH
N 5605 375 "C19[2]" normal LB B
S 1059 1037 ADD32 2 "B" 1 SH
N 5885 255 "C7[0]" normal LB B
S 1057 VS8 1 "VSS" 1037 ADD32 3 "A" 1 SH
S 1037 ADD32 5 "S" 1058 1 SH
N 6045 295 "C7[9]" normal LB B
S 1061 1010 ADD33 1 "CI" 1 SH
N 5885 375 "C7[4]" normal LB B
S 1010 ADD33 4 "CO" 1060 1 SH
N 6045 375 "C8[10]" normal LB B
S 1066 1009 ADD23 2 "B" 1 SH
N 5025 415 "C10[3]" normal LB B
S 1065 1009 ADD23 3 "A" 1 SH
N 5025 455 "C10[2]" normal LB B
S 1071 1062 ADD24 1 "CI" 1 SH
N 5025 535 "C11[1]" normal LB B
S 1073 1062 ADD24 2 "B" 1 SH
N 5025 575 "C11[0]" normal LB B
S 1063 VS5 1 "VSS" 1062 ADD24 3 "A" 1 SH
S 1008 ADD13 5 "S" 1067 1 SH
N 4885 455 "C14[17]" normal LB B
S 1009 ADD23 5 "S" 1070 1 SH
N 5185 455 "C10[13]" normal LB B
S 1069 1006 ADD219 2 "B" 1 SH
N 5325 415 "C15[10]" normal LB B
S 1068 1006 ADD219 3 "A" 1 SH
N 5325 455 "C15[9]" normal LB B
S 1064 ADD14 4 "CO" 1072 1 SH
N 4885 535 "C16[15]" normal LB B
S 1075 VS2 1 "VSS" 1064 ADD14 3 "A" 1 SH
S 1064 ADD14 5 "S" 1074 1 SH
N 4885 615 "C15[20]" normal LB B
S 1062 ADD24 4 "CO" 1077 1 SH
N 5185 535 "C12[13]" normal LB B
S 1076 1007 ADD220 1 "CI" 1 SH
N 5325 535 "C15[14]" normal LB B
S 1062 ADD24 5 "S" 1078 1 SH
N 5185 615 "C11[14]" normal LB B
S 1079 1007 ADD220 2 "B" 1 SH
N 5325 575 "C15[13]" normal LB B
S 1080 1007 ADD220 3 "A" 1 SH
N 5325 615 "C15[12]" normal LB B S 1011 ADD235 5 "S" 1086 1 SH
N 5745 455 "C19[17]" normal LB B
S 1085 1011 ADD235 3 "A" 1 SH
N 5605 455 "C19[0]" normal LB B
S 1006 ADD219 5 "S" 1083 1 SH
N 5465 455 "C15[28]" normal LB B
S 1084 1011 ADD235 2 "B" 1 SH
N 5605 415 "C19[1]" normal LB B
S 1089 1010 ADD33 2 "B" 1 SH
N 5885 415 "C7[3]" normal LB B
S 1088 1010 ADD33 3 "A" 1 SH
N 5885 455 "C7[2]" normal LB B
S 1010 ADD33 5 "S" 1087 1 SH
N 6045 455 "C7[10]" normal LB B
S 1081 ADD236 4 "CO" 1092 1 SH
N 5745 535 "C20[12]" normal LB B
S 1081 ADD236 5 "S" 1096 1 SH
N 5745 615 "C19[18]" normal LB B
S 1091 1081 ADD236 1 "CI" 1 SH
N 5605 535 "C19[5]" normal LB B
S 1007 ADD220 4 "CO" 1090 1 SH
N 5465 535 "C16[23]" normal LB B
S 1007 ADD220 5 "S" 1095 1 SH
N 5465 615 "C15[29]" normal LB B
S 1094 1081 ADD236 2 "B" 1 SH
N 5605 575 "C19[4]" normal LB B
S 1093 1081 ADD236 3 "A" 1 SH
N 5605 615 "C19[3]" normal LB B
S 1098 1082 ADD34 1 "CI" 1 SH
N 5885 535 "C8[1]" normal LB B
S 1082 ADD34 4 "CO" 1097 1 SH
N 6045 535 "C9[11]" normal LB B
S 1101 1082 ADD34 2 "B" 1 SH
N 5885 575 "C8[0]" normal LB B
S 1100 VS9 1 "VSS" 1082 ADD34 3 "A" 1 SH
S 1082 ADD34 5 "S" 1099 1 SH
N 6045 615 "C8[11]" normal LB B
S 1108 ADD350 4 "CO" 1140 1 SH
N 6885 215 "C24[8]" normal LB B
S 968 ADD349 5 "S" 1139 1 SH
N 6885 135 "C23[12]" normal LB B
S 1105 ADD351 4 "CO" 1156 1 SH
N 6885 375 "C24[9]" normal LB B
S 1108 ADD350 5 "S" 1155 1 SH
N 6885 295 "C23[13]" normal LB B
S 1169 ADD352 4 "CO" 1203 1 SH
N 6885 535 "C25[6]" normal LB B
S 1105 ADD351 5 "S" 1194 1 SH N 6885 455 "C23[14]" normal LB B
S 1169 ADD352 5 "S" 1208 1 SH
N 6885 615 "C24[10]" normal LB B
S 1110 962 ADD317 2 "B" 1 SH
N 6185 95 "C12[15]" normal LB B
S 1111 961 ADD333 2 "B" 1 SH
N 6465 95 "C17[25]" normal LB B
S 1113 961 ADD333 3 "A" 1 SH
N 6465 135 "C17[24]" normal LB B
S 1112 1107 ADD334 1 "CI" 1 SH
N 6465 215 "C18[17]" normal LB B
S 1109 ADD318 4 "CO" 1117 1 SH
N 6325 215 "C13[25]" normal LB B
S 1116 1109 ADD318 1 "CI" 1 SH
N 6185 215 "C12[19]" normal LB B
S 962 ADD317 5 "S" 1115 1 SH
N 6325 135 "C12[24]" normal LB B
S 1114 962 ADD317 3 "A" 1 SH
N 6185 135 "C12[14]" normal LB B
S 1118 968 ADD349 2 "B" 1 SH
N 6745 95 "C23[1]" normal LB B
S 961 ADD333 5 "S" 1122 1 SH
N 6605 135 "C17[32]" normal LB B
S 1107 ADD334 4 "CO" 1121 1 SH
N 6605 215 "C19[21]" normal LB B
S 1120 968 ADD349 3 "A" 1 SH
N 6745 135 "C23[0]" normal LB B
S 1119 1108 ADD350 1 "CI" 1 SH
N 6745 215 "C23[5]" normal LB B
S 1123 1107 ADD334 2 "B" 1 SH
N 6465 255 "C18[16]" normal LB B
S 1124 1107 ADD334 3 "A" 1 SH
N 6465 295 "C18[15]" normal LB B
S 1125 1106 ADD335 1 "CI" 1 SH
N 6465 375 "C18[20]" normal LB B
S 1128 1104 ADD319 1 "CI" 1 SH
N 6185 375 "C13[16]" normal LB B
S 1109 ADD318 5 "S" 1129 1 SH
N 6325 295 "C12[25]" normal LB B
S 1130 1109 ADD318 3 "A" 1 SH
N 6185 295 "C12[17]" normal LB B
S 1127 1109 ADD318 2 "B" 1 SH
N 6185 255 "C12[18]" normal LB B
S 1104 ADD319 4 "CO" 1126 1 SH
N 6325 375 "C14[26]" normal LB B
S 1107 ADD334 5 "S" 1135 1 SH
N 6605 295 "C18[27]" normal LB B
S 1106 ADD335 4 "CO" 1134 1 SH N 6605 375 "C19[22]" normal LB B
S 1133 1108 ADD350 2 "B" 1 SH
N 6745 255 "C23[4]" normal LB B
S 1132 1108 ADD350 3 "A" 1 SH
N 6745 295 "C23[3]" normal LB B
S 1131 1105 ADD351 1 "CI" 1 SH
N 6745 375 "C23[8]" normal LB B
S 1138 975 ADD41 2 "B" 1 SH
N 7025 95 "C4[0]" normal LB B
S 975 ADD41 5 "S" 1144 1 SH
N 7185 135 "C4[5]" normal LB B
S 1136 ADD42 4 "CO" 1143 1 SH
N 7185 215 "C6[8]" normal LB B
S 1142 1136 ADD42 1 "CI" 1 SH
N 7025 215 "C5[1]" normal LB B
S 1141 VS10 1 "VSS" 975 ADD41 3 "A" 1 SH
S 1146 969 ADD417 2 "B" 1 SH
N 7325 95 "C12[24]" normal LB B
S 1152 969 ADD417 3 "A" 1 SH
N 7325 135 "C12[23]" normal LB B
S 969 ADD417 5 "S" 1151 1 SH
N 7465 135 "C12[29]" normal LB B
S 1150 1137 ADD418 1 "CI" 1 SH
N 7325 215 "C13[25]" normal LB B
S 1137 ADD418 4 "CO" 1149 1 SH
N 7465 215 "C14[32]" normal LB B
S 1136 ADD42 5 "S" 1158 1 SH
N 7185 295 "C5[7]" normal LB B
S 1103 ADD43 4 "CO" 1159 1 SH
N 7185 375 "C6[9]" normal LB B
S 1157 1136 ADD42 2 "B" 1 SH
N 7025 255 "C5[0]" normal LB B
S 1154 VS11 1 "VSS" 1136 ADD42 3 "A" 1 SH
S 1153 1103 ADD43 1 "CI" 1 SH
N 7025 375 "C5[4]" normal LB B
S 1162 1137 ADD418 2 "B" 1 SH
N 7325 255 "C13[24]" normal LB B
S 1161 1137 ADD418 3 "A" 1 SH
N 7325 295 "C13[23]" normal LB B
S 1137 ADD418 5 "S" 1165 1 SH
N 7465 295 "C13[31]" normal LB B
S 1166 1102 ADD419 1 "CI" 1 SH
N 7325 375 "C13[28]" normal LB B
S 1102 ADD419 4 "CO" 1167 1 SH
N 7465 375 "C14[33]" normal LB B
S 1172 1106 ADD335 2 "B" 1 SH
N 6465 415 "C18[19]" normal LB B
S 1171 1106 ADD335 3 "A" 1 SH N 6465 455 "C18[18]" normal LB B
S 1104 ADD319 5 "S" 1175 1 SH
N 6325 455 "C13[26]" normal LB B
S 1174 1104 ADD319 3 "A" 1 SH
N 6185 455 "C13[14]" normal LB B
S 1173 1104 ADD319 2 "B" 1 SH
N 6185 415 "C13[15]" normal LB B
S 1106 ADD335 5 "S" 1178 1 SH
N 6605 455 "C18[28]" normal LB B
S 1177 1105 ADD351 2 "B" 1 SH
N 6745 415 "C23[7]" normal LB B
S 1176 1105 ADD351 3 "A" 1 SH
N 6745 455 "C23[6]" normal LB B
S 1179 1168 ADD336 1 "CI" 1 SH
N 6465 535 "C18[23]" normal LB B
S 1183 1168 ADD336 2 "B" 1 SH
N 6465 575 "C18[22]" normal LB B
S 1182 1168 ADD336 3 "A" 1 SH
N 6465 615 "C18[21]" normal LB B
S 1170 ADD320 4 "CO" 1181 1 SH
N 6325 535 "C14[27]" normal LB B
S 1180 1170 ADD320 1 "CI" 1 SH
N 6185 535 "C13[19]" normal LB B
S 1186 1170 ADD320 3 "A" 1 SH
N 6185 615 "C13[17]" normal LB B
S 1185 1170 ADD320 2 "B" 1 SH
N 6185 575 "C13[18]" normal LB B
S 1170 ADD320 5 "S" 1184 1 SH
N 6325 615 "C13[27]" normal LB B
S 1168 ADD336 4 "CO" 1188 1 SH
N 6605 535 "C19[23]" normal LB B
S 1187 1169 ADD352 1 "CI" 1 SH
N 6745 535 "C24[2]" normal LB B
S 1168 ADD336 5 "S" 1189 1 SH
N 6605 615 "C18[29]" normal LB B
S 1190 1169 ADD352 2 "B" 1 SH
N 6745 575 "C24[1]" normal LB B
S 1191 1169 ADD352 3 "A" 1 SH
N 6745 615 "C24[0]" normal LB B
S 1103 ADD43 5 "S" 1197 1 SH
N 7185 455 "C5[8]" normal LB B
S 1195 1103 ADD43 2 "B" 1 SH
N 7025 415 "C5[3]" normal LB B
S 1196 1103 ADD43 3 "A" 1 SH
N 7025 455 "C5[2]" normal LB B
S 1202 1102 ADD419 2 "B" 1 SH
N 7325 415 "C13[27]" normal LB B
S 1201 1102 ADD419 3 "A" 1 SH N 7325 455 "C13[26]" normal LB B
S 1102 ADD419 5 "S" 1200 1 SH
N 7465 455 "C13[32]" normal LB B
S 1192 ADD44 4 "CO" 1205 1 SH
N 7185 535 "C7[11]" normal LB B
S 1192 ADD44 5 "S" 1209 1 SH
N 7185 615 "C6[10]" normal LB B
S 1204 1192 ADD44 1 "CI" 1 SH
N 7025 535 "C6[4]" normal LB B
S 1207 1192 ADD44 2 "B" 1 SH
N 7025 575 "C6[3]" normal LB B
S 1206 1192 ADD44 3 "A" 1 SH
N 7025 615 "C6[2]" normal LB B
S 1212 1193 ADD420 1 "CI" 1 SH
N 7325 535 "C14[28]" normal LB B
S 1193 ADD420 4 "CO" 1211 1 SH
N 7465 535 "C15[38]" normal LB B
S 1213 1193 ADD420 2 "B" 1 SH
N 7325 575 "C14[27]" normal LB B
S 1214 1193 ADD420 3 "A" 1 SH
N 7325 615 "C14[26]" normal LB B
S 1193 ADD420 5 "S" 1215 1 SH
N 7465 615 "C14[34]" normal LB B
S 1228 1223 ADD25 1 "CI" 1 SH
N 5025 695 "C11[4]" normal LB B
S 1224 1223 ADD25 2 "B" 1 SH
N 5025 735 "C11[3]" normal LB B
S 1225 1223 ADD25 3 "A" 1 SH
N 5025 775 "C11[2]" normal LB B
S 1236 1222 ADD26 3 "A" 1 SH
N 5025 935 "C11[5]" normal LB B
S 1237 1222 ADD26 2 "B" 1 SH
N 5025 895 "C11[6]" normal LB B
S 1238 1222 ADD26 1 "CI" 1 SH
N 5025 855 "C11[7]" normal LB B
S 1227 ADD15 4 "CO" 1229 1 SH
N 4885 695 "C16[16]" normal LB B
S 1227 ADD15 5 "S" 1226 1 SH
N 4885 775 "C15[21]" normal LB B
S 1223 ADD25 4 "CO" 1230 1 SH
N 5185 695 "C12[14]" normal LB B
S 1231 1220 ADD221 1 "CI" 1 SH
N 5325 695 "C15[19]" normal LB B
S 1223 ADD25 5 "S" 1234 1 SH
N 5185 775 "C11[15]" normal LB B
S 1233 1220 ADD221 2 "B" 1 SH
N 5325 735 "C15[18]" normal LB B
S 1232 1220 ADD221 3 "A" 1 SH N 5325 775 "C15[15]" normal LB B
S 1235 ADD16 5 "S" 1240 1 SH
N 4885 935 "C15[22]" normal LB B
S 1235 ADD16 4 "CO" 1239 1 SH
N 4885 855 "C16[17]" normal LB B
S 1222 ADD26 4 "CO" 1242 1 SH
N 5185 855 "C12[15]" normal LB B
S 1222 ADD26 5 "S" 1241 1 SH
N 5185 935 "C11[16]" normal LB B
S 1245 1218 ADD222 1 "CI" 1 SH
N 5325 855 "C15[22]" normal LB B
S 1244 1218 ADD222 2 "B" 1 SH
N 5325 895 "C15[21]" normal LB B
S 1243 1218 ADD222 3 "A" 1 SH
N 5325 935 "C15[20]" normal LB B
S 1249 ADD237 4 "CO" 1246 1 SH
N 5745 695 "C20[13]" normal LB B
S 1220 ADD221 4 "CO" 1247 1 SH
N 5465 695 "C16[24]" normal LB B
S 1248 1249 ADD237 1 "CI" 1 SH
N 5605 695 "C19[8]" normal LB B
S 1249 ADD237 5 "S" 1253 1 SH
N 5745 775 "C19[19]" normal LB B
S 1252 1249 ADD237 3 "A" 1 SH
N 5605 775 "C19[6]" normal LB B
S 1220 ADD221 5 "S" 1250 1 SH
N 5465 775 "C15[30]" normal LB B
S 1251 1249 ADD237 2 "B" 1 SH
N 5605 735 "C19[7]" normal LB B
S 1254 1256 ADD35 1 "CI" 1 SH
N 5885 695 "C8[4]" normal LB B
S 1256 ADD35 4 "CO" 1255 1 SH
N 6045 695 "C9[12]" normal LB B
S 1259 1256 ADD35 2 "B" 1 SH
N 5885 735 "C8[3]" normal LB B
S 1258 1256 ADD35 3 "A" 1 SH
N 5885 775 "C8[2]" normal LB B
S 1256 ADD35 5 "S" 1257 1 SH
N 6045 775 "C8[12]" normal LB B
S 1262 ADD238 5 "S" 1261 1 SH
N 5745 935 "C19[20]" normal LB B
S 1262 ADD238 4 "CO" 1260 1 SH
N 5745 855 "C20[14]" normal LB B
S 1267 1262 ADD238 3 "A" 1 SH
N 5605 935 "C19[9]" normal LB B
S 1266 1262 ADD238 2 "B" 1 SH
N 5605 895 "C19[10]" normal LB B
S 1265 1262 ADD238 1 "CI" 1 SH N 5605 855 "C19[11]" normal LB B
S 1218 ADD222 5 "S" 1264 1 SH
N 5465 935 "C15[31]" normal LB B
S 1218 ADD222 4 "CO" 1263 1 SH
N 5465 855 "C16[25]" normal LB B
S 1271 1272 ADD36 1 "CI" 1 SH
N 5885 855 "C8[7]" normal LB B
S 1268 1272 ADD36 2 "B" 1 SH
N 5885 895 "C8[6]" normal LB B
S 1269 1272 ADD36 3 "A" 1 SH
N 5885 935 "C8[5]" normal LB B
S 1272 ADD36 4 "CO" 1270 1 SH
N 6045 855 "C9[13]" normal LB B
S 1272 ADD36 5 "S" 1273 1 SH
N 6045 935 "C8[13]" normal LB B
S 1278 1275 ADD27 1 "CI" 1 SH
N 5025 1015 "C12[1]" normal LB B
S 1277 1275 ADD27 2 "B" 1 SH
N 5025 1055 "C12[0]" normal LB B
S 1289 1276 ADD28 1 "CI" 1 SH
N 5025 1175 "C12[4]" normal LB B
S 1288 1276 ADD28 2 "B" 1 SH
N 5025 1215 "C12[3]" normal LB B
S 1287 1276 ADD28 3 "A" 1 SH
N 5025 1255 "C12[2]" normal LB B
S 1274 VS6 1 "VSS" 1275 ADD27 3 "A" 1 SH
S 1279 ADD17 5 "S" 1281 1 SH
N 4885 1095 "C15[23]" normal LB B
S 1279 ADD17 4 "CO" 1280 1 SH
N 4885 1015 "C16[18]" normal LB B
S 1275 ADD27 4 "CO" 1286 1 SH
N 5185 1015 "C13[15]" normal LB B
S 1275 ADD27 5 "S" 1285 1 SH
N 5185 1095 "C12[16]" normal LB B
S 1284 1219 ADD223 1 "CI" 1 SH
N 5325 1015 "C16[11]" normal LB B
S 1283 1219 ADD223 2 "B" 1 SH
N 5325 1055 "C16[10]" normal LB B
S 1282 1219 ADD223 3 "A" 1 SH
N 5325 1095 "C16[9]" normal LB B
S 1292 ADD18 4 "CO" 1291 1 SH
N 4885 1175 "C17[14]" normal LB B
S 1292 ADD18 5 "S" 1290 1 SH
N 4885 1255 "C16[19]" normal LB B
S 1276 ADD28 4 "CO" 1297 1 SH
N 5185 1175 "C13[16]" normal LB B
S 1276 ADD28 5 "S" 1294 1 SH
N 5185 1255 "C12[17]" normal LB B S 1295 1221 ADD224 1 "CI" 1 SH
N 5325 1175 "C16[14]" normal LB B
S 1296 1221 ADD224 2 "B" 1 SH
N 5325 1215 "C16[13]" normal LB B
S 1293 1221 ADD224 3 "A" 1 SH
N 5325 1255 "C16[12]" normal LB B
S 1298 ADD239 4 "CO" 1305 1 SH
N 5745 1015 "C21[10]" normal LB B
S 1298 ADD239 5 "S" 1304 1 SH
N 5745 1095 "C20[15]" normal LB B
S 1303 1298 ADD239 3 "A" 1 SH
N 5605 1095 "C20[0]" normal LB B
S 1302 1298 ADD239 2 "B" 1 SH
N 5605 1055 "C20[1]" normal LB B
S 1301 1298 ADD239 1 "CI" 1 SH
N 5605 1015 "C20[2]" normal LB B
S 1219 ADD223 5 "S" 1300 1 SH
N 5465 1095 "C16[26]" normal LB B
S 1219 ADD223 4 "CO" 1299 1 SH
N 5465 1015 "C17[19]" normal LB B
S 1310 1311 ADD37 1 "CI" 1 SH
N 5885 1015 "C9[4]" normal LB B
S 1309 1311 ADD37 2 "B" 1 SH
N 5885 1055 "C9[3]" normal LB B
S 1308 1311 ADD37 3 "A" 1 SH
N 5885 1095 "C9[2]" normal LB B
S 1311 ADD37 4 "CO" 1307 1 SH
N 6045 1015 "C10[14]" normal LB B
S 1311 ADD37 5 "S" 1306 1 SH
N 6045 1095 "C9[14]" normal LB B
S 1317 ADD240 4 "CO" 1312 1 SH
N 5745 1175 "C21[11]" normal LB B
S 1317 ADD240 5 "S" 1313 1 SH
N 5745 1255 "C20[16]" normal LB B
S 1221 ADD224 5 "S" 1319 1 SH
N 5465 1255 "C16[27]" normal LB B
S 1221 ADD224 4 "CO" 1318 1 SH
N 5465 1175 "C17[20]" normal LB B
S 1316 1317 ADD240 1 "CI" 1 SH
N 5605 1175 "C20[5]" normal LB B
S 1315 1317 ADD240 2 "B" 1 SH
N 5605 1215 "C20[4]" normal LB B
S 1314 1317 ADD240 3 "A" 1 SH
N 5605 1255 "C20[3]" normal LB B
S 1323 1324 ADD38 1 "CI" 1 SH
N 5885 1175 "C9[7]" normal LB B
S 1320 1324 ADD38 2 "B" 1 SH
N 5885 1215 "C9[6]" normal LB B

```
S 1321 1324 ADD38 3 "A" 1 SH
N 5885 1255 "C9[5]" normal LB B
S 1324 ADD38 4 "CO" 1322 1 SH
N 6045 1175 "C10[15]" normal LB B
S 1324 ADD38 5 "S" 1325 1 SH
N 6045 1255 "C9[15]" normal LB B
S 1340 ADD353 4 "CO" 1359 1 SH
N 6885 695 "C25[7]" normal LB B
S 1340 ADD353 5 "S" 1362 1 SH
N 6885 775 "C24[11]" normal LB B
S 1352 ADD354 5 "S" 1379 1 SH
N 6885 935 "C25[8]" normal LB B
S 1352 ADD354 4 "CO" 1378 1 SH
N 6885 855 "C26[5]" normal LB B
S 1334 1327 ADD337 1 "CI" 1 SH
N 6465 695 "C19[14]" normal LB B
S 1336 1333 ADD321 1 "CI" 1 SH
N 6185 695 "C13[22]" normal LB B
S 1333 ADD321 4 "CO" 1335 1 SH
N 6325 695 "C14[28]" normal LB B
S 1332 1327 ADD337 2 "B" 1 SH
N 6465 735 "C19[13]" normal LB B
S 1328 1327 ADD337 3 "A" 1 SH
N 6465 775 "C19[12]" normal LB B
S 1333 ADD321 5 "S" 1331 1 SH
N 6325 775 "C13[28]" normal LB B
S 1330 1333 ADD321 3 "A" 1 SH
N 6185 775 "C13[20]" normal LB B
S 1329 1333 ADD321 2 "B" 1 SH
N 6185 735 "C13[21]" normal LB B
S 1327 ADD337 4 "CO" 1341 1 SH
N 6605 695 "C20[18]" normal LB B
S 1342 1340 ADD353 1 "CI" 1 SH
N 6745 695 "C24[5]" normal LB B
S 1327 ADD337 5 "S" 1339 1 SH
N 6605 775 "C19[24]" normal LB B
S 1338 1340 ADD353 2 "B" 1 SH
N 6745 735 "C24[4]" normal LB B
S 1337 1340 ADD353 3 "A" 1 SH
N 6745 775 "C24[3]" normal LB B
S 1351 1326 ADD338 3 "A" 1 SH
N 6465 935 "C19[15]" normal LB B
S 1350 1326 ADD338 2 "B" 1 SH
N 6465 895 "C19[16]" normal LB B
S 1349 1326 ADD338 1 "CI" 1 SH
N 6465 855 "C19[17]" normal LB B
S 1343 ADD322 5 "S" 1344 1 SH
N 6325 935 "C14[29]" normal LB B
```

S 1343 ADD322 4 "CO" 1345 1 SH
N 6325 855 "C15[32]" normal LB B
S 1346 1343 ADD322 3 "A" 1 SH
N 6185 935 "C14[17]" normal LB B
S 1347 1343 ADD322 2 "B" 1 SH
N 6185 895 "C14[18]" normal LB B
S 1348 1343 ADD322 1 "CI" 1 SH
N 6185 855 "C14[19]" normal LB B
S 1326 ADD338 4 "CO" 1357 1 SH
N 6605 855 "C20[19]" normal LB B
S 1326 ADD338 5 "S" 1356 1 SH
N 6605 935 "C19[25]" normal LB B
S 1355 1352 ADD354 1 "CI" 1 SH
N 6745 855 "C25[2]" normal LB B
S 1354 1352 ADD354 2 "B" 1 SH
N 6745 895 "C25[1]" normal LB B
S 1353 1352 ADD354 3 "A" 1 SH
N 6745 935 "C25[0]" normal LB B
S 1361 ADD45 4 "CO" 1358 1 SH
N 7185 695 "C7[12]" normal LB B
S 1360 1361 ADD45 1 "CI" 1 SH
N 7025 695 "C6[7]" normal LB B
S 1361 ADD45 5 "S" 1365 1 SH
N 7185 775 "C6[11]" normal LB B
S 1364 1361 ADD45 3 "A" 1 SH
N 7025 775 "C6[5]" normal LB B
S 1363 1361 ADD45 2 "B" 1 SH
N 7025 735 "C6[6]" normal LB B
S 1368 1369 ADD421 1 "CI" 1 SH
N 7325 695 "C14[31]" normal LB B
S 1369 ADD421 4 "CO" 1367 1 SH
N 7465 695 "C15[39]" normal LB B
S 1374 1369 ADD421 2 "B" 1 SH
N 7325 735 "C14[30]" normal LB B
S 1373 1369 ADD421 3 "A" 1 SH
N 7325 775 "C14[29]" normal LB B
S 1369 ADD421 5 "S" 1372 1 SH
N 7465 775 "C14[35]" normal LB B
S 1377 ADD46 5 "S" 1376 1 SH
N 7185 935 "C7[13]" normal LB B
S 1377 ADD46 4 "CO" 1375 1 SH
N 7185 855 "C8[14]" normal LB B
S 1382 1377 ADD46 3 "A" 1 SH
N 7025 935 "C7[5]" normal LB B
S 1381 1377 ADD46 2 "B" 1 SH
N 7025 895 "C7[6]" normal LB B
S 1380 1377 ADD46 1 "CI" 1 SH
N 7025 855 "C7[7]" normal LB B S 1388 1391 ADD422 1 "CI" 1 SH
N 7325 855 "C15[34]" normal LB B
S 1389 1391 ADD422 2 "B" 1 SH
N 7325 895 "C15[33]" normal LB B
S 1390 1391 ADD422 3 "A" 1 SH
N 7325 935 "C15[32]" normal LB B
S 1391 ADD422 4 "CO" 1383 1 SH
N 7465 855 "C16[36]" normal LB B
S 1391 ADD422 5 "S" 1384 1 SH
N 7465 935 "C15[40]" normal LB B
S 1394 1393 ADD339 3 "A" 1 SH
N 6465 1095 "C19[18]" normal LB B
S 1395 1393 ADD339 2 "B" 1 SH
N 6465 1055 "C19[19]" normal LB B
S 1396 1393 ADD339 1 "CI" 1 SH
N 6465 1015 "C19[20]" normal LB B
S 1397 ADD323 5 "S" 1402 1 SH
N 6325 1095 "C14[30]" normal LB B
S 1397 ADD323 4 "CO" 1401 1 SH
N 6325 1015 "C15[33]" normal LB B
S 1398 1397 ADD323 1 "CI" 1 SH
N 6185 1015 "C14[22]" normal LB B
S 1399 1397 ADD323 2 "B" 1 SH
N 6185 1055 "C14[21]" normal LB B
S 1400 1397 ADD323 3 "A" 1 SH
N 6185 1095 "C14[20]" normal LB B
S 1393 ADD339 4 "CO" 1404 1 SH
N 6605 1015 "C20[20]" normal LB B
S 1393 ADD339 5 "S" 1403 1 SH
N 6605 1095 "C19[26]" normal LB B
S 1405 1392 ADD340 3 "A" 1 SH
N 6465 1255 "C20[9]" normal LB B
S 1406 1392 ADD340 2 "B" 1 SH
N 6465 1215 "C20[10]" normal LB B
S 1407 1392 ADD340 1 "CI" 1 SH
N 6465 1175 "C20[11]" normal LB B
S 1412 1409 ADD324 3 "A" 1 SH
N 6185 1255 "C14[23]" normal LB B
S 1411 1409 ADD324 2 "B" 1 SH
N 6185 1215 "C14[24]" normal LB B
S 1410 1409 ADD324 1 "CI" 1 SH
N 6185 1175 "C14[25]" normal LB B
S 1409 ADD324 4 "CO" 1413 1 SH
N 6325 1175 "C15[34]" normal LB B
S 1409 ADD324 5 "S" 1408 1 SH
N 6325 1255 "C14[31]" normal LB B
S 1392 ADD340 4 "CO" 1415 1 SH
N 6605 1175 "C21[15]" normal LB B S 1392 ADD340 5 "S" 1414 1 SH
N 6605 1255 "C20[21]" normal LB B
S 1416 ADD47 5 "S" 1421 1 SH
N 7185 1095 "C7[14]" normal LB B
S 1416 ADD47 4 "CO" 1420 1 SH
N 7185 1015 "C8[15]" normal LB B
S 1419 1416 ADD47 3 "A" 1 SH
N 7025 1095 "C7[8]" normal LB B
S 1418 1416 ADD47 2 "B" 1 SH
N 7025 1055 "C7[9]" normal LB B
S 1417 1416 ADD47 1 "CI" 1 SH
N 7025 1015 "C7[10]" normal LB B
S 1429 1430 ADD423 1 "CI" 1 SH
N 7325 1015 "C15[37]" normal LB B
S 1428 1430 ADD423 2 "B" 1 SH
N 7325 1055 "C15[36]" normal LB B
S 1427 1430 ADD423 3 "A" 1 SH
N 7325 1095 "C15[35]" normal LB B
S 1430 ADD423 4 "CO" 1426 1 SH
N 7465 1015 "C16[37]" normal LB B
S 1430 ADD423 5 "S" 1425 1 SH
N 7465 1095 "C15[41]" normal LB B
S 1431 ADD48 4 "CO" 1435 1 SH
N 7185 1175 "C9[17]" normal LB B
S 1431 ADD48 5 "S" 1436 1 SH
N 7185 1255 "C8[16]" normal LB B
S 1434 1431 ADD48 3 "A" 1 SH
N 7025 1255 "C8[8]" normal LB B
S 1433 1431 ADD48 2 "B" 1 SH
N 7025 1215 "C8[9]" normal LB B
S 1432 1431 ADD48 1 "CI" 1 SH
N 7025 1175 "C8[10]" normal LB B
S 1437 1438 ADD424 1 "CI" 1 SH
N 7325 1175 "C16[32]" normal LB B
S 1445 1438 ADD424 2 "B" 1 SH
N 7325 1215 "C16[31]" normal LB B
S 1444 1438 ADD424 3 "A" 1 SH
N 7325 1255 "C16[30]" normal LB B
S 1438 ADD424 4 "CO" 1443 1 SH
N 7465 1175 "C17[33]" normal LB B
S 1438 ADD424 5 "S" 1442 1 SH
N 7465 1255 "C16[38]" normal LB B
S 1484 4 1 SHM
N 9045 95 "P1[31:1]" normal LB B
S 1485 5 1 SHM
N 9045 115 "P2[31:1]" normal LB B
S 972 ADD517 5 "S" 1477 1 SH
N 8325 135 "C19[32]" normal LB B S 1452 ADD518 4 "CO" 1478 1 SH
N 8325 215 "C21[25]" normal LB B
S 1452 ADD518 5 "S" 1490 1 SH
N 8325 295 "C20[29]" normal LB B
S 1446 ADD519 4 "CO" 1491 1 SH
N 8325 375 "C22[22]" normal LB B
S 1446 ADD519 5 "S" 1523 1 SH
N 8325 455 "C21[26]" normal LB B
S 1503 ADD520 4 "CO" 1530 1 SH
N 8325 535 "C23[19]" normal LB B
S 1503 ADD520 5 "S" 1533 1 SH
N 8325 615 "C22[23]" normal LB B
S 1454 971 ADD51 2 "B" 1 SH
N 7885 95 "C3[0]" normal LB B
S 1458 VS12 1 "VSS" 971 ADD51 3 "A" 1 SH
S 1453 ADD434 4 "CO" 1457 1 SH
N 7745 215 "C22[18]" normal LB B
S 970 ADD433 5 "S" 1456 1 SH
N 7745 135 "C20[27]" normal LB B
S 1455 1451 ADD52 1 "CI" 1 SH
N 7885 215 "C4[4]" normal LB B
S 1459 972 ADD517 2 "B" 1 SH
N 8185 95 "C19[28]" normal LB B
S 971 ADD51 5 "S" 1463 1 SH
N 8045 135 "C3[4]" normal LB B
S 1451 ADD52 4 "CO" 1462 1 SH
N 8045 215 "C5[9]" normal LB B
S 1461 972 ADD517 3 "A" 1 SH
N 8185 135 "C19[27]" normal LB B
S 1460 1452 ADD518 1 "CI" 1 SH
N 8185 215 "C20[26]" normal LB B
S 1447 ADD435 4 "CO" 1468 1 SH
N 7745 375 "C22[19]" normal LB B
S 1453 ADD434 5 "S" 1467 1 SH
N 7745 295 "C21[23]" normal LB B
S 1466 1451 ADD52 2 "B" 1 SH
N 7885 255 "C4[3]" normal LB B
S 1465 1451 ADD52 3 "A" 1 SH
N 7885 295 "C4[2]" normal LB B
S 1464 1450 ADD53 1 "CI" 1 SH
N 7885 375 "C5[7]" normal LB B
S 1451 ADD52 5 "S" 1473 1 SH
N 8045 295 "C4[7]" normal LB B
S 1450 ADD53 4 "CO" 1472 1 SH
N 8045 375 "C6[12]" normal LB B
S 1471 1452 ADD518 2 "B" 1 SH
N 8185 255 "C20[25]" normal LB B
S 1470 1452 ADD518 3 "A" 1 SH N 8185 295 "C20[24]" normal LB B
S 1469 1446 ADD519 1 "CI" 1 SH
N 8185 375 "C21[23]" normal LB B
S 1476 973 ADD61 2 "B" 1 SH
N 8465 95 "C2[0]" normal LB B
S 1474 ADD62 4 "CO" 1482 1 SH
N 8625 215 "P1[4]" normal LB B
S 1479 VS13 1 "VSS" 973 ADD61 3 "A" 1 SH
S 973 ADD61 5 "S" 1480 1 SH
N 8625 135 "P2[2]" normal LB B
S 1481 1474 ADD62 1 "CI" 1 SH
N 8465 215 "C3[4]" normal LB B
S 1483 974 ADD617 2 "B" 1 SH
N 8765 95 "C18[34]" normal LB B
S 1489 974 ADD617 3 "A" 1 SH
N 8765 135 "C18[33]" normal LB B
S 974 ADD617 5 "S" 1488 1 SH
N 8905 135 "P2[18]" normal LB B
S 1487 1475 ADD618 1 "CI" 1 SH
N 8765 215 "C19[32]" normal LB B
S 1475 ADD618 4 "CO" 1486 1 SH
N 8905 215 "P1[20]" normal LB B
S 1495 1448 ADD63 1 "CI" 1 SH
N 8465 375 "C4[7]" normal LB B
S 1474 ADD62 5 "S" 1494 1 SH
N 8625 295 "P2[3]" normal LB B
S 1493 1474 ADD62 3 "A" 1 SH
N 8465 295 "C3[2]" normal LB B
S 1492 1474 ADD62 2 "B" 1 SH
N 8465 255 "C3[3]" normal LB B
S 1448 ADD63 4 "CO" 1496 1 SH
N 8625 375 "P1[5]" normal LB B
S 1501 1475 ADD618 2 "B" 1 SH
N 8765 255 "C19[31]" normal LB B
S 1500 1475 ADD618 3 "A" 1 SH
N 8765 295 "C19[30]" normal LB B
S 1475 ADD618 5 "S" 1499 1 SH
N 8905 295 "P2[19]" normal LB B
S 1498 1449 ADD619 1 "CI" 1 SH
N 8765 375 "C20[29]" normal LB B
S 1449 ADD619 4 "CO" 1497 1 SH
N 8905 375 "P1[21]" normal LB B
S 1447 ADD435 5 "S" 1506 1 SH
N 7745 455 "C21[24]" normal LB B
S 1507 1450 ADD53 2 "B" 1 SH
N 7885 415 "C5[6]" normal LB B
S 1505 1450 ADD53 3 "A" 1 SH
N 7885 455 "C5[5]" normal LB B S 1450 ADD53 5 "S" 1510 1 SH
N 8045 455 "C5[10]" normal LB B
S 1509 1446 ADD519 2 "B" 1 SH
N 8185 415 "C21[22]" normal LB B
S 1508 1446 ADD519 3 "A" 1 SH
N 8185 455 "C21[21]" normal LB B
S 1504 ADD436 4 "CO" 1512 1 SH
N 7745 535 "C23[15]" normal LB B
S 1511 1502 ADD54 1 "CI" 1 SH
N 7885 535 "C6[10]" normal LB B
S 1504 ADD436 5 "S" 1515 1 SH
N 7745 615 "C22[20]" normal LB B
S 1514 1502 ADD54 2 "B" 1 SH
N 7885 575 "C6[9]" normal LB B
S 1513 1502 ADD54 3 "A" 1 SH
N 7885 615 "C6[8]" normal LB B
S 1502 ADD54 4 "CO" 1517 1 SH
N 8045 535 "C7[15]" normal LB B
S 1516 1503 ADD520 1 "CI" 1 SH
N 8185 535 "C22[20]" normal LB B
S 1502 ADD54 5 "S" 1518 1 SH
N 8045 615 "C6[13]" normal LB B
S 1519 1503 ADD520 2 "B" 1 SH
N 8185 575 "C22[19]" normal LB B
S 1520 1503 ADD520 3 "A" 1 SH
N 8185 615 "C22[18]" normal LB B
S 1525 1448 ADD63 3 "A" 1 SH
N 8465 455 "C4[5]" normal LB B
S 1448 ADD63 5 "S" 1526 1 SH
N 8625 455 "P2[4]" normal LB B
S 1524 1448 ADD63 2 "B" 1 SH
N 8465 415 "C4[6]" normal LB B
S 1529 1449 ADD619 2 "B" 1 SH
N 8765 415 "C20[28]" normal LB B
S 1528 1449 ADD619 3 "A" 1 SH
N 8765 455 "C20[27]" normal LB B
S 1449 ADD619 5 "S" 1527 1 SH
N 8905 455 "P2[20]" normal LB B
S 1531 1521 ADD64 1 "CI" 1 SH
N 8465 535 "C5[10]" normal LB B
S 1521 ADD64 4 "CO" 1532 1 SH
N 8625 535 "P1[6]" normal LB B
S 1521 ADD64 5 "S" 1536 1 SH
N 8625 615 "P2[5]" normal LB B
S 1535 1521 ADD64 3 "A" 1 SH
N 8465 615 "C5[8]" normal LB B
S 1534 1521 ADD64 2 "B" 1 SH
N 8465 575 "C5[9]" normal LB B S 1538 1522 ADD620 1 "CI" 1 SH
N 8765 535 "C21[26]" normal LB B
S 1522 ADD620 4 "CO" 1537 1 SH
N 8905 535 "P1[22]" normal LB B
S 1541 1522 ADD620 2 "B" 1 SH
N 8765 575 "C21[25]" normal LB B
S 1540 1522 ADD620 3 "A" 1 SH
N 8765 615 "C21[24]" normal LB B
S 1522 ADD620 5 "S" 1539 1 SH
N 8905 615 "P2[21]" normal LB B
S 1543 VD0 1 "VDD" 1542 ALIAS 1 "C1" 1 SH
S 1542 ALIAS 1 "C1" 1544 1 SH
N 9160 205 "P1[31]" normal LB B
S 1556 ADD521 4 "CO" 1571 1 SH
N 8325 695 "C24[16]" normal LB B
S 1556 ADD521 5 "S" 1575 1 SH
N 8325 775 "C23[20]" normal LB B
S 1565 ADD522 4 "CO" 1586 1 SH
N 8325 855 "C25[13]" normal LB B
S 1565 ADD522 5 "S" 1587 1 SH
N 8325 935 "C24[17]" normal LB B
S 1607 ADD523 4 "CO" 1626 1 SH
N 8325 1015 "C26[10]" normal LB B
S 1607 ADD523 5 "S" 1627 1 SH
N 8325 1095 "C25[14]" normal LB B
S 1619 ADD524 4 "CO" 1643 1 SH
N 8325 1175 "C27[7]" normal LB B
S 1619 ADD524 5 "S" 1644 1 SH
N 8325 1255 "C26[11]" normal LB B
S 1550 ADD437 4 "CO" 1552 1 SH
N 7745 695 "C23[16]" normal LB B
S 1551 1546 ADD55 1 "CI" 1 SH
N 7885 695 "C7[13]" normal LB B
S 1549 1546 ADD55 3 "A" 1 SH
N 7885 775 "C7[11]" normal LB B
S 1548 1546 ADD55 2 "B" 1 SH
N 7885 735 "C7[12]" normal LB B
S 1550 ADD437 5 "S" 1547 1 SH
N 7745 775 "C22[21]" normal LB B
S 1546 ADD55 4 "CO" 1557 1 SH
N 8045 695 "C8[18]" normal LB B
S 1558 1556 ADD521 1 "CI" 1 SH
N 8185 695 "C23[17]" normal LB B
S 1546 ADD55 5 "S" 1553 1 SH
N 8045 775 "C7[16]" normal LB B
S 1554 1556 ADD521 2 "B" 1 SH
N 8185 735 "C23[16]" normal LB B
S 1555 1556 ADD521 3 "A" 1 SH N 8185 775 "C23[15]" normal LB B
S 1562 ADD438 5 "S" 1564 1 SH
N 7745 935 "C23[17]" normal LB B
S 1562 ADD438 4 "CO" 1563 1 SH
N 7745 855 "C24[12]" normal LB B
S 1559 1545 ADD56 1 "CI" 1 SH
N 7885 855 "C8[16]" normal LB B
S 1560 1545 ADD56 2 "B" 1 SH
N 7885 895 "C8[15]" normal LB B
S 1561 1545 ADD56 3 "A" 1 SH
N 7885 935 "C8[14]" normal LB B
S 1545 ADD56 4 "CO" 1570 1 SH
N 8045 855 "C9[21]" normal LB B
S 1545 ADD56 5 "S" 1569 1 SH
N 8045 935 "C8[19]" normal LB B
S 1568 1565 ADD522 1 "CI" 1 SH
N 8185 855 "C24[14]" normal LB B
S 1567 1565 ADD522 2 "B" 1 SH
N 8185 895 "C24[13]" normal LB B
S 1566 1565 ADD522 3 "A" 1 SH
N 8185 935 "C24[12]" normal LB B
S 1572 1574 ADD65 1 "CI" 1 SH
N 8465 695 "C6[13]" normal LB B
S 1574 ADD65 4 "CO" 1573 1 SH
N 8625 695 "P1[7]" normal LB B
S 1576 1574 ADD65 2 "B" 1 SH
N 8465 735 "C6[12]" normal LB B
S 1577 1574 ADD65 3 "A" 1 SH
N 8465 775 "C6[11]" normal LB B
S 1574 ADD65 5 "S" 1578 1 SH
N 8625 775 "P2[6]" normal LB B
S 1579 1581 ADD621 1 "CI" 1 SH
N 8765 695 "C22[23]" normal LB B
S 1581 ADD621 4 "CO" 1580 1 SH
N 8905 695 "P1[23]" normal LB B
S 1581 ADD621 5 "S" 1582 1 SH
N 8905 775 "P2[22]" normal LB B
S 1584 1581 ADD621 3 "A" 1 SH
N 8765 775 "C22[21]" normal LB B
S 1583 1581 ADD621 2 "B" 1 SH
N 8765 735 "C22[22]" normal LB B
S 1585 ADD66 5 "S" 1592 1 SH
N 8625 935 "P2[7]" normal LB B
S 1585 ADD66 4 "CO" 1591 1 SH
N 8625 855 "P1[8]" normal LB B
S 1590 1585 ADD66 3 "A" 1 SH
N 8465 935 "C7[14]" normal LB B
S 1589 1585 ADD66 2 "B" 1 SH N 8465 895 "C7[15]" normal LB B
S 1588 1585 ADD66 1 "CI" 1 SH
N 8465 855 "C7[16]" normal LB B
S 1598 1593 ADD622 1 "CI" 1 SH
N 8765 855 "C23[20]" normal LB B
S 1597 1593 ADD622 2 "B" 1 SH
N 8765 895 "C23[19]" normal LB B
S 1596 1593 ADD622 3 "A" 1 SH
N 8765 935 "C23[18]" normal LB B
S 1593 ADD622 4 "CO" 1595 1 SH
N 8905 855 "P1[24]" normal LB B
S 1593 ADD622 5 "S" 1594 1 SH
N 8905 935 "P2[23]" normal LB B
S 1604 ADD439 5 "S" 1606 1 SH
N 7745 1095 "C23[18]" normal LB B
S 1604 ADD439 4 "CO" 1605 1 SH
N 7745 1015 "C24[13]" normal LB B
S 1603 1600 ADD57 1 "CI" 1 SH
N 7885 1015 "C9[19]" normal LB B
S 1602 1600 ADD57 2 "B" 1 SH
N 7885 1055 "C9[18]" normal LB B
S 1601 1600 ADD57 3 "A" 1 SH
N 7885 1095 "C9[17]" normal LB B
S 1600 ADD57 4 "CO" 1612 1 SH
N 8045 1015 "C10[24]" normal LB B
S 1600 ADD57 5 "S" 1611 1 SH
N 8045 1095 "C9[22]" normal LB B
S 1610 1607 ADD523 1 "CI" 1 SH
N 8185 1015 "C25[11]" normal LB B
S 1609 1607 ADD523 2 "B" 1 SH
N 8185 1055 "C25[10]" normal LB B
S 1608 1607 ADD523 3 "A" 1 SH
N 8185 1095 "C25[9]" normal LB B
S 1614 ADD440 4 "CO" 1613 1 SH
N 7745 1175 "C25[9]" normal LB B
S 1614 ADD440 5 "S" 1618 1 SH
N 7745 1255 "C24[14]" normal LB B
S 1617 1599 ADD58 1 "CI" 1 SH
N 7885 1175 "C10[22]" normal LB B
S 1616 1599 ADD58 2 "B" 1 SH
N 7885 1215 "C10[21]" normal LB B
S 1615 1599 ADD58 3 "A" 1 SH
N 7885 1255 "C10[20]" normal LB B
S 1599 ADD58 4 "CO" 1620 1 SH
N 8045 1175 "C11[27]" normal LB B
S 1599 ADD58 5 "S" 1624 1 SH
N 8045 1255 "C10[25]" normal LB B
S 1623 1619 ADD524 1 "CI" 1 SH N 8185 1175 "C26[8]" normal LB B
S 1622 1619 ADD524 2 "B" 1 SH
N 8185 1215 "C26[7]" normal LB B
S 1621 1619 ADD524 3 "A" 1 SH
N 8185 1255 "C26[6]" normal LB B
S 1625 ADD67 5 "S" 1632 1 SH
N 8625 1095 "P2[8]" normal LB B
S 1625 ADD67 4 "CO" 1631 1 SH
N 8625 1015 "P1[9]" normal LB B
S 1630 1625 ADD67 3 "A" 1 SH
N 8465 1095 "C8[17]" normal LB B
S 1629 1625 ADD67 2 "B" 1 SH
N 8465 1055 "C8[18]" normal LB B
S 1628 1625 ADD67 1 "CI" 1 SH
N 8465 1015 "C8[19]" normal LB B
S 1637 1638 ADD623 1 "CI" 1 SH
N 8765 1015 "C24[17]" normal LB B
S 1636 1638 ADD623 2 "B" 1 SH
N 8765 1055 "C24[16]" normal LB B
S 1635 1638 ADD623 3 "A" 1 SH
N 8765 1095 "C24[15]" normal LB B
S 1638 ADD623 4 "CO" 1634 1 SH
N 8905 1015 "P1[25]" normal LB B
S 1638 ADD623 5 "S" 1633 1 SH
N 8905 1095 "P2[24]" normal LB B
S 1646 1642 ADD68 2 "B" 1 SH
N 8465 1215 "C9[21]" normal LB B
S 1645 1642 ADD68 1 "CI" 1 SH
N 8465 1175 "C9[22]" normal LB B
S 1641 1642 ADD68 3 "A" 1 SH
N 8465 1255 "C9[20]" normal LB B
S 1642 ADD68 4 "CO" 1640 1 SH
N 8625 1175 "P1[10]" normal LB B
S 1642 ADD68 5 "S" 1639 1 SH
N 8625 1255 "P2[9]" normal LB B
S 1651 1652 ADD624 1 "CI" 1 SH
N 8765 1175 "C25[14]" normal LB B
S 1650 1652 ADD624 2 "B" 1 SH
N 8765 1215 "C25[13]" normal LB B
S 1649 1652 ADD624 3 "A" 1 SH
N 8765 1255 "C25[12]" normal LB B
S 1652 ADD624 4 "CO" 1648 1 SH
N 8905 1175 "P1[26]" normal LB B
S 1652 ADD624 5 "S" 1647 1 SH
N 8905 1255 "P2[25]" normal LB B
S 1690 9 NORA14B5 1 "A2" 1 SH
N 1755 1315 "NA[14]" normal LB B
S 1691 1653 NORA15B5 1 "A2" 1 SH N 1755 1405 "NA[15]" normal LB B
S 1684 1653 NORA15B5 2 "A1" 1 SH
N 1755 1425 "B[5]" normal LB B
S 1692 9 NORA14B5 2 "A1" 1 SH
S 12 NORA14B2 3 "ZN" 1676 1 SH
N 1075 1325 "C16[1]" normal LB B
S 1654 NORA15B2 3 "ZN" 1677 1 SH
N 1075 1415 "C17[0]" normal LB B
S 1663 21 NORA14B1 1 "A2" 1 SH
N 675 1315 "NA[14]" normal LB B
S 1664 1656 NORA15B1 1 "A2" 1 SH
N 675 1405 "NA[15]" normal LB B
S 1665 1656 NORA15B1 2 "A1" 1 SH
N 675 1425 "B[1]" normal LB B
S 1658 20 NORA14B0 1 "A2" 1 SH
N 405 1315 "NA[14]" normal LB B
S 1657 20 NORA14B0 2 "A1" 1 SH
S 1660 1655 NORA15B0 1 "A2" 1 SH
N 405 1405 "NA[15]" normal LB B
S 20 NORA14B0 3 "ZN" 1659 1 SH
N 535 1325 "C14[0]" normal LB B
S 1655 NORA15B0 3 "ZN" 1662 1 SH
N 535 1415 "C15[0]" normal LB B
S 1661 1655 NORA15B0 2 "A1" 1 SH
N 405 1425 "B[0]" normal LB B
S 1656 NORA15B1 3 "ZN" 1672 1 SH
N 805 1415 "C16[0]" normal LB B
S 21 NORA14B1 3 "ZN" 1671 1 SH
N 805 1325 "C15[1]" normal LB B
S 1670 12 NORA14B2 1 "A2" 1 SH
N 945 1315 "NA[14]" normal LB B
S 1669 1654 NORA15B2 1 "A2" 1 SH
N 945 1405 "NA[15]" normal LB B
S 1668 1654 NORA15B2 2 "A1" 1 SH
N 945 1425 "B[2]" normal LB B
S 1667 21 NORA14B1 2 "A1" 1 SH
S 1666 12 NORA14B2 2 "A1" 1 SH
S 1675 11 NORA14B3 2 "A1" 1 SH
S 1678 11 NORA14B3 1 "A2" 1 SH
N 1215 1315 "NA[14]" normal LB B
S 11 NORA14B3 3 "ZN" 1679 1 SH
N 1345 1325 "C17[1]" normal LB B
S 1680 1673 NORA15B3 1 "A2" 1 SH
N 1215 1405 "NA[15]" normal LB B
S 1681 1673 NORA15B3 2 "A1" 1 SH
N 1215 1425 "B[3]" normal LB B
S 1673 NORA15B3 3 "ZN" 1682 1 SH
N 1345 1415 "C18[0]" normal LB B S 1688 1674 NORA15B4 2 "A1" 1 SH
N 1485 1425 "B[4]" normal LB B
S 1674 NORA15B4 3 "ZN" 1689 1 SH
N 1615 1415 "C19[0]" normal LB B
S 1687 1674 NORA15B4 1 "A2" 1 SH
N 1485 1405 "NA[15]" normal LB B
S 1683 10 NORA14B4 2 "A1" 1 SH
S 10 NORA14B4 3 "ZN" 1686 1 SH
N 1615 1325 "C18[1]" normal LB B
S 1685 10 NORA14B4 1 "A2" 1 SH
N 1485 1315 "NA[14]" normal LB B
S 17 NORA14B10 3 "ZN" 1732 1 SH
N 3235 1325 "C24[1]" normal LB B
S 1693 NORA15B10 3 "ZN" 1733 1 SH
N 3235 1415 "C25[0]" normal LB B
S 13 NORA14B6 3 "ZN" 1706 1 SH
N 2155 1325 "C20[1]" normal LB B
S 1694 NORA15B6 3 "ZN" 1705 1 SH
N 2155 1415 "C21[0]" normal LB B
S 1700 1694 NORA15B6 2 "A1" 1 SH
N 2025 1425 "B[6]" normal LB B
S 1698 13 NORA14B6 2 "A1" 1 SH
S 1697 13 NORA14B6 1 "A2" 1 SH
N 2025 1315 "NA[14]" normal LB B
S 1653 NORA15B5 3 "ZN" 1696 1 SH
N 1885 1415 "C20[0]" normal LB B
S 9 NORA14B5 3 "ZN" 1701 1 SH
N 1885 1325 "C19[1]" normal LB B
S 1699 1694 NORA15B6 1 "A2" 1 SH
N 2025 1405 "NA[15]" normal LB B
S 1702 1695 NORA15B7 1 "A2" 1 SH
N 2295 1405 "NA[15]" normal LB B
S 14 NORA14B7 3 "ZN" 1703 1 SH
N 2425 1325 "C21[1]" normal LB B
S 1704 14 NORA14B7 1 "A2" 1 SH
N 2295 1315 "NA[14]" normal LB B
S 1707 1695 NORA15B7 2 "A1" 1 SH
N 2295 1425 "B[7]" normal LB B
S 1695 NORA15B7 3 "ZN" 1708 1 SH
N 2425 1415 "C22[0]" normal LB B
S 1709 14 NORA14B7 2 "A1" 1 SH
S 1714 15 NORA14B8 1 "A2" 1 SH
N 2565 1315 "NA[14]" normal LB B
S 1713 15 NORA14B8 2 "A1" 1 SH
S 1717 1711 NORA15B8 2 "A1" 1 SH
N 2565 1425 "B[8]" normal LB B
S 1716 1711 NORA15B8 1 "A2" 1 SH
N 2565 1405 "NA[15]" normal LB B S 15 NORA14B8 3 "ZN" 1715 1 SH
N 2695 1325 "C22[1]" normal LB B
S 1712 16 NORA14B9 2 "A1" 1 SH
S 1719 16 NORA14B9 1 "A2" 1 SH
N 2835 1315 "NA[14]" normal LB B
S 1720 1710 NORA15B9 1 "A2" 1 SH
N 2835 1405 "NA[15]" normal LB B
S 1721 1710 NORA15B9 2 "A1" 1 SH
N 2835 1425 "B[9]" normal LB B
S 1711 NORA15B8 3 "ZN" 1718 1 SH
N 2695 1415 "C23[0]" normal LB B
S 1710 NORA15B9 3 "ZN" 1727 1 SH
N 2965 1415 "C24[0]" normal LB B
S 16 NORA14B9 3 "ZN" 1726 1 SH
N 2965 1325 "C23[1]" normal LB B
S 1725 17 NORA14B10 1 "A2" 1 SH
N 3105 1315 "NA[14]" normal LB B
S 1724 1693 NORA15B10 1 "A2" 1 SH
N 3105 1405 "NA[15]" normal LB B
S 1723 1693 NORA15B10 2 "A1" 1 SH
N 3105 1425 "B[10]" normal LB B
S 1722 17 NORA14B10 2 "A1" 1 SH
S 1729 NORA15B11 3 "ZN" 1731 1 SH
N 3505 1415 "C26[0]" normal LB B
S 1734 18 NORA14B11 1 "A2" 1 SH
N 3375 1315 "NA[14]" normal LB B
S 1738 18 NORA14B11 2 "A1" 1 SH
S 1737 1729 NORA15B11 2 "A1" 1 SH
N 3375 1425 "B[11]" normal LB B
S 1736 1729 NORA15B11 1 "A2" 1 SH
N 3375 1405 "NA[15]" normal LB B
S 18 NORA14B11 3 "ZN" 1735 1 SH
N 3505 1325 "C25[1]" normal LB B
S 1748 6 NORA14B13 2 "A1" 1 SH
S 1746 1728 NORA15B13 2 "A1" 1 SH
N 3915 1425 "B[13]" normal LB B
S 1739 1728 NORA15B13 1 "A2" 1 SH
N 3915 1405 "NA[15]" normal LB B
S 1740 6 NORA14B13 1 "A2" 1 SH
N 3915 1315 "NA[14]" normal LB B
S 1730 NORA15B12 3 "ZN" 1741 1 SH
N 3775 1415 "C27[0]" normal LB B
S 1742 1730 NORA15B12 2 "A1" 1 SH
N 3645 1425 "B[12]" normal LB B
S 1743 1730 NORA15B12 1 "A2" 1 SH
N 3645 1405 "NA[15]" normal LB B
S 19 NORA14B12 3 "ZN" 1744 1 SH
N 3775 1325 "C26[1]" normal LB B S 1747 19 NORA14B12 2 "A1" 1 SH
S 1745 19 NORA14B12 1 "A2" 1 SH
N 3645 1315 "NA[14]" normal LB B
S 7 NORA14B14 3 "ZN" 1759 1 SH
N 4315 1325 "C28[1]" normal LB B
S 1749 NORA15B14 3 "ZN" 1760 1 SH
N 4315 1415 "C29[0]" normal LB B
S 1755 1749 NORA15B14 1 "A2" 1 SH
N 4185 1405 "NA[15]" normal LB B
S 1756 1749 NORA15B14 2 "A1" 1 SH
N 4185 1425 "B[14]" normal LB B
S 1751 7 NORA14B14 2 "A1" 1 SH
S 6 NORA14B13 3 "ZN" 1752 1 SH
N 4045 1325 "C27[1]" normal LB B
S 1728 NORA15B13 3 "ZN" 1753 1 SH
N 4045 1415 "C28[0]" normal LB B
S 1754 7 NORA14B14 1 "A2" 1 SH
N 4185 1315 "NA[14]" normal LB B
S 1750 NORA15B15 3 "ZN" 1764 1 SH
N 4585 1415 "C30[0]" normal LB B
S 1763 1750 NORA15B15 1 "A2" 1 SH
N 4455 1405 "NA[15]" normal LB B
S 8 NORA14B15 3 "ZN" 1762 1 SH
N 4585 1325 "C29[1]" normal LB B
S 1758 1757 1 SV
S 1757 1750 NORA15B15 2 "A1" 1 SH
S 1758 8 NORA14B15 2 "A1" 1 SH
S 1761 8 NORA14B15 1 "A2" 1 SH
N 4455 1315 "A[14]" normal LB B
S 1924 2169 ADD441 1 "CI" 1 SH
N 7605 1335 "C24[11]" normal LB B
S 1923 2169 ADD441 2 "B" 1 SH
N 7605 1375 "C24[10]" normal LB B
S 1922 2169 ADD441 3 "A" 1 SH
N 7605 1415 "C24[9]" normal LB B
S 1941 2180 ADD442 1 "CI" 1 SH
N 7605 1495 "C25[5]" normal LB B
S 1940 2180 ADD442 2 "B" 1 SH
N 7605 1535 "C25[4]" normal LB B
S 1939 2180 ADD442 3 "A" 1 SH
N 7605 1575 "C25[3]" normal LB B
S 1973 2220 ADD443 1 "CI" 1 SH
N 7605 1655 "C25[8]" normal LB B
S 1972 2220 ADD443 2 "B" 1 SH
N 7605 1695 "C25[7]" normal LB B
S 1971 2220 ADD443 3 "A" 1 SH
N 7605 1735 "C25[6]" normal LB B
S 1983 2163 ADD444 1 "CI" 1 SH N 7605 1815 "C26[2]" normal LB B
S 1982 2163 ADD444 2 "B" 1 SH
N 7605 1855 "C26[1]" normal LB B
S 2097 2163 ADD444 3 "A" 1 SH
N 7605 1895 "C26[0]" normal LB B
S 2099 2254 ADD445 1 "CI" 1 SH
N 7605 1975 "C26[5]" normal LB B
S 2098 2254 ADD445 2 "B" 1 SH
N 7605 2015 "C26[4]" normal LB B
S 2108 2254 ADD445 3 "A" 1 SH
N 7605 2055 "C26[3]" normal LB B
S 2112 2250 ADD446 1 "CI" 1 SH
N 7605 2135 "C27[2]" normal LB B
S 2111 2250 ADD446 2 "B" 1 SH
N 7605 2175 "C27[1]" normal LB B
S 2145 2250 ADD446 3 "A" 1 SH
N 7605 2215 "C27[0]" normal LB B
S 1805 1802 ADD29 1 "CI" 1 SH
N 5025 1335 "C12[7]" normal LB B
S 1804 1802 ADD29 2 "B" 1 SH
N 5025 1375 "C12[6]" normal LB B
S 1803 1802 ADD29 3 "A" 1 SH
N 5025 1415 "C12[5]" normal LB B
S 1816 1801 ADD210 1 "CI" 1 SH
N 5025 1495 "C12[10]" normal LB B
S 1817 1801 ADD210 2 "B" 1 SH
N 5025 1535 "C12[9]" normal LB B
S 1818 1801 ADD210 3 "A" 1 SH
N 5025 1575 "C12[8]" normal LB B
S 1806 ADD19 5 "S" 1807 1 SH
N 4885 1415 "C16[20]" normal LB B
S 1806 ADD19 4 "CO" 1808 1 SH
N 4885 1335 "C17[15]" normal LB B
S 1802 ADD29 4 "CO" 1813 1 SH
N 5185 1335 "C13[17]" normal LB B
S 1802 ADD29 5 "S" 1812 1 SH
N 5185 1415 "C12[18]" normal LB B
S 1811 1800 ADD225 1 "CI" 1 SH
N 5325 1335 "C16[17]" normal LB B
S 1810 1800 ADD225 2 "B" 1 SH
N 5325 1375 "C16[16]" normal LB B
S 1809 1800 ADD225 3 "A" 1 SH
N 5325 1415 "C16[15]" normal LB B
S 1819 ADD110 4 "CO" 1814 1 SH
N 4885 1495 "C17[16]" normal LB B
S 1819 ADD110 5 "S" 1815 1 SH
N 4885 1575 "C16[21]" normal LB B
S 1801 ADD210 4 "CO" 1822 1 SH N 5185 1495 "C13[18]" normal LB B
S 1801 ADD210 5 "S" 1821 1 SH
N 5185 1575 "C12[19]" normal LB B
S 1820 1799 ADD226 1 "CI" 1 SH
N 5325 1495 "C16[20]" normal LB B
S 1824 1799 ADD226 2 "B" 1 SH
N 5325 1535 "C16[19]" normal LB B
S 1823 1799 ADD226 3 "A" 1 SH
N 5325 1575 "C16[18]" normal LB B
S 1825 ADD241 4 "CO" 1832 1 SH
N 5745 1335 "C21[12]" normal LB B
S 1825 ADD241 5 "S" 1831 1 SH
N 5745 1415 "C20[17]" normal LB B
S 1830 1825 ADD241 3 "A" 1 SH
N 5605 1415 "C20[6]" normal LB B
S 1829 1825 ADD241 2 "B" 1 SH
N 5605 1375 "C20[7]" normal LB B
S 1828 1825 ADD241 1 "CI" 1 SH
N 5605 1335 "C20[8]" normal LB B
S 1800 ADD225 5 "S" 1827 1 SH
N 5465 1415 "C16[28]" normal LB B
S 1800 ADD225 4 "CO" 1826 1 SH
N 5465 1335 "C17[21]" normal LB B
S 1837 1838 ADD39 1 "CI" 1 SH
N 5885 1335 "C9[10]" normal LB B
S 1836 1838 ADD39 2 "B" 1 SH
N 5885 1375 "C9[9]" normal LB B
S 1835 1838 ADD39 3 "A" 1 SH
N 5885 1415 "C9[8]" normal LB B
S 1838 ADD39 4 "CO" 1834 1 SH
N 6045 1335 "C10[16]" normal LB B
S 1838 ADD39 5 "S" 1833 1 SH
N 6045 1415 "C9[16]" normal LB B
S 1844 ADD242 4 "CO" 1839 1 SH
N 5745 1495 "C22[9]" normal LB B
S 1844 ADD242 5 "S" 1840 1 SH
N 5745 1575 "C21[13]" normal LB B
S 1799 ADD226 5 "S" 1846 1 SH
N 5465 1575 "C16[29]" normal LB B
S 1799 ADD226 4 "CO" 1845 1 SH
N 5465 1495 "C17[22]" normal LB B
S 1843 1844 ADD242 1 "CI" 1 SH
N 5605 1495 "C21[2]" normal LB B
S 1842 1844 ADD242 2 "B" 1 SH
N 5605 1535 "C21[1]" normal LB B
S 1841 1844 ADD242 3 "A" 1 SH
N 5605 1575 "C21[0]" normal LB B
S 1850 1851 ADD310 1 "CI" 1 SH N 5885 1495 "C10[7]" normal LB B
S 1847 1851 ADD310 2 "B" 1 SH
N 5885 1535 "C10[6]" normal LB B
S 1848 1851 ADD310 3 "A" 1 SH
N 5885 1575 "C10[5]" normal LB B
S 1851 ADD310 4 "CO" 1849 1 SH
N 6045 1495 "C11[17]" normal LB B
S 1851 ADD310 5 "S" 1852 1 SH
N 6045 1575 "C10[17]" normal LB B
S 1865 1791 ADD212 2 "B" 1 SH
N 5025 1855 "C13[6]" normal LB B
S 1866 1791 ADD212 1 "CI" 1 SH
N 5025 1815 "C13[7]" normal LB B
S 1857 1853 ADD211 1 "CI" 1 SH
N 5025 1655 "C13[4]" normal LB B
S 1856 1853 ADD211 2 "B" 1 SH
N 5025 1695 "C13[3]" normal LB B
S 1855 1853 ADD211 3 "A" 1 SH
N 5025 1735 "C13[2]" normal LB B
S 1854 ADD111 5 "S" 1859 1 SH
N 4885 1735 "C17[17]" normal LB B
S 1854 ADD111 4 "CO" 1858 1 SH
N 4885 1655 "C18[13]" normal LB B
S 1853 ADD211 4 "CO" 1864 1 SH
N 5185 1655 "C14[18]" normal LB B
S 1853 ADD211 5 "S" 1863 1 SH
N 5185 1735 "C13[19]" normal LB B
S 1862 1798 ADD227 1 "CI" 1 SH
N 5325 1655 "C17[8]" normal LB B
S 1861 1798 ADD227 2 "B" 1 SH
N 5325 1695 "C17[7]" normal LB B
S 1860 1798 ADD227 3 "A" 1 SH
N 5325 1735 "C17[6]" normal LB B
S 1790 ADD112 4 "CO" 1867 1 SH
N 4885 1815 "C18[14]" normal LB B
S 1791 ADD212 4 "CO" 1868 1 SH
N 5185 1815 "C14[19]" normal LB B
S 1870 1789 ADD228 1 "CI" 1 SH
N 5325 1815 "C17[11]" normal LB B
S 1869 1789 ADD228 2 "B" 1 SH
N 5325 1855 "C17[10]" normal LB B
S 1876 1871 ADD243 2 "B" 1 SH
N 5605 1695 "C21[4]" normal LB B
S 1877 1871 ADD243 3 "A" 1 SH
N 5605 1735 "C21[3]" normal LB B
S 1798 ADD227 4 "CO" 1873 1 SH
N 5465 1655 "C18[16]" normal LB B
S 1798 ADD227 5 "S" 1874 1 SH N 5465 1735 "C17[23]" normal LB B
S 1875 1871 ADD243 1 "CI" 1 SH
N 5605 1655 "C21[5]" normal LB B
S 1871 ADD243 4 "CO" 1879 1 SH
N 5745 1655 "C22[10]" normal LB B
S 1871 ADD243 5 "S" 1878 1 SH
N 5745 1735 "C21[14]" normal LB B
S 1884 1872 ADD311 1 "CI" 1 SH
N 5885 1655 "C10[10]" normal LB B
S 1883 1872 ADD311 2 "B" 1 SH
N 5885 1695 "C10[9]" normal LB B
S 1882 1872 ADD311 3 "A" 1 SH
N 5885 1735 "C10[8]" normal LB B
S 1872 ADD311 4 "CO" 1881 1 SH
N 6045 1655 "C11[18]" normal LB B
S 1872 ADD311 5 "S" 1880 1 SH
N 6045 1735 "C10[18]" normal LB B
S 1792 ADD244 4 "CO" 1888 1 SH
N 5745 1815 "C23[8]" normal LB B
S 1789 ADD228 4 "CO" 1887 1 SH
N 5465 1815 "C18[17]" normal LB B
S 1886 1792 ADD244 1 "CI" 1 SH
N 5605 1815 "C22[2]" normal LB B
S 1885 1792 ADD244 2 "B" 1 SH
N 5605 1855 "C22[1]" normal LB B
S 1891 1793 ADD312 1 "CI" 1 SH
N 5885 1815 "C10[13]" normal LB B
S 1890 1793 ADD312 2 "B" 1 SH
N 5885 1855 "C10[12]" normal LB B
S 1793 ADD312 4 "CO" 1889 1 SH
N 6045 1815 "C11[19]" normal LB B
S 1902 1892 ADD341 3 "A" 1 SH
N 6465 1415 "C20[12]" normal LB B
S 1901 1892 ADD341 2 "B" 1 SH
N 6465 1375 "C20[13]" normal LB B
S 1900 1892 ADD341 1 "CI" 1 SH
N 6465 1335 "C20[14]" normal LB B
S 1899 ADD325 5 "S" 1894 1 SH
N 6325 1415 "C15[35]" normal LB B
S 1899 ADD325 4 "CO" 1895 1 SH
N 6325 1335 "C16[30]" normal LB B
S 1898 1899 ADD325 1 "CI" 1 SH
N 6185 1335 "C15[25]" normal LB B
S 1897 1899 ADD325 2 "B" 1 SH
N 6185 1375 "C15[24]" normal LB B
S 1896 1899 ADD325 3 "A" 1 SH
N 6185 1415 "C15[23]" normal LB B
S 1892 ADD341 4 "CO" 1903 1 SH N 6605 1335 "C21[16]" normal LB B
S 1892 ADD341 5 "S" 1904 1 SH
N 6605 1415 "C20[22]" normal LB B
S 1908 1893 ADD342 3 "A" 1 SH
N 6465 1575 "C20[15]" normal LB B
S 1907 1893 ADD342 2 "B" 1 SH
N 6465 1535 "C20[16]" normal LB B
S 1906 1893 ADD342 1 "CI" 1 SH
N 6465 1495 "C20[17]" normal LB B
S 1912 1909 ADD326 3 "A" 1 SH
N 6185 1575 "C15[26]" normal LB B
S 1911 1909 ADD326 2 "B" 1 SH
N 6185 1535 "C15[27]" normal LB B
S 1910 1909 ADD326 1 "CI" 1 SH
N 6185 1495 "C15[28]" normal LB B
S 1909 ADD326 4 "CO" 1913 1 SH
N 6325 1495 "C16[31]" normal LB B
S 1909 ADD326 5 "S" 1905 1 SH
N 6325 1575 "C15[36]" normal LB B
S 1893 ADD342 4 "CO" 1915 1 SH
N 6605 1495 "C21[17]" normal LB B
S 1893 ADD342 5 "S" 1914 1 SH
N 6605 1575 "C20[23]" normal LB B
S 1916 ADD49 5 "S" 1921 1 SH
N 7185 1415 "C8[17]" normal LB B
S 1916 ADD49 4 "CO" 1920 1 SH
N 7185 1335 "C9[18]" normal LB B
S 1919 1916 ADD49 3 "A" 1 SH
N 7025 1415 "C8[11]" normal LB B
S 1918 1916 ADD49 2 "B" 1 SH
N 7025 1375 "C8[12]" normal LB B
S 1917 1916 ADD49 1 "CI" 1 SH
N 7025 1335 "C8[13]" normal LB B
S 1929 1930 ADD425 1 "CI" 1 SH
N 7325 1335 "C16[35]" normal LB B
S 1928 1930 ADD425 2 "B" 1 SH
N 7325 1375 "C16[34]" normal LB B
S 1927 1930 ADD425 3 "A" 1 SH
N 7325 1415 "C16[33]" normal LB B
S 1930 ADD425 4 "CO" 1926 1 SH
N 7465 1335 "C17[34]" normal LB B
S 1930 ADD425 5 "S" 1925 1 SH
N 7465 1415 "C16[39]" normal LB B
S 1931 ADD410 4 "CO" 1935 1 SH
N 7185 1495 "C10[20]" normal LB B
S 1931 ADD410 5 "S" 1936 1 SH
N 7185 1575 "C9[19]" normal LB B
S 1934 1931 ADD410 3 "A" 1 SH N 7025 1575 "C9[11]" normal LB B
S 1933 1931 ADD410 2 "B" 1 SH
N 7025 1535 "C9[12]" normal LB B
S 1932 1931 ADD410 1 "CI" 1 SH
N 7025 1495 "C9[13]" normal LB B
S 1937 1938 ADD426 1 "CI" 1 SH
N 7325 1495 "C17[29]" normal LB B
S 1945 1938 ADD426 2 "B" 1 SH
N 7325 1535 "C17[28]" normal LB B
S 1944 1938 ADD426 3 "A" 1 SH
N 7325 1575 "C17[27]" normal LB B
S 1938 ADD426 4 "CO" 1943 1 SH
N 7465 1495 "C18[30]" normal LB B
S 1938 ADD426 5 "S" 1942 1 SH
N 7465 1575 "C17[35]" normal LB B
S 1951 1947 ADD327 1 "CI" 1 SH
N 6185 1655 "C15[31]" normal LB B
S 1952 1947 ADD327 2 "B" 1 SH
N 6185 1695 "C15[30]" normal LB B
S 1950 1946 ADD343 1 "CI" 1 SH
N 6465 1655 "C21[8]" normal LB B
S 1949 1946 ADD343 2 "B" 1 SH
N 6465 1695 "C21[7]" normal LB B
S 1948 1946 ADD343 3 "A" 1 SH
N 6465 1735 "C21[6]" normal LB B
S 1947 ADD327 5 "S" 1955 1 SH
N 6325 1735 "C15[37]" normal LB B
S 1947 ADD327 4 "CO" 1954 1 SH
N 6325 1655 "C16[32]" normal LB B
S 1953 1947 ADD327 3 "A" 1 SH
N 6185 1735 "C15[29]" normal LB B
S 1946 ADD343 4 "CO" 1957 1 SH
N 6605 1655 "C22[12]" normal LB B
S 1946 ADD343 5 "S" 1956 1 SH
N 6605 1735 "C21[18]" normal LB B
S 1959 1797 ADD344 1 "CI" 1 SH
N 6465 1815 "C21[11]" normal LB B
S 1958 1797 ADD344 2 "B" 1 SH
N 6465 1855 "C21[10]" normal LB B
S 1796 ADD328 4 "CO" 1962 1 SH
N 6325 1815 "C17[27]" normal LB B
S 1961 1796 ADD328 2 "B" 1 SH
N 6185 1855 "C16[22]" normal LB B
S 1960 1796 ADD328 1 "CI" 1 SH
N 6185 1815 "C16[23]" normal LB B
S 1797 ADD344 4 "CO" 1963 1 SH
N 6605 1815 "C22[13]" normal LB B
S 1966 1964 ADD411 1 "CI" 1 SH N 7025 1655 "C9[16]" normal LB B
S 1964 ADD411 5 "S" 1970 1 SH
N 7185 1735 "C9[20]" normal LB B
S 1964 ADD411 4 "CO" 1969 1 SH
N 7185 1655 "C10[21]" normal LB B
S 1968 1964 ADD411 3 "A" 1 SH
N 7025 1735 "C9[14]" normal LB B
S 1967 1964 ADD411 2 "B" 1 SH
N 7025 1695 "C9[15]" normal LB B
S 1978 1965 ADD427 1 "CI" 1 SH
N 7325 1655 "C17[32]" normal LB B
S 1977 1965 ADD427 2 "B" 1 SH
N 7325 1695 "C17[31]" normal LB B
S 1976 1965 ADD427 3 "A" 1 SH
N 7325 1735 "C17[30]" normal LB B
S 1965 ADD427 4 "CO" 1975 1 SH
N 7465 1655 "C18[31]" normal LB B
S 1965 ADD427 5 "S" 1974 1 SH
N 7465 1735 "C17[36]" normal LB B
S 1795 ADD412 4 "CO" 1981 1 SH
N 7185 1815 "C11[23]" normal LB B
S 1980 1795 ADD412 2 "B" 1 SH
N 7025 1855 "C10[15]" normal LB B
S 1979 1795 ADD412 1 "CI" 1 SH
N 7025 1815 "C10[16]" normal LB B
S 1986 1794 ADD428 1 "CI" 1 SH
N 7325 1815 "C18[26]" normal LB B
S 1985 1794 ADD428 2 "B" 1 SH
N 7325 1855 "C18[25]" normal LB B
S 1794 ADD428 4 "CO" 1984 1 SH
N 7465 1815 "C19[27]" normal LB B
S 1995 1791 ADD212 3 "A" 1 SH
N 5025 1895 "C13[5]" normal LB B
S 2006 1990 ADD214 2 "B" 1 SH
N 5025 2175 "C13[12]" normal LB B
S 2007 1990 ADD214 1 "CI" 1 SH
N 5025 2135 "C13[13]" normal LB B
S 1997 1992 ADD213 1 "CI" 1 SH
N 5025 1975 "C13[10]" normal LB B
S 1998 1992 ADD213 2 "B" 1 SH
N 5025 2015 "C13[9]" normal LB B
S 2005 1992 ADD213 3 "A" 1 SH
N 5025 2055 "C13[8]" normal LB B
S 1790 ADD112 5 "S" 1994 1 SH
N 4885 1895 "C17[18]" normal LB B
S 1993 ADD113 4 "CO" 1996 1 SH
N 4885 1975 "C19[12]" normal LB B
S 1791 ADD212 5 "S" 1999 1 SH N 5185 1895 "C13[20]" normal LB B
S 2000 1789 ADD228 3 "A" 1 SH
N 5325 1895 "C17[9]" normal LB B
S 1992 ADD213 4 "CO" 2003 1 SH
N 5185 1975 "C14[20]" normal LB B
S 2002 1987 ADD229 1 "CI" 1 SH
N 5325 1975 "C17[14]" normal LB B
S 2001 1987 ADD229 2 "B" 1 SH
N 5325 2015 "C17[13]" normal LB B
S 1993 ADD113 5 "S" 2004 1 SH
N 4885 2055 "C18[15]" normal LB B
S 1992 ADD213 5 "S" 2009 1 SH
N 5185 2055 "C13[21]" normal LB B
S 2008 1987 ADD229 3 "A" 1 SH
N 5325 2055 "C17[12]" normal LB B
S 1990 ADD214 4 "CO" 2012 1 SH
N 5185 2135 "C14[21]" normal LB B
S 2011 1988 ADD230 1 "CI" 1 SH
N 5325 2135 "C17[17]" normal LB B
S 2010 1988 ADD230 2 "B" 1 SH
N 5325 2175 "C17[16]" normal LB B
S 1792 ADD244 5 "S" 2014 1 SH
N 5745 1895 "C22[11]" normal LB B
S 1789 ADD228 5 "S" 2015 1 SH
N 5465 1895 "C17[24]" normal LB B
S 2016 1792 ADD244 3 "A" 1 SH
N 5605 1895 "C22[0]" normal LB B
S 1987 ADD229 4 "CO" 2017 1 SH
N 5465 1975 "C18[18]" normal LB B
S 1793 ADD312 5 "S" 2019 1 SH
N 6045 1895 "C10[19]" normal LB B
S 2013 ADD313 4 "CO" 2022 1 SH
N 6045 1975 "C12[20]" normal LB B
S 2021 2013 ADD313 2 "B" 1 SH
N 5885 2015 "C11[9]" normal LB B
S 2020 2013 ADD313 1 "CI" 1 SH
N 5885 1975 "C11[10]" normal LB B
S 2018 1793 ADD312 3 "A" 1 SH
N 5885 1895 "C10[11]" normal LB B
S 1988 ADD230 4 "CO" 2024 1 SH
N 5465 2135 "C18[19]" normal LB B
S 1987 ADD229 5 "S" 2023 1 SH
N 5465 2055 "C17[25]" normal LB B
S 2025 2013 ADD313 3 "A" 1 SH
N 5885 2055 "C11[8]" normal LB B
S 2013 ADD313 5 "S" 2026 1 SH
N 6045 2055 "C11[20]" normal LB B
S 2027 1991 ADD314 1 "CI" 1 SH N 5885 2135 "C11[13]" normal LB B
S 2028 1991 ADD314 2 "B" 1 SH
N 5885 2175 "C11[12]" normal LB B
S 1991 ADD314 4 "CO" 2029 1 SH
N 6045 2135 "C12[21]" normal LB B
S 2031 1990 ADD214 3 "A" 1 SH
N 5025 2215 "C13[11]" normal LB B
S 2032 2030 ADD215 1 "CI" 1 SH
N 5025 2295 "C14[7]" normal LB B
S 2033 2030 ADD215 2 "B" 1 SH
N 5025 2335 "C14[6]" normal LB B
S 2039 2030 ADD215 3 "A" 1 SH
N 5025 2375 "C14[5]" normal LB B
S 2040 1782 ADD216 1 "CI" 1 SH
N 5025 2455 "C14[10]" normal LB B
S 2041 1782 ADD216 2 "B" 1 SH
N 5025 2495 "C14[9]" normal LB B
S 2034 1989 ADD231 2 "B" 1 SH
N 5325 2335 "C18[4]" normal LB B
S 2030 ADD215 4 "CO" 2037 1 SH
N 5185 2295 "C15[24]" normal LB B
S 1990 ADD214 5 "S" 2036 1 SH
N 5185 2215 "C13[22]" normal LB B
S 2035 1989 ADD231 1 "CI" 1 SH
N 5325 2295 "C18[5]" normal LB B
S 2038 1988 ADD230 3 "A" 1 SH
N 5325 2215 "C17[15]" normal LB B
S 1782 ADD216 4 "CO" 2046 1 SH
N 5185 2455 "C15[25]" normal LB B
S 2030 ADD215 5 "S" 2045 1 SH
N 5185 2375 "C14[22]" normal LB B
S 2044 1989 ADD231 3 "A" 1 SH
N 5325 2375 "C18[3]" normal LB B
S 2043 1781 ADD232 1 "CI" 1 SH
N 5325 2455 "C18[8]" normal LB B
S 2042 1781 ADD232 2 "B" 1 SH
N 5325 2495 "C18[7]" normal LB B
S 1988 ADD230 5 "S" 2048 1 SH
N 5465 2215 "C17[26]" normal LB B
S 1989 ADD231 4 "CO" 2049 1 SH
N 5465 2295 "C19[13]" normal LB B
S 2050 1991 ADD314 3 "A" 1 SH
N 5885 2215 "C11[11]" normal LB B
S 1991 ADD314 5 "S" 2051 1 SH
N 6045 2215 "C11[21]" normal LB B
S 2052 2047 ADD315 1 "CI" 1 SH
N 5885 2295 "C11[16]" normal LB B
S 2053 2047 ADD315 2 "B" 1 SH

```
N 5885 2335 "C11[15]" normal LB B
S 2047 ADD315 4 "CO" 2054 1 SH
N 6045 2295 "C12[22]" normal LB B
S 1989 ADD231 5 "S" 2055 1 SH
N 5465 2375 "C18[20]" normal LB B
S 1781 ADD232 4 "CO" 2056 1 SH
N 5465 2455 "C19[14]" normal LB B
S 2047 ADD315 5 "S" 2060 1 SH
N 6045 2375 "C11[22]" normal LB B
S 2059 2047 ADD315 3 "A" 1 SH
N 5885 2375 "C11[14]" normal LB B
S 2061 1780 ADD316 1 "CI" 1 SH
N 5885 2455 "C12[13]" normal LB B
S 2058 1780 ADD316 2 "B" 1 SH
N 5885 2495 "C12[12]" normal LB B
S 1780 ADD316 4 "CO" 2057 1 SH
N 6045 2455 "C13[23]" normal LB B
S 1796 ADD328 5 "S" 2069 1 SH
N 6325 1895 "C16[33]" normal LB B
S 2068 1796 ADD328 3 "A" 1 SH
N 6185 1895 "C16[21]" normal LB B
S 2070 1797 ADD344 3 "A" 1 SH
N 6465 1895 "C21[9]" normal LB B
S 2074 2066 ADD345 1 "CI" 1 SH
N 6465 1975 "C21[14]" normal LB B
S 2072 2067 ADD329 2 "B" 1 SH
N 6185 2015 "C16[25]" normal LB B
S 2071 2067 ADD329 1 "CI" 1 SH
N 6185 1975 "C16[26]" normal LB B
S 2067 ADD329 4 "CO" 2073 1 SH
N 6325 1975 "C17[28]" normal LB B
S 2075 2066 ADD345 2 "B" 1 SH
N 6465 2015 "C21[13]" normal LB B
S 1797 ADD344 5 "S" 2076 1 SH
N 6605 1895 "C21[19]" normal LB B
S 2066 ADD345 4 "CO" 2077 1 SH
N 6605 1975 "C22[14]" normal LB B
S 2081 2062 ADD346 2 "B" 1 SH
N 6465 2175 "C22[4]" normal LB B
S 2082 2062 ADD346 1 "CI" 1 SH
N 6465 2135 "C22[5]" normal LB B
S 2080 2066 ADD345 3 "A" 1 SH
N 6465 2055 "C21[12]" normal LB B
S 2067 ADD329 5 "S" 2079 1 SH
N 6325 2055 "C16[34]" normal LB B
S 2078 2067 ADD329 3 "A" 1 SH
N 6185 2055 "C16[24]" normal LB B
S 2065 ADD330 4 "CO" 2085 1 SH
```

N 6325 2135 "C17[29]" normal LB B
S 2084 2065 ADD330 2 "B" 1 SH
N 6185 2175 "C16[28]" normal LB B
S 2083 2065 ADD330 1 "CI" 1 SH
N 6185 2135 "C16[29]" normal LB B
S 2066 ADD345 5 "S" 2086 1 SH
N 6605 2055 "C21[20]" normal LB B
S 2062 ADD346 4 "CO" 2087 1 SH
N 6605 2135 "C23[9]" normal LB B
S 1795 ADD412 5 "S" 2090 1 SH
N 7185 1895 "C10[22]" normal LB B
S 2091 1795 ADD412 3 "A" 1 SH
N 7025 1895 "C10[14]" normal LB B
S 2088 ADD413 4 "CO" 2094 1 SH
N 7185 1975 "C11[24]" normal LB B
S 2092 2088 ADD413 1 "CI" 1 SH
N 7025 1975 "C10[19]" normal LB B
S 2093 2088 ADD413 2 "B" 1 SH
N 7025 2015 "C10[18]" normal LB B
S 2095 1794 ADD428 3 "A" 1 SH
N 7325 1895 "C18[24]" normal LB B
S 1794 ADD428 5 "S" 2096 1 SH
N 7465 1895 "C18[32]" normal LB B
S 2102 2089 ADD429 2 "B" 1 SH
N 7325 2015 "C18[28]" normal LB B
S 2101 2089 ADD429 1 "CI" 1 SH
N 7325 1975 "C18[29]" normal LB B
S 2089 ADD429 4 "CO" 2100 1 SH
N 7465 1975 "C19[28]" normal LB B
S 2088 ADD413 5 "S" 2104 1 SH
N 7185 2055 "C10[23]" normal LB B
S 2064 ADD414 4 "CO" 2107 1 SH
N 7185 2135 "C12[26]" normal LB B
S 2103 2088 ADD413 3 "A" 1 SH
N 7025 2055 "C10[17]" normal LB B
S 2106 2064 ADD414 2 "B" 1 SH
N 7025 2175 "C11[18]" normal LB B
S 2105 2064 ADD414 1 "CI" 1 SH
N 7025 2135 "C11[19]" normal LB B
S 2110 2089 ADD429 3 "A" 1 SH
N 7325 2055 "C18[27]" normal LB B
S 2089 ADD429 5 "S" 2109 1 SH
N 7465 2055 "C18[33]" normal LB B
S 2115 2063 ADD430 1 "CI" 1 SH
N 7325 2135 "C19[23]" normal LB B
S 2114 2063 ADD430 2 "B" 1 SH
N 7325 2175 "C19[22]" normal LB B
S 2063 ADD430 4 "CO" 2113 1 SH N 7465 2135 "C20[24]" normal LB B
S 2119 2116 ADD347 1 "CI" 1 SH
N 6465 2295 "C22[8]" normal LB B
S 2120 2062 ADD346 3 "A" 1 SH
N 6465 2215 "C22[3]" normal LB B
S 2118 2116 ADD347 2 "B" 1 SH
N 6465 2335 "C22[7]" normal LB B
S 2117 ADD331 4 "CO" 2125 1 SH
N 6325 2295 "C18[24]" normal LB B
S 2121 2065 ADD330 3 "A" 1 SH
N 6185 2215 "C16[27]" normal LB B
S 2065 ADD330 5 "S" 2122 1 SH
N 6325 2215 "C16[35]" normal LB B
S 2123 2117 ADD331 1 "CI" 1 SH
N 6185 2295 "C17[20]" normal LB B
S 2124 2117 ADD331 2 "B" 1 SH
N 6185 2335 "C17[19]" normal LB B
S 2062 ADD346 5 "S" 2127 1 SH
N 6605 2215 "C22[15]" normal LB B
S 2116 ADD347 4 "CO" 2126 1 SH
N 6605 2295 "C23[10]" normal LB B
S 2129 1787 ADD348 1 "CI" 1 SH
N 6465 2455 "C22[11]" normal LB B
S 2128 1787 ADD348 2 "B" 1 SH
N 6465 2495 "C22[10]" normal LB B
S 2130 2116 ADD347 3 "A" 1 SH
N 6465 2375 "C22[6]" normal LB B
S 2134 1788 ADD332 2 "B" 1 SH
N 6185 2495 "C17[22]" normal LB B
S 2133 1788 ADD332 1 "CI" 1 SH
N 6185 2455 "C17[23]" normal LB B
S 2117 ADD331 5 "S" 2132 1 SH
N 6325 2375 "C17[30]" normal LB B
S 2131 2117 ADD331 3 "A" 1 SH
N 6185 2375 "C17[18]" normal LB B
S 1788 ADD332 4 "CO" 2135 1 SH
N 6325 2455 "C18[25]" normal LB B
S 2116 ADD347 5 "S" 2137 1 SH
N 6605 2375 "C22[16]" normal LB B
S 1787 ADD348 4 "CO" 2136 1 SH
N 6605 2455 "C23[11]" normal LB B
S 2064 ADD414 5 "S" 2143 1 SH
N 7185 2215 "C11[25]" normal LB B
S 2138 ADD415 4 "CO" 2144 1 SH
N 7185 2295 "C12[27]" normal LB B
S 2140 2064 ADD414 3 "A" 1 SH
N 7025 2215 "C11[17]" normal LB B
S 2141 2138 ADD415 1 "CI" 1 SH N 7025 2295 "C11[22]" normal LB B
S 2142 2138 ADD415 2 "B" 1 SH
N 7025 2335 "C11[21]" normal LB B
S 2150 2063 ADD430 3 "A" 1 SH
N 7325 2215 "C19[21]" normal LB B
S 2063 ADD430 5 "S" 2149 1 SH
N 7465 2215 "C19[29]" normal LB B
S 2148 2139 ADD431 1 "CI" 1 SH
N 7325 2295 "C19[26]" normal LB B
S 2147 2139 ADD431 2 "B" 1 SH
N 7325 2335 "C19[25]" normal LB B
S 2139 ADD431 4 "CO" 2146 1 SH
N 7465 2295 "C20[25]" normal LB B
S 1786 ADD416 4 "CO" 2155 1 SH
N 7185 2455 "C13[29]" normal LB B
S 2138 ADD415 5 "S" 2154 1 SH
N 7185 2375 "C11[26]" normal LB B
S 2153 1786 ADD416 2 "B" 1 SH
N 7025 2495 "C12[21]" normal LB B
S 2152 1786 ADD416 1 "CI" 1 SH
N 7025 2455 "C12[22]" normal LB B
S 2151 2138 ADD415 3 "A" 1 SH
N 7025 2375 "C11[20]" normal LB B
S 2160 2139 ADD431 3 "A" 1 SH
N 7325 2375 "C19[24]" normal LB B
S 2139 ADD431 5 "S" 2159 1 SH
N 7465 2375 "C19[30]" normal LB B
S 2158 1785 ADD432 1 "CI" 1 SH
N 7325 2455 "C20[20]" normal LB B
S 2157 1785 ADD432 2 "B" 1 SH
N 7325 2495 "C20[19]" normal LB B
S 1785 ADD432 4 "CO" 2156 1 SH
N 7465 2455 "C21[21]" normal LB B
S 2178 ADD525 4 "CO" 2192 1 SH
N 8325 1335 "C28[4]" normal LB B
S 2178 ADD525 5 "S" 2193 1 SH
N 8325 1415 "C27[8]" normal LB B
S 2185 ADD526 4 "CO" 2209 1 SH
N 8325 1495 "C29[2]" normal LB B
S 2185 ADD526 5 "S" 2210 1 SH
N 8325 1575 "C28[5]" normal LB B
S 2169 ADD441 5 "S" 2167 1 SH
N 7745 1415 "C24[15]" normal LB B
S 2169 ADD441 4 "CO" 2168 1 SH
N 7745 1335 "C25[10]" normal LB B
S 2172 2165 ADD59 1 "CI" 1 SH
N 7885 1335 "C11[25]" normal LB B
S 2171 2165 ADD59 2 "B" 1 SH N 7885 1375 "C11[24]" normal LB B
S 2170 2165 ADD59 3 "A" 1 SH
N 7885 1415 "C11[23]" normal LB B
S 2165 ADD59 4 "CO" 2173 1 SH
N 8045 1335 "C12[30]" normal LB B
S 2165 ADD59 5 "S" 2174 1 SH
N 8045 1415 "C11[28]" normal LB B
S 2175 2178 ADD525 1 "CI" 1 SH
N 8185 1335 "C27[5]" normal LB B
S 2176 2178 ADD525 2 "B" 1 SH
N 8185 1375 "C27[4]" normal LB B
S 2177 2178 ADD525 3 "A" 1 SH
N 8185 1415 "C27[3]" normal LB B
S 2180 ADD442 4 "CO" 2179 1 SH
N 7745 1495 "C26[6]" normal LB B
S 2180 ADD442 5 "S" 2182 1 SH
N 7745 1575 "C25[11]" normal LB B
S 2181 2166 ADD510 1 "CI" 1 SH
N 7885 1495 "C12[28]" normal LB B
S 2184 2166 ADD510 2 "B" 1 SH
N 7885 1535 "C12[27]" normal LB B
S 2183 2166 ADD510 3 "A" 1 SH
N 7885 1575 "C12[26]" normal LB B
S 2166 ADD510 4 "CO" 2186 1 SH
N 8045 1495 "C13[33]" normal LB B
S 2166 ADD510 5 "S" 2190 1 SH
N 8045 1575 "C12[31]" normal LB B
S 2189 2185 ADD526 1 "CI" 1 SH
N 8185 1495 "C28[2]" normal LB B
S 2188 2185 ADD526 2 "B" 1 SH
N 8185 1535 "C28[1]" normal LB B
S 2187 2185 ADD526 3 "A" 1 SH
N 8185 1575 "C28[0]" normal LB B
S 2191 ADD69 5 "S" 2198 1 SH
N 8625 1415 "P2[10]" normal LB B
S 2191 ADD69 4 "CO" 2197 1 SH
N 8625 1335 "P1[11]" normal LB B
S 2196 2191 ADD69 3 "A" 1 SH
N 8465 1415 "C10[23]" normal LB B
S 2195 2191 ADD69 2 "B" 1 SH
N 8465 1375 "C10[24]" normal LB B
S 2194 2191 ADD69 1 "CI" 1 SH
N 8465 1335 "C10[25]" normal LB B
S 2203 2204 ADD625 1 "CI" 1 SH
N 8765 1335 "C26[11]" normal LB B
S 2202 2204 ADD625 2 "B" 1 SH
N 8765 1375 "C26[10]" normal LB B
S 2201 2204 ADD625 3 "A" 1 SH N 8765 1415 "C26[9]" normal LB B
S 2204 ADD625 4 "CO" 2200 1 SH
N 8905 1335 "P1[27]" normal LB B
S 2204 ADD625 5 "S" 2199 1 SH
N 8905 1415 "P2[26]" normal LB B
S 2212 2208 ADD610 2 "B" 1 SH
N 8465 1535 "C11[27]" normal LB B
S 2211 2208 ADD610 1 "CI" 1 SH
N 8465 1495 "C11[28]" normal LB B
S 2207 2208 ADD610 3 "A" 1 SH
N 8465 1575 "C11[26]" normal LB B
S 2208 ADD610 4 "CO" 2206 1 SH
N 8625 1495 "P1[12]" normal LB B
S 2208 ADD610 5 "S" 2205 1 SH
N 8625 1575 "P2[11]" normal LB B
S 2217 2218 ADD626 1 "CI" 1 SH
N 8765 1495 "C27[8]" normal LB B
S 2216 2218 ADD626 2 "B" 1 SH
N 8765 1535 "C27[7]" normal LB B
S 2215 2218 ADD626 3 "A" 1 SH
N 8765 1575 "C27[6]" normal LB B
S 2218 ADD626 4 "CO" 2214 1 SH
N 8905 1495 "P1[28]" normal LB B
S 2218 ADD626 5 "S" 2213 1 SH
N 8905 1575 "P2[27]" normal LB B
S 2225 2219 ADD511 3 "A" 1 SH
N 7885 1735 "C13[29]" normal LB B
S 2224 2219 ADD511 2 "B" 1 SH
N 7885 1695 "C13[30]" normal LB B
S 2220 ADD443 4 "CO" 2221 1 SH
N 7745 1655 "C26[7]" normal LB B
S 2220 ADD443 5 "S" 2222 1 SH
N 7745 1735 "C25[12]" normal LB B
S 2223 2219 ADD511 1 "CI" 1 SH
N 7885 1655 "C13[31]" normal LB B
S 2219 ADD511 4 "CO" 2227 1 SH
N 8045 1655 "C14[36]" normal LB B
S 2219 ADD511 5 "S" 2226 1 SH
N 8045 1735 "C13[34]" normal LB B
S 2163 ADD444 4 "CO" 2230 1 SH
N 7745 1815 "C27[4]" normal LB B
S 2229 2164 ADD512 1 "CI" 1 SH
N 7885 1815 "C14[34]" normal LB B
S 2228 2164 ADD512 2 "B" 1 SH
N 7885 1855 "C14[33]" normal LB B
S 2164 ADD512 4 "CO" 2231 1 SH
N 8045 1815 "C15[42]" normal LB B
S 2232 ADD611 5 "S" 2238 1 SH N 8625 1735 "P2[12]" normal LB B
S 2232 ADD611 4 "CO" 2237 1 SH
N 8625 1655 "P1[13]" normal LB B
S 2234 2232 ADD611 1 "CI" 1 SH
N 8465 1655 "C12[31]" normal LB B
S 2235 2232 ADD611 2 "B" 1 SH
N 8465 1695 "C12[30]" normal LB B
S 2236 2232 ADD611 3 "A" 1 SH
N 8465 1735 "C12[29]" normal LB B
S 2241 2233 ADD627 3 "A" 1 SH
N 8765 1735 "C28[3]" normal LB B
S 2242 2233 ADD627 2 "B" 1 SH
N 8765 1695 "C28[4]" normal LB B
S 2233 ADD627 5 "S" 2239 1 SH
N 8905 1735 "P2[28]" normal LB B
S 2233 ADD627 4 "CO" 2240 1 SH
N 8905 1655 "P1[29]" normal LB B
S 2243 2233 ADD627 1 "CI" 1 SH
N 8765 1655 "C28[5]" normal LB B
S 2162 ADD612 4 "CO" 2246 1 SH
N 8625 1815 "P1[14]" normal LB B
S 2245 2162 ADD612 2 "B" 1 SH
N 8465 1855 "C13[33]" normal LB B
S 2244 2162 ADD612 1 "CI" 1 SH
N 8465 1815 "C13[34]" normal LB B
S 2249 2161 ADD628 1 "CI" 1 SH
N 8765 1815 "C29[2]" normal LB B
S 2248 2161 ADD628 2 "B" 1 SH
N 8765 1855 "C29[1]" normal LB B
S 2161 ADD628 4 "CO" 2247 1 SH
N 8905 1815 "P1[30]" normal LB B
S 2163 ADD444 5 "S" 2259 1 SH
N 7745 1895 "C26[8]" normal LB B
S 2258 2164 ADD512 3 "A" 1 SH
N 7885 1895 "C14[32]" normal LB B
S 2254 ADD445 4 "CO" 2255 1 SH
N 7745 1975 "C27[5]" normal LB B
S 2256 2253 ADD513 1 "CI" 1 SH
N 7885 1975 "C15[40]" normal LB B
S 2257 2253 ADD513 2 "B" 1 SH
N 7885 2015 "C15[39]" normal LB B
S 2253 ADD513 4 "CO" 2261 1 SH
N 8045 1975 "C16[40]" normal LB B
S 2164 ADD512 5 "S" 2260 1 SH
N 8045 1895 "C14[37]" normal LB B
S 2254 ADD445 5 "S" 2263 1 SH
N 7745 2055 "C26[9]" normal LB B
S 2262 2253 ADD513 3 "A" 1 SH N 7885 2055 "C15[38]" normal LB B
S 2264 2251 ADD514 1 "CI" 1 SH
N 7885 2135 "C16[38]" normal LB B
S 2250 ADD446 4 "CO" 2265 1 SH
N 7745 2135 "C28[3]" normal LB B
S 2266 2251 ADD514 2 "B" 1 SH
N 7885 2175 "C16[37]" normal LB B
S 2253 ADD513 5 "S" 2267 1 SH
N 8045 2055 "C15[43]" normal LB B
S 2251 ADD514 4 "CO" 2268 1 SH
N 8045 2135 "C17[37]" normal LB B
S 2269 ADD613 4 "CO" 2275 1 SH
N 8625 1975 "P1[15]" normal LB B
S 2271 2162 ADD612 3 "A" 1 SH
N 8465 1895 "C13[32]" normal LB B
S 2162 ADD612 5 "S" 2272 1 SH
N 8625 1895 "P2[13]" normal LB B
S 2273 2269 ADD613 1 "CI" 1 SH
N 8465 1975 "C14[37]" normal LB B
S 2274 2269 ADD613 2 "B" 1 SH
N 8465 2015 "C14[36]" normal LB B
S 2161 ADD628 5 "S" 2277 1 SH
N 8905 1895 "P2[29]" normal LB B
S 2276 2161 ADD628 3 "A" 1 SH
N 8765 1895 "C29[0]" normal LB B
S 2270 ADD629 4 "CO" 2280 1 SH
N 8905 1975 "P2[31]" normal LB B
S 2279 2270 ADD629 2 "B" 1 SH
N 8765 2015 "NB[15]" normal LB B
S 2278 2270 ADD629 1 "CI" 1 SH
N 8765 1975 "C30[0]" normal LB B
S 2281 2269 ADD613 3 "A" 1 SH
N 8465 2055 "C14[35]" normal LB B
S 2269 ADD613 5 "S" 2282 1 SH
N 8625 2055 "P2[14]" normal LB B
S 2252 ADD614 4 "CO" 2285 1 SH
N 8625 2135 "P1[16]" normal LB B
S 2284 2252 ADD614 2 "B" 1 SH
N 8465 2175 "C15[42]" normal LB B
S 2283 2252 ADD614 1 "CI" 1 SH
N 8465 2135 "C15[43]" normal LB B
S 2270 ADD629 5 "S" 2286 1 SH
N 8905 2055 "P2[30]" normal LB B
S 2287 2270 ADD629 3 "A" 1 SH
N 8765 2055 "NA[15]" normal LB B
S 2250 ADD446 5 "S" 2289 1 SH
N 7745 2215 "C27[6]" normal LB B
S 2290 2251 ADD514 3 "A" 1 SH N 7885 2215 "C16[36]" normal LB B
S 2251 ADD514 5 "S" 2291 1 SH
N 8045 2215 "C16[41]" normal LB B
S 2292 2288 ADD515 1 "CI" 1 SH
N 7885 2295 "C17[35]" normal LB B
S 2293 2288 ADD515 2 "B" 1 SH
N 7885 2335 "C17[34]" normal LB B
S 2294 2288 ADD515 3 "A" 1 SH
N 7885 2375 "C17[33]" normal LB B
S 2288 ADD515 4 "CO" 2295 1 SH
N 8045 2295 "C18[34]" normal LB B
S 2288 ADD515 5 "S" 2296 1 SH
N 8045 2375 "C17[38]" normal LB B
S 2297 1784 ADD516 1 "CI" 1 SH
N 7885 2455 "C18[32]" normal LB B
S 2298 1784 ADD516 2 "B" 1 SH
N 7885 2495 "C18[31]" normal LB B
S 1784 ADD516 4 "CO" 2299 1 SH
N 8045 2455 "C19[31]" normal LB B
S 2301 2252 ADD614 3 "A" 1 SH
N 8465 2215 "C15[41]" normal LB B
S 2252 ADD614 5 "S" 2302 1 SH
N 8625 2215 "P2[15]" normal LB B
S 2303 2300 ADD615 1 "CI" 1 SH
N 8465 2295 "C16[41]" normal LB B
S 2304 2300 ADD615 2 "B" 1 SH
N 8465 2335 "C16[40]" normal LB B
S 2305 2300 ADD615 3 "A" 1 SH
N 8465 2375 "C16[39]" normal LB B
S 2300 ADD615 4 "CO" 2306 1 SH
N 8625 2295 "P1[17]" normal LB B
S 2300 ADD615 5 "S" 2307 1 SH
N 8625 2375 "P2[16]" normal LB B
S 2308 1783 ADD616 1 "CI" 1 SH
N 8465 2455 "C17[38]" normal LB B
S 2309 1783 ADD616 2 "B" 1 SH
N 8465 2495 "C17[37]" normal LB B
S 1783 ADD616 4 "CO" 2310 1 SH
N 8625 2455 "P1[18]" normal LB B
S 2311 1782 ADD216 3 "A" 1 SH
N 5025 2535 "C14[8]" normal LB B
S 1782 ADD216 5 "S" 2312 1 SH
N 5185 2535 "C14[23]" normal LB B
S 2313 1781 ADD232 3 "A" 1 SH
N 5325 2535 "C18[6]" normal LB B
S 1781 ADD232 5 "S" 2314 1 SH
N 5465 2535 "C18[21]" normal LB B
S 2315 1780 ADD316 3 "A" 1 SH

```
N 5885 2535 "C12[11]" normal LB B
S 1780 ADD316 5 "S" 2316 1 SH
N 6045 2535 "C12[23]" normal LB B
S 2318 1785 ADD432 3 "A" 1 SH
N 7325 2535 "C20[18]" normal LB B
S 1785 ADD432 5 "S" 2317 1 SH
N 7465 2535 "C20[26]" normal LB B
S 1787 ADD348 5 "S" 2322 1 SH
N 6605 2535 "C22[17]" normal LB B
S 2321 1787 ADD348 3 "A" 1 SH
N 6465 2535 "C22[9]" normal LB B
S 1788 ADD332 5 "S" 2320 1 SH
N 6325 2535 "C17[31]" normal LB B
S 2319 1788 ADD332 3 "A" 1 SH
N 6185 2535 "C17[21]" normal LB B
S 1786 ADD416 5 "S" 2324 1 SH
N 7185 2535 "C12[28]" normal LB B
S 2323 1786 ADD416 3 "A" 1 SH
N 7025 2535 "C12[20]" normal LB B
S 2325 1784 ADD516 3 "A" 1 SH
N 7885 2535 "C18[30]" normal LB B
S 1784 ADD516 5 "S" 2326 1 SH
N 8045 2535 "C18[35]" normal LB B
S 2327 1783 ADD616 3 "A" 1 SH
N 8465 2535 "C17[36]" normal LB B
S 1783 ADD616 5 "S" 2328 1 SH
N 8625 2535 "P2[17]" normal LB B
E
```

MULX NLS

```
#cell2 * mulx nls * 2 any 0 v8r4.6.2
# "12-Sep-94 GMT" "11:41:35 GMT" "12-Sep-94 GMT" "11:41:35 GMT" amir * .
writer        1
file_version  1
sections      1
netlist   1:        79 mulx


B contents:  mulx
netlist         242
cells         39911
switches          0
attributes    39989
physical          0
history           0
E contents


B netlist
X 1 A[15] i;
X 2 A[14] i;
X 3 A[13] i;
X 4 A[12] i;
X 5 A[11] i;
X 6 A[10] i;
X 7 A[9] i;
X 8 A[8] i;
X 9 A[7] i;
X 10 A[6] i;
X 11 A[5] i;
X 12 A[4] i;
X 13 A[3] i;
X 14 A[2] i;
X 15 A[1] i;
X 16 A[0] i;
X 17 B[15] i;
X 18 B[14] i;
X 19 B[13] i;
X 20 B[12] i;
X 21 B[11] i;
X 22 B[10] i;
X 23 B[9] i;
X 24 B[8] i;
X 25 B[7] i;
X 26 B[6] i;
```

```
X 27 B[5] i;
X 28 B[4] i;
X 29 B[3] i;
X 30 B[2] i;
X 31 B[1] i;
X 32 B[0] i;
X 33 P[0] o;
X 34 P1[31] o;
X 35 P1[30] o;
X 36 P1[29] o;
X 37 P1[28] o;
X 38 P1[27] o;
X 39 P1[26] o;
X 40 P1[25] o;
X 41 P1[24] o;
X 42 P1[23] o;
X 43 P1[22] o;
X 44 P1[21] o;
X 45 P1[20] o;
X 46 P1[19] o;
X 47 P1[18] o;
X 48 P1[17] o;
X 49 P1[16] o;
X 50 P1[15] o;
X 51 P1[14] o;
X 52 P1[13] o;
X 53 P1[12] o;
X 54 P1[11] o;
X 55 P1[10] o;
X 56 P1[9] o;
X 57 P1[8] o;
X 58 P1[7] o;
X 59 P1[6] o;
X 60 P1[5] o;
X 61 P1[4] o;
X 62 P1[3] o;
X 63 P1[2] o;
X 64 P1[1] o;
X 65 P2[31] o;
X 66 P2[30] o;
X 67 P2[29] o;
X 68 P2[28] o;
X 69 P2[27] o;
X 70 P2[26] o;
X 71 P2[25] o;
X 72 P2[24] o;
X 73 P2[23] o;
X 74 P2[22] o;
```

```
X 75 P2[21] o;
X 76 P2[20] o;
X 77 P2[19] o;
X 78 P2[18] o;
X 79 P2[17] o;
X 80 P2[16] o;
X 81 P2[15] o;
X 82 P2[14] o;
X 83 P2[13] o;
X 84 P2[12] o;
X 85 P2[11] o;
X 86 P2[10] o;
X 87 P2[9] o;
X 88 P2[8] o;
X 89 P2[7] o;
X 90 P2[6] o;
X 91 P2[5] o;
X 92 P2[4] o;
X 93 P2[3] o;
X 94 P2[2] o;
X 95 P2[1] o;
G 34 VDD;
G 96 VSS;
N 34 P1[31];
N 97 NA[0];
N 98 C3[3];
N 99 C4[4];
N 100 NA[15];
N 101 NA[14];
N 102 NA[13];
N 103 NA[12];
N 104 NA[11];
N 105 NA[10];
N 106 NA[9];
N 107 NA[8];
N 108 NA[7];
N 109 NA[6];
N 110 NA[5];
N 111 NA[4];
N 112 NA[3];
N 113 NA[2];
N 114 NA[1];
N 115 NB[15];
N 116 NB[14];
N 117 NB[13];
N 118 NB[12];
N 119 NB[11];
N 120 NB[10];
```

```
N 121 NB[9];
N 122 NB[8];
N 123 NB[7];
N 124 NB[6];
N 125 NB[5];
N 126 NB[4];
N 127 NB[3];
N 128 NB[2];
N 129 NB[1];
N 130 NB[0];
N 131 C3[0];
N 132 C2[0];
N 133 C3[2];
N 134 C2[1];
N 135 C4[1];
N 136 C3[1];
N 137 C5[2];
N 138 C4[2];
N 139 C5[0];
N 140 C4[0];
N 141 C6[0];
N 142 C6[2];
N 143 C7[2];
N 144 C6[1];
N 145 C5[1];
N 146 C7[1];
N 147 C8[2];
N 148 C4[3];
N 149 C5[3];
N 150 C6[3];
N 151 C5[4];
N 152 C7[4];
N 153 C6[4];
N 154 C8[3];
N 155 C7[3];
N 156 C9[3];
N 157 C9[4];
N 158 C8[4];
N 159 C10[4];
N 160 C7[0];
N 161 C8[0];
N 162 C10[0];
N 163 C9[0];
N 164 C10[2];
N 165 C9[2];
N 166 C8[1];
N 167 C9[1];
N 168 C11[1];
```

N 169 C10[1];
N 170 C11[2];
N 171 C12[2];
N 172 C11[0];
N 173 C12[0];
N 174 C13[0];
N 175 C13[2];
N 176 C12[1];
N 177 C14[1];
N 178 C14[2];
N 179 C15[2];
N 180 C13[1];
N 181 C10[3];
N 182 C11[3];
N 183 C13[3];
N 184 C12[3];
N 185 C11[4];
N 186 C12[4];
N 187 C13[4];
N 188 C14[4];
N 189 C14[3];
N 190 C15[3];
N 191 C16[2];
N 192 C15[4];
N 193 C17[2];
N 194 C16[3];
N 195 C5[5];
N 196 C10[10];
N 197 C6[6];
N 198 C7[7];
N 199 C8[8];
N 200 C9[9];
N 201 C13[13];
N 202 C12[12];
N 203 C11[11];
N 204 C15[15];
N 205 C14[14];
N 206 C7[6];
N 207 C6[5];
N 208 C9[6];
N 209 C7[5];
N 210 C8[5];
N 211 C8[6];
N 212 C8[7];
N 213 C10[7];
N 214 C9[7];
N 215 C10[5];
N 216 C9[5];

N 217 C10[6];
N 218 C11[6];
N 219 C11[5];
N 220 C12[6];
N 221 C12[7];
N 222 C11[7];
N 223 C13[7];
N 224 C9[8];
N 225 C11[8];
N 226 C10[8];
N 227 C11[10];
N 228 C10[9];
N 229 C12[9];
N 230 C11[9];
N 231 C13[10];
N 232 C12[10];
N 233 C13[8];
N 234 C12[8];
N 235 C14[8];
N 236 C15[10];
N 237 C14[10];
N 238 C13[9];
N 239 C14[9];
N 240 C15[9];
N 241 C16[9];
N 242 C13[6];
N 243 C13[5];
N 244 C12[5];
N 245 C14[6];
N 246 C14[5];
N 247 C15[5];
N 248 C16[5];
N 249 C15[6];
N 250 C15[7];
N 251 C14[7];
N 252 C17[5];
N 253 C16[6];
N 254 C16[4];
N 255 C17[4];
N 256 C17[3];
N 257 C18[2];
N 258 C19[2];
N 259 C18[3];
N 260 C18[4];
N 261 C19[3];
N 262 C20[2];
N 263 C15[8];
N 264 C16[7];

N 265 C18[5];
N 266 C17[6];
N 267 C17[7];
N 268 C18[7];
N 269 C17[8];
N 270 C16[8];
N 271 C19[5];
N 272 C18[6];
N 273 C20[5];
N 274 C19[6];
N 275 C19[4];
N 276 C21[2];
N 277 C20[3];
N 278 C21[4];
N 279 C20[4];
N 280 C22[2];
N 281 C21[3];
N 282 C22[3];
N 283 C23[2];
N 284 C12[11];
N 285 C13[11];
N 286 C14[11];
N 287 C13[12];
N 288 C15[12];
N 289 C14[12];
N 290 C16[10];
N 291 C15[11];
N 292 C17[9];
N 293 C17[10];
N 294 C16[11];
N 295 C18[9];
N 296 C14[13];
N 297 C15[14];
N 298 C15[13];
N 299 C16[12];
N 300 C16[13];
N 301 C17[12];
N 302 C16[14];
N 303 C14[0];
N 304 C18[12];
N 305 C17[13];
N 306 C17[11];
N 307 C18[10];
N 308 C18[11];
N 309 C19[10];
N 310 C19[9];
N 311 C20[9];
N 312 C20[10];

N 313 C19[11];
N 314 C21[9];
N 315 C18[8];
N 316 C19[7];
N 317 C20[6];
N 318 C21[5];
N 319 C19[8];
N 320 C20[7];
N 321 C22[5];
N 322 C21[6];
N 323 C22[4];
N 324 C23[3];
N 325 C24[2];
N 326 C23[4];
N 327 C25[2];
N 328 C24[3];
N 329 C21[7];
N 330 C21[8];
N 331 C20[8];
N 332 C22[7];
N 333 C22[6];
N 334 C23[5];
N 335 C24[5];
N 336 C23[6];
N 337 C22[8];
N 338 C15[1];
N 339 C15[0];
N 340 C23[7];
N 341 C24[6];
N 342 C25[5];
N 343 C24[4];
N 344 C25[4];
N 345 C25[3];
N 346 C26[2];
N 347 C26[3];
N 348 C27[2];
N 349 C26[4];
N 350 C28[2];
N 351 C27[3];
N 352 C16[1];
N 353 C16[0];
N 354 C17[0];
N 355 C17[1];
N 356 C18[0];
N 357 C18[1];
N 358 C19[0];
N 359 C19[1];
N 360 C20[1];

```
N 361 C20[0];
N 362 C21[0];
N 363 C22[0];
N 364 C21[1];
N 365 C22[1];
N 366 C23[0];
N 367 C24[0];
N 368 C24[1];
N 369 C23[1];
N 370 C25[0];
N 371 C25[1];
N 372 C26[0];
N 373 C26[1];
N 374 C27[0];
N 375 C29[0];
N 376 C28[0];
N 377 C27[1];
N 378 C28[1];
N 379 C29[1];
N 380 C30[0];
N 381 C14[15];
N 382 C10[11];
N 383 C15[26];
N 384 C19[15];
N 385 C7[8];
N 386 C13[24];
N 387 C12[16];
N 388 C18[26];
N 389 C17[26];
N 390 C24[7];
N 391 C12[25];
N 392 C13[30];
N 393 C5[6];
N 394 C20[23];
N 395 C13[14];
N 396 C15[18];
N 397 C15[19];
N 398 C14[16];
N 399 C9[10];
N 400 C11[12];
N 401 C11[13];
N 402 C10[12];
N 403 C14[17];
N 404 C16[15];
N 405 C15[20];
N 406 C10[13];
N 407 C12[13];
N 408 C11[14];
```

N 409 C14[24];
N 410 C18[22];
N 411 C15[27];
N 412 C18[14];
N 413 C19[16];
N 414 C14[25];
N 415 C16[22];
N 416 C20[11];
N 417 C18[13];
N 418 C18[23];
N 419 C6[7];
N 420 C8[9];
N 421 C8[10];
N 422 C7[9];
N 423 C15[28];
N 424 C19[17];
N 425 C16[23];
N 426 C15[29];
N 427 C20[12];
N 428 C19[18];
N 429 C7[10];
N 430 C9[11];
N 431 C8[11];
N 432 C16[16];
N 433 C15[21];
N 434 C16[17];
N 435 C15[22];
N 436 C12[14];
N 437 C11[15];
N 438 C11[16];
N 439 C12[15];
N 440 C16[18];
N 441 C15[23];
N 442 C16[19];
N 443 C17[14];
N 444 C13[15];
N 445 C13[16];
N 446 C12[17];
N 447 C15[30];
N 448 C16[24];
N 449 C20[13];
N 450 C19[19];
N 451 C15[31];
N 452 C16[25];
N 453 C20[14];
N 454 C19[20];
N 455 C9[12];
N 456 C8[12];

08947083 .041398

N 457 C8[13];
N 458 C9[13];
N 459 C16[26];
N 460 C17[19];
N 461 C21[10];
N 462 C20[15];
N 463 C16[27];
N 464 C17[20];
N 465 C21[11];
N 466 C20[16];
N 467 C9[14];
N 468 C10[14];
N 469 C9[15];
N 470 C10[15];
N 471 C18[17];
N 472 C12[24];
N 473 C17[24];
N 474 C17[25];
N 475 C12[19];
N 476 C13[25];
N 477 C12[18];
N 478 C14[26];
N 479 C18[15];
N 480 C18[16];
N 481 C18[20];
N 482 C19[21];
N 483 C17[32];
N 484 C23[12];
N 485 C24[8];
N 486 C18[27];
N 487 C19[22];
N 488 C23[8];
N 489 C24[9];
N 490 C23[13];
N 491 C18[18];
N 492 C18[19];
N 493 C13[26];
N 494 C18[21];
N 495 C13[19];
N 496 C13[18];
N 497 C13[17];
N 498 C14[27];
N 499 C13[27];
N 500 C18[28];
N 501 C23[14];
N 502 C19[23];
N 503 C18[29];
N 504 C25[6];

N 505 C24[10];
N 506 C4[5];
N 507 C6[8];
N 508 C6[9];
N 509 C5[7];
N 510 C12[23];
N 511 C12[29];
N 512 C14[32];
N 513 C20[22];
N 514 C21[17];
N 515 C20[21];
N 516 C14[33];
N 517 C13[28];
N 518 C13[31];
N 519 C21[16];
N 520 C21[15];
N 521 C13[23];
N 522 C21[20];
N 523 C5[8];
N 524 C7[11];
N 525 C6[10];
N 526 C13[32];
N 527 C21[18];
N 528 C21[19];
N 529 C14[28];
N 530 C15[38];
N 531 C14[34];
N 532 C22[14];
N 533 C22[12];
N 534 C22[13];
N 535 C13[22];
N 536 C19[14];
N 537 C13[20];
N 538 C13[21];
N 539 C19[13];
N 540 C19[12];
N 541 C14[19];
N 542 C14[18];
N 543 C15[32];
N 544 C14[29];
N 545 C20[18];
N 546 C24[11];
N 547 C25[7];
N 548 C19[24];
N 549 C20[19];
N 550 C19[25];
N 551 C25[8];
N 552 C26[5];

N 553 C14[22];
N 554 C14[21];
N 555 C14[20];
N 556 C15[33];
N 557 C14[30];
N 558 C14[31];
N 559 C14[23];
N 560 C15[34];
N 561 C20[20];
N 562 C19[26];
N 563 C7[12];
N 564 C6[11];
N 565 C8[14];
N 566 C7[13];
N 567 C22[17];
N 568 C15[39];
N 569 C14[35];
N 570 C22[15];
N 571 C22[16];
N 572 C15[40];
N 573 C16[36];
N 574 C23[11];
N 575 C23[10];
N 576 C23[9];
N 577 C8[15];
N 578 C7[14];
N 579 C9[17];
N 580 C8[16];
N 581 C15[41];
N 582 C16[37];
N 583 C15[35];
N 584 C15[36];
N 585 C15[37];
N 586 C16[31];
N 587 C16[32];
N 588 C16[30];
N 589 C17[33];
N 590 C16[38];
N 591 C18[35];
N 592 C20[28];
N 593 C19[29];
N 594 C4[6];
N 595 C21[22];
N 596 C20[27];
N 597 C22[18];
N 598 C22[19];
N 599 C21[23];
N 600 C5[9];

N 601 C3[4];
N 602 C19[28];
N 603 C19[27];
N 604 C19[32];
N 605 C20[26];
N 606 C21[25];
N 607 C4[7];
N 608 C6[12];
N 609 C20[25];
N 610 C20[24];
N 611 C22[22];
N 612 C20[29];
N 613 C21[24];
N 614 C23[15];
N 615 C22[20];
N 616 C5[10];
N 617 C21[21];
N 618 C21[26];
N 619 C7[15];
N 620 C6[13];
N 621 C23[19];
N 622 C22[23];
N 623 C18[34];
N 624 C18[33];
N 625 C19[31];
N 626 C19[30];
N 627 C23[16];
N 628 C22[21];
N 629 C23[17];
N 630 C24[12];
N 631 C8[18];
N 632 C23[20];
N 633 C24[16];
N 634 C7[16];
N 635 C9[21];
N 636 C8[19];
N 637 C24[14];
N 638 C24[13];
N 639 C24[17];
N 640 C25[13];
N 641 C9[19];
N 642 C9[18];
N 643 C23[18];
N 644 C10[22];
N 645 C10[21];
N 646 C10[20];
N 647 C25[9];
N 648 C10[24];

N 649 C9[22];
N 650 C25[11];
N 651 C25[10];
N 652 C26[10];
N 653 C25[14];
N 654 C10[25];
N 655 C26[8];
N 656 C26[7];
N 657 C26[6];
N 658 C11[27];
N 659 C26[11];
N 660 C27[7];
N 661 C8[17];
N 662 C9[20];
N 663 C24[15];
N 664 C25[12];
N 665 C17[15];
N 666 C16[20];
N 667 C17[16];
N 668 C16[21];
N 669 C17[17];
N 670 C16[28];
N 671 C17[21];
N 672 C21[12];
N 673 C20[17];
N 674 C16[29];
N 675 C17[22];
N 676 C22[9];
N 677 C21[13];
N 678 C9[16];
N 679 C10[16];
N 680 C10[17];
N 681 C11[17];
N 682 C17[23];
N 683 C22[10];
N 684 C21[14];
N 685 C11[18];
N 686 C10[18];
N 687 C11[19];
N 688 C17[18];
N 689 C15[24];
N 690 C15[25];
N 691 C22[11];
N 692 C10[19];
N 693 C12[20];
N 694 C12[21];
N 695 C11[20];
N 696 C11[21];

N 697 C12[22];
N 698 C11[22];
N 699 C17[27];
N 700 C16[39];
N 701 C17[34];
N 702 C16[33];
N 703 C16[34];
N 704 C16[35];
N 705 C17[28];
N 706 C17[29];
N 707 C18[30];
N 708 C17[35];
N 709 C11[23];
N 710 C17[31];
N 711 C17[30];
N 712 C18[31];
N 713 C17[36];
N 714 C18[25];
N 715 C18[24];
N 716 C11[24];
N 717 C12[26];
N 718 C10[23];
N 719 C18[32];
N 720 C11[25];
N 721 C12[27];
N 722 C13[29];
N 723 C11[26];
N 724 C12[28];
N 725 C27[8];
N 726 C28[4];
N 727 C27[4];
N 728 C27[5];
N 729 C11[28];
N 730 C12[30];
N 731 C12[31];
N 732 C13[33];
N 733 C28[5];
N 734 C29[2];
N 735 C14[36];
N 736 C13[34];
N 737 C15[42];
N 738 C26[9];
N 739 C27[6];
N 740 C28[3];
N 741 C16[40];
N 742 C14[37];
N 743 C15[43];
N 744 C17[37];

```
N 745 C17[38];
N 746 C16[41];
V A 15 0 ¦ 1 2 3 4 5 6 7 8 9 10 11 12 13 14 15 16;
V B 15 0 ¦ 17 18 19 20 21 22 23 24 25 26 27 28 29 30 31 32;
V P1 31 1 ¦ 34 35 36 37 38 39 40 41 42 43 44 45 46 47 48 49 50 51 52 53 54 55 56-
  57 58 59 60 61 62 63 64;
V P2 31 1 ¦ 65 66 67 68 69 70 71 72 73 74 75 76 77 78 79 80 81 82 83 84 85 86 87-
  88 89 90 91 92 93 94 95;
M MDE nr02d1 vsc653 ¦ A1 A2 ZN ¦ ;
M MDE in01d5 vsc653 ¦ I ZN ¦ ;
M MDE ad01d1 vsc653 ¦ A B CI S CO ¦ ;
I MDE nr02d1 vsc653 * 1 NORA14B1 ¦ 129 101 338;
I MDE nr02d1 vsc653 * 2 NORA14B0 ¦ 130 101 303;
I MDE nr02d1 vsc653 * 3 NORA14B12 ¦ 118 101 373;
I MDE nr02d1 vsc653 * 4 NORA14B11 ¦ 119 101 371;
I MDE nr02d1 vsc653 * 5 NORA14B10 ¦ 120 101 368;
I MDE nr02d1 vsc653 * 6 NORA14B9 ¦ 121 101 369;
I MDE nr02d1 vsc653 * 7 NORA14B8 ¦ 122 101 365;
I MDE nr02d1 vsc653 * 8 NORA14B13 ¦ 117 101 377;
I MDE nr02d1 vsc653 * 9 NORA14B14 ¦ 116 101 378;
I MDE nr02d1 vsc653 * 10 NORA14B15 ¦ 115 2 379;
I MDE nr02d1 vsc653 * 11 NORA14B5 ¦ 125 101 359;
I MDE nr02d1 vsc653 * 12 NORA14B4 ¦ 126 101 357;
I MDE nr02d1 vsc653 * 13 NORA14B3 ¦ 127 101 355;
I MDE nr02d1 vsc653 * 14 NORA14B2 ¦ 128 101 352;
I MDE nr02d1 vsc653 * 15 NORA14B6 ¦ 124 101 360;
I MDE nr02d1 vsc653 * 16 NORA14B7 ¦ 123 101 364;
I MDE nr02d1 vsc653 * 17 NORA9B5 ¦ 125 106 246;
I MDE nr02d1 vsc653 * 18 NORA10B5 ¦ 125 105 247;
I MDE nr02d1 vsc653 * 19 NORA11B5 ¦ 125 104 254;
I MDE nr02d1 vsc653 * 20 NORA6B5 ¦ 125 109 219;
I MDE nr02d1 vsc653 * 21 NORA7B5 ¦ 125 108 244;
I MDE nr02d1 vsc653 * 22 NORA8B5 ¦ 125 107 243;
I MDE nr02d1 vsc653 * 23 NORA3B5 ¦ 125 112 210;
I MDE nr02d1 vsc653 * 24 NORA4B5 ¦ 125 111 216;
I MDE nr02d1 vsc653 * 25 NORA5B5 ¦ 125 110 215;
I MDE nr02d1 vsc653 * 26 NORA0B5 ¦ 125 97 195;
I MDE nr02d1 vsc653 * 27 NORA1B5 ¦ 125 114 207;
I MDE nr02d1 vsc653 * 28 NORA2B5 ¦ 125 113 209;
I MDE nr02d1 vsc653 * 29 NORA13B5 ¦ 125 102 257;
I MDE nr02d1 vsc653 * 30 NORA12B5 ¦ 125 103 256;
I MDE nr02d1 vsc653 * 31 NORA0B14 ¦ 116 97 205;
I MDE nr02d1 vsc653 * 32 NORA0B15 ¦ 115 16 204;
I MDE nr02d1 vsc653 * 33 NORA0B11 ¦ 119 97 203;
I MDE nr02d1 vsc653 * 34 NORA0B12 ¦ 118 97 202;
I MDE nr02d1 vsc653 * 35 NORA0B13 ¦ 117 97 201;
I MDE nr02d1 vsc653 * 36 NORA0B9 ¦ 121 97 200;
I MDE nr02d1 vsc653 * 37 NORA0B8 ¦ 122 97 199;
```

```
I MDE nr02d1 vsc653 * 38 NORA0B7 ¦ 123 97 198;
I MDE nr02d1 vsc653 * 39 NORA0B6 ¦ 124 97 197;
I MDE nr02d1 vsc653 * 40 NORA0B10 ¦ 120 97 196;
I MDE nr02d1 vsc653 * 41 NORA0B4 ¦ 126 97 99;
I MDE nr02d1 vsc653 * 42 NORA0B3 ¦ 127 97 98;
I MDE nr02d1 vsc653 * 43 NORA0B1 ¦ 129 97 95;
I MDE nr02d1 vsc653 * 44 NORA0B0 ¦ 130 97 33;
I MDE nr02d1 vsc653 * 45 NORA0B2 ¦ 128 97 63;
I MDE in01d5 vsc653 * 46 AINV$1 ¦ 1 100;
I MDE in01d5 vsc653 * 47 AINV$2 ¦ 2 101;
I MDE in01d5 vsc653 * 48 AINV$3 ¦ 3 102;
I MDE in01d5 vsc653 * 49 AINV$4 ¦ 4 103;
I MDE in01d5 vsc653 * 50 AINV$5 ¦ 5 104;
I MDE in01d5 vsc653 * 51 AINV$6 ¦ 6 105;
I MDE in01d5 vsc653 * 52 AINV$7 ¦ 7 106;
I MDE in01d5 vsc653 * 53 AINV$8 ¦ 8 107;
I MDE in01d5 vsc653 * 54 AINV$9 ¦ 9 108;
I MDE in01d5 vsc653 * 55 AINV$10 ¦ 10 109;
I MDE in01d5 vsc653 * 56 AINV$11 ¦ 11 110;
I MDE in01d5 vsc653 * 57 AINV$12 ¦ 12 111;
I MDE in01d5 vsc653 * 58 AINV$13 ¦ 13 112;
I MDE in01d5 vsc653 * 59 AINV$14 ¦ 14 113;
I MDE in01d5 vsc653 * 60 AINV$15 ¦ 15 114;
I MDE in01d5 vsc653 * 61 AINV$16 ¦ 16 97;
I MDE nr02d1 vsc653 * 62 NORA7B4 ¦ 126 108 185;
I MDE nr02d1 vsc653 * 63 NORA7B3 ¦ 127 108 181;
I MDE nr02d1 vsc653 * 64 NORA7B2 ¦ 128 108 165;
I MDE nr02d1 vsc653 * 65 NORA7B1 ¦ 129 108 166;
I MDE nr02d1 vsc653 * 66 NORA7B0 ¦ 130 108 160;
I MDE in01d5 vsc653 * 67 BINV$1 ¦ 17 115;
I MDE in01d5 vsc653 * 68 BINV$2 ¦ 18 116;
I MDE in01d5 vsc653 * 69 BINV$3 ¦ 19 117;
I MDE in01d5 vsc653 * 70 BINV$4 ¦ 20 118;
I MDE in01d5 vsc653 * 71 BINV$5 ¦ 21 119;
I MDE in01d5 vsc653 * 72 BINV$6 ¦ 22 120;
I MDE in01d5 vsc653 * 73 BINV$7 ¦ 23 121;
I MDE in01d5 vsc653 * 74 BINV$8 ¦ 24 122;
I MDE in01d5 vsc653 * 75 BINV$9 ¦ 25 123;
I MDE in01d5 vsc653 * 76 BINV$10 ¦ 26 124;
I MDE in01d5 vsc653 * 77 BINV$11 ¦ 27 125;
I MDE in01d5 vsc653 * 78 BINV$12 ¦ 28 126;
I MDE in01d5 vsc653 * 79 BINV$13 ¦ 29 127;
I MDE in01d5 vsc653 * 80 BINV$14 ¦ 30 128;
I MDE in01d5 vsc653 * 81 BINV$15 ¦ 31 129;
I MDE in01d5 vsc653 * 82 BINV$16 ¦ 32 130;
I MDE nr02d1 vsc653 * 83 NORA2B2 ¦ 128 113 138;
I MDE nr02d1 vsc653 * 84 NORA3B2 ¦ 128 112 137;
I MDE nr02d1 vsc653 * 85 NORA4B2 ¦ 128 111 142;
```

I MDE nr02d1 vsc653 * 86 NORA5B2 ¦ 128 110 143;
I MDE nr02d1 vsc653 * 87 NORA6B2 ¦ 128 109 147;
I MDE nr02d1 vsc653 * 88 NORA1B2 ¦ 128 114 133;
I MDE nr02d1 vsc653 * 89 NORA2B1 ¦ 129 113 136;
I MDE nr02d1 vsc653 * 90 NORA2B0 ¦ 130 113 132;
I MDE nr02d1 vsc653 * 91 NORA1B0 ¦ 130 114 64;
I MDE nr02d1 vsc653 * 92 NORA3B0 ¦ 130 112 131;
I MDE nr02d1 vsc653 * 93 NORA1B1 ¦ 129 114 134;
I MDE nr02d1 vsc653 * 94 NORA3B1 ¦ 129 112 135;
I MDE nr02d1 vsc653 * 95 NORA5B0 ¦ 130 110 139;
I MDE nr02d1 vsc653 * 96 NORA5B1 ¦ 129 110 144;
I MDE nr02d1 vsc653 * 97 NORA4B0 ¦ 130 111 140;
I MDE nr02d1 vsc653 * 98 NORA6B0 ¦ 130 109 141;
I MDE nr02d1 vsc653 * 99 NORA4B1 ¦ 129 111 145;
I MDE nr02d1 vsc653 * 100 NORA6B1 ¦ 129 109 146;
I MDE nr02d1 vsc653 * 101 NORA2B3 ¦ 127 113 149;
I MDE nr02d1 vsc653 * 102 NORA2B4 ¦ 126 113 153;
I MDE nr02d1 vsc653 * 103 NORA1B3 ¦ 127 114 148;
I MDE nr02d1 vsc653 * 104 NORA3B3 ¦ 127 112 150;
I MDE nr02d1 vsc653 * 105 NORA1B4 ¦ 126 114 151;
I MDE nr02d1 vsc653 * 106 NORA3B4 ¦ 126 112 152;
I MDE nr02d1 vsc653 * 107 NORA5B3 ¦ 127 110 154;
I MDE nr02d1 vsc653 * 108 NORA5B4 ¦ 126 110 157;
I MDE nr02d1 vsc653 * 109 NORA4B3 ¦ 127 111 155;
I MDE nr02d1 vsc653 * 110 NORA6B3 ¦ 127 109 156;
I MDE nr02d1 vsc653 * 111 NORA4B4 ¦ 126 111 158;
I MDE nr02d1 vsc653 * 112 NORA6B4 ¦ 126 109 159;
I MDE nr02d1 vsc653 * 113 NORA8B2 ¦ 128 107 164;
I MDE nr02d1 vsc653 * 114 NORA13B2 ¦ 128 102 179;
I MDE nr02d1 vsc653 * 115 NORA12B2 ¦ 128 103 178;
I MDE nr02d1 vsc653 * 116 NORA11B2 ¦ 128 104 175;
I MDE nr02d1 vsc653 * 117 NORA10B2 ¦ 128 105 171;
I MDE nr02d1 vsc653 * 118 NORA9B2 ¦ 128 106 170;
I MDE nr02d1 vsc653 * 119 NORA10B3 ¦ 127 105 183;
I MDE nr02d1 vsc653 * 120 NORA10B4 ¦ 126 105 188;
I MDE nr02d1 vsc653 * 121 NORA10B0 ¦ 130 105 162;
I MDE nr02d1 vsc653 * 122 NORA10B1 ¦ 129 105 168;
I MDE nr02d1 vsc653 * 123 NORA8B0 ¦ 130 107 161;
I MDE nr02d1 vsc653 * 124 NORA9B0 ¦ 130 106 163;
I MDE nr02d1 vsc653 * 125 NORA8B1 ¦ 129 107 167;
I MDE nr02d1 vsc653 * 126 NORA9B1 ¦ 129 106 169;
I MDE nr02d1 vsc653 * 127 NORA12B1 ¦ 129 103 180;
I MDE nr02d1 vsc653 * 128 NORA12B0 ¦ 130 103 173;
I MDE nr02d1 vsc653 * 129 NORA11B0 ¦ 130 104 172;
I MDE nr02d1 vsc653 * 130 NORA13B0 ¦ 130 102 174;
I MDE nr02d1 vsc653 * 131 NORA11B1 ¦ 129 104 176;
I MDE nr02d1 vsc653 * 132 NORA13B1 ¦ 129 102 177;
I MDE nr02d1 vsc653 * 133 NORA8B3 ¦ 127 107 182;

I MDE nr02d1 vsc653 * 134 NORA9B3 ¦ 127 106 184;
I MDE nr02d1 vsc653 * 135 NORA8B4 ¦ 126 107 186;
I MDE nr02d1 vsc653 * 136 NORA9B4 ¦ 126 106 187;
I MDE nr02d1 vsc653 * 137 NORA12B3 ¦ 127 103 190;
I MDE nr02d1 vsc653 * 138 NORA12B4 ¦ 126 103 194;
I MDE nr02d1 vsc653 * 139 NORA11B3 ¦ 127 104 189;
I MDE nr02d1 vsc653 * 140 NORA13B3 ¦ 127 102 191;
I MDE nr02d1 vsc653 * 141 NORA11B4 ¦ 126 104 192;
I MDE nr02d1 vsc653 * 142 NORA13B4 ¦ 126 102 193;
I MDE nr02d1 vsc653 * 143 NORA12B10 ¦ 120 103 282;
I MDE nr02d1 vsc653 * 144 NORA13B10 ¦ 120 102 283;
I MDE nr02d1 vsc653 * 145 NORA11B10 ¦ 120 104 278;
I MDE nr02d1 vsc653 * 146 NORA10B10 ¦ 120 105 273;
I MDE nr02d1 vsc653 * 147 NORA9B10 ¦ 120 106 274;
I MDE nr02d1 vsc653 * 148 NORA8B10 ¦ 120 107 268;
I MDE nr02d1 vsc653 * 149 NORA7B10 ¦ 120 108 269;
I MDE nr02d1 vsc653 * 150 NORA6B10 ¦ 120 109 241;
I MDE nr02d1 vsc653 * 151 NORA5B10 ¦ 120 110 236;
I MDE nr02d1 vsc653 * 152 NORA4B10 ¦ 120 111 237;
I MDE nr02d1 vsc653 * 153 NORA3B10 ¦ 120 112 231;
I MDE nr02d1 vsc653 * 154 NORA2B10 ¦ 120 113 232;
I MDE nr02d1 vsc653 * 155 NORA1B10 ¦ 120 114 227;
I MDE nr02d1 vsc653 * 156 NORA7B15 ¦ 115 9 337;
I MDE nr02d1 vsc653 * 157 NORA7B14 ¦ 116 108 330;
I MDE nr02d1 vsc653 * 158 NORA7B13 ¦ 117 108 331;
I MDE nr02d1 vsc653 * 159 NORA7B12 ¦ 118 108 319;
I MDE nr02d1 vsc653 * 160 NORA7B11 ¦ 119 108 315;
I MDE nr02d1 vsc653 * 161 NORA7B9 ¦ 121 108 270;
I MDE nr02d1 vsc653 * 162 NORA7B8 ¦ 122 108 263;
I MDE nr02d1 vsc653 * 163 NORA7B7 ¦ 123 108 251;
I MDE nr02d1 vsc653 * 164 NORA7B6 ¦ 124 108 242;
I MDE nr02d1 vsc653 * 165 NORA3B6 ¦ 124 112 208;
I MDE nr02d1 vsc653 * 166 NORA1B6 ¦ 124 114 206;
I MDE nr02d1 vsc653 * 167 NORA2B6 ¦ 124 113 211;
I MDE nr02d1 vsc653 * 168 NORA2B7 ¦ 123 113 214;
I MDE nr02d1 vsc653 * 169 NORA1B7 ¦ 123 114 212;
I MDE nr02d1 vsc653 * 170 NORA3B7 ¦ 123 112 213;
I MDE nr02d1 vsc653 * 171 NORA4B6 ¦ 124 111 217;
I MDE nr02d1 vsc653 * 172 NORA6B6 ¦ 124 109 220;
I MDE nr02d1 vsc653 * 173 NORA5B6 ¦ 124 110 218;
I MDE nr02d1 vsc653 * 174 NORA5B7 ¦ 123 110 221;
I MDE nr02d1 vsc653 * 175 NORA4B7 ¦ 123 111 222;
I MDE nr02d1 vsc653 * 176 NORA6B7 ¦ 123 109 223;
I MDE nr02d1 vsc653 * 177 NORA1B9 ¦ 121 114 228;
I MDE nr02d1 vsc653 * 178 NORA2B9 ¦ 121 113 230;
I MDE nr02d1 vsc653 * 179 NORA3B9 ¦ 121 112 229;
I MDE nr02d1 vsc653 * 180 NORA2B8 ¦ 122 113 226;
I MDE nr02d1 vsc653 * 181 NORA1B8 ¦ 122 114 224;

I MDE nr02d1 vsc653 * 182 NORA3B8 ¦ 122 112 225;
I MDE nr02d1 vsc653 * 183 NORA4B9 ¦ 121 111 238;
I MDE nr02d1 vsc653 * 184 NORA5B9 ¦ 121 110 239;
I MDE nr02d1 vsc653 * 185 NORA6B9 ¦ 121 109 240;
I MDE nr02d1 vsc653 * 186 NORA5B8 ¦ 122 110 233;
I MDE nr02d1 vsc653 * 187 NORA4B8 ¦ 122 111 234;
I MDE nr02d1 vsc653 * 188 NORA6B8 ¦ 122 109 235;
I MDE nr02d1 vsc653 * 189 NORA10B8 ¦ 122 105 265;
I MDE nr02d1 vsc653 * 190 NORA10B9 ¦ 121 105 271;
I MDE nr02d1 vsc653 * 191 NORA10B7 ¦ 123 105 252;
I MDE nr02d1 vsc653 * 192 NORA10B6 ¦ 124 105 248;
I MDE nr02d1 vsc653 * 193 NORA9B6 ¦ 124 106 249;
I MDE nr02d1 vsc653 * 194 NORA8B6 ¦ 124 107 245;
I MDE nr02d1 vsc653 * 195 NORA8B7 ¦ 123 107 250;
I MDE nr02d1 vsc653 * 196 NORA9B7 ¦ 123 106 253;
I MDE nr02d1 vsc653 * 197 NORA13B6 ¦ 124 102 258;
I MDE nr02d1 vsc653 * 198 NORA12B6 ¦ 124 103 259;
I MDE nr02d1 vsc653 * 199 NORA11B6 ¦ 124 104 255;
I MDE nr02d1 vsc653 * 200 NORA12B7 ¦ 123 103 261;
I MDE nr02d1 vsc653 * 201 NORA11B7 ¦ 123 104 260;
I MDE nr02d1 vsc653 * 202 NORA13B7 ¦ 123 102 262;
I MDE nr02d1 vsc653 * 203 NORA8B9 ¦ 121 107 267;
I MDE nr02d1 vsc653 * 204 NORA9B9 ¦ 121 106 272;
I MDE nr02d1 vsc653 * 205 NORA8B8 ¦ 122 107 264;
I MDE nr02d1 vsc653 * 206 NORA9B8 ¦ 122 106 266;
I MDE nr02d1 vsc653 * 207 NORA11B9 ¦ 121 104 279;
I MDE nr02d1 vsc653 * 208 NORA12B9 ¦ 121 103 281;
I MDE nr02d1 vsc653 * 209 NORA13B9 ¦ 121 102 280;
I MDE nr02d1 vsc653 * 210 NORA12B8 ¦ 122 103 277;
I MDE nr02d1 vsc653 * 211 NORA11B8 ¦ 122 104 275;
I MDE nr02d1 vsc653 * 212 NORA13B8 ¦ 122 102 276;
I MDE nr02d1 vsc653 * 213 NORA6B13 ¦ 117 109 310;
I MDE nr02d1 vsc653 * 214 NORA5B13 ¦ 117 110 307;
I MDE nr02d1 vsc653 * 215 NORA4B13 ¦ 117 111 306;
I MDE nr02d1 vsc653 * 216 NORA3B13 ¦ 117 112 299;
I MDE nr02d1 vsc653 * 217 NORA2B13 ¦ 117 113 298;
I MDE nr02d1 vsc653 * 218 NORA1B13 ¦ 117 114 296;
I MDE nr02d1 vsc653 * 219 NORA2B12 ¦ 118 113 289;
I MDE nr02d1 vsc653 * 220 NORA2B11 ¦ 119 113 285;
I MDE nr02d1 vsc653 * 221 NORA1B11 ¦ 119 114 284;
I MDE nr02d1 vsc653 * 222 NORA3B11 ¦ 119 112 286;
I MDE nr02d1 vsc653 * 223 NORA1B12 ¦ 118 114 287;
I MDE nr02d1 vsc653 * 224 NORA3B12 ¦ 118 112 288;
I MDE nr02d1 vsc653 * 225 NORA5B11 ¦ 119 110 290;
I MDE nr02d1 vsc653 * 226 NORA5B12 ¦ 118 110 293;
I MDE nr02d1 vsc653 * 227 NORA4B11 ¦ 119 111 291;
I MDE nr02d1 vsc653 * 228 NORA6B11 ¦ 119 109 292;
I MDE nr02d1 vsc653 * 229 NORA4B12 ¦ 118 111 294;

I MDE nr02d1 vsc653 * 230 NORA6B12 ¦ 118 109 295;
I MDE nr02d1 vsc653 * 231 NORA1B14 ¦ 116 114 297;
I MDE nr02d1 vsc653 * 232 NORA2B14 ¦ 116 113 300;
I MDE nr02d1 vsc653 * 233 NORA3B14 ¦ 116 112 301;
I MDE nr02d1 vsc653 * 234 NORA2B15 ¦ 115 14 305;
I MDE nr02d1 vsc653 * 235 NORA1B15 ¦ 115 15 302;
I MDE nr02d1 vsc653 * 236 NORA3B15 ¦ 115 13 304;
I MDE nr02d1 vsc653 * 237 NORA4B14 ¦ 116 111 308;
I MDE nr02d1 vsc653 * 238 NORA5B14 ¦ 116 110 309;
I MDE nr02d1 vsc653 * 239 NORA6B14 ¦ 116 109 311;
I MDE nr02d1 vsc653 * 240 NORA5B15 ¦ 115 11 312;
I MDE nr02d1 vsc653 * 241 NORA4B15 ¦ 115 12 313;
I MDE nr02d1 vsc653 * 242 NORA6B15 ¦ 115 10 314;
I MDE nr02d1 vsc653 * 243 NORA8B13 ¦ 117 107 329;
I MDE nr02d1 vsc653 * 244 NORA13B13 ¦ 117 102 346;
I MDE nr02d1 vsc653 * 245 NORA12B13 ¦ 117 103 345;
I MDE nr02d1 vsc653 * 246 NORA11B13 ¦ 117 104 343;
I MDE nr02d1 vsc653 * 247 NORA10B13 ¦ 117 105 334;
I MDE nr02d1 vsc653 * 248 NORA9B13 ¦ 117 106 333;
I MDE nr02d1 vsc653 * 249 NORA10B14 ¦ 116 105 335;
I MDE nr02d1 vsc653 * 250 NORA10B15 ¦ 115 6 342;
I MDE nr02d1 vsc653 * 251 NORA10B11 ¦ 119 105 318;
I MDE nr02d1 vsc653 * 252 NORA10B12 ¦ 118 105 321;
I MDE nr02d1 vsc653 * 253 NORA8B11 ¦ 119 107 316;
I MDE nr02d1 vsc653 * 254 NORA9B11 ¦ 119 106 317;
I MDE nr02d1 vsc653 * 255 NORA8B12 ¦ 118 107 320;
I MDE nr02d1 vsc653 * 256 NORA9B12 ¦ 118 106 322;
I MDE nr02d1 vsc653 * 257 NORA12B12 ¦ 118 103 328;
I MDE nr02d1 vsc653 * 258 NORA12B11 ¦ 119 103 324;
I MDE nr02d1 vsc653 * 259 NORA11B11 ¦ 119 104 323;
I MDE nr02d1 vsc653 * 260 NORA13B11 ¦ 119 102 325;
I MDE nr02d1 vsc653 * 261 NORA11B12 ¦ 118 104 326;
I MDE nr02d1 vsc653 * 262 NORA13B12 ¦ 118 102 327;
I MDE nr02d1 vsc653 * 263 NORA8B14 ¦ 116 107 332;
I MDE nr02d1 vsc653 * 264 NORA9B14 ¦ 116 106 336;
I MDE nr02d1 vsc653 * 265 NORA8B15 ¦ 115 8 340;
I MDE nr02d1 vsc653 * 266 NORA9B15 ¦ 115 7 341;
I MDE nr02d1 vsc653 * 267 NORA11B14 ¦ 116 104 344;
I MDE nr02d1 vsc653 * 268 NORA12B14 ¦ 116 103 347;
I MDE nr02d1 vsc653 * 269 NORA13B14 ¦ 116 102 348;
I MDE nr02d1 vsc653 * 270 NORA12B15 ¦ 115 4 351;
I MDE nr02d1 vsc653 * 271 NORA11B15 ¦ 115 5 349;
I MDE nr02d1 vsc653 * 272 NORA13B15 ¦ 115 3 350;
I MDE nr02d1 vsc653 * 273 NORA15B5 ¦ 27 100 361;
I MDE nr02d1 vsc653 * 274 NORA15B2 ¦ 30 100 354;
I MDE nr02d1 vsc653 * 275 NORA15B0 ¦ 32 100 339;
I MDE nr02d1 vsc653 * 276 NORA15B1 ¦ 31 100 353;
I MDE nr02d1 vsc653 * 277 NORA15B3 ¦ 29 100 356;

I MDE nr02d1 vsc653 * 278 NORA15B4 ¦ 28 100 358;
I MDE nr02d1 vsc653 * 279 NORA15B10 ¦ 22 100 370;
I MDE nr02d1 vsc653 * 280 NORA15B6 ¦ 26 100 362;
I MDE nr02d1 vsc653 * 281 NORA15B7 ¦ 25 100 363;
I MDE nr02d1 vsc653 * 282 NORA15B9 ¦ 23 100 367;
I MDE nr02d1 vsc653 * 283 NORA15B8 ¦ 24 100 366;
I MDE nr02d1 vsc653 * 284 NORA15B13 ¦ 19 100 376;
I MDE nr02d1 vsc653 * 285 NORA15B12 ¦ 20 100 374;
I MDE nr02d1 vsc653 * 286 NORA15B11 ¦ 21 100 372;
I MDE nr02d1 vsc653 * 287 NORA15B14 ¦ 18 100 375;
I MDE nr02d1 vsc653 * 288 NORA15B15 ¦ 115 100 380;
I MDE ad01d1 vsc653 * 289 ADD41 ¦ 96 140 135 506 393;
I MDE ad01d1 vsc653 * 290 ADD617 ¦ 624 623 591 78 46;
I MDE ad01d1 vsc653 * 291 ADD61 ¦ 96 132 134 94 62;
I MDE ad01d1 vsc653 * 292 ADD517 ¦ 603 602 593 604 592;
I MDE ad01d1 vsc653 * 293 ADD51 ¦ 96 131 136 601 594;
I MDE ad01d1 vsc653 * 294 ADD433 ¦ 515 513 394 596 595;
I MDE ad01d1 vsc653 * 295 ADD417 ¦ 510 472 391 511 392;
I MDE ad01d1 vsc653 * 296 ADD349 ¦ 366 369 283 484 390;
I MDE ad01d1 vsc653 * 297 ADD333 ¦ 473 474 389 483 388;
I MDE ad01d1 vsc653 * 298 ADD317 ¦ 436 439 387 472 386;
I MDE ad01d1 vsc653 * 299 ADD31 ¦ 96 141 144 419 385;
I MDE ad01d1 vsc653 * 300 ADD233 ¦ 295 307 308 410 384;
I MDE ad01d1 vsc653 * 301 ADD217 ¦ 286 289 296 409 383;
I MDE ad01d1 vsc653 * 302 ADD21 ¦ 96 163 167 399 382;
I MDE ad01d1 vsc653 * 303 ADD11 ¦ 96 174 180 395 381;
I MDE ad01d1 vsc653 * 304 ADD220 ¦ 288 298 297 426 425;
I MDE ad01d1 vsc653 * 305 ADD219 ¦ 240 236 291 423 415;
I MDE ad01d1 vsc653 * 306 ADD218 ¦ 205 381 398 414 411;
I MDE ad01d1 vsc653 * 307 ADD235 ¦ 358 359 258 424 416;
I MDE ad01d1 vsc653 * 308 ADD33 ¦ 143 155 152 429 421;
I MDE ad01d1 vsc653 * 309 ADD13 ¦ 178 189 188 403 397;
I MDE ad01d1 vsc653 * 310 ADD23 ¦ 164 181 159 406 401;
I MDE ad01d1 vsc653 * 311 ADD22 ¦ 96 162 169 402 400;
I MDE ad01d1 vsc653 * 312 ADD12 ¦ 96 303 177 398 396;
I MDE ad01d1 vsc653 * 313 ADD24 ¦ 96 172 168 408 407;
I MDE ad01d1 vsc653 * 314 ADD14 ¦ 96 1 17 405 404;
I MDE ad01d1 vsc653 * 315 ADD234 ¦ 304 417 412 418 413;
I MDE ad01d1 vsc653 * 316 ADD32 ¦ 96 160 146 422 420;
I MDE ad01d1 vsc653 * 317 ADD236 ¦ 261 275 271 428 427;
I MDE ad01d1 vsc653 * 318 ADD34 ¦ 96 161 166 431 430;
I MDE ad01d1 vsc653 * 319 ADD222 ¦ 405 433 435 451 452;
I MDE ad01d1 vsc653 * 320 ADD223 ¦ 241 290 294 459 460;
I MDE ad01d1 vsc653 * 321 ADD221 ¦ 204 396 397 447 448;
I MDE ad01d1 vsc653 * 322 ADD224 ¦ 299 300 302 463 464;
I MDE ad01d1 vsc653 * 323 ADD25 ¦ 170 182 185 437 436;
I MDE ad01d1 vsc653 * 324 ADD26 ¦ 219 218 222 438 439;
I MDE ad01d1 vsc653 * 325 ADD15 ¦ 339 338 179 433 432;

I MDE ad01d1 vsc653 * 326 ADD16 ¦ 190 192 247 435 434;
I MDE ad01d1 vsc653 * 327 ADD27 ¦ 96 173 176 387 444;
I MDE ad01d1 vsc653 * 328 ADD28 ¦ 171 184 186 446 445;
I MDE ad01d1 vsc653 * 329 ADD17 ¦ 249 250 263 441 440;
I MDE ad01d1 vsc653 * 330 ADD18 ¦ 353 352 191 442 443;
I MDE ad01d1 vsc653 * 331 ADD237 ¦ 274 316 319 450 449;
I MDE ad01d1 vsc653 * 332 ADD238 ¦ 310 309 313 454 453;
I MDE ad01d1 vsc653 * 333 ADD35 ¦ 147 154 158 456 455;
I MDE ad01d1 vsc653 * 334 ADD36 ¦ 210 211 212 457 458;
I MDE ad01d1 vsc653 * 335 ADD239 ¦ 361 360 262 462 461;
I MDE ad01d1 vsc653 * 336 ADD240 ¦ 277 279 273 466 465;
I MDE ad01d1 vsc653 * 337 ADD37 ¦ 165 156 157 467 468;
I MDE ad01d1 vsc653 * 338 ADD38 ¦ 216 208 214 469 470;
I MDE ad01d1 vsc653 * 339 ADD419 ¦ 493 499 517 526 516;
I MDE ad01d1 vsc653 * 340 ADD43 ¦ 137 149 151 523 508;
I MDE ad01d1 vsc653 * 341 ADD319 ¦ 395 444 445 493 478;
I MDE ad01d1 vsc653 * 342 ADD351 ¦ 336 340 488 501 489;
I MDE ad01d1 vsc653 * 343 ADD335 ¦ 491 492 481 500 487;
I MDE ad01d1 vsc653 * 344 ADD334 ¦ 479 480 471 486 482;
I MDE ad01d1 vsc653 * 345 ADD350 ¦ 324 326 334 490 485;
I MDE ad01d1 vsc653 * 346 ADD318 ¦ 446 477 475 391 476;
I MDE ad01d1 vsc653 * 347 ADD336 ¦ 494 410 418 503 502;
I MDE ad01d1 vsc653 * 348 ADD352 ¦ 367 368 325 505 504;
I MDE ad01d1 vsc653 * 349 ADD320 ¦ 497 496 495 499 498;
I MDE ad01d1 vsc653 * 350 ADD42 ¦ 96 139 145 509 507;
I MDE ad01d1 vsc653 * 351 ADD418 ¦ 521 386 476 518 512;
I MDE ad01d1 vsc653 * 352 ADD44 ¦ 142 150 153 525 524;
I MDE ad01d1 vsc653 * 353 ADD420 ¦ 478 498 529 531 530;
I MDE ad01d1 vsc653 * 354 ADD337 ¦ 540 539 536 548 545;
I MDE ad01d1 vsc653 * 355 ADD338 ¦ 384 413 424 550 549;
I MDE ad01d1 vsc653 * 356 ADD321 ¦ 537 538 535 517 529;
I MDE ad01d1 vsc653 * 357 ADD322 ¦ 403 542 541 544 543;
I MDE ad01d1 vsc653 * 358 ADD353 ¦ 328 343 335 546 547;
I MDE ad01d1 vsc653 * 359 ADD354 ¦ 370 371 327 551 552;
I MDE ad01d1 vsc653 * 360 ADD340 ¦ 311 312 416 515 520;
I MDE ad01d1 vsc653 * 361 ADD339 ¦ 428 450 454 562 561;
I MDE ad01d1 vsc653 * 362 ADD323 ¦ 555 554 553 557 556;
I MDE ad01d1 vsc653 * 363 ADD324 ¦ 559 409 414 558 560;
I MDE ad01d1 vsc653 * 364 ADD45 ¦ 207 197 419 564 563;
I MDE ad01d1 vsc653 * 365 ADD46 ¦ 209 206 198 566 565;
I MDE ad01d1 vsc653 * 366 ADD421 ¦ 544 557 558 569 568;
I MDE ad01d1 vsc653 * 367 ADD422 ¦ 543 556 560 572 573;
I MDE ad01d1 vsc653 * 368 ADD47 ¦ 385 422 429 578 577;
I MDE ad01d1 vsc653 * 369 ADD48 ¦ 199 420 421 580 579;
I MDE ad01d1 vsc653 * 370 ADD423 ¦ 583 584 585 581 582;
I MDE ad01d1 vsc653 * 371 ADD424 ¦ 588 586 587 590 589;
I MDE ad01d1 vsc653 * 372 ADD619 ¦ 596 592 612 76 44;
I MDE ad01d1 vsc653 * 373 ADD63 ¦ 506 594 607 92 60;

I MDE ad01d1 vsc653 * 374 ADD435 ¦ 527 528 522 613 598;
I MDE ad01d1 vsc653 * 375 ADD519 ¦ 617 595 599 618 611;
I MDE ad01d1 vsc653 * 376 ADD53 ¦ 195 393 509 616 608;
I MDE ad01d1 vsc653 * 377 ADD52 ¦ 138 148 99 607 600;
I MDE ad01d1 vsc653 * 378 ADD518 ¦ 610 609 605 612 606;
I MDE ad01d1 vsc653 * 379 ADD434 ¦ 520 519 514 599 597;
I MDE ad01d1 vsc653 * 380 ADD54 ¦ 507 508 525 620 619;
I MDE ad01d1 vsc653 * 381 ADD520 ¦ 597 598 615 622 621;
I MDE ad01d1 vsc653 * 382 ADD436 ¦ 533 534 532 615 614;
I MDE ad01d1 vsc653 * 383 ADD62 ¦ 133 98 601 93 61;
I MDE ad01d1 vsc653 * 384 ADD618 ¦ 626 625 604 77 45;
I MDE ad01d1 vsc653 * 385 ADD64 ¦ 523 600 616 91 59;
I MDE ad01d1 vsc653 * 386 ADD620 ¦ 613 606 618 75 43;
I MDE ad01d1 vsc653 * 387 ADD55 ¦ 524 563 566 634 631;
I MDE ad01d1 vsc653 * 388 ADD56 ¦ 565 577 580 636 635;
I MDE ad01d1 vsc653 * 389 ADD437 ¦ 570 571 567 628 627;
I MDE ad01d1 vsc653 * 390 ADD438 ¦ 576 575 574 629 630;
I MDE ad01d1 vsc653 * 391 ADD521 ¦ 614 627 629 632 633;
I MDE ad01d1 vsc653 * 392 ADD522 ¦ 630 638 637 639 640;
I MDE ad01d1 vsc653 * 393 ADD58 ¦ 646 645 644 654 658;
I MDE ad01d1 vsc653 * 394 ADD57 ¦ 579 642 641 649 648;
I MDE ad01d1 vsc653 * 395 ADD439 ¦ 484 490 501 643 638;
I MDE ad01d1 vsc653 * 396 ADD440 ¦ 341 390 485 637 647;
I MDE ad01d1 vsc653 * 397 ADD523 ¦ 647 651 650 653 652;
I MDE ad01d1 vsc653 * 398 ADD524 ¦ 657 656 655 659 660;
I MDE ad01d1 vsc653 * 399 ADD65 ¦ 564 608 620 90 58;
I MDE ad01d1 vsc653 * 400 ADD66 ¦ 578 619 634 89 57;
I MDE ad01d1 vsc653 * 401 ADD621 ¦ 628 611 622 74 42;
I MDE ad01d1 vsc653 * 402 ADD622 ¦ 643 621 632 73 41;
I MDE ad01d1 vsc653 * 403 ADD67 ¦ 661 631 636 88 56;
I MDE ad01d1 vsc653 * 404 ADD68 ¦ 662 635 649 87 55;
I MDE ad01d1 vsc653 * 405 ADD623 ¦ 663 633 639 72 40;
I MDE ad01d1 vsc653 * 406 ADD624 ¦ 664 640 653 71 39;
I MDE ad01d1 vsc653 * 407 ADD332 ¦ 671 675 682 710 714;
I MDE ad01d1 vsc653 * 408 ADD316 ¦ 284 202 407 510 521;
I MDE ad01d1 vsc653 * 409 ADD232 ¦ 272 268 315 494 536;
I MDE ad01d1 vsc653 * 410 ADD216 ¦ 235 239 237 559 690;
I MDE ad01d1 vsc653 * 411 ADD616 ¦ 713 744 745 79 47;
I MDE ad01d1 vsc653 * 412 ADD516 ¦ 707 712 719 591 625;
I MDE ad01d1 vsc653 * 413 ADD432 ¦ 545 549 561 605 617;
I MDE ad01d1 vsc653 * 414 ADD416 ¦ 693 694 697 724 722;
I MDE ad01d1 vsc653 * 415 ADD348 ¦ 676 683 691 567 574;
I MDE ad01d1 vsc653 * 416 ADD344 ¦ 314 461 465 528 534;
I MDE ad01d1 vsc653 * 417 ADD328 ¦ 668 415 425 702 699;
I MDE ad01d1 vsc653 * 418 ADD412 ¦ 468 470 679 644 709;
I MDE ad01d1 vsc653 * 419 ADD428 ¦ 715 714 388 719 603;
I MDE ad01d1 vsc653 * 420 ADD312 ¦ 382 402 406 692 687;
I MDE ad01d1 vsc653 * 421 ADD228 ¦ 292 293 306 473 471;

I MDE ad01d1 vsc653 * 422 ADD112 ¦ 256 255 252 688 412;
I MDE ad01d1 vsc653 * 423 ADD212 ¦ 243 242 223 537 541;
I MDE ad01d1 vsc653 * 424 ADD244 ¦ 363 365 280 691 488;
I MDE ad01d1 vsc653 * 425 ADD227 ¦ 266 267 269 682 480;
I MDE ad01d1 vsc653 * 426 ADD226 ¦ 440 442 666 674 675;
I MDE ad01d1 vsc653 * 427 ADD225 ¦ 404 432 434 670 671;
I MDE ad01d1 vsc653 * 428 ADD29 ¦ 244 220 221 477 497;
I MDE ad01d1 vsc653 * 429 ADD210 ¦ 234 229 232 475 496;
I MDE ad01d1 vsc653 * 430 ADD19 ¦ 194 254 248 666 665;
I MDE ad01d1 vsc653 * 431 ADD110 ¦ 253 264 270 668 667;
I MDE ad01d1 vsc653 * 432 ADD211 ¦ 175 183 187 495 542;
I MDE ad01d1 vsc653 * 433 ADD111 ¦ 354 355 193 669 417;
I MDE ad01d1 vsc653 * 434 ADD241 ¦ 317 320 331 673 672;
I MDE ad01d1 vsc653 * 435 ADD242 ¦ 362 364 276 677 676;
I MDE ad01d1 vsc653 * 436 ADD39 ¦ 224 200 399 678 679;
I MDE ad01d1 vsc653 * 437 ADD310 ¦ 215 217 213 680 681;
I MDE ad01d1 vsc653 * 438 ADD243 ¦ 281 278 318 684 683;
I MDE ad01d1 vsc653 * 439 ADD311 ¦ 226 228 196 686 685;
I MDE ad01d1 vsc653 * 440 ADD229 ¦ 301 305 443 474 491;
I MDE ad01d1 vsc653 * 441 ADD230 ¦ 665 667 669 389 492;
I MDE ad01d1 vsc653 * 442 ADD231 ¦ 259 260 265 481 539;
I MDE ad01d1 vsc653 * 443 ADD214 ¦ 285 287 201 535 554;
I MDE ad01d1 vsc653 * 444 ADD314 ¦ 203 400 401 696 694;
I MDE ad01d1 vsc653 * 445 ADD213 ¦ 233 238 231 538 555;
I MDE ad01d1 vsc653 * 446 ADD113 ¦ 356 357 257 479 540;
I MDE ad01d1 vsc653 * 447 ADD215 ¦ 246 245 251 553 689;
I MDE ad01d1 vsc653 * 448 ADD313 ¦ 225 230 227 695 693;
I MDE ad01d1 vsc653 * 449 ADD315 ¦ 408 437 438 698 697;
I MDE ad01d1 vsc653 * 450 ADD342 ¦ 462 466 673 394 514;
I MDE ad01d1 vsc653 * 451 ADD341 ¦ 427 449 453 513 519;
I MDE ad01d1 vsc653 * 452 ADD325 ¦ 441 689 690 583 588;
I MDE ad01d1 vsc653 * 453 ADD326 ¦ 383 411 423 584 586;
I MDE ad01d1 vsc653 * 454 ADD343 ¦ 322 329 330 527 533;
I MDE ad01d1 vsc653 * 455 ADD327 ¦ 426 447 451 585 587;
I MDE ad01d1 vsc653 * 456 ADD49 ¦ 431 456 457 661 642;
I MDE ad01d1 vsc653 * 457 ADD410 ¦ 430 455 458 641 646;
I MDE ad01d1 vsc653 * 458 ADD425 ¦ 702 703 704 700 701;
I MDE ad01d1 vsc653 * 459 ADD426 ¦ 699 705 706 708 707;
I MDE ad01d1 vsc653 * 460 ADD411 ¦ 467 469 678 662 645;
I MDE ad01d1 vsc653 * 461 ADD427 ¦ 711 710 483 713 712;
I MDE ad01d1 vsc653 * 462 ADD346 ¦ 282 323 321 570 576;
I MDE ad01d1 vsc653 * 463 ADD430 ¦ 482 487 502 593 610;
I MDE ad01d1 vsc653 * 464 ADD414 ¦ 681 685 687 720 717;
I MDE ad01d1 vsc653 * 465 ADD330 ¦ 463 670 674 704 706;
I MDE ad01d1 vsc653 * 466 ADD345 ¦ 672 677 684 522 532;
I MDE ad01d1 vsc653 * 467 ADD329 ¦ 448 452 459 703 705;
I MDE ad01d1 vsc653 * 468 ADD347 ¦ 333 332 337 571 575;
I MDE ad01d1 vsc653 * 469 ADD331 ¦ 688 460 464 711 715;

I MDE ad01d1 vsc653 * 470 ADD413 ¦ 680 686 692 718 716;
I MDE ad01d1 vsc653 * 471 ADD429 ¦ 486 500 503 624 602;
I MDE ad01d1 vsc653 * 472 ADD415 ¦ 695 696 698 723 721;
I MDE ad01d1 vsc653 * 473 ADD431 ¦ 548 550 562 626 609;
I MDE ad01d1 vsc653 * 474 ADD628 ¦ 375 379 734 67 35;
I MDE ad01d1 vsc653 * 475 ADD612 ¦ 526 732 736 83 51;
I MDE ad01d1 vsc653 * 476 ADD444 ¦ 372 373 346 655 727;
I MDE ad01d1 vsc653 * 477 ADD512 ¦ 512 516 531 742 737;
I MDE ad01d1 vsc653 * 478 ADD59 ¦ 709 716 720 729 730;
I MDE ad01d1 vsc653 * 479 ADD510 ¦ 717 721 724 731 732;
I MDE ad01d1 vsc653 * 480 ADD441 ¦ 489 505 546 663 651;
I MDE ad01d1 vsc653 * 481 ADD442 ¦ 345 344 342 650 657;
I MDE ad01d1 vsc653 * 482 ADD525 ¦ 351 727 728 725 726;
I MDE ad01d1 vsc653 * 483 ADD526 ¦ 376 378 350 733 734;
I MDE ad01d1 vsc653 * 484 ADD511 ¦ 722 392 518 736 735;
I MDE ad01d1 vsc653 * 485 ADD443 ¦ 504 547 551 664 656;
I MDE ad01d1 vsc653 * 486 ADD69 ¦ 718 648 654 86 54;
I MDE ad01d1 vsc653 * 487 ADD610 ¦ 723 658 729 85 53;
I MDE ad01d1 vsc653 * 488 ADD625 ¦ 738 652 659 70 38;
I MDE ad01d1 vsc653 * 489 ADD626 ¦ 739 660 725 69 37;
I MDE ad01d1 vsc653 * 490 ADD611 ¦ 511 730 731 84 52;
I MDE ad01d1 vsc653 * 491 ADD627 ¦ 740 726 733 68 36;
I MDE ad01d1 vsc653 * 492 ADD446 ¦ 374 377 348 739 740;
I MDE ad01d1 vsc653 * 493 ADD514 ¦ 573 582 590 746 744;
I MDE ad01d1 vsc653 * 494 ADD614 ¦ 581 737 743 81 49;
I MDE ad01d1 vsc653 * 495 ADD513 ¦ 530 568 572 743 741;
I MDE ad01d1 vsc653 * 496 ADD445 ¦ 347 349 552 738 728;
I MDE ad01d1 vsc653 * 497 ADD515 ¦ 589 701 708 745 623;
I MDE ad01d1 vsc653 * 498 ADD613 ¦ 569 735 742 82 50;
I MDE ad01d1 vsc653 * 499 ADD629 ¦ 100 115 380 66 65;
I MDE ad01d1 vsc653 * 500 ADD615 ¦ 700 741 746 80 48;
I $C0 501 * ¦ .28 ¦ 1 96;
I $C0 502 * ¦ .285 ¦ 2 96;
I $C0 503 * ¦ .285 ¦ 3 96;
I $C0 504 * ¦ .285 ¦ 4 96;
I $C0 505 * ¦ .285 ¦ 5 96;
I $C0 506 * ¦ .285 ¦ 6 96;
I $C0 507 * ¦ .285 ¦ 7 96;
I $C0 508 * ¦ .285 ¦ 8 96;
I $C0 509 * ¦ .285 ¦ 9 96;
I $C0 510 * ¦ .285 ¦ 10 96;
I $C0 511 * ¦ .285 ¦ 11 96;
I $C0 512 * ¦ .285 ¦ 12 96;
I $C0 513 * ¦ .285 ¦ 13 96;
I $C0 514 * ¦ .285 ¦ 14 96;
I $C0 515 * ¦ .285 ¦ 15 96;
I $C0 516 * ¦ .285 ¦ 16 96;
I $C0 517 * ¦ .291 ¦ 17 96;

```
I $C0 518 * ¦ .285 ¦ 18 96;
I $C0 519 * ¦ .285 ¦ 19 96;
I $C0 520 * ¦ .285 ¦ 20 96;
I $C0 521 * ¦ .285 ¦ 21 96;
I $C0 522 * ¦ .285 ¦ 22 96;
I $C0 523 * ¦ .285 ¦ 23 96;
I $C0 524 * ¦ .285 ¦ 24 96;
I $C0 525 * ¦ .285 ¦ 25 96;
I $C0 526 * ¦ .285 ¦ 26 96;
I $C0 527 * ¦ .285 ¦ 27 96;
I $C0 528 * ¦ .285 ¦ 28 96;
I $C0 529 * ¦ .285 ¦ 29 96;
I $C0 530 * ¦ .285 ¦ 30 96;
I $C0 531 * ¦ .285 ¦ 31 96;
I $C0 532 * ¦ .285 ¦ 32 96;
I $C0 533 * ¦ .59E-01 ¦ 33 96;
I $C0 534 * ¦ .61E-01 ¦ 35 96;
I $C0 535 * ¦ .61E-01 ¦ 36 96;
I $C0 536 * ¦ .61E-01 ¦ 37 96;
I $C0 537 * ¦ .61E-01 ¦ 38 96;
I $C0 538 * ¦ .61E-01 ¦ 39 96;
I $C0 539 * ¦ .61E-01 ¦ 40 96;
I $C0 540 * ¦ .61E-01 ¦ 41 96;
I $C0 541 * ¦ .61E-01 ¦ 42 96;
I $C0 542 * ¦ .61E-01 ¦ 43 96;
I $C0 543 * ¦ .61E-01 ¦ 44 96;
I $C0 544 * ¦ .61E-01 ¦ 45 96;
I $C0 545 * ¦ .61E-01 ¦ 46 96;
I $C0 546 * ¦ .61E-01 ¦ 47 96;
I $C0 547 * ¦ .61E-01 ¦ 48 96;
I $C0 548 * ¦ .61E-01 ¦ 49 96;
I $C0 549 * ¦ .61E-01 ¦ 50 96;
I $C0 550 * ¦ .61E-01 ¦ 51 96;
I $C0 551 * ¦ .61E-01 ¦ 52 96;
I $C0 552 * ¦ .61E-01 ¦ 53 96;
I $C0 553 * ¦ .61E-01 ¦ 54 96;
I $C0 554 * ¦ .61E-01 ¦ 55 96;
I $C0 555 * ¦ .61E-01 ¦ 56 96;
I $C0 556 * ¦ .61E-01 ¦ 57 96;
I $C0 557 * ¦ .61E-01 ¦ 58 96;
I $C0 558 * ¦ .61E-01 ¦ 59 96;
I $C0 559 * ¦ .61E-01 ¦ 60 96;
I $C0 560 * ¦ .61E-01 ¦ 61 96;
I $C0 561 * ¦ .61E-01 ¦ 62 96;
I $C0 562 * ¦ .59E-01 ¦ 63 96;
I $C0 563 * ¦ .59E-01 ¦ 64 96;
I $C0 564 * ¦ .61E-01 ¦ 65 96;
I $C0 565 * ¦ .65E-01 ¦ 66 96;
```

I $C0 566 * ¦ .65E-01 ¦ 67 96;
I $C0 567 * ¦ .65E-01 ¦ 68 96;
I $C0 568 * ¦ .65E-01 ¦ 69 96;
I $C0 569 * ¦ .65E-01 ¦ 70 96;
I $C0 570 * ¦ .65E-01 ¦ 71 96;
I $C0 571 * ¦ .65E-01 ¦ 72 96;
I $C0 572 * ¦ .65E-01 ¦ 73 96;
I $C0 573 * ¦ .65E-01 ¦ 74 96;
I $C0 574 * ¦ .65E-01 ¦ 75 96;
I $C0 575 * ¦ .65E-01 ¦ 76 96;
I $C0 576 * ¦ .65E-01 ¦ 77 96;
I $C0 577 * ¦ .65E-01 ¦ 78 96;
I $C0 578 * ¦ .65E-01 ¦ 79 96;
I $C0 579 * ¦ .65E-01 ¦ 80 96;
I $C0 580 * ¦ .65E-01 ¦ 81 96;
I $C0 581 * ¦ .65E-01 ¦ 82 96;
I $C0 582 * ¦ .65E-01 ¦ 83 96;
I $C0 583 * ¦ .65E-01 ¦ 84 96;
I $C0 584 * ¦ .65E-01 ¦ 85 96;
I $C0 585 * ¦ .65E-01 ¦ 86 96;
I $C0 586 * ¦ .65E-01 ¦ 87 96;
I $C0 587 * ¦ .65E-01 ¦ 88 96;
I $C0 588 * ¦ .65E-01 ¦ 89 96;
I $C0 589 * ¦ .65E-01 ¦ 90 96;
I $C0 590 * ¦ .65E-01 ¦ 91 96;
I $C0 591 * ¦ .65E-01 ¦ 92 96;
I $C0 592 * ¦ .65E-01 ¦ 93 96;
I $C0 593 * ¦ .65E-01 ¦ 94 96;
I $C0 594 * ¦ .59E-01 ¦ 95 96;
E netlist B subcells
MDE nr02d1 vsc653
MDE in01d5 vsc653
MDE ad01d1 vsc653
E subcells B attribute_list
40045 la_source
E attribute_list B A: la_source
1010 [mde]nr02d1;
1 2 3 4 5 6 7 8 9 10 11 12 13 14 15 16 17 18 19 20 21 22 23 24 25 26 27 28 29 3-
0 31 32 33 34 35 36 37 38 39 40 41 42 43 44 45 62 63 64 65 66 83 84 85 86 87 88 -
89 90 91 92 93 94 95 96 97 98 99 100 101 102 103 104 105 106 107 108 109 110 111-

112 113 114 115 116 117 118 119 120 121 122 123 124 125 126 127 128 129 130 131-
132 133 134 135 136 137 138 139 140 141 142 143 144 145 146 147 148 149 150 151-
152 153 154 155 156 157 158 159 160 161 162 163 164 165 166 167 168 169 170 171-
172 173 174 175 176 177 178 179 180 181 182 183 184 185 186 187 188 189 190 191-
192 193 194 195 196 197 198 199 200 201 202 203 204 205 206 207 208 209 210 211-
212 213 214 215 216 217 218 219 220 221 222 223 224 225 226 227 228 229 230 231-
232 233 234 235 236 237 238 239 240 241 242 243 244 245 246 247 248 249 250 251-
252 253 254 255 256 257 258 259 260 261 262 263 264 265 266 267 268 269 270 271-
272 273 274 275 276 277 278 279 280 281 282 283 284 285 286 287 288;
1010 [mde]in01d5;
46 47 48 49 50 51 52 53 54 55 56 57 58 59 60 61 67 68 69 70 71 72 73 74 75 76 7-
7 78 79 80 81 82;
1010 [mde]ad01d1;
289 290 291 292 293 294 295 296 297 298 299 300 301 302 303 304 305 306 307 308-
309 310 311 312 313 314 315 316 317 318 319 320 321 322 323 324 325 326 327 328-
329 330 331 332 333 334 335 336 337 338 339 340 341 342 343 344 345 346 347 348-
349 350 351 352 353 354 355 356 357 358 359 360 361 362 363 364 365 366 367 368-
369 370 371 372 373 374 375 376 377 378 379 380 381 382 383 384 385 386 387 388-
389 390 391 392 393 394 395 396 397 398 399 400 401 402 403 404 405 406 407 408-
409 410 411 412 413 414 415 416 417 418 419 420 421 422 423 424 425 426 427 428-
429 430 431 432 433 434 435 436 437 438 439 440 441 442 443 444 445 446 447 448-
449 450 451 452 453 454 455 456 457 458 459 460 461 462 463 464 465 466 467 468-
469 470 471 472 473 474 475 476 477 478 479 480 481 482 483 484 485 486 487 488-
489 490 491 492 493 494 495 496 497 498 499 500;
E

NM16_P NLS

#cell2 * nm16_p nls * 33 any 0 v8r4.6.2
"19-Sep-94 GMT" "13:44:09 GMT" "19-Sep-94 GMT" "13:44:09 GMT" amir * .
writer 1
file_version 1
sections 1
netlist 1: 81 nm16_p B contents: nm16_p
netlist 246
cells 19186
switches 0
attributes 0
physical 0
history 0
E contents B netlist
X 1 mclk i;
X 2 reset_ i;
X 3 minp3 i;
X 4 minmul i;
X 5 maxone[3] i;
X 6 maxone[2] i;
X 7 maxone[1] i;
X 8 maxone[0] i;
X 9 mckonst i;
X 10 macc0[3] i;
X 11 macc0[2] i;
X 12 macc0[1] i;
X 13 macc0[0] i;
X 14 macc_smp i;
X 15 mv_tr i;
X 16 mrdacc i;
X 17 mbrl[10] i;
X 18 mbrl[9] i;
X 19 mbrl[8] i;
X 20 mbrl[7] i;
X 21 mbrl[6] i;
X 22 mbrl[5] i;
X 23 mbrl[4] i;
X 24 mbrl[3] i;
X 25 mbrl[2] i;
X 26 mbrl[1] i;

```
X 27 mbrl[0] i;
X 28 mdat[15] i;
X 29 mdat[14] i;
X 30 mdat[13] i;
X 31 mdat[12] i;
X 32 mdat[11] i;
X 33 mdat[10] i;
X 34 mdat[9] i;
X 35 mdat[8] i;
X 36 mdat[7] i;
X 37 mdat[6] i;
X 38 mdat[5] i;
X 39 mdat[4] i;
X 40 mdat[3] i;
X 41 mdat[2] i;
X 42 mdat[1] i;
X 43 mdat[0] i;
X 44 mcof[23] i;
X 45 mcof[22] i;
X 46 mcof[21] i;
X 47 mcof[20] i;
X 48 mcof[19] i;
X 49 mcof[18] i;
X 50 mcof[17] i;
X 51 mcof[16] i;
X 52 mcof[15] i;
X 53 mcof[14] i;
X 54 mcof[13] i;
X 55 mcof[12] i;
X 56 mcof[11] i;
X 57 mcof[10] i;
X 58 mcof[9] i;
X 59 mcof[8] i;
X 60 mcof[7] i;
X 61 mcof[6] i;
X 62 mcof[5] i;
X 63 mcof[4] i;
X 64 mcof[3] i;
X 65 mcof[2] i;
X 66 mcof[1] i;
X 67 mcof[0] i;
X 68 mbbus[23] o;
X 69 mbbus[22] o;
X 70 mbbus[21] o;
X 71 mbbus[20] o;
X 72 mbbus[19] o;
X 73 mbbus[18] o;
X 74 mbbus[17] o;
```

X 75 mbbus[16] o;
X 76 mbbus[15] o;
X 77 mbbus[14] o;
X 78 mbbus[13] o;
X 79 mbbus[12] o;
X 80 mbbus[11] o;
X 81 mbbus[10] o;
X 82 mbbus[9] o;
X 83 mbbus[8] o;
X 84 mbbus[7] o;
X 85 mbbus[6] o;
X 86 mbbus[5] o;
X 87 mbbus[4] o;
X 88 mbbus[3] o;
X 89 mbbus[2] o;
X 90 mbbus[1] o;
X 91 mbbus[0] o;
X 92 mwra i;
X 93 modph_we i;
X 94 modg_we i;
X 95 maadd[7] i;
X 96 maadd[6] i;
X 97 maadd[5] i;
X 98 maadd[4] i;
X 99 maadd[3] i;
X 100 maadd[2] i;
X 101 maadd[1] i;
X 102 maadd[0] i;
X 103 muaadd[3] o;
X 104 muaadd[2] o;
X 105 muaadd[1] o;
X 106 muaadd[0] o;
X 107 abus[15] o;
X 108 abus[14] o;
X 109 abus[13] o;
X 110 abus[12] o;
X 111 abus[11] o;
X 112 abus[10] o;
X 113 abus[9] o;
X 114 abus[8] o;
X 115 abus[7] o;
X 116 abus[6] o;
X 117 abus[5] o;
X 118 abus[4] o;
X 119 abus[3] o;
X 120 abus[2] o;
X 121 abus[1] o;
X 122 abus[0] o;

X 123 aadd[3] o;
X 124 aadd[2] o;
X 125 aadd[1] o;
X 126 aadd[0] o;
X 127 mrgw[7] i;
X 128 mrgw[6] i;
X 129 mrgw[5] i;
X 130 mrgw[4] i;
X 131 mrgw[3] i;
X 132 mrgw[2] i;
X 133 mrgw[1] i;
X 134 mrgw[0] i;
X 135 mrgr[3] i;
X 136 mrgr[2] i;
X 137 mrgr[1] i;
X 138 mrgr[0] i;
X 139 mrgs i;
X 140 mrda i;
X 141 bbus[15] i;
X 142 bbus[14] i;
X 143 bbus[13] i;
X 144 bbus[12] i;
X 145 bbus[11] i;
X 146 bbus[10] i;
X 147 bbus[9] i;
X 148 bbus[8] i;
X 149 bbus[7] i;
X 150 bbus[6] i;
X 151 bbus[5] i;
X 152 bbus[4] i;
X 153 bbus[3] i;
X 154 bbus[2] i;
X 155 bbus[1] i;
X 156 bbus[0] i;
X 157 mbwrc i;
G 158 VDD;
G 159 VSS;
N 162 inp1[0];
N 163 inp1[1];
N 164 inp1[2];
N 165 inp1[3];
N 166 inp1[4];
N 167 inp1[5];
N 168 inp1[6];
N 169 inp1[7];
N 170 inp1[8];
N 171 inp1[9];
N 172 inp1[10];

```
N 173 inp1[11];
N 174 inp1[12];
N 175 inp1[13];
N 176 inp1[14];
N 177 inp1[15];
N 178 inp2[0];
N 179 inp2[1];
N 180 inp2[2];
N 181 inp2[3];
N 182 inp2[4];
N 183 inp2[5];
N 184 inp2[6];
N 185 inp2[7];
N 186 inp2[8];
N 187 inp2[9];
N 188 inp2[10];
N 189 inp2[11];
N 190 inp2[12];
N 191 inp2[13];
N 192 inp2[14];
N 193 inp2[15];
N 194 trmsb[0];
N 195 trmsb[1];
N 196 trmsb[2];
N 197 trmsb[3];
N 198 trmsb[4];
N 199 trmsb[5];
N 200 trmsb[6];
N 201 trmsb[7];
N 202 trmsb[8];
N 203 msbacc[0];
N 204 msbacc[1];
N 205 msbacc[2];
N 206 msbacc[3];
N 207 msbacc[4];
N 208 msbacc[5];
N 209 msbacc[6];
N 210 msbacc[7];
N 211 msbacc[8];
N 212 trsel[0];
N 213 trsel[1];
N 214 trsel[2];
N 215 trsel[3];
N 216 selu[0];
N 217 selu[1];
N 218 selu[2];
N 219 selu[3];
N 220 selb[0];
```

```
N 221 selb[1];
N 222 selb[2];
N 223 selb[3];
N 224 selb[4];
N 225 selb[5];
N 226 selb[6];
N 227 selb[7];
N 228 selb[8];
N 229 selb[9];
N 230 selb[10];
N 231 selb[11];
N 232 selb[12];
N 233 selb[13];
N 234 selb[14];
N 235 selb[15];
N 236 p2[1];
N 237 p2[2];
N 238 p2[3];
N 239 p2[4];
N 240 p2[5];
N 241 p2[6];
N 242 p2[7];
N 243 p2[8];
N 244 p2[9];
N 245 p2[10];
N 246 p2[11];
N 247 p2[12];
N 248 p2[13];
N 249 p2[14];
N 250 p2[15];
N 251 p2[16];
N 252 p2[17];
N 253 p2[18];
N 254 p2[19];
N 255 p2[20];
N 256 p2[21];
N 257 p2[22];
N 258 p2[23];
N 259 p2[24];
N 260 p2[25];
N 261 p2[26];
N 262 p2[27];
N 263 p2[28];
N 264 p2[29];
N 265 p2[30];
N 266 p2[31];
N 267 p1[1];
N 268 p1[2];
```

N 269 p1[3];
N 270 p1[4];
N 271 p1[5];
N 272 p1[6];
N 273 p1[7];
N 274 p1[8];
N 275 p1[9];
N 276 p1[10];
N 277 p1[11];
N 278 p1[12];
N 279 p1[13];
N 280 p1[14];
N 281 p1[15];
N 282 p1[16];
N 283 p1[17];
N 284 p1[18];
N 285 p1[19];
N 286 p1[20];
N 287 p1[21];
N 288 p1[22];
N 289 p1[23];
N 290 p1[24];
N 291 p1[25];
N 292 p1[26];
N 293 p1[27];
N 294 p1[28];
N 295 p1[29];
N 296 p1[30];
N 297 mcy;
N 298 mrdaccn;
N 299 adder_cout;
N 300 adder_ovr;
N 301 yasis;
N 302 yof;
N 303 yuf;
N 304 p;
N 68 mm16a_mbbus[23];
N 68 mm16x_mbbus16[15];
N 69 mm16a_mbbus[22];
N 69 mm16x_mbbus16[14];
N 70 mm16a_mbbus[21];
N 70 mm16x_mbbus16[13];
N 71 mm16a_mbbus[20];
N 71 mm16x_mbbus16[12];
N 72 mm16a_mbbus[19];
N 72 mm16x_mbbus16[11];
N 73 mm16a_mbbus[18];
N 73 mm16x_mbbus16[10];

N 74 mm16a_mbbus[17];
N 74 mm16x_mbbus16[9];
N 75 mm16a_mbbus[16];
N 75 mm16x_mbbus16[8];
N 76 mm16a_mbbus[15];
N 76 mm16x_mbbus16[7];
N 77 mm16a_mbbus[14];
N 77 mm16x_mbbus16[6];
N 78 mm16a_mbbus[13];
N 78 mm16x_mbbus16[5];
N 79 mm16a_mbbus[12];
N 79 mm16x_mbbus16[4];
N 80 mm16a_mbbus[11];
N 80 mm16x_mbbus16[3];
N 81 mm16a_mbbus[10];
N 81 mm16x_mbbus16[2];
N 82 mm16a_mbbus[9];
N 82 mm16x_mbbus16[1];
N 83 mm16a_mbbus[8];
N 83 mm16x_mbbus16[0];
N 84 mm16a_mbbus[7];
N 84 mm16x_mbbusl[7];
N 85 mm16a_mbbus[6];
N 85 mm16x_mbbusl[6];
N 86 mm16a_mbbus[5];
N 86 mm16x_mbbusl[5];
N 87 mm16a_mbbus[4];
N 87 mm16x_mbbusl[4];
N 88 mm16a_mbbus[3];
N 88 mm16x_mbbusl[3];
N 89 mm16a_mbbus[2];
N 89 mm16x_mbbusl[2];
N 90 mm16a_mbbus[1];
N 90 mm16x_mbbusl[1];
N 91 mm16a_mbbus[0];
N 91 mm16x_mbbusl[0];
N 103 mm16a_muaadd[3];
N 104 mm16a_muaadd[2];
N 105 mm16a_muaadd[1];
N 106 mm16a_muaadd[0];
N 107 mm16a_abusdd[19];
N 108 mm16a_abusdd[18];
N 109 mm16a_abusdd[17];
N 110 mm16a_abusdd[16];
N 111 mm16a_abusdd[15];
N 112 mm16a_abusdd[14];
N 113 mm16a_abusdd[13];
N 114 mm16a_abusdd[12];

N 115 mm16a_abusdd[11];
N 116 mm16a_abusdd[10];
N 117 mm16a_abusdd[9];
N 118 mm16a_abusdd[8];
N 119 mm16a_abusdd[7];
N 120 mm16a_abusdd[6];
N 121 mm16a_abusdd[5];
N 122 mm16a_abusdd[4];
N 123 mm16a_abusdd[3];
N 124 mm16a_abusdd[2];
N 125 mm16a_abusdd[1];
N 126 mm16a_abusdd[0];
N 162 mm16x_inp1[0];
N 163 mm16x_inp1[1];
N 164 mm16x_inp1[2];
N 165 mm16x_inp1[3];
N 166 mm16x_inp1[4];
N 167 mm16x_inp1[5];
N 168 mm16x_inp1[6];
N 169 mm16x_inp1[7];
N 170 mm16x_inp1[8];
N 171 mm16x_inp1[9];
N 172 mm16x_inp1[10];
N 173 mm16x_inp1[11];
N 174 mm16x_inp1[12];
N 175 mm16x_inp1[13];
N 176 mm16x_inp1[14];
N 177 mm16x_inp1[15];
N 178 mm16x_inp2[0];
N 179 mm16x_inp2[1];
N 180 mm16x_inp2[2];
N 181 mm16x_inp2[3];
N 182 mm16x_inp2[4];
N 183 mm16x_inp2[5];
N 184 mm16x_inp2[6];
N 185 mm16x_inp2[7];
N 186 mm16x_inp2[8];
N 187 mm16x_inp2[9];
N 188 mm16x_inp2[10];
N 189 mm16x_inp2[11];
N 190 mm16x_inp2[12];
N 191 mm16x_inp2[13];
N 192 mm16x_inp2[14];
N 193 mm16x_inp2[15];
N 194 mm16a_trmsb[0];
N 195 mm16a_trmsb[1];
N 196 mm16a_trmsb[2];
N 197 mm16a_trmsb[3];

N 198 mm16a_trmsb[4];
N 199 mm16a_trmsb[5];
N 200 mm16a_trmsb[6];
N 201 mm16a_trmsb[7];
N 202 mm16a_trmsb[8];
N 203 mm16a_msbacc[0];
N 204 mm16a_msbacc[1];
N 205 mm16a_msbacc[2];
N 206 mm16a_msbacc[3];
N 207 mm16a_msbacc[4];
N 208 mm16a_msbacc[5];
N 209 mm16a_msbacc[6];
N 210 mm16a_msbacc[7];
N 211 mm16a_msbacc[8];
N 212 nm16c_trsel[0];
N 213 nm16c_trsel[1];
N 214 nm16c_trsel[2];
N 215 nm16c_trsel[3];
N 216 mm16x_selu[0];
N 217 mm16x_selu[1];
N 218 mm16x_selu[2];
N 219 mm16x_selu[3];
N 220 nm16c_selb[0];
N 221 nm16c_selb[1];
N 222 nm16c_selb[2];
N 223 nm16c_selb[3];
N 224 nm16c_selb[4];
N 225 nm16c_selb[5];
N 226 nm16c_selb[6];
N 227 nm16c_selb[7];
N 228 nm16c_selb[8];
N 229 nm16c_selb[9];
N 230 nm16c_selb[10];
N 231 nm16c_selb[11];
N 232 nm16c_selb[12];
N 233 nm16c_selb[13];
N 234 nm16c_selb[14];
N 235 nm16c_selb[15];
N 236 mmul_P2[0];
N 237 mmul_P2[1];
N 238 mmul_P2[2];
N 239 mmul_P2[3];
N 240 mmul_P2[4];
N 241 mmul_P2[5];
N 242 mmul_P2[6];
N 243 mmul_P2[7];
N 244 mmul_P2[8];
N 245 mmul_P2[9];

N 246 mmul_P2[10];
N 247 mmul_P2[11];
N 248 mmul_P2[12];
N 249 mmul_P2[13];
N 250 mmul_P2[14];
N 251 mmul_P2[15];
N 252 mmul_P2[16];
N 253 mmul_P2[17];
N 254 mmul_P2[18];
N 255 mmul_P2[19];
N 256 mmul_P2[20];
N 257 mmul_P2[21];
N 258 mmul_P2[22];
N 259 mmul_P2[23];
N 260 mmul_P2[24];
N 261 mmul_P2[25];
N 262 mmul_P2[26];
N 263 mmul_P2[27];
N 264 mmul_P2[28];
N 265 mmul_P2[29];
N 266 mmul_P2[30];
N 267 mmul_P1[0];
N 268 mmul_P1[1];
N 269 mmul_P1[2];
N 270 mmul_P1[3];
N 271 mmul_P1[4];
N 272 mmul_P1[5];
N 273 mmul_P1[6];
N 274 mmul_P1[7];
N 275 mmul_P1[8];
N 276 mmul_P1[9];
N 277 mmul_P1[10];
N 278 mmul_P1[11];
N 279 mmul_P1[12];
N 280 mmul_P1[13];
N 281 mmul_P1[14];
N 282 mmul_P1[15];
N 283 mmul_P1[16];
N 284 mmul_P1[17];
N 285 mmul_P1[18];
N 286 mmul_P1[19];
N 287 mmul_P1[20];
N 288 mmul_P1[21];
N 289 mmul_P1[22];
N 290 mmul_P1[23];
N 291 mmul_P1[24];
N 292 mmul_P1[25];
N 293 mmul_P1[26];

```
N 294 mmul_P1[27];
N 295 mmul_P1[28];
N 296 mmul_P1[29];
N 297 nm16c_mcy[0];
N 298 nm16c_mrdaccn[0];
N 299 mm16a_adder_COUT[0];
N 300 mm16a_adder_OVR[0];
N 301 nm16c_yasis[0];
N 302 nm16c_yof[0];
N 303 nm16c_yuf[0];
N 304 mmul_P[0];
V maxone 3 0 ¦ 5 6 7 8;
V macc0 3 0 ¦ 10 11 12 13;
V mbrl 10 0 ¦ 17 18 19 20 21 22 23 24 25 26 27;
V mdat 15 0 ¦ 28 29 30 31 32 33 34 35 36 37 38 39 40 41 42 43;
V mcof 23 0 ¦ 44 45 46 47 48 49 50 51 52 53 54 55 56 57 58 59 60 61 62 63 64 65 -
66 67;
V mbbus 23 0 ¦ 68 69 70 71 72 73 74 75 76 77 78 79 80 81 82 83 84 85 86 87 88 89-
 90 91;
V maadd 7 0 ¦ 95 96 97 98 99 100 101 102;
V muaadd 3 0 ¦ 103 104 105 106;
V abus 15 0 ¦ 107 108 109 110 111 112 113 114 115 116 117 118 119 120 121 122;
V aadd 3 0 ¦ 123 124 125 126;
V mrgw 7 0 ¦ 127 128 129 130 131 132 133 134;
V mrgr 3 0 ¦ 135 136 137 138;
V bbus 15 0 ¦ 141 142 143 144 145 146 147 148 149 150 151 152 153 154 155 156;
V inp1 15 0 ¦ 177 176 175 174 173 172 171 170 169 168 167 166 165 164 163 162;
V inp2 15 0 ¦ 193 192 191 190 189 188 187 186 185 184 183 182 181 180 179 178;
V trmsb 8 0 ¦ 202 201 200 199 198 197 196 195 194;
V msbacc 8 0 ¦ 211 210 209 208 207 206 205 204 203;
V trsel 3 0 ¦ 215 214 213 212;
V selu 3 0 ¦ 219 218 217 216;
V selb 15 0 ¦ 235 234 233 232 231 230 229 228 227 226 225 224 223 222 221 220;
V p2 31 1 ¦ 266 265 264 263 262 261 260 259 258 257 256 255 254 253 252 251 250 -
249 248 247 246 245 244 243 242 241 240 239 238 237 236;
V p1 31 1 ¦ 158 296 295 294 293 292 291 290 289 288 287 286 285 284 283 282 281 -
280 279 278 277 276 275 274 273 272 271 270 269 268 267;
V nm16c_mcy 0 0 ¦ 297;
V nm16c_mrdaccn 0 0 ¦ 298;
V nm16c_yasis 0 0 ¦ 301;
V nm16c_yof 0 0 ¦ 302;
V nm16c_yuf 0 0 ¦ 303;
V nm16c_trsel 3 0 ¦ 215 214 213 212;
V nm16c_selb 15 0 ¦ 235 234 233 232 231 230 229 228 227 226 225 224 223 222 221 -
220;
V mm16a_abusdd 19 0 ¦ 107 108 109 110 111 112 113 114 115 116 117 118 119 120 12-
1 122 123 124 125 126;
V mm16a_adder_COUT 0 0 ¦ 299;
```

V mm16a_adder_OVR 0 0 ¦ 300;
V mm16a_mbbus 23 0 ¦ 68 69 70 71 72 73 74 75 76 77 78 79 80 81 82 83 84 85 86 87-88 89 90 91;
V mm16a_msbacc 8 0 ¦ 211 210 209 208 207 206 205 204 203;
V mm16a_muaadd 3 0 ¦ 103 104 105 106;
V mm16a_trmsb 8 0 ¦ 202 201 200 199 198 197 196 195 194;
V mm16x_inp1 15 0 ¦ 177 176 175 174 173 172 171 170 169 168 167 166 165 164 163 -162;
V mm16x_inp2 15 0 ¦ 193 192 191 190 189 188 187 186 185 184 183 182 181 180 179 -178;
V mm16x_selu 3 0 ¦ 219 218 217 216;
V mm16x_mbbus16 15 0 ¦ 68 69 70 71 72 73 74 75 76 77 78 79 80 81 82 83;
V mm16x_mbbusl 7 0 ¦ 84 85 86 87 88 89 90 91;
V mmul_P 0 0 ¦ 304;
V mmul_P1 30 0 ¦ 158 296 295 294 293 292 291 290 289 288 287 286 285 284 283 282-281 280 279 278 277 276 275 274 273 272 271 270 269 268 267;
V mmul_P2 30 0 ¦ 266 265 264 263 262 261 260 259 258 257 256 255 254 253 252 251-250 249 248 247 246 245 244 243 242 241 240 239 238 237 236;
M NLS nm16c_p * ¦ mclk minmul mcy mrdacc mrdaccn acout aovr msbacc[8] msbacc[7] -
msbacc[6] msbacc[5] msbacc[4] msbacc[3] msbacc[2] msbacc[1] msbacc[0] yasis yof -yuf mv_tr mwra trmsb[8] trmsb[7] trmsb[6] trmsb[5] trmsb[4] trmsb[3] trmsb[2] tr-msb[1] trmsb[0] trsel[3] trsel[2] trsel[1] trsel[0] mbrl[2] mbrl[1] mbrl[0] selu-[3] selu[2] selu[1] selu[0] selb[15] selb[14] selb[13] selb[12] selb[11] selb[10-] selb[9] selb[8] selb[7] selb[6] selb[5] selb[4] selb[3] selb[2] selb[1] selb[0-] ¦ iioioiiiiiiiiiiiooooiiiiiiiiiiiiooooiiiiiiiioooooooooooooooo;
M NLS nm16x_p * ¦ cp maxone[3] maxone[2] maxone[1] maxone[0] mckonst mcof16[15] -
mcof16[14] mcof16[13] mcof16[12] mcof16[11] mcof16[10] mcof16[9] mcof16[8] mcof1-6[7] mcof16[6] mcof16[5] mcof16[4] mcof16[3] mcof16[2] mcof16[1] mcof16[0] mdat[-15] mdat[14] mdat[13] mdat[12] mdat[11] mdat[10] mdat[9] mdat[8] mdat[7] mdat[6]-mdat[5] mdat[4] mdat[3] mdat[2] mdat[1] mdat[0] inp1[15] inp1[14] inp1[13] inp1-[12] inp1[11] inp1[10] inp1[9] inp1[8] inp1[7] inp1[6] inp1[5] inp1[4] inp1[3] i-np1[2] inp1[1] inp1[0] inp2[15] inp2[14] inp2[13] inp2[12] inp2[11] inp2[10] inp-2[9] inp2[8] inp2[7] inp2[6] inp2[5] inp2[4] inp2[3] inp2[2] inp2[1] inp2[0] uph-rg_cp uphrg_init ugrg_cp ugrg_init sel[7] sel[6] sel[5] sel[4] sel[3] sel[2] sel-[1] sel[0] selu[3] selu[2] selu[1] selu[0] mbbus16[15] mbbus16[14] mbbus16[13] m-bbus16[12] mbbus16[11] mbbus16[10] mbbus16[9] mbbus16[8] mbbus16[7] mbbus16[6] m-
bbus16[5] mbbus16[4] mbbus16[3] mbbus16[2] mbbus16[1] mbbus16[0] mbbusl[7] mbbus-
l[6] mbbusl[5] mbbusl[4] mbbusl[3] mbbusl[2] mbbusl[1] mbbusl[0] bbus[15] bbus[1-4] bbus[13] bbus[12] bbus[11] bbus[10] bbus[9] bbus[8] bbus[7] bbus[6] bbus[5] b-bus[4] bbus[3] bbus[2] bbus[1] bbus[0] bbusrg_cp mrdaccn mbbuslsl ¦ iiiiiiiiiii-iiiiiiiiiiiiiiiiiiiiiiiiiioooooooooooooooooooooooooooooooooiiiiiiiiiiiioooooooooo-ooooooooooooooooooiiiiiiiiiiiiiiiiii;
M NLS mulx * ¦ A[15] A[14] A[13] A[12] A[11] A[10] A[9] A[8] A[7] A[6] A[5] A[4]-A[3] A[2] A[1] A[0] B[15] B[14] B[13] B[12] B[11] B[10] B[9] B[8] B[7] B[6] B[5-

] B[4] B[3] B[2] B[1] B[0] P[0] P1[31] P1[30] P1[29] P1[28] P1[27] P1[26] P1[25]-
P1[24] P1[23] P1[22] P1[21] P1[20] P1[19] P1[18] P1[17] P1[16] P1[15] P1[14] P1-
[13] P1[12] P1[11] P1[10] P1[9] P1[8] P1[7] P1[6] P1[5] P1[4] P1[3] P1[2] P1[1] -
P2[31] P2[30] P2[29] P2[28] P2[27] P2[26] P2[25] P2[24] P2[23] P2[22] P2[21] P2[-
20] P2[19] P2[18] P2[17] P2[16] P2[15] P2[14] P2[13] P2[12] P2[11] P2[10] P2[9] -
P2[8] P2[7] P2[6] P2[5] P2[4] P2[3] P2[2] P2[1] ¦ iiiiiiiiiiiiiiiiiiiiiiiiiiii-
iioooooooooooooooooooooooooooooooooooooooooooooooooooooooooooooo;
M MDE ni01d5 vsc653 ¦ I Z ¦ ;
M MDE ni01d2 vsc653 ¦ I Z ¦ ;
M MDE MDP(nm16a) * ¦ accu_cp adder_CIN cp macc0[3] macc0[2] macc0[1] macc0[0]
mc-
of[23] mcof[22] mcof[21] mcof[20] mcof[19] mcof[18] mcof[17] mcof[16] mcof[15] m-
cof[14] mcof[13] mcof[12] mcof[11] mcof[10] mcof[9] mcof[8] mcof[7] mcof[6] mcof-
[5] mcof[4] mcof[3] mcof[2] mcof[1] mcof[0] minp3_cp muladder_CIN p1[31] p1[30] -
p1[29] p1[28] p1[27] p1[26] p1[25] p1[24] p1[23] p1[22] p1[21] p1[20] p1[19] p1[-
18] p1[17] p1[16] p1[15] p1[14] p1[13] p1[12] p1[11] p1[10] p1[9] p1[8] p1[7] p1-
[6] p1[5] p1[4] p1[3] p1[2] p1[1] p1[0] p2[31] p2[30] p2[29] p2[28] p2[27] p2[26-
] p2[25] p2[24] p2[23] p2[22] p2[21] p2[20] p2[19] p2[18] p2[17] p2[16] p2[15] p-
2[14] p2[13] p2[12] p2[11] p2[10] p2[9] p2[8] p2[7] p2[6] p2[5] p2[4] p2[3] p2[2-
] p2[1] p2[0] selb[15] selb[14] selb[13] selb[12] selb[11] selb[10] selb[9] selb-
[8] selb[7] selb[6] selb[5] selb[4] selb[3] selb[2] selb[1] selb[0] transu_cp tr-
sel[3] trsel[2] trsel[1] trsel[0] yasis yof yuf adder_COUT adder_OVR mbbus[23] m-
bbus[22] mbbus[21] mbbus[20] mbbus[19] mbbus[18] mbbus[17] mbbus[16] mbbus[15]
m-
bbus[14] mbbus[13] mbbus[12] mbbus[11] mbbus[10] mbbus[9] mbbus[8] mbbus[7]
mbbu-
s[6] mbbus[5] mbbus[4] mbbus[3] mbbus[2] mbbus[1] mbbus[0] msbacc[31] msbacc[30]-
msbacc[29] msbacc[28] msbacc[27] msbacc[26] msbacc[25] msbacc[24] msbacc[23] mu-
ladder_COUT muladder_OVR trmsb[31] trmsb[30] trmsb[29] trmsb[28] trmsb[27] trmsb-
[26] trmsb[25] trmsb[24] trmsb[23] mulmin maadd[7] maadd[6] maadd[5] maadd[4] ma-
add[3] maadd[2] maadd[1] maadd[0] mrda rgf_ra[3] rgf_ra[2] rgf_ra[1] rgf_ra[0] r-
gf_rb[3] rgf_rb[2] rgf_rb[1] rgf_rb[0] rgf_sa rgf_sb rgf_wh[3] rgf_wh[2] rgf_wh[-
1] rgf_wh[0] rgf_wl[3] rgf_wl[2] rgf_wl[1] rgf_wl[0] muaadd[3] muaadd[2] muaadd[-
1] muaadd[0] abusdd[19] abusdd[18] abusdd[17] abusdd[16] abusdd[15] abusdd[14] a-
busdd[13] abusdd[12] abusdd[11] abusdd[10] abusdd[9] abusdd[8] abusdd[7] abusdd[-
6] abusdd[5] abusdd[4] abusdd[3] abusdd[2] abusdd[1] abusdd[0] ¦ iiiiiiiiiiiiii-
iiiiiiiiiiiiiiiiiiiiiiiiiiiiiiiiiiiiiiiiiiiiiiiiiiiiiiiiiiiiiiiiiiiiiiiiiiiii-
iiiiiiiiiiiiiiiiiiiiiiiiiioooooooooooooooooooooooooooooooooooooooooooooooiiiiiii-
iiiiiiiiiiiiiiiiiiiiioooobbbbbbbbbbbbbbbbbbbbb;
I NLS nm16c_p * * 1 nm16c ¦ 161 4 297 16 298 299 300 211 210 209 208 207 206 205-
204 203 301 302 303 15 92 202 201 200 199 198 197 196 195 194 215 214 213 212 2-
5 26 27 219 218 217 216 235 234 233 232 231 230 229 228 227 226 225 224 223 222 -
221 220;
I NLS nm16x_p * * 2 mm16x ¦ 161 5 6 7 8 9 44 45 46 47 48 49 50 51 52 53 54 55 56-
57 58 59 28 29 30 31 32 33 34 35 36 37 38 39 40 41 42 43 177 176 175 174 173 17-
2 171 170 169 168 167 166 165 164 163 162 193 192 191 190 189 188 187 186 185 18-
4 183 182 181 180 179 178 93 2 94 2 17 18 160 20 21 22 23 24 219 218 217 216 68 -
69 70 71 72 73 74 75 76 77 78 79 80 81 82 83 84 85 86 87 88 89 90 91 141 142 143-

144 145 146 147 148 149 150 151 152 153 154 155 156 157 298 298;
I NLS mulx * * 3 mmul ¦ 177 176 175 174 173 172 171 170 169 168 167 166 165 164 -
163 162 193 192 191 190 189 188 187 186 185 184 183 182 181 180 179 178 304 307 -
296 295 294 293 292 291 290 289 288 287 286 285 284 283 282 281 280 279 278 277 -
276 275 274 273 272 271 270 269 268 267 266 265 264 263 262 261 260 259 258 257 -
256 255 254 253 252 251 250 249 248 247 246 245 244 243 242 241 240 239 238 237 -
236;
I MDE ni01d5 vsc653 * 4 i_11 ¦ 19 160;
I MDE ni01d2 vsc653 * 5 i_14 ¦ 1 161;
I MDE MDP(nm16a) * * 6 mm16a ¦ 14 297 1 10 11 12 13 44 45 46 47 48 49 50 51 52
5-
3 54 55 56 57 58 59 60 61 62 63 64 65 66 67 3 159 158 296 295 294 293 292 291 29-
0 289 288 287 286 285 284 283 282 281 280 279 278 277 276 275 274 273 272 271 27-
0 269 268 267 159 266 265 264 263 262 261 260 259 258 257 256 255 254 253 252 25-
1 250 249 248 247 246 245 244 243 242 241 240 239 238 237 236 304 235 234 233 23-
2 231 230 229 228 227 226 225 224 223 222 221 220 92 215 214 213 212 301 302 303-
299 300 68 69 70 71 72 73 74 75 76 77 78 79 80 81 82 83 84 85 86 87 88 89 90 91-
211 210 209 208 207 206 205 204 203 306 305 202 201 200 199 198 197 196 195 194-
297 95 96 97 98 99 100 101 102 140 135 136 137 138 159 159 159 159 139 159 127 -
128 129 130 131 132 133 134 103 104 105 106 107 108 109 110 111 112 113 114 115 -
116 117 118 119 120 121 122 123 124 125 126;
E netlist B subcells
NLS nm16c_p *
NLS nm16x_p *
NLS mulx *
MDE ni01d5 vsc653
MDE ni01d2 vsc653
MDE MDP(nm16a) *
E subcells

NM16A LA

```
#cell2 * nm16a la * 30 any 22528 v8r4.6.2
# "19-Sep-94 GMT" "7:50:20 GMT" "19-Sep-94 GMT" "7:50:15 GMT" amir * .la
mtbordera .
V 15 COMPASSlogicAssist
T C
L ""
I 1
B -23 31 1000 1086
M 0 0 0 0
F miejn
A 2 "chip" "chip_1" HI "frequency" "15" HI
D "[mde]MDP" "nm16a" "" "0" "0" "1073791438" "1073744825" "1073791318"
"1073764985"
C 100 40 1 -95 -110 "accu_cp" small LC B NSCI -100 -110 1
N 90 40 "accu_cp" normal RC B
C 100 80 2 -95 -100 "adder_CIN" small LC B NSCI -100 -100 1
N 90 80 "adder_CIN" normal RC B
C 100 120 3 -95 -90 "cp" small LC B NSCI -100 -90 1
N 90 120 "cp" normal RC B
C 100 160 4 -95 -80 "macc0[3:0]" small LC B NSCI -100 -80 1
N 90 160 "macc0[3:0]" normal RC B
C 100 200 5 -95 -70 "mcof[23:0]" small LC B NSCI -100 -70 1
N 90 200 "mcof[23:0]" normal RC B
C 100 320 8 -95 -40 "minp3_cp" small LC B NSCI -100 -40 1
N 90 320 "minp3_cp" normal RC B
C 100 400 10 -95 -20 "muladder_CIN" small LC B NSCI -100 -20 1
N 90 400 "muladder_CIN" normal RC B
C 100 440 11 -95 -10 "p1[31:0]" small LC B NSCI -100 -10 1
N 90 440 "p1[31:0]" normal RC B
C 100 480 12 -95 0 "p2[31:0]" small LC B NSCI -100 0 1
N 90 480 "p2[31:0]" normal RC B
C 100 520 13 -95 10 "selb[15:0]" small LC B NSCI -100 10 1
N 90 520 "selb[15:0]" normal RC B
C 100 560 14 -95 20 "transu_cp" small LC B NSCI -100 20 1
N 90 560 "transu_cp" normal RC B
C 100 600 15 -95 30 "trsel[3:0]" small LC B NSCI -100 30 1
N 90 600 "trsel[3:0]" normal RC B
C 100 640 16 -95 40 "yasis" small LC B NSCI -100 40 1
N 90 640 "yasis" normal RC B
C 100 680 17 -95 50 "yof" small LC B NSCI -100 50 1
N 90 680 "yof" normal RC B
C 100 720 18 -95 60 "yuf" small LC B NSCI -100 60 1
N 90 720 "yuf" normal RC B
C 1000 40 19 75 -90 "adder_COUT" small RC B NSCO 80 -90 1
N 990 40 "adder_COUT" normal RC B
```

```
C 1000 80 20 75 -70 "adder_OVR" small RC B NSCO 80 -70 1
N 990 80 "adder_OVR" normal RC B
C 1000 160 22 75 -30 "mbbus[23:0]" small RC B NSCO 80 -30 1
N 990 160 "mbbus[23:0]" normal RC B
C 1000 200 23 75 -10 "msbacc[31:23]" small RC B NSCO 80 -10 1
N 990 200 "msbacc[31:23]" normal RC B
C 1000 240 24 75 10 "muladder_COUT" small RC B NSCO 80 10 1
N 990 240 "muladder_COUT" normal RC B
C 1000 280 25 75 30 "muladder_OVR" small RC B NSCO 80 30 1
N 990 280 "muladder_OVR" normal RC B
C 1000 320 26 75 50 "trmsb[31:23]" small RC B NSCO 80 50 1
N 990 320 "trmsb[31:23]" normal RC B
C 100 760 29 -95 -60 "mulmin" small LC B NSCI -100 -60 1
N 90 760 "mulmin" normal RC B
C 100 800 30 -95 -50 "maadd[7:0]" small LC B NSCI -100 -50 1
N 90 800 "maadd[7:0]" normal RC B
C 100 840 31 -95 -30 "mrda" small LC B NSCI -100 -30 1
N 90 840 "mrda" normal RC B
C 100 880 32 -95 70 "rgf_ra[3:0]" small LC B NSCI -100 70 1
N 90 880 "rgf_ra[3:0]" normal RC B
C 100 920 33 -95 80 "rgf_rb[3:0]" small LC B NSCI -100 80 1
N 90 920 "rgf_rb[3:0]" normal RC B
C 100 960 34 -95 90 "rgf_sa" small LC B NSCI -100 90 1
N 90 960 "rgf_sa" normal RC B
C 100 1000 35 -95 100 "rgf_sb" small LC B NSCI -100 100 1
N 90 1000 "rgf_sb" normal RC B
C 100 1040 36 -95 110 "rgf_wh[3:0]" small LC B NSCI -100 110 1
N 90 1040 "rgf_wh[3:0]" normal RC B
C 100 1080 37 -95 120 "rgf_wl[3:0]" small LC B NSCI -100 120 1
N 90 1080 "rgf_wl[3:0]" normal RC B
C 1000 400 39 75 20 "muaadd[3:0]" small RC B NSCO 80 20 1
N 990 400 "muaadd[3:0]" normal RC B
C 1000 440 47 75 0 "abusdd[19:0]" small RC B NSCIO 80 0 1
N 990 440 "abusdd[19:0]" normal RC B
V 4 *
L 80 113 80 120 1 0
A 80 120 70 130 10.253 1 0
L -90 -120 70 -120 1 0
L -100 -103 -100 113 1 0
L -100 -110 -100 -103 1 0
A -100 -110 -90 -120 10 0 0
L -100 113 -100 120 1 0
A -90 130 -100 120 10 0 0
L 80 -110 80 -103 1 0
A 70 -120 80 -110 10 0 0
L -90 130 70 130 1 0
T -3 -82 "nm16a" normal CT B T
L 80 -103 80 113 1 0
```

```
F 40 97 70 122 5 0
F -90 97 -60 122 5 0
T -9 112 "DATAPATH" normal CC B *
L -11 4 -8 -2 0 0
L -8 -2 -11 -6 0 0
L -11 -40 -2 -25 1 0
L -2 23 -11 38 1 0
B -33 5 -25 37 0 0
B -33 -40 -25 -7 0 0
L -14 23 -14 26 0 0
L -14 26 -11 22 0 0
L -11 22 -14 17 0 0
L -14 17 -14 19 1 0
L -11 38 -11 4 1 0
L -11 -6 -11 -40 1 0
L -14 -20 -14 -16 0 0
L -11 -21 -14 -27 0 0
L -14 -27 -14 -24 0 0
L -14 -16 -11 -21 0 0
L 10 0 10 4 0 0
L 10 4 13 -2 0 0
L 13 -2 10 -7 0 0
L 10 -7 10 -3 0 0
L -2 -25 -2 23 1 0
B 13 -21 21 22 0 0
L -2 0 10 0 1 0
L 10 -3 -2 -3 1 0
L -14 19 -25 19 1 0
L -25 23 -14 23 1 0
L -14 -24 -25 -24 1 0
L -24 -20 -14 -20 1 0
T -5 -53 "@Size@" normal CC B A
T -1 -78 "w=@dx@, h=@dy@" normal CC B A
T -15 55 "@@LABEL" normal CC B L
T -5 72 "@@INSTNAME" normal CB B I
E
O "mtbordera" 0 0 1100 800 N
E
```

NM16A PCL

```
#cell2 * nm16a pcl * 17 any 53248 v8r4.6.2
# "22-May-94 GMT" "13:26:01 GMT" "22-May-94 GMT" "13:26:01 GMT" amir * .
# VERSION NUMBER
2
# TEMPLATE
# name date time checkSum
cdp "10-Dec-92 GMT" "21:51:41 GMT" 'H5B6542F
# CLIENT OBJECTS (generator modules, etc.)
# ID cellName cellType capabilities
1 MDP mde  Check Portable-Netlist Layout-Model-Netlist Model-Schematic
VHDL-Portable VHDL-Layout-Model Verilog-Portable Verilog-Layout-Model
2 CDP slc  CIF MCP Layout
3 dpath ese  DA
4 MDP la  icon
5 vdpath vce  Generate-Vectors
6 dphdng obj  VHDL-Model Verilog-Model
.
# PARAMETERS
# name value default type flags clientIDs / range
DP_specification [la]nm16a_dp "" string [s,Spec:LA] 1 2 3
DP_frequency 50 10.0 real [] 1 2 3 4 / 1.0 *
DP_place_method manual detail string [] 1 2 3 4 / detail quick manual
DP_place_order [txt]nm16a_dp_order * string [] 1 2 3 4
DP_vdd_size * * string [] 1 2 3 4
DP_vss_size * * string [] 1 2 3 4
DP_power_refresh * * string [] 1 2 3 4
DP_ctrl_buffers auto auto string [s] 1 2 3 4 / auto none
DP_misc false false boolean [] 1 2 3 4
->
.
+>
DP_portable_clock * * string [] 1 2 3 4
DP_layout_clock * * string [] 1 2 3 4
DP_placement_summary * * string [] 1 2 3 4
DP_statemachine "" "" string [] 1 2 3 4
DP_connectorseeds "" "" string [] 1 2 3 4
.
DP_control_misc false false boolean [] 1 2 3 4
->
.
+>
Use_VLSI_buffers true true boolean [] 1 2 3 4
->
control_buffer_family_number * * string [] 1 2 3 4
control_buffer_drive_number * * string [] 1 2 3 4
```

.
+>
DP_control_buffer_family auto auto string [] 1 2 3 4 / auto 2 3 4
DP_control_buffer_drive auto auto string [] 1 2 3 4 / auto 1 2 3 4
.
DP_control_logic_layout_option auto auto string [s] 1 2 3 4 / auto none
.
DP_third_routing_layer none none string [] 1 2 3 4 / auto none
Sim_Option Netlist Netlist string [] 1 2 3 4 / Netlist
Layout_Option Optimized Portable string [] 1 2 3 4 / Portable Optimized
HDL_Option Behavioral Behavioral string [] 1 2 3 4 / Behavioral Netlist
Compatible_Tag vcc6dp4 vcc6dp4 string [] 1 2 3 4
Output_Test_Format VIF VIF string [] 5 / VIF QSIM SIM
.

NM16A_DP LA

```
#cell2 * nm16a_dp la * 81 any 71680 v8r4.6.2
# "19-Sep-94 GMT" "7:50:01 GMT" "19-Sep-94 GMT" "7:50:01 GMT" amir * .la
dprpt0010 dpconright dprgf010h dpclkuct0 dptsb1023 dpswztopi dptsb1022 dpibt1022
dpinv0011 dpxnr1021 dptitle00 dpbsh004h dpbuf0013 dpadd001s dpmux4041 dpconleft
dpclktgc0 dpclkckt0 dpdff0101 dpswzint0 dpswztopo mtbordera .
V 15 COMPASSlogicAssist
T C
L ""
I 110
B 5 6 1094 751
M 1073791437 1073777883 1073791438 1073744802
F micej
D "" "" "cdp:vcc4dp2" "0" "0" "0" "0" "0" "0"
C 464 350 1 5 90 "mcof" small LC B NSCI 0 90 1
N 454 350 "mcof" normal RC B
C 1094 300 5 175 50 "mbbus" small RC B NSCO 180 50 1
N 1044 310 "mbbus" normal LC B
C 34 223 2 5 40 "p2" small LC B NSCI 0 40 1
N 24 223 "p2" normal RC B
C 34 303 6 5 60 "p1" small LC B NSCI 0 60 1
N 24 303 "p1" normal RC B
C 1050 580 3 175 80 "abusdd" small RC B NSCO 180 80 1
N 1020 600 "abusdd" normal LC B
V 4 *
T 95 113 "@@InstName" normal CB B I
A 180 140 170 150 10.253 1 0
L 10 0 170 0 1 0
L 0 10 0 140 1 0
A 0 10 10 0 10 0 0
A 10 150 0 140 10 0 0
A 170 0 180 10 10 0 0
L 10 150 170 150 1 0
L 180 10 180 140 1 0
T 95 30 "@@LABEL" normal CC B L
L 75 70 105 70 1 0
L 75 100 75 70 1 0
L 105 100 75 100 1 0
L 105 70 105 100 1 0
L 105 85 111 91 1 0
L 111 91 111 88 1 0
L 111 88 117 88 1 0
L 117 88 117 91 1 0
L 117 91 123 85 1 0
L 123 85 117 79 1 0
L 117 79 117 82 1 0
```

```
L 117 82 111 82 1 0
L 111 82 111 79 1 0
L 111 79 105 85 1 0
L 75 85 71 89 1 0
L 71 89 71 87 1 0
L 71 87 67 87 1 0
L 67 87 67 83 1 0
L 67 83 71 83 1 0
L 71 83 71 81 1 0
L 71 81 75 85 1 0
T 95 50 "w=@dx@, h=@dy@" small CC B A
T 93 10 "nm16a_dp" normal CC B T
F 10 130 55 145 6 0
F 130 130 170 145 6 0
E
O "mtbordera" 0 0 1100 800 N
I trmsb 64 1 500 644 0 "[la]dpswztopo" "" 0 N * 2 "spec" "31:23" HLMC "buffered"
"true" HLMCI
I tufswiz 49 1 570 534 0 "[la]dpswzint0" "" 0 * * 1 "spec" "H 15L 8-" HLMC
I tofswiz 48 1 570 564 0 "[la]dpswzint0" "" 0 * * 1 "spec" "L 15H 8-" HLMC
I dtailswiz 47 1 570 624 0 "[la]dpswzint0" "" 0 * * 1 "spec" "29:14 8-" HLMC
I mvswiz 50 1 570 590 0 "[la]dpswzint0" "" 0 * * 1 "spec" "23:8 8-" HLMC
I mulrg 7 1 504 203 0 "[la]dpdff0101" "" 0 N * 0
I mulick 10 1 524 233 0 "[la]dpclkckt0" "" 0 * * 1 "clock_number" "1" HLMC
I mcofswiz 14 1 504 350 0 "[la]dpswzint0" "" 0 * * 1 "spec" "23:0" HLMC
I minp3ck 13 1 564 380 0 "[la]dpclktgc0" "" 0 * * 1 "clock_number" "1" HLMC
I minp3 94 1 544 350 0 "[la]dpdff0101" "" 0 N * 0
I macc0 41 1 694 310 0 "[la]dpmux4041" "" 0 N * 0
I selswiz 68 1 394 423 3 "[la]dpswzint0" "" 0 * * 1 "spec" "16L 15:0" HLMC
I maxgswiz 42 1 604 403 0 "[la]dpswzint0" "" 0 * * 1 "spec" "9L 23H" HLMC
I msbacc 66 1 914 393 0 "[la]dpswztopo" "" 0 N * 2 "spec" "31:23" HLMC "buffered"
"true" HLMCI
I U69 108 1 484 350 0 "[la]dpconleft" "" 0 * * 1 "spec" "" HLMC
I msbswiz 18 1 234 183 0 "[la]dpswzint0" "" 0 * * 1 "spec" "msb 5- msb 5- msb 5- 14-"
HLMC
I muladder 80 1 144 223 0 "[la]dpadd001s" "" 0 N * 0
I U67 86 1 54 223 0 "[la]dpconleft" "" 0 * * 1 "spec" "" HLMC
I U65 84 1 94 253 0 "[la]dpclkckt0" "" 0 * * 1 "clock_number" "1" HLMC
I p2rg 82 1 74 223 0 "[la]dpdff0101" "" 0 N * 0
I U66 85 1 54 303 0 "[la]dpconleft" "" 0 * * 1 "spec" "" HLMC
I U64 83 1 94 333 0 "[la]dpclkckt0" "" 0 * * 1 "clock_number" "1" HLMC
I p1rg 81 1 74 303 0 "[la]dpdff0101" "" 0 N * 0
I msbzswiz1 19 1 324 183 0 "[la]dpswzint0" "" 0 * * 1 "spec" "6*31 6*25 6*19 14L"
HLMC
I msbbuf1 20 1 274 183 0 "[la]dpbuf0013" "" 0 * * 0
P 224 263 S
I mbrl32 16 1 374 183 0 "[la]dpbsh004h" "" 0 NC * 1 "Number_of_Shifts" "16" HLMC
P 224 183 S
```

I accu 3 1 864 300 0 "[la]dpdff0101" "" 0 N * 0
I accck 4 1 884 330 0 "[la]dpclktgc0" "" 0 * * 1 "clock_number" "1" HLMC
I U1 1 1 660 26 0 "[la]dptitle00" "" 0 * * 2 "number_of_bits" "32" HLMC "title" "Spec schematic" HLMCI
I mulmin 93 1 674 250 0 "[la]dpxnr1021" "" 0 N * 0
I adder 91 1 764 260 0 "[la]dpadd001s" "" 0 * * 0
I hinv 92 1 604 203 0 "[la]dpinv0011" "" 0 N * 0
P 654 250 S
P 684 373 S
P 674 330 S
I honeswiz 43 1 604 310 0 "[la]dpswzint0" "" 0 * * 1 "spec" "9L H 22L" HLMC
I inp3swiz 11 1 614 350 0 "[la]dpswzint0" "" 0 * * 1 "spec" "8*23 23:0" HLMC
P 684 370 S
P 840 300 S
P 1034 300 S
I U59 74 1 1044 300 0 "[la]dpconleft" "" 0 * * 1 "spec" "" HLMC
I yofswiz 55 1 924 173 0 "[la]dpswzint0" "" 0 * * 1 "spec" "H 23L" HLMC
I yof 76 1 964 173 0 "[la]dpibt1022" "" 0 N * 0
P 1034 173 S
I yasis 52 1 964 300 0 "[la]dptsb1022" "" 0 N * 0
I yswiz 53 1 934 300 0 "[la]dpswzint0" "" 0 * * 1 "spec" "23:0" HLMC
I yufswiz 54 1 924 223 0 "[la]dpswzint0" "" 0 * * 1 "spec" "L 23H" HLMC
I yuf 75 1 964 223 0 "[la]dpibt1022" "" 0 N * 0
P 1034 223 S
P 914 373 S
P 390 500 S
P 500 590 S
I transck 46 1 450 620 0 "[la]dpclktgc0" "" 0 * * 1 "clock_number" "1" HLMC
I transu 45 1 430 590 0 "[la]dpdff0101" "" 0 N * 0
I selb 67 1 394 423 0 "[la]dpswztopi" "" 0 N * 2 "spec" "15:0" HLMC "buffered" "false" HLMCI
I transwiz 44 1 390 590 0 "[la]dpswzint0" "" 0 * * 1 "spec" "31:8 8-" HLMC
I muaadd 99 1 850 644 0 "[la]dpswztopo" "" 0 N * 2 "spec" "3:0" HLMC "buffered" "true" HLMCI
I abusswiz 107 1 850 580 0 "[la]dpswzint0" "" 0 * * 1 "spec" "23:4" HLMC
I mrda 101 1 890 580 0 "[la]dptsb1023" "" 0 N * 0
I rgfck 96 1 810 610 0 "[la]dpclkuct0" "" 0 * * 0
I trsel 51 1 640 550 0 "[la]dpmux4041" "" 0 N * 0
I maadd 98 1 760 644 0 "[la]dpswztopi" "" 0 N * 2 "spec" "7:0" HLMC "buffered" "false" HLMCI
I madtswiz 97 1 720 580 0 "[la]dpswzint0" "" 0 * * 1 "spec" "23:8 8-" HLMC
I rgf 95 1 760 580 0 "[la]dprgf010h" "" 0 NC * 1 "number_of_words" "8" HLMC
P 674 403 S
P 640 450 S
P 640 500 S
P 840 450 S
P 640 534 S
P 640 624 S

```
P 610 570 S
I U68 103 1 1010 580 0 "[la]dpconright" "" 0 * * 1 "spec" "19:0" HLMC
I abusrep 102 1 940 634 1 "[la]dprpt0010" "" 0 N * 0
J 25 p2rg 3 "clockspec" 24 U65 1 "clockspec"
J 28 p1rg 3 "clockspec" 27 U64 1 "clockspec"
J 15 minp3 1 "d" 13 mcofswiz 2 "o"
J 11 mulrg 3 "clockspec" 12 mulick 1 "clockspec"
J 21 msbswiz 2 "o" 30 msbbuf1 1 "i"
J 30 msbbuf1 2 "z" 29 msbzswiz1 1 "i"
J 34 accu 3 "clockspec" 35 accck 1 "clockspec"
J 49 yofswiz 2 "o" 50 yof 2 "I"
J 54 yufswiz 2 "o" 55 yuf 2 "I"
J 61 transu 1 "d" 63 transwiz 2 "o"
J 61 transu 3 "clockspec" 60 transck 1 "clockspec"
J 62 selb 1 "o" 17 selswiz 1 "i"
J 15 minp3 3 "clockspec" 14 minp3ck 1 "clockspec"
J 71 rgf 4 "clockspec" 67 rgfck 1 "clockspec"
J 71 rgf 1 "d" 70 madtswiz 2 "o"
J 66 mrda 1 "i" 65 abusswiz 2 "o"
F 39 hinv 2 "zn" S
N 669 203 "mbrlo_" normal LB B
S 59 10 mvswiz 1 "i" 1 SH
N 535 593 "trans" normal LB B
S 58 74 1 SH
S 46 75 1 SV
S 42 72 1 SV
S 32 mbrl32 4 "SEL" 17 selswiz 2 "o" 1 SV
N 389 343 "msel" normal LB B
S 57 19 msbacc 1 "o" 1 SV
S 22 muladder 3 "SO" 31 1 SH
S 3 23 U67 1 "i" 1 SH
S 23 U67 1 "i" 25 p2rg 1 "d" 1 SH
S 25 p2rg 2 "q" 22 muladder 2 "B" 1 SH
N 133 226 "p2b" normal LB B
S 4 26 U66 1 "i" 1 SH
S 26 U66 1 "i" 28 p1rg 1 "d" 1 SH
S 28 p1rg 2 "q" 22 muladder 1 "A" 1 SH
N 134 306 "p1b" normal LB B
S 1 20 U69 1 "i" 1 SH
S 20 U69 1 "i" 13 mcofswiz 1 "i" 1 SH
S 32 mbrl32 3 "Z" 11 mulrg 1 "d" 1 SH
N 479 206 "mbrlod" normal LB B
S 33 31 1 SV
S 31 32 mbrl32 2 "A" 1 SH
N 313 266 "mulot" normal LB B
S 29 msbzswiz1 2 "o" 32 mbrl32 1 "B" 1 SH
S 33 21 msbswiz 1 "i" 1 SH
S 41 57 1 SH
```

S 39 hinv 2 "zn" 40 1 SV
S 40 37 mulmin 3 "a1" 1 SH
S 11 mulrg 2 "q" 39 hinv 3 "i" 1 SH
N 574 206 "mbrlo" normal LB B
S 45 41 1 SV
S 43 honeswiz 2 "o" 16 macc0 2 "i3" 1 SH
S 42 16 macc0 3 "i2" 1 SH
S 15 minp3 2 "q" 44 inp3swiz 1 "i" 1 SH
S 44 inp3swiz 2 "o" 16 macc0 4 "i1" 1 SH
N 684 353 "inp3" normal LB B
S 45 16 macc0 5 "i0" 1 SH
S 46 34 accu 1 "d" 1 SH
N 849 303 "add" normal LB B
S 38 adder 3 "SO" 46 1 SH
S 37 mulmin 2 "zn" 38 adder 2 "B" 1 SH
N 749 263 "muli" normal LB B
S 16 macc0 1 "z" 38 adder 1 "A" 1 SH
N 749 343 "acci" normal LB B
S 56 47 1 SV
S 48 U59 1 "i" 2 1 SH
S 47 48 U59 1 "i" 1 SH
S 52 yasis 2 "z" 47 1 SH
S 52 yasis 1 "i" 53 yswiz 2 "o" 1 SH
S 34 accu 2 "q" 53 yswiz 1 "i" 1 SH
N 924 303 "acc" normal LB B
S 55 yuf 3 "ZN" 56 1 SH
S 34 accu 2 "q" 57 1 SV
S 51 56 1 SV
S 50 yof 3 "ZN" 51 1 SH
S 61 transu 2 "q" 59 1 SH
S 58 63 transwiz 1 "i" 1 SV
S 59 6 trmsb 1 "o" 1 SV
S 71 rgf 1 "d" 69 maadd 1 "o" 1 SV
S 65 abusswiz 1 "i" 64 muaadd 1 "o" 1 SV
S 66 mrda 2 "z" 80 abusrep 1 "i" 1 SV
S 71 rgf 2 "a" 65 abusswiz 1 "i" 1 SH
N 845 583 "rgfout" small LB BV
S 10 mvswiz 1 "i" 9 dtailswiz 1 "i" 1 SV
S 7 tufswiz 2 "o" 76 1 SH
S 9 dtailswiz 2 "o" 77 1 SH
S 10 mvswiz 2 "o" 68 trsel 4 "i1" 1 SH
S 78 68 trsel 3 "i2" 1 SH
S 68 trsel 5 "i0" 77 1 SV
S 8 tofswiz 2 "o" 78 1 SV
S 76 68 trsel 2 "i3" 1 SV
S 18 maxgswiz 2 "o" 72 1 SH
S 73 74 1 SV
S 73 75 1 SH

```
S 68 trsel 1 "z" 70 madtswiz 1 "i" 1 SH
N 700 583 "madt" normal LB B
S 79 U68 1 "i" 5 1 SH
S 66 mrda 2 "z" 79 U68 1 "i" 1 SH
E
```

NM16A_DP NLS

```
#cell2 * nm16a_dp nls * 3 any 0 v8r4.6.2
# "19-Sep-94 GMT" "7:50:03 GMT" "19-Sep-94 GMT" "7:50:03 GMT" amir * .
writer        1
file_version  1
sections      1
netlist   1:       83 nm16a_dp


B contents:  nm16a_dp
netlist        250
cells         3298
switches         0
attributes    3659
physical         0
history          0
E contents


B netlist
X 1 mcof i;
X 2 mbbus o;
X 3 p2 i;
X 4 p1 i;
X 5 abusdd o;
G 6 VDD;
G 7 VSS;
G 8 BULK;
N 9 p1b;
N 10 p2b;
N 11 mulot;
N 15 mbrlod;
N 20 msel;
N 21 add;
N 22 trans;
N 26 mbrlo;
N 27 mbrlo_;
N 28 acc;
N 33 inp3;
N 34 muli;
N 35 acci;
N 50 rgfout;
N 51 madt;
M NLS dpswztopo * ¦ o ¦ i;
M NLS dpswzint0 * ¦ o i ¦ oi;
M NLS dpdff0101 * ¦ clockspec d q ¦ iio;
```

M NLS dpclkckt0 * ¦ clockspec ¦ o;
M NLS dpclktgc0 * ¦ clockspec ¦ o;
M NLS dpmux4041 * ¦ z i0 i1 i2 i3 ¦ oiiii;
M NLS dpconleft * ¦ i ¦ u;
M NLS dpadd001s * ¦ A B SO ¦ iio;
M NLS dpbuf0013 * ¦ i z ¦ io;
M NLS dpbsh004h * ¦ A B Z SEL ¦ iioi;
M NLS dpswztopi * ¦ o ¦ o;
M NLS dptitle00 * ¦ ¦ ;
M NLS dpxnr1021 * ¦ a1 zn ¦ io;
M NLS dpinv0011 * ¦ zn i ¦ oi;
M NLS dpibt1022 * ¦ I ZN ¦ io;
M NLS dptsb1022 * ¦ i z ¦ io;
M NLS dptsb1023 * ¦ i z ¦ io;
M NLS dpclkuct0 * ¦ clockspec ¦ o;
M NLS dprgf010h * ¦ clockspec d a b ¦ iioo;
M NLS dpconright * ¦ i ¦ u;
M NLS dprpt0010 * ¦ i ¦ b;
I NLS dpswztopo * * 1 trmsb ¦ 22;
I NLS dpswzint0 * * 2 tufswiz ¦ 49 48;
I NLS dpswzint0 * * 3 tofswiz ¦ 47 46;
I NLS dpswzint0 * * 4 dtailswiz ¦ 45 22;
I NLS dpswzint0 * * 5 mvswiz ¦ 44 22;
I NLS dpdff0101 * * 6 mulrg ¦ 16 15 26;
I NLS dpclkckt0 * * 7 mulick ¦ 16;
I NLS dpswzint0 * * 8 mcofswiz ¦ 14 1;
I NLS dpclktgc0 * * 9 minp3ck ¦ 43;
I NLS dpdff0101 * * 10 minp3 ¦ 43 14 32;
I NLS dpmux4041 * * 11 macc0 ¦ 35 28 33 29 31;
I NLS dpswzint0 * * 12 selswiz ¦ 20 25;
I NLS dpswzint0 * * 13 maxgswiz ¦ 29 42;
I NLS dpswztopo * * 14 msbacc ¦ 28;
I NLS dpconleft * * 15 U69 ¦ 1;
I NLS dpswzint0 * * 16 msbswiz ¦ 17 11;
I NLS dpadd001s * * 17 muladder ¦ 9 10 11;
I NLS dpconleft * * 18 U67 ¦ 3;
I NLS dpclkckt0 * * 19 U65 ¦ 12;
I NLS dpdff0101 * * 20 p2rg ¦ 12 3 10;
I NLS dpconleft * * 21 U66 ¦ 4;
I NLS dpclkckt0 * * 22 U64 ¦ 13;
I NLS dpdff0101 * * 23 p1rg ¦ 13 4 9;
I NLS dpswzint0 * * 24 msbzswiz1 ¦ 18 19;
I NLS dpbuf0013 * * 25 msbbufl ¦ 17 19;
I NLS dpbsh004h * * 26 mbrl32 ¦ 11 18 15 20;
I NLS dpclktgc0 * * 27 transck ¦ 24;
I NLS dpdff0101 * * 28 transu ¦ 24 23 22;
I NLS dpswztopi * * 29 selb ¦ 25;
I NLS dpswzint0 * * 30 transwiz ¦ 23 21;

```
I NLS dpdff0101 * * 31 accu ¦ 36 21 28;
I NLS dpclktgc0 * * 32 accck ¦ 36;
I NLS dptitle00 * * 33 U1 ¦;
I NLS dpxnr1021 * * 34 mulmin ¦ 27 34;
I NLS dpadd001s * * 35 adder ¦ 35 34 21;
I NLS dpinv0011 * * 36 hinv ¦ 27 26;
I NLS dpswzint0 * * 37 honeswiz ¦ 31 30;
I NLS dpswzint0 * * 38 inp3swiz ¦ 33 32;
I NLS dpconleft * * 39 U59 ¦ 2;
I NLS dpswzint0 * * 40 yofswiz ¦ 38 37;
I NLS dpibt1022 * * 41 yof ¦ 38 2;
I NLS dptsb1022 * * 42 yasis ¦ 39 2;
I NLS dpswzint0 * * 43 yswiz ¦ 39 28;
I NLS dpswzint0 * * 44 yufswiz ¦ 40 41;
I NLS dpibt1022 * * 45 yuf ¦ 40 2;
I NLS dpswztopo * * 46 muaadd ¦ 50;
I NLS dpswzint0 * * 47 abusswiz ¦ 55 50;
I NLS dptsb1023 * * 48 mrda ¦ 55 5;
I NLS dpclkuct0 * * 49 rgfck ¦ 52;
I NLS dpmux4041 * * 50 trsel ¦ 51 45 44 47 49;
I NLS dpswztopi * * 51 maadd ¦ 53;
I NLS dpswzint0 * * 52 madtswiz ¦ 53 51;
I NLS dprgf010h * * 53 rgf ¦ 52 53 50 54;
I NLS dpconright * * 54 U68 ¦ 5;
I NLS dprpt0010 * * 55 abusrep ¦ 5;
E netlist


B subcells
NLS dpswztopo *
NLS dpswzint0 *
NLS dpdff0101 *
NLS dpclkckt0 *
NLS dpclktgc0 *
NLS dpmux4041 *
NLS dpconleft *
NLS dpadd001s *
NLS dpbuf0013 *
NLS dpbsh004h *
NLS dpswztopi *
NLS dptitle00 *
NLS dpxnr1021 *
NLS dpinv0011 *
NLS dpibt1022 *
NLS dptsb1022 *
NLS dptsb1023 *
NLS dpclkuct0 *
NLS dprgf010h *
```

```
NLS dpconright *
NLS dprpt0010 *
E subcells


B attribute_list
      3852 spec
      4304 buffered
      4364 clock_number
      4411 Number_of_Shifts
      4450 number_of_bits
      4487 title
      4528 number_of_words
E attribute_list

B A: spec
1010 31:23;
 1 14;
1010 H 15L 8-;
 2;
1010 L 15H 8-;
 3;
1010 29:14 8-;
 4;
1010 23:8 8-;
 5 52;
1010 23:0;
 8 43;
1010 16L 15:0;
 12;
1010 9L 23H;
 13;
1010 ;
 15;
1010 msb 5- msb 5- msb 5- 14-;
 16;
1010 ;
 18;
1010 ;
 21;
1010 6*31 6*25 6*19 14L;
 24;
1010 15:0;
 29;
1010 31:8 8-;
 30;
1010 9L H 22L;
 37;
```

```
1010 8*23 23:0;
 38;
1010 ;
 39;
1010 H 23L;
 40;
1010 L 23H;
 44;
1010 3:0;
 46;
1010 23:4;
 47;
1010 7:0;
 51;
1010 19:0;
 54;
E

B A: buffered
11010 true;
 1 14 46;
11010 false;
 29 51;
E

B A: clock_number
1010 1;
 7 9 19 22 27 32;
E

B A: Number_of_Shifts
1010 16;
 26;
E

B A: number_of_bits
1010 32;
 33;
E

B A: title
11010 Spec schematic;
 33;
E
B A: number_of_words
1010 8;
 53;
E
```

NM16C_P NLS

```
#cell2 * nm16c_p nls * 33 any 0 v8r4.6.2
# "19-Sep-94 GMT" "13:44:10 GMT" "19-Sep-94 GMT" "13:44:10 GMT" amir * .
writer        1
file_version  1
sections      1
netlist   1:       82 nm16c_p


B contents:  nm16c_p
netlist        248
cells         7310
switches         0
attributes       0
physical         0
history          0
E contents


B netlist
X 1 mclk i;
X 2 minmul i;
X 3 mcy o;
X 4 mrdacc i;
X 5 mrdaccn o;
X 6 acout i;
X 7 aovr i;
X 8 msbacc[8] i;
X 9 msbacc[7] i;
X 10 msbacc[6] i;
X 11 msbacc[5] i;
X 12 msbacc[4] i;
X 13 msbacc[3] i;
X 14 msbacc[2] i;
X 15 msbacc[1] i;
X 16 msbacc[0] i;
X 17 yasis o;
X 18 yof o;
X 19 yuf o;
X 20 mv_tr i;
X 21 mwra i;
X 22 trmsb[8] i;
X 23 trmsb[7] i;
X 24 trmsb[6] i;
X 25 trmsb[5] i;
X 26 trmsb[4] i;
```

X 27 trmsb[3] i;
X 28 trmsb[2] i;
X 29 trmsb[1] i;
X 30 trmsb[0] i;
X 31 trsel[3] o;
X 32 trsel[2] o;
X 33 trsel[1] o;
X 34 trsel[0] o;
X 35 mbrl[2] i;
X 36 mbrl[1] i;
X 37 mbrl[0] i;
X 38 selu[3] i;
X 39 selu[2] i;
X 40 selu[1] i;
X 41 selu[0] i;
X 42 selb[15] o;
X 43 selb[14] o;
X 44 selb[13] o;
X 45 selb[12] o;
X 46 selb[11] o;
X 47 selb[10] o;
X 48 selb[9] o;
X 49 selb[8] o;
X 50 selb[7] o;
X 51 selb[6] o;
X 52 selb[5] o;
X 53 selb[4] o;
X 54 selb[3] o;
X 55 selb[2] o;
X 56 selb[1] o;
X 57 selb[0] o;
G 58 VDD;
G 59 VSS;
N 111 tcoutd;
N 112 tovrd_n;
N 113 tcoutd_n;
N 2 mcy_n;
N 3 mcy_1_q;
N 111 tcoutd_1_q;
N 33 trsel1_buf_ZN[0];
N 34 trsel0_buf_ZN[0];
N 5 mrdaccn_1[0];
N 17 yasis_buf_ZN[0];
N 18 yof_buf_ZN[0];
N 19 yuf_buf_ZN[0];
V msbacc 8 0 ¦ 8 9 10 11 12 13 14 15 16;
V trmsb 8 0 ¦ 22 23 24 25 26 27 28 29 30;
V trsel 3 0 ¦ 31 32 33 34;

```
V mbrl 2 0 ¦ 35 36 37;
V selu 3 0 ¦ 38 39 40 41;
V selb 15 0 ¦ 42 43 44 45 46 47 48 49 50 51 52 53 54 55 56 57;
V mrdaccn_1 0 0 ¦ 5;
V yof_buf_ZN 0 0 ¦ 18;
V yuf_buf_ZN 0 0 ¦ 19;
V yasis_buf_ZN 0 0 ¦ 17;
V trsel0_buf_ZN 0 0 ¦ 34;
V trsel1_buf_ZN 0 0 ¦ 33;
M MDE nr04d1 vsc653 ¦ A1 A2 A3 A4 ZN ¦ ;
M MDE in01d5 vsc653 ¦ I ZN ¦ ;
M MDE in01d3 vsc653 ¦ I ZN ¦ ;
M MDE fn01d2 vsc653 ¦ A1 B1 ZN ¦ ;
M MDE or02d1 vsc653 ¦ A1 A2 Z ¦ ;
M MDE in01d4 vsc653 ¦ I ZN ¦ ;
M MDE in01d2 vsc653 ¦ I ZN ¦ ;
M MDE ni01d4 vsc653 ¦ I Z ¦ ;
M MDE nr02d1 vsc653 ¦ A1 A2 ZN ¦ ;
M MDE an04d1 vsc653 ¦ A1 A2 A3 A4 Z ¦ ;
M MDE ao04d2 vsc653 ¦ A1 A2 B ZN ¦ ;
M MDE nd04d1 vsc653 ¦ A1 A3 A4 A2 ZN ¦ ;
M MDE in01d1 vsc653 ¦ I ZN ¦ ;
M MDE an03d1 vsc653 ¦ A1 A2 A3 Z ¦ ;
M MDE ao04d1 vsc653 ¦ A1 A2 B ZN ¦ ;
M MDE or05d1 vsc653 ¦ A1 A2 A3 A4 A5 Z ¦ ;
M MDE nd02d1 vsc653 ¦ A1 A2 ZN ¦ ;
M MDE an02d1 vsc653 ¦ A1 A2 Z ¦ ;
M MDE or06d1 vsc653 ¦ A1 A2 A3 A4 A5 A6 Z ¦ ;
M MDE nd03d1 vsc653 ¦ A1 A2 A3 ZN ¦ ;
M MDE or03d1 vsc653 ¦ A1 A2 A3 Z ¦ ;
M MDE oa02d1 vsc653 ¦ A1 A2 A3 B1 B2 B3 ZN ¦ ;
M MDE or04d2 vsc653 ¦ A1 A2 A3 A4 Z ¦ ;
M MDE in02d1 vsc653 ¦ I ZN ¦ ;
M MDE ni01d3 vsc653 ¦ I Z ¦ ;
M MDE dfntnb vsc653 ¦ D CP Q QN ¦ ;
I MDE nr04d1 vsc653 * 1 i_339 ¦ 91 105 100 81 42;
I MDE in01d5 vsc653 * 2 i_340 ¦ 94 81;
I MDE in01d3 vsc653 * 3 i_341 ¦ 78 94;
I MDE in01d5 vsc653 * 4 i_342 ¦ 41 78;
I MDE fn01d2 vsc653 * 5 i_343 ¦ 104 39 100;
I MDE or02d1 vsc653 * 6 i_344 ¦ 35 80 104;
I MDE or02d1 vsc653 * 7 i_345 ¦ 37 36 80;
I MDE in01d4 vsc653 * 8 i_346 ¦ 38 105;
I MDE in01d2 vsc653 * 9 i_347 ¦ 40 91;
I MDE nr04d1 vsc653 * 10 i_348 ¦ 100 105 109 91 43;
I MDE ni01d4 vsc653 * 11 i_349 ¦ 41 109;
I MDE nr04d1 vsc653 * 12 i_350 ¦ 100 40 105 81 44;
I MDE nr02d1 vsc653 * 13 i_351 ¦ 74 76 45;
```

I MDE fn01d2 vsc653 * 14 i_352 ¦ 105 75 76;
I MDE in01d4 vsc653 * 15 i_353 ¦ 100 75;
I MDE fn01d2 vsc653 * 16 i_354 ¦ 40 73 74;
I MDE ni01d4 vsc653 * 17 i_355 ¦ 78 73;
I MDE an04d1 vsc653 * 18 i_356 ¦ 79 72 110 109 46;
I MDE in01d2 vsc653 * 19 i_357 ¦ 105 110;
I MDE ni01d4 vsc653 * 20 i_358 ¦ 40 72;
I MDE nr02d1 vsc653 * 21 i_359 ¦ 39 104 79;
I MDE an04d1 vsc653 * 22 i_360 ¦ 79 72 81 110 47;
I MDE an04d1 vsc653 * 23 i_361 ¦ 79 110 91 109 48;
I MDE an04d1 vsc653 * 24 i_362 ¦ 79 73 110 91 49;
I MDE nr04d1 vsc653 * 25 i_363 ¦ 91 107 100 81 50;
I MDE ni01d4 vsc653 * 26 i_364 ¦ 38 107;
I MDE ao04d2 vsc653 * 27 i_365 ¦ 99 108 80 51;
I MDE nd04d1 vsc653 * 28 i_366 ¦ 39 78 105 40 108;
I MDE in01d1 vsc653 * 29 i_367 ¦ 35 99;
I MDE nr04d1 vsc653 * 30 i_368 ¦ 100 40 107 81 52;
I MDE nr02d1 vsc653 * 31 i_369 ¦ 98 74 53;
I MDE fn01d2 vsc653 * 32 i_370 ¦ 107 75 98;
I MDE an04d1 vsc653 * 33 i_371 ¦ 79 72 109 105 54;
I MDE fn01d2 vsc653 * 34 i_372 ¦ 37 97 55;
I MDE nd04d1 vsc653 * 35 i_373 ¦ 78 96 72 106 97;
I MDE nr02d1 vsc653 * 36 i_374 ¦ 38 102 106;
I MDE or02d1 vsc653 * 37 i_375 ¦ 36 35 102;
I MDE in01d1 vsc653 * 38 i_376 ¦ 39 96;
I MDE an03d1 vsc653 * 39 i_377 ¦ 79 103 109 56;
I MDE nr02d1 vsc653 * 40 i_378 ¦ 107 40 103;
I MDE ao04d1 vsc653 * 41 i_379 ¦ 101 77 37 57;
I MDE in01d1 vsc653 * 42 i_380 ¦ 36 77;
I MDE or05d1 vsc653 * 43 i_381 ¦ 39 41 35 38 40 101;
I MDE fn01d2 vsc653 * 44 i_545 ¦ 114 115 31;
I MDE fn01d2 vsc653 * 45 i_546 ¦ 116 117 115;
I MDE fn01d2 vsc653 * 46 i_547 ¦ 118 119 117;
I MDE fn01d2 vsc653 * 47 i_548 ¦ 120 20 119;
I MDE nr02d1 vsc653 * 48 i_549 ¦ 121 122 120;
I MDE nd02d1 vsc653 * 49 i_550 ¦ 25 26 122;
I MDE nd04d1 vsc653 * 50 i_551 ¦ 29 28 27 30 121;
I MDE nd02d1 vsc653 * 51 i_552 ¦ 24 23 118;
I MDE nd02d1 vsc653 * 52 i_553 ¦ 22 123 116;
I MDE in01d1 vsc653 * 53 i_554 ¦ 124 123;
I MDE an02d1 vsc653 * 54 i_555 ¦ 125 126 124;
I MDE an02d1 vsc653 * 55 i_556 ¦ 111 128 114;
I MDE fn01d2 vsc653 * 56 i_557 ¦ 83 87 112;
I MDE fn01d2 vsc653 * 57 i_558 ¦ 86 7 87;
I MDE in01d1 vsc653 * 58 i_559 ¦ 21 86;
I MDE nr02d1 vsc653 * 59 i_560 ¦ 21 128 83;
I MDE fn01d2 vsc653 * 60 i_561 ¦ 85 84 113;
I MDE fn01d2 vsc653 * 61 i_562 ¦ 86 6 84;

I MDE nr02d1 vsc653 * 62 i_563 ¦ 21 126 85;
I MDE fn01d2 vsc653 * 63 i_564 ¦ 124 60 32;
I MDE fn01d2 vsc653 * 64 i_565 ¦ 62 68 60;
I MDE fn01d2 vsc653 * 65 i_566 ¦ 69 70 68;
I MDE fn01d2 vsc653 * 66 i_567 ¦ 67 20 70;
I MDE in01d1 vsc653 * 67 i_568 ¦ 64 67;
I MDE or06d1 vsc653 * 68 i_569 ¦ 26 27 29 30 28 25 64;
I MDE or02d1 vsc653 * 69 i_570 ¦ 23 24 69;
I MDE or02d1 vsc653 * 70 i_571 ¦ 114 22 62;
I MDE an03d1 vsc653 * 71 i_572 ¦ 65 63 95 33;
I MDE nr02d1 vsc653 * 72 i_573 ¦ 124 114 95;
I MDE nd02d1 vsc653 * 73 i_574 ¦ 89 88 63;
I MDE nd03d1 vsc653 * 74 i_575 ¦ 67 71 90 88;
I MDE in01d1 vsc653 * 75 i_576 ¦ 22 90;
I MDE nr02d1 vsc653 * 76 i_577 ¦ 24 23 71;
I MDE nd04d1 vsc653 * 77 i_578 ¦ 22 24 120 23 89;
I MDE ni01d4 vsc653 * 78 i_579 ¦ 20 65;
I MDE nr02d1 vsc653 * 79 i_580 ¦ 65 127 34;
I MDE fn01d2 vsc653 * 80 i_581 ¦ 93 92 127;
I MDE nd02d1 vsc653 * 81 i_582 ¦ 66 61 92;
I MDE nd03d1 vsc653 * 82 i_583 ¦ 24 23 22 61;
I MDE or03d1 vsc653 * 83 i_584 ¦ 24 23 22 66;
I MDE or02d1 vsc653 * 84 i_585 ¦ 114 124 93;
I MDE in01d5 vsc653 * 85 i_684 ¦ 130 5;
I MDE ni01d4 vsc653 * 86 i_685 ¦ 4 130;
I MDE oa02d1 vsc653 * 87 i_686 ¦ 132 133 134 135 136 137 17;
I MDE or04d2 vsc653 * 88 i_687 ¦ 15 16 14 13 137;
I MDE or04d2 vsc653 * 89 i_688 ¦ 12 10 11 9 136;
I MDE fn01d2 vsc653 * 90 i_689 ¦ 8 4 135;
I MDE nd04d1 vsc653 * 91 i_690 ¦ 15 16 13 14 134;
I MDE nd04d1 vsc653 * 92 i_691 ¦ 12 10 9 11 133;
I MDE fn01d2 vsc653 * 93 i_692 ¦ 138 4 132;
I MDE in02d1 vsc653 * 94 i_693 ¦ 8 138;
I MDE nr02d1 vsc653 * 95 i_694 ¦ 129 131 18;
I MDE nr02d1 vsc653 * 96 i_695 ¦ 136 137 131;
I MDE ni01d3 vsc653 * 97 i_696 ¦ 135 129;
I MDE nr02d1 vsc653 * 98 i_697 ¦ 82 132 19;
I MDE nr02d1 vsc653 * 99 i_698 ¦ 133 134 82;
I MDE dfntnb vsc653 * 100 tovrd_ff ¦ 112 1 125 128;
I MDE dfntnb vsc653 * 101 tcoutd_ff ¦ 113 1 111 126;
I MDE dfntnb vsc653 * 102 mcy_ff ¦ 2 1 3 139;
E netlist B subcells
MDE nr04d1 vsc653
MDE in01d5 vsc653
MDE in01d3 vsc653

MDE fn01d2 vsc653
MDE or02d1 vsc653
MDE in01d4 vsc653
MDE in01d2 vsc653
MDE ni01d4 vsc653
MDE nr02d1 vsc653
MDE an04d1 vsc653
MDE ao04d2 vsc653
MDE nd04d1 vsc653
MDE in01d1 vsc653
MDE an03d1 vsc653
MDE ao04d1 vsc653
MDE or05d1 vsc653
MDE nd02d1 vsc653
MDE an02d1 vsc653
MDE or06d1 vsc653
MDE nd03d1 vsc653
MDE or03d1 vsc653
MDE oa02d1 vsc653
MDE or04d2 vsc653
MDE in02d1 vsc653
MDE ni01d3 vsc653
MDE dfntnb vsc653
E subcells

NM16X_P NLS

```
#cell2 * nm16x_p nls * 33 any 0 v8r4.6.2
# "19-Sep-94 GMT" "13:44:12 GMT" "19-Sep-94 GMT" "13:44:12 GMT" amir * .
writer        1
file_version  1
sections      1
netlist   1:      82 nm16x_p


B contents:  nm16x_p
netlist       248
cells         21949
switches        0
attributes      0
physical        0
history         0
E contents


B netlist
X 1 cp i;
X 2 maxone[3] i;
X 3 maxone[2] i;
X 4 maxone[1] i;
X 5 maxone[0] i;
X 6 mckonst i;
X 7 mcof16[15] i;
X 8 mcof16[14] i;
X 9 mcof16[13] i;
X 10 mcof16[12] i;
X 11 mcof16[11] i;
X 12 mcof16[10] i;
X 13 mcof16[9] i;
X 14 mcof16[8] i;
X 15 mcof16[7] i;
X 16 mcof16[6] i;
X 17 mcof16[5] i;
X 18 mcof16[4] i;
X 19 mcof16[3] i;
X 20 mcof16[2] i;
X 21 mcof16[1] i;
X 22 mcof16[0] i;
X 23 mdat[15] i;
X 24 mdat[14] i;
X 25 mdat[13] i;
X 26 mdat[12] i;
```

X 27 mdat[11] i;
X 28 mdat[10] i;
X 29 mdat[9] i;
X 30 mdat[8] i;
X 31 mdat[7] i;
X 32 mdat[6] i;
X 33 mdat[5] i;
X 34 mdat[4] i;
X 35 mdat[3] i;
X 36 mdat[2] i;
X 37 mdat[1] i;
X 38 mdat[0] i;
X 39 inp1[15] o;
X 40 inp1[14] o;
X 41 inp1[13] o;
X 42 inp1[12] o;
X 43 inp1[11] o;
X 44 inp1[10] o;
X 45 inp1[9] o;
X 46 inp1[8] o;
X 47 inp1[7] o;
X 48 inp1[6] o;
X 49 inp1[5] o;
X 50 inp1[4] o;
X 51 inp1[3] o;
X 52 inp1[2] o;
X 53 inp1[1] o;
X 54 inp1[0] o;
X 55 inp2[15] o;
X 56 inp2[14] o;
X 57 inp2[13] o;
X 58 inp2[12] o;
X 59 inp2[11] o;
X 60 inp2[10] o;
X 61 inp2[9] o;
X 62 inp2[8] o;
X 63 inp2[7] o;
X 64 inp2[6] o;
X 65 inp2[5] o;
X 66 inp2[4] o;
X 67 inp2[3] o;
X 68 inp2[2] o;
X 69 inp2[1] o;
X 70 inp2[0] o;
X 71 uphrg_cp i;
X 72 uphrg_init i;
X 73 ugrg_cp i;
X 74 ugrg_init i;

X 75 sel[7] i;
X 76 sel[6] i;
X 77 sel[5] i;
X 78 sel[4] i;
X 79 sel[3] i;
X 80 sel[2] i;
X 81 sel[1] i;
X 82 sel[0] i;
X 83 selu[3] o;
X 84 selu[2] o;
X 85 selu[1] o;
X 86 selu[0] o;
X 87 mbbus16[15] o;
X 88 mbbus16[14] o;
X 89 mbbus16[13] o;
X 90 mbbus16[12] o;
X 91 mbbus16[11] o;
X 92 mbbus16[10] o;
X 93 mbbus16[9] o;
X 94 mbbus16[8] o;
X 95 mbbus16[7] o;
X 96 mbbus16[6] o;
X 97 mbbus16[5] o;
X 98 mbbus16[4] o;
X 99 mbbus16[3] o;
X 100 mbbus16[2] o;
X 101 mbbus16[1] o;
X 102 mbbus16[0] o;
X 103 mbbusl[7] o;
X 104 mbbusl[6] o;
X 105 mbbusl[5] o;
X 106 mbbusl[4] o;
X 107 mbbusl[3] o;
X 108 mbbusl[2] o;
X 109 mbbusl[1] o;
X 110 mbbusl[0] o;
X 111 bbus[15] i;
X 112 bbus[14] i;
X 113 bbus[13] i;
X 114 bbus[12] i;
X 115 bbus[11] i;
X 116 bbus[10] i;
X 117 bbus[9] i;
X 118 bbus[8] i;
X 119 bbus[7] i;
X 120 bbus[6] i;
X 121 bbus[5] i;
X 122 bbus[4] i;

X 123 bbus[3] i;
X 124 bbus[2] i;
X 125 bbus[1] i;
X 126 bbus[0] i;
X 127 bbusrg_cp i;
X 128 mrdaccn i;
X 129 mbbuslsl i;
G 130 VDD;
G 131 VSS;
N 134 inp2d[15];
N 136 inp1d[0];
N 138 inp2d[13];
N 154 inp2d[3];
N 155 inp2d[8];
N 156 inp1d[5];
N 157 inp1d[8];
N 159 inp2d[5];
N 168 inp1d[9];
N 173 inp2d[4];
N 177 inp1d[14];
N 178 inp1d[2];
N 181 bbusrg[0];
N 182 bbusrg[1];
N 183 bbusrg[2];
N 184 bbusrg[3];
N 185 bbusrg[4];
N 186 bbusrg[5];
N 187 bbusrg[6];
N 188 bbusrg[7];
N 189 bbusrg[8];
N 190 bbusrg[9];
N 191 bbusrg[10];
N 192 bbusrg[11];
N 193 bbusrg[12];
N 194 bbusrg[13];
N 195 bbusrg[14];
N 196 bbusrg[15];
N 200 inp1d[1];
N 202 inp1d[11];
N 204 inp2d[0];
N 206 inp1d[15];
N 213 inp2d[6];
N 214 inp1d[7];
N 215 inp1d[10];
N 221 inp1d[12];
N 222 inp2d[12];
N 224 inp2d[7];
N 225 inp1d[13];

N 226 inp2d[14];
N 227 inp2d[2];
N 228 inp1d[3];
N 230 inp2d[11];
N 232 inp2d[10];
N 234 inp2d[9];
N 237 inp1d[6];
N 238 inp1d[4];
N 241 inp2d[1];
N 272 uphrg[1];
N 273 ugrg[5];
N 275 uphrg[2];
N 276 ugrg[6];
N 278 ugrg[7];
N 280 uphrg[3];
N 282 ugrg[4];
N 283 uphrg[0];
N 134 inp2_n[15];
N 136 inp1_n[0];
N 138 inp2_n[13];
N 154 inp2_n[3];
N 155 inp2_n[8];
N 156 inp1_n[5];
N 157 inp1_n[8];
N 159 inp2_n[5];
N 39 inp1_1_q[15];
N 40 inp1_1_q[14];
N 41 inp1_1_q[13];
N 42 inp1_1_q[12];
N 43 inp1_1_q[11];
N 44 inp1_1_q[10];
N 45 inp1_1_q[9];
N 46 inp1_1_q[8];
N 47 inp1_1_q[7];
N 48 inp1_1_q[6];
N 49 inp1_1_q[5];
N 50 inp1_1_q[4];
N 51 inp1_1_q[3];
N 52 inp1_1_q[2];
N 53 inp1_1_q[1];
N 54 inp1_1_q[0];
N 55 inp2_1_q[15];
N 56 inp2_1_q[14];
N 57 inp2_1_q[13];
N 58 inp2_1_q[12];
N 59 inp2_1_q[11];
N 60 inp2_1_q[10];
N 61 inp2_1_q[9];

N 62 inp2_1_q[8];
N 63 inp2_1_q[7];
N 64 inp2_1_q[6];
N 65 inp2_1_q[5];
N 66 inp2_1_q[4];
N 67 inp2_1_q[3];
N 68 inp2_1_q[2];
N 69 inp2_1_q[1];
N 70 inp2_1_q[0];
N 168 inp1_n[9];
N 87 mbbus16_1[15];
N 88 mbbus16_1[14];
N 89 mbbus16_1[13];
N 90 mbbus16_1[12];
N 91 mbbus16_1[11];
N 92 mbbus16_1[10];
N 93 mbbus16_1[9];
N 94 mbbus16_1[8];
N 95 mbbus16_1[7];
N 96 mbbus16_1[6];
N 97 mbbus16_1[5];
N 98 mbbus16_1[4];
N 99 mbbus16_1[3];
N 100 mbbus16_1[2];
N 101 mbbus16_1[1];
N 102 mbbus16_1[0];
N 103 mbbusl_1[7];
N 104 mbbusl_1[6];
N 105 mbbusl_1[5];
N 106 mbbusl_1[4];
N 107 mbbusl_1[3];
N 108 mbbusl_1[2];
N 109 mbbusl_1[1];
N 110 mbbusl_1[0];
N 111 bbusrg_n[15];
N 112 bbusrg_n[14];
N 113 bbusrg_n[13];
N 114 bbusrg_n[12];
N 115 bbusrg_n[11];
N 116 bbusrg_n[10];
N 117 bbusrg_n[9];
N 118 bbusrg_n[8];
N 119 bbusrg_n[7];
N 120 bbusrg_n[6];
N 121 bbusrg_n[5];
N 122 bbusrg_n[4];
N 123 bbusrg_n[3];
N 124 bbusrg_n[2];

```
N 125 bbusrg_n[1];
N 126 bbusrg_n[0];
N 173 inp2_n[4];
N 177 inp1_n[14];
N 178 inp1_n[2];
N 181 uphrg_n[0];
N 181 ugrg_n[0];
N 181 bbusrg_1_q[0];
N 182 uphrg_n[1];
N 182 ugrg_n[1];
N 182 bbusrg_1_q[1];
N 183 uphrg_n[2];
N 183 ugrg_n[2];
N 183 bbusrg_1_q[2];
N 184 uphrg_n[3];
N 184 ugrg_n[3];
N 184 bbusrg_1_q[3];
N 185 uphrg_n[4];
N 185 ugrg_n[4];
N 185 bbusrg_1_q[4];
N 186 uphrg_n[5];
N 186 ugrg_n[5];
N 186 bbusrg_1_q[5];
N 187 uphrg_n[6];
N 187 ugrg_n[6];
N 187 bbusrg_1_q[6];
N 188 uphrg_n[7];
N 188 ugrg_n[7];
N 188 bbusrg_1_q[7];
N 189 uphrg_n[8];
N 189 ugrg_n[8];
N 189 bbusrg_1_q[8];
N 190 uphrg_n[9];
N 190 ugrg_n[9];
N 190 bbusrg_1_q[9];
N 191 uphrg_n[10];
N 191 ugrg_n[10];
N 191 bbusrg_1_q[10];
N 192 uphrg_n[11];
N 192 ugrg_n[11];
N 192 bbusrg_1_q[11];
N 193 uphrg_n[12];
N 193 ugrg_n[12];
N 193 bbusrg_1_q[12];
N 194 uphrg_n[13];
N 194 ugrg_n[13];
N 194 bbusrg_1_q[13];
N 195 uphrg_n[14];
```

```
N 195 ugrg_n[14];
N 195 bbusrg_1_q[14];
N 196 uphrg_n[15];
N 196 ugrg_n[15];
N 196 bbusrg_1_q[15];
N 200 inp1_n[1];
N 202 inp1_n[11];
N 204 inp2_n[0];
N 206 inp1_n[15];
N 213 inp2_n[6];
N 214 inp1_n[7];
N 215 inp1_n[10];
N 221 inp1_n[12];
N 222 inp2_n[12];
N 224 inp2_n[7];
N 225 inp1_n[13];
N 226 inp2_n[14];
N 227 inp2_n[2];
N 228 inp1_n[3];
N 230 inp2_n[11];
N 232 inp2_n[10];
N 234 inp2_n[9];
N 237 inp1_n[6];
N 238 inp1_n[4];
N 241 inp2_n[1];
N 272 uphrg_1_q[1];
N 273 ugrg_1_q[5];
N 275 uphrg_1_q[2];
N 276 ugrg_1_q[6];
N 278 ugrg_1_q[7];
N 280 uphrg_1_q[3];
N 282 ugrg_1_q[4];
N 283 uphrg_1_q[0];
V maxone 3 0 ¦ 2 3 4 5;
V mcof16 15 0 ¦ 7 8 9 10 11 12 13 14 15 16 17 18 19 20 21 22;
V mdat 15 0 ¦ 23 24 25 26 27 28 29 30 31 32 33 34 35 36 37 38;
V inp1 15 0 ¦ 39 40 41 42 43 44 45 46 47 48 49 50 51 52 53 54;
V inp2 15 0 ¦ 55 56 57 58 59 60 61 62 63 64 65 66 67 68 69 70;
V sel 7 0 ¦ 75 76 77 78 79 80 81 82;
V selu 3 0 ¦ 83 84 85 86;
V mbbus16 15 0 ¦ 87 88 89 90 91 92 93 94 95 96 97 98 99 100 101 102;
V mbbusl 7 0 ¦ 103 104 105 106 107 108 109 110;
V bbus 15 0 ¦ 111 112 113 114 115 116 117 118 119 120 121 122 123 124 125 126;
V bbusrg 15 0 ¦ 196 195 194 193 192 191 190 189 188 187 186 185 184 183 182 181;
V inp2d 15 0 ¦ 134 226 138 222 230 232 234 155 224 213 159 173 154 227 241 204;
V inp1d 15 0 ¦ 206 177 225 221 202 215 168 157 214 237 156 238 228 178 200 136;
V uphrg_n 15 0 ¦ 196 195 194 193 192 191 190 189 188 187 186 185 184 183 182 181-
;
```

V ugrg_n 15 0 ¦ 196 195 194 193 192 191 190 189 188 187 186 185 184 183 182 181;
V bbusrg_n 15 0 ¦ 111 112 113 114 115 116 117 118 119 120 121 122 123 124 125 12-
6;
V bbusrg_1_q 15 0 ¦ 196 195 194 193 192 191 190 189 188 187 186 185 184 183 182 -
181;
V inp1_n 15 0 ¦ 206 177 225 221 202 215 168 157 214 237 156 238 228 178 200 136;
V inp1_1_q 15 0 ¦ 39 40 41 42 43 44 45 46 47 48 49 50 51 52 53 54;
V inp2_n 15 0 ¦ 134 226 138 222 230 232 234 155 224 213 159 173 154 227 241 204;
V inp2_1_q 15 0 ¦ 55 56 57 58 59 60 61 62 63 64 65 66 67 68 69 70;
V mbbus16_1 15 0 ¦ 87 88 89 90 91 92 93 94 95 96 97 98 99 100 101 102;
V mbbusl_1 7 0 ¦ 103 104 105 106 107 108 109 110;
M MDE rp01d1 vsc653 ¦ Z ¦ ;
M MDE lapfnb vsc653 ¦ EN D SDN Q QN ¦ ;
M MDE fn01d2 vsc653 ¦ A1 B1 ZN ¦ ;
M MDE in01d1 vsc653 ¦ I ZN ¦ ;
M MDE an02d1 vsc653 ¦ A1 A2 Z ¦ ;
M MDE nr02d1 vsc653 ¦ A1 A2 ZN ¦ ;
M MDE nd02d1 vsc653 ¦ A1 A2 ZN ¦ ;
M MDE ao01d2 vsc653 ¦ A1 A2 B1 B2 ZN ¦ ;
M MDE ao07d1 vsc653 ¦ A1 A2 A3 B1 B2 ZN ¦ ;
M MDE or02d1 vsc653 ¦ A1 A2 Z ¦ ;
M MDE nd04d1 vsc653 ¦ A1 A3 A4 A2 ZN ¦ ;
M MDE ni01d4 vsc653 ¦ I Z ¦ ;
M MDE nd03d1 vsc653 ¦ A1 A2 A3 ZN ¦ ;
M MDE in01d2 vsc653 ¦ I ZN ¦ ;
M MDE or03d1 vsc653 ¦ A1 A2 A3 Z ¦ ;
M MDE ao06d1 vsc653 ¦ A1 A2 B1 B2 C1 C2 ZN ¦ ;
M MDE ni01d2 vsc653 ¦ I Z ¦ ;
M MDE fn05d1 vsc653 ¦ A1 B1 ZN ¦ ;
M MDE ni01d5 vsc653 ¦ I Z ¦ ;
M MDE nt01d3 vsc653 ¦ I Z OE ¦ ;
M MDE lactnb vsc653 ¦ E D CDN Q QN ¦ ;
M MDE dfntnb vsc653 ¦ D CP Q QN ¦ ;
I MDE rp01d1 vsc653 * 1 u69 ¦ 102;
I MDE rp01d1 vsc653 * 2 u70 ¦ 101;
I MDE rp01d1 vsc653 * 3 u71 ¦ 100;
I MDE rp01d1 vsc653 * 4 u72 ¦ 99;
I MDE rp01d1 vsc653 * 5 u73 ¦ 98;
I MDE rp01d1 vsc653 * 6 u74 ¦ 97;
I MDE rp01d1 vsc653 * 7 u75 ¦ 96;
I MDE rp01d1 vsc653 * 8 u76 ¦ 95;
I MDE rp01d1 vsc653 * 9 u77 ¦ 94;
I MDE rp01d1 vsc653 * 10 u78 ¦ 93;
I MDE rp01d1 vsc653 * 11 u79 ¦ 92;
I MDE rp01d1 vsc653 * 12 u80 ¦ 91;
I MDE rp01d1 vsc653 * 13 u81 ¦ 90;
I MDE rp01d1 vsc653 * 14 u82 ¦ 89;
I MDE rp01d1 vsc653 * 15 u83 ¦ 88;

I MDE rp01d1 vsc653 * 16 u84 ¦ 87;
I MDE rp01d1 vsc653 * 17 u85 ¦ 110;
I MDE rp01d1 vsc653 * 18 u86 ¦ 109;
I MDE rp01d1 vsc653 * 19 u87 ¦ 108;
I MDE rp01d1 vsc653 * 20 u88 ¦ 107;
I MDE rp01d1 vsc653 * 21 u89 ¦ 106;
I MDE rp01d1 vsc653 * 22 u90 ¦ 105;
I MDE rp01d1 vsc653 * 23 u91 ¦ 104;
I MDE rp01d1 vsc653 * 24 u92 ¦ 103;
I MDE rp01d1 vsc653 * 25 u93 ¦ 126;
I MDE rp01d1 vsc653 * 26 u94 ¦ 125;
I MDE rp01d1 vsc653 * 27 u95 ¦ 124;
I MDE rp01d1 vsc653 * 28 u96 ¦ 123;
I MDE rp01d1 vsc653 * 29 u97 ¦ 122;
I MDE rp01d1 vsc653 * 30 u98 ¦ 121;
I MDE rp01d1 vsc653 * 31 u99 ¦ 120;
I MDE rp01d1 vsc653 * 32 u100 ¦ 119;
I MDE rp01d1 vsc653 * 33 u101 ¦ 118;
I MDE rp01d1 vsc653 * 34 u102 ¦ 117;
I MDE rp01d1 vsc653 * 35 u103 ¦ 116;
I MDE rp01d1 vsc653 * 36 u104 ¦ 115;
I MDE rp01d1 vsc653 * 37 u105 ¦ 114;
I MDE rp01d1 vsc653 * 38 u106 ¦ 113;
I MDE rp01d1 vsc653 * 39 u107 ¦ 112;
I MDE rp01d1 vsc653 * 40 u108 ¦ 111;
I MDE lapfnb vsc653 * 41 uphrg_ff_b2 ¦ 165 183 72 275 371;
I MDE lapfnb vsc653 * 42 uphrg_ff_b4 ¦ 165 185 72 307 372;
I MDE lapfnb vsc653 * 43 uphrg_ff_b5 ¦ 165 186 72 348 373;
I MDE lapfnb vsc653 * 44 uphrg_ff_b6 ¦ 165 187 72 347 374;
I MDE lapfnb vsc653 * 45 uphrg_ff_b8 ¦ 165 189 72 305 375;
I MDE lapfnb vsc653 * 46 uphrg_ff_b9 ¦ 165 190 72 345 376;
I MDE lapfnb vsc653 * 47 uphrg_ff_b11 ¦ 165 192 72 328 377;
I MDE lapfnb vsc653 * 48 uphrg_ff_b12 ¦ 165 193 72 312 378;
I MDE lapfnb vsc653 * 49 uphrg_ff_b14 ¦ 165 195 72 349 379;
I MDE lapfnb vsc653 * 50 uphrg_ff_b15 ¦ 165 196 72 331 380;
I MDE lapfnb vsc653 * 51 ugrg_ff_b0 ¦ 365 181 164 289 381;
I MDE lapfnb vsc653 * 52 ugrg_ff_b1 ¦ 365 182 164 355 382;
I MDE lapfnb vsc653 * 53 ugrg_ff_b2 ¦ 365 183 164 336 383;
I MDE lapfnb vsc653 * 54 ugrg_ff_b3 ¦ 365 184 164 318 384;
I MDE lapfnb vsc653 * 55 ugrg_ff_b13 ¦ 365 194 74 327 385;
I MDE lapfnb vsc653 * 56 ugrg_ff_b14 ¦ 365 195 74 344 386;
I MDE fn01d2 vsc653 * 57 i_636 ¦ 158 172 134;
I MDE fn01d2 vsc653 * 58 i_637 ¦ 236 7 172;
I MDE in01d1 vsc653 * 59 i_638 ¦ 5 236;
I MDE an02d1 vsc653 * 60 i_639 ¦ 216 23 158;
I MDE an02d1 vsc653 * 61 i_640 ¦ 3 160 216;
I MDE nr02d1 vsc653 * 62 i_641 ¦ 5 4 160;
I MDE nd02d1 vsc653 * 63 i_642 ¦ 218 210 226;

I MDE ao01d2 vsc653 * 64 i_643 ¦ 236 4 217 24 210;
I MDE an02d1 vsc653 * 65 i_644 ¦ 3 236 217;
I MDE fn01d2 vsc653 * 66 i_645 ¦ 236 8 218;
I MDE nd02d1 vsc653 * 67 i_646 ¦ 175 161 138;
I MDE ao07d1 vsc653 * 68 i_647 ¦ 160 162 2 216 25 161;
I MDE in01d1 vsc653 * 69 i_648 ¦ 3 162;
I MDE fn01d2 vsc653 * 70 i_649 ¦ 236 9 175;
I MDE fn01d2 vsc653 * 71 i_650 ¦ 229 235 222;
I MDE fn01d2 vsc653 * 72 i_651 ¦ 236 10 235;
I MDE an02d1 vsc653 * 73 i_652 ¦ 216 26 229;
I MDE fn01d2 vsc653 * 74 i_653 ¦ 239 231 230;
I MDE fn01d2 vsc653 * 75 i_654 ¦ 236 11 231;
I MDE an02d1 vsc653 * 76 i_655 ¦ 216 27 239;
I MDE fn01d2 vsc653 * 77 i_656 ¦ 219 271 232;
I MDE fn01d2 vsc653 * 78 i_657 ¦ 236 12 271;
I MDE an02d1 vsc653 * 79 i_658 ¦ 216 28 219;
I MDE fn01d2 vsc653 * 80 i_659 ¦ 245 223 234;
I MDE fn01d2 vsc653 * 81 i_660 ¦ 236 13 223;
I MDE an02d1 vsc653 * 82 i_661 ¦ 216 29 245;
I MDE fn01d2 vsc653 * 83 i_662 ¦ 270 233 155;
I MDE fn01d2 vsc653 * 84 i_663 ¦ 236 14 233;
I MDE an02d1 vsc653 * 85 i_664 ¦ 216 30 270;
I MDE fn01d2 vsc653 * 86 i_665 ¦ 169 171 224;
I MDE fn01d2 vsc653 * 87 i_666 ¦ 236 15 171;
I MDE an02d1 vsc653 * 88 i_667 ¦ 216 31 169;
I MDE fn01d2 vsc653 * 89 i_668 ¦ 170 135 213;
I MDE fn01d2 vsc653 * 90 i_669 ¦ 236 16 135;
I MDE an02d1 vsc653 * 91 i_670 ¦ 216 32 170;
I MDE fn01d2 vsc653 * 92 i_671 ¦ 153 240 159;
I MDE fn01d2 vsc653 * 93 i_672 ¦ 236 17 240;
I MDE an02d1 vsc653 * 94 i_673 ¦ 216 33 153;
I MDE fn01d2 vsc653 * 95 i_674 ¦ 167 244 173;
I MDE fn01d2 vsc653 * 96 i_675 ¦ 236 18 244;
I MDE an02d1 vsc653 * 97 i_676 ¦ 216 34 167;
I MDE fn01d2 vsc653 * 98 i_677 ¦ 208 152 154;
I MDE fn01d2 vsc653 * 99 i_678 ¦ 236 19 152;
I MDE an02d1 vsc653 * 100 i_679 ¦ 216 35 208;
I MDE fn01d2 vsc653 * 101 i_680 ¦ 211 163 227;
I MDE fn01d2 vsc653 * 102 i_681 ¦ 236 20 163;
I MDE an02d1 vsc653 * 103 i_682 ¦ 216 36 211;
I MDE fn01d2 vsc653 * 104 i_683 ¦ 137 133 241;
I MDE fn01d2 vsc653 * 105 i_684 ¦ 236 21 133;
I MDE an02d1 vsc653 * 106 i_685 ¦ 216 37 137;
I MDE fn01d2 vsc653 * 107 i_686 ¦ 243 212 204;
I MDE fn01d2 vsc653 * 108 i_687 ¦ 236 22 212;
I MDE an02d1 vsc653 * 109 i_688 ¦ 216 38 243;
I MDE an02d1 vsc653 * 110 i_689 ¦ 242 24 177;
I MDE in01d1 vsc653 * 111 i_690 ¦ 6 242;

I MDE an02d1 vsc653 * 112 i_691 ¦ 242 25 225;
I MDE an02d1 vsc653 * 113 i_692 ¦ 242 26 221;
I MDE or02d1 vsc653 * 114 i_693 ¦ 6 27 202;
I MDE an02d1 vsc653 * 115 i_694 ¦ 242 28 215;
I MDE an02d1 vsc653 * 116 i_695 ¦ 242 29 168;
I MDE or02d1 vsc653 * 117 i_696 ¦ 6 30 157;
I MDE an02d1 vsc653 * 118 i_697 ¦ 242 31 214;
I MDE an02d1 vsc653 * 119 i_698 ¦ 242 32 237;
I MDE an02d1 vsc653 * 120 i_699 ¦ 242 33 156;
I MDE an02d1 vsc653 * 121 i_700 ¦ 242 34 238;
I MDE an02d1 vsc653 * 122 i_701 ¦ 242 35 228;
I MDE an02d1 vsc653 * 123 i_702 ¦ 242 36 178;
I MDE an02d1 vsc653 * 124 i_703 ¦ 242 37 200;
I MDE an02d1 vsc653 * 125 i_704 ¦ 242 38 136;
I MDE an02d1 vsc653 * 126 i_705 ¦ 242 23 206;
I MDE nd04d1 vsc653 * 127 i_993 ¦ 284 285 286 287 86;
I MDE nd02d1 vsc653 * 128 i_994 ¦ 288 289 287;
I MDE nr02d1 vsc653 * 129 i_995 ¦ 290 291 288;
I MDE fn01d2 vsc653 * 130 i_996 ¦ 79 78 291;
I MDE fn01d2 vsc653 * 131 i_997 ¦ 80 292 290;
I MDE nr02d1 vsc653 * 132 i_998 ¦ 82 81 292;
I MDE fn01d2 vsc653 * 133 i_999 ¦ 293 294 286;
I MDE fn01d2 vsc653 * 134 i_1000 ¦ 295 296 294;
I MDE fn01d2 vsc653 * 135 i_1001 ¦ 77 297 296;
I MDE nd02d1 vsc653 * 136 i_1002 ¦ 298 299 297;
I MDE fn01d2 vsc653 * 137 i_1003 ¦ 300 301 299;
I MDE ni01d4 vsc653 * 138 i_1004 ¦ 76 301;
I MDE nd03d1 vsc653 * 139 i_1005 ¦ 302 75 303 298;
I MDE in01d2 vsc653 * 140 i_1006 ¦ 76 302;
I MDE an02d1 vsc653 * 141 i_1007 ¦ 282 77 295;
I MDE or03d1 vsc653 * 142 i_1008 ¦ 290 78 79 293;
I MDE ao06d1 vsc653 * 143 i_1009 ¦ 305 306 307 308 283 310 285;
I MDE ni01d2 vsc653 * 144 i_1010 ¦ 82 310;
I MDE fn05d1 vsc653 * 145 i_1011 ¦ 81 310 308;
I MDE an02d1 vsc653 * 146 i_1012 ¦ 80 292 306;
I MDE nd02d1 vsc653 * 147 i_1013 ¦ 311 312 284;
I MDE nr02d1 vsc653 * 148 i_1014 ¦ 290 313 311;
I MDE in01d1 vsc653 * 149 i_1015 ¦ 79 313;
I MDE nd04d1 vsc653 * 150 i_1016 ¦ 314 315 316 317 83;
I MDE nd02d1 vsc653 * 151 i_1017 ¦ 288 318 317;
I MDE fn01d2 vsc653 * 152 i_1018 ¦ 293 319 316;
I MDE fn01d2 vsc653 * 153 i_1019 ¦ 320 321 319;
I MDE fn01d2 vsc653 * 154 i_1020 ¦ 77 322 321;
I MDE nd02d1 vsc653 * 155 i_1021 ¦ 323 324 322;
I MDE fn01d2 vsc653 * 156 i_1022 ¦ 325 301 324;
I MDE nd03d1 vsc653 * 157 i_1023 ¦ 302 75 326 323;
I MDE an02d1 vsc653 * 158 i_1024 ¦ 278 77 320;
I MDE ao06d1 vsc653 * 159 i_1025 ¦ 328 306 329 308 280 310 315;

I MDE nd02d1 vsc653 * 160 i_1026 ¦ 311 331 314;
I MDE nd04d1 vsc653 * 161 i_1027 ¦ 332 333 334 335 84;
I MDE nd02d1 vsc653 * 162 i_1028 ¦ 288 336 335;
I MDE fn01d2 vsc653 * 163 i_1029 ¦ 293 337 334;
I MDE fn01d2 vsc653 * 164 i_1030 ¦ 338 339 337;
I MDE fn01d2 vsc653 * 165 i_1031 ¦ 77 340 339;
I MDE nd02d1 vsc653 * 166 i_1032 ¦ 341 342 340;
I MDE fn01d2 vsc653 * 167 i_1033 ¦ 343 301 342;
I MDE nd03d1 vsc653 * 168 i_1034 ¦ 302 75 344 341;
I MDE an02d1 vsc653 * 169 i_1035 ¦ 276 77 338;
I MDE ao06d1 vsc653 * 170 i_1036 ¦ 346 306 347 308 275 310 333;
I MDE nd02d1 vsc653 * 171 i_1037 ¦ 311 349 332;
I MDE ni01d5 vsc653 * 172 i_1038 ¦ 350 85;
I MDE nd04d1 vsc653 * 173 i_1039 ¦ 351 352 353 354 350;
I MDE nd02d1 vsc653 * 174 i_1040 ¦ 288 355 354;
I MDE fn01d2 vsc653 * 175 i_1041 ¦ 293 356 353;
I MDE fn01d2 vsc653 * 176 i_1042 ¦ 357 358 356;
I MDE fn01d2 vsc653 * 177 i_1043 ¦ 77 359 358;
I MDE nd02d1 vsc653 * 178 i_1044 ¦ 360 304 359;
I MDE fn01d2 vsc653 * 179 i_1045 ¦ 309 301 304;
I MDE nd03d1 vsc653 * 180 i_1046 ¦ 302 75 327 360;
I MDE an02d1 vsc653 * 181 i_1047 ¦ 273 77 357;
I MDE ao06d1 vsc653 * 182 i_1048 ¦ 345 306 348 308 272 310 352;
I MDE nd02d1 vsc653 * 183 i_1049 ¦ 311 330 351;
I MDE ni01d4 vsc653 * 184 i_1052 ¦ 74 164;
I MDE ni01d4 vsc653 * 185 i_1055 ¦ 72 220;
I MDE in01d1 vsc653 * 186 i_1060 ¦ 71 165;
I MDE in01d1 vsc653 * 187 i_1065 ¦ 73 365;
I MDE nt01d3 vsc653 * 188 u201 ¦ 181 102 128;
I MDE nt01d3 vsc653 * 189 u202 ¦ 182 101 128;
I MDE nt01d3 vsc653 * 190 u203 ¦ 183 100 128;
I MDE nt01d3 vsc653 * 191 u204 ¦ 184 99 128;
I MDE nt01d3 vsc653 * 192 u205 ¦ 185 98 128;
I MDE nt01d3 vsc653 * 193 u206 ¦ 186 97 128;
I MDE nt01d3 vsc653 * 194 u207 ¦ 187 96 128;
I MDE nt01d3 vsc653 * 195 u208 ¦ 188 95 128;
I MDE nt01d3 vsc653 * 196 u209 ¦ 189 94 128;
I MDE nt01d3 vsc653 * 197 u210 ¦ 190 93 128;
I MDE nt01d3 vsc653 * 198 u211 ¦ 191 92 128;
I MDE nt01d3 vsc653 * 199 u212 ¦ 192 91 128;
I MDE nt01d3 vsc653 * 200 u213 ¦ 193 90 128;
I MDE nt01d3 vsc653 * 201 u214 ¦ 194 89 128;
I MDE nt01d3 vsc653 * 202 u215 ¦ 195 88 128;
I MDE nt01d3 vsc653 * 203 u216 ¦ 196 87 128;
I MDE nt01d3 vsc653 * 204 u218 ¦ 131 110 129;
I MDE nt01d3 vsc653 * 205 u219 ¦ 131 109 129;
I MDE nt01d3 vsc653 * 206 u220 ¦ 131 108 129;
I MDE nt01d3 vsc653 * 207 u221 ¦ 131 107 129;

I MDE nt01d3 vsc653 * 208 u222 ¦ 131 106 129;
I MDE nt01d3 vsc653 * 209 u223 ¦ 131 105 129;
I MDE nt01d3 vsc653 * 210 u224 ¦ 131 104 129;
I MDE nt01d3 vsc653 * 211 u225 ¦ 131 103 129;
I MDE lactnb vsc653 * 212 uphrg_ff_b0 ¦ 71 181 220 283 151;
I MDE lactnb vsc653 * 213 uphrg_ff_b1 ¦ 71 182 220 272 166;
I MDE lactnb vsc653 * 214 uphrg_ff_b3 ¦ 71 184 220 280 246;
I MDE lactnb vsc653 * 215 uphrg_ff_b7 ¦ 71 188 220 329 364;
I MDE lactnb vsc653 * 216 uphrg_ff_b10 ¦ 71 191 220 346 363;
I MDE lactnb vsc653 * 217 uphrg_ff_b13 ¦ 71 194 220 330 362;
I MDE lactnb vsc653 * 218 ugrg_ff_b4 ¦ 73 185 164 282 361;
I MDE lactnb vsc653 * 219 ugrg_ff_b5 ¦ 73 186 164 273 370;
I MDE lactnb vsc653 * 220 ugrg_ff_b6 ¦ 73 187 164 276 369;
I MDE lactnb vsc653 * 221 ugrg_ff_b7 ¦ 73 188 164 278 281;
I MDE lactnb vsc653 * 222 ugrg_ff_b8 ¦ 73 189 74 274 300;
I MDE lactnb vsc653 * 223 ugrg_ff_b9 ¦ 73 190 74 277 309;
I MDE lactnb vsc653 * 224 ugrg_ff_b10 ¦ 73 191 74 279 343;
I MDE lactnb vsc653 * 225 ugrg_ff_b11 ¦ 73 192 74 368 325;
I MDE lactnb vsc653 * 226 ugrg_ff_b12 ¦ 73 193 74 303 367;
I MDE lactnb vsc653 * 227 ugrg_ff_b15 ¦ 73 196 74 326 132;
I MDE dfntnb vsc653 * 228 bbusrg_ff_b0 ¦ 126 127 181 269;
I MDE dfntnb vsc653 * 229 bbusrg_ff_b1 ¦ 125 127 182 139;
I MDE dfntnb vsc653 * 230 bbusrg_ff_b2 ¦ 124 127 183 201;
I MDE dfntnb vsc653 * 231 bbusrg_ff_b3 ¦ 123 127 184 268;
I MDE dfntnb vsc653 * 232 bbusrg_ff_b4 ¦ 122 127 185 140;
I MDE dfntnb vsc653 * 233 bbusrg_ff_b5 ¦ 121 127 186 267;
I MDE dfntnb vsc653 * 234 bbusrg_ff_b6 ¦ 120 127 187 207;
I MDE dfntnb vsc653 * 235 bbusrg_ff_b7 ¦ 119 127 188 266;
I MDE dfntnb vsc653 * 236 bbusrg_ff_b8 ¦ 118 127 189 141;
I MDE dfntnb vsc653 * 237 bbusrg_ff_b9 ¦ 117 127 190 265;
I MDE dfntnb vsc653 * 238 bbusrg_ff_b10 ¦ 116 127 191 205;
I MDE dfntnb vsc653 * 239 bbusrg_ff_b11 ¦ 115 127 192 264;
I MDE dfntnb vsc653 * 240 bbusrg_ff_b12 ¦ 114 127 193 142;
I MDE dfntnb vsc653 * 241 bbusrg_ff_b13 ¦ 113 127 194 263;
I MDE dfntnb vsc653 * 242 bbusrg_ff_b14 ¦ 112 127 195 203;
I MDE dfntnb vsc653 * 243 bbusrg_ff_b15 ¦ 111 127 196 262;
I MDE dfntnb vsc653 * 244 inp1_ff_b0 ¦ 136 1 54 143;
I MDE dfntnb vsc653 * 245 inp1_ff_b1 ¦ 200 1 53 261;
I MDE dfntnb vsc653 * 246 inp1_ff_b2 ¦ 178 1 52 179;
I MDE dfntnb vsc653 * 247 inp1_ff_b3 ¦ 228 1 51 260;
I MDE dfntnb vsc653 * 248 inp1_ff_b4 ¦ 238 1 50 144;
I MDE dfntnb vsc653 * 249 inp1_ff_b5 ¦ 156 1 49 259;
I MDE dfntnb vsc653 * 250 inp1_ff_b6 ¦ 237 1 48 198;
I MDE dfntnb vsc653 * 251 inp1_ff_b7 ¦ 214 1 47 258;
I MDE dfntnb vsc653 * 252 inp1_ff_b8 ¦ 157 1 46 145;
I MDE dfntnb vsc653 * 253 inp1_ff_b9 ¦ 168 1 45 257;
I MDE dfntnb vsc653 * 254 inp1_ff_b10 ¦ 215 1 44 176;
I MDE dfntnb vsc653 * 255 inp1_ff_b11 ¦ 202 1 43 256;

I MDE dfntnb vsc653 * 256 inp1_ff_b12 ¦ 221 1 42 146;
I MDE dfntnb vsc653 * 257 inp1_ff_b13 ¦ 225 1 41 255;
I MDE dfntnb vsc653 * 258 inp1_ff_b14 ¦ 177 1 40 209;
I MDE dfntnb vsc653 * 259 inp1_ff_b15 ¦ 206 1 39 254;
I MDE dfntnb vsc653 * 260 inp2_ff_b0 ¦ 204 1 70 147;
I MDE dfntnb vsc653 * 261 inp2_ff_b1 ¦ 241 1 69 253;
I MDE dfntnb vsc653 * 262 inp2_ff_b2 ¦ 227 1 68 197;
I MDE dfntnb vsc653 * 263 inp2_ff_b3 ¦ 154 1 67 252;
I MDE dfntnb vsc653 * 264 inp2_ff_b4 ¦ 173 1 66 148;
I MDE dfntnb vsc653 * 265 inp2_ff_b5 ¦ 159 1 65 251;
I MDE dfntnb vsc653 * 266 inp2_ff_b6 ¦ 213 1 64 174;
I MDE dfntnb vsc653 * 267 inp2_ff_b7 ¦ 224 1 63 250;
I MDE dfntnb vsc653 * 268 inp2_ff_b8 ¦ 155 1 62 149;
I MDE dfntnb vsc653 * 269 inp2_ff_b9 ¦ 234 1 61 249;
I MDE dfntnb vsc653 * 270 inp2_ff_b10 ¦ 232 1 60 180;
I MDE dfntnb vsc653 * 271 inp2_ff_b11 ¦ 230 1 59 248;
I MDE dfntnb vsc653 * 272 inp2_ff_b12 ¦ 222 1 58 150;
I MDE dfntnb vsc653 * 273 inp2_ff_b13 ¦ 138 1 57 247;
I MDE dfntnb vsc653 * 274 inp2_ff_b14 ¦ 226 1 56 199;
I MDE dfntnb vsc653 * 275 inp2_ff_b15 ¦ 134 1 55 366;
E netlist B subcells
MDE rp01d1 vsc653
MDE lapfnb vsc653
MDE fn01d2 vsc653
MDE in01d1 vsc653
MDE an02d1 vsc653
MDE nr02d1 vsc653
MDE nd02d1 vsc653
MDE ao01d2 vsc653
MDE ao07d1 vsc653
MDE or02d1 vsc653
MDE nd04d1 vsc653
MDE ni01d4 vsc653
MDE nd03d1 vsc653
MDE in01d2 vsc653
MDE or03d1 vsc653
MDE ao06d1 vsc653
MDE ni01d2 vsc653
MDE fn05d1 vsc653
MDE ni01d5 vsc653
MDE nt01d3 vsc653
MDE lactnb vsc653
MDE dfntnb vsc653
E subcells

NM40C_P NLS

```
#cell2 * nm40c_p nls * 32 any 0 v8r4.6.2
# "19-Sep-94 GMT" "13:43:56 GMT" "19-Sep-94 GMT" "13:43:56 GMT" amir * .
writer       1
file_version 1
sections     1
netlist   1:      82 nm40c_p


B contents:  nm40c_p
netlist        248
cells         3118
switches         0
attributes       0
physical         0
history          0
E contents


B netlist
X 1 shiftt i;
X 2 shiftr i;
X 3 shiftn i;
X 4 selu[3] i;
X 5 selu[2] i;
X 6 selu[1] i;
X 7 selu[0] i;
X 8 selb[15] o;
X 9 selb[14] o;
X 10 selb[13] o;
X 11 selb[12] o;
X 12 selb[11] o;
X 13 selb[10] o;
X 14 selb[9] o;
X 15 selb[8] o;
X 16 selb[7] o;
X 17 selb[6] o;
X 18 selb[5] o;
X 19 selb[4] o;
X 20 selb[3] o;
X 21 selb[2] o;
X 22 selb[1] o;
X 23 selb[0] o;
G 24 VDD;
G 25 VSS;
V selu 3 0 ¦ 4 5 6 7;
```

```
V selb 15 0 ¦ 8 9 10 11 12 13 14 15 16 17 18 19 20 21 22 23;
M MDE nr02d1 vsc653 ¦ A1 A2 ZN ¦ ;
M MDE nd03d1 vsc653 ¦ A1 A2 A3 ZN ¦ ;
M MDE ni01d3 vsc653 ¦ I Z ¦ ;
M MDE ni01d4 vsc653 ¦ I Z ¦ ;
M MDE fn01d2 vsc653 ¦ A1 B1 ZN ¦ ;
M MDE fn05d2 vsc653 ¦ A1 B1 ZN ¦ ;
M MDE in02d2 vsc653 ¦ I ZN ¦ ;
M MDE in02d1 vsc653 ¦ I ZN ¦ ;
M MDE in01d2 vsc653 ¦ I ZN ¦ ;
M MDE in01d5 vsc653 ¦ I ZN ¦ ;
M MDE ao04d1 vsc653 ¦ A1 A2 B ZN ¦ ;
M MDE in01d1 vsc653 ¦ I ZN ¦ ;
M MDE or05d1 vsc653 ¦ A1 A2 A3 A4 A5 Z ¦ ;
M MDE nd04d1 vsc653 ¦ A1 A3 A4 A2 ZN ¦ ;
M MDE fn01d1 vsc653 ¦ A1 B1 ZN ¦ ;
M MDE or02d1 vsc653 ¦ A1 A2 Z ¦ ;
I MDE nr02d1 vsc653 * 1 i_292 ¦ 26 27 8;
I MDE nd03d1 vsc653 * 2 i_293 ¦ 28 29 30 27;
I MDE ni01d3 vsc653 * 3 i_294 ¦ 4 30;
I MDE ni01d4 vsc653 * 4 i_295 ¦ 6 29;
I MDE ni01d3 vsc653 * 5 i_296 ¦ 7 28;
I MDE fn01d2 vsc653 * 6 i_297 ¦ 31 32 26;
I MDE fn05d2 vsc653 * 7 i_298 ¦ 33 1 32;
I MDE nr02d1 vsc653 * 8 i_299 ¦ 2 3 33;
I MDE in02d2 vsc653 * 9 i_300 ¦ 5 31;
I MDE nr02d1 vsc653 * 10 i_301 ¦ 26 34 9;
I MDE nd03d1 vsc653 * 11 i_302 ¦ 29 35 30 34;
I MDE in02d1 vsc653 * 12 i_303 ¦ 7 35;
I MDE nr02d1 vsc653 * 13 i_304 ¦ 26 36 10;
I MDE nd03d1 vsc653 * 14 i_305 ¦ 28 30 37 36;
I MDE in01d2 vsc653 * 15 i_306 ¦ 6 37;
I MDE nr02d1 vsc653 * 16 i_307 ¦ 26 38 11;
I MDE nd03d1 vsc653 * 17 i_308 ¦ 35 30 37 38;
I MDE nr02d1 vsc653 * 18 i_309 ¦ 39 27 12;
I MDE fn01d2 vsc653 * 19 i_310 ¦ 40 32 39;
I MDE in01d5 vsc653 * 20 i_311 ¦ 31 40;
I MDE nr02d1 vsc653 * 21 i_312 ¦ 39 34 13;
I MDE nr02d1 vsc653 * 22 i_313 ¦ 39 36 14;
I MDE ao04d1 vsc653 * 23 i_314 ¦ 41 42 3 15;
I MDE in01d1 vsc653 * 24 i_315 ¦ 2 42;
I MDE or05d1 vsc653 * 25 i_316 ¦ 43 7 1 6 40 41;
I MDE in02d2 vsc653 * 26 i_317 ¦ 4 43;
I MDE nr02d1 vsc653 * 27 i_318 ¦ 26 44 16;
I MDE nd03d1 vsc653 * 28 i_319 ¦ 28 29 43 44;
I MDE nr02d1 vsc653 * 29 i_320 ¦ 26 45 17;
I MDE nd03d1 vsc653 * 30 i_321 ¦ 29 35 43 45;
I MDE nr02d1 vsc653 * 31 i_322 ¦ 26 46 18;
```

```
I MDE nd03d1 vsc653 * 32 i_323 ¦ 28 37 43 46;
I MDE ao04d1 vsc653 * 33 i_324 ¦ 47 48 49 19;
I MDE in01d1 vsc653 * 34 i_325 ¦ 33 49;
I MDE in01d1 vsc653 * 35 i_326 ¦ 1 48;
I MDE nd04d1 vsc653 * 36 i_327 ¦ 43 37 35 40 47;
I MDE nr02d1 vsc653 * 37 i_328 ¦ 39 44 20;
I MDE nr02d1 vsc653 * 38 i_329 ¦ 39 45 21;
I MDE nr02d1 vsc653 * 39 i_330 ¦ 39 46 22;
I MDE fn01d1 vsc653 * 40 i_331 ¦ 3 50 23;
I MDE or05d1 vsc653 * 41 i_332 ¦ 28 30 40 29 51 50;
I MDE or02d1 vsc653 * 42 i_333 ¦ 1 52 51;
I MDE in01d1 vsc653 * 43 i_334 ¦ 42 52;
E netlist

B subcells
MDE nr02d1 vsc653
MDE nd03d1 vsc653
MDE ni01d3 vsc653
MDE ni01d4 vsc653
MDE fn01d2 vsc653
MDE fn05d2 vsc653
MDE in02d2 vsc653
MDE in02d1 vsc653
MDE in01d2 vsc653
MDE in01d5 vsc653
MDE ao04d1 vsc653
MDE in01d1 vsc653
MDE or05d1 vsc653
MDE nd04d1 vsc653
MDE fn01d1 vsc653
MDE or02d1 vsc653
E subcells
```

NM40D_P NLS

#cell2 * nm40d_p nls * 32 any 0 v8r4.6.2
"19-Sep-94 GMT" "13:43:57 GMT" "19-Sep-94 GMT" "13:43:57 GMT" amir * .
writer 1
file_version 1
sections 1
netlist 1: 82 nm40d_p B contents: nm40d_p
netlist 248
cells 3725
switches 0
attributes 0
physical 0
history 0
E contents B netlist
X 1 best0 i;
X 2 best1 i;
X 3 best2 i;
X 4 sav_min00[3] i;
X 5 sav_min00[2] i;
X 6 sav_min00[1] i;
X 7 sav_min00[0] i;
X 8 sav_min01[3] i;
X 9 sav_min01[2] i;
X 10 sav_min01[1] i;
X 11 sav_min01[0] i;
X 12 sav_min10[3] i;
X 13 sav_min10[2] i;
X 14 sav_min10[1] i;
X 15 sav_min10[0] i;
X 16 sav_x2n00[3] i;
X 17 sav_x2n00[2] i;
X 18 sav_x2n00[1] i;
X 19 sav_x2n00[0] i;
X 20 sav_x2n01[3] i;
X 21 sav_x2n01[2] i;
X 22 sav_x2n01[1] i;
X 23 sav_x2n01[0] i;
X 24 sav_x2n10[3] i;
X 25 sav_x2n10[2] i;
X 26 sav_x2n10[1] i;

```
X 27 sav_x2n10[0] i;
X 28 minusu00[1] o;
X 29 minusu00[0] o;
X 30 minusu01[1] o;
X 31 minusu01[0] o;
X 32 minusu10[1] o;
X 33 minusu10[0] o;
X 34 x2nu00[1] o;
X 35 x2nu00[0] o;
X 36 x2nu01[1] o;
X 37 x2nu01[0] o;
X 38 x2nu10[1] o;
X 39 x2nu10[0] o;
G 40 VDD;
G 41 VSS;
V sav_min00 3 0 ¦ 4 5 6 7;
V sav_min01 3 0 ¦ 8 9 10 11;
V sav_min10 3 0 ¦ 12 13 14 15;
V sav_x2n00 3 0 ¦ 16 17 18 19;
V sav_x2n01 3 0 ¦ 20 21 22 23;
V sav_x2n10 3 0 ¦ 24 25 26 27;
V minusu00 1 0 ¦ 28 29;
V minusu01 1 0 ¦ 30 31;
V minusu10 1 0 ¦ 32 33;
V x2nu00 1 0 ¦ 34 35;
V x2nu01 1 0 ¦ 36 37;
V x2nu10 1 0 ¦ 38 39;
M MDE nd02d1 vsc653 ¦ A1 A2 ZN ¦ ;
M MDE fn01d2 vsc653 ¦ A1 B1 ZN ¦ ;
M MDE ni01d4 vsc653 ¦ I Z ¦ ;
M MDE in01d1 vsc653 ¦ I ZN ¦ ;
M MDE nd03d1 vsc653 ¦ A1 A2 A3 ZN ¦ ;
M MDE in01d3 vsc653 ¦ I ZN ¦ ;
M MDE ni01d3 vsc653 ¦ I Z ¦ ;
M MDE an02d1 vsc653 ¦ A1 A2 Z ¦ ;
M MDE fn05d2 vsc653 ¦ A1 B1 ZN ¦ ;
M MDE fn04d1 vsc653 ¦ A1 A2 B1 B2 ZN ¦ ;
M MDE in02d2 vsc653 ¦ I ZN ¦ ;
I MDE nd02d1 vsc653 * 1 i_301 ¦ 42 43 28;
I MDE fn01d2 vsc653 * 2 i_302 ¦ 44 45 43;
I MDE ni01d4 vsc653 * 3 i_303 ¦ 2 45;
I MDE in01d1 vsc653 * 4 i_304 ¦ 9 44;
I MDE nd03d1 vsc653 * 5 i_305 ¦ 46 47 13 42;
I MDE in01d3 vsc653 * 6 i_306 ¦ 2 47;
I MDE ni01d3 vsc653 * 7 i_307 ¦ 3 46;
I MDE fn01d2 vsc653 * 8 i_308 ¦ 48 49 29;
I MDE nd03d1 vsc653 * 9 i_309 ¦ 46 47 15 49;
I MDE an02d1 vsc653 * 10 i_310 ¦ 11 2 48;
```

```
I MDE fn01d2 vsc653 * 11 i_311 ¦ 50 51 30;
I MDE fn01d2 vsc653 * 12 i_312 ¦ 52 53 51;
I MDE fn05d2 vsc653 * 13 i_313 ¦ 3 1 53;
I MDE in01d1 vsc653 * 14 i_314 ¦ 12 52;
I MDE an02d1 vsc653 * 15 i_315 ¦ 5 54 50;
I MDE ni01d4 vsc653 * 16 i_316 ¦ 1 54;
I MDE fn01d2 vsc653 * 17 i_317 ¦ 55 56 31;
I MDE fn01d2 vsc653 * 18 i_318 ¦ 57 53 56;
I MDE in01d1 vsc653 * 19 i_319 ¦ 14 57;
I MDE an02d1 vsc653 * 20 i_320 ¦ 7 54 55;
I MDE fn04d1 vsc653 * 21 i_321 ¦ 58 59 60 4 32;
I MDE in02d2 vsc653 * 22 i_322 ¦ 61 60;
I MDE in01d1 vsc653 * 23 i_323 ¦ 1 61;
I MDE in01d1 vsc653 * 24 i_324 ¦ 8 59;
I MDE fn01d2 vsc653 * 25 i_325 ¦ 1 2 58;
I MDE fn04d1 vsc653 * 26 i_326 ¦ 58 62 54 6 33;
I MDE in01d1 vsc653 * 27 i_327 ¦ 10 62;
I MDE nd02d1 vsc653 * 28 i_328 ¦ 63 64 34;
I MDE fn01d2 vsc653 * 29 i_329 ¦ 65 45 64;
I MDE in01d1 vsc653 * 30 i_330 ¦ 21 65;
I MDE nd03d1 vsc653 * 31 i_331 ¦ 46 47 25 63;
I MDE nd02d1 vsc653 * 32 i_332 ¦ 66 67 35;
I MDE fn01d2 vsc653 * 33 i_333 ¦ 68 45 67;
I MDE in01d1 vsc653 * 34 i_334 ¦ 23 68;
I MDE nd03d1 vsc653 * 35 i_335 ¦ 46 47 27 66;
I MDE fn01d2 vsc653 * 36 i_336 ¦ 69 70 36;
I MDE fn01d2 vsc653 * 37 i_337 ¦ 71 53 70;
I MDE in01d1 vsc653 * 38 i_338 ¦ 24 71;
I MDE an02d1 vsc653 * 39 i_339 ¦ 17 60 69;
I MDE fn01d2 vsc653 * 40 i_340 ¦ 72 73 37;
I MDE fn01d2 vsc653 * 41 i_341 ¦ 74 53 73;
I MDE in01d1 vsc653 * 42 i_342 ¦ 26 74;
I MDE an02d1 vsc653 * 43 i_343 ¦ 19 60 72;
I MDE fn04d1 vsc653 * 44 i_344 ¦ 58 75 60 16 38;
I MDE in01d1 vsc653 * 45 i_345 ¦ 20 75;
I MDE fn04d1 vsc653 * 46 i_346 ¦ 58 76 60 18 39;
I MDE in01d1 vsc653 * 47 i_347 ¦ 22 76;
E netlist

B subcells
MDE nd02d1 vsc653
MDE fn01d2 vsc653
MDE ni01d4 vsc653
MDE in01d1 vsc653
MDE nd03d1 vsc653
MDE in01d3 vsc653
MDE ni01d3 vsc653
```

MDE an02d1 vsc653
MDE fn05d2 vsc653
MDE fn04d1 vsc653
MDE in02d2 vsc653
E subcells

NM4C_P NLS

```
#cell2 * nm4c_p nls * 34 any 0 v8r4.6.2
# "9-Oct-94 GMT" "2:04:58 GMT" "9-Oct-94 GMT" "2:04:58 GMT" amir * .
writer        1
file_version  1
sections      1
netlist   1:        81 nm4c_p


B contents:  nm4c_p
netlist        246
cells         5834
switches         0
attributes       0
physical         0
history          0
E contents


B netlist
X 1 mclk i;
X 2 reset_ i;
X 3 mins i;
X 4 sav_clk i;
X 5 upd[2] i;
X 6 upd[1] i;
X 7 upd[0] i;
X 8 shiftn i;
X 9 h0 i;
X 10 sym[1] i;
X 11 sym[0] i;
X 12 x2n o;
X 13 mi2 o;
X 14 mi2n o;
X 15 minus o;
X 16 h00 o;
X 17 smp i;
X 18 rdacc i;
X 19 accmsb[1] i;
X 20 accmsb[0] i;
X 21 csa i;
X 22 yasis o;
X 23 yof o;
X 24 yuf o;
X 25 minusu[1] i;
X 26 minusu[0] i;
```

```
X 27 x2nu[1] i;
X 28 x2nu[0] i;
X 29 mwrb i;
X 30 h10 i;
X 31 tmsb[4] i;
X 32 tmsb[3] i;
X 33 tmsb[2] i;
X 34 tmsb[1] i;
X 35 tmsb[0] i;
X 36 sav_min[3] o;
X 37 sav_min[2] o;
X 38 sav_min[1] o;
X 39 sav_min[0] o;
X 40 sav_x2n[3] o;
X 41 sav_x2n[2] o;
X 42 sav_x2n[1] o;
X 43 sav_x2n[0] o;
X 44 h30[3] o;
X 45 h30[2] o;
X 46 h30[1] o;
X 47 h30[0] o;
G 48 VDD;
G 49 VSS;
N 73 minusdt;
N 77 x2n_n;
N 84 savmin0_n;
N 88 savx0_n;
N 93 tcsad;
N 94 acsad;
N 99 minuss;
N 100 minusp;
N 15 minus_1[0];
N 16 h00_1[0];
N 43 savx3;
N 43 savx3_1_q;
N 73 minusdt_1[0];
N 73 minuss_n;
N 73 minusp_n;
N 14 mi2n_1[0];
N 13 mi2_1[0];
N 39 savmin3;
N 39 savmin3_1_q;
N 38 savmin2;
N 38 savmin2_1_q;
N 37 savmin1;
N 37 savmin1_1_q;
N 36 savmin0;
N 36 savmin0_1_q;
```

```
N 40 savx0;
N 40 savx0_1_q;
N 41 savx1;
N 41 savx1_1_q;
N 42 savx2;
N 42 savx2_1_q;
N 93 tcsad_1_q;
N 94 acsad_1_q;
N 22 yasis_buf_ZN[0];
N 23 yof_buf_Z[0];
N 24 yuf_buf_Z[0];
N 44 h30_3_buf_ZN[0];
N 45 h30_2_buf_ZN[0];
N 46 inst_driver[0];
N 47 h30_0_buf_ZN[0];
N 99 minuss_1_q;
N 100 minusp_1_q;
N 12 x2n_1_q;
V upd 2 0 ¦ 5 6 7;
V sym 1 0 ¦ 10 11;
V accmsb 1 0 ¦ 19 20;
V minusu 1 0 ¦ 25 26;
V x2nu 1 0 ¦ 27 28;
V tmsb 4 0 ¦ 31 32 33 34 35;
V sav_min 3 0 ¦ 36 37 38 39;
V sav_x2n 3 0 ¦ 40 41 42 43;
V h30 3 0 ¦ 44 45 46 47;
V minusdt_1 0 0 ¦ 73;
V minus_1 0 0 ¦ 15;
V mi2_1 0 0 ¦ 13;
V mi2n_1 0 0 ¦ 14;
V h00_1 0 0 ¦ 16;
V yasis_buf_ZN 0 0 ¦ 22;
V yof_buf_Z 0 0 ¦ 23;
V yuf_buf_Z 0 0 ¦ 24;
V h30_0_buf_ZN 0 0 ¦ 47;
V inst_driver 0 0 ¦ 46;
V h30_2_buf_ZN 0 0 ¦ 45;
V h30_3_buf_ZN 0 0 ¦ 44;
M MDE lacfnh vsc653 ¦ EN D CDN Q QN ¦ ;
M MDE fn01d2 vsc653 ¦ A1 B1 ZN ¦ ;
M MDE in01d1 vsc653 ¦ I ZN ¦ ;
M MDE nr02d1 vsc653 ¦ A1 A2 ZN ¦ ;
M MDE oa04d1 vsc653 ¦ A1 A2 B ZN ¦ ;
M MDE or02d1 vsc653 ¦ A1 A2 Z ¦ ;
M MDE nd02d1 vsc653 ¦ A1 A2 ZN ¦ ;
M MDE ao06d1 vsc653 ¦ A1 A2 B1 B2 C1 C2 ZN ¦ ;
M MDE or05d1 vsc653 ¦ A1 A2 A3 A4 A5 Z ¦ ;
```

```
M MDE an04d1 vsc653 ¦ A1 A2 A3 A4 Z ¦ ;
M MDE or03d1 vsc653 ¦ A1 A2 A3 Z ¦ ;
M MDE or04d1 vsc653 ¦ A1 A2 A3 A4 Z ¦ ;
M MDE an03d1 vsc653 ¦ A1 A2 A3 Z ¦ ;
M MDE an02d1 vsc653 ¦ A1 A2 Z ¦ ;
M MDE xo02d1 vsc653 ¦ A1 A2 Z ¦ ;
M MDE oa07d1 vsc653 ¦ A1 A2 A3 B1 B2 ZN ¦ ;
M MDE xn02d1 vsc653 ¦ A1 A2 ZN ¦ ;
M MDE nr03d1 vsc653 ¦ A1 A2 A3 ZN ¦ ;
M MDE ao02d1 vsc653 ¦ A1 A2 A3 B1 B2 B3 ZN ¦ ;
M MDE mx21d1 vsc653 ¦ I0 I1 S Z ¦ ;
M MDE mfctnh vsc653 ¦ DA DB SA CP CDN Q QN ¦ ;
M MDE mfntnb vsc653 ¦ DA DB SA CP Q QN ¦ ;
M MDE dfctnb vsc653 ¦ D CP CDN Q QN ¦ ;
M MDE dfntnb vsc653 ¦ D CP Q QN ¦ ;
M MDE dfptnh vsc653 ¦ D CP SDN Q QN ¦ ;
I MDE lacfnh vsc653 * 1 minusp_ff ¦ 1 73 2 100 101;
I MDE fn01d2 vsc653 * 2 i_286 ¦ 75 68 88;
I MDE fn01d2 vsc653 * 3 i_287 ¦ 69 11 68;
I MDE in01d1 vsc653 * 4 i_288 ¦ 4 69;
I MDE nr02d1 vsc653 * 5 i_289 ¦ 4 81 75;
I MDE oa04d1 vsc653 * 6 i_290 ¦ 10 69 67 84;
I MDE or02d1 vsc653 * 7 i_291 ¦ 66 4 67;
I MDE nd02d1 vsc653 * 8 i_292 ¦ 74 80 73;
I MDE nr02d1 vsc653 * 9 i_293 ¦ 60 86 80;
I MDE in01d1 vsc653 * 10 i_294 ¦ 65 86;
I MDE ao06d1 vsc653 * 11 i_295 ¦ 25 6 36 7 26 5 65;
I MDE nr02d1 vsc653 * 12 i_296 ¦ 10 59 60;
I MDE or05d1 vsc653 * 13 i_297 ¦ 3 5 6 7 8 59;
I MDE oa04d1 vsc653 * 14 i_298 ¦ 10 8 70 74;
I MDE an04d1 vsc653 * 15 i_299 ¦ 3 92 85 51 70;
I MDE in01d1 vsc653 * 16 i_300 ¦ 6 51;
I MDE in01d1 vsc653 * 17 i_301 ¦ 5 85;
I MDE in01d1 vsc653 * 18 i_302 ¦ 7 92;
I MDE fn01d2 vsc653 * 19 i_306 ¦ 91 72 77;
I MDE fn01d2 vsc653 * 20 i_307 ¦ 76 11 72;
I MDE or03d1 vsc653 * 21 i_308 ¦ 7 5 6 76;
I MDE or04d1 vsc653 * 22 i_309 ¦ 82 83 87 90 91;
I MDE an03d1 vsc653 * 23 i_310 ¦ 27 85 6 90;
I MDE an04d1 vsc653 * 24 i_311 ¦ 85 7 51 40 87;
I MDE an02d1 vsc653 * 25 i_312 ¦ 5 28 83;
I MDE an04d1 vsc653 * 26 i_313 ¦ 8 92 85 51 82;
I MDE an02d1 vsc653 * 27 i_422 ¦ 18 97 22;
I MDE in01d1 vsc653 * 28 i_423 ¦ 98 97;
I MDE xo02d1 vsc653 * 29 i_424 ¦ 19 20 98;
I MDE an03d1 vsc653 * 30 i_425 ¦ 71 98 18 23;
I MDE an03d1 vsc653 * 31 i_428 ¦ 98 94 18 24;
I MDE oa07d1 vsc653 * 32 i_429 ¦ 50 30 52 53 78 44;
```

```
I MDE xn02d1 vsc653 * 33 i_430 ¦ 32 31 78;
I MDE nd02d1 vsc653 * 34 i_431 ¦ 32 31 52;
I MDE an03d1 vsc653 * 35 i_432 ¦ 35 33 34 50;
I MDE oa04d1 vsc653 * 36 i_433 ¦ 93 78 55 45;
I MDE or04d1 vsc653 * 37 i_434 ¦ 56 32 30 31 55;
I MDE nr03d1 vsc653 * 38 i_435 ¦ 35 33 34 56;
I MDE an02d1 vsc653 * 39 i_436 ¦ 78 30 46;
I MDE nr02d1 vsc653 * 40 i_437 ¦ 58 30 47;
I MDE ao02d1 vsc653 * 41 i_438 ¦ 50 31 32 57 56 79 58;
I MDE in01d1 vsc653 * 42 i_439 ¦ 31 79;
I MDE in01d1 vsc653 * 43 i_440 ¦ 32 57;
I MDE mx21d1 vsc653 * 44 i_466 ¦ 99 100 1 15;
I MDE xo02d1 vsc653 * 45 i_467 ¦ 15 9 16;
I MDE an02d1 vsc653 * 46 i_468 ¦ 16 89 13;
I MDE in01d1 vsc653 * 47 i_469 ¦ 13 14;
I MDE mfctnh vsc653 * 48 acsad_ff ¦ 21 94 17 1 2 94 71;
I MDE mfctnh vsc653 * 49 tcsad_ff ¦ 21 93 29 1 2 93 53;
I MDE mfntnb vsc653 * 50 savx3_ff ¦ 42 43 4 1 43 64;
I MDE mfntnb vsc653 * 51 savmin3_ff ¦ 38 39 4 1 39 61;
I MDE mfntnb vsc653 * 52 savx2_ff ¦ 41 42 4 1 42 62;
I MDE mfntnb vsc653 * 53 savmin2_ff ¦ 37 38 4 1 38 54;
I MDE mfntnb vsc653 * 54 savx1_ff ¦ 40 41 4 1 41 63;
I MDE mfntnb vsc653 * 55 savmin1_ff ¦ 36 37 4 1 37 95;
I MDE dfctnb vsc653 * 56 minuss_ff ¦ 73 1 2 99 96;
I MDE dfntnb vsc653 * 57 savmin0_ff ¦ 84 1 36 66;
I MDE dfntnb vsc653 * 58 savx0_ff ¦ 88 1 40 81;
I MDE dfptnh vsc653 * 59 x2n_ff ¦ 77 1 2 12 89;
E netlist


B subcells
MDE lacfnh vsc653
MDE fn01d2 vsc653
MDE in01d1 vsc653
MDE nr02d1 vsc653
MDE oa04d1 vsc653
MDE or02d1 vsc653
MDE nd02d1 vsc653
MDE ao06d1 vsc653
MDE or05d1 vsc653
MDE an04d1 vsc653
MDE or03d1 vsc653
MDE or04d1 vsc653
MDE an03d1 vsc653
MDE an02d1 vsc653
MDE xo02d1 vsc653
MDE oa07d1 vsc653
MDE xn02d1 vsc653
```

MDE nr03d1 vsc653
MDE ao02d1 vsc653
MDE mx21d1 vsc653
MDE mfctnh vsc653
MDE mfntnb vsc653
MDE dfctnb vsc653
MDE dfntnb vsc653
MDE dfptnh vsc653
E subcells

NM60_P NLS

```
#cell2 * nm60_p nls * 33 any 0 v8r4.6.2
# "24-Oct-94 GMT" "13:33:31 GMT" "24-Oct-94 GMT" "13:33:31 GMT" amir * .
writer        1
file_version  1
sections      1
netlist   1:        81 nm60_p


B contents:  nm60_p
netlist       246
cells        14532
switches         0
attributes   14659
physical         0
history          0
E contents


B netlist
X 1 mclk i;
X 2 reset_ i;
X 3 cofsel[2] i;
X 4 cofsel[1] i;
X 5 cofsel[0] i;
X 6 brl[5] i;
X 7 brl[4] i;
X 8 brl[3] i;
X 9 brl[2] i;
X 10 brl[1] i;
X 11 brl[0] i;
X 12 shiftnt i;
X 13 ureg_cp i;
X 14 mwrb i;
X 15 mins i;
X 16 acc00 i;
X 17 acc01 i;
X 18 acc10 i;
X 19 best0 i;
X 20 best1 i;
X 21 best2 i;
X 22 upd[2] i;
X 23 upd[1] i;
X 24 upd[0] i;
X 25 sav_clk i;
X 26 h10 i;
```

```
X 27 tst[1] o;
X 28 tst[0] o;
X 29 abus[15] i;
X 30 abus[14] i;
X 31 abus[13] i;
X 32 abus[12] i;
X 33 abus[11] i;
X 34 abus[10] i;
X 35 abus[9] i;
X 36 abus[8] i;
X 37 abus[7] i;
X 38 abus[6] i;
X 39 abus[5] i;
X 40 abus[4] i;
X 41 abus[3] i;
X 42 abus[2] i;
X 43 abus[1] i;
X 44 abus[0] i;
X 45 awr i;
X 46 rda i;
X 47 sympath[11] o;
X 48 sympath[10] o;
X 49 sympath[9] o;
X 50 sympath[8] o;
X 51 sympath[7] o;
X 52 sympath[6] o;
X 53 sympath[5] o;
X 54 sympath[4] o;
X 55 sympath[3] o;
X 56 sympath[2] o;
X 57 sympath[1] o;
X 58 sympath[0] o;
X 59 cof[23] o;
X 60 cof[22] o;
X 61 cof[21] o;
X 62 cof[20] o;
X 63 cof[19] o;
X 64 cof[18] o;
X 65 cof[17] o;
X 66 cof[16] o;
X 67 cof[15] o;
X 68 cof[14] o;
X 69 cof[13] o;
X 70 cof[12] o;
X 71 cof[11] o;
X 72 cof[10] o;
X 73 cof[9] o;
X 74 cof[8] o;
```

```
X 75 cof[7] o;
X 76 cof[6] o;
X 77 cof[5] o;
X 78 cof[4] o;
X 79 cof[3] o;
X 80 cof[2] o;
X 81 cof[1] o;
X 82 cof[0] o;
X 83 din[23] i;
X 84 din[22] i;
X 85 din[21] i;
X 86 din[20] i;
X 87 din[19] i;
X 88 din[18] i;
X 89 din[17] i;
X 90 din[16] i;
X 91 din[15] i;
X 92 din[14] i;
X 93 din[13] i;
X 94 din[12] i;
X 95 din[11] i;
X 96 din[10] i;
X 97 din[9] i;
X 98 din[8] i;
X 99 din[7] i;
X 100 din[6] i;
X 101 din[5] i;
X 102 din[4] i;
X 103 din[3] i;
X 104 din[2] i;
X 105 din[1] i;
X 106 din[0] i;
X 107 bbus[15] o;
X 108 bbus[14] o;
X 109 bbus[13] o;
X 110 bbus[12] o;
X 111 bbus[11] o;
X 112 bbus[10] o;
X 113 bbus[9] o;
X 114 bbus[8] o;
X 115 bbus[7] o;
X 116 bbus[6] o;
X 117 bbus[5] o;
X 118 bbus[4] o;
X 119 bbus[3] o;
X 120 bbus[2] o;
X 121 bbus[1] o;
X 122 bbus[0] o;
```

```
X 123 brd00 i;
X 124 brd01 i;
X 125 brd10 i;
X 126 sym00[1] i;
X 127 sym00[0] i;
X 128 sym01[1] i;
X 129 sym01[0] i;
X 130 sym10[1] i;
X 131 sym10[0] i;
X 132 rdacc00 i;
X 133 rdacc01 i;
X 134 rdacc10 i;
X 135 smp00 i;
X 136 smp01 i;
X 137 smp10 i;
G 138 VDD;
G 139 VSS;
N 140 h0030[0];
N 141 h0030[1];
N 142 h0030[2];
N 143 h0030[3];
N 144 h0130[0];
N 145 h0130[1];
N 146 h0130[2];
N 147 h0130[3];
N 148 h1030[0];
N 149 h1030[1];
N 150 h1030[2];
N 151 h1030[3];
N 152 tmsb00[0];
N 153 tmsb00[1];
N 154 tmsb00[2];
N 155 tmsb00[3];
N 156 tmsb00[4];
N 157 tmsb01[0];
N 158 tmsb01[1];
N 159 tmsb01[2];
N 160 tmsb01[3];
N 161 tmsb01[4];
N 162 tmsb10[0];
N 163 tmsb10[1];
N 164 tmsb10[2];
N 165 tmsb10[3];
N 166 tmsb10[4];
N 167 acc00msb[0];
N 168 acc00msb[1];
N 169 acc01msb[0];
N 170 acc01msb[1];
```

N 171 acc10msb[0];
N 172 acc10msb[1];
N 173 selu[0];
N 174 selu[1];
N 175 selu[2];
N 176 selu[3];
N 177 selb[0];
N 178 selb[1];
N 179 selb[2];
N 180 selb[3];
N 181 selb[4];
N 182 selb[5];
N 183 selb[6];
N 184 selb[7];
N 185 selb[8];
N 186 selb[9];
N 187 selb[10];
N 188 selb[11];
N 189 selb[12];
N 190 selb[13];
N 191 selb[14];
N 192 selb[15];
N 193 onez_sel[0];
N 194 onez_sel[1];
N 195 onez[0];
N 196 onez[1];
N 197 onez[2];
N 198 onez[3];
N 199 i_8_z;
N 200 h0;
N 201 x2n00;
N 202 mi200;
N 203 mi2n00;
N 204 minus00;
N 205 ha00;
N 206 yasis00;
N 207 csa00;
N 208 x2n01;
N 209 mi201;
N 210 mi2n01;
N 211 minus01;
N 212 ha01;
N 213 yasis01;
N 214 csa01;
N 215 x2n10;
N 216 mi210;
N 217 mi2n10;
N 218 minus10;

N 219 ha10;
N 220 yasis10;
N 221 csa10;
N 222 yof;
N 223 yuf;
N 224 dnm60a_adder01_cout;
N 225 dnm60a_adder01_ovr;
N 226 dnm60a_adder10_cout;
N 227 dnm60a_adder10_ovr;
N 228 dnm60a_adder00_cout;
N 229 dnm60a_adder00_ovr;
N 140 nm60c_h0030[0];
N 141 nm60c_h0030[1];
N 142 nm60c_h0030[2];
N 143 nm60c_h0030[3];
N 144 nm60c_h0130[0];
N 145 nm60c_h0130[1];
N 146 nm60c_h0130[2];
N 147 nm60c_h0130[3];
N 148 nm60c_h1030[0];
N 149 nm60c_h1030[1];
N 150 nm60c_h1030[2];
N 151 nm60c_h1030[3];
N 152 dnm60a_tmsb00[0];
N 153 dnm60a_tmsb00[1];
N 154 dnm60a_tmsb00[2];
N 155 dnm60a_tmsb00[3];
N 156 dnm60a_tmsb00[4];
N 157 dnm60a_tmsb01[0];
N 158 dnm60a_tmsb01[1];
N 159 dnm60a_tmsb01[2];
N 160 dnm60a_tmsb01[3];
N 161 dnm60a_tmsb01[4];
N 162 dnm60a_tmsb10[0];
N 163 dnm60a_tmsb10[1];
N 164 dnm60a_tmsb10[2];
N 165 dnm60a_tmsb10[3];
N 166 dnm60a_tmsb10[4];
N 167 dnm60a_acc00msb[0];
N 168 dnm60a_acc00msb[1];
N 169 dnm60a_acc01msb[0];
N 170 dnm60a_acc01msb[1];
N 171 dnm60a_acc10msb[0];
N 172 dnm60a_acc10msb[1];
N 173 dnm60a_selu[0];
N 174 dnm60a_selu[1];
N 175 dnm60a_selu[2];
N 176 dnm60a_selu[3];

N 177 nm60c_selb[0];
N 178 nm60c_selb[1];
N 179 nm60c_selb[2];
N 180 nm60c_selb[3];
N 181 nm60c_selb[4];
N 182 nm60c_selb[5];
N 183 nm60c_selb[6];
N 184 nm60c_selb[7];
N 185 nm60c_selb[8];
N 186 nm60c_selb[9];
N 187 nm60c_selb[10];
N 188 nm60c_selb[11];
N 189 nm60c_selb[12];
N 190 nm60c_selb[13];
N 191 nm60c_selb[14];
N 192 nm60c_selb[15];
N 193 dnm60a_tst[0];
N 194 dnm60a_tst[1];
N 195 onez_ll_Z[0];
N 196 onez_lh_ZN[0];
N 197 onez_hl_ZN[0];
N 198 onez_hh_ZN[0];
N 199 i_8_Z_1[0];
N 200 dnm60a_h0[0];
N 201 nm60c_x2n00[0];
N 202 nm60c_mi200[0];
N 203 nm60c_mi2n00[0];
N 204 nm60c_minus00[0];
N 205 nm60c_ha00[0];
N 206 nm60c_yasis00[0];
N 207 dnm60a_csa00_COUT[0];
N 208 nm60c_x2n01[0];
N 209 nm60c_mi201[0];
N 210 nm60c_mi2n01[0];
N 211 nm60c_minus01[0];
N 212 nm60c_ha01[0];
N 213 nm60c_yasis01[0];
N 214 dnm60a_csa01_COUT[0];
N 215 nm60c_x2n10[0];
N 216 nm60c_mi210[0];
N 217 nm60c_mi2n10[0];
N 218 nm60c_minus10[0];
N 219 nm60c_ha10[0];
N 220 nm60c_yasis10[0];
N 221 dnm60a_csa10_COUT[0];
N 222 nm60c_yof[0];
N 223 nm60c_yuf[0];
N 224 dnm60a_adder01_COUT_1[0];

N 225 dnm60a_adder01_OVR_1[0];
N 226 dnm60a_adder10_COUT_1[0];
N 227 dnm60a_adder10_OVR_1[0];
N 228 dnm60a_adder00_COUT_1[0];
N 229 dnm60a_adder00_OVR_1[0];
N 28 dnm60a_tst[2];
N 27 dnm60a_tst[3];
N 122 dnm60a_bbus[0];
N 121 dnm60a_bbus[1];
N 120 dnm60a_bbus[2];
N 119 dnm60a_bbus[3];
N 118 dnm60a_bbus[4];
N 117 dnm60a_bbus[5];
N 116 dnm60a_bbus[6];
N 115 dnm60a_bbus[7];
N 114 dnm60a_bbus[8];
N 113 dnm60a_bbus[9];
N 112 dnm60a_bbus[10];
N 111 dnm60a_bbus[11];
N 110 dnm60a_bbus[12];
N 109 dnm60a_bbus[13];
N 108 dnm60a_bbus[14];
N 107 dnm60a_bbus[15];
N 82 dnm60a_cof[0];
N 81 dnm60a_cof[1];
N 80 dnm60a_cof[2];
N 79 dnm60a_cof[3];
N 78 dnm60a_cof[4];
N 77 dnm60a_cof[5];
N 76 dnm60a_cof[6];
N 75 dnm60a_cof[7];
N 74 dnm60a_cof[8];
N 73 dnm60a_cof[9];
N 72 dnm60a_cof[10];
N 71 dnm60a_cof[11];
N 70 dnm60a_cof[12];
N 69 dnm60a_cof[13];
N 68 dnm60a_cof[14];
N 67 dnm60a_cof[15];
N 66 dnm60a_cof[16];
N 65 dnm60a_cof[17];
N 64 dnm60a_cof[18];
N 63 dnm60a_cof[19];
N 62 dnm60a_cof[20];
N 61 dnm60a_cof[21];
N 60 dnm60a_cof[22];
N 59 dnm60a_cof[23];
N 58 dnm60a_path[0];

```
N 57 dnm60a_path[1];
N 56 dnm60a_path[2];
N 55 dnm60a_path[3];
N 54 dnm60a_path[4];
N 53 dnm60a_path[5];
N 52 dnm60a_sym[0];
N 51 dnm60a_sym[1];
N 50 dnm60a_sym[2];
N 49 dnm60a_sym[3];
N 48 dnm60a_sym[4];
N 47 dnm60a_sym[5];
V cofsel 2 0 ¦ 3 4 5;
V brl 5 0 ¦ 6 7 8 9 10 11;
V upd 2 0 ¦ 22 23 24;
V tst 1 0 ¦ 27 28;
V abus 15 0 ¦ 29 30 31 32 33 34 35 36 37 38 39 40 41 42 43 44;
V sympath 11 0 ¦ 47 48 49 50 51 52 53 54 55 56 57 58;
V cof 23 0 ¦ 59 60 61 62 63 64 65 66 67 68 69 70 71 72 73 74 75 76 77 78 79 80 8-
1 82;
V din 23 0 ¦ 83 84 85 86 87 88 89 90 91 92 93 94 95 96 97 98 99 100 101 102 103 -
104 105 106;
V bbus 15 0 ¦ 107 108 109 110 111 112 113 114 115 116 117 118 119 120 121 122;
V sym00 1 0 ¦ 126 127;
V sym01 1 0 ¦ 128 129;
V sym10 1 0 ¦ 130 131;
V h0030 3 0 ¦ 143 142 141 140;
V h0130 3 0 ¦ 147 146 145 144;
V h1030 3 0 ¦ 151 150 149 148;
V tmsb00 4 0 ¦ 156 155 154 153 152;
V tmsb01 4 0 ¦ 161 160 159 158 157;
V tmsb10 4 0 ¦ 166 165 164 163 162;
V acc00msb 1 0 ¦ 168 167;
V acc01msb 1 0 ¦ 170 169;
V acc10msb 1 0 ¦ 172 171;
V selu 3 0 ¦ 176 175 174 173;
V selb 15 0 ¦ 192 191 190 189 188 187 186 185 184 183 182 181 180 179 178 177;
V onez_sel 1 0 ¦ 194 193;
V onez 3 0 ¦ 198 197 196 195;
V onez_hh_ZN 0 0 ¦ 198;
V onez_hl_ZN 0 0 ¦ 197;
V onez_lh_ZN 0 0 ¦ 196;
V onez_ll_Z 0 0 ¦ 195;
V nm60c_selb 15 0 ¦ 192 191 190 189 188 187 186 185 184 183 182 181 180 179 178 -
177;
V nm60c_x2n00 0 0 ¦ 201;
V nm60c_mi200 0 0 ¦ 202;
V nm60c_mi2n00 0 0 ¦ 203;
V nm60c_minus00 0 0 ¦ 204;
```

V nm60c_ha00 0 0 ¦ 205;
V nm60c_yasis00 0 0 ¦ 206;
V nm60c_h0030 3 0 ¦ 143 142 141 140;
V nm60c_x2n01 0 0 ¦ 208;
V nm60c_mi201 0 0 ¦ 209;
V nm60c_mi2n01 0 0 ¦ 210;
V nm60c_minus01 0 0 ¦ 211;
V nm60c_ha01 0 0 ¦ 212;
V nm60c_yasis01 0 0 ¦ 213;
V nm60c_h0130 3 0 ¦ 147 146 145 144;
V nm60c_x2n10 0 0 ¦ 215;
V nm60c_mi210 0 0 ¦ 216;
V nm60c_mi2n10 0 0 ¦ 217;
V nm60c_minus10 0 0 ¦ 218;
V nm60c_ha10 0 0 ¦ 219;
V nm60c_yasis10 0 0 ¦ 220;
V nm60c_h1030 3 0 ¦ 151 150 149 148;
V nm60c_yof 0 0 ¦ 222;
V nm60c_yuf 0 0 ¦ 223;
V i_8_Z_1 0 0 ¦ 199;
V dnm60a_acc00msb 1 0 ¦ 168 167;
V dnm60a_acc01msb 1 0 ¦ 170 169;
V dnm60a_acc10msb 1 0 ¦ 172 171;
V dnm60a_adder00_COUT_1 0 0 ¦ 228;
V dnm60a_adder00_OVR_1 0 0 ¦ 229;
V dnm60a_adder01_COUT_1 0 0 ¦ 224;
V dnm60a_adder01_OVR_1 0 0 ¦ 225;
V dnm60a_adder10_COUT_1 0 0 ¦ 226;
V dnm60a_adder10_OVR_1 0 0 ¦ 227;
V dnm60a_bbus 15 0 ¦ 107 108 109 110 111 112 113 114 115 116 117 118 119 120 121-
122;
V dnm60a_cof 23 0 ¦ 59 60 61 62 63 64 65 66 67 68 69 70 71 72 73 74 75 76 77 78 -
79 80 81 82;
V dnm60a_csa00_COUT 0 0 ¦ 207;
V dnm60a_csa01_COUT 0 0 ¦ 214;
V dnm60a_csa10_COUT 0 0 ¦ 221;
V dnm60a_h0 0 0 ¦ 200;
V dnm60a_path 5 0 ¦ 53 54 55 56 57 58;
V dnm60a_selu 3 0 ¦ 176 175 174 173;
V dnm60a_sym 5 0 ¦ 47 48 49 50 51 52;
V dnm60a_tmsb00 4 0 ¦ 156 155 154 153 152;
V dnm60a_tmsb01 4 0 ¦ 161 160 159 158 157;
V dnm60a_tmsb10 4 0 ¦ 166 165 164 163 162;
V dnm60a_tst 3 0 ¦ 27 28 194 193;
M MDE nr02d2 vsc653 ¦ A1 A2 ZN ¦ ;
M MDE fn05d2 vsc653 ¦ A1 B1 ZN ¦ ;
M MDE an02d2 vsc653 ¦ A1 A2 Z ¦ ;
M NLS nm60c_p * ¦ shiftt shiftr shiftn shiftnt selu[3] selu[2] selu[1] selu[0] s- elb[15] selb[14] selb[13] selb[12] selb[11] selb[10] selb[9] selb[8] selb[7] sel-
b[6] selb[5] selb[4] selb[3] selb[2] selb[1] selb[0] mclk mins sav_clk best0 bes-
t1 best2 upd[2] upd[1] upd[0] mwrb h10 h0 sym00[1] sym00[0] smp00 rdacc00 acc00m-
sb[1] acc00msb[0] tmsb00[4] tmsb00[3] tmsb00[2] tmsb00[1] tmsb00[0] x2n00 mi200 -
mi2n00 minus00 ha00 yasis00 h0030[3] h0030[2] h0030[1] h0030[0] csa00 sym01[1] s-
ym01[0] smp01 rdacc01 acc01msb[1] acc01msb[0] tmsb01[4] tmsb01[3] tmsb01[2] tmsb-
01[1] tmsb01[0] x2n01 mi201 mi2n01 minus01 ha01 yasis01 h0130[3] h0130[2] h0130[-
1] h0130[0] csa01 sym10[1] sym10[0] smp10 rdacc10 acc10msb[1] acc10msb[0] tmsb10-
[4] tmsb10[3] tmsb10[2] tmsb10[1] tmsb10[0] x2n10 mi210 mi2n10 minus10 ha10 yasi-
s10 h1030[3] h1030[2] h1030[1] h1030[0] csa10 yof yuf reset_ ¦ iiiiiiiooooooooo-
oooooooiiiiiiiiiiiiiiiiiiiiiiooooooooooiiiiiiiiiiiooooooooooiiiiiiiiiiiooooooo-
ooooiooi;
M MDE ni01d2 vsc653 ¦ I Z ¦ ;
M MDE MDP(nm60a) * ¦ accu00_cp accu01_cp accu10_cp accz00 accz01 accz10
adder01_-
CIN adder10_CIN cofsel[2] cofsel[1] cofsel[0] cp csa00_CIN csa01_CIN csa10_CIN d-
in[23] din[22] din[21] din[20] din[19] din[18] din[17] din[16] din[15] din[14] d-
in[13] din[12] din[11] din[10] din[9] din[8] din[7] din[6] din[5] din[4] din[3] -
din[2] din[1] din[0] mi2n00[0] mi2n01[0] mi2n10[0] minus00 minus01 minus10 selb[-
15] selb[14] selb[13] selb[12] selb[11] selb[10] selb[9] selb[8] selb[7] selb[6]-
selb[5] selb[4] selb[3] selb[2] selb[1] selb[0] sel[2] sel[1] sel[0] trans00_cp-
trans01_cp trans10_cp ureg_cp ureg_init x2n00 x2n01 x2n10 yasis00 yasis01 yasis-
10 yof yuf adder01_COUT adder01_OVR adder10_COUT adder10_OVR bbus[20]
bbus[19] b-
bus[18] bbus[17] bbus[16] bbus[15] bbus[14] bbus[13] bbus[12] bbus[11] bbus[10] -
bbus[9] bbus[8] bbus[7] bbus[6] bbus[5] cof[23] cof[22] cof[21] cof[20] cof[19] -
cof[18] cof[17] cof[16] cof[15] cof[14] cof[13] cof[12] cof[11] cof[10] cof[9] c-
of[8] cof[7] cof[6] cof[5] cof[4] cof[3] cof[2] cof[1] cof[0] csa00_COUT csa01_C-
OUT csa10_COUT h0[0] selu[3] selu[2] selu[1] selu[0] tmsb00[24] tmsb00[23] tmsb0-
0[22] tmsb00[21] tmsb00[20] tst[23] tst[22] tst[21] tst[20] tmsb01[24] tmsb01[23-
] tmsb01[22] tmsb01[21] tmsb01[20] tmsb10[24] tmsb10[23] tmsb10[22] tmsb10[21] t-
msb10[20] adder00_CIN adder00_COUT adder00_OVR brd00 brd01 brd10 h0030[3]
h0030[-
2] h0030[1] h0030[0] h0130[3] h0130[2] h0130[1] h0130[0] h1030[3] h1030[2] h1030-
[1] h1030[0] abusrg_cp abus[15] abus[14] abus[13] abus[12] abus[11] abus[10] abu-
s[9] abus[8] abus[7] abus[6] abus[5] abus[4] abus[3] abus[2] abus[1] abus[0] rda-
abusrg_init path[13] path[12] path[11] path[10] path[9] path[8] sym[21] sym[20]-
sym[19] sym[18] sym[17] sym[16] acc00msb[24] acc00msb[23] acc01msb[24] acc01msb-
[23] acc10msb[24] acc10msb[23] onez[22] onez[21] onez[20] onez[19] ¦ iiiiiiiiii-
iiiiiiiiiiiiiiiiiiiiiiiiiiiiiiiiiiiiiiiiiiiiiiiiiiiiiiiiiiiiiioooooooooooooo-
oooooooooooooooooooooooooooooooooooooooooooooooooooooooioo iiiiiiiiiiiiiiiiii-
iiiiiiiiiiiiioooooooooooooooooooiiii;
I MDE nr02d2 vsc653 * 1 onez_hh ¦ 194 193 198;
I MDE fn05d2 vsc653 * 2 onez_hl ¦ 193 194 197;
I MDE fn05d2 vsc653 * 3 onez_lh ¦ 194 193 196;
I MDE an02d2 vsc653 * 4 onez_ll ¦ 194 193 195;
I NLS nm60c_p * * 5 nm60c ¦ 9 10 11 12 176 175 174 173 192 191 190 189 188 187 1-
86 185 184 183 182 181 180 179 178 177 199 15 25 19 20 21 22 23 24 14 26 200 126-

127 135 132 168 167 156 155 154 153 152 201 202 203 204 205 206 143 142 141 140-
207 128 129 136 133 170 169 161 160 159 158 157 208 209 210 211 212 213 147 146-
145 144 214 130 131 137 134 172 171 166 165 164 163 162 215 216 217 218 219 220-
151 150 149 148 221 222 223 2;
I MDE ni01d2 vsc653 * 6 i_8 ¦ 1 199;
I MDE MDP(nm60a) * * 7 dnm60a ¦ 135 136 137 16 17 18 212 219 3 4 5 1 202 209
216-
83 84 85 86 87 88 89 90 91 92 93 94 95 96 97 98 99 100 101 102 103 104 105 106 -
203 210 217 204 211 218 192 191 190 189 188 187 186 185 184 183 182 181 180 179 -
178 177 6 7 8 14 14 14 13 2 201 208 215 206 213 220 222 223 224 225 226 227 107 -
108 109 110 111 112 113 114 115 116 117 118 119 120 121 122 59 60 61 62 63 64 65-
66 67 68 69 70 71 72 73 74 75 76 77 78 79 80 81 82 207 214 221 200 176 175 174 -
173 156 155 154 153 152 27 28 194 193 161 160 159 158 157 166 165 164 163 162 20-
5 228 229 123 124 125 143 142 141 140 147 146 145 144 151 150 149 148 45 29 30 3-
1 32 33 34 35 36 37 38 39 40 41 42 43 44 46 2 53 54 55 56 57 58 47 48 49 50 51 5-
2 168 167 170 169 172 171 198 197 196 195;
E netlist B subcells
MDE nr02d2 vsc653
MDE fn05d2 vsc653
MDE an02d2 vsc653
NLS nm60c_p *
MDE ni01d2 vsc653
MDE MDP(nm60a) *
E subcells B attribute_list
14731 chip
14744 frequency
E attribute_list B A: chip
E B A: frequency
E

NM60A LA

```
#cell2 * nm60a la * 31 any 34816 v8r4.6.2
# "24-Oct-94 GMT" "12:56:19 GMT" "24-Oct-94 GMT" "12:56:14 GMT" amir * .la
mtbordera .
V 15 COMPASSlogicAssist
T C
L ""
I 1
B -24 31 1000 2246
M 0 0 0 0
F miejn
A 2 "chip" "chip_1" HI "frequency" "15" HI
D "[mde]MDP" "nm60a" "" "0" "0" "1073791473" "1073763180" "1073791318"
"1073775452"
C 100 40 1 -95 -110 "accu00_cp" small LC B NSCI -100 -110 1
N 90 40 "accu00_cp" normal RC B
C 100 80 2 -95 -100 "accu01_cp" small LC B NSCI -100 -100 1
N 90 80 "accu01_cp" normal RC B
C 100 120 3 -95 -90 "accu10_cp" small LC B NSCI -100 -90 1
N 90 120 "accu10_cp" normal RC B
C 100 160 4 -95 -80 "accz00" small LC B NSCI -100 -80 1
N 90 160 "accz00" normal RC B
C 100 200 5 -95 -70 "accz01" small LC B NSCI -100 -70 1
N 90 200 "accz01" normal RC B
C 100 240 6 -95 -60 "accz10" small LC B NSCI -100 -60 1
N 90 240 "accz10" normal RC B
C 100 280 7 -95 -50 "adder01_CIN" small LC B NSCI -100 -50 1
N 90 280 "adder01_CIN" normal RC B
C 100 320 8 -95 -40 "adder10_CIN" small LC B NSCI -100 -40 1
N 90 320 "adder10_CIN" normal RC B
C 100 480 12 -95 0 "cofsel[2:0]" small LC B NSCI -100 0 1
N 90 480 "cofsel[2:0]" normal RC B
C 100 520 13 -95 10 "cp" small LC B NSCI -100 10 1
N 90 520 "cp" normal RC B
C 100 560 14 -95 20 "csa00_CIN" small LC B NSCI -100 20 1
N 90 560 "csa00_CIN" normal RC B
C 100 600 15 -95 30 "csa01_CIN" small LC B NSCI -100 30 1
N 90 600 "csa01_CIN" normal RC B
C 100 640 16 -95 40 "csa10_CIN" small LC B NSCI -100 40 1
N 90 640 "csa10_CIN" normal RC B
C 100 680 17 -95 50 "din[23:0]" small LC B NSCI -100 50 1
N 90 680 "din[23:0]" normal RC B
C 100 840 21 -95 90 "mi2n00[0]" small LC B NSCI -100 90 1
N 90 840 "mi2n00[0]" normal RC B
C 100 880 22 -95 100 "mi2n01[0]" small LC B NSCI -100 100 1
N 90 880 "mi2n01[0]" normal RC B
```

```
C 100 920 23 -95 110 "mi2n10[0]" small LC B NSCI -100 110 1
N 90 920 "mi2n10[0]" normal RC B
C 100 960 24 -95 120 "minus00" small LC B NSCI -100 120 1
N 90 960 "minus00" normal RC B
C 100 1000 25 -95 130 "minus01" small LC B NSCI -100 130 1
N 90 1000 "minus01" normal RC B
C 100 1040 26 -95 140 "minus10" small LC B NSCI -100 140 1
N 90 1040 "minus10" normal RC B
C 100 1120 28 -95 160 "selb[15:0]" small LC B NSCI -100 160 1
N 90 1120 "selb[15:0]" normal RC B
C 100 1160 29 -95 170 "sel[2:0]" small LC B NSCI -100 170 1
N 90 1160 "sel[2:0]" normal RC B
C 100 1200 30 -95 180 "trans00_cp" small LC B NSCI -100 180 1
N 90 1200 "trans00_cp" normal RC B
C 100 1240 31 -95 190 "trans01_cp" small LC B NSCI -100 190 1
N 90 1240 "trans01_cp" normal RC B
C 100 1280 32 -95 200 "trans10_cp" small LC B NSCI -100 200 1
N 90 1280 "trans10_cp" normal RC B
C 100 1320 33 -95 210 "ureg_cp" small LC B NSCI -100 210 1
N 90 1320 "ureg_cp" normal RC B
C 100 1360 34 -95 220 "ureg_init" small LC B NSCI -100 220 1
N 90 1360 "ureg_init" normal RC B
C 100 1400 35 -95 230 "x2n00" small LC B NSCI -100 230 1
N 90 1400 "x2n00" normal RC B
C 100 1440 36 -95 240 "x2n01" small LC B NSCI -100 240 1
N 90 1440 "x2n01" normal RC B
C 100 1480 37 -95 250 "x2n10" small LC B NSCI -100 250 1
N 90 1480 "x2n10" normal RC B
C 100 1520 38 -95 260 "yasis00" small LC B NSCI -100 260 1
N 90 1520 "yasis00" normal RC B
C 100 1560 39 -95 270 "yasis01" small LC B NSCI -100 270 1
N 90 1560 "yasis01" normal RC B
C 100 1600 40 -95 280 "yasis10" small LC B NSCI -100 280 1
N 90 1600 "yasis10" normal RC B
C 100 1640 41 -95 290 "yof" small LC B NSCI -100 290 1
N 90 1640 "yof" normal RC B
C 100 1680 42 -95 300 "yuf" small LC B NSCI -100 300 1
N 90 1680 "yuf" normal RC B
C 1000 40 43 75 -70 "adder01_COUT" small RC B NSCO 80 -70 1
N 990 40 "adder01_COUT" normal RC B
C 1000 80 44 75 -50 "adder01_OVR" small RC B NSCO 80 -50 1
N 990 80 "adder01_OVR" normal RC B
C 1000 120 45 75 -30 "adder10_COUT" small RC B NSCO 80 -30 1
N 990 120 "adder10_COUT" normal RC B
C 1000 160 46 75 -10 "adder10_OVR" small RC B NSCO 80 -10 1
N 990 160 "adder10_OVR" normal RC B
C 1000 280 49 75 50 "bbus[20:5]" small RC B NSCO 80 50 1
N 990 280 "bbus[20:5]" normal RC B
```

```
C 1000 320 50 75 70 "cof[23:0]" small RC B NSCO 80 70 1
N 990 320 "cof[23:0]" normal RC B
C 1000 360 51 75 90 "csa00_COUT" small RC B NSCO 80 90 1
N 990 360 "csa00_COUT" normal RC B
C 1000 400 52 75 110 "csa01_COUT" small RC B NSCO 80 110 1
N 990 400 "csa01_COUT" normal RC B
C 1000 440 53 75 130 "csa10_COUT" small RC B NSCO 80 130 1
N 990 440 "csa10_COUT" normal RC B
C 1000 480 54 75 150 "h0[0]" small RC B NSCO 80 150 1
N 990 480 "h0[0]" normal RC B
C 1000 520 55 75 170 "selu[3:0]" small RC B NSCO 80 170 1
N 990 520 "selu[3:0]" normal RC B
C 1000 560 56 75 190 "tmsb00[24:20]" small RC B NSCO 80 190 1
N 990 560 "tmsb00[24:20]" normal RC B
C 1000 680 59 75 250 "tst[23:20]" small RC B NSCO 80 250 1
N 990 680 "tst[23:20]" normal RC B
C 1000 720 61 75 210 "tmsb01[24:20]" small RC B NSCO 80 210 1
N 990 720 "tmsb01[24:20]" normal RC B
C 1000 760 62 75 230 "tmsb10[24:20]" small RC B NSCO 80 230 1
N 990 760 "tmsb10[24:20]" normal RC B
C 100 1760 63 -95 -30 "adder00_CIN" small LC B NSCI -100 -30 1
N 90 1760 "adder00_CIN" normal RC B
C 1000 800 64 75 10 "adder00_COUT" small RC B NSCO 80 10 1
N 990 800 "adder00_COUT" normal RC B
C 1000 840 65 75 30 "adder00_OVR" small RC B NSCO 80 30 1
N 990 840 "adder00_OVR" normal RC B
C 100 1800 68 -95 -20 "brd00" small LC B NSCI -100 -20 1
N 90 1800 "brd00" normal RC B
C 100 1840 69 -95 -10 "brd01" small LC B NSCI -100 -10 1
N 90 1840 "brd01" normal RC B
C 100 1880 70 -95 60 "brd10" small LC B NSCI -100 60 1
N 90 1880 "brd10" normal RC B
C 100 1920 71 -95 70 "h0030[3:0]" small LC B NSCI -100 70 1
N 90 1920 "h0030[3:0]" normal RC B
C 100 1960 72 -95 80 "h0130[3:0]" small LC B NSCI -100 80 1
N 90 1960 "h0130[3:0]" normal RC B
C 100 2000 73 -95 150 "h1030[3:0]" small LC B NSCI -100 150 1
N 90 2000 "h1030[3:0]" normal RC B
C 100 2080 75 -95 320 "abusrg_cp" small LC B NSCI -100 320 1
N 90 2080 "abusrg_cp" normal RC B
C 100 2120 76 -95 330 "abus[15:0]" small LC B NSCI -100 330 1
N 90 2120 "abus[15:0]" normal RC B
C 100 2160 77 -95 340 "rda" small LC B NSCI -100 340 1
N 90 2160 "rda" normal RC B
C 100 2200 80 -95 310 "abusrg_init" small LC B NSCI -100 310 1
N 90 2200 "abusrg_init" normal RC B
C 1000 880 83 75 270 "path[13:8]" small RC B NSCO 80 270 1
N 990 880 "path[13:8]" normal RC B
```

```
C 1000 920 84 75 290 "sym[21:16]" small RC B NSCO 80 290 1
N 990 920 "sym[21:16]" normal RC B
C 1000 960 85 75 -90 "acc00msb[24:23]" small RC B NSCO 80 -90 1
N 990 960 "acc00msb[24:23]" normal RC B
C 1000 1000 86 75 310 "acc01msb[24:23]" small RC B NSCO 80 310 1
N 990 1000 "acc01msb[24:23]" normal RC B
C 1000 1040 87 75 330 "acc10msb[24:23]" small RC B NSCO 80 330 1
N 990 1040 "acc10msb[24:23]" normal RC B
C 100 2240 88 -95 350 "onez[22:19]" small LC B NSCI -100 350 1
N 90 2240 "onez[22:19]" normal RC B
V 4 *
L 80 327 80 350 1 0
A 80 350 70 360 10.253 1 0
L -90 -120 70 -120 1 0
L -100 -87 -100 327 1 0
L -100 -110 -100 -87 1 0
A -100 -110 -90 -120 10 0 0
L -100 327 -100 350 1 0
A -90 360 -100 350 10 0 0
L 80 -110 80 -87 1 0
A 70 -120 80 -110 10 0 0
L -90 360 70 360 1 0
T -3 -46 "nm60a" normal CT B T
L 80 -87 80 327 1 0
F 40 297 70 345 5 0
F -90 297 -60 345 5 0
T -9 324 "DATAPATH" normal CC B *
L -11 117 -8 108 0 0
L -8 108 -11 101 0 0
L -11 34 -2 62 1 0
L -2 156 -11 183 1 0
B -33 120 -25 180 0 0
B -33 34 -25 98 0 0
L -14 156 -14 161 0 0
L -14 161 -11 153 0 0
L -11 153 -14 142 0 0
L -14 142 -14 149 1 0
L -11 183 -11 117 1 0
L -11 101 -11 34 1 0
L -14 72 -14 79 0 0
L -11 69 -14 60 0 0
L -14 60 -14 65 0 0
L -14 79 -11 69 0 0
L 10 110 10 117 0 0
L 10 117 13 108 0 0
L 13 108 10 98 0 0
L 10 98 10 105 0 0
L -2 62 -2 156 1 0
```

```
B 13 69 21 153 0 0
L -2 110 10 110 1 0
L 10 105 -2 105 1 0
L -14 149 -25 149 1 0
L -25 156 -14 156 1 0
L -14 65 -25 65 1 0
L -24 72 -14 72 1 0
T -5 9 "@Size@" normal CC B A
T -1 -39 "w=@dx@, h=@dy@" normal CC B A
T -15 216 "@@LABEL" normal CC B L
T -5 249 "@@INSTNAME" normal CB B I
E
O "mtbordera" 0 0 1100 800 N
E
```

NM60A PCL

```
#cell2 * nm60a pcl * 12 any 13312 v8r4.6.2
# "22-May-94 GMT" "16:20:28 GMT" "22-May-94 GMT" "16:20:28 GMT" amir * .
# VERSION NUMBER
2
# TEMPLATE
# name date time checkSum
cdp "10-Dec-92 GMT" "21:51:41 GMT" 'H5B6542F
# CLIENT OBJECTS (generator modules, etc.)
# ID cellName cellType capabilities
1 MDP mde  Check Portable-Netlist Layout-Model-Netlist Model-Schematic
VHDL-Portable VHDL-Layout-Model Verilog-Portable Verilog-Layout-Model
2 CDP slc  CIF MCP Layout
3 dpath ese  DA
4 MDP la  icon
5 vdpath vce  Generate-Vectors
6 dphdng obj  VHDL-Model Verilog-Model
.
# PARAMETERS
# name value default type flags clientIDs / range
DP_specification [la]nm60a_dp "" string [s,Spec:LA] 1 2 3
DP_frequency 50 10.0 real [] 1 2 3 4 / 1.0 *
DP_place_method manual detail string [] 1 2 3 4 / detail quick manual
DP_place_order [txt]nm60a_dp_order * string [] 1 2 3 4
DP_vdd_size * * string [] 1 2 3 4
DP_vss_size * * string [] 1 2 3 4
DP_power_refresh * * string [] 1 2 3 4
DP_ctrl_buffers auto auto string [s] 1 2 3 4 / auto none
DP_misc false false boolean [] 1 2 3 4
->

.
+>
DP_portable_clock * * string [] 1 2 3 4
DP_layout_clock * * string [] 1 2 3 4
DP_placement_summary * * string [] 1 2 3 4
DP_statemachine "" "" string [] 1 2 3 4
DP_connectorseeds "" "" string [] 1 2 3 4

.
DP_control_misc false false boolean [] 1 2 3 4
->

.
+>
Use_VLSI_buffers true true boolean [] 1 2 3 4
->
control_buffer_family_number * * string [] 1 2 3 4
control_buffer_drive_number * * string [] 1 2 3 4
```

.
+>
DP_control_buffer_family auto auto string [] 1 2 3 4 / auto 2 3 4
DP_control_buffer_drive auto auto string [] 1 2 3 4 / auto 1 2 3 4
.
DP_control_logic_layout_option auto auto string [s] 1 2 3 4 / auto none
.
DP_third_routing_layer none none string [] 1 2 3 4 / auto none
Sim_Option Netlist Netlist string [] 1 2 3 4 / Netlist
Layout_Option Optimized Portable string [] 1 2 3 4 / Portable Optimized
HDL_Option Behavioral Behavioral string [] 1 2 3 4 / Behavioral Netlist
Compatible_Tag vcc6dp4 vcc6dp4 string [] 1 2 3 4
Output_Test_Format VIF VIF string [] 5 / VIF QSIM SIM
.

NM60A_DP LA

```
#cell2 * nm60a_dp la * 291 any 147456 v8r4.6.2
# "24-Oct-94 GMT" "12:55:56 GMT" "24-Oct-94 GMT" "12:55:56 GMT" amir * .la
dpdff0801 dptsb1021 dpclkuct0 dplat0201 dpmux4041 dptsb1022 dpadd001s dpclktgc0
dptsb1023 dpconright dpclkckt0 dpdff0101 dpbuf0013 dpbsh004h dpconleft dpnor1021
dpxnr1021 dptitle00 dpmux3031 dprpt0010 dpmux1021 dpibt1022 dpinv0011 dpcsa010h
dpswztopi dpswzint0 dpswztopo mtborderb .
V 15 COMPASSlogicAssist
T C
L ""
I 455
B -58 93 1650 1200
M 1073791473 1073763116 1073791473 1073763176
F micej
D "" "" "cdp:vcc4dp2" "0" "0" "0" "0" "0" "0"
C -10 540 5 5 40 "cof" small LC B NSCO 0 40 1
N -20 540 "cof" normal RC B
C -10 490 1 5 70 "din" small LC B NSCI 0 70 1
N -20 490 "din" normal RC B
C 1353 363 2 55 90 "bbus" small RC B NSCO 60 90 1
N 1363 363 "bbus" normal LC B
C 1605 1088 9 55 60 "bbus" small RC B NSCO 60 60 1
N 1615 1088 "bbus" normal LC B
C 1599 736 3 55 50 "bbus" small RC B NSCO 60 50 1
N 1609 736 "bbus" normal LC B
V 4 *
B 0 0 60 110 1 0
T 30 73 "@@InstName" normal CB B I
T 30 55 "@@Label" normal CC B L
T 30 36 "nm60a_dp" normal CT B T
E
O "mtborderb" -50 70 1740 910 P
I acc00msb 450 1 800 350 0 "[la]dpswztopo" "" 0 N * 2 "spec" "24:23" HLMC "buffered"
"false" HLMCI
I x2swiz10 353 1 755 840 0 "[la]dpswzint0" "" 0 * * 1 "spec" "23:0 -" HLMC
I accz10swiz 351 1 815 968 0 "[la]dpswzint0" "" 0 * * 1 "spec" "25l" HLMC
I x2swiz01 429 1 779 498 0 "[la]dpswzint0" "" 0 * * 1 "spec" "23:0 -" HLMC
I mi2n01 428 1 819 498 0 "[la]dpswztopi" "" 0 N * 2 "spec" "lsb" HLMC "buffered"
"false" HLMCI
I csa00 299 1 723 110 0 "[la]dpcsa010h" "" 0 NTC * 0
I mi2n10 358 1 795 840 0 "[la]dpswztopi" "" 0 * * 2 "spec" "lsb" HLMC "buffered"
"false" HLMCI
I hinv10 349 1 765 938 0 "[la]dpinv0011" "" 0 * * 0
I onez 454 1 150 630 0 "[la]dpswztopi" "" 0 NTLC * 2 "spec" "22:19" HLMC "buffered"
"false" HLMCI
I cofrep 173 1 60 550 1 "[la]dprpt0010" "" 0 * * 0
```

```
I yuf01swiz 426 1 1371 684 0 "[la]dpswzint0" "" 0 * * 1 "spec" "H 15L 5-" HLMC
I accz01swiz 421 1 839 624 0 "[la]dpswzint0" "" 0 * * 1 "spec" "25l" HLMC
I yufswiz 344 1 -20 680 0 "[la]dpswzint0" "" 0 * * 1 "spec" "L L 23H" HLMC
I yofswiz 347 1 -20 640 0 "[la]dpswzint0" "" 0 * * 1 "spec" "H H 23L" HLMC
I yof 346 1 32 640 0 "[la]dpibt1022" "" 0 N * 0
I selb 203 1 457 634 0 "[la]dpswztopi" "" 0 N * 2 "spec" "15:0" HLMC "buffered" "false"
HLMCI
I accz01 412 1 879 624 0 "[la]dpmux1021" "" 0 N * 0
I hswiz 174 1 253 510 0 "[la]dpswzint0" "" 0 * * 1 "spec" "23:0 L" HLMC
I cofsel 214 1 170 490 0 "[la]dpmux3031" "" 0 N * 0
I accz00swiz 293 1 603 260 0 "[la]dpswzint0" "" 0 * * 1 "spec" "25l" HLMC
I accz00 292 1 643 260 0 "[la]dpmux1021" "" 0 N * 0
I U1 1 1 -18 124 0 "[la]dptitle00" "" 0 * * 2 "number_of_bits" "25" HLMC "title" "Spec
schematic" HLMCI
I x2swiz00 295 1 523 133 0 "[la]dpswzint0" "" 0 * * 1 "spec" "23:0 -" HLMC
I minus00 290 1 433 223 0 "[la]dpxnr1021" "" 0 N * 0
P 625 190 S
P 675 110 S
P 395 223 S
P 505 233 S
I hinv00 291 1 575 233 0 "[la]dpinv0011" "" 0 * * 0
I mi2n00 300 1 563 133 0 "[la]dpswztopi" "" 0 N * 2 "spec" "lsb" HLMC "buffered"
"false" HLMCI
P 505 133 S
I x2n00 301 1 615 133 0 "[la]dpnor1021" "" 0 * * 0
I cofswiz 184 1 59 540 4 "[la]dpswzint0" "" 0 * * 1 "spec" "23:0" HLMC
I U226 436 1 19 540 0 "[la]dpconleft" "" 0 * * 1 "spec" "23:0" HLMC
I U225 435 1 9 490 0 "[la]dpconleft" "" 0 * * 1 "spec" "23:0" HLMC
I dswiz 205 1 37 490 0 "[la]dpswzint0" "" 0 * * 1 "spec" "L 23:0" HLMC
I cofiswiz 209 1 130 530 0 "[la]dpswzint0" "" 0 * * 1 "spec" "L L 22 L 21 L 20 L 19
16L" HLMC
P 150 580 S
P 130 580 S
P 110 510 S
P 110 640 S
P 110 540 S
N 107 540 "cofb" normal LB B
P 60 540 S
I nbrl25 175 1 437 430 0 "[la]dpbsh004h" "" 0 C * 1 "Number_of_Shifts" "16" HLMC
I bufmsb 169 1 347 430 0 "[la]dpbuf0013" "" 0 * * 0
I hcswiz 215 1 613 450 0 "[la]dpswzint0" "" 0 * * 1 "spec" "24 24:1" HLMC
I hreg 166 1 537 450 0 "[la]dpdff0101" "" 0 * * 0
I msbsswiz 167 1 397 430 0 "[la]dpswzint0" "" 0 * * 1 "spec" "6*24 6*18 6*12 7L"
HLMC
I msbswiz 176 1 307 430 0 "[la]dpswzint0" "" 0 * * 1 "spec" "24 5- 24 5- 24 5- 7-"
HLMC
P 300 430 S
P 575 300 S
```

```
P 575 280 S
P 593 450 S
P 660 450 S
I selbswiz 204 1 457 614 3 "[la]dpswzint0" "" 0 * * 1 "spec" "9L 15:0" HLMC
P 300 510 S
I minus01 420 1 689 580 0 "[la]dpxnr1021" "" 0 N * 0
I hregclk 168 1 557 480 0 "[la]dpclkckt0" "" 0 * * 1 "clock_number" "1" HLMC
I h0 187 1 593 534 0 "[la]dpswztopo" "" 0 N * 2 "spec" "0" HLMC "buffered" "false"
HLMCI
P 760 498 S
P 760 590 S
P 640 580 S
I U19 280 1 1323 363 0 "[la]dpconright" "" 0 * * 1 "spec" "20:5" HLMC
I brd00 279 1 1253 363 0 "[la]dptsb1023" "" 0 N * 0
I accu01ck 416 1 1309 584 0 "[la]dpclktgc0" "" 0 * * 1 "clock_number" "1" HLMC
I accu01 415 1 1289 554 0 "[la]dpdff0101" "" 0 N * 0
I adder00 298 1 893 150 0 "[la]dpadd001s" "" 0 NTC * 0
P 1230 190 S
I yasis00 296 1 1170 190 0 "[la]dptsb1022" "" 0 N * 0
P 1140 190 S
I accu00 297 1 1043 190 0 "[la]dpdff0101" "" 0 N * 0
I accu00clk 276 1 1063 220 0 "[la]dpclktgc0" "" 0 * * 1 "clock_number" "1" HLMC
P 975 190 S
I tmsb00 274 1 1083 426 0 "[la]dpswztopo" "" 0 N * 2 "spec" "24:20" HLMC "buffered"
"false" HLMCI
I trans00swiz 282 1 975 393 0 "[la]dpswzint0" "" 0 * * 1 "spec" "24:5 5-" HLMC
I trans00 281 1 1015 393 0 "[la]dpdff0101" "" 0 N * 0
I trans00clk 275 1 1035 423 0 "[la]dpclktgc0" "" 0 * * 1 "clock_number" "1" HLMC
I csa01 413 1 969 474 0 "[la]dpcsa010h" "" 0 NTC * 0
P 800 300 S
I yof00swiz 284 1 1125 352 0 "[la]dpswzint0" "" 0 * * 1 "spec" "L 15H 5-" HLMC
I ho00swiz 277 1 1123 376 0 "[la]dpswzint0" "" 0 * * 1 "spec" "23:8 5-" HLMC
I y00swiz 285 1 1133 393 0 "[la]dpswzint0" "" 0 * * 1 "spec" "20:5 5-" HLMC
I yuf00swiz 283 1 1125 322 0 "[la]dpswzint0" "" 0 * * 1 "spec" "H 15L 5-" HLMC
I h0030 278 1 1203 333 0 "[la]dpmux4041" "" 0 N * 0
P 1140 300 S
P 1173 353 S
P 1173 352 S
P 1193 322 S
P 1193 333 S
P 1083 393 S
P 1065 376 S
P 1163 373 S
P 810 644 S
P 919 474 S
P 909 554 S
I x2n01 418 1 859 498 0 "[la]dpnor1021" "" 0 * * 0
I hinv01 419 1 859 590 0 "[la]dpinv0011" "" 0 * * 0
```

I adder01 414 1 1139 514 0 "[la]dpadd001s" "" 0 NTC * 0
P 1219 554 S
P 1585 554 S
I yasis01 417 1 1489 554 0 "[la]dptsb1022" "" 0 N * 0
P 1471 554 S
I ureg 444 1 246 970 0 "[la]dplat0201" "" 0 * * 1 "initial_value" "'h06f4" HLMCI
I uregck 180 1 272 1000 0 "[la]dpclkuct0" "" 0 * * 0
I tst 213 1 310 1047 0 "[la]dpswztopo" "" 0 N * 2 "spec" "23:20" HLMC "buffered"
"false" HLMCI
I sym 439 1 141 985 0 "[la]dpswztopo" "" 0 N * 2 "spec" "21:16" HLMC "buffered"
"false" HLMCI
I abus 448 1 -20 950 0 "[la]dpswztopi" "" 0 N * 2 "spec" "15:0" HLMC "buffered" "false"
HLMCI
P -10 740 S
P 110 740 S
P 110 680 S
I rda 438 1 50 740 0 "[la]dptsb1021" "" 0 N * 0
I yuf 345 1 29 680 0 "[la]dpibt1022" "" 0 N * 0
P -20 910 S
I abusswiz 430 1 31 910 0 "[la]dpswzint0" "" 0 * * 1 "spec" "L 15:0 8-" HLMC
I path 447 1 160 940 0 "[la]dpswztopo" "" 0 N * 2 "spec" "13:8" HLMC "buffered"
"false" HLMCI
P 142 917 S
P 142 910 S
P 160 910 S
P 220 970 S
P 220 910 S
I awrck 441 1 91 940 0 "[la]dpclkuct0" "" 0 * * 0
I abusrg 442 1 71 910 0 "[la]dpdff0801" "" 0 N * 1 "initial_value" "'b0" HLMCI
I abusrgswiz 443 1 360 910 0 "[la]dpswzint0" "" 0 * * 1 "spec" "24:8 8L" HLMC
I shiftiswiz 160 1 342 937 0 "[la]dpswzint0" "" 0 * * 1 "spec" "19:16" HLMC
I shift2swiz 159 1 352 970 0 "[la]dpswzint0" "" 0 * * 1 "spec" "15:12" HLMC
I sel 212 1 422 937 0 "[la]dpmux3031" "" 0 N * 0
I shift1swiz 446 1 350 1000 0 "[la]dpswzint0" "" 0 * * 1 "spec" "11:8" HLMC
P 310 937 S
P 392 957 S
P 472 957 S
P 440 910 S
N 450 910 "abusrgb" normal LB B
P 310 970 S
P 422 1000 S
P 310 1000 S
P 745 1010 S
P 735 938 S
I minus10 348 1 665 928 0 "[la]dpxnr1021" "" 0 N * 0
P 615 928 S
P 745 988 S
P 735 840 S I selu 193 1 472 1054 0 "[la]dpswztopo" "" 0 N * 2 "spec" "3:0" HLMC "buffered" "false" HLMCI
I tmsb10 332 1 1340 1150 0 "[la]dpswztopo" "" 0 N * 2 "spec" "24:20" HLMC "buffered" "false" HLMCI
I trans01swiz 422 1 1219 766 0 "[la]dpswzint0" "" 0 * * 1 "spec" "24:5 5-" HLMC
I tmsb01 423 1 1329 798 0 "[la]dpswztopo" "" 0 N * 2 "spec" "24:20" HLMC "buffered" "false" HLMCI
I trans10swiz 340 1 1225 1118 0 "[la]dpswzint0" "" 0 * * 1 "spec" "24:5 5-" HLMC
P 1329 766 S
I trans01 410 1 1259 766 0 "[la]dpdff0101" "" 0 N * 0
I trans01clk 411 1 1279 796 0 "[la]dpclktgc0" "" 0 * * 1 "clock_number" "1" HLMC
I trans10 339 1 1265 1118 0 "[la]dpdff0101" "" 0 N * 0
I trans10clk 333 1 1285 1148 0 "[la]dpclktgc0" "" 0 * * 1 "clock_number" "1" HLMC
I accu10ck 334 1 1315 928 0 "[la]dpclktgc0" "" 0 * * 1 "clock_number" "1" HLMC
I accu10 355 1 1295 898 0 "[la]dpdff0101" "" 0 N * 0
I acc10msb 452 1 1030 1050 0 "[la]dpswztopo" "" 0 N * 2 "spec" "24:23" HLMC "buffered" "false" HLMCI
I yuf10swiz 341 1 1381 1028 0 "[la]dpswzint0" "" 0 * * 1 "spec" "H 15L 5-" HLMC
I yof10swiz 342 1 1371 1058 0 "[la]dpswzint0" "" 0 * * 1 "spec" "L 15H 5-" HLMC
I acc01msb 451 1 1010 700 0 "[la]dpswztopo" "" 0 N * 2 "spec" "24:23" HLMC "buffered" "false" HLMCI
I csa10 357 1 975 818 0 "[la]dpcsa010h" "" 0 NTC * 0
I x2n10 359 1 825 840 0 "[la]dpnor1021" "" 0 * * 0
I adder10 356 1 1145 858 0 "[la]dpadd001s" "" 0 NTC * 0
P 1010 670 S
P 885 818 S
P 810 670 S
P 1309 738 S
P 1030 1010 S
I accz10 350 1 855 968 0 "[la]dpmux1021" "" 0 N * 0
P 815 898 S
P 1225 898 S
I U219 409 1 1569 736 0 "[la]dpconright" "" 0 * * 1 "spec" "20:5" HLMC
I brd01 408 1 1499 736 0 "[la]dptsb1023" "" 0 N * 0
I yof01swiz 425 1 1371 704 0 "[la]dpswzint0" "" 0 * * 1 "spec" "L 15H 5-" HLMC
I h0130 407 1 1449 706 0 "[la]dpmux4041" "" 0 N * 0
I y01swiz 424 1 1379 766 0 "[la]dpswzint0" "" 0 * * 1 "spec" "20:5 5-" HLMC
I ho01swiz 427 1 1369 738 0 "[la]dpswzint0" "" 0 * * 1 "spec" "23:8 5-" HLMC
P 1439 684 S
P 1419 704 S
P 1419 726 S
P 1439 706 S
P 1471 670 S
P 1409 746 S
P 1475 1010 S
P 1445 1028 S
P 1475 898 S
I yasis10 354 1 1495 898 0 "[la]dptsb1022" "" 0 N * 0

P 1591 898 S
P 1315 1088 S
I brd10 337 1 1505 1088 0 "[la]dptsb1023" "" 0 N * 0
I U148 338 1 1575 1088 0 "[la]dpconright" "" 0 * * 1 "spec" "20:5" HLMC
I ho10swiz 335 1 1381 1088 0 "[la]dpswzint0" "" 0 * * 1 "spec" "23:8 5-" HLMC
I h1030 336 1 1455 1058 0 "[la]dpmux4041" "" 0 N * 0
I y10swiz 343 1 1385 1118 0 "[la]dpswzint0" "" 0 * * 1 "spec" "20:5 5-" HLMC
P 1340 1118 S
P 1425 1058 S
P 1425 1078 S
P 1421 1098 S
P 1445 1058 S
J 26 accz00 2 "i1" 25 accz00swiz 2 "o"
J 28 x2swiz00 2 "o" 35 mi2n00 1 "o"
J 24 cofsel 4 "i0" 42 cofiswiz 2 "o"
J 38 cofswiz 2 "o" 39 U226 1 "i"
J 49 nbrl25 1 "B" 53 msbsswiz 2 "o"
J 50 bufmsb 1 "i" 54 msbswiz 2 "o"
J 53 msbsswiz 1 "i" 50 bufmsb 2 "z"
J 52 hreg 3 "clockspec" 63 hregclk 1 "clockspec"
J 76 accu00 3 "clockspec" 77 accu00clk 1 "clockspec"
J 82 trans00clk 1 "clockspec" 81 trans00 3 "clockspec"
J 81 trans00 1 "d" 80 trans00swiz 2 "o"
J 10 mi2n01 1 "o" 9 x2swiz01 2 "o"
J 22 accz01 2 "i1" 17 accz01swiz 2 "o"
J 71 accu01 3 "clockspec" 70 accu01ck 1 "clockspec"
J 126 awrck 1 "clockspec" 127 abusrg 1 "clockspec"
J 127 abusrg 2 "d" 119 abusswiz 2 "o"
J 108 ureg 3 "clockspec" 109 uregck 1 "clockspec"
J 7 x2swiz10 2 "o" 12 mi2n10 1 "o"
J 152 trans01 1 "d" 148 trans01swiz 2 "o"
J 152 trans01 3 "clockspec" 153 trans01clk 1 "clockspec"
J 170 accz10 2 "i1" 8 accz10swiz 2 "o"
J 156 accu10ck 1 "clockspec" 157 accu10 3 "clockspec"
J 154 trans10 1 "d" 150 trans10swiz 2 "o"
J 155 trans10clk 1 "clockspec" 154 trans10 3 "clockspec"
F 26 accz00 2 "i1" S
N 635 262 "acc00l" small LB BV
F 49 nbrl25 1 "B" S
N 442 430 "bitsmsb" small LB BV
F 50 bufmsb 1 "i" S
N 349 433 "bitmsb" small LB BV
F 53 msbsswiz 1 "i" S
N 397 434 "bitmsbd" small LB BV
F 81 trans00 1 "d" S
N 1015 396 "transin00" small LB BV
F 22 accz01 2 "i1" S
N 877 626 "acc01l" small LB BV

```
F 152 trans01 1 "d" S
N 1259 772 "transin01" small LB BV
F 170 accz10 2 "i1" S
N 858 974 "acc10l" small LB BV
F 154 trans10 1 "d" S
N 1268 1123 "transin10" small LB BV
S 56 84 1 SH
S 140 169 1 SH
S 66 102 hinv01 3 "i" 1 SH
N 809 593 "hin01" normal LB B
S 144 170 accz10 3 "i0" 1 SH
S 7 x2swiz10 2 "o" 163 x2n10 1 "a1" 1 SH
N 818 843 "hin210" small LB B
S 46 115 1 SV
S 104 148 trans01swiz 1 "i" 1 SV
S 107 183 1 SV
S 98 167 1 SV
S 32 29 minus00 3 "a1" 1 SH
N 403 226 "hc" normal LB B
S 29 minus00 2 "zn" 33 1 SH
S 33 34 hinv00 3 "i" 1 SH
N 540 236 "hin00" normal LB B
S 30 34 hinv00 2 "zn" 1 SV
S 31 37 x2n00 4 "zn" 1 SV
S 28 x2swiz00 2 "o" 37 x2n00 1 "a1" 1 SH
N 567 136 "hin200" small LB B
S 36 28 x2swiz00 1 "i" 1 SH
S 36 33 1 SV
S 31 11 csa00 3 "A3" 1 SH
N 688 113 "a200" normal LB B
S 30 11 csa00 2 "A2" 1 SH
N 642 193 "hi00" normal LB B
S 2 40 U225 1 "i" 1 SH
S 1 38 cofswiz 2 "o" 1 SH
S 43 14 onez 1 "o" 1 SV
S 44 43 1 SH
S 42 cofiswiz 1 "i" 44 1 SV
S 45 47 1 SV
S 48 47 1 SH
S 47 46 1 SV
S 45 24 cofsel 3 "i1" 1 SH
S 41 dswiz 2 "o" 24 cofsel 2 "i2" 1 SH
S 40 U225 1 "i" 41 dswiz 1 "i" 1 SH
S 20 yof 3 "ZN" 46 1 SH
S 19 yofswiz 2 "o" 20 yof 2 "I" 1 SH
N 26 643 "oob" small LB B
S 48 15 cofrep 1 "i" 1 SV
S 38 cofswiz 1 "i" 48 1 SH
```

S 24 cofsel 1 "z" 23 hswiz 1 "i" 1 SH
N 231 515 "cofi" normal LB BV
S 49 nbrl25 3 "Z" 52 hreg 1 "d" 1 SH
N 532 453 "hx" normal LB B
S 58 64 h0 1 "o" 1 SV
S 55 61 1 SV
S 55 54 msbswiz 1 "i" 1 SH
S 57 56 1 SV
S 58 51 hcswiz 1 "i" 1 SH
N 608 453 "h" normal LB B
S 51 hcswiz 2 "o" 59 1 SH
N 656 453 "hc" normal LB B
S 52 hreg 2 "q" 58 1 SH
S 26 accz00 1 "z" 11 csa00 1 "A1" 1 SH
N 704 273 "acci00" normal LB B
S 57 26 accz00 3 "i0" 1 SH
S 23 hswiz 2 "o" 61 1 SH
S 60 selbswiz 1 "i" 21 selb 1 "o" 1 SV
N 454 624 "selbb" small LB BV
S 49 nbrl25 4 "SEL" 60 selbswiz 2 "o" 1 SV
N 454 571 "selz" normal LB BV
S 61 49 nbrl25 2 "A" 1 SH
N 368 513 "dcofin" small LB BV
S 65 9 x2swiz01 1 "i" 1 SH
S 67 62 minus01 3 "a1" 1 SH
N 649 583 "hc" normal LB B
S 62 minus01 2 "zn" 66 1 SH
S 65 66 1 SV
S 68 U19 1 "i" 3 1 SH
S 75 90 1 SV
S 78 80 trans00swiz 1 "i" 1 SV
S 74 yasis00 2 "z" 73 1 SH
N 1225 193 "cofb" normal LB B
S 76 accu00 2 "q" 75 1 SH
N 1116 193 "acc00" normal LB B
S 78 76 accu00 1 "d" 1 SH
N 1016 193 "add00" normal LB B
S 72 adder00 3 "SO" 78 1 SH
S 11 csa00 7 "S1" 72 adder00 1 "A" 1 SH
N 869 233 "add100" small LB B
S 11 csa00 4 "S2" 72 adder00 2 "B" 1 SH
N 871 153 "add200" small LB B
S 75 74 yasis00 1 "i" 1 SH
S 84 90 1 SH
S 84 6 acc00msb 1 "o" 1 SV
S 91 89 h0030 3 "i2" 1 SH
N 1188 356 "ob00" small LB B
S 94 89 h0030 2 "i3" 1 SH S 87 y00swiz 2 "o" 89 h0030 5 "i0" 1 SH
N 1192 396 "yb00" small LB B
S 97 89 h0030 4 "i1" 1 SH
N 1196 376 "hb00" small LB B
S 88 yuf00swiz 2 "o" 93 1 SH
S 93 94 1 SV
N 1190 327 "ub00" small LB BV
S 92 91 1 SV
S 85 yof00swiz 2 "o" 92 1 SH
S 97 86 ho00swiz 2 "o" 1 SV
S 95 79 tmsb00 1 "o" 1 SV
S 96 86 ho00swiz 1 "i" 1 SH
S 81 trans00 2 "q" 95 1 SH
S 96 81 trans00 2 "q" 1 SV
S 95 87 y00swiz 1 "i" 1 SH
N 1098 396 "transb00" small LB B
S 69 brd00 2 "z" 68 U19 1 "i" 1 SH
S 89 h0030 1 "z" 69 brd00 1 "i" 1 SH
N 1248 366 "bdat00" small LB BV
S 98 22 accz01 3 "i0" 1 SH
S 22 accz01 1 "z" 83 csa01 1 "A1" 1 SH
N 959 637 "acci01" normal LB B
S 99 83 csa01 3 "A3" 1 SH
N 928 477 "a201" normal LB B
S 99 101 x2n01 4 "zn" 1 SV
S 100 83 csa01 2 "A2" 1 SH
N 939 557 "hi01" normal LB B
S 100 102 hinv01 2 "zn" 1 SV
S 10 mi2n01 1 "o" 101 x2n01 1 "a1" 1 SH
N 839 501 "hin201" small LB B
S 83 csa01 7 "S1" 103 adder01 1 "A" 1 SH
N 1114 597 "add101" small LB B
S 83 csa01 4 "S2" 103 adder01 2 "B" 1 SH
N 1104 517 "add201" small LB B
S 103 adder01 3 "SO" 104 1 SH
S 104 71 accu01 1 "d" 1 SH
N 1243 557 "add01" normal LB B
S 71 accu01 2 "q" 107 1 SH
N 1389 557 "acc01" normal LB B
S 107 106 yasis01 1 "i" 1 SH
S 106 yasis01 2 "z" 105 1 SH
N 1584 557 "cofb" normal LB B
S 125 128 abusrgswiz 1 "i" 1 SH
S 139 110 tst 1 "o" 1 SV
S 135 146 selu 1 "o" 1 SV
N 469 1040 "selub" small LB BV
S 118 119 abusswiz 1 "i" 1 SH
S 113 116 rda 1 "i" 1 SH

```
N -9 743 "abusrgb" normal LB B
S 117 yuf 3 "ZN" 115 1 SH
S 116 rda 2 "z" 114 1 SH
S 115 114 1 SV
S 18 yufswiz 2 "o" 117 yuf 2 "I" 1 SH
N 24 683 "uub" small LB B
S 118 112 abus 1 "o" 1 SV
S 124 108 ureg 1 "d" 1 SH
S 125 124 1 SV
S 123 120 path 1 "o" 1 SV
S 111 sym 1 "o" 121 1 S
S 122 121 1 SV
S 127 abusrg 4 "q" 122 1 SH
S 123 125 1 SH
N 173 913 "amodbus" normal LB B
S 122 123 1 SH
S 108 ureg 2 "q" 137 1 SH
S 131 sel 4 "i0" 138 1 SV
S 133 137 1 SV
S 134 130 shift2swiz 2 "o" 1 SV
S 131 sel 1 "z" 135 1 SH
S 134 131 sel 3 "i1" 1 SH
N 403 960 "s2" small LB B
S 132 shift1swiz 2 "o" 138 1 SH
N 403 1003 "s1" small LB B
S 129 shiftiswiz 2 "o" 131 sel 2 "i2" 1 SH
N 409 940 "st" small LB B
S 137 139 1 SV
S 139 132 shift1swiz 1 "i" 1 SH
S 137 130 shift2swiz 1 "i" 1 SH
S 128 abusrgswiz 2 "o" 136 1 SH
S 133 129 shiftiswiz 1 "i" 1 SH
S 144 140 1 SV
S 143 142 minus10 3 "a1" 1 SH
N 655 931 "hc" normal LB B
S 142 minus10 2 "zn" 141 1 SH
S 145 7 x2swiz10 1 "i" 1 SH
S 145 141 1 SV
S 141 13 hinv10 3 "i" 1 SH
N 745 941 "hin10" normal LB B
S 154 trans10 2 "q" 196 1 SH
S 165 183 1 SH
S 169 185 1 SH
S 152 trans01 2 "q" 151 1 SH
S 151 149 tmsb01 1 "o" 1 SV
S 168 178 ho01swiz 1 "i" 1 SH
S 190 193 ho10swiz 1 "i" 1 SH
S 151 177 y01swiz 1 "i" 1 SH
```

N 1344 769 "transb01" small LB B
S 169 158 acc10msb 1 "o" 1 SV
S 172 150 trans10swiz 1 "i" 1 SV
S 186 200 1 SV
N 1442 1043 "ub10" small LB BV
S 166 163 x2n10 4 "zn" 1 SV
S 165 161 acc01msb 1 "o" 1 SV
S 167 165 1 SH
S 166 162 csa10 3 "A3" 1 SH
N 912 821 "a210" normal LB B
S 168 152 trans01 2 "q" 1 SV
S 170 accz10 1 "z" 162 csa10 1 "A1" 1 SH
N 960 981 "acci10" normal LB B
S 171 13 hinv10 2 "zn" 1 SV
S 171 162 csa10 2 "A2" 1 SH
N 911 901 "hi10" normal LB B
S 164 adder10 3 "SO" 172 1 SH
S 172 157 accu10 1 "d" 1 SH
N 1231 901 "add10" normal LB B
S 162 csa10 4 "S2" 164 adder10 2 "B" 1 SH
N 1115 861 "add210" small LB B
S 162 csa10 7 "S1" 164 adder10 1 "A" 1 SH
N 1117 941 "add110" small LB B
S 173 U219 1 "i" 5 1 SH
S 16 yuf01swiz 2 "o" 179 1 SH
S 179 182 1 SV
N 1436 705 "ub01" small LB BV
S 177 y01swiz 2 "o" 176 h0130 5 "i0" 1 SH
N 1427 769 "yb01" small LB B
S 184 176 h0130 4 "i1" 1 SH
N 1428 749 "hb01" small LB B
S 174 brd01 2 "z" 173 U219 1 "i" 1 SH
S 178 ho01swiz 2 "o" 184 1 SV
S 180 181 1 SV
S 182 176 h0130 2 "i3" 1 SH
S 181 176 h0130 3 "i2" 1 SH
N 1421 729 "ob01" small LB B
S 175 yof01swiz 2 "o" 180 1 SH
S 176 h0130 1 "z" 174 brd01 1 "i" 1 SH
N 1494 739 "bdat01" small LB BV
S 187 185 1 SV
S 188 yasis10 2 "z" 189 1 SH
N 1568 901 "cofb" normal LB B
S 187 188 yasis10 1 "i" 1 SH
S 157 accu10 2 "q" 187 1 SH
N 1408 901 "acc10" normal LB B
S 159 yuf10swiz 2 "o" 186 1 SH
S 190 154 trans10 2 "q" 1 SV

```
S 192 U148 1 "i" 4 1 SH
S 196 147 tmsb10 1 "o" 1 SV
S 196 195 y10swiz 1 "i" 1 SH
N 1350 1121 "transb10" small LB B
S 160 yof10swiz 2 "o" 197 1 SH
S 197 198 1 SV
S 198 194 h1030 3 "i2" 1 SH
N 1440 1081 "ob10" small LB B
S 193 ho10swiz 2 "o" 199 1 SV
S 199 194 h1030 4 "i1" 1 SH
N 1434 1101 "hb10" small LB B
S 195 y10swiz 2 "o" 194 h1030 5 "i0" 1 SH
N 1435 1121 "yb10" small LB B
S 200 194 h1030 2 "i3" 1 SH
N 1449 1061 "ub10" normal LB B
S 191 brd10 2 "z" 192 U148 1 "i" 1 SH
S 194 h1030 1 "z" 191 brd10 1 "i" 1 SH
N 1497 1091 "bdat10" small LB BV
E
```

NM60A_DP NLS

```
#cell2 * nm60a_dp nls * 2 any 0 v8r4.6.2
# "19-Sep-94 GMT" "8:44:29 GMT" "19-Sep-94 GMT" "8:44:29 GMT" amir * .
writer        1
file_version  1
sections      1
netlist   1:        83 nm60a_dp


B contents:  nm60a_dp
netlist        250
cells         6499
switches         0
attributes    6956
physical         0
history          0
E contents


B netlist
X 1 cof o;
X 2 din i;
X 3 bbus o;
X 3 bbus o;
X 3 bbus o;
G 4 VDD;
G 5 VSS;
G 6 BULK;
N 7 cofb;
N 10 oob;
N 12 cofi;
N 14 hi00;
N 15 a200;
N 17 acc00l;
N 18 hin200;
N 19 hin00;
N 20 hc;
N 21 bitsmsb;
N 22 hx;
N 23 bitmsb;
N 24 bitmsbd;
N 25 dcofin;
N 26 selbb;
N 27 selz;
N 28 acci00;
```

N 29 acc00;
N 30 h;
N 31 hin01;
N 33 abusrgb;
N 36 uub;
N 37 amodbus;
N 41 st;
N 43 s2;
N 44 selub;
N 45 s1;
N 46 hin210;
N 47 hin10;
N 48 acc10;
N 49 add200;
N 50 add100;
N 51 add00;
N 54 transin00;
N 55 hi01;
N 56 a201;
N 57 hin201;
N 58 acc01;
N 59 acc01l;
N 60 acci01;
N 63 ub00;
N 65 ob00;
N 66 transb00;
N 67 yb00;
N 68 hb00;
N 69 bdat00;
N 70 add01;
N 71 add201;
N 72 add101;
N 74 transb01;
N 75 a210;
N 77 hi10;
N 78 acci10;
N 79 acc10l;
N 80 transin01;
N 82 add10;
N 84 add110;
N 85 add210;
N 86 transb10;
N 87 transin10;
N 89 ub01;
N 91 bdat01;
N 92 ob01;
N 94 yb01;
N 95 hb01;

```
N 97 ub10;
N 98 hb10;
N 99 ob10;
N 100 yb10;
N 101 bdat10;
M NLS dpswztopo * ¦ o ¦ i;
M NLS dpswzint0 * ¦ o i ¦ oi;
M NLS dpswztopi * ¦ o ¦ o;
M NLS dpcsa010h * ¦ A3 A2 S1 S2 A1 ¦ iiooi;
M NLS dpinv0011 * ¦ zn i ¦ oi;
M NLS dpibt1022 * ¦ I ZN ¦ io;
M NLS dpmux1021 * ¦ i1 i0 z ¦ iio;
M NLS dprpt0010 * ¦ i ¦ b;
M NLS dpmux3031 * ¦ z i0 i1 i2 ¦ oiii;
M NLS dptitle00 * ¦ ¦ ;
M NLS dpconleft * ¦ i ¦ u;
M NLS dpxnr1021 * ¦ a1 zn ¦ io;
M NLS dpnor1021 * ¦ a1 zn ¦ io;
M NLS dpbsh004h * ¦ A B Z SEL ¦ iioi;
M NLS dpbuf0013 * ¦ i z ¦ io;
M NLS dpdff0101 * ¦ clockspec d q ¦ iio;
M NLS dpclkckt0 * ¦ clockspec ¦ o;
M NLS dplat0201 * ¦ clockspec d q ¦ iio;
M NLS dpclkuct0 * ¦ clockspec ¦ o;
M NLS dptsb1021 * ¦ i z ¦ io;
M NLS dpdff0801 * ¦ clockspec d q ¦ iio;
M NLS dpconright * ¦ i ¦ u;
M NLS dptsb1023 * ¦ i z ¦ io;
M NLS dpclktgc0 * ¦ clockspec ¦ o;
M NLS dpadd001s * ¦ A B SO ¦ iio;
M NLS dptsb1022 * ¦ i z ¦ io;
M NLS dpmux4041 * ¦ z i0 i1 i2 i3 ¦ oiiii;
I NLS dpswztopo * * 1 acc00msb ¦ 29;
I NLS dpswzint0 * * 2 x2swiz10 ¦ 46 47;
I NLS dpswzint0 * * 3 accz10swiz ¦ 79 76;
I NLS dpswzint0 * * 4 x2swiz01 ¦ 57 31;
I NLS dpswztopi * * 5 mi2n01 ¦ 57;
I NLS dpcsa010h * * 6 csa00 ¦ 15 14 50 49 28;
I NLS dpswztopi * * 7 mi2n10 ¦ 46;
I NLS dpinv0011 * * 8 hinv10 ¦ 77 47;
I NLS dpswzint0 * * 9 yufswiz ¦ 36 34;
I NLS dpswzint0 * * 10 yofswiz ¦ 10 11;
I NLS dpibt1022 * * 11 yof ¦ 10 7;
I NLS dpswztopi * * 12 selb ¦ 26;
I NLS dpmux1021 * * 13 accz01 ¦ 59 58 60;
I NLS dpswzint0 * * 14 accz01swiz ¦ 59 61;
I NLS dpswzint0 * * 15 yuf01swiz ¦ 89 90;
I NLS dprpt0010 * * 16 cofrep ¦ 7;
```

I NLS dpswzint0 * * 17 hswiz ¦ 25 12;
I NLS dpmux3031 * * 18 cofsel ¦ 12 13 7 8;
I NLS dpswzint0 * * 19 accz00swiz ¦ 17 16;
I NLS dpmux1021 * * 20 accz00 ¦ 17 29 28;
I NLS dptitle00 * * 21 U1 ¦;
I NLS dpswzint0 * * 22 cofswiz ¦ 1 7;
I NLS dpconleft * * 23 U226 ¦ 1;
I NLS dpconleft * * 24 U225 ¦ 2;
I NLS dpswzint0 * * 25 dswiz ¦ 8 2;
I NLS dpswzint0 * * 26 cofiswiz ¦ 13 9;
I NLS dpswzint0 * * 27 x2swiz00 ¦ 18 19;
I NLS dpxnr1021 * * 28 minus00 ¦ 20 19;
I NLS dpinv0011 * * 29 hinv00 ¦ 14 19;
I NLS dpswztopi * * 30 mi2n00 ¦ 18;
I NLS dpnor1021 * * 31 x2n00 ¦ 18 15;
I NLS dpbsh004h * * 32 nbrl25 ¦ 25 21 22 27;
I NLS dpbuf0013 * * 33 bufmsb ¦ 23 24;
I NLS dpswzint0 * * 34 hcswiz ¦ 20 30;
I NLS dpdff0101 * * 35 hreg ¦ 32 22 30;
I NLS dpswzint0 * * 36 msbsswiz ¦ 21 24;
I NLS dpswzint0 * * 37 msbswiz ¦ 23 25;
I NLS dpswzint0 * * 38 selbswiz ¦ 27 26;
I NLS dpxnr1021 * * 39 minus01 ¦ 20 31;
I NLS dpclkckt0 * * 40 hregclk ¦ 32;
I NLS dpswztopo * * 41 h0 ¦ 30;
I NLS dplat0201 * * 42 ureg ¦ 42 37 40;
I NLS dpclkuct0 * * 43 uregck ¦ 42;
I NLS dpswztopo * * 44 tst ¦ 40;
I NLS dpswztopo * * 45 sym ¦ 37;
I NLS dpswztopi * * 46 abus ¦ 35;
I NLS dpibt1022 * * 47 yuf ¦ 36 7;
I NLS dptsb1021 * * 48 rda ¦ 33 7;
I NLS dpdff0801 * * 49 abusrg ¦ 39 38 37;
I NLS dpclkuct0 * * 50 awrck ¦ 39;
I NLS dpswztopo * * 51 path ¦ 37;
I NLS dpswzint0 * * 52 abusswiz ¦ 38 35;
I NLS dpswzint0 * * 53 abusrgswiz ¦ 33 37;
I NLS dpswzint0 * * 54 shiftiswiz ¦ 41 40;
I NLS dpswzint0 * * 55 shift2swiz ¦ 43 40;
I NLS dpmux3031 * * 56 sel ¦ 44 45 43 41;
I NLS dpswzint0 * * 57 shift1swiz ¦ 45 40;
I NLS dpxnr1021 * * 58 minus10 ¦ 20 47;
I NLS dpswztopo * * 59 selu ¦ 44;
I NLS dpconright * * 60 U19 ¦ 3;
I NLS dptsb1023 * * 61 brd00 ¦ 69 3;
I NLS dpclktgc0 * * 62 accu01ck ¦ 73;
I NLS dpdff0101 * * 63 accu01 ¦ 73 70 58;
I NLS dpadd001s * * 64 adder00 ¦ 50 49 51;

```
I NLS dptsb1022 * * 65 yasis00 ¦ 29 7;
I NLS dpdff0101 * * 66 accu00 ¦ 52 51 29;
I NLS dpclktgc0 * * 67 accu00clk ¦ 52;
I NLS dpdff0101 * * 68 trans00 ¦ 53 54 66;
I NLS dpswzint0 * * 69 trans00swiz ¦ 54 51;
I NLS dpswztopo * * 70 tmsb00 ¦ 66;
I NLS dpclktgc0 * * 71 trans00clk ¦ 53;
I NLS dpcsa010h * * 72 csa01 ¦ 56 55 72 71 60;
I NLS dpinv0011 * * 73 hinv01 ¦ 55 31;
I NLS dpnor1021 * * 74 x2n01 ¦ 57 56;
I NLS dpswzint0 * * 75 yuf00swiz ¦ 63 62;
I NLS dpswzint0 * * 76 y00swiz ¦ 67 66;
I NLS dpswzint0 * * 77 ho00swiz ¦ 68 66;
I NLS dpswzint0 * * 78 yof00swiz ¦ 65 64;
I NLS dpmux4041 * * 79 h0030 ¦ 69 67 68 65 63;
I NLS dpadd001s * * 80 adder01 ¦ 72 71 70;
I NLS dptsb1022 * * 81 yasis01 ¦ 58 7;
I NLS dpswztopo * * 82 tmsb10 ¦ 86;
I NLS dpswzint0 * * 83 trans01swiz ¦ 80 70;
I NLS dpswztopo * * 84 tmsb01 ¦ 74;
I NLS dpswzint0 * * 85 trans10swiz ¦ 87 82;
I NLS dpdff0101 * * 86 trans01 ¦ 81 80 74;
I NLS dpclktgc0 * * 87 trans01clk ¦ 81;
I NLS dpdff0101 * * 88 trans10 ¦ 88 87 86;
I NLS dpclktgc0 * * 89 trans10clk ¦ 88;
I NLS dpclktgc0 * * 90 accu10ck ¦ 83;
I NLS dpdff0101 * * 91 accu10 ¦ 83 82 48;
I NLS dpswztopo * * 92 acc10msb ¦ 48;
I NLS dpswzint0 * * 93 yuf10swiz ¦ 97 96;
I NLS dpswzint0 * * 94 yof10swiz ¦ 99 102;
I NLS dpswztopo * * 95 acc01msb ¦ 58;
I NLS dpcsa010h * * 96 csa10 ¦ 75 77 84 85 78;
I NLS dpnor1021 * * 97 x2n10 ¦ 46 75;
I NLS dpadd001s * * 98 adder10 ¦ 84 85 82;
I NLS dpmux1021 * * 99 accz10 ¦ 79 48 78;
I NLS dpconright * * 100 U219 ¦ 3;
I NLS dptsb1023 * * 101 brd01 ¦ 91 3;
I NLS dpswzint0 * * 102 yof01swiz ¦ 92 93;
I NLS dpmux4041 * * 103 h0130 ¦ 91 94 95 92 89;
I NLS dpswzint0 * * 104 y01swiz ¦ 94 74;
I NLS dpswzint0 * * 105 ho01swiz ¦ 95 74;
I NLS dptsb1022 * * 106 yasis10 ¦ 48 7;
I NLS dpswzint0 * * 107 y10swiz ¦ 100 86;
I NLS dpmux4041 * * 108 h1030 ¦ 101 100 98 99 97;
I NLS dpswzint0 * * 109 ho10swiz ¦ 98 86;
I NLS dpconright * * 110 U148 ¦ 3;
I NLS dptsb1023 * * 111 brd10 ¦ 101 3;
E netlist
```

B subcells
NLS dpswztopo *
NLS dpswzint0 *
NLS dpswztopi *
NLS dpcsa010h *
NLS dpinv0011 *
NLS dpibt1022 *
NLS dpmux1021 *
NLS dprpt0010 *
NLS dpmux3031 *
NLS dptitle00 *
NLS dpconleft *
NLS dpxnr1021 *
NLS dpnor1021 *
NLS dpbsh004h *
NLS dpbuf0013 *
NLS dpdff0101 *
NLS dpclkckt0 *
NLS dplat0201 *
NLS dpclkuct0 *
NLS dptsb1021 *
NLS dpdff0801 *
NLS dpconright *
NLS dptsb1023 *
NLS dpclktgc0 *
NLS dpadd001s *
NLS dptsb1022 *
NLS dpmux4041 *
E subcells B attribute_list
  7147 spec
  7824 buffered
  7901 number_of_bits
  7938 title
  7979 Number_of_Shifts
  8018 clock_number
  8070 initial_value
E attribute_list B A: spec
1010 24:23;
 1 92 95;
1010 23:0 -;
 2 4 27;
1010 25l;

```
3 14 19;
1010 lsb;
5 7 30;
1010 L L 23H;
9;
1010 H H 23L;
10;
1010 15:0;
12 46;
1010 H 15L 5-;
15 75 93;
1010 23:0 L;
17;
1010 23:0;
22 23 24;
1010 L 23:0;
25;
1010 L L H 22L;
26;
1010 24 24:1;
34;
1010 6*24 6*18 6*12 7L;
36;
1010 24 5- 24 5- 24 5- 7-;
37;
1010 9L 15:0;
38;
1010 0;
41;
1010 23:22;
44;
1010 21:16;
45;
1010 13:8;
51;
1010 L 15:0 8-;
52;
1010 24:8 8L;
53;
1010 19:16;
54;
1010 15:12;
55;
1010 11:8;
57;
1010 3:0;
59;
1010 20:5;
```

```
 60 100 110;
1010 24:5 5-;
 69 83 85;
1010 24:20;
 70 82 84;
1010 20:5 5-;
 76 104 107;
1010 23:8 5-;
 77 105 109;
1010 L 15H 5-;
 78 94 102;
E

B A: buffered
11010 false;
 1 5 7 12 30 41 44 45 46 51 59 70 82 84 92 95;
E

B A: number_of_bits
1010 25;
 21;
E

B A: title
11010 Spec schematic;
 21;
E

B A: Number_of_Shifts
1010 16;
 32;
E

B A: clock_number
1010 1;
 40 62 67 71 87 89 90;
E

B A: initial_value
11010 'h06f4;
 42;
11010 'b0;
 49;
E
```

NM60C_P NLS

#cell2 * nm60c_p nls * 32 any 0 v8r4.6.2
"19-Sep-94 GMT" "13:43:56 GMT" "19-Sep-94 GMT" "13:43:56 GMT" amir * .
writer 1
file_version 1
sections 1
netlist 1: 82 nm60c_p B contents: nm60c_p
netlist 248
cells 9027
switches 0
attributes 0
physical 0
history 0
E contents B netlist
X 1 shiftt i;
X 2 shiftr i;
X 3 shiftn i;
X 4 shiftnt i;
X 5 selu[3] i;
X 6 selu[2] i;
X 7 selu[1] i;
X 8 selu[0] i;
X 9 selb[15] o;
X 10 selb[14] o;
X 11 selb[13] o;
X 12 selb[12] o;
X 13 selb[11] o;
X 14 selb[10] o;
X 15 selb[9] o;
X 16 selb[8] o;
X 17 selb[7] o;
X 18 selb[6] o;
X 19 selb[5] o;
X 20 selb[4] o;
X 21 selb[3] o;
X 22 selb[2] o;
X 23 selb[1] o;
X 24 selb[0] o;
X 25 mclk i;
X 26 mins i;

X 27 sav_clk i;
X 28 best0 i;
X 29 best1 i;
X 30 best2 i;
X 31 upd[2] i;
X 32 upd[1] i;
X 33 upd[0] i;
X 34 mwrb i;
X 35 h10 i;
X 36 h0 i;
X 37 sym00[1] i;
X 38 sym00[0] i;
X 39 smp00 i;
X 40 rdacc00 i;
X 41 acc00msb[1] i;
X 42 acc00msb[0] i;
X 43 tmsb00[4] i;
X 44 tmsb00[3] i;
X 45 tmsb00[2] i;
X 46 tmsb00[1] i;
X 47 tmsb00[0] i;
X 48 x2n00 o;
X 49 mi200 o;
X 50 mi2n00 o;
X 51 minus00 o;
X 52 ha00 o;
X 53 yasis00 o;
X 54 h0030[3] o;
X 55 h0030[2] o;
X 56 h0030[1] o;
X 57 h0030[0] o;
X 58 csa00 i;
X 59 sym01[1] i;
X 60 sym01[0] i;
X 61 smp01 i;
X 62 rdacc01 i;
X 63 acc01msb[1] i;
X 64 acc01msb[0] i;
X 65 tmsb01[4] i;
X 66 tmsb01[3] i;
X 67 tmsb01[2] i;
X 68 tmsb01[1] i;
X 69 tmsb01[0] i;
X 70 x2n01 o;
X 71 mi201 o;
X 72 mi2n01 o;
X 73 minus01 o;
X 74 ha01 o;

X 75 yasis01 o;
X 76 h0130[3] o;
X 77 h0130[2] o;
X 78 h0130[1] o;
X 79 h0130[0] o;
X 80 csa01 i;
X 81 sym10[1] i;
X 82 sym10[0] i;
X 83 smp10 i;
X 84 rdacc10 i;
X 85 acc10msb[1] i;
X 86 acc10msb[0] i;
X 87 tmsb10[4] i;
X 88 tmsb10[3] i;
X 89 tmsb10[2] i;
X 90 tmsb10[1] i;
X 91 tmsb10[0] i;
X 92 x2n10 o;
X 93 mi210 o;
X 94 mi2n10 o;
X 95 minus10 o;
X 96 ha10 o;
X 97 yasis10 o;
X 98 h1030[3] o;
X 99 h1030[2] o;
X 100 h1030[1] o;
X 101 h1030[0] o;
X 102 csa10 i;
X 103 yof o;
X 104 yuf o;
X 105 reset_ i;
G 106 VDD;
G 107 VSS;
N 109 yof10;
N 110 sav_min00[0];
N 111 sav_min00[1];
N 112 sav_min00[2];
N 113 sav_min00[3];
N 114 sav_x2n00[0];
N 115 sav_x2n00[1];
N 116 sav_x2n00[2];
N 117 sav_x2n00[3];
N 118 sav_min01[0];
N 119 sav_min01[1];
N 120 sav_min01[2];
N 121 sav_min01[3];
N 122 sav_x2n01[0];
N 123 sav_x2n01[1];

N 124 sav_x2n01[2];
N 125 sav_x2n01[3];
N 126 sav_min10[0];
N 127 sav_min10[1];
N 128 sav_min10[2];
N 129 sav_min10[3];
N 130 sav_x2n10[0];
N 131 sav_x2n10[1];
N 132 sav_x2n10[2];
N 133 sav_x2n10[3];
N 134 minusu00[0];
N 135 minusu00[1];
N 136 x2nu00[0];
N 137 x2nu00[1];
N 138 minusu01[0];
N 139 minusu01[1];
N 140 x2nu01[0];
N 141 x2nu01[1];
N 142 minusu10[0];
N 143 minusu10[1];
N 144 x2nu10[0];
N 145 x2nu10[1];
N 147 yof01;
N 148 yof00;
N 149 yuf01;
N 150 yuf00;
N 151 yuf10;
N 9 nm40c_selb[15];
N 10 nm40c_selb[14];
N 11 nm40c_selb[13];
N 12 nm40c_selb[12];
N 13 nm40c_selb[11];
N 14 nm40c_selb[10];
N 15 nm40c_selb[9];
N 16 nm40c_selb[8];
N 17 nm40c_selb[7];
N 18 nm40c_selb[6];
N 19 nm40c_selb[5];
N 20 nm40c_selb[4];
N 21 nm40c_selb[3];
N 22 nm40c_selb[2];
N 23 nm40c_selb[1];
N 24 nm40c_selb[0];
N 48 nm4c00_x2n[0];
N 49 nm4c00_mi2[0];
N 50 nm4c00_mi2n[0];
N 51 nm4c00_minus[0];
N 52 nm4c00_h00[0];

```
N 53 nm4c00_yasis[0];
N 54 nm4c00_h30[3];
N 55 nm4c00_h30[2];
N 56 nm4c00_h30[1];
N 57 nm4c00_h30[0];
N 70 nm4c01_x2n[0];
N 71 nm4c01_mi2[0];
N 72 nm4c01_mi2n[0];
N 73 nm4c01_minus[0];
N 74 nm4c01_h00[0];
N 75 nm4c01_yasis[0];
N 76 nm4c01_h30[3];
N 77 nm4c01_h30[2];
N 78 nm4c01_h30[1];
N 79 nm4c01_h30[0];
N 92 nm4c10_x2n[0];
N 93 nm4c10_mi2[0];
N 94 nm4c10_mi2n[0];
N 95 nm4c10_minus[0];
N 96 nm4c10_h00[0];
N 97 nm4c10_yasis[0];
N 98 nm4c10_h30[3];
N 99 nm4c10_h30[2];
N 100 nm4c10_h30[1];
N 101 nm4c10_h30[0];
N 103 yof_1[0];
N 109 nm4c10_yof[0];
N 110 nm4c00_sav_min[0];
N 111 nm4c00_sav_min[1];
N 112 nm4c00_sav_min[2];
N 113 nm4c00_sav_min[3];
N 114 nm4c00_sav_x2n[0];
N 115 nm4c00_sav_x2n[1];
N 116 nm4c00_sav_x2n[2];
N 117 nm4c00_sav_x2n[3];
N 118 nm4c01_sav_min[0];
N 119 nm4c01_sav_min[1];
N 120 nm4c01_sav_min[2];
N 121 nm4c01_sav_min[3];
N 122 nm4c01_sav_x2n[0];
N 123 nm4c01_sav_x2n[1];
N 124 nm4c01_sav_x2n[2];
N 125 nm4c01_sav_x2n[3];
N 126 nm4c10_sav_min[0];
N 127 nm4c10_sav_min[1];
N 128 nm4c10_sav_min[2];
N 129 nm4c10_sav_min[3];
N 130 nm4c10_sav_x2n[0];
```

```
N 131 nm4c10_sav_x2n[1];
N 132 nm4c10_sav_x2n[2];
N 133 nm4c10_sav_x2n[3];
N 134 nm40d_minusu00[0];
N 135 nm40d_minusu00[1];
N 136 nm40d_x2nu00[0];
N 137 nm40d_x2nu00[1];
N 138 nm40d_minusu01[0];
N 139 nm40d_minusu01[1];
N 140 nm40d_x2nu01[0];
N 141 nm40d_x2nu01[1];
N 142 nm40d_minusu10[0];
N 143 nm40d_minusu10[1];
N 144 nm40d_x2nu10[0];
N 145 nm40d_x2nu10[1];
N 147 nm4c01_yof[0];
N 148 nm4c00_yof[0];
N 149 nm4c01_yuf[0];
N 150 nm4c00_yuf[0];
N 151 nm4c10_yuf[0];
N 104 yuf_1[0];
V selu 3 0 ¦ 5 6 7 8;
V selb 15 0 ¦ 9 10 11 12 13 14 15 16 17 18 19 20 21 22 23 24;
V upd 2 0 ¦ 31 32 33;
V sym00 1 0 ¦ 37 38;
V acc00msb 1 0 ¦ 41 42;
V tmsb00 4 0 ¦ 43 44 45 46 47;
V h0030 3 0 ¦ 54 55 56 57;
V sym01 1 0 ¦ 59 60;
V acc01msb 1 0 ¦ 63 64;
V tmsb01 4 0 ¦ 65 66 67 68 69;
V h0130 3 0 ¦ 76 77 78 79;
V sym10 1 0 ¦ 81 82;
V acc10msb 1 0 ¦ 85 86;
V tmsb10 4 0 ¦ 87 88 89 90 91;
V h1030 3 0 ¦ 98 99 100 101;
V sav_min00 3 0 ¦ 113 112 111 110;
V sav_x2n00 3 0 ¦ 117 116 115 114;
V sav_min01 3 0 ¦ 121 120 119 118;
V sav_x2n01 3 0 ¦ 125 124 123 122;
V sav_min10 3 0 ¦ 129 128 127 126;
V sav_x2n10 3 0 ¦ 133 132 131 130;
V minusu00 1 0 ¦ 135 134;
V x2nu00 1 0 ¦ 137 136;
V minusu01 1 0 ¦ 139 138;
V x2nu01 1 0 ¦ 141 140;
V minusu10 1 0 ¦ 143 142;
V x2nu10 1 0 ¦ 145 144;
```

V nm40c_selb 15 0 ¦ 9 10 11 12 13 14 15 16 17 18 19 20 21 22 23 24;
V nm40d_minusu00 1 0 ¦ 135 134;
V nm40d_minusu01 1 0 ¦ 139 138;
V nm40d_minusu10 1 0 ¦ 143 142;
V nm40d_x2nu00 1 0 ¦ 137 136;
V nm40d_x2nu01 1 0 ¦ 141 140;
V nm40d_x2nu10 1 0 ¦ 145 144;
V nm4c00_x2n 0 0 ¦ 48;
V nm4c00_mi2 0 0 ¦ 49;
V nm4c00_mi2n 0 0 ¦ 50;
V nm4c00_minus 0 0 ¦ 51;
V nm4c00_h00 0 0 ¦ 52;
V nm4c00_yasis 0 0 ¦ 53;
V nm4c00_yof 0 0 ¦ 148;
V nm4c00_yuf 0 0 ¦ 150;
V nm4c00_sav_min 3 0 ¦ 113 112 111 110;
V nm4c00_sav_x2n 3 0 ¦ 117 116 115 114;
V nm4c00_h30 3 0 ¦ 54 55 56 57;
V nm4c01_x2n 0 0 ¦ 70;
V nm4c01_mi2 0 0 ¦ 71;
V nm4c01_mi2n 0 0 ¦ 72;
V nm4c01_minus 0 0 ¦ 73;
V nm4c01_h00 0 0 ¦ 74;
V nm4c01_yasis 0 0 ¦ 75;
V nm4c01_yof 0 0 ¦ 147;
V nm4c01_yuf 0 0 ¦ 149;
V nm4c01_sav_min 3 0 ¦ 121 120 119 118;
V nm4c01_sav_x2n 3 0 ¦ 125 124 123 122;
V nm4c01_h30 3 0 ¦ 76 77 78 79;
V nm4c10_x2n 0 0 ¦ 92;
V nm4c10_mi2 0 0 ¦ 93;
V nm4c10_mi2n 0 0 ¦ 94;
V nm4c10_minus 0 0 ¦ 95;
V nm4c10_h00 0 0 ¦ 96;
V nm4c10_yasis 0 0 ¦ 97;
V nm4c10_yof 0 0 ¦ 109;
V nm4c10_yuf 0 0 ¦ 151;
V nm4c10_sav_min 3 0 ¦ 129 128 127 126;
V nm4c10_sav_x2n 3 0 ¦ 133 132 131 130;
V nm4c10_h30 3 0 ¦ 98 99 100 101;
V yof_1 0 0 ¦ 103;
V yuf_1 0 0 ¦ 104;
M NLS nm40c_p * ¦ shiftt shiftr shiftn selu[3] selu[2] selu[1] selu[0] selb[15] - selb[14] selb[13] selb[12] selb[11] selb[10] selb[9] selb[8] selb[7] selb[6] sel-b[5] selb[4] selb[3] selb[2] selb[1] selb[0] ¦ iiiiiiioooooooooooooooo;
M NLS nm40d_p * ¦ best0 best1 best2 sav_min00[3] sav_min00[2] sav_min00[1] sav_m-in00[0] sav_min01[3] sav_min01[2] sav_min01[1] sav_min01[0] sav_min10[3] sav_min-10[2] sav_min10[1] sav_min10[0] sav_x2n00[3] sav_x2n00[2] sav_x2n00[1] sav_x2n00-

[0] sav_x2n01[3] sav_x2n01[2] sav_x2n01[1] sav_x2n01[0] sav_x2n10[3] sav_x2n10[2-] sav_x2n10[1] sav_x2n10[0] minusu00[1] minusu00[0] minusu01[1] minusu01[0] minusu10[1] minusu10[0] x2nu00[1] x2nu00[0] x2nu01[1] x2nu01[0] x2nu10[1] x2nu10[0] - ¦ iiiiiiiiiiiiiiiiiiiiiiiiiiiioooooooooooo;
M NLS nm4c_p * ¦ mclk reset_ mins sav_clk upd[2] upd[1] upd[0] shiftn h0 sym[1] - sym[0] x2n mi2 mi2n minus h00 smp rdacc accmsb[1] accmsb[0] csa yasis yof yuf minusu[1] minusu[0] x2nu[1] x2nu[0] mwrb h10 tmsb[4] tmsb[3] tmsb[2] tmsb[1] tmsb[-0] sav_min[3] sav_min[2] sav_min[1] sav_min[0] sav_x2n[3] sav_x2n[2] sav_x2n[1] - sav_x2n[0] h30[3] h30[2] h30[1] h30[0] ¦ iiiiiiiiiiooooooiiiiioooiiiiiiiiiiiioooo-oooooooo;
M MDE ni01d3 vsc653 ¦ I Z ¦ ;
M MDE ni01d5 vsc653 ¦ I Z ¦ ;
M MDE or03d1 vsc653 ¦ A1 A2 A3 Z ¦ ;
I NLS nm40c_p * * 1 nm40c ¦ 1 2 3 5 6 7 8 9 10 11 12 13 14 15 16 17 18 19 20 21 - 22 23 24;
I NLS nm40d_p * * 2 nm40d ¦ 28 29 30 113 112 111 110 121 120 119 118 129 128 127-126 117 116 115 114 125 124 123 122 133 132 131 130 135 134 139 138 143 142 137-136 141 140 145 144;
I NLS nm4c_p * * 3 nm4c00 ¦ 25 105 26 146 108 32 33 4 36 37 38 48 49 50 51 52 39-40 41 42 58 53 148 150 135 134 137 136 34 35 43 44 45 46 47 113 112 111 110 117-116 115 114 54 55 56 57;
I NLS nm4c_p * * 4 nm4c01 ¦ 25 105 26 146 108 32 33 4 36 59 60 70 71 72 73 74 61-62 63 64 80 75 147 149 139 138 141 140 34 35 65 66 67 68 69 121 120 119 118 125-124 123 122 76 77 78 79;
I NLS nm4c_p * * 5 nm4c10 ¦ 25 105 26 146 108 32 33 4 36 81 82 92 93 94 95 96 83-84 85 86 102 97 109 151 143 142 145 144 34 35 87 88 89 90 91 129 128 127 126 13-3 132 131 130 98 99 100 101;
I MDE ni01d3 vsc653 * 6 i_13 ¦ 31 108;
I MDE ni01d5 vsc653 * 7 i_16 ¦ 27 146;
I MDE or03d1 vsc653 * 8 i_22 ¦ 109 148 147 103;
I MDE or03d1 vsc653 * 9 i_28 ¦ 151 150 149 104;
E netlist B subcells
NLS nm40c_p *
NLS nm40d_p *
NLS nm4c_p *
MDE ni01d3 vsc653
MDE ni01d5 vsc653
MDE or03d1 vsc653
E subcells

NMA_CTL_P NLS

```
#cell2 * nma_ctl_p nls * 37 any 0 v8r4.6.2
# "11-Oct-94 GMT" "15:33:59 GMT" "11-Oct-94 GMT" "15:33:59 GMT" amir * .
writer       1
file_version 1
sections     1
netlist   1:      84 nma_ctl_p


B contents:  nma_ctl_p
netlist        252
cells        21445
switches         0
attributes       0
physical         0
history          0
E contents


B netlist
X 1 clk i;
X 2 clk_ i;
X 3 reset_ i;
X 4 mwra i;
X 5 aadd[3] o;
X 6 aadd[2] o;
X 7 aadd[1] o;
X 8 aadd[0] o;
X 9 mrgw[7] o;
X 10 mrgw[6] o;
X 11 mrgw[5] o;
X 12 mrgw[4] o;
X 13 mrgw[3] o;
X 14 mrgw[2] o;
X 15 mrgw[1] o;
X 16 mrgw[0] o;
X 17 mrgr[3] o;
X 18 mrgr[2] o;
X 19 mrgr[1] o;
X 20 mrgr[0] o;
X 21 mrgs o;
X 22 mrda o;
X 23 eu_free_ i;
X 24 pu_free_ i;
X 25 du_free_ i;
X 26 su_free_ i;
```

X 27 ssoid i;
X 28 wr_eu o;
X 29 wr_pu o;
X 30 wr_du o;
X 31 wr_su o;
X 32 rd_ad i;
X 33 muaadd[3] i;
X 34 muaadd[2] i;
X 35 muaadd[1] i;
X 36 muaadd[0] i;
X 37 mfe o;
X 38 mff_ o;
X 39 tstwa i;
X 40 tstuaa[1] o;
X 41 tstuaa[0] o;
G 42 VDD;
G 43 VSS;
N 44 mfaddw[0];
N 45 mfaddw[1];
N 46 mffadd[1];
N 47 mfaddwd[0];
N 48 mfaddwd[1];
N 49 mfaddwd[2];
N 50 mfaddr[0];
N 51 mfaddr[1];
N 52 mfeadd[1];
N 53 mfaddr_n[2];
N 54 mfaddwd_n[0];
N 55 mfaddwd_n[2];
N 56 mrgw_5_n[5];
N 57 mrgw_3_n[3];
N 58 mrgw_1_n[1];
N 59 mrgw_2_n[2];
N 60 mrgrd[0];
N 61 mrgrd[1];
N 62 mrgrd[2];
N 63 mrgw_4_n[4];
N 64 mrgw_7_n[7];
N 65 mrgw_6_n[6];
N 66 mrgw_n[0];
N 67 wrua[0];
N 68 wrua[1];
N 69 mfaddr_ff_b1_qn;
N 70 n2;
N 71 n4;
N 72 n5;
N 73 n6;
N 74 n8;

N 75 i_1155_z;
N 76 mfaddwd_ff_b1_qn;
N 77 i_1160_z;
N 78 i_1117_zn;
N 79 i_1124_z;
N 80 mfe_1_q;
N 81 mfe_ff_qn;
N 82 mfaddr_ff_b0_qn;
N 83 i_1149_z;
N 84 i_1134_z;
N 85 i_1191_zn;
N 86 i_1140_z;
N 87 i_1121_zn;
N 88 i_1120_z;
N 89 i_1119_z;
N 90 i_1118_zn;
N 91 mfaddw_ff_b2_qn;
N 92 mfaddr_ff_b2_qn;
N 93 mwrad1;
N 94 mfaddw_ff_b0_qn;
N 95 mwrad1_ff_qn;
N 96 i_1123_zn;
N 97 i_1125_zn;
N 98 i_1126_z;
N 99 i_1136_z;
N 100 i_1133_zn;
N 101 i_1129_zn;
N 102 i_1127_zn;
N 103 i_1128_zn;
N 104 i_1130_zn;
N 105 i_1131_zn;
N 106 i_1132_zn;
N 107 i_1135_zn;
N 108 i_1146_zn;
N 109 i_1144_zn;
N 110 i_1143_zn;
N 111 i_1139_zn;
N 112 i_1137_zn;
N 113 i_1138_zn;
N 114 i_1141_zn;
N 115 i_1142_zn;
N 116 i_1145_zn;
N 117 i_1147_zn;
N 118 i_1148_zn;
N 119 i_1153_z;
N 120 i_1152_zn;
N 121 i_1151_zn;
N 122 i_1150_zn;

N 123 i_1154_zn;
N 124 i_1157_zn;
N 125 mfaddwd_ff_b0_qn;
N 126 i_1162_z;
N 127 mwrad1_n;
N 128 i_1165_z;
N 129 mfaddwd_ff_b2_qn;
N 130 i_1169_z;
N 131 i_1178_zn;
N 132 i_1177_z;
N 133 i_1174_z;
N 134 i_1171_z;
N 135 mff_n;
N 136 i_1173_zn;
N 137 i_1172_zn;
N 138 i_1176_zn;
N 139 i_1175_zn;
N 140 i_1183_zn;
N 141 i_1184_z;
N 142 i_1190_zn;
N 143 mrgsd;
N 144 i_1194_zn;
N 145 i_1193_zn;
N 146 i_1192_zn;
N 147 i_1196_z;
N 148 i_1200_zn;
N 149 i_1197_zn;
N 150 i_1198_z;
N 151 i_1199_zn;
N 152 i_1202_zn;
N 153 i_1204_zn;
N 154 i_1207_zn;
N 155 i_1206_z;
N 156 i_1205_zn;
N 157 i_1210_zn;
N 158 i_1208_z;
N 159 i_1209_zn;
N 160 i_1213_zn;
N 161 i_1211_zn;
N 162 i_1212_z;
N 163 i_1219_zn;
N 164 i_1216_zn;
N 165 i_1215_zn;
N 166 i_1218_zn;
N 167 i_1217_zn;
N 168 i_1220_zn;
N 169 i_1225_zn;
N 170 i_1223_zn;

N 171 i_1222_zn;
N 172 i_1224_zn;
N 173 i_1228_zn;
N 174 i_1227_zn;
N 175 i_1226_zn;
N 176 i_1229_zn;
N 177 i_1232_zn;
N 178 i_1231_zn;
N 179 i_1230_zn;
N 180 i_1236_z;
N 181 i_1233_zn;
N 182 i_1235_zn;
N 183 i_1234_zn;
N 184 i_1237_zn;
N 185 i_1240_zn;
N 186 i_1239_zn;
N 187 i_1238_zn;
N 188 mrgr_ff_b3_qn;
N 189 mfaddr_ff_b2_q;
N 190 mfaddw_ff_b2_q;
N 191 mff_ff_q;
N 192 mrgw_ff_qn;
N 193 mrgw_1_ff_qn;
N 194 mrgw_2_ff_qn;
N 195 mrgw_3_ff_qn;
N 196 mrgw_4_ff_qn;
N 197 mrgw_5_ff_qn;
N 198 mrgw_6_ff_qn;
N 199 mrgw_7_ff_qn;
N 200 mrgr_ff_b0_qn;
N 201 mrgr_ff_b1_qn;
N 202 mrgr_ff_b2_qn;
N 203 mrgs_ff_qn;
N 44 mfaddw_ff_b0_Q[0];
N 45 mfaddw_ff_b1_Q[0];
N 46 u70_S[0];
N 47 mfaddwd_ff_b0_Q[0];
N 48 mfaddwd_ff_b1_Q[0];
N 49 mfaddwd_ff_b2_Q[0];
N 50 mfaddr_ff_b0_Q[0];
N 51 mfaddr_ff_b1_Q[0];
N 52 u54_S[0];
N 53 i_1156_Z[0];
N 54 i_1158_Z[0];
N 55 i_1164_Z[0];
N 56 i_1161_Z[0];
N 57 i_1166_Z[0];
N 58 i_1167_Z[0];

N 59 i_1168_Z[0];
N 60 i_1188_ZN[0];
N 61 i_1180_ZN[0];
N 62 i_1187_ZN[0];
N 63 i_1181_Z[0];
N 64 i_1182_Z[0];
N 65 i_1185_Z[0];
N 66 i_1186_Z[0];
N 67 i_1214_ZN[0];
N 68 i_1221_ZN[0];
N 12 mrgw_4_ff_Q[0];
N 69 mfaddr_ff_b1_QN_1[0];
N 70 i_1159_Z[0];
N 71 u54_CO[0];
N 72 mfaddw_ff_b1_QN[0];
N 73 i_1179_Z[0];
N 74 u70_CO[0];
N 75 i_1155_Z_1[0];
N 76 mfaddwd_ff_b1_QN_1[0];
N 77 i_1160_Z_1[0];
N 78 i_1117_ZN_1[0];
N 79 i_1124_Z_1[0];
N 80 mfe_ff_Q[0];
N 81 mfe_ff_QN_1[0];
N 82 mfaddr_ff_b0_QN_1[0];
N 83 i_1149_Z_1[0];
N 84 i_1134_Z_1[0];
N 85 i_1191_ZN_1[0];
N 86 i_1140_Z_1[0];
N 87 i_1121_ZN_1[0];
N 88 i_1120_Z_1[0];
N 89 i_1119_Z_1[0];
N 90 i_1118_ZN_1[0];
N 91 mfaddw_ff_b2_QN_1[0];
N 92 mfaddr_ff_b2_QN_1[0];
N 93 mwrad1_ff_Q[0];
N 94 mfaddw_ff_b0_QN_1[0];
N 95 mwrad1_ff_QN_1[0];
N 96 i_1123_ZN_1[0];
N 97 i_1125_ZN_1[0];
N 98 i_1126_Z_1[0];
N 99 i_1136_Z_1[0];
N 100 i_1133_ZN_1[0];
N 101 i_1129_ZN_1[0];
N 102 i_1127_ZN_1[0];
N 103 i_1128_ZN_1[0];
N 104 i_1130_ZN_1[0];
N 105 i_1131_ZN_1[0];

N 106 i_1132_ZN_1[0];
N 107 i_1135_ZN_1[0];
N 108 i_1146_ZN_1[0];
N 109 i_1144_ZN_1[0];
N 110 i_1143_ZN_1[0];
N 111 i_1139_ZN_1[0];
N 112 i_1137_ZN_1[0];
N 113 i_1138_ZN_1[0];
N 114 i_1141_ZN_1[0];
N 115 i_1142_ZN_1[0];
N 116 i_1145_ZN_1[0];
N 117 i_1147_ZN_1[0];
N 118 i_1148_ZN_1[0];
N 119 i_1153_Z_1[0];
N 120 i_1152_ZN_1[0];
N 121 i_1151_ZN_1[0];
N 122 i_1150_ZN_1[0];
N 123 i_1154_ZN_1[0];
N 124 i_1157_ZN_1[0];
N 125 mfaddwd_ff_b0_QN_1[0];
N 126 i_1162_Z_1[0];
N 127 i_1163_Z[0];
N 128 i_1165_Z_1[0];
N 129 mfaddwd_ff_b2_QN_1[0];
N 130 i_1169_Z_1[0];
N 131 i_1178_ZN_1[0];
N 132 i_1177_Z_1[0];
N 133 i_1174_Z_1[0];
N 134 i_1171_Z_1[0];
N 135 i_1170_Z[0];
N 136 i_1173_ZN_1[0];
N 137 i_1172_ZN_1[0];
N 138 i_1176_ZN_1[0];
N 139 i_1175_ZN_1[0];
N 140 i_1183_ZN_1[0];
N 141 i_1184_Z_1[0];
N 142 i_1190_ZN_1[0];
N 143 i_1189_Z[0];
N 144 i_1194_ZN_1[0];
N 145 i_1193_ZN_1[0];
N 146 i_1192_ZN_1[0];
N 147 i_1196_Z_1[0];
N 148 i_1200_ZN_1[0];
N 149 i_1197_ZN_1[0];
N 150 i_1198_Z_1[0];
N 151 i_1199_ZN_1[0];
N 152 i_1202_ZN_1[0];
N 153 i_1204_ZN_1[0];

N 154 i_1207_ZN_1[0];
N 155 i_1206_Z_1[0];
N 156 i_1205_ZN_1[0];
N 157 i_1210_ZN_1[0];
N 158 i_1208_Z_1[0];
N 159 i_1209_ZN_1[0];
N 160 i_1213_ZN_1[0];
N 161 i_1211_ZN_1[0];
N 162 i_1212_Z_1[0];
N 163 i_1219_ZN_1[0];
N 164 i_1216_ZN_1[0];
N 165 i_1215_ZN_1[0];
N 166 i_1218_ZN_1[0];
N 167 i_1217_ZN_1[0];
N 168 i_1220_ZN_1[0];
N 169 i_1225_ZN_1[0];
N 170 i_1223_ZN_1[0];
N 171 i_1222_ZN_1[0];
N 172 i_1224_ZN_1[0];
N 173 i_1228_ZN_1[0];
N 174 i_1227_ZN_1[0];
N 175 i_1226_ZN_1[0];
N 176 i_1229_ZN_1[0];
N 177 i_1232_ZN_1[0];
N 178 i_1231_ZN_1[0];
N 179 i_1230_ZN_1[0];
N 180 i_1236_Z_1[0];
N 181 i_1233_ZN_1[0];
N 182 i_1235_ZN_1[0];
N 183 i_1234_ZN_1[0];
N 184 i_1237_ZN_1[0];
N 185 i_1240_ZN_1[0];
N 186 i_1239_ZN_1[0];
N 187 i_1238_ZN_1[0];
N 188 mrgr_ff_b3_QN_1[0];
N 189 mfaddr_ff_b2_Q_1[0];
N 190 mfaddw_ff_b2_Q_1[0];
N 191 mff_ff_Q_1[0];
N 192 mrgw_ff_QN_1[0];
N 193 mrgw_1_ff_QN_1[0];
N 194 mrgw_2_ff_QN_1[0];
N 195 mrgw_3_ff_QN_1[0];
N 196 mrgw_4_ff_QN_1[0];
N 197 mrgw_5_ff_QN_1[0];
N 198 mrgw_6_ff_QN_1[0];
N 199 mrgw_7_ff_QN_1[0];
N 200 mrgr_ff_b0_QN_1[0];
N 201 mrgr_ff_b1_QN_1[0];

N 202 mrgr_ff_b2_QN_1[0];
N 203 mrgs_ff_QN_1[0];
N 31 i_11238_Z[0];
N 11 mrgw_5_ff_Q[0];
N 17 mrgr_ff_b3_Q[0];
N 10 mrgw_6_ff_Q[0];
N 9 mrgw_7_ff_Q[0];
N 20 mrgr_ff_b0_Q[0];
N 19 mrgr_ff_b1_Q[0];
N 8 u170_Z[0];
N 7 u171_Z[0];
N 6 u172_Z[0];
N 5 u173_Z[0];
N 41 u174_Z[0];
N 40 u175_Z[0];
N 18 mrgr_ff_b2_Q[0];
N 21 mrgs_ff_Q[0];
N 37 i_1122_ZN[0];
N 29 i_11226_Z[0];
N 22 i_1195_ZN[0];
N 38 mff_ff_QN[0];
N 16 mrgw_ff_Q[0];
N 30 i_11230_Z[0];
N 15 mrgw_1_ff_Q[0];
N 14 mrgw_2_ff_Q[0];
N 28 i_11205_Z[0];
N 13 mrgw_3_ff_Q[0];
V aadd 3 0 ¦ 5 6 7 8;
V mrgw 7 0 ¦ 9 10 11 12 13 14 15 16;
V mrgr 3 0 ¦ 17 18 19 20;
V muaadd 3 0 ¦ 33 34 35 36;
V tstuaa 1 0 ¦ 40 41;
V mfaddw 1 0 ¦ 45 44;
V mffadd 1 1 ¦ 46;
V mfaddwd 2 0 ¦ 49 48 47;
V mfaddr 1 0 ¦ 51 50;
V mfeadd 1 1 ¦ 52;
V mfaddr_n 2 2 ¦ 53;
V mfaddwd_n 2 0 ¦ 55 43 54;
V mrgw_5_n 5 5 ¦ 56;
V mrgw_3_n 3 3 ¦ 57;
V mrgw_1_n 1 1 ¦ 58;
V mrgw_2_n 2 2 ¦ 59;
V mrgrd 2 0 ¦ 62 61 60;
V mrgw_4_n 4 4 ¦ 63;
V mrgw_7_n 7 7 ¦ 64;
V mrgw_6_n 6 6 ¦ 65;
V mrgw_n 0 0 ¦ 66;

```
V wrua 1 0 ¦ 68 67;
V u54_CO 0 0 ¦ 71;
V u54_S 0 0 ¦ 52;
V u70_CO 0 0 ¦ 74;
V u70_S 0 0 ¦ 46;
V mfaddr_ff_b1_Q 0 0 ¦ 51;
V mfaddr_ff_b1_QN_1 0 0 ¦ 69;
V mfaddwd_ff_b1_Q 0 0 ¦ 48;
V mfaddwd_ff_b1_QN_1 0 0 ¦ 76;
V mfe_ff_Q 0 0 ¦ 80;
V mfe_ff_QN_1 0 0 ¦ 81;
V mfaddr_ff_b0_Q 0 0 ¦ 50;
V mfaddr_ff_b0_QN_1 0 0 ¦ 82;
V u170_Z 0 0 ¦ 8;
V u171_Z 0 0 ¦ 7;
V u172_Z 0 0 ¦ 6;
V u173_Z 0 0 ¦ 5;
V u174_Z 0 0 ¦ 41;
V u175_Z 0 0 ¦ 40;
V i_1117_ZN_1 0 0 ¦ 78;
V i_1118_ZN_1 0 0 ¦ 90;
V i_1119_Z_1 0 0 ¦ 89;
V i_1120_Z_1 0 0 ¦ 88;
V i_1121_ZN_1 0 0 ¦ 87;
V i_1122_ZN 0 0 ¦ 37;
V i_1123_ZN_1 0 0 ¦ 96;
V i_1124_Z_1 0 0 ¦ 79;
V i_1125_ZN_1 0 0 ¦ 97;
V i_1126_Z_1 0 0 ¦ 98;
V i_1127_ZN_1 0 0 ¦ 102;
V i_1128_ZN_1 0 0 ¦ 103;
V i_1129_ZN_1 0 0 ¦ 101;
V i_1130_ZN_1 0 0 ¦ 104;
V i_1131_ZN_1 0 0 ¦ 105;
V i_1132_ZN_1 0 0 ¦ 106;
V i_1133_ZN_1 0 0 ¦ 100;
V i_1134_Z_1 0 0 ¦ 84;
V i_1135_ZN_1 0 0 ¦ 107;
V i_1136_Z_1 0 0 ¦ 99;
V i_1137_ZN_1 0 0 ¦ 112;
V i_1138_ZN_1 0 0 ¦ 113;
V i_1139_ZN_1 0 0 ¦ 111;
V i_1140_Z_1 0 0 ¦ 86;
V i_1141_ZN_1 0 0 ¦ 114;
V i_1142_ZN_1 0 0 ¦ 115;
V i_1143_ZN_1 0 0 ¦ 110;
V i_1144_ZN_1 0 0 ¦ 109;
V i_1145_ZN_1 0 0 ¦ 116;
```

V i_1146_ZN_1 0 0 ¦ 108;
V i_1147_ZN_1 0 0 ¦ 117;
V i_1148_ZN_1 0 0 ¦ 118;
V i_1149_Z_1 0 0 ¦ 83;
V i_1150_ZN_1 0 0 ¦ 122;
V i_1151_ZN_1 0 0 ¦ 121;
V i_1152_ZN_1 0 0 ¦ 120;
V i_1153_Z_1 0 0 ¦ 119;
V i_1154_ZN_1 0 0 ¦ 123;
V i_1155_Z_1 0 0 ¦ 75;
V i_1156_Z 0 0 ¦ 53;
V i_1157_ZN_1 0 0 ¦ 124;
V i_1158_Z 0 0 ¦ 54;
V i_1159_Z 0 0 ¦ 70;
V i_1160_Z_1 0 0 ¦ 77;
V i_1161_Z 0 0 ¦ 56;
V i_1162_Z_1 0 0 ¦ 126;
V i_1163_Z 0 0 ¦ 127;
V i_1164_Z 0 0 ¦ 55;
V i_1165_Z_1 0 0 ¦ 128;
V i_1166_Z 0 0 ¦ 57;
V i_1167_Z 0 0 ¦ 58;
V i_1168_Z 0 0 ¦ 59;
V i_1169_Z_1 0 0 ¦ 130;
V i_1170_Z 0 0 ¦ 135;
V i_1171_Z_1 0 0 ¦ 134;
V i_1172_ZN_1 0 0 ¦ 137;
V i_1173_ZN_1 0 0 ¦ 136;
V i_1174_Z_1 0 0 ¦ 133;
V i_1175_ZN_1 0 0 ¦ 139;
V i_1176_ZN_1 0 0 ¦ 138;
V i_1177_Z_1 0 0 ¦ 132;
V i_1178_ZN_1 0 0 ¦ 131;
V i_1179_Z 0 0 ¦ 73;
V i_1180_ZN 0 0 ¦ 61;
V i_1181_Z 0 0 ¦ 63;
V i_1182_Z 0 0 ¦ 64;
V i_1183_ZN_1 0 0 ¦ 140;
V i_1184_Z_1 0 0 ¦ 141;
V i_1185_Z 0 0 ¦ 65;
V i_1186_Z 0 0 ¦ 66;
V i_1187_ZN 0 0 ¦ 62;
V i_1188_ZN 0 0 ¦ 60;
V i_1189_Z 0 0 ¦ 143;
V i_1190_ZN_1 0 0 ¦ 142;
V i_1191_ZN_1 0 0 ¦ 85;
V i_1192_ZN_1 0 0 ¦ 146;
V i_1193_ZN_1 0 0 ¦ 145;

V i_1194_ZN_1 0 0 ¦ 144;
V i_1195_ZN 0 0 ¦ 22;
V i_1196_Z_1 0 0 ¦ 147;
V i_1197_ZN_1 0 0 ¦ 149;
V i_1198_Z_1 0 0 ¦ 150;
V i_1199_ZN_1 0 0 ¦ 151;
V i_1200_ZN_1 0 0 ¦ 148;
V i_1202_ZN_1 0 0 ¦ 152;
V i_1204_ZN_1 0 0 ¦ 153;
V i_1205_ZN_1 0 0 ¦ 156;
V i_11205_Z 0 0 ¦ 28;
V i_1206_Z_1 0 0 ¦ 155;
V i_1207_ZN_1 0 0 ¦ 154;
V i_1208_Z_1 0 0 ¦ 158;
V i_1209_ZN_1 0 0 ¦ 159;
V i_1210_ZN_1 0 0 ¦ 157;
V i_1211_ZN_1 0 0 ¦ 161;
V i_1212_Z_1 0 0 ¦ 162;
V i_1213_ZN_1 0 0 ¦ 160;
V i_1214_ZN 0 0 ¦ 67;
V i_1215_ZN_1 0 0 ¦ 165;
V i_1216_ZN_1 0 0 ¦ 164;
V i_1217_ZN_1 0 0 ¦ 167;
V i_1218_ZN_1 0 0 ¦ 166;
V i_1219_ZN_1 0 0 ¦ 163;
V i_1220_ZN_1 0 0 ¦ 168;
V i_1221_ZN 0 0 ¦ 68;
V i_1222_ZN_1 0 0 ¦ 171;
V i_1223_ZN_1 0 0 ¦ 170;
V i_1224_ZN_1 0 0 ¦ 172;
V i_1225_ZN_1 0 0 ¦ 169;
V i_1226_ZN_1 0 0 ¦ 175;
V i_11226_Z 0 0 ¦ 29;
V i_1227_ZN_1 0 0 ¦ 174;
V i_1228_ZN_1 0 0 ¦ 173;
V i_1229_ZN_1 0 0 ¦ 176;
V i_1230_ZN_1 0 0 ¦ 179;
V i_11230_Z 0 0 ¦ 30;
V i_1231_ZN_1 0 0 ¦ 178;
V i_1232_ZN_1 0 0 ¦ 177;
V i_1233_ZN_1 0 0 ¦ 181;
V i_1234_ZN_1 0 0 ¦ 183;
V i_1235_ZN_1 0 0 ¦ 182;
V i_1236_Z_1 0 0 ¦ 180;
V i_1237_ZN_1 0 0 ¦ 184;
V i_1238_ZN_1 0 0 ¦ 187;
V i_11238_Z 0 0 ¦ 31;
V i_1239_ZN_1 0 0 ¦ 186;

```
V i_1240_ZN_1 0 0 ¦ 185;
V mrgr_ff_b3_Q 0 0 ¦ 17;
V mrgr_ff_b3_QN_1 0 0 ¦ 188;
V mfaddr_ff_b2_Q_1 0 0 ¦ 189;
V mfaddr_ff_b2_QN_1 0 0 ¦ 92;
V mfaddw_ff_b0_Q 0 0 ¦ 44;
V mfaddw_ff_b0_QN_1 0 0 ¦ 94;
V mfaddw_ff_b1_Q 0 0 ¦ 45;
V mfaddw_ff_b1_QN 0 0 ¦ 72;
V mfaddw_ff_b2_Q_1 0 0 ¦ 190;
V mfaddw_ff_b2_QN_1 0 0 ¦ 91;
V mfaddwd_ff_b0_Q 0 0 ¦ 47;
V mfaddwd_ff_b0_QN_1 0 0 ¦ 125;
V mfaddwd_ff_b2_Q 0 0 ¦ 49;
V mfaddwd_ff_b2_QN_1 0 0 ¦ 129;
V mwrad1_ff_Q 0 0 ¦ 93;
V mwrad1_ff_QN_1 0 0 ¦ 95;
V mff_ff_Q_1 0 0 ¦ 191;
V mff_ff_QN 0 0 ¦ 38;
V mrgw_ff_Q 0 0 ¦ 16;
V mrgw_ff_QN_1 0 0 ¦ 192;
V mrgw_1_ff_Q 0 0 ¦ 15;
V mrgw_1_ff_QN_1 0 0 ¦ 193;
V mrgw_2_ff_Q 0 0 ¦ 14;
V mrgw_2_ff_QN_1 0 0 ¦ 194;
V mrgw_3_ff_Q 0 0 ¦ 13;
V mrgw_3_ff_QN_1 0 0 ¦ 195;
V mrgw_4_ff_Q 0 0 ¦ 12;
V mrgw_4_ff_QN_1 0 0 ¦ 196;
V mrgw_5_ff_Q 0 0 ¦ 11;
V mrgw_5_ff_QN_1 0 0 ¦ 197;
V mrgw_6_ff_Q 0 0 ¦ 10;
V mrgw_6_ff_QN_1 0 0 ¦ 198;
V mrgw_7_ff_Q 0 0 ¦ 9;
V mrgw_7_ff_QN_1 0 0 ¦ 199;
V mrgr_ff_b0_Q 0 0 ¦ 20;
V mrgr_ff_b0_QN_1 0 0 ¦ 200;
V mrgr_ff_b1_Q 0 0 ¦ 19;
V mrgr_ff_b1_QN_1 0 0 ¦ 201;
V mrgr_ff_b2_Q 0 0 ¦ 18;
V mrgr_ff_b2_QN_1 0 0 ¦ 202;
V mrgs_ff_Q 0 0 ¦ 21;
V mrgs_ff_QN_1 0 0 ¦ 203;
M MDE ad01d1 vsc653 ¦ A B CI S CO ¦ ;
M MDE mfctnh vsc653 ¦ DA DB SA CP CDN Q QN ¦ ;
M MDE mfptnh vsc653 ¦ DA DB SA CP SDN Q QN ¦ ;
M MDE nt02d3 vsc653 ¦ I Z OEN ¦ ;
M MDE oa02d1 vsc653 ¦ A1 A2 A3 B1 B2 B3 ZN ¦ ;
```

```
M MDE xn02d1 vsc653 ¦ A1 A2 ZN ¦ ;
M MDE or03d1 vsc653 ¦ A1 A2 A3 Z ¦ ;
M MDE xo02d1 vsc653 ¦ A1 A2 Z ¦ ;
M MDE nd03d1 vsc653 ¦ A1 A2 A3 ZN ¦ ;
M MDE in01d1 vsc653 ¦ I ZN ¦ ;
M MDE in01d2 vsc653 ¦ I ZN ¦ ;
M MDE or02d1 vsc653 ¦ A1 A2 Z ¦ ;
M MDE or04d1 vsc653 ¦ A1 A2 A3 A4 Z ¦ ;
M MDE ni01d1 vsc653 ¦ I Z ¦ ;
M MDE an05d1 vsc653 ¦ A1 A2 A3 A4 A5 Z ¦ ;
M MDE fn05d1 vsc653 ¦ A1 B1 ZN ¦ ;
M MDE ni01d4 vsc653 ¦ I Z ¦ ;
M MDE in01d3 vsc653 ¦ I ZN ¦ ;
M MDE fn01d1 vsc653 ¦ A1 B1 ZN ¦ ;
M MDE fn01d2 vsc653 ¦ A1 B1 ZN ¦ ;
M MDE an03d1 vsc653 ¦ A1 A2 A3 Z ¦ ;
M MDE an02d1 vsc653 ¦ A1 A2 Z ¦ ;
M MDE an04d1 vsc653 ¦ A1 A2 A3 A4 Z ¦ ;
M MDE nr04d1 vsc653 ¦ A1 A2 A3 A4 ZN ¦ ;
M MDE nr02d1 vsc653 ¦ A1 A2 ZN ¦ ;
M MDE oa04d1 vsc653 ¦ A1 A2 B ZN ¦ ;
M MDE in01d4 vsc653 ¦ I ZN ¦ ;
M MDE nd02d1 vsc653 ¦ A1 A2 ZN ¦ ;
M MDE nd04d1 vsc653 ¦ A1 A3 A4 A2 ZN ¦ ;
M MDE ni01d2 vsc653 ¦ I Z ¦ ;
M MDE nr03d1 vsc653 ¦ A1 A2 A3 ZN ¦ ;
M MDE mfntnb vsc653 ¦ DA DB SA CP Q QN ¦ ;
M MDE dfctnb vsc653 ¦ D CP CDN Q QN ¦ ;
M MDE dfntnb vsc653 ¦ D CP Q QN ¦ ;
I MDE ad01d1 vsc653 * 1 u54 ¦ 45 69 70 52 71;
I MDE ad01d1 vsc653 * 2 u70 ¦ 51 72 73 46 74;
I MDE mfctnh vsc653 * 3 mfaddr_ff_b1 ¦ 51 69 75 1 3 51 69;
I MDE mfctnh vsc653 * 4 mfaddwd_ff_b1 ¦ 48 76 77 2 3 48 76;
I MDE mfptnh vsc653 * 5 mfe_ff ¦ 78 37 79 1 3 80 81;
I MDE mfctnh vsc653 * 6 mfaddr_ff_b0 ¦ 50 82 83 1 3 50 82;
I MDE nt02d3 vsc653 * 7 u170 ¦ 84 8 85;
I MDE nt02d3 vsc653 * 8 u171 ¦ 42 7 85;
I MDE nt02d3 vsc653 * 9 u172 ¦ 43 6 85;
I MDE nt02d3 vsc653 * 10 u173 ¦ 43 5 85;
I MDE nt02d3 vsc653 * 11 u174 ¦ 67 41 86;
I MDE nt02d3 vsc653 * 12 u175 ¦ 68 40 86;
I MDE oa02d1 vsc653 * 13 i_1117 ¦ 87 52 88 89 88 90 78;
I MDE xn02d1 vsc653 * 14 i_1118 ¦ 91 92 90;
I MDE or03d1 vsc653 * 15 i_1119 ¦ 93 71 52 89;
I MDE xo02d1 vsc653 * 16 i_1120 ¦ 50 94 88;
I MDE nd03d1 vsc653 * 17 i_1121 ¦ 90 95 71 87;
I MDE in01d1 vsc653 * 18 i_1122 ¦ 96 37;
I MDE in01d2 vsc653 * 19 i_1123 ¦ 80 96;
```

I MDE or02d1 vsc653 * 20 i_1124 ¦ 93 97 79;
I MDE in01d1 vsc653 * 21 i_1125 ¦ 98 97;
I MDE or04d1 vsc653 * 22 i_1126 ¦ 99 100 101 102 98;
I MDE in01d1 vsc653 * 23 i_1127 ¦ 103 102;
I MDE in01d1 vsc653 * 24 i_1128 ¦ 37 103;
I MDE in01d1 vsc653 * 25 i_1129 ¦ 104 101;
I MDE in01d1 vsc653 * 26 i_1130 ¦ 105 104;
I MDE in01d2 vsc653 * 27 i_1131 ¦ 106 105;
I MDE in01d1 vsc653 * 28 i_1132 ¦ 32 106;
I MDE in01d1 vsc653 * 29 i_1133 ¦ 84 100;
I MDE ni01d1 vsc653 * 30 i_1134 ¦ 107 84;
I MDE in01d1 vsc653 * 31 i_1135 ¦ 27 107;
I MDE an05d1 vsc653 * 32 i_1136 ¦ 108 109 110 111 112 99;
I MDE in01d1 vsc653 * 33 i_1137 ¦ 113 112;
I MDE fn05d1 vsc653 * 34 i_1138 ¦ 33 24 113;
I MDE in01d1 vsc653 * 35 i_1139 ¦ 86 111;
I MDE ni01d4 vsc653 * 36 i_1140 ¦ 114 86;
I MDE in01d3 vsc653 * 37 i_1141 ¦ 115 114;
I MDE in01d2 vsc653 * 38 i_1142 ¦ 39 115;
I MDE fn01d1 vsc653 * 39 i_1143 ¦ 25 35 110;
I MDE in01d1 vsc653 * 40 i_1144 ¦ 116 109;
I MDE fn05d1 vsc653 * 41 i_1145 ¦ 34 23 116;
I MDE in01d1 vsc653 * 42 i_1146 ¦ 117 108;
I MDE in01d3 vsc653 * 43 i_1147 ¦ 118 117;
I MDE fn01d2 vsc653 * 44 i_1148 ¦ 26 36 118;
I MDE or04d1 vsc653 * 45 i_1149 ¦ 119 120 121 122 83;
I MDE in01d1 vsc653 * 46 i_1150 ¦ 103 122;
I MDE in01d1 vsc653 * 47 i_1151 ¦ 104 121;
I MDE in01d1 vsc653 * 48 i_1152 ¦ 84 120;
I MDE an05d1 vsc653 * 49 i_1153 ¦ 108 109 110 123 112 119;
I MDE in01d1 vsc653 * 50 i_1154 ¦ 86 123;
I MDE or02d1 vsc653 * 51 i_1155 ¦ 98 82 75;
I MDE xo02d1 vsc653 * 52 i_1156 ¦ 124 92 53;
I MDE nd03d1 vsc653 * 53 i_1157 ¦ 97 51 50 124;
I MDE xo02d1 vsc653 * 54 i_1158 ¦ 95 125 54;
I MDE or02d1 vsc653 * 55 i_1159 ¦ 44 82 70;
I MDE or02d1 vsc653 * 56 i_1160 ¦ 125 95 77;
I MDE an03d1 vsc653 * 57 i_1161 ¦ 49 76 126 56;
I MDE an02d1 vsc653 * 58 i_1162 ¦ 4 47 126;
I MDE an02d1 vsc653 * 59 i_1163 ¦ 4 38 127;
I MDE xo02d1 vsc653 * 60 i_1164 ¦ 128 129 55;
I MDE or03d1 vsc653 * 61 i_1165 ¦ 76 125 95 128;
I MDE an03d1 vsc653 * 62 i_1166 ¦ 126 129 48 57;
I MDE an03d1 vsc653 * 63 i_1167 ¦ 76 129 126 58;
I MDE an03d1 vsc653 * 64 i_1168 ¦ 130 129 48 59;
I MDE an02d1 vsc653 * 65 i_1169 ¦ 125 4 130;
I MDE or04d1 vsc653 * 66 i_1170 ¦ 131 132 133 134 135;
I MDE an04d1 vsc653 * 67 i_1171 ¦ 136 137 46 88 134;

I MDE in01d1 vsc653 * 68 i_1172 ¦ 90 137;
I MDE in01d1 vsc653 * 69 i_1173 ¦ 74 136;
I MDE an04d1 vsc653 * 70 i_1174 ¦ 138 139 74 90 133;
I MDE in01d1 vsc653 * 71 i_1175 ¦ 88 139;
I MDE in01d1 vsc653 * 72 i_1176 ¦ 46 138;
I MDE an04d1 vsc653 * 73 i_1177 ¦ 74 46 90 88 132;
I MDE nr04d1 vsc653 * 74 i_1178 ¦ 88 74 90 46 131;
I MDE or02d1 vsc653 * 75 i_1179 ¦ 94 50 73;
I MDE oa02d1 vsc653 * 76 i_1180 ¦ 97 82 51 98 51 50 61;
I MDE an03d1 vsc653 * 77 i_1181 ¦ 49 76 130 63;
I MDE an03d1 vsc653 * 78 i_1182 ¦ 49 48 126 64;
I MDE nr02d1 vsc653 * 79 i_1183 ¦ 69 50 140;
I MDE an02d1 vsc653 * 80 i_1184 ¦ 50 51 141;
I MDE an03d1 vsc653 * 81 i_1185 ¦ 49 48 130 65;
I MDE an03d1 vsc653 * 82 i_1186 ¦ 76 129 130 66;
I MDE oa02d1 vsc653 * 83 i_1187 ¦ 69 97 50 82 51 98 62;
I MDE oa02d1 vsc653 * 84 i_1188 ¦ 69 82 98 97 51 50 60;
I MDE xo02d1 vsc653 * 85 i_1189 ¦ 142 92 143;
I MDE nd03d1 vsc653 * 86 i_1190 ¦ 97 50 51 142;
I MDE oa04d1 vsc653 * 87 i_1191 ¦ 144 145 146 85;
I MDE in01d1 vsc653 * 88 i_1192 ¦ 86 146;
I MDE in01d1 vsc653 * 89 i_1193 ¦ 104 145;
I MDE in01d1 vsc653 * 90 i_1194 ¦ 84 144;
I MDE nr02d1 vsc653 * 91 i_1195 ¦ 80 147 22;
I MDE or02d1 vsc653 * 92 i_1196 ¦ 148 149 147;
I MDE in01d1 vsc653 * 93 i_1197 ¦ 150 149;
I MDE ni01d1 vsc653 * 94 i_1198 ¦ 151 150;
I MDE nr02d1 vsc653 * 95 i_1199 ¦ 39 32 151;
I MDE in01d1 vsc653 * 96 i_1200 ¦ 84 148;
I MDE in01d4 vsc653 * 97 i_1202 ¦ 40 152;
I MDE in01d3 vsc653 * 98 i_1204 ¦ 41 153;
I MDE fn01d2 vsc653 * 99 i_1205 ¦ 154 155 156;
I MDE ni01d4 vsc653 * 100 i_11205 ¦ 156 28;
I MDE or03d1 vsc653 * 101 i_1206 ¦ 40 41 115 155;
I MDE nd02d1 vsc653 * 102 i_1207 ¦ 157 158 154;
I MDE or02d1 vsc653 * 103 i_1208 ¦ 114 159 158;
I MDE in01d1 vsc653 * 104 i_1209 ¦ 105 159;
I MDE nd04d1 vsc653 * 105 i_1210 ¦ 116 160 96 161 157;
I MDE in01d1 vsc653 * 106 i_1211 ¦ 162 161;
I MDE ni01d2 vsc653 * 107 i_1212 ¦ 27 162;
I MDE in01d1 vsc653 * 108 i_1213 ¦ 114 160;
I MDE nd03d1 vsc653 * 109 i_1214 ¦ 163 164 165 67;
I MDE fn01d1 vsc653 * 110 i_1215 ¦ 25 162 165;
I MDE nd03d1 vsc653 * 111 i_1216 ¦ 81 166 167 164;
I MDE nr02d1 vsc653 * 112 i_1217 ¦ 25 32 167;
I MDE fn05d1 vsc653 * 113 i_1218 ¦ 35 39 166;
I MDE nd04d1 vsc653 * 114 i_1219 ¦ 118 168 81 113 163;
I MDE nr03d1 vsc653 * 115 i_1220 ¦ 39 27 32 168;

```
I MDE nd03d1 vsc653 * 116 i_1221 ¦ 169 170 171 68;
I MDE fn01d1 vsc653 * 117 i_1222 ¦ 25 162 171;
I MDE nd03d1 vsc653 * 118 i_1223 ¦ 81 151 172 170;
I MDE fn05d1 vsc653 * 119 i_1224 ¦ 35 25 172;
I MDE nd04d1 vsc653 * 120 i_1225 ¦ 107 151 81 117 169;
I MDE fn01d2 vsc653 * 121 i_1226 ¦ 173 174 175;
I MDE ni01d4 vsc653 * 122 i_11226 ¦ 175 29;
I MDE nd03d1 vsc653 * 123 i_1227 ¦ 152 41 86 174;
I MDE nr02d1 vsc653 * 124 i_1228 ¦ 176 112 173;
I MDE nd03d1 vsc653 * 125 i_1229 ¦ 96 151 107 176;
I MDE fn01d2 vsc653 * 126 i_1230 ¦ 177 178 179;
I MDE ni01d4 vsc653 * 127 i_11230 ¦ 179 30;
I MDE nd03d1 vsc653 * 128 i_1231 ¦ 40 41 86 178;
I MDE fn01d2 vsc653 * 129 i_1232 ¦ 180 181 177;
I MDE nd03d1 vsc653 * 130 i_1233 ¦ 96 182 183 181;
I MDE nr02d1 vsc653 * 131 i_1234 ¦ 105 25 183;
I MDE fn05d1 vsc653 * 132 i_1235 ¦ 35 114 182;
I MDE an03d1 vsc653 * 133 i_1236 ¦ 162 184 115 180;
I MDE in01d1 vsc653 * 134 i_1237 ¦ 25 184;
I MDE fn01d2 vsc653 * 135 i_1238 ¦ 185 186 187;
I MDE ni01d4 vsc653 * 136 i_11238 ¦ 187 31;
I MDE nd03d1 vsc653 * 137 i_1239 ¦ 153 40 86 186;
I MDE nr02d1 vsc653 * 138 i_1240 ¦ 176 108 185;
I MDE mfntnb vsc653 * 139 mrgr_ff_b3 ¦ 141 140 83 1 17 188;
I MDE dfctnb vsc653 * 140 mfaddr_ff_b2 ¦ 53 1 3 189 92;
I MDE dfntnb vsc653 * 141 mfaddw_ff_b0 ¦ 47 1 44 94;
I MDE dfntnb vsc653 * 142 mfaddw_ff_b1 ¦ 48 1 45 72;
I MDE dfntnb vsc653 * 143 mfaddw_ff_b2 ¦ 49 1 190 91;
I MDE dfctnb vsc653 * 144 mfaddwd_ff_b0 ¦ 54 2 3 47 125;
I MDE dfctnb vsc653 * 145 mfaddwd_ff_b2 ¦ 55 2 3 49 129;
I MDE dfctnb vsc653 * 146 mwrad1_ff ¦ 127 1 3 93 95;
I MDE dfctnb vsc653 * 147 mff_ff ¦ 135 1 3 191 38;
I MDE dfntnb vsc653 * 148 mrgw_ff ¦ 66 1 16 192;
I MDE dfntnb vsc653 * 149 mrgw_1_ff ¦ 58 1 15 193;
I MDE dfntnb vsc653 * 150 mrgw_2_ff ¦ 59 1 14 194;
I MDE dfntnb vsc653 * 151 mrgw_3_ff ¦ 57 1 13 195;
I MDE dfntnb vsc653 * 152 mrgw_4_ff ¦ 63 1 12 196;
I MDE dfntnb vsc653 * 153 mrgw_5_ff ¦ 56 1 11 197;
I MDE dfntnb vsc653 * 154 mrgw_6_ff ¦ 65 1 10 198;
I MDE dfntnb vsc653 * 155 mrgw_7_ff ¦ 64 1 9 199;
I MDE dfntnb vsc653 * 156 mrgr_ff_b0 ¦ 60 1 20 200;
I MDE dfntnb vsc653 * 157 mrgr_ff_b1 ¦ 61 1 19 201;
I MDE dfntnb vsc653 * 158 mrgr_ff_b2 ¦ 62 1 18 202;
I MDE dfntnb vsc653 * 159 mrgs_ff ¦ 143 1 21 203;
E netlist

B subcells
```

MDE ad01d1 vsc653
MDE mfctnh vsc653
MDE mfptnh vsc653
MDE nt02d3 vsc653
MDE oa02d1 vsc653
MDE xn02d1 vsc653
MDE or03d1 vsc653
MDE xo02d1 vsc653
MDE nd03d1 vsc653
MDE in01d1 vsc653
MDE in01d2 vsc653
MDE or02d1 vsc653
MDE or04d1 vsc653
MDE ni01d1 vsc653
MDE an05d1 vsc653
MDE fn05d1 vsc653
MDE ni01d4 vsc653
MDE in01d3 vsc653
MDE fn01d1 vsc653
MDE fn01d2 vsc653
MDE an03d1 vsc653
MDE an02d1 vsc653
MDE an04d1 vsc653
MDE nr04d1 vsc653
MDE nr02d1 vsc653
MDE oa04d1 vsc653
MDE in01d4 vsc653
MDE nd02d1 vsc653
MDE nd04d1 vsc653
MDE ni01d2 vsc653
MDE nr03d1 vsc653
MDE mfntnb vsc653
MDE dfctnb vsc653
MDE dfntnb vsc653
E subcells

NMB_CTL_P NLS

```
#cell2 * nmb_ctl_p nls * 33 any 0 v8r4.6.2
# "19-Sep-94 GMT" "13:44:08 GMT" "19-Sep-94 GMT" "13:44:08 GMT" amir * .
writer        1
file_version  1
sections      1
netlist   1:        84 nmb_ctl_p


B contents:  nmb_ctl_p
netlist         252
cells          5904
switches          0
attributes        0
physical          0
history           0
E contents


B netlist
X 1 clk i;
X 2 clk_ i;
X 3 mrst_n i;
X 4 mff_ i;
X 5 mwrbadd[4] i;
X 6 mwrbadd[3] i;
X 7 mwrbadd[2] i;
X 8 mwrbadd[1] i;
X 9 mwrbadd[0] i;
X 10 mcof_we i;
X 11 mdat_we i;
X 12 mbwr o;
X 13 badd[3] i;
X 14 badd[2] i;
X 15 badd[1] i;
X 16 badd[0] i;
X 17 tstwb i;
X 18 tstuab[1] b;
X 19 tstuab[0] b;
X 20 mu_send i;
X 21 eu_send i;
X 22 du_send i;
X 23 su_send i;
X 24 rd_eu o;
X 25 rd_du o;
X 26 rd_su o;
```

```
X 27 mbddw[4] o;
X 28 mbddw[3] o;
X 29 mbddw[2] o;
X 30 mbddw[1] o;
X 31 mbddw[0] o;
X 32 mwrr o;
X 33 mwrl o;
X 34 mmv_rec o;
X 35 mb_recc o;
X 36 mb_recd o;
X 37 mb_rech o;
X 38 mb_rec6 o;
X 39 mb_rec7 o;
X 40 mb_rec3 o;
G 41 VDD;
G 42 VSS;
N 55 rd_sus;
N 56 wrub[0];
N 57 wrub[1];
N 58 mbwrd;
N 61 mb_rec3_n;
N 62 mb_rec7_n;
N 63 mb_rec6_n;
N 64 mb_rech_n;
N 65 mb_recd_n;
N 66 mb_recc_n;
N 67 mbddwd[4];
N 68 rd_sud;
N 69 rd_eud;
N 70 rd_dud;
N 71 mwrrdp;
N 72 mwrldp;
N 37 mb_rech_1_q;
N 39 mb_rec7_1_q;
N 12 mbwr_1_q;
N 33 npulsw_mwrl_wr_[0];
N 36 mb_recd_1_q;
N 32 npulsw_mwrr_wr_[0];
N 35 mb_recc_1_q;
N 40 mb_rec3_1_q;
N 38 mb_rec6_1_q;
N 27 mbddw_1_q[4];
N 28 mbddw_1_q[3];
N 29 mbddw_1_q[2];
N 30 mbddw_1_q[1];
N 31 mbddw_1_q[0];
N 19 tstuab_1[0];
N 18 tstuab_1[1];
```

N 55 rd_sus_1_q;
N 58 mbwrd_1[0];
N 58 mbwr_n;
N 67 mbddw_n[4];
N 68 rd_sud_1[0];
N 68 rd_sus_n;
N 69 rd_eud_1[0];
N 69 rd_eus_n;
N 70 rd_dud_1[0];
N 70 rd_dus_n;
N 71 mwrrdp_1[0];
N 72 mwrldp_1[0];
N 34 mmv_rec_1[0];
V mwrbadd 4 0 ¦ 5 6 7 8 9;
V badd 3 0 ¦ 13 14 15 16;
V tstuab 1 0 ¦ 18 19;
V mbddw 4 0 ¦ 27 28 29 30 31;
V wrub 1 0 ¦ 57 56;
V rd_dud_1 0 0 ¦ 70;
V rd_eud_1 0 0 ¦ 69;
V rd_sud_1 0 0 ¦ 68;
V mbwrd_1 0 0 ¦ 58;
V mwrrdp_1 0 0 ¦ 71;
V npulsw_mwrr_wr_ 0 0 ¦ 32;
V mwrldp_1 0 0 ¦ 72;
V npulsw_mwrl_wr_ 0 0 ¦ 33;
V mmv_rec_1 0 0 ¦ 34;
V mbddw_1_q 4 0 ¦ 27 28 29 30 31;
V tstuab_1 1 0 ¦ 18 19;
M MDE rp01d1 vsc653 ¦ Z ¦ ;
M NLS npulsw2_p * ¦ wrd clk clk_ wr_ reset_ ¦ iiioi;
M MDE in01d2 vsc653 ¦ I ZN ¦ ;
M MDE fn01d2 vsc653 ¦ A1 B1 ZN ¦ ;
M MDE or03d1 vsc653 ¦ A1 A2 A3 Z ¦ ;
M MDE in01d1 vsc653 ¦ I ZN ¦ ;
M MDE nr02d1 vsc653 ¦ A1 A2 ZN ¦ ;
M MDE nd02d1 vsc653 ¦ A1 A2 ZN ¦ ;
M MDE in01d3 vsc653 ¦ I ZN ¦ ;
M MDE an03d1 vsc653 ¦ A1 A2 A3 Z ¦ ;
M MDE nd03d1 vsc653 ¦ A1 A2 A3 ZN ¦ ;
M MDE nr03d1 vsc653 ¦ A1 A2 A3 ZN ¦ ;
M MDE an02d1 vsc653 ¦ A1 A2 Z ¦ ;
M MDE nr04d1 vsc653 ¦ A1 A2 A3 A4 ZN ¦ ;
M MDE fn05d1 vsc653 ¦ A1 B1 ZN ¦ ;
M MDE nt02d3 vsc653 ¦ I Z OEN ¦ ;
M MDE mfntnb vsc653 ¦ DA DB SA CP Q QN ¦ ;
M MDE dfntnb vsc653 ¦ D CP Q QN ¦ ;
I MDE rp01d1 vsc653 * 1 u2 ¦ 16;

I MDE rp01d1 vsc653 * 2 u3 ¦ 15;
I MDE rp01d1 vsc653 * 3 u4 ¦ 14;
I MDE rp01d1 vsc653 * 4 u5 ¦ 13;
I NLS npulsw2_p * * 5 npulsw_mwrr ¦ 71 1 2 32 3;
I NLS npulsw2_p * * 6 npulsw_mwrl ¦ 72 1 2 33 3;
I MDE in01d2 vsc653 * 7 i_371 ¦ 73 56;
I MDE fn01d2 vsc653 * 8 i_372 ¦ 74 4 73;
I MDE fn01d2 vsc653 * 9 i_373 ¦ 55 73 57;
I MDE or03d1 vsc653 * 10 i_374 ¦ 57 77 78 58;
I MDE in01d1 vsc653 * 11 i_375 ¦ 79 77;
I MDE in01d1 vsc653 * 12 i_376 ¦ 17 79;
I MDE in01d1 vsc653 * 13 i_378 ¦ 20 81;
I MDE nr02d1 vsc653 * 14 i_381 ¦ 83 84 61;
I MDE or03d1 vsc653 * 15 i_382 ¦ 85 14 13 84;
I MDE nd02d1 vsc653 * 16 i_383 ¦ 16 15 85;
I MDE in01d1 vsc653 * 17 i_384 ¦ 24 83;
I MDE fn01d2 vsc653 * 18 i_385 ¦ 86 87 24;
I MDE or03d1 vsc653 * 19 i_386 ¦ 88 89 79 87;
I MDE in01d3 vsc653 * 20 i_387 ¦ 90 89;
I MDE in01d1 vsc653 * 21 i_388 ¦ 18 90;
I MDE in01d3 vsc653 * 22 i_389 ¦ 92 88;
I MDE in01d1 vsc653 * 23 i_390 ¦ 19 92;
I MDE nr02d1 vsc653 * 24 i_391 ¦ 77 94 86;
I MDE an03d1 vsc653 * 25 i_392 ¦ 95 96 16 62;
I MDE in01d1 vsc653 * 26 i_393 ¦ 13 96;
I MDE in01d1 vsc653 * 27 i_394 ¦ 97 95;
I MDE nd03d1 vsc653 * 28 i_395 ¦ 98 14 15 97;
I MDE an03d1 vsc653 * 29 i_396 ¦ 88 90 77 98;
I MDE nr03d1 vsc653 * 30 i_397 ¦ 97 16 13 63;
I MDE nr02d1 vsc653 * 31 i_398 ¦ 101 85 64;
I MDE nd03d1 vsc653 * 32 i_399 ¦ 98 14 13 101;
I MDE nr03d1 vsc653 * 33 i_400 ¦ 101 15 103 65;
I MDE in01d1 vsc653 * 34 i_401 ¦ 16 103;
I MDE nr03d1 vsc653 * 35 i_402 ¦ 101 15 16 66;
I MDE an02d1 vsc653 * 36 i_404 ¦ 20 5 67;
I MDE nr04d1 vsc653 * 37 i_405 ¦ 22 20 21 75 68;
I MDE in01d1 vsc653 * 38 i_406 ¦ 23 75;
I MDE an03d1 vsc653 * 39 i_407 ¦ 80 81 21 69;
I MDE in01d1 vsc653 * 40 i_408 ¦ 22 80;
I MDE an02d1 vsc653 * 41 i_409 ¦ 81 22 70;
I MDE fn01d2 vsc653 * 42 i_410 ¦ 82 91 25;
I MDE nd03d1 vsc653 * 43 i_411 ¦ 88 89 77 91;
I MDE nr02d1 vsc653 * 44 i_412 ¦ 93 77 82;
I MDE in01d1 vsc653 * 45 i_413 ¦ 56 93;
I MDE fn01d2 vsc653 * 46 i_414 ¦ 99 100 26;
I MDE nd03d1 vsc653 * 47 i_415 ¦ 89 92 77 100;
I MDE nr02d1 vsc653 * 48 i_416 ¦ 77 102 99;
I MDE or03d1 vsc653 * 49 i_417 ¦ 10 98 26 71;

```
I MDE nd03d1 vsc653 * 50 i_418 ¦ 83 60 76 72;
I MDE in01d1 vsc653 * 51 i_419 ¦ 11 76;
I MDE in01d1 vsc653 * 52 i_420 ¦ 25 60;
I MDE an02d1 vsc653 * 53 i_421 ¦ 50 104 34;
I MDE in01d1 vsc653 * 54 i_422 ¦ 60 104;
I MDE fn05d1 vsc653 * 55 i_423 ¦ 13 14 50;
I MDE nt02d3 vsc653 * 56 u68 ¦ 56 19 17;
I MDE nt02d3 vsc653 * 57 u69 ¦ 57 18 17;
I MDE mfntnb vsc653 * 58 mbddw_ff_b3 ¦ 13 6 81 1 28 54;
I MDE mfntnb vsc653 * 59 mbddw_ff_b2 ¦ 14 7 81 1 29 46;
I MDE mfntnb vsc653 * 60 mbddw_ff_b1 ¦ 15 8 81 1 30 45;
I MDE mfntnb vsc653 * 61 mbddw_ff_b0 ¦ 16 9 81 1 31 59;
I MDE dfntnb vsc653 * 62 rd_dus_ff ¦ 70 1 43 74;
I MDE dfntnb vsc653 * 63 rd_eus_ff ¦ 69 1 78 94;
I MDE dfntnb vsc653 * 64 rd_sus_ff ¦ 68 1 55 102;
I MDE dfntnb vsc653 * 65 mbwr_ff ¦ 58 2 12 48;
I MDE dfntnb vsc653 * 66 mbddw_ff_b4 ¦ 67 1 27 44;
I MDE dfntnb vsc653 * 67 mb_recc_ff ¦ 66 1 35 52;
I MDE dfntnb vsc653 * 68 mb_recd_ff ¦ 65 1 36 49;
I MDE dfntnb vsc653 * 69 mb_rech_ff ¦ 64 1 37 51;
I MDE dfntnb vsc653 * 70 mb_rec6_ff ¦ 63 1 38 53;
I MDE dfntnb vsc653 * 71 mb_rec7_ff ¦ 62 1 39 47;
I MDE dfntnb vsc653 * 72 mb_rec3_ff ¦ 61 1 40 105;
E netlist


B subcells
MDE rp01d1 vsc653
NLS npulsw2_p *
MDE in01d2 vsc653
MDE fn01d2 vsc653
MDE or03d1 vsc653
MDE in01d1 vsc653
MDE nr02d1 vsc653
MDE nd02d1 vsc653
MDE in01d3 vsc653
MDE an03d1 vsc653
MDE nd03d1 vsc653
MDE nr03d1 vsc653
MDE an02d1 vsc653
MDE nr04d1 vsc653
MDE fn05d1 vsc653
MDE nt02d3 vsc653
MDE mfntnb vsc653
MDE dfntnb vsc653
E subcells
```

NMM_P NLS

```
#cell2 * nmm_p nls * 32 any 0 v8r4.6.2
# "22-Sep-94 GMT" "15:20:09 GMT" "22-Sep-94 GMT" "15:20:09 GMT" amir * .
writer         1
file_version   1
sections       1
netlist   1:        80 nmm_p


B contents:  nmm_p
netlist        244
cells        16563
switches         0
attributes       0
physical         0
history          0
E contents


B netlist
X 1 reset_ i;
X 2 clk i;
X 3 clk_ i;
X 4 srst_n i;
X 5 mclk i;
X 6 mclk_ i;
X 7 rx_ck i;
X 8 abus[15] b;
X 9 abus[14] b;
X 10 abus[13] b;
X 11 abus[12] b;
X 12 abus[11] b;
X 13 abus[10] b;
X 14 abus[9] b;
X 15 abus[8] b;
X 16 abus[7] b;
X 17 abus[6] b;
X 18 abus[5] b;
X 19 abus[4] b;
X 20 abus[3] b;
X 21 abus[2] b;
X 22 abus[1] b;
X 23 abus[0] b;
X 24 awr i;
X 25 asoid i;
X 26 ard i;
```

```
X 27 samp i;
X 28 init i;
X 29 id[3] i;
X 30 id[2] i;
X 31 id[1] i;
X 32 id[0] i;
X 33 upd i;
X 34 rdacc i;
X 35 tstu i;
X 36 mod_we i;
X 37 qut_we i;
X 38 wrb i;
X 39 brd i;
X 40 bbus[15] o;
X 41 bbus[14] o;
X 42 bbus[13] o;
X 43 bbus[12] o;
X 44 bbus[11] o;
X 45 bbus[10] o;
X 46 bbus[9] o;
X 47 bbus[8] o;
X 48 bbus[7] o;
X 49 bbus[6] o;
X 50 bbus[5] o;
X 51 bbus[4] o;
X 52 bbus[3] o;
X 53 bbus[2] o;
X 54 bbus[1] o;
X 55 bbus[0] o;
X 56 azero o;
X 57 quality o;
X 58 mod00_we i;
X 59 mod01_we i;
X 60 mod10_we i;
X 61 mod11_we i;
X 62 mod12_we i;
X 63 mod13_we i;
X 64 inval_we i;
X 65 f_we i;
X 66 f_en i;
X 67 ttfrz i;
X 68 ttmod[4] i;
X 69 ttmod[3] i;
X 70 ttmod[2] i;
X 71 ttmod[1] i;
X 72 ttmod[0] i;
X 73 ta_ck o;
X 74 ta_data o;
```

X 75 ta_le_ o;
X 76 tflgof o;
X 77 tflguf o;
G 78 VDD;
G 79 VSS;
N 81 madd[0];
N 82 madd[1];
N 83 madd[2];
N 84 sadd[0];
N 85 sadd[1];
N 86 sadd[2];
N 87 sadd[3];
N 88 coftst[0];
N 89 coftst[1];
N 90 sym_d[0];
N 91 sym_d[1];
N 92 sym_d[2];
N 93 sym_d[3];
N 94 sym_d[4];
N 95 sym_d[5];
N 98 path_d[0];
N 99 path_d[1];
N 100 path_d[2];
N 101 path_d[3];
N 102 path_d[4];
N 103 path_d[5];
N 105 bsym[0];
N 106 bsym[1];
N 107 selu0[0];
N 108 selu0[1];
N 109 selu0[2];
N 110 selu0[3];
N 111 selu1[0];
N 112 selu1[1];
N 113 selu1[2];
N 114 selu1[3];
N 115 selu1[4];
N 116 selu1[5];
N 117 selu1[6];
N 118 selu1[7];
N 119 selu0b[0];
N 120 selu0b[1];
N 121 selu0b[2];
N 122 selu0b[3];
N 123 selu0b[4];
N 124 selu0b[5];
N 125 selu0b[6];
N 126 selu0b[7];

```
N 127 selu1b[0];
N 128 selu1b[1];
N 129 selu1b[2];
N 130 selu1b[3];
N 131 selu1b[4];
N 132 selu1b[5];
N 133 selu1b[6];
N 134 selu1b[7];
N 135 inval[0];
N 136 inval[1];
N 137 inval[2];
N 138 inval[3];
N 139 inval[4];
N 140 inval[5];
N 141 inval[6];
N 142 inval[7];
N 143 inval[8];
N 144 inval[9];
N 145 inval[10];
N 146 inval[11];
N 147 inval[12];
N 148 inval[13];
N 149 inval[14];
N 150 inval[15];
N 151 abusd[0];
N 152 abusd[1];
N 153 abusd[2];
N 154 abusd[3];
N 155 abusd[4];
N 156 abusd[5];
N 157 abusd[6];
N 158 abusd[7];
N 159 abusd[8];
N 160 abusd[9];
N 161 abusd[10];
N 162 abusd[11];
N 163 abusd[12];
N 164 abusd[13];
N 165 abusd[14];
N 166 abusd[15];
N 167 t[0];
N 168 t[1];
N 169 t[2];
N 170 t[3];
N 171 t[4];
N 172 t[5];
N 173 t[6];
N 174 t[7];
```

```
N 175 t[8];
N 176 t[9];
N 177 t[10];
N 178 t[11];
N 179 t[12];
N 180 t[13];
N 181 t[14];
N 182 t[15];
N 183 selb[0];
N 184 selb[1];
N 185 selb[2];
N 186 selb[3];
N 187 selb[4];
N 188 selb[5];
N 189 selb[6];
N 190 selb[7];
N 191 selb[8];
N 192 selb[9];
N 193 selb[10];
N 194 selb[11];
N 195 selb[12];
N 196 selb[13];
N 197 selb[14];
N 198 selb[15];
N 199 selb[16];
N 200 selb[17];
N 201 selb[18];
N 202 selb[19];
N 203 selb[20];
N 204 selb[21];
N 205 selb[22];
N 206 selb[23];
N 207 selb[24];
N 208 selb[25];
N 209 selb[26];
N 210 selb[27];
N 211 selb[28];
N 212 selb[29];
N 213 selb[30];
N 214 selb[31];
N 215 accmsb[0];
N 216 accmsb[1];
N 217 accmsb[2];
N 218 accmsb[3];
N 219 accmsb[4];
N 220 accmsb[5];
N 221 accmsb[6];
N 222 wr0;
```

```
N 223 ms0;
N 224 zero0;
N 225 wr1;
N 226 ms1;
N 227 zero1;
N 228 wr2;
N 229 ms2;
N 230 zero2;
N 231 msq;
N 232 tovr;
N 233 tcout;
N 234 acctck;
N 235 enck;
N 236 minus;
N 237 en_sl;
N 238 tacc_sl;
N 239 tzero;
N 240 tta_ck;
N 8 smms_abus[15];
N 9 smms_abus[14];
N 10 smms_abus[13];
N 11 smms_abus[12];
N 12 smms_abus[11];
N 13 smms_abus[10];
N 14 smms_abus[9];
N 15 smms_abus[8];
N 16 smms_abus[7];
N 17 smms_abus[6];
N 18 smms_abus[5];
N 19 smms_abus[4];
N 20 smms_abus[3];
N 21 smms_abus[2];
N 22 smms_abus[1];
N 23 smms_abus[0];
N 40 smms_bbus[15];
N 41 smms_bbus[14];
N 42 smms_bbus[13];
N 43 smms_bbus[12];
N 44 smms_bbus[11];
N 45 smms_bbus[10];
N 46 smms_bbus[9];
N 47 smms_bbus[8];
N 48 smms_bbus[7];
N 49 smms_bbus[6];
N 50 smms_bbus[5];
N 51 smms_bbus[4];
N 52 smms_bbus[3];
N 53 smms_bbus[2];
```

N 54 smms_bbus[1];
N 55 smms_bbus[0];
N 56 nmmc_azero[0];
N 57 nmmc_quality[0];
N 73 nmmtc_ta_ck[0];
N 74 nmmtc_ta_data[0];
N 75 nmmtc_ta_le_[0];
N 76 nmmtc_tflgof[0];
N 77 nmmtc_tflguf[0];
N 81 nmmc_madd[0];
N 82 nmmc_madd[1];
N 83 nmmc_madd[2];
N 84 nmmc_sadd[0];
N 85 nmmc_sadd[1];
N 86 nmmc_sadd[2];
N 87 nmmc_sadd[3];
N 88 smms_tst[0];
N 89 smms_tst[1];
N 90 nmmc_sym_d[0];
N 91 nmmc_sym_d[1];
N 92 nmmc_sym_d[2];
N 93 nmmc_sym_d[3];
N 94 nmmc_sym_d[4];
N 95 nmmc_sym_d[5];
N 98 nmmc_path_d[0];
N 99 nmmc_path_d[1];
N 100 nmmc_path_d[2];
N 101 nmmc_path_d[3];
N 102 nmmc_path_d[4];
N 103 nmmc_path_d[5];
N 105 nmmc_bsym[0];
N 106 nmmc_bsym[1];
N 107 nmmtc_selu0[0];
N 108 nmmtc_selu0[1];
N 109 nmmtc_selu0[2];
N 110 nmmtc_selu0[3];
N 111 nmmtc_selu1[0];
N 112 nmmtc_selu1[1];
N 113 nmmtc_selu1[2];
N 114 nmmtc_selu1[3];
N 115 nmmtc_selu1[4];
N 116 nmmtc_selu1[5];
N 117 nmmtc_selu1[6];
N 118 nmmtc_selu1[7];
N 119 smms_selu0b[0];
N 120 smms_selu0b[1];
N 121 smms_selu0b[2];
N 122 smms_selu0b[3];

N 123 smms_selu0b[4];
N 124 smms_selu0b[5];
N 125 smms_selu0b[6];
N 126 smms_selu0b[7];
N 127 smms_selu1b[0];
N 128 smms_selu1b[1];
N 129 smms_selu1b[2];
N 130 smms_selu1b[3];
N 131 smms_selu1b[4];
N 132 smms_selu1b[5];
N 133 smms_selu1b[6];
N 134 smms_selu1b[7];
N 135 smms_invalb[0];
N 136 smms_invalb[1];
N 137 smms_invalb[2];
N 138 smms_invalb[3];
N 139 smms_invalb[4];
N 140 smms_invalb[5];
N 141 smms_invalb[6];
N 142 smms_invalb[7];
N 143 smms_invalb[8];
N 144 smms_invalb[9];
N 145 smms_invalb[10];
N 146 smms_invalb[11];
N 147 smms_invalb[12];
N 148 smms_invalb[13];
N 149 smms_invalb[14];
N 150 smms_invalb[15];
N 151 smms_abusd[0];
N 152 smms_abusd[1];
N 153 smms_abusd[2];
N 154 smms_abusd[3];
N 155 smms_abusd[4];
N 156 smms_abusd[5];
N 157 smms_abusd[6];
N 158 smms_abusd[7];
N 159 smms_abusd[8];
N 160 smms_abusd[9];
N 161 smms_abusd[10];
N 162 smms_abusd[11];
N 163 smms_abusd[12];
N 164 smms_abusd[13];
N 165 smms_abusd[14];
N 166 smms_abusd[15];
N 167 smmt_T[0];
N 168 smmt_T[1];
N 169 smmt_T[2];
N 170 smmt_T[3];

N 171 smmt_T[4];
N 172 smmt_T[5];
N 173 smmt_T[6];
N 174 smmt_T[7];
N 175 smmt_T[8];
N 176 smmt_T[9];
N 177 smmt_T[10];
N 178 smmt_T[11];
N 179 smmt_T[12];
N 180 smmt_T[13];
N 181 smmt_T[14];
N 182 smmt_T[15];
N 183 nmmtc_selb[0];
N 184 nmmtc_selb[1];
N 185 nmmtc_selb[2];
N 186 nmmtc_selb[3];
N 187 nmmtc_selb[4];
N 188 nmmtc_selb[5];
N 189 nmmtc_selb[6];
N 190 nmmtc_selb[7];
N 191 nmmtc_selb[8];
N 192 nmmtc_selb[9];
N 193 nmmtc_selb[10];
N 194 nmmtc_selb[11];
N 195 nmmtc_selb[12];
N 196 nmmtc_selb[13];
N 197 nmmtc_selb[14];
N 198 nmmtc_selb[15];
N 199 nmmtc_selb[16];
N 200 nmmtc_selb[17];
N 201 nmmtc_selb[18];
N 202 nmmtc_selb[19];
N 203 nmmtc_selb[20];
N 204 nmmtc_selb[21];
N 205 nmmtc_selb[22];
N 206 nmmtc_selb[23];
N 207 nmmtc_selb[24];
N 208 nmmtc_selb[25];
N 209 nmmtc_selb[26];
N 210 nmmtc_selb[27];
N 211 nmmtc_selb[28];
N 212 nmmtc_selb[29];
N 213 nmmtc_selb[30];
N 214 nmmtc_selb[31];
N 215 smmt_accmsb[0];
N 216 smmt_accmsb[1];
N 217 smmt_accmsb[2];
N 218 smmt_accmsb[3];

N 219 smmt_accmsb[4];
N 220 smmt_accmsb[5];
N 221 smmt_accmsb[6];
N 222 nmmc_wr0[0];
N 223 smms_subr0_OVR[0];
N 224 smms_zero0_Z[0];
N 225 nmmc_wr1[0];
N 226 smms_subr1_OVR[0];
N 227 smms_zero1_Z[0];
N 228 nmmc_wr2[0];
N 229 smms_subr2_OVR[0];
N 230 smms_zero2_Z[0];
N 231 smms_subrq_OVR[0];
N 232 smmt_subrt_OVR[0];
N 233 smmt_subrt_COUT[0];
N 234 nmmtc_acctck[0];
N 235 nmmtc_enck[0];
N 236 nmmtc_minus[0];
N 237 nmmtc_en_sl[0];
N 238 nmmtc_tacc_sl[0];
N 239 nmmtc_tzero[0];
N 240 nmmtc_tta_ck[0];
V abus 15 0 ¦ 8 9 10 11 12 13 14 15 16 17 18 19 20 21 22 23;
V id 3 0 ¦ 29 30 31 32;
V bbus 15 0 ¦ 40 41 42 43 44 45 46 47 48 49 50 51 52 53 54 55;
V ttmod 4 0 ¦ 68 69 70 71 72;
V madd 2 0 ¦ 83 82 81;
V sadd 3 0 ¦ 87 86 85 84;
V coftst 1 0 ¦ 89 88;
V sym_d 7 0 ¦ 79 79 95 94 93 92 91 90;
V path_d 7 0 ¦ 79 79 103 102 101 100 99 98;
V bsym 1 0 ¦ 106 105;
V selu0 3 0 ¦ 110 109 108 107;
V selu1 7 0 ¦ 118 117 116 115 114 113 112 111;
V selu0b 7 0 ¦ 126 125 124 123 122 121 120 119;
V selu1b 7 0 ¦ 134 133 132 131 130 129 128 127;
V inval 15 0 ¦ 150 149 148 147 146 145 144 143 142 141 140 139 138 137 136 135;
V abusd 15 0 ¦ 166 165 164 163 162 161 160 159 158 157 156 155 154 153 152 151;
V t 15 0 ¦ 182 181 180 179 178 177 176 175 174 173 172 171 170 169 168 167;
V selb 31 0 ¦ 214 213 212 211 210 209 208 207 206 205 204 203 202 201 200 199 19-
8 197 196 195 194 193 192 191 190 189 188 187 186 185 184 183;
V accmsb 6 0 ¦ 221 220 219 218 217 216 215;
V smms_abus 15 0 ¦ 8 9 10 11 12 13 14 15 16 17 18 19 20 21 22 23;
V smms_abusd 15 0 ¦ 166 165 164 163 162 161 160 159 158 157 156 155 154 153 152 -
151;
V smms_bbus 15 0 ¦ 40 41 42 43 44 45 46 47 48 49 50 51 52 53 54 55;
V smms_invalb 15 0 ¦ 150 149 148 147 146 145 144 143 142 141 140 139 138 137 136-
135;

```
V smms_selu0b 7 0 ¦ 126 125 124 123 122 121 120 119;
V smms_selu1b 7 0 ¦ 134 133 132 131 130 129 128 127;
V smms_subr0_OVR 0 0 ¦ 223;
V smms_subr1_OVR 0 0 ¦ 226;
V smms_subr2_OVR 0 0 ¦ 229;
V smms_subrq_OVR 0 0 ¦ 231;
V smms_tst 1 0 ¦ 89 88;
V smms_zero0_Z 0 0 ¦ 224;
V smms_zero1_Z 0 0 ¦ 227;
V smms_zero2_Z 0 0 ¦ 230;
V nmmc_wr0 0 0 ¦ 222;
V nmmc_wr1 0 0 ¦ 225;
V nmmc_wr2 0 0 ¦ 228;
V nmmc_sym_d 7 0 ¦ 79 79 95 94 93 92 91 90;
V nmmc_path_d 7 0 ¦ 79 79 103 102 101 100 99 98;
V nmmc_madd 2 0 ¦ 83 82 81;
V nmmc_sadd 3 0 ¦ 87 86 85 84;
V nmmc_azero 0 0 ¦ 56;
V nmmc_quality 0 0 ¦ 57;
V nmmc_bsym 1 0 ¦ 106 105;
V nmmtc_ta_ck 0 0 ¦ 73;
V nmmtc_ta_data 0 0 ¦ 74;
V nmmtc_ta_le_ 0 0 ¦ 75;
V nmmtc_selu1 7 0 ¦ 118 117 116 115 114 113 112 111;
V nmmtc_selu0 3 0 ¦ 110 109 108 107;
V nmmtc_selb 31 0 ¦ 214 213 212 211 210 209 208 207 206 205 204 203 202 201 200 -
199 198 197 196 195 194 193 192 191 190 189 188 187 186 185 184 183;
V nmmtc_acctck 0 0 ¦ 234;
V nmmtc_enck 0 0 ¦ 235;
V nmmtc_minus 0 0 ¦ 236;
V nmmtc_en_sl 0 0 ¦ 237;
V nmmtc_tacc_sl 0 0 ¦ 238;
V nmmtc_tzero 0 0 ¦ 239;
V nmmtc_tta_ck 0 0 ¦ 240;
V nmmtc_tflgof 0 0 ¦ 76;
V nmmtc_tflguf 0 0 ¦ 77;
V smmt_accmsb 6 0 ¦ 221 220 219 218 217 216 215;
V smmt_subrt_COUT 0 0 ¦ 233;
V smmt_subrt_OVR 0 0 ¦ 232;
V smmt_T 15 0 ¦ 182 181 180 179 178 177 176 175 174 173 172 171 170 169 168 167;
M NLS nmmc_p * ¦ reset_ samp init upd rdacc mclk mclk_ tstu mod_we cof1514[1] co-
f1514[0] zero0 zero1 zero2 ms0 ms1 ms2 id[3] id[2] id[1] id[0] wr0 wr1 wr2 sym_d-
[7] sym_d[6] sym_d[5] sym_d[4] sym_d[3] sym_d[2] sym_d[1] sym_d[0] path_d[7] pat-
h_d[6] path_d[5] path_d[4] path_d[3] path_d[2] path_d[1] path_d[0] madd[2] madd[-
1] madd[0] sadd[3] sadd[2] sadd[1] sadd[0] azero msq rx_ck quality asoid bsym[1]-
bsym[0] ¦ iiiiiiiiiiiiiiiiiiiiooooooooooooooooooooooooooooooiioioo;
M NLS nmmtc_p * ¦ clk clk_ reset_ f_en rx_ck ta_ck ta_data ta_le_ t[15] t[14] t[-
13] t[12] t[11] t[10] t[9] t[8] t[7] t[6] t[5] t[4] t[3] t[2] t[1] t[0] ttfrz tt-
```

mod[4] ttmod[3] ttmod[2] ttmod[1] ttmod[0] selu1[7] selu1[6] selu1[5] selu1[4] s-elu1[3] selu1[2] selu1[1] selu1[0] selu0[3] selu0[2] selu0[1] selu0[0] selu0b[7]-selu0b[6] selu0b[5] selu0b[4] selu0b[3] selu0b[2] selu0b[1] selu0b[0] selu1b[7]-selu1b[6] selu1b[5] selu1b[4] selu1b[3] selu1b[2] selu1b[1] selu1b[0] selb[31] -selb[30] selb[29] selb[28] selb[27] selb[26] selb[25] selb[24] selb[23] selb[22]-selb[21] selb[20] selb[19] selb[18] selb[17] selb[16] selb[15] selb[14] selb[13-] selb[12] selb[11] selb[10] selb[9] selb[8] selb[7] selb[6] selb[5] selb[4] sel-b[3] selb[2] selb[1] selb[0] accmsb[6] accmsb[5] accmsb[4] accmsb[3] accmsb[2] a-ccmsb[1] accmsb[0] tovr tcout acctck enck minus en_sl tacc_sl tzero bsym[1] bsym-[0] tta_ck tflgof tflguf ¦ iiiiioooiiiiiiiiiiiiiiiiiiiiiiiooooooooooooiiiiiiiiii-iiiiiooooooooooooooooooooooooooooooooiiiiiiiiioooooooiiooo;
M MDE ni01d5 vsc653 ¦ I Z ¦ ;
M MDE MDP(nmmsto) * ¦ accu0_cp accu0_init accu1_cp accu1_init accu2_cp accu2_ini-t ard areg_cp brd cp qtru_cp qtru_init sadd[3] sadd[2] sadd[1] sadd[0] sel0 sel1-sel2 selu0[3] selu0[2] selu0[1] selu0[0] selu1[7] selu1[6] selu1[5] selu1[4] se-lu1[3] selu1[2] selu1[1] selu1[0] soidrg_cp soid[15] soid[14] soid[13] soid[12] -soid[11] soid[10] soid[9] soid[8] soid[7] soid[6] soid[5] soid[4] soid[3] soid[2-] soid[1] soid[0] subr0_CIN subr1_CIN subr2_CIN subrq_CIN transu[2] transu[1] tr-ansu[0] transu_cp ureg00_init ureg01_init ureg10_cp ureg10_init ureg11_cp ureg11-_init ureg12_cp ureg12_init ureg13_cp ureg13_init abus[15] abus[14] abus[13] abu-s[12] abus[11] abus[10] abus[9] abus[8] abus[7] abus[6] abus[5] abus[4] abus[3] -abus[2] abus[1] abus[0] bbus[15] bbus[14] bbus[13] bbus[12] bbus[11] bbus[10] bb-us[9] bbus[8] bbus[7] bbus[6] bbus[5] bbus[4] bbus[3] bbus[2] bbus[1] bbus[0] se-lu0b[7] selu0b[6] selu0b[5] selu0b[4] selu0b[3] selu0b[2] selu0b[1] selu0b[0] se-lu1b[7] selu1b[6] selu1b[5] selu1b[4] selu1b[3] selu1b[2] selu1b[1] selu1b[0] su-br0_COUT subr0_OVR subr1_COUT subr1_OVR subr2_COUT subr2_OVR subrq_COUT subrq_OV-R tst[15] tst[14] zero0_Z zero1_Z zero2_Z inval_cp inval_init invalb[15] invalb[-14] invalb[13] invalb[12] invalb[11] invalb[10] invalb[9] invalb[8] invalb[7] in-valb[6] invalb[5] invalb[4] invalb[3] invalb[2] invalb[1] invalb[0] frg_cp abusd-[15] abusd[14] abusd[13] abusd[12] abusd[11] abusd[10] abusd[9] abusd[8] abusd[7-] abusd[6] abusd[5] abusd[4] abusd[3] abusd[2] abusd[1] abusd[0] ureg00_cp ureg0-1_cp ¦ iiiiiiiiiiiiiiiiiiiiiiiiiiiiiiiiiiiiiiiiiiiiiiiiiiiiiiiiiiiiiiiiioooooooo-ooooooooooooooooooooooooooooooooooooooooooooooooooooooiioooooooooooooooooiooooooo-ooooooooooii;
M MDE MDP(nmmt) * ¦ abusd[47] abusd[46] abusd[45] abusd[44] abusd[43] abusd[42] -abusd[41] abusd[40] abusd[39] abusd[38] abusd[37] abusd[36] abusd[35] abusd[34] -abusd[33] abusd[32] accu accu_cp cp en en_cp inval[41] inval[40] inval[39] inval-[38] inval[37] inval[36] inval[35] inval[34] inval[33] inval[32] inval[31] inval-[30] inval[29] inval[28] inval[27] inval[26] min selb[31] selb[30] selb[29] selb-[28] selb[27] selb[26] selb[25] selb[24] selb[23] selb[22] selb[21] selb[20] sel-b[19] selb[18] selb[17] selb[16] selb[15] selb[14] selb[13] selb[12] selb[11] se-lb[10] selb[9] selb[8] selb[7] selb[6] selb[5] selb[4] selb[3] selb[2] selb[1] s-elb[0] subrt_CIN zer subrt_COUT subrt_OVR T[41] T[40] T[39] T[38] T[37] T[36] T[-35] T[34] T[33] T[32] T[31] T[30] T[29] T[28] T[27] T[26] accmsb[47] accmsb[46] -accmsb[45] accmsb[44] accmsb[43] accmsb[42] accmsb[41] ¦ iiiiiiiiiiiiiiiiiiiii-iiiiiiiiiiiiiiiiiiiiiiiiiiiiiiiiiiiiiiiiiiiiiiiiooooooooooooooooooooooooo;

I NLS nmmc_p * * 1 nmmc ¦ 4 27 28 33 34 245 6 35 36 89 88 224 227 230 223 226 22-
9 29 30 31 32 222 225 228 97 96 95 94 93 92 91 90 104 80 103 102 101 100 99 98 8-
3 82 81 87 86 85 84 56 231 7 57 25 106 105;
I NLS nmmtc_p * * 2 nmmtc ¦ 2 3 1 66 7 73 74 75 182 181 180 179 178 177 176 175 -
174 173 172 171 170 169 168 167 67 68 69 70 71 72 118 117 116 115 114 113 112 11-
1 110 109 108 107 126 125 124 123 122 121 120 119 134 133 132 131 130 129 128 12-
7 214 213 212 211 210 209 208 207 206 205 204 203 202 201 200 199 198 197 196 19-
5 194 193 192 191 190 189 188 187 186 185 184 183 221 220 219 218 217 216 215 23-
2 233 234 235 236 237 238 239 106 105 240 76 77;
I MDE ni01d5 vsc653 * 3 i_10 ¦ 5 245;
I MDE MDP(nmmsto) * * 4 smms ¦ 222 28 225 28 228 28 26 24 39 5 37 4 87 86 85 84 -
33 33 33 110 109 108 107 118 117 116 115 114 113 112 111 25 79 79 95 94 93 92 91-
90 79 79 103 102 101 100 99 98 78 78 78 78 83 82 81 38 1 1 60 1 61 1 62 1 63 1 -
8 9 10 11 12 13 14 15 16 17 18 19 20 21 22 23 40 41 42 43 44 45 46 47 48 49 50 5-
1 52 53 54 55 126 125 124 123 122 121 120 119 134 133 132 131 130 129 128 127 24-
1 223 242 226 243 229 244 231 89 88 224 227 230 64 4 150 149 148 147 146 145 144-
143 142 141 140 139 138 137 136 135 65 166 165 164 163 162 161 160 159 158 157 -
156 155 154 153 152 151 58 59;
I MDE MDP(nmmt) * * 5 smmt ¦ 166 165 164 163 162 161 160 159 158 157 156 155
154-
153 152 151 238 234 240 237 235 150 149 148 147 146 145 144 143 142 141 140 139-
138 137 136 135 236 214 213 212 211 210 209 208 207 206 205 204 203 202 201 200-
199 198 197 196 195 194 193 192 191 190 189 188 187 186 185 184 183 236 239 233-
232 182 181 180 179 178 177 176 175 174 173 172 171 170 169 168 167 221 220 219-
218 217 216 215;
E netlist B subcells
NLS nmmc_p *
NLS nmmtc_p *
MDE ni01d5 vsc653
MDE MDP(nmmsto) *
MDE MDP(nmmt) *
E subcells

NMMC_P NLS

#cell2 * nmmc_p nls * 34 any 0 v8r4.6.2
"11-Oct-94 GMT" "6:59:58 GMT" "11-Oct-94 GMT" "6:59:58 GMT" amir * .
writer 1
file_version 1
sections 1
netlist 1: 81 nmmc_p B contents: nmmc_p
netlist 246
cells 29733
switches 0
attributes 0
physical 0
history 0
E contents B netlist
X 1 reset_ i;
X 2 samp i;
X 3 init i;
X 4 upd i;
X 5 rdacc i;
X 6 mclk i;
X 7 mclk_ i;
X 8 tstu i;
X 9 mod_we i;
X 10 cof1514[1] i;
X 11 cof1514[0] i;
X 12 zero0 i;
X 13 zero1 i;
X 14 zero2 i;
X 15 ms0 i;
X 16 ms1 i;
X 17 ms2 i;
X 18 id[3] i;
X 19 id[2] i;
X 20 id[1] i;
X 21 id[0] i;
X 22 wr0 o;
X 23 wr1 o;
X 24 wr2 o;
X 25 sym_d[5] o;
X 26 sym_d[4] o;

```
X 27 sym_d[3] o;
X 28 sym_d[2] o;
X 29 sym_d[1] o;
X 30 sym_d[0] o;
X 31 path_d[5] o;
X 32 path_d[4] o;
X 33 path_d[3] o;
X 34 path_d[2] o;
X 35 path_d[1] o;
X 36 path_d[0] o;
X 37 madd[2] o;
X 38 madd[1] o;
X 39 madd[0] o;
X 40 sadd[3] o;
X 41 sadd[2] o;
X 42 sadd[1] o;
X 43 sadd[0] o;
X 44 azero o;
X 45 msq i;
X 46 rx_ck i;
X 47 quality o;
X 48 asoid i;
X 49 bsym[1] o;
X 50 bsym[0] o;
G 51 VDD;
G 52 VSS;
N 53 cleveld[0];
N 54 cleveld[1];
N 55 bsym0[0];
N 56 bsym0[1];
N 57 tst_add[0];
N 58 tst_add[1];
N 59 qcnt[0];
N 60 qcnt[1];
N 61 qcnt[2];
N 62 qcnt[3];
N 63 qcnt[4];
N 64 qcnt[5];
N 65 qcnt[6];
N 66 qcnt[7];
N 67 level2[0];
N 68 level2[1];
N 69 level1[0];
N 70 level1[1];
N 71 clevel[0];
N 72 clevel[1];
N 73 level0[0];
N 74 level0[1];
```

N 75 mid2[0];
N 76 mid2[1];
N 77 mid2[2];
N 78 mid2[3];
N 79 mid1[0];
N 80 mid1[1];
N 81 mid1[2];
N 82 mid1[3];
N 83 mid0[0];
N 84 mid0[1];
N 85 mid0[2];
N 86 mid0[3];
N 87 qcnt_n[0];
N 88 qcnt_n[1];
N 89 qcnt_n[2];
N 90 qcnt_n[3];
N 91 qcnt_n[4];
N 92 qcnt_n[5];
N 93 qcnt_n[6];
N 94 qcnt_n[7];
N 95 maddd[0];
N 96 maddd[1];
N 97 maddd[2];
N 98 i_1419_zn;
N 99 i_1415_zn;
N 100 i_1412_zn;
N 101 wrs0;
N 102 ll0;
N 103 i_1295_zn;
N 104 level0_ff_b0_qn;
N 105 i_1296_z;
N 106 i_1299_z;
N 107 i_1298_z;
N 108 wrs1;
N 109 ll1;
N 110 i_1301_zn;
N 111 level1_ff_b0_qn;
N 112 i_1302_z;
N 113 i_1305_z;
N 114 i_1304_z;
N 115 i_1308_z;
N 116 i_1306_zn;
N 117 i_1307_z;
N 118 wrs2;
N 119 ll2;
N 120 i_1310_zn;
N 121 level2_ff_b0_qn;
N 122 i_1311_z;

N 123 i_1314_z;
N 124 i_1313_z;
N 125 i_1316_zn;
N 126 i_1315_z;
N 127 level2_ff_b1_qn;
N 128 i_1319_z;
N 129 i_1318_z;
N 130 i_1320_z;
N 131 i_1322_z;
N 132 i_1326_zn;
N 133 i_1324_zn;
N 134 qup_n;
N 135 i_1325_zn;
N 136 qup_ff_qn;
N 137 i_1337_zn;
N 138 i_1328_zn;
N 139 i_1331_zn;
N 140 i_1330_zn;
N 141 i_1329_zn;
N 142 i_1336_zn;
N 143 i_1332_z;
N 144 i_1335_zn;
N 145 i_1334_zn;
N 146 i_1333_zn;
N 147 qcnt_ff_b0_qn;
N 148 qcnt_ff_b6_qn;
N 149 qcnt_ff_b1_qn;
N 150 qcnt_ff_b2_qn;
N 151 qcnt_ff_b3_qn;
N 152 qcnt_ff_b4_qn;
N 153 updd;
N 154 qup;
N 155 i_1338_z;
N 156 i_1339_z;
N 157 qcnt_ff_b5_qn;
N 158 qcnt_ff_b7_qn;
N 159 quatdd_ff_qn;
N 160 quatd;
N 161 i_1347_zn;
N 162 i_1342_zn;
N 163 i_1343_zn;
N 164 i_1345_z;
N 165 i_1344_zn;
N 166 i_1346_zn;
N 167 i_1348_zn;
N 168 i_1352_zn;
N 169 i_1350_zn;
N 170 i_1351_z;

N 171 i_1353_z;
N 172 i_1354_zn;
N 173 i_1364_zn;
N 174 i_1356_zn;
N 175 i_1357_zn;
N 176 i_1362_zn;
N 177 i_1358_z;
N 178 i_1359_zn;
N 179 i_1360_zn;
N 180 i_1361_z;
N 181 i_1363_zn;
N 182 i_1365_zn;
N 183 i_1366_zn;
N 184 i_1374_zn;
N 185 i_1368_zn;
N 186 i_1373_z;
N 187 i_1369_zn;
N 188 i_1371_zn;
N 189 i_1370_zn;
N 190 i_1372_z;
N 191 i_1377_z;
N 192 i_1375_zn;
N 193 i_1376_z;
N 194 i_1381_zn;
N 195 i_1379_zn;
N 196 i_1380_z;
N 197 i_1382_zn;
N 198 i_1383_zn;
N 199 i_1384_zn;
N 200 i_1393_zn;
N 201 i_1386_zn;
N 202 i_1387_zn;
N 203 i_1391_zn;
N 204 i_1388_zn;
N 205 i_1389_zn;
N 206 i_1390_z;
N 207 i_1392_zn;
N 208 i_1394_z;
N 209 i_1395_zn;
N 210 i_1399_zn;
N 211 i_1397_zn;
N 212 i_1398_z;
N 213 i_1400_z;
N 214 i_1401_zn;
N 215 i_1405_zn;
N 216 i_1404_zn;
N 217 i_1403_zn;
N 218 level0_ff_b1_qn;

N 219 i_1407_zn;
N 220 tst_add_ff_b1_qn;
N 221 i_1409_z;
N 222 i_1408_z;
N 223 level1_ff_b1_qn;
N 224 i_1411_zn;
N 225 i_1414_z;
N 226 lld2;
N 227 i_1418_z;
N 228 i_1417_zn;
N 229 lld1;
N 230 i_1422_z;
N 231 i_1421_zn;
N 232 lld0;
N 233 i_1424_z;
N 234 wrsd2;
N 235 i_1426_z;
N 236 wrsd1;
N 237 i_1428_z;
N 238 wrsd0;
N 239 i_1432_z;
N 240 i_1433_zn;
N 241 i_1435_z;
N 242 i_1437_z;
N 243 i_1439_z;
N 244 i_1441_z;
N 245 i_1443_z;
N 246 i_1445_z;
N 247 i_1447_z;
N 248 i_1449_z;
N 249 i_1451_z;
N 250 i_1458_zn;
N 251 i_1456_zn;
N 252 i_1453_zn;
N 253 i_1455_z;
N 254 i_1454_z;
N 255 i_1457_z;
N 256 i_1459_z;
N 257 i_1461_zn;
N 258 i_1472_z;
N 259 i_1480_zn;
N 260 i_1479_zn;
N 261 i_1481_z;
N 262 mid0_ff_b0_qn;
N 263 mid0_ff_b1_qn;
N 264 mid0_ff_b2_qn;
N 265 mid0_ff_b3_qn;
N 266 mid1_ff_b0_qn;

N 267 mid1_ff_b1_qn;
N 268 mid1_ff_b2_qn;
N 269 mid1_ff_b3_qn;
N 270 mid2_ff_b0_qn;
N 271 mid2_ff_b1_qn;
N 272 mid2_ff_b2_qn;
N 273 mid2_ff_b3_qn;
N 274 tst_add_ff_b0_qn;
N 275 bsym0_ff_b0_qn;
N 276 bsym0_ff_b1_qn;
N 277 updd_ff_qn;
N 278 quatdd_ff_q;
N 279 madd_ff_b0_qn;
N 280 madd_ff_b1_qn;
N 281 madd_ff_b2_qn;
N 282 quality_ff_q;
N 283 quality_ff_qn;
N 284 bsym_ff_b0_qn;
N 285 bsym_ff_b1_qn;
N 53 u107_S[0];
N 54 u107_CO[0];
N 55 bsym0_ff_b0_Q[0];
N 56 bsym0_ff_b1_Q[0];
N 57 tst_add_ff_b0_Q[0];
N 58 tst_add_ff_b1_Q[0];
N 59 qcnt_ff_b0_Q[0];
N 60 qcnt_ff_b1_Q[0];
N 61 qcnt_ff_b2_Q[0];
N 62 qcnt_ff_b3_Q[0];
N 63 qcnt_ff_b4_Q[0];
N 64 qcnt_ff_b5_Q[0];
N 65 qcnt_ff_b6_Q[0];
N 66 qcnt_ff_b7_Q[0];
N 67 level2_ff_b0_Q[0];
N 68 level2_ff_b1_Q[0];
N 69 level1_ff_b0_Q[0];
N 70 level1_ff_b1_Q[0];
N 71 clevel_ff_b0_Q[0];
N 72 clevel_ff_b1_Q[0];
N 73 level0_ff_b0_Q[0];
N 74 level0_ff_b1_Q[0];
N 75 mid2_ff_b0_Q[0];
N 76 mid2_ff_b1_Q[0];
N 77 mid2_ff_b2_Q[0];
N 78 mid2_ff_b3_Q[0];
N 79 mid1_ff_b0_Q[0];
N 80 mid1_ff_b1_Q[0];
N 81 mid1_ff_b2_Q[0];

N 82 mid1_ff_b3_Q[0];
N 83 mid0_ff_b0_Q[0];
N 84 mid0_ff_b1_Q[0];
N 85 mid0_ff_b2_Q[0];
N 86 mid0_ff_b3_Q[0];
N 87 i_1327_ZN[0];
N 88 i_1341_ZN[0];
N 89 i_1349_ZN[0];
N 90 i_1355_ZN[0];
N 91 i_1367_ZN[0];
N 92 i_1378_ZN[0];
N 93 i_1385_ZN[0];
N 94 i_1396_ZN[0];
N 95 i_1402_ZN[0];
N 96 i_1406_ZN[0];
N 97 i_1410_ZN[0];
N 98 i_1419_ZN_1[0];
N 99 i_1415_ZN_1[0];
N 100 i_1412_ZN_1[0];
N 101 wrs0_ff_Q[0];
N 102 ll0_ff_Q[0];
N 103 i_1295_ZN_1[0];
N 104 level0_ff_b0_QN_1[0];
N 105 i_1296_Z_1[0];
N 106 i_1299_Z_1[0];
N 107 i_1298_Z_1[0];
N 108 wrs1_ff_Q[0];
N 109 ll1_ff_Q[0];
N 110 i_1301_ZN_1[0];
N 111 level1_ff_b0_QN_1[0];
N 112 i_1302_Z_1[0];
N 113 i_1305_Z_1[0];
N 114 i_1304_Z_1[0];
N 115 i_1308_Z_1[0];
N 116 i_1306_ZN_1[0];
N 117 i_1307_Z_1[0];
N 118 wrs2_ff_Q[0];
N 119 ll2_ff_Q[0];
N 120 i_1310_ZN_1[0];
N 121 level2_ff_b0_QN_1[0];
N 122 i_1311_Z_1[0];
N 123 i_1314_Z_1[0];
N 124 i_1313_Z_1[0];
N 125 i_1316_ZN_1[0];
N 126 i_1315_Z_1[0];
N 127 level2_ff_b1_QN_1[0];
N 128 i_1319_Z_1[0];
N 129 i_1318_Z_1[0];

N 130 i_1320_Z_1[0];
N 131 i_1322_Z_1[0];
N 132 i_1326_ZN_1[0];
N 133 i_1324_ZN_1[0];
N 134 i_1323_ZN[0];
N 135 i_1325_ZN_1[0];
N 136 qup_ff_QN_1[0];
N 137 i_1337_ZN_1[0];
N 138 i_1328_ZN_1[0];
N 139 i_1331_ZN_1[0];
N 140 i_1330_ZN_1[0];
N 141 i_1329_ZN_1[0];
N 142 i_1336_ZN_1[0];
N 143 i_1332_Z_1[0];
N 144 i_1335_ZN_1[0];
N 145 i_1334_ZN_1[0];
N 146 i_1333_ZN_1[0];
N 147 qcnt_ff_b0_QN_1[0];
N 148 qcnt_ff_b6_QN_1[0];
N 149 qcnt_ff_b1_QN_1[0];
N 150 qcnt_ff_b2_QN_1[0];
N 151 qcnt_ff_b3_QN_1[0];
N 152 qcnt_ff_b4_QN_1[0];
N 153 updd_ff_Q[0];
N 154 qup_ff_Q[0];
N 155 i_1338_Z_1[0];
N 156 i_1339_Z_1[0];
N 157 qcnt_ff_b5_QN_1[0];
N 158 qcnt_ff_b7_QN_1[0];
N 159 quatdd_ff_QN_1[0];
N 160 i_1340_ZN[0];
N 161 i_1347_ZN_1[0];
N 162 i_1342_ZN_1[0];
N 163 i_1343_ZN_1[0];
N 164 i_1345_Z_1[0];
N 165 i_1344_ZN_1[0];
N 166 i_1346_ZN_1[0];
N 167 i_1348_ZN_1[0];
N 168 i_1352_ZN_1[0];
N 169 i_1350_ZN_1[0];
N 170 i_1351_Z_1[0];
N 171 i_1353_Z_1[0];
N 172 i_1354_ZN_1[0];
N 173 i_1364_ZN_1[0];
N 174 i_1356_ZN_1[0];
N 175 i_1357_ZN_1[0];
N 176 i_1362_ZN_1[0];
N 177 i_1358_Z_1[0];

N 178 i_1359_ZN_1[0];
N 179 i_1360_ZN_1[0];
N 180 i_1361_Z_1[0];
N 181 i_1363_ZN_1[0];
N 182 i_1365_ZN_1[0];
N 183 i_1366_ZN_1[0];
N 184 i_1374_ZN_1[0];
N 185 i_1368_ZN_1[0];
N 186 i_1373_Z_1[0];
N 187 i_1369_ZN_1[0];
N 188 i_1371_ZN_1[0];
N 189 i_1370_ZN_1[0];
N 190 i_1372_Z_1[0];
N 191 i_1377_Z_1[0];
N 192 i_1375_ZN_1[0];
N 193 i_1376_Z_1[0];
N 194 i_1381_ZN_1[0];
N 195 i_1379_ZN_1[0];
N 196 i_1380_Z_1[0];
N 197 i_1382_ZN_1[0];
N 198 i_1383_ZN_1[0];
N 199 i_1384_ZN_1[0];
N 200 i_1393_ZN_1[0];
N 201 i_1386_ZN_1[0];
N 202 i_1387_ZN_1[0];
N 203 i_1391_ZN_1[0];
N 204 i_1388_ZN_1[0];
N 205 i_1389_ZN_1[0];
N 206 i_1390_Z_1[0];
N 207 i_1392_ZN_1[0];
N 208 i_1394_Z_1[0];
N 209 i_1395_ZN_1[0];
N 210 i_1399_ZN_1[0];
N 211 i_1397_ZN_1[0];
N 212 i_1398_Z_1[0];
N 213 i_1400_Z_1[0];
N 214 i_1401_ZN_1[0];
N 215 i_1405_ZN_1[0];
N 216 i_1404_ZN_1[0];
N 217 i_1403_ZN_1[0];
N 218 level0_ff_b1_QN_1[0];
N 219 i_1407_ZN_1[0];
N 220 tst_add_ff_b1_QN_1[0];
N 221 i_1409_Z_1[0];
N 222 i_1408_Z_1[0];
N 223 level1_ff_b1_QN_1[0];
N 224 i_1411_ZN_1[0];
N 225 i_1414_Z_1[0];

N 226 i_1413_Z[0];
N 227 i_1418_Z_1[0];
N 228 i_1417_ZN_1[0];
N 229 i_1416_Z[0];
N 230 i_1422_Z_1[0];
N 231 i_1421_ZN_1[0];
N 232 i_1420_Z[0];
N 233 i_1424_Z_1[0];
N 234 i_1423_Z[0];
N 235 i_1426_Z_1[0];
N 236 i_1425_Z[0];
N 237 i_1428_Z_1[0];
N 238 i_1427_Z[0];
N 239 i_1432_Z_1[0];
N 240 i_1433_ZN_1[0];
N 241 i_1435_Z_1[0];
N 242 i_1437_Z_1[0];
N 243 i_1439_Z_1[0];
N 244 i_1441_Z_1[0];
N 245 i_1443_Z_1[0];
N 246 i_1445_Z_1[0];
N 247 i_1447_Z_1[0];
N 248 i_1449_Z_1[0];
N 249 i_1451_Z_1[0];
N 250 i_1458_ZN_1[0];
N 251 i_1456_ZN_1[0];
N 252 i_1453_ZN_1[0];
N 253 i_1455_Z_1[0];
N 254 i_1454_Z_1[0];
N 255 i_1457_Z_1[0];
N 256 i_1459_Z_1[0];
N 257 i_1461_ZN_1[0];
N 258 i_1472_Z_1[0];
N 259 i_1480_ZN_1[0];
N 260 i_1479_ZN_1[0];
N 261 i_1481_Z_1[0];
N 262 mid0_ff_b0_QN_1[0];
N 263 mid0_ff_b1_QN_1[0];
N 264 mid0_ff_b2_QN_1[0];
N 265 mid0_ff_b3_QN_1[0];
N 266 mid1_ff_b0_QN_1[0];
N 267 mid1_ff_b1_QN_1[0];
N 268 mid1_ff_b2_QN_1[0];
N 269 mid1_ff_b3_QN_1[0];
N 270 mid2_ff_b0_QN_1[0];
N 271 mid2_ff_b1_QN_1[0];
N 272 mid2_ff_b2_QN_1[0];
N 273 mid2_ff_b3_QN_1[0];

```
N 274 tst_add_ff_b0_QN_1[0];
N 275 bsym0_ff_b0_QN_1[0];
N 276 bsym0_ff_b1_QN_1[0];
N 277 updd_ff_QN_1[0];
N 278 quatdd_ff_Q_1[0];
N 279 madd_ff_b0_QN_1[0];
N 280 madd_ff_b1_QN_1[0];
N 281 madd_ff_b2_QN_1[0];
N 282 quality_ff_Q_1[0];
N 283 quality_ff_QN_1[0];
N 284 bsym_ff_b0_QN_1[0];
N 285 bsym_ff_b1_QN_1[0];
N 32 i_1442_Z[0];
N 22 i_1281_Z[0];
N 33 i_1444_Z[0];
N 39 madd_ff_b0_Q[0];
N 34 i_1446_Z[0];
N 35 i_1448_Z[0];
N 38 madd_ff_b1_Q[0];
N 36 i_1450_Z[0];
N 40 i_1452_Z[0];
N 37 madd_ff_b2_Q[0];
N 47 qual_buf_ZN[0];
N 50 bsym_ff_b0_Q[0];
N 30 i_1317_Z[0];
N 41 i_1460_Z[0];
N 49 bsym_ff_b1_Q[0];
N 42 i_1462_ZN[0];
N 29 i_1321_Z[0];
N 43 i_1463_ZN[0];
N 44 i_1469_Z[0];
N 23 i_1429_Z[0];
N 24 i_1430_Z[0];
N 25 i_1431_Z[0];
N 26 i_1434_Z[0];
N 27 i_1436_Z[0];
N 28 i_1438_Z[0];
N 31 i_1440_Z[0];
V cof1514 1 0 ¦ 10 11;
V id 3 0 ¦ 18 19 20 21;
V sym_d 5 0 ¦ 25 26 27 28 29 30;
V path_d 5 0 ¦ 31 32 33 34 35 36;
V madd 2 0 ¦ 37 38 39;
V sadd 3 0 ¦ 40 41 42 43;
V bsym 1 0 ¦ 49 50;
V cleveld 1 0 ¦ 54 53;
V bsym0 1 0 ¦ 56 55;
V tst_add 1 0 ¦ 58 57;
```

```
V qcnt 7 0 ¦ 66 65 64 63 62 61 60 59;
V level2 1 0 ¦ 68 67;
V level1 1 0 ¦ 70 69;
V clevel 1 0 ¦ 72 71;
V level0 1 0 ¦ 74 73;
V mid2 3 0 ¦ 78 77 76 75;
V mid1 3 0 ¦ 82 81 80 79;
V mid0 3 0 ¦ 86 85 84 83;
V qcnt_n 7 0 ¦ 94 93 92 91 90 89 88 87;
V maddd 2 0 ¦ 97 96 95;
V u107_CO 0 0 ¦ 54;
V u107_S 0 0 ¦ 53;
V i_1281_Z 0 0 ¦ 22;
V i_1295_ZN_1 0 0 ¦ 103;
V i_1296_Z_1 0 0 ¦ 105;
V i_1298_Z_1 0 0 ¦ 107;
V i_1299_Z_1 0 0 ¦ 106;
V i_1301_ZN_1 0 0 ¦ 110;
V i_1302_Z_1 0 0 ¦ 112;
V i_1304_Z_1 0 0 ¦ 114;
V i_1305_Z_1 0 0 ¦ 113;
V i_1306_ZN_1 0 0 ¦ 116;
V i_1307_Z_1 0 0 ¦ 117;
V i_1308_Z_1 0 0 ¦ 115;
V i_1310_ZN_1 0 0 ¦ 120;
V i_1311_Z_1 0 0 ¦ 122;
V i_1313_Z_1 0 0 ¦ 124;
V i_1314_Z_1 0 0 ¦ 123;
V i_1315_Z_1 0 0 ¦ 126;
V i_1316_ZN_1 0 0 ¦ 125;
V i_1317_Z 0 0 ¦ 30;
V i_1318_Z_1 0 0 ¦ 129;
V i_1319_Z_1 0 0 ¦ 128;
V i_1320_Z_1 0 0 ¦ 130;
V i_1321_Z 0 0 ¦ 29;
V i_1322_Z_1 0 0 ¦ 131;
V i_1323_ZN 0 0 ¦ 134;
V i_1324_ZN_1 0 0 ¦ 133;
V i_1325_ZN_1 0 0 ¦ 135;
V i_1326_ZN_1 0 0 ¦ 132;
V i_1327_ZN 0 0 ¦ 87;
V i_1328_ZN_1 0 0 ¦ 138;
V i_1329_ZN_1 0 0 ¦ 141;
V i_1330_ZN_1 0 0 ¦ 140;
V i_1331_ZN_1 0 0 ¦ 139;
V i_1332_Z_1 0 0 ¦ 143;
V i_1333_ZN_1 0 0 ¦ 146;
V i_1334_ZN_1 0 0 ¦ 145;
```

V i_1335_ZN_1 0 0 ¦ 144;
V i_1336_ZN_1 0 0 ¦ 142;
V i_1337_ZN_1 0 0 ¦ 137;
V i_1338_Z_1 0 0 ¦ 155;
V i_1339_Z_1 0 0 ¦ 156;
V i_1340_ZN 0 0 ¦ 160;
V i_1341_ZN 0 0 ¦ 88;
V i_1342_ZN_1 0 0 ¦ 162;
V i_1343_ZN_1 0 0 ¦ 163;
V i_1344_ZN_1 0 0 ¦ 165;
V i_1345_Z_1 0 0 ¦ 164;
V i_1346_ZN_1 0 0 ¦ 166;
V i_1347_ZN_1 0 0 ¦ 161;
V i_1348_ZN_1 0 0 ¦ 167;
V i_1349_ZN 0 0 ¦ 89;
V i_1350_ZN_1 0 0 ¦ 169;
V i_1351_Z_1 0 0 ¦ 170;
V i_1352_ZN_1 0 0 ¦ 168;
V i_1353_Z_1 0 0 ¦ 171;
V i_1354_ZN_1 0 0 ¦ 172;
V i_1355_ZN 0 0 ¦ 90;
V i_1356_ZN_1 0 0 ¦ 174;
V i_1357_ZN_1 0 0 ¦ 175;
V i_1358_Z_1 0 0 ¦ 177;
V i_1359_ZN_1 0 0 ¦ 178;
V i_1360_ZN_1 0 0 ¦ 179;
V i_1361_Z_1 0 0 ¦ 180;
V i_1362_ZN_1 0 0 ¦ 176;
V i_1363_ZN_1 0 0 ¦ 181;
V i_1364_ZN_1 0 0 ¦ 173;
V i_1365_ZN_1 0 0 ¦ 182;
V i_1366_ZN_1 0 0 ¦ 183;
V i_1367_ZN 0 0 ¦ 91;
V i_1368_ZN_1 0 0 ¦ 185;
V i_1369_ZN_1 0 0 ¦ 187;
V i_1370_ZN_1 0 0 ¦ 189;
V i_1371_ZN_1 0 0 ¦ 188;
V i_1372_Z_1 0 0 ¦ 190;
V i_1373_Z_1 0 0 ¦ 186;
V i_1374_ZN_1 0 0 ¦ 184;
V i_1375_ZN_1 0 0 ¦ 192;
V i_1376_Z_1 0 0 ¦ 193;
V i_1377_Z_1 0 0 ¦ 191;
V i_1378_ZN 0 0 ¦ 92;
V i_1379_ZN_1 0 0 ¦ 195;
V i_1380_Z_1 0 0 ¦ 196;
V i_1381_ZN_1 0 0 ¦ 194;
V i_1382_ZN_1 0 0 ¦ 197;

```
V i_1383_ZN_1 0 0 ¦ 198;
V i_1384_ZN_1 0 0 ¦ 199;
V i_1385_ZN 0 0 ¦ 93;
V i_1386_ZN_1 0 0 ¦ 201;
V i_1387_ZN_1 0 0 ¦ 202;
V i_1388_ZN_1 0 0 ¦ 204;
V i_1389_ZN_1 0 0 ¦ 205;
V i_1390_Z_1 0 0 ¦ 206;
V i_1391_ZN_1 0 0 ¦ 203;
V i_1392_ZN_1 0 0 ¦ 207;
V i_1393_ZN_1 0 0 ¦ 200;
V i_1394_Z_1 0 0 ¦ 208;
V i_1395_ZN_1 0 0 ¦ 209;
V i_1396_ZN 0 0 ¦ 94;
V i_1397_ZN_1 0 0 ¦ 211;
V i_1398_Z_1 0 0 ¦ 212;
V i_1399_ZN_1 0 0 ¦ 210;
V i_1400_Z_1 0 0 ¦ 213;
V i_1401_ZN_1 0 0 ¦ 214;
V i_1402_ZN 0 0 ¦ 95;
V i_1403_ZN_1 0 0 ¦ 217;
V i_1404_ZN_1 0 0 ¦ 216;
V i_1405_ZN_1 0 0 ¦ 215;
V i_1406_ZN 0 0 ¦ 96;
V i_1407_ZN_1 0 0 ¦ 219;
V i_1408_Z_1 0 0 ¦ 222;
V i_1409_Z_1 0 0 ¦ 221;
V i_1410_ZN 0 0 ¦ 97;
V i_1411_ZN_1 0 0 ¦ 224;
V i_1412_ZN_1 0 0 ¦ 100;
V i_1413_Z 0 0 ¦ 226;
V i_1414_Z_1 0 0 ¦ 225;
V i_1415_ZN_1 0 0 ¦ 99;
V i_1416_Z 0 0 ¦ 229;
V i_1417_ZN_1 0 0 ¦ 228;
V i_1418_Z_1 0 0 ¦ 227;
V i_1419_ZN_1 0 0 ¦ 98;
V i_1420_Z 0 0 ¦ 232;
V i_1421_ZN_1 0 0 ¦ 231;
V i_1422_Z_1 0 0 ¦ 230;
V i_1423_Z 0 0 ¦ 234;
V i_1424_Z_1 0 0 ¦ 233;
V i_1425_Z 0 0 ¦ 236;
V i_1426_Z_1 0 0 ¦ 235;
V i_1427_Z 0 0 ¦ 238;
V i_1428_Z_1 0 0 ¦ 237;
V i_1429_Z 0 0 ¦ 23;
V i_1430_Z 0 0 ¦ 24;
```

V i_1431_Z 0 0 ¦ 25;
V i_1432_Z_1 0 0 ¦ 239;
V i_1433_ZN_1 0 0 ¦ 240;
V i_1434_Z 0 0 ¦ 26;
V i_1435_Z_1 0 0 ¦ 241;
V i_1436_Z 0 0 ¦ 27;
V i_1437_Z_1 0 0 ¦ 242;
V i_1438_Z 0 0 ¦ 28;
V i_1439_Z_1 0 0 ¦ 243;
V i_1440_Z 0 0 ¦ 31;
V i_1441_Z_1 0 0 ¦ 244;
V i_1442_Z 0 0 ¦ 32;
V i_1443_Z_1 0 0 ¦ 245;
V i_1444_Z 0 0 ¦ 33;
V i_1445_Z_1 0 0 ¦ 246;
V i_1446_Z 0 0 ¦ 34;
V i_1447_Z_1 0 0 ¦ 247;
V i_1448_Z 0 0 ¦ 35;
V i_1449_Z_1 0 0 ¦ 248;
V i_1450_Z 0 0 ¦ 36;
V i_1451_Z_1 0 0 ¦ 249;
V i_1452_Z 0 0 ¦ 40;
V i_1453_ZN_1 0 0 ¦ 252;
V i_1454_Z_1 0 0 ¦ 254;
V i_1455_Z_1 0 0 ¦ 253;
V i_1456_ZN_1 0 0 ¦ 251;
V i_1457_Z_1 0 0 ¦ 255;
V i_1458_ZN_1 0 0 ¦ 250;
V i_1459_Z_1 0 0 ¦ 256;
V i_1460_Z 0 0 ¦ 41;
V i_1461_ZN_1 0 0 ¦ 257;
V i_1462_ZN 0 0 ¦ 42;
V i_1463_ZN 0 0 ¦ 43;
V i_1469_Z 0 0 ¦ 44;
V i_1472_Z_1 0 0 ¦ 258;
V i_1479_ZN_1 0 0 ¦ 260;
V i_1480_ZN_1 0 0 ¦ 259;
V i_1481_Z_1 0 0 ¦ 261;
V mid0_ff_b0_Q 0 0 ¦ 83;
V mid0_ff_b0_QN_1 0 0 ¦ 262;
V mid0_ff_b1_Q 0 0 ¦ 84;
V mid0_ff_b1_QN_1 0 0 ¦ 263;
V mid0_ff_b2_Q 0 0 ¦ 85;
V mid0_ff_b2_QN_1 0 0 ¦ 264;
V mid0_ff_b3_Q 0 0 ¦ 86;
V mid0_ff_b3_QN_1 0 0 ¦ 265;
V mid1_ff_b0_Q 0 0 ¦ 79;
V mid1_ff_b0_QN_1 0 0 ¦ 266;

V mid1_ff_b1_Q 0 0 ¦ 80;
V mid1_ff_b1_QN_1 0 0 ¦ 267;
V mid1_ff_b2_Q 0 0 ¦ 81;
V mid1_ff_b2_QN_1 0 0 ¦ 268;
V mid1_ff_b3_Q 0 0 ¦ 82;
V mid1_ff_b3_QN_1 0 0 ¦ 269;
V mid2_ff_b0_Q 0 0 ¦ 75;
V mid2_ff_b0_QN_1 0 0 ¦ 270;
V mid2_ff_b1_Q 0 0 ¦ 76;
V mid2_ff_b1_QN_1 0 0 ¦ 271;
V mid2_ff_b2_Q 0 0 ¦ 77;
V mid2_ff_b2_QN_1 0 0 ¦ 272;
V mid2_ff_b3_Q 0 0 ¦ 78;
V mid2_ff_b3_QN_1 0 0 ¦ 273;
V level0_ff_b0_Q 0 0 ¦ 73;
V level0_ff_b0_QN_1 0 0 ¦ 104;
V level0_ff_b1_Q 0 0 ¦ 74;
V level0_ff_b1_QN_1 0 0 ¦ 218;
V level1_ff_b0_Q 0 0 ¦ 69;
V level1_ff_b0_QN_1 0 0 ¦ 111;
V level1_ff_b1_Q 0 0 ¦ 70;
V level1_ff_b1_QN_1 0 0 ¦ 223;
V level2_ff_b0_Q 0 0 ¦ 67;
V level2_ff_b0_QN_1 0 0 ¦ 121;
V level2_ff_b1_Q 0 0 ¦ 68;
V level2_ff_b1_QN_1 0 0 ¦ 127;
V clevel_ff_b0_Q 0 0 ¦ 71;
V clevel_ff_b1_Q 0 0 ¦ 72;
V tst_add_ff_b0_Q 0 0 ¦ 57;
V tst_add_ff_b0_QN_1 0 0 ¦ 274;
V tst_add_ff_b1_Q 0 0 ¦ 58;
V tst_add_ff_b1_QN_1 0 0 ¦ 220;
V wrs0_ff_Q 0 0 ¦ 101;
V wrs1_ff_Q 0 0 ¦ 108;
V wrs2_ff_Q 0 0 ¦ 118;
V ll0_ff_Q 0 0 ¦ 102;
V ll1_ff_Q 0 0 ¦ 109;
V ll2_ff_Q 0 0 ¦ 119;
V bsym0_ff_b0_Q 0 0 ¦ 55;
V bsym0_ff_b0_QN_1 0 0 ¦ 275;
V bsym0_ff_b1_Q 0 0 ¦ 56;
V bsym0_ff_b1_QN_1 0 0 ¦ 276;
V qup_ff_Q 0 0 ¦ 154;
V qup_ff_QN_1 0 0 ¦ 136;
V updd_ff_Q 0 0 ¦ 153;
V updd_ff_QN_1 0 0 ¦ 277;
V quatdd_ff_Q_1 0 0 ¦ 278;
V quatdd_ff_QN_1 0 0 ¦ 159;

```
V qcnt_ff_b0_Q 0 0 ¦ 59;
V qcnt_ff_b0_QN_1 0 0 ¦ 147;
V qcnt_ff_b1_Q 0 0 ¦ 60;
V qcnt_ff_b1_QN_1 0 0 ¦ 149;
V qcnt_ff_b2_Q 0 0 ¦ 61;
V qcnt_ff_b2_QN_1 0 0 ¦ 150;
V qcnt_ff_b3_Q 0 0 ¦ 62;
V qcnt_ff_b3_QN_1 0 0 ¦ 151;
V qcnt_ff_b4_Q 0 0 ¦ 63;
V qcnt_ff_b4_QN_1 0 0 ¦ 152;
V qcnt_ff_b5_Q 0 0 ¦ 64;
V qcnt_ff_b5_QN_1 0 0 ¦ 157;
V qcnt_ff_b6_Q 0 0 ¦ 65;
V qcnt_ff_b6_QN_1 0 0 ¦ 148;
V qcnt_ff_b7_Q 0 0 ¦ 66;
V qcnt_ff_b7_QN_1 0 0 ¦ 158;
V madd_ff_b0_Q 0 0 ¦ 39;
V madd_ff_b0_QN_1 0 0 ¦ 279;
V madd_ff_b1_Q 0 0 ¦ 38;
V madd_ff_b1_QN_1 0 0 ¦ 280;
V madd_ff_b2_Q 0 0 ¦ 37;
V madd_ff_b2_QN_1 0 0 ¦ 281;
V quality_ff_Q_1 0 0 ¦ 282;
V quality_ff_QN_1 0 0 ¦ 283;
V qual_buf_ZN 0 0 ¦ 47;
V bsym_ff_b0_Q 0 0 ¦ 50;
V bsym_ff_b0_QN_1 0 0 ¦ 284;
V bsym_ff_b1_Q 0 0 ¦ 49;
V bsym_ff_b1_QN_1 0 0 ¦ 285;
M MDE ad01d1 vsc653 ¦ A B CI S CO ¦ ;
M MDE or02d1 vsc653 ¦ A1 A2 Z ¦ ;
M MDE nr02d1 vsc653 ¦ A1 A2 ZN ¦ ;
M MDE mx21d1 vsc653 ¦ I0 I1 S Z ¦ ;
M MDE xo02d1 vsc653 ¦ A1 A2 Z ¦ ;
M MDE in01d1 vsc653 ¦ I ZN ¦ ;
M MDE an02d1 vsc653 ¦ A1 A2 Z ¦ ;
M MDE fn01d2 vsc653 ¦ A1 B1 ZN ¦ ;
M MDE oa04d1 vsc653 ¦ A1 A2 B ZN ¦ ;
M MDE oa03d1 vsc653 ¦ A1 A2 B1 B2 C ZN ¦ ;
M MDE or05d1 vsc653 ¦ A1 A2 A3 A4 A5 Z ¦ ;
M MDE nd02d1 vsc653 ¦ A1 A2 ZN ¦ ;
M MDE in01d2 vsc653 ¦ I ZN ¦ ;
M MDE an03d1 vsc653 ¦ A1 A2 A3 Z ¦ ;
M MDE or08d1 vsc653 ¦ A1 A2 A3 A4 A5 A6 A7 A8 Z ¦ ;
M MDE oa07d1 vsc653 ¦ A1 A2 A3 B1 B2 ZN ¦ ;
M MDE ni01d1 vsc653 ¦ I Z ¦ ;
M MDE fn05d1 vsc653 ¦ A1 B1 ZN ¦ ;
M MDE xn02d1 vsc653 ¦ A1 A2 ZN ¦ ;
```

M MDE ni01d2 vsc653 ¦ I Z ¦ ;
M MDE fn05d2 vsc653 ¦ A1 B1 ZN ¦ ;
M MDE oa02d1 vsc653 ¦ A1 A2 A3 B1 B2 B3 ZN ¦ ;
M MDE in02d2 vsc653 ¦ I ZN ¦ ;
M MDE ao02d1 vsc653 ¦ A1 A2 A3 B1 B2 B3 ZN ¦ ;
M MDE in01d3 vsc653 ¦ I ZN ¦ ;
M MDE in02d1 vsc653 ¦ I ZN ¦ ;
M MDE ni01d4 vsc653 ¦ I Z ¦ ;
M MDE an03d2 vsc653 ¦ A1 A2 A3 Z ¦ ;
M MDE in01d5 vsc653 ¦ I ZN ¦ ;
M MDE mfctnh vsc653 ¦ DA DB SA CP CDN Q QN ¦ ;
M MDE mfptnh vsc653 ¦ DA DB SA CP SDN Q QN ¦ ;
M MDE lantnq vsc653 ¦ D E Q ¦ ;
M MDE lactnb vsc653 ¦ E D CDN Q QN ¦ ;
M MDE dfctnb vsc653 ¦ D CP CDN Q QN ¦ ;
M MDE dfptnb vsc653 ¦ D CP SDN Q QN ¦ ;
M MDE dfctnh vsc653 ¦ D CP CDN Q QN ¦ ;
I MDE ad01d1 vsc653 * 1 u107 ¦ 98 99 100 53 54;
I MDE or02d1 vsc653 * 2 i_1281 ¦ 4 101 22;
I MDE nr02d1 vsc653 * 3 i_1295 ¦ 101 102 103;
I MDE mx21d1 vsc653 * 4 i_1296 ¦ 71 104 102 105;
I MDE mx21d1 vsc653 * 5 i_1298 ¦ 72 106 102 107;
I MDE xo02d1 vsc653 * 6 i_1299 ¦ 74 73 106;
I MDE nr02d1 vsc653 * 7 i_1301 ¦ 108 109 110;
I MDE mx21d1 vsc653 * 8 i_1302 ¦ 71 111 109 112;
I MDE mx21d1 vsc653 * 9 i_1304 ¦ 72 113 109 114;
I MDE or02d1 vsc653 * 10 i_1305 ¦ 115 116 113;
I MDE in01d1 vsc653 * 11 i_1306 ¦ 117 116;
I MDE or02d1 vsc653 * 12 i_1307 ¦ 111 70 117;
I MDE an02d1 vsc653 * 13 i_1308 ¦ 111 70 115;
I MDE nr02d1 vsc653 * 14 i_1310 ¦ 118 119 120;
I MDE mx21d1 vsc653 * 15 i_1311 ¦ 71 121 119 122;
I MDE mx21d1 vsc653 * 16 i_1313 ¦ 72 123 119 124;
I MDE or02d1 vsc653 * 17 i_1314 ¦ 125 126 123;
I MDE an02d1 vsc653 * 18 i_1315 ¦ 67 127 126;
I MDE nr02d1 vsc653 * 19 i_1316 ¦ 127 67 125;
I MDE mx21d1 vsc653 * 20 i_1317 ¦ 128 77 129 30;
I MDE an02d1 vsc653 * 21 i_1318 ¦ 127 121 129;
I MDE mx21d1 vsc653 * 22 i_1319 ¦ 81 85 130 128;
I MDE or02d1 vsc653 * 23 i_1320 ¦ 70 69 130;
I MDE mx21d1 vsc653 * 24 i_1321 ¦ 131 78 129 29;
I MDE mx21d1 vsc653 * 25 i_1322 ¦ 82 86 130 131;
I MDE fn01d2 vsc653 * 26 i_1323 ¦ 132 133 134;
I MDE fn01d2 vsc653 * 27 i_1324 ¦ 135 45 133;
I MDE in01d1 vsc653 * 28 i_1325 ¦ 4 135;
I MDE nr02d1 vsc653 * 29 i_1326 ¦ 4 136 132;
I MDE oa04d1 vsc653 * 30 i_1327 ¦ 137 59 138 87;
I MDE oa03d1 vsc653 * 31 i_1328 ¦ 139 140 59 141 137 138;

I MDE in01d1 vsc653 * 32 i_1329 ¦ 139 141;
I MDE in01d1 vsc653 * 33 i_1330 ¦ 59 140;
I MDE fn01d2 vsc653 * 34 i_1331 ¦ 142 143 139;
I MDE or05d1 vsc653 * 35 i_1332 ¦ 144 66 64 145 146 143;
I MDE nd02d1 vsc653 * 36 i_1333 ¦ 147 148 146;
I MDE nd02d1 vsc653 * 37 i_1334 ¦ 149 150 145;
I MDE nd02d1 vsc653 * 38 i_1335 ¦ 151 152 144;
I MDE nd02d1 vsc653 * 39 i_1336 ¦ 153 154 142;
I MDE in01d2 vsc653 * 40 i_1337 ¦ 155 137;
I MDE an03d1 vsc653 * 41 i_1338 ¦ 156 136 153 155;
I MDE or08d1 vsc653 * 42 i_1339 ¦ 157 149 148 147 151 150 152 158 156;
I MDE oa07d1 vsc653 * 43 i_1340 ¦ 148 159 66 65 66 160;
I MDE fn01d2 vsc653 * 44 i_1341 ¦ 161 162 88;
I MDE fn01d2 vsc653 * 45 i_1342 ¦ 155 163 162;
I MDE oa04d1 vsc653 * 46 i_1343 ¦ 164 149 165 163;
I MDE fn01d2 vsc653 * 47 i_1344 ¦ 60 164 165;
I MDE ni01d1 vsc653 * 48 i_1345 ¦ 166 164;
I MDE fn05d1 vsc653 * 49 i_1346 ¦ 147 139 166;
I MDE nr02d1 vsc653 * 50 i_1347 ¦ 137 167 161;
I MDE xn02d1 vsc653 * 51 i_1348 ¦ 147 149 167;
I MDE fn01d2 vsc653 * 52 i_1349 ¦ 168 169 89;
I MDE fn01d2 vsc653 * 53 i_1350 ¦ 155 170 169;
I MDE mx21d1 vsc653 * 54 i_1351 ¦ 150 61 165 170;
I MDE nr02d1 vsc653 * 55 i_1352 ¦ 137 171 168;
I MDE xo02d1 vsc653 * 56 i_1353 ¦ 172 150 171;
I MDE nr02d1 vsc653 * 57 i_1354 ¦ 147 149 172;
I MDE fn01d2 vsc653 * 58 i_1355 ¦ 173 174 90;
I MDE fn01d2 vsc653 * 59 i_1356 ¦ 155 175 174;
I MDE nd02d1 vsc653 * 60 i_1357 ¦ 176 177 175;
I MDE or02d1 vsc653 * 61 i_1358 ¦ 151 178 177;
I MDE in01d1 vsc653 * 62 i_1359 ¦ 179 178;
I MDE fn01d2 vsc653 * 63 i_1360 ¦ 180 166 179;
I MDE or02d1 vsc653 * 64 i_1361 ¦ 60 61 180;
I MDE in01d1 vsc653 * 65 i_1362 ¦ 181 176;
I MDE nr02d1 vsc653 * 66 i_1363 ¦ 179 62 181;
I MDE nr02d1 vsc653 * 67 i_1364 ¦ 137 182 173;
I MDE xn02d1 vsc653 * 68 i_1365 ¦ 183 151 182;
I MDE nd02d1 vsc653 * 69 i_1366 ¦ 172 61 183;
I MDE fn01d2 vsc653 * 70 i_1367 ¦ 184 185 91;
I MDE fn01d2 vsc653 * 71 i_1368 ¦ 186 187 185;
I MDE nd02d1 vsc653 * 72 i_1369 ¦ 188 189 187;
I MDE fn01d2 vsc653 * 73 i_1370 ¦ 152 176 189;
I MDE fn01d2 vsc653 * 74 i_1371 ¦ 63 190 188;
I MDE ni01d2 vsc653 * 75 i_1372 ¦ 181 190;
I MDE ni01d1 vsc653 * 76 i_1373 ¦ 155 186;
I MDE nr02d1 vsc653 * 77 i_1374 ¦ 191 192 184;
I MDE xn02d1 vsc653 * 78 i_1375 ¦ 193 152 192;
I MDE or02d1 vsc653 * 79 i_1376 ¦ 151 183 193;

I MDE ni01d1 vsc653 * 80 i_1377 ¦ 137 191;
I MDE fn01d2 vsc653 * 81 i_1378 ¦ 194 195 92;
I MDE fn01d2 vsc653 * 82 i_1379 ¦ 186 196 195;
I MDE mx21d1 vsc653 * 83 i_1380 ¦ 157 64 188 196;
I MDE nr02d1 vsc653 * 84 i_1381 ¦ 191 197 194;
I MDE xn02d1 vsc653 * 85 i_1382 ¦ 198 157 197;
I MDE nd02d1 vsc653 * 86 i_1383 ¦ 199 63 198;
I MDE in01d1 vsc653 * 87 i_1384 ¦ 193 199;
I MDE fn01d2 vsc653 * 88 i_1385 ¦ 200 201 93;
I MDE fn01d2 vsc653 * 89 i_1386 ¦ 186 202 201;
I MDE nd02d1 vsc653 * 90 i_1387 ¦ 203 204 202;
I MDE fn01d2 vsc653 * 91 i_1388 ¦ 65 205 204;
I MDE fn05d2 vsc653 * 92 i_1389 ¦ 181 206 205;
I MDE or02d1 vsc653 * 93 i_1390 ¦ 64 63 206;
I MDE nd02d1 vsc653 * 94 i_1391 ¦ 207 65 203;
I MDE in01d1 vsc653 * 95 i_1392 ¦ 205 207;
I MDE nr02d1 vsc653 * 96 i_1393 ¦ 208 191 200;
I MDE xo02d1 vsc653 * 97 i_1394 ¦ 209 148 208;
I MDE nr02d1 vsc653 * 98 i_1395 ¦ 198 157 209;
I MDE fn01d2 vsc653 * 99 i_1396 ¦ 210 211 94;
I MDE fn01d2 vsc653 * 100 i_1397 ¦ 186 212 211;
I MDE xo02d1 vsc653 * 101 i_1398 ¦ 204 158 212;
I MDE nr02d1 vsc653 * 102 i_1399 ¦ 213 191 210;
I MDE xo02d1 vsc653 * 103 i_1400 ¦ 214 66 213;
I MDE nd02d1 vsc653 * 104 i_1401 ¦ 209 65 214;
I MDE oa02d1 vsc653 * 105 i_1402 ¦ 215 57 58 8 216 217 95;
I MDE xn02d1 vsc653 * 106 i_1403 ¦ 21 104 217;
I MDE xn02d1 vsc653 * 107 i_1404 ¦ 20 218 216;
I MDE in02d2 vsc653 * 108 i_1405 ¦ 8 215;
I MDE nr02d1 vsc653 * 109 i_1406 ¦ 95 219 96;
I MDE ao02d1 vsc653 * 110 i_1407 ¦ 8 220 57 215 221 222 219;
I MDE xo02d1 vsc653 * 111 i_1408 ¦ 20 223 222;
I MDE xo02d1 vsc653 * 112 i_1409 ¦ 21 111 221;
I MDE nr02d1 vsc653 * 113 i_1410 ¦ 224 95 97;
I MDE in01d1 vsc653 * 114 i_1411 ¦ 219 224;
I MDE in01d3 vsc653 * 115 i_1412 ¦ 17 100;
I MDE an02d1 vsc653 * 116 i_1413 ¦ 225 17 226;
I MDE an02d1 vsc653 * 117 i_1414 ¦ 2 127 225;
I MDE in01d3 vsc653 * 118 i_1415 ¦ 16 99;
I MDE an02d1 vsc653 * 119 i_1416 ¦ 227 228 229;
I MDE in02d1 vsc653 * 120 i_1417 ¦ 99 228;
I MDE an02d1 vsc653 * 121 i_1418 ¦ 2 223 227;
I MDE in01d3 vsc653 * 122 i_1419 ¦ 15 98;
I MDE an02d1 vsc653 * 123 i_1420 ¦ 230 231 232;
I MDE in02d1 vsc653 * 124 i_1421 ¦ 98 231;
I MDE an02d1 vsc653 * 125 i_1422 ¦ 2 218 230;
I MDE an02d1 vsc653 * 126 i_1423 ¦ 233 17 234;
I MDE an02d1 vsc653 * 127 i_1424 ¦ 2 68 233;

I MDE an02d1 vsc653 * 128 i_1425 ¦ 235 228 236;
I MDE an02d1 vsc653 * 129 i_1426 ¦ 2 70 235;
I MDE an02d1 vsc653 * 130 i_1427 ¦ 237 231 238;
I MDE an02d1 vsc653 * 131 i_1428 ¦ 2 74 237;
I MDE or02d1 vsc653 * 132 i_1429 ¦ 4 108 23;
I MDE or02d1 vsc653 * 133 i_1430 ¦ 4 118 24;
I MDE mx21d1 vsc653 * 134 i_1431 ¦ 239 78 125 25;
I MDE mx21d1 vsc653 * 135 i_1432 ¦ 82 86 240 239;
I MDE in01d1 vsc653 * 136 i_1433 ¦ 115 240;
I MDE mx21d1 vsc653 * 137 i_1434 ¦ 241 77 125 26;
I MDE mx21d1 vsc653 * 138 i_1435 ¦ 81 85 240 241;
I MDE mx21d1 vsc653 * 139 i_1436 ¦ 242 78 126 27;
I MDE mx21d1 vsc653 * 140 i_1437 ¦ 82 86 117 242;
I MDE mx21d1 vsc653 * 141 i_1438 ¦ 243 77 126 28;
I MDE mx21d1 vsc653 * 142 i_1439 ¦ 81 85 117 243;
I MDE mx21d1 vsc653 * 143 i_1440 ¦ 244 76 125 31;
I MDE mx21d1 vsc653 * 144 i_1441 ¦ 80 84 240 244;
I MDE mx21d1 vsc653 * 145 i_1442 ¦ 245 75 125 32;
I MDE mx21d1 vsc653 * 146 i_1443 ¦ 79 83 240 245;
I MDE mx21d1 vsc653 * 147 i_1444 ¦ 246 76 126 33;
I MDE mx21d1 vsc653 * 148 i_1445 ¦ 80 84 117 246;
I MDE mx21d1 vsc653 * 149 i_1446 ¦ 247 75 126 34;
I MDE mx21d1 vsc653 * 150 i_1447 ¦ 79 83 117 247;
I MDE mx21d1 vsc653 * 151 i_1448 ¦ 248 76 129 35;
I MDE mx21d1 vsc653 * 152 i_1449 ¦ 80 84 130 248;
I MDE mx21d1 vsc653 * 153 i_1450 ¦ 249 75 129 36;
I MDE mx21d1 vsc653 * 154 i_1451 ¦ 79 83 130 249;
I MDE an03d1 vsc653 * 155 i_1452 ¦ 250 251 252 40;
I MDE fn01d2 vsc653 * 156 i_1453 ¦ 253 254 252;
I MDE ni01d4 vsc653 * 157 i_1454 ¦ 5 254;
I MDE or02d1 vsc653 * 158 i_1455 ¦ 67 68 253;
I MDE fn01d2 vsc653 * 159 i_1456 ¦ 255 254 251;
I MDE or02d1 vsc653 * 160 i_1457 ¦ 70 69 255;
I MDE fn01d2 vsc653 * 161 i_1458 ¦ 256 254 250;
I MDE or02d1 vsc653 * 162 i_1459 ¦ 73 74 256;
I MDE an03d1 vsc653 * 163 i_1460 ¦ 257 250 251 41;
I MDE in02d2 vsc653 * 164 i_1461 ¦ 252 257;
I MDE nr02d1 vsc653 * 165 i_1462 ¦ 43 251 42;
I MDE in01d2 vsc653 * 166 i_1463 ¦ 250 43;
I MDE an03d2 vsc653 * 167 i_1469 ¦ 14 13 12 44;
I MDE ni01d2 vsc653 * 168 i_1472 ¦ 1 258;
I MDE in01d5 vsc653 * 169 i_1479 ¦ 259 260;
I MDE in01d3 vsc653 * 170 i_1480 ¦ 3 259;
I MDE ni01d1 vsc653 * 171 i_1481 ¦ 260 261;
I MDE mfctnh vsc653 * 172 mid0_ff_b0 ¦ 21 83 101 6 261 83 262;
I MDE mfctnh vsc653 * 173 mid0_ff_b1 ¦ 20 84 101 6 261 84 263;
I MDE mfctnh vsc653 * 174 mid0_ff_b2 ¦ 19 85 101 6 261 85 264;
I MDE mfctnh vsc653 * 175 mid0_ff_b3 ¦ 18 86 101 6 261 86 265;

```
I MDE mfptnh vsc653 * 176 mid1_ff_b0 ¦ 21 79 108 6 261 79 266;
I MDE mfctnh vsc653 * 177 mid1_ff_b1 ¦ 20 80 108 6 261 80 267;
I MDE mfctnh vsc653 * 178 mid1_ff_b2 ¦ 19 81 108 6 261 81 268;
I MDE mfctnh vsc653 * 179 mid1_ff_b3 ¦ 18 82 108 6 261 82 269;
I MDE mfctnh vsc653 * 180 mid2_ff_b0 ¦ 21 75 118 6 261 75 270;
I MDE mfptnh vsc653 * 181 mid2_ff_b1 ¦ 20 76 118 6 261 76 271;
I MDE mfctnh vsc653 * 182 mid2_ff_b2 ¦ 19 77 118 6 261 77 272;
I MDE mfctnh vsc653 * 183 mid2_ff_b3 ¦ 18 78 118 6 261 78 273;
I MDE mfctnh vsc653 * 184 level0_ff_b0 ¦ 73 105 103 6 260 73 104;
I MDE mfctnh vsc653 * 185 level0_ff_b1 ¦ 74 107 103 6 260 74 218;
I MDE mfptnh vsc653 * 186 level1_ff_b0 ¦ 69 112 110 6 3 69 111;
I MDE mfctnh vsc653 * 187 level1_ff_b1 ¦ 70 114 110 6 3 70 223;
I MDE mfctnh vsc653 * 188 level2_ff_b0 ¦ 67 122 120 6 260 67 121;
I MDE mfptnh vsc653 * 189 level2_ff_b1 ¦ 68 124 120 6 3 68 127;
I MDE lantnq vsc653 * 190 clevel_ff_b0 ¦ 53 7 71;
I MDE lantnq vsc653 * 191 clevel_ff_b1 ¦ 54 7 72;
I MDE lactnb vsc653 * 192 tst_add_ff_b0 ¦ 9 11 258 57 274;
I MDE lactnb vsc653 * 193 tst_add_ff_b1 ¦ 9 10 258 58 220;
I MDE lantnq vsc653 * 194 wrs0_ff ¦ 238 7 101;
I MDE lantnq vsc653 * 195 wrs1_ff ¦ 236 7 108;
I MDE lantnq vsc653 * 196 wrs2_ff ¦ 234 7 118;
I MDE lantnq vsc653 * 197 ll0_ff ¦ 232 7 102;
I MDE lantnq vsc653 * 198 ll1_ff ¦ 229 7 109;
I MDE lantnq vsc653 * 199 ll2_ff ¦ 226 7 119;
I MDE dfctnb vsc653 * 200 bsym0_ff_b0 ¦ 30 48 258 55 275;
I MDE dfctnb vsc653 * 201 bsym0_ff_b1 ¦ 29 48 258 56 276;
I MDE dfctnb vsc653 * 202 qup_ff ¦ 134 6 258 154 136;
I MDE dfctnb vsc653 * 203 updd_ff ¦ 4 6 258 153 277;
I MDE dfctnb vsc653 * 204 quatdd_ff ¦ 160 4 258 278 159;
I MDE dfptnb vsc653 * 205 qcnt_ff_b0 ¦ 87 6 258 59 147;
I MDE dfptnb vsc653 * 206 qcnt_ff_b1 ¦ 88 6 258 60 149;
I MDE dfptnb vsc653 * 207 qcnt_ff_b2 ¦ 89 6 258 61 150;
I MDE dfptnb vsc653 * 208 qcnt_ff_b3 ¦ 90 6 258 62 151;
I MDE dfptnb vsc653 * 209 qcnt_ff_b4 ¦ 91 6 258 63 152;
I MDE dfptnb vsc653 * 210 qcnt_ff_b5 ¦ 92 6 258 64 157;
I MDE dfptnb vsc653 * 211 qcnt_ff_b6 ¦ 93 6 258 65 148;
I MDE dfptnb vsc653 * 212 qcnt_ff_b7 ¦ 94 6 258 66 158;
I MDE dfctnb vsc653 * 213 madd_ff_b0 ¦ 95 7 258 39 279;
I MDE dfctnb vsc653 * 214 madd_ff_b1 ¦ 96 7 258 38 280;
I MDE dfctnb vsc653 * 215 madd_ff_b2 ¦ 97 7 258 37 281;
I MDE dfctnb vsc653 * 216 quality_ff ¦ 160 46 258 282 283;
I MDE in01d5 vsc653 * 217 qual_buf ¦ 283 47;
I MDE dfctnb vsc653 * 218 bsym_ff_b0 ¦ 55 46 258 50 284;
I MDE dfctnh vsc653 * 219 bsym_ff_b1 ¦ 56 46 1 49 285;
E netlist

B subcells
```

MDE ad01d1 vsc653
MDE or02d1 vsc653
MDE nr02d1 vsc653
MDE mx21d1 vsc653
MDE xo02d1 vsc653
MDE in01d1 vsc653
MDE an02d1 vsc653
MDE fn01d2 vsc653
MDE oa04d1 vsc653
MDE oa03d1 vsc653
MDE or05d1 vsc653
MDE nd02d1 vsc653
MDE in01d2 vsc653
MDE an03d1 vsc653
MDE or08d1 vsc653
MDE oa07d1 vsc653
MDE ni01d1 vsc653
MDE fn05d1 vsc653
MDE xn02d1 vsc653
MDE ni01d2 vsc653
MDE fn05d2 vsc653
MDE oa02d1 vsc653
MDE in02d2 vsc653
MDE ao02d1 vsc653
MDE in01d3 vsc653
MDE in02d1 vsc653
MDE ni01d4 vsc653
MDE an03d2 vsc653
MDE in01d5 vsc653
MDE mfctnh vsc653
MDE mfptnh vsc653
MDE lantnq vsc653
MDE lactnb vsc653
MDE dfctnb vsc653
MDE dfptnb vsc653
MDE dfctnh vsc653
E subcells

NMMSTO_DP LA

```
#cell2 * nmmsto_dp la * 47 any 97280 v8r4.6.2
# "1-Sep-94 GMT" "16:34:18 GMT" "1-Sep-94 GMT" "16:34:18 GMT" amir * .la
dpdff0501 dpconright dpzdt001s dpdff0801 dpclktgc0 dpmux1021 dplat0001 dpmux8081
dpswzint0 dpmux4041 dptitle00 dplat0201 dptsb1023 dpswztopi dpclkuct0 dpdff0101
dpswztopo dpbuf0013 dpsub001s dpswzboto mtborderb .
V 15 COMPASSlogicAssist
T C
L ""
I 139
B 12 46 1716 1050
M 1073791229 1073764073 1073791420 1073776278
F micej
D "" "" "cdp:vcc4dp2" "0" "0" "0" "0" "0" "0"
C 1710 810 2 175 90 "bbus" small RC B NSCO 180 90 1
N 1680 830 "bbus" normal LC B
V 4 *
T 95 113 "@@InstName" normal CB B I
A 180 140 170 150 10.253 1 0
L 10 0 170 0 1 0
L 0 10 0 140 1 0
A 0 10 10 0 10 0 0
A 10 150 0 140 10 0 0
A 170 0 180 10 10 0 0
L 10 150 170 150 1 0
L 180 10 180 140 1 0
T 95 30 "@@LABEL" normal CC B L
L 75 70 105 70 1 0
L 75 100 75 70 1 0
L 105 100 75 100 1 0
L 105 70 105 100 1 0
L 105 85 111 91 1 0
L 111 91 111 88 1 0
L 111 88 117 88 1 0
L 117 88 117 91 1 0
L 117 91 123 85 1 0
L 123 85 117 79 1 0
L 117 79 117 82 1 0
L 117 82 111 82 1 0
L 111 82 111 79 1 0
L 111 79 105 85 1 0
L 75 85 71 89 1 0
L 71 89 71 87 1 0
L 71 87 67 87 1 0
L 67 87 67 83 1 0
L 67 83 71 83 1 0
```

L 71 83 71 81 1 0
L 71 81 75 85 1 0
T 95 50 "w=@dx@, h=@dy@" small CC B A
T 93 10 "nmmsto_dp" normal CC B T
F 10 130 55 145 6 0
F 130 130 170 145 6 0
E
O "mtborderb" 0 0 1100 800 P
I abusd 137 1 840 810 0 "[la]dpswzboto" "" 0 N * 1 "spec" "15:0" HLMC
I invalb 138 1 870 730 0 "[la]dpswzboto" "" 0 N * 1 "spec" "15:0" HLMC
I subr2 26 1 1332 540 0 "[la]dpsub001s" "" 0 N * 0
I cofbuf 89 1 270 440 0 "[la]dpbuf0013" "" 0 N * 0
I tst 6 1 350 490 0 "[la]dpswztopo" "" 0 N * 2 "spec" "15:14" HLMC "buffered" "false" HLMCI
I areg 2 1 170 210 0 "[la]dpdff0101" "" 0 N * 0
P 160 210 S
I aregck 3 1 190 240 0 "[la]dpclkuct0" "" 0 * * 0
P 240 210 S
I abus 136 1 80 250 0 "[la]dpswztopo" "" 0 N * 2 "spec" "15:0" HLMC "buffered" "false" HLMCI
P 80 210 S
P 240 440 S
I soid 47 1 50 400 0 "[la]dpswztopi" "" 0 N * 2 "spec" "15:0" HLMC "buffered" "false" HLMCI
I soidrg 45 1 50 380 0 "[la]dpdff0101" "" 0 N * 0
I U43 46 1 70 410 0 "[la]dpclkuct0" "" 0 * * 0
I ard 48 1 110 380 0 "[la]dptsb1023" "" 0 * * 0
P 538 210 S
P 538 413 S
P 350 440 S
P 420 440 S
I U1 1 1 1010 66 0 "[la]dptitle00" "" 0 * * 2 "number_of_bits" "16" HLMC "title" "Spec schematic" HLMCI
P 1612 263 S
P 1032 263 S
P 1522 210 S
I qtru 60 1 1182 413 0 "[la]dplat0201" "" 0 N * 1 "initial_value" "'h0020" HLMCI
I qtrck 33 1 1208 443 0 "[la]dpclkuct0" "" 0 * * 0
P 1032 540 S
I subrq 34 1 1338 333 0 "[la]dpsub001s" "" 0 N * 0
P 1032 333 S
P 1428 373 S
I selu0b 87 1 312 996 0 "[la]dpswztopo" "" 0 N * 2 "spec" "7:0" HLMC "buffered" "false" HLMCI
I selu0 73 1 262 856 0 "[la]dpmux4041" "" 0 N * 0
I uregl1 64 1 406 906 0 "[la]dplat0201" "" 0 N * 1 "initial_value" "'ha5c5" HLMCI
I ureg00 61 1 94 910 0 "[la]dplat0201" "" 0 N * 1 "initial_value" "'ha459" HLMCI
I s01swiz 76 1 182 910 0 "[la]dpswzint0" "" 0 * * 1 "spec" "15:8" HLMC

```
I selul 74 1 602 796 0 "[la]dpmux8081" "" 0 N * 0
I s12swiz 81 1 472 936 0 "[la]dpswzint0" "" 0 * * 1 "spec" "7:0" HLMC
I s13swiz 82 1 492 906 0 "[la]dpswzint0" "" 0 * * 1 "spec" "15:8" HLMC
I s00swiz 75 1 162 936 0 "[la]dpswzint0" "" 0 * * 1 "spec" "7:0" HLMC
I ureg01 62 1 94 830 0 "[la]dplat0201" "" 0 N * 1 "initial_value" "'h79f4" HLMCI
I s02swiz 77 1 162 856 0 "[la]dpswzint0" "" 0 * * 1 "spec" "7:0" HLMC
I ureg01ck 132 1 120 860 0 "[la]dpclkuct0" "" 0 * * 0
I s03swiz 78 1 182 830 0 "[la]dpswzint0" "" 0 * * 1 "spec" "15:8" HLMC
P 220 680 S
P 262 830 S
P 202 876 S
P 312 886 S
P 222 896 S
P 72 830 S
P 162 830 S
P 220 740 S
P 72 740 S
I ureg13 66 1 406 740 0 "[la]dplat0201" "" 0 N * 1 "initial_value" "'ha595" HLMCI
I inval 109 1 686 750 0 "[la]dplat0201" "" 0 N * 1 "initial_value" "'b0" HLMCI
I s17swiz 86 1 492 740 0 "[la]dpswzint0" "" 0 * * 1 "spec" "15:8" HLMC
P 420 680 S
P 652 680 S
I ureg12 65 1 406 826 0 "[la]dplat0201" "" 0 N * 1 "initial_value" "'ha1a1" HLMCI
I s16swiz 85 1 472 776 0 "[la]dpswzint0" "" 0 * * 1 "spec" "7:0" HLMC
I s14swiz 83 1 472 856 0 "[la]dpswzint0" "" 0 * * 1 "spec" "7:0" HLMC
I ureg12ck 70 1 432 856 0 "[la]dpclkuct0" "" 0 * * 0
I ureg13ck 72 1 432 770 0 "[la]dpclkuct0" "" 0 * * 0
I s15swiz 84 1 492 826 0 "[la]dpswzint0" "" 0 * * 1 "spec" "15:8" HLMC
P 382 740 S
P 552 776 S
P 552 816 S
P 472 740 S
P 382 826 S
P 562 896 S
P 532 876 S
P 532 836 S
P 472 826 S
P 840 830 S
I invalck 113 1 712 780 0 "[la]dpclkuct0" "" 0 * * 0
I U49 129 1 710 860 0 "[la]dpclkuct0" "" 0 * * 0
I frg 128 1 690 830 0 "[la]dplat0001" "" 0 * * 0
P 660 750 S
P 602 740 S
P 652 750 S
P 662 866 S
P 660 830 S
P 162 910 S
P 72 910 S
```

```
P 262 936 S
I ureg00ck 131 1 120 940 0 "[la]dpclkuct0" "" 0 * * 0
I ureg10 63 1 406 986 0 "[la]dplat0201" "" 0 N * 1 "initial_value" "'ha585" HLMCI
P 382 906 S
P 472 906 S
I ureg11ck 68 1 432 936 0 "[la]dpclkuct0" "" 0 * * 0
I s10swiz 79 1 472 1016 0 "[la]dpswzint0" "" 0 * * 1 "spec" "7:0" HLMC
P 382 986 S
I ureg10ck 71 1 432 1016 0 "[la]dpclkuct0" "" 0 * * 0
P 472 986 S
I s11swiz 80 1 492 986 0 "[la]dpswzint0" "" 0 * * 1 "spec" "15:8" HLMC
P 582 986 S
P 562 936 S
P 582 916 S
I selu1b 88 1 662 996 0 "[la]dpswztopo" "" 0 N * 2 "spec" "7:0" HLMC "buffered" "false"
HLMCI
P 602 1016 S
I subr0 13 1 1332 910 0 "[la]dpsub001s" "" 0 N * 0
I subr1 21 1 1332 710 0 "[la]dpsub001s" "" 0 N * 0
I sel2 27 1 1062 610 0 "[la]dpmux1021" "" 0 N * 0
I sel1 22 1 1072 780 0 "[la]dpmux1021" "" 0 N * 0
P 1052 663 S
P 1032 630 S
P 1052 610 S
P 1032 710 S
P 1278 620 S
I zero2 44 1 1258 620 0 "[la]dpzdt001s" "" 0 * * 0
I accu2 28 1 1190 620 0 "[la]dpdff0801" "" 0 N * 1 "initial_value" "'h7fff" HLMCI
I U52 135 1 1210 650 0 "[la]dpclktgc0" "" 0 * * 1 "clock_number" "1" HLMC
P 1278 608 S
P 870 750 S
P 1052 780 S
P 1032 800 S
P 1052 846 S
P 1292 746 S
I accu1 23 1 1200 790 0 "[la]dpdff0801" "" 0 N * 1 "initial_value" "'h7fff" HLMCI
I zero1 43 1 1268 790 0 "[la]dpzdt001s" "" 0 * * 0
P 1292 790 S
I U51 134 1 1220 820 0 "[la]dpclktgc0" "" 0 * * 1 "clock_number" "1" HLMC
I brd 40 1 1620 810 0 "[la]dptsb1023" "" 0 N * 0
I U41 41 1 1670 810 0 "[la]dpconright" "" 0 * * 1 "spec" "" HLMC
I sadd 126 1 1552 706 0 "[la]dpmux4041" "" 0 N * 0
P 1512 726 S
P 1428 580 S
P 1428 663 S
P 1512 608 S
P 1522 706 S
P 1442 750 S
```

```
I transu 50 1 1550 790 0 "[la]dpdff0501" "" 0 * * 0
P 1492 746 S
P 1612 736 S
P 1472 766 S
P 1442 846 S
I U47 52 1 1570 840 0 "[la]dpclktgc0" "" 0 * * 1 "clock_number" "1" HLMC
P 1492 810 S
P 1512 790 S
P 1472 830 S
P 1032 910 S
P 1298 938 S
P 1048 1038 S
I U50 133 1 1220 1020 0 "[la]dpclktgc0" "" 0 * * 1 "clock_number" "1" HLMC
I accu0 7 1 1200 990 0 "[la]dpdff0801" "" 0 N * 1 "initial_value" "'h7fff" HLMCI
I sel0 10 1 1078 980 0 "[la]dpmux1021" "" 0 N * 0
P 1048 980 S
P 1032 1000 S
I zero0 42 1 1268 990 0 "[la]dpzdt001s" "" 0 * * 0
P 1298 990 S
P 1472 938 S
P 1458 1038 S
P 1458 950 S
J 7 areg 3 "clockspec" 9 aregck 1 "clockspec"
J 15 soidrg 3 "clockspec" 16 U43 1 "clockspec"
J 26 qtru 3 "clockspec" 27 qtrck 1 "clockspec"
J 43 ureg01ck 1 "clockspec" 41 ureg01 3 "clockspec"
J 54 ureg13 3 "clockspec" 63 ureg13ck 1 "clockspec"
J 59 ureg12 3 "clockspec" 62 ureg12ck 1 "clockspec"
J 77 frg 3 "clockspec" 76 U49 1 "clockspec"
J 55 inval 3 "clockspec" 75 invalck 1 "clockspec"
J 86 ureg00ck 1 "clockspec" 35 ureg00 3 "clockspec"
J 34 ureg11 3 "clockspec" 90 ureg11ck 1 "clockspec"
J 87 ureg10 3 "clockspec" 93 ureg10ck 1 "clockspec"
J 111 accu2 1 "clockspec" 112 U52 1 "clockspec"
J 119 accu1 1 "clockspec" 122 U51 1 "clockspec"
J 132 transu 4 "clockspec" 137 U47 1 "clockspec"
J 123 brd 2 "z" 124 U41 1 "i"
J 145 accu0 1 "clockspec" 144 U50 1 "clockspec"
S 55 inval 2 "q" 114 1 SH
S 18 25 1 SH
S 19 26 qtru 1 "d" 1 SH
S 25 130 1 SV
S 21 57 1 SV
S 23 134 1 SV
S 28 106 1 SV
S 10 18 1 SH
N 461 213 "cof" normal LB B
S 5 cofbuf 2 "z" 20 1 SH
```

```
S 8 7 areg 1 "d" 1 SH
S 7 areg 2 "q" 10 1 SH
S 8 17 ard 2 "z" 1 SV
S 10 13 1 SV
S 12 8 1 SH
S 12 11 abus 1 "o" 1 SV
S 13 5 cofbuf 1 "i" 1 SH
S 15 soidrg 1 "d" 14 soid 1 "o" 1 SV
S 15 soidrg 2 "q" 17 ard 1 "i" 1 SH
S 18 19 1 SV
S 20 21 1 SH
N 378 443 "cofd" normal LB B
S 20 6 tst 1 "o" 1 SV
S 26 qtru 2 "q" 29 subrq 1 "A" 1 SH
N 1293 416 "qtr" normal LB B
S 30 29 subrq 2 "B" 1 SH
S 24 30 1 SV
S 29 subrq 3 "SO" 31 1 SH
N 1416 376 "subq" normal LB B
S 24 23 1 SH
N 1583 266 "acc" normal LB B
S 30 28 1 SV
S 28 4 subr2 2 "B" 1 SH
S 52 65 1 SH
S 45 57 1 SH
S 48 32 selu0b 1 "o" 1 SV
S 81 99 selu1b 1 "o" 1 SV
S 70 97 1 SV
S 50 84 1 SV
S 49 36 s01swiz 2 "o" 1 SV
S 69 88 1 SV
S 71 39 s13swiz 2 "o" 1 SV
S 45 52 1 SV
S 44 s03swiz 2 "o" 46 1 SH
N 241 833 "s03" small LB B
S 46 33 selu0 2 "i3" 1 SV
S 47 33 selu0 3 "i2" 1 SH
N 242 879 "s02" small LB B
S 33 selu0 1 "z" 48 1 SH
S 53 52 1 SH
S 53 50 1 SV
S 51 42 s02swiz 1 "i" 1 SV
S 41 ureg01 2 "q" 51 1 SH
S 50 41 ureg01 1 "d" 1 SH
S 51 44 s03swiz 1 "i" 1 SH
S 49 33 selu0 4 "i1" 1 SH
N 247 899 "s01" small LB B
S 42 s02swiz 2 "o" 47 1 SV
```

```
S 57 58 1 SH
S 56 s17swiz 2 "o" 79 1 SH
N 563 743 "s17" small LB B
S 67 37 selu1 3 "i6" 1 SH
N 562 819 "s16" small LB B
S 70 37 selu1 7 "i2" 1 SH
S 71 37 selu1 6 "i3" 1 SH
N 549 879 "s13" small LB B
S 61 s14swiz 2 "o" 37 selu1 5 "i4" 1 SH
N 563 859 "s14" small LB B
S 72 37 selu1 4 "i5" 1 SH
N 561 839 "s15" small LB B
S 58 80 1 SV
S 54 ureg13 2 "q" 68 1 SH
S 59 ureg12 2 "q" 73 1 SH
S 65 69 1 SV
S 65 54 ureg13 1 "d" 1 SH
S 68 60 s16swiz 1 "i" 1 SV
S 68 56 s17swiz 1 "i" 1 SH
S 60 s16swiz 2 "o" 66 1 SH
S 66 67 1 SV
S 69 59 ureg12 1 "d" 1 SH
S 73 64 s15swiz 1 "i" 1 SH
S 64 s15swiz 2 "o" 72 1 SV
S 73 61 s14swiz 1 "i" 1 SV
S 2 abusd 1 "o" 74 1 SV
S 77 frg 2 "q" 74 1 SH
S 78 82 1 SV
S 79 37 selu1 2 "i7" 1 SV
S 78 55 inval 1 "d" 1 SH
S 80 78 1 SH
S 82 77 frg 1 "d" 1 SH
S 37 selu1 1 "z" 81 1 SH
S 83 40 s00swiz 1 "i" 1 SV
S 35 ureg00 2 "q" 83 1 SH
S 84 35 ureg00 1 "d" 1 SH
S 83 36 s01swiz 1 "i" 1 SH
S 40 s00swiz 2 "o" 85 1 SH
N 238 939 "s00" small LB B
S 33 selu0 5 "i0" 85 1 SV
S 91 s10swiz 2 "o" 100 1 SH
N 568 1019 "s10" small LB B
S 98 37 selu1 8 "i1" 1 SH
S 98 96 1 SV
S 89 38 s12swiz 1 "i" 1 SV
S 88 92 1 SV
S 34 ureg11 2 "q" 89 1 SH
S 88 34 ureg11 1 "d" 1 SH
```

```
S 89 39 s13swiz 1 "i" 1 SH
S 94 91 s10swiz 1 "i" 1 SV
S 92 87 ureg10 1 "d" 1 SH
S 87 ureg10 2 "q" 94 1 SH
S 94 95 s11swiz 1 "i" 1 SH
S 95 s11swiz 2 "o" 96 1 SH
N 568 989 "s11" small LB B
S 38 s12swiz 2 "o" 97 1 SH
N 544 939 "s12" small LB B
S 37 selu1 9 "i0" 100 1 SV
S 142 151 1 SH
S 113 129 1 SH
S 143 152 1 SH
S 105 128 1 SH
S 117 136 1 SH
S 118 133 1 SH
S 4 subr2 3 "SO" 127 1 SH
S 102 subr1 3 "SO" 131 1 SH
S 101 subr0 3 "SO" 153 1 SH
N 1425 953 "sub0" normal LB BV
S 140 151 1 SV
S 116 141 1 SV
S 104 sel1 1 "z" 119 accu1 2 "d" 1 SH
N 1171 793 "sel1bus" normal LB BV
S 108 102 subr1 2 "B" 1 SH
S 103 sel2 1 "z" 111 accu2 2 "d" 1 SH
N 1167 623 "sel2bus" normal LB BV
S 108 116 1 SV
S 107 105 1 SV
S 106 103 sel2 3 "i0" 1 SH
S 107 103 sel2 2 "i1" 1 SH
S 106 108 1 SV
S 113 109 1 SV
S 109 4 subr2 1 "A" 1 SH
N 1298 623 "acc2" normal LB B
S 110 zero2 1 "A" 109 1 SH
S 111 accu2 4 "q" 110 zero2 1 "A" 1 SH
S 3 invalb 1 "o" 114 1 SV
S 115 117 1 SV
S 116 104 sel1 3 "i0" 1 SH
S 115 104 sel1 2 "i1" 1 SH
S 118 121 1 SV
S 121 102 subr1 1 "A" 1 SH
N 1308 793 "acc1" normal LB B
S 120 zero1 1 "A" 121 1 SH
S 119 accu1 4 "q" 120 zero1 1 "A" 1 SH
S 126 139 1 SV
S 129 126 1 SV
```

```
S 126 125 sadd 3 "i2" 1 SH
S 127 128 1 SV
N 1425 656 "sub2" normal LB BV
S 130 125 sadd 2 "i3" 1 SH
S 135 140 1 SV
S 133 125 sadd 4 "i1" 1 SH
S 125 sadd 1 "z" 134 1 SH
S 139 132 transu 3 "d2" 1 SH
S 138 132 transu 1 "d1" 1 SH
S 133 138 1 SV
S 132 transu 2 "q" 123 brd 1 "i" 1 SH
N 1610 813 "trans" normal LB B
S 140 132 transu 5 "d0" 1 SH
S 131 136 1 SV
N 1439 789 "sub1" normal LB BV
S 135 125 sadd 5 "i0" 1 SH
S 123 brd 2 "z" 1 1 SH
S 141 148 1 SV
S 141 101 subr0 2 "B" 1 SH
S 142 150 1 SV
S 145 accu0 4 "q" 149 zero0 1 "A" 1 SH
S 147 143 1 SV
S 146 sel0 1 "z" 145 accu0 2 "d" 1 SH
N 1176 993 "sel0bus" normal LB BV
S 150 101 subr0 1 "A" 1 SH
N 1300 993 "acc0" normal LB B
S 149 zero0 1 "A" 150 1 SH
S 148 146 sel0 3 "i0" 1 SH
S 147 146 sel0 2 "i1" 1 SH
S 153 152 1 SV
E
```

NMMSTO_DP NLS

```
#cell2 * nmmsto_dp nls * 3 any 0 v8r4.6.2
# "1-Sep-94 GMT" "16:34:19 GMT" "1-Sep-94 GMT" "16:34:19 GMT" amir * .
writer        1
file_version  1
sections      1
netlist   1:        84 nmmsto_dp


B contents:  nmmsto_dp
netlist       252
cells        3875
switches        0
attributes   4220
physical        0
history         0
E contents


B netlist
X 1 bbus o;
G 2 VDD;
G 3 VSS;
G 4 BULK;
N 5 cof;
N 6 cofd;
N 13 s02;
N 15 s03;
N 17 s01;
N 19 s00;
N 23 s17;
N 26 s16;
N 27 s14;
N 28 s15;
N 29 s12;
N 30 s13;
N 40 s10;
N 41 s11;
N 42 acc;
N 43 qtr;
N 45 subq;
N 46 sub2;
N 47 sel2bus;
N 48 sub1;
N 49 sel1bus;
N 50 acc2;
```

```
N 52 acc1;
N 54 acc0;
N 55 sub0;
N 56 sel0bus;
N 58 trans;
M NLS dpswzboto * ¦ o ¦ i;
M NLS dpsub001s * ¦ A B SO ¦ iio;
M NLS dpbuf0013 * ¦ i z ¦ io;
M NLS dpswztopo * ¦ o ¦ i;
M NLS dpdff0101 * ¦ clockspec d q ¦ iio;
M NLS dpclkuct0 * ¦ clockspec ¦ o;
M NLS dpswztopi * ¦ o ¦ o;
M NLS dptsb1023 * ¦ i z ¦ io;
M NLS dpmux4041 * ¦ z i0 i1 i2 i3 ¦ oiiii;
M NLS dplat0201 * ¦ clockspec d q ¦ iio;
M NLS dpswzint0 * ¦ o i ¦ oi;
M NLS dpmux8081 * ¦ z i0 i1 i2 i3 i4 i5 i6 i7 ¦ oiiiiiiii;
M NLS dplat0001 * ¦ clockspec d q ¦ iio;
M NLS dptitle00 * ¦ ¦ ;
M NLS dpmux1021 * ¦ i1 i0 z ¦ iio;
M NLS dpzdt001s * ¦ A ¦ i;
M NLS dpdff0801 * ¦ clockspec d q ¦ iio;
M NLS dpclktgc0 * ¦ clockspec ¦ o;
M NLS dpconright * ¦ i ¦ u;
M NLS dpdff0501 * ¦ clockspec q d0 d1 d2 ¦ ioiii;
I NLS dpswzboto * * 1 abusd ¦ 31;
I NLS dpswzboto * * 2 invalb ¦ 35;
I NLS dpsub001s * * 3 subr2 ¦ 50 42 46;
I NLS dpbuf0013 * * 4 cofbuf ¦ 5 6;
I NLS dpswztopo * * 5 tst ¦ 6;
I NLS dpdff0101 * * 6 areg ¦ 7 8 5;
I NLS dpclkuct0 * * 7 aregck ¦ 7;
I NLS dpswztopo * * 8 abus ¦ 8;
I NLS dpswztopi * * 9 soid ¦ 9;
I NLS dpdff0101 * * 10 soidrg ¦ 10 9 11;
I NLS dpclkuct0 * * 11 U43 ¦ 10;
I NLS dptsb1023 * * 12 ard ¦ 11 8;
I NLS dpswztopo * * 13 selu0b ¦ 16;
I NLS dpmux4041 * * 14 selu0 ¦ 16 19 17 13 15;
I NLS dplat0201 * * 15 ureg11 ¦ 37 6 36;
I NLS dplat0201 * * 16 ureg00 ¦ 20 6 18;
I NLS dpswzint0 * * 17 s01swiz ¦ 17 18;
I NLS dpmux8081 * * 18 selu1 ¦ 33 40 41 29 30 27 28 26 23;
I NLS dpswzint0 * * 19 s12swiz ¦ 29 36;
I NLS dpswzint0 * * 20 s13swiz ¦ 30 36;
I NLS dpswzint0 * * 21 s00swiz ¦ 19 18;
I NLS dplat0201 * * 22 ureg01 ¦ 14 6 12;
I NLS dpswzint0 * * 23 s02swiz ¦ 13 12;
```

```
I NLS dpclkuct0 * * 24 ureg01ck ¦ 14;
I NLS dpswzint0 * * 25 s03swiz ¦ 15 12;
I NLS dpclkuct0 * * 26 ureg00ck ¦ 20;
I NLS dplat0201 * * 27 ureg13 ¦ 21 6 22;
I NLS dplat0201 * * 28 inval ¦ 34 6 35;
I NLS dpswzint0 * * 29 s17swiz ¦ 23 22;
I NLS dplat0201 * * 30 ureg12 ¦ 24 6 25;
I NLS dpswzint0 * * 31 s16swiz ¦ 26 22;
I NLS dpswzint0 * * 32 s14swiz ¦ 27 25;
I NLS dpclkuct0 * * 33 ureg12ck ¦ 24;
I NLS dpclkuct0 * * 34 ureg13ck ¦ 21;
I NLS dpswzint0 * * 35 s15swiz ¦ 28 25;
I NLS dpclkuct0 * * 36 invalck ¦ 34;
I NLS dpclkuct0 * * 37 U49 ¦ 32;
I NLS dplat0001 * * 38 frg ¦ 32 6 31;
I NLS dplat0201 * * 39 ureg10 ¦ 38 6 39;
I NLS dpclkuct0 * * 40 ureg11ck ¦ 37;
I NLS dpswzint0 * * 41 s10swiz ¦ 40 39;
I NLS dpclkuct0 * * 42 ureg10ck ¦ 38;
I NLS dpswzint0 * * 43 s11swiz ¦ 41 39;
I NLS dpswztopo * * 44 selu1b ¦ 33;
I NLS dptitle00 * * 45 U1 ¦;
I NLS dplat0201 * * 46 qtru ¦ 44 5 43;
I NLS dpclkuct0 * * 47 qtrck ¦ 44;
I NLS dpsub001s * * 48 subrq ¦ 43 42 45;
I NLS dpsub001s * * 49 subr0 ¦ 54 42 55;
I NLS dpsub001s * * 50 subr1 ¦ 52 42 48;
I NLS dpmux1021 * * 51 sel2 ¦ 46 42 47;
I NLS dpmux1021 * * 52 sel1 ¦ 48 42 49;
I NLS dpzdt001s * * 53 zero2 ¦ 50;
I NLS dpdff0801 * * 54 accu2 ¦ 51 47 50;
I NLS dpclktgc0 * * 55 U52 ¦ 51;
I NLS dpdff0801 * * 56 accu1 ¦ 53 49 52;
I NLS dpzdt001s * * 57 zero1 ¦ 52;
I NLS dpclktgc0 * * 58 U51 ¦ 53;
I NLS dpclktgc0 * * 59 U50 ¦ 57;
I NLS dpdff0801 * * 60 accu0 ¦ 57 56 54;
I NLS dpmux1021 * * 61 sel0 ¦ 55 42 56;
I NLS dpzdt001s * * 62 zero0 ¦ 54;
I NLS dptsb1023 * * 63 brd ¦ 58 1;
I NLS dpconright * * 64 U41 ¦ 1;
I NLS dpmux4041 * * 65 sadd ¦ 42 54 52 50 5;
I NLS dpdff0501 * * 66 transu ¦ 59 58 54 52 50;
I NLS dpclktgc0 * * 67 U47 ¦ 59;
E netlist

B subcells
```

```
NLS dpswzboto *
NLS dpsub001s *
NLS dpbuf0013 *
NLS dpswztopo *
NLS dpdff0101 *
NLS dpclkuct0 *
NLS dpswztopi *
NLS dptsb1023 *
NLS dpmux4041 *
NLS dplat0201 *
NLS dpswzint0 *
NLS dpmux8081 *
NLS dplat0001 *
NLS dptitle00 *
NLS dpmux1021 *
NLS dpzdt001s *
NLS dpdff0801 *
NLS dpclktgc0 *
NLS dpconright *
NLS dpdff0501 *
E subcells


B attribute_list
      4383 spec
      4512 buffered
      4556 initial_value
      4752 number_of_bits
      4789 title
      4830 clock_number
E attribute_list

B A: spec
1010 15:0;
 1 2 8 9;
1010 15:14;
 5;
1010 7:0;
 13 19 21 23 31 32 41 44;
1010 15:8;
 17 20 25 29 35 43;
1010 ;
 64;
E

B A: buffered
11010 false;
 5 8 9 13 44;
```

```
E

B A: initial_value
11010 'ha5c5;
 15;
11010 'ha459;
 16;
11010 'h79f4;
 22;
11010 'ha595;
 27;
11010 'b0;
 28;
11010 'ha1a1;
 30;
11010 'ha585;
 39;
11010 'h0020;
 46;
11010 'h7fff;
 54 56 60;
E

B A: number_of_bits
1010 16;
 45;
E

B A: title
11010 Spec schematic;
 45;
E

B A: clock_number
1010 1;
 55 58 59 67;
E
```

NMMSTO LA

```
#cell2 * nmmsto la * 10 any 30720 v8r4.6.2
# "1-Sep-94 GMT" "16:34:59 GMT" "1-Sep-94 GMT" "16:34:33 GMT" amir * .la
mtbordera .
V 15 COMPASSlogicAssist
T C
L ""
I 1
B 0 31 1000 1806
M 0 0 0 0
F miejn
A 2 "chip" "chip_1" HI "frequency" "15" HI
D "[mde]MDP" "nmmsto" "" "0" "0" "1073791420" "1073776282" "1073791318"
"1073775483"
C 100 40 1 -95 -110 "accu0_cp" small LC B NSCI -100 -110 1
N 90 40 "accu0_cp" normal RC B
C 100 80 2 -95 -100 "accu0_init" small LC B NSCI -100 -100 1
N 90 80 "accu0_init" normal RC B
C 100 120 3 -95 -90 "accu1_cp" small LC B NSCI -100 -90 1
N 90 120 "accu1_cp" normal RC B
C 100 160 4 -95 -80 "accu1_init" small LC B NSCI -100 -80 1
N 90 160 "accu1_init" normal RC B
C 100 200 5 -95 -70 "accu2_cp" small LC B NSCI -100 -70 1
N 90 200 "accu2_cp" normal RC B
C 100 240 6 -95 -60 "accu2_init" small LC B NSCI -100 -60 1
N 90 240 "accu2_init" normal RC B
C 100 280 7 -95 -50 "ard" small LC B NSCI -100 -50 1
N 90 280 "ard" normal RC B
C 100 320 8 -95 -40 "areg_cp" small LC B NSCI -100 -40 1
N 90 320 "areg_cp" normal RC B
C 100 360 9 -95 -30 "brd" small LC B NSCI -100 -30 1
N 90 360 "brd" normal RC B
C 100 400 10 -95 -20 "cp" small LC B NSCI -100 -20 1
N 90 400 "cp" normal RC B
C 100 440 11 -95 -10 "qtru_cp" small LC B NSCI -100 -10 1
N 90 440 "qtru_cp" normal RC B
C 100 480 12 -95 0 "qtru_init" small LC B NSCI -100 0 1
N 90 480 "qtru_init" normal RC B
C 100 520 13 -95 10 "sadd[3:0]" small LC B NSCI -100 10 1
N 90 520 "sadd[3:0]" normal RC B
C 100 560 14 -95 20 "sel0" small LC B NSCI -100 20 1
N 90 560 "sel0" normal RC B
C 100 600 15 -95 30 "sel1" small LC B NSCI -100 30 1
N 90 600 "sel1" normal RC B
C 100 640 16 -95 40 "sel2" small LC B NSCI -100 40 1
N 90 640 "sel2" normal RC B
```

```
C 100 680 17 -95 50 "selu0[3:0]" small LC B NSCI -100 50 1
N 90 680 "selu0[3:0]" normal RC B
C 100 720 18 -95 60 "selu1[7:0]" small LC B NSCI -100 60 1
N 90 720 "selu1[7:0]" normal RC B
C 100 760 19 -95 70 "soidrg_cp" small LC B NSCI -100 70 1
N 90 760 "soidrg_cp" normal RC B
C 100 800 20 -95 80 "soid[15:0]" small LC B NSCI -100 80 1
N 90 800 "soid[15:0]" normal RC B
C 100 840 21 -95 90 "subr0_CIN" small LC B NSCI -100 90 1
N 90 840 "subr0_CIN" normal RC B
C 100 880 22 -95 100 "subr1_CIN" small LC B NSCI -100 100 1
N 90 880 "subr1_CIN" normal RC B
C 100 920 23 -95 110 "subr2_CIN" small LC B NSCI -100 110 1
N 90 920 "subr2_CIN" normal RC B
C 100 960 24 -95 120 "subrq_CIN" small LC B NSCI -100 120 1
N 90 960 "subrq_CIN" normal RC B
C 100 1000 25 -95 130 "transu[2:0]" small LC B NSCI -100 130 1
N 90 1000 "transu[2:0]" normal RC B
C 100 1040 26 -95 140 "transu_cp" small LC B NSCI -100 140 1
N 90 1040 "transu_cp" normal RC B
C 100 1200 30 -95 180 "ureg00_init" small LC B NSCI -100 180 1
N 90 1200 "ureg00_init" normal RC B
C 100 1280 32 -95 200 "ureg01_init" small LC B NSCI -100 200 1
N 90 1280 "ureg01_init" normal RC B
C 100 1320 33 -95 210 "ureg10_cp" small LC B NSCI -100 210 1
N 90 1320 "ureg10_cp" normal RC B
C 100 1360 34 -95 220 "ureg10_init" small LC B NSCI -100 220 1
N 90 1360 "ureg10_init" normal RC B
C 100 1400 35 -95 230 "ureg11_cp" small LC B NSCI -100 230 1
N 90 1400 "ureg11_cp" normal RC B
C 100 1440 36 -95 240 "ureg11_init" small LC B NSCI -100 240 1
N 90 1440 "ureg11_init" normal RC B
C 100 1480 37 -95 250 "ureg12_cp" small LC B NSCI -100 250 1
N 90 1480 "ureg12_cp" normal RC B
C 100 1520 38 -95 260 "ureg12_init" small LC B NSCI -100 260 1
N 90 1520 "ureg12_init" normal RC B
C 100 1560 39 -95 270 "ureg13_cp" small LC B NSCI -100 270 1
N 90 1560 "ureg13_cp" normal RC B
C 100 1600 40 -95 280 "ureg13_init" small LC B NSCI -100 280 1
N 90 1600 "ureg13_init" normal RC B
C 1000 40 41 75 -80 "abus[15:0]" small RC B NSCO 80 -80 1
N 990 40 "abus[15:0]" normal RC B
C 1000 120 43 75 -40 "bbus[15:0]" small RC B NSCO 80 -40 1
N 990 120 "bbus[15:0]" normal RC B
C 1000 200 45 75 0 "selu0b[7:0]" small RC B NSCO 80 0 1
N 990 200 "selu0b[7:0]" normal RC B
C 1000 240 46 75 20 "selu1b[7:0]" small RC B NSCO 80 20 1
N 990 240 "selu1b[7:0]" normal RC B
```

```
C 1000 280 47 75 40 "subr0_COUT" small RC B NSCO 80 40 1
N 990 280 "subr0_COUT" normal RC B
C 1000 320 48 75 60 "subr0_OVR" small RC B NSCO 80 60 1
N 990 320 "subr0_OVR" normal RC B
C 1000 360 49 75 80 "subr1_COUT" small RC B NSCO 80 80 1
N 990 360 "subr1_COUT" normal RC B
C 1000 400 50 75 100 "subr1_OVR" small RC B NSCO 80 100 1
N 990 400 "subr1_OVR" normal RC B
C 1000 440 51 75 120 "subr2_COUT" small RC B NSCO 80 120 1
N 990 440 "subr2_COUT" normal RC B
C 1000 480 52 75 140 "subr2_OVR" small RC B NSCO 80 140 1
N 990 480 "subr2_OVR" normal RC B
C 1000 520 53 75 160 "subrq_COUT" small RC B NSCO 80 160 1
N 990 520 "subrq_COUT" normal RC B
C 1000 560 54 75 180 "subrq_OVR" small RC B NSCO 80 180 1
N 990 560 "subrq_OVR" normal RC B
C 1000 600 55 75 200 "tst[15:14]" small RC B NSCO 80 200 1
N 990 600 "tst[15:14]" normal RC B
C 1000 640 56 75 220 "zero0_Z" small RC B NSCO 80 220 1
N 990 640 "zero0_Z" normal RC B
C 1000 680 57 75 240 "zero1_Z" small RC B NSCO 80 240 1
N 990 680 "zero1_Z" normal RC B
C 1000 720 58 75 260 "zero2_Z" small RC B NSCO 80 260 1
N 990 720 "zero2_Z" normal RC B
C 100 1640 61 -95 150 "inval_cp" small LC B NSCI -100 150 1
N 90 1640 "inval_cp" normal RC B
C 100 1680 62 -95 160 "inval_init" small LC B NSCI -100 160 1
N 90 1680 "inval_init" normal RC B
C 1000 760 63 75 -20 "invalb[15:0]" small RC B NSCO 80 -20 1
N 990 760 "invalb[15:0]" normal RC B
C 100 1720 64 -95 290 "frg_cp" small LC B NSCI -100 290 1
N 90 1720 "frg_cp" normal RC B
C 1000 800 65 75 90 "abusd[15:0]" small RC B NSCO 80 90 1
N 990 800 "abusd[15:0]" normal RC B
C 100 1760 66 -95 170 "ureg00_cp" small LC B NSCI -100 170 1
N 90 1760 "ureg00_cp" normal RC B
C 100 1800 67 -95 190 "ureg01_cp" small LC B NSCI -100 190 1
N 90 1800 "ureg01_cp" normal RC B
V 4 *
L 80 290 80 272 1 0
A 80 290 70 300 10.253 1 0
L -90 -120 70 -120 1 0
L -100 -92 -100 272 1 0
L -100 -110 -100 -92 1 0
A -100 -110 -90 -120 10 0 0
L -100 290 -100 272 1 0
A -90 300 -100 290 10 0 0
L 80 -110 80 -92 1 0
```

```
A 70 -120 80 -110 10 0 0
L -90 300 70 300 1 0
T -3 -55 "nmmsto" normal CT B T
L 80 -92 80 272 1 0
F 40 244 70 286 5 0
F -90 244 -60 286 5 0
T -9 269 "DATAPATH" normal CC B *
L -11 87 -8 79 0 0
L -8 79 -11 74 0 0
L -11 14 -2 40 1 0
L -2 121 -11 146 1 0
B -33 90 -25 143 0 0
B -33 14 -25 71 0 0
L -14 121 -14 127 0 0
L -14 127 -11 118 0 0
L -11 118 -14 109 0 0
L -14 109 -14 116 1 0
L -11 146 -11 87 1 0
L -11 74 -11 14 1 0
L -14 48 -14 53 0 0
L -11 45 -14 37 0 0
L -14 37 -14 43 0 0
L -14 53 -11 45 0 0
L 10 82 10 87 0 0
L 10 87 13 79 0 0
L 13 79 10 71 0 0
L 10 71 10 76 0 0
L -2 40 -2 121 1 0
B 13 45 21 118 0 0
L -2 82 10 82 1 0
L 10 76 -2 76 1 0
L -14 116 -25 116 1 0
L -25 121 -14 121 1 0
L -14 43 -25 43 1 0
L -24 48 -14 48 1 0
T -5 -8 "@Size@" normal CC B A
T -1 -50 "w=@dx@, h=@dy@" normal CC B A
T -15 174 "@@LABEL" normal CC B L
T -5 202 "@@INSTNAME" normal CB B I
E
O "mtbordera" 0 0 1100 800 N
E
```

NMMSTO PCL

```
#cell2 * nmmsto pcl * 5 any 13312 v8r4.6.2
# "22-May-94 GMT" "16:20:59 GMT" "22-May-94 GMT" "16:20:59 GMT" amir * .
# VERSION NUMBER
2
# TEMPLATE
# name date time checkSum
cdp "10-Dec-92 GMT" "21:51:41 GMT" 'H5B6542F
# CLIENT OBJECTS (generator modules, etc.)
# ID cellName cellType capabilities
1 MDP mde  Check Portable-Netlist Layout-Model-Netlist Model-Schematic
VHDL-Portable VHDL-Layout-Model Verilog-Portable Verilog-Layout-Model
2 CDP slc  CIF MCP Layout
3 dpath ese  DA
4 MDP la  icon
5 vdpath vce  Generate-Vectors
6 dphdng obj  VHDL-Model Verilog-Model
.
# PARAMETERS
# name value default type flags clientIDs / range
DP_specification [la]nmmsto_dp "" string [s,Spec:LA] 1 2 3
DP_frequency 50 10.0 real [] 1 2 3 4 / 1.0 *
DP_place_method manual detail string [] 1 2 3 4 / detail quick manual
DP_place_order [txt]nmmsto_dp_order * string [] 1 2 3 4
DP_vdd_size * * string [] 1 2 3 4
DP_vss_size * * string [] 1 2 3 4
DP_power_refresh * * string [] 1 2 3 4
DP_ctrl_buffers auto auto string [s] 1 2 3 4 / auto none
DP_misc false false boolean [] 1 2 3 4
->

.
+>
DP_portable_clock * * string [] 1 2 3 4
DP_layout_clock * * string [] 1 2 3 4
DP_placement_summary * * string [] 1 2 3 4
DP_statemachine "" "" string [] 1 2 3 4
DP_connectorseeds "" "" string [] 1 2 3 4
.
DP_control_misc false false boolean [] 1 2 3 4
->

.
+>
Use_VLSI_buffers true true boolean [] 1 2 3 4
->
control_buffer_family_number * * string [] 1 2 3 4
control_buffer_drive_number * * string [] 1 2 3 4
```

.
+>
DP_control_buffer_family auto auto string [] 1 2 3 4 / auto 2 3 4
DP_control_buffer_drive auto auto string [] 1 2 3 4 / auto 1 2 3 4
.
DP_control_logic_layout_option auto auto string [s] 1 2 3 4 / auto none
.
DP_third_routing_layer none none string [] 1 2 3 4 / auto none
Sim_Option Netlist Netlist string [] 1 2 3 4 / Netlist
Layout_Option Optimized Portable string [] 1 2 3 4 / Portable Optimized
HDL_Option Behavioral Behavioral string [] 1 2 3 4 / Behavioral Netlist
Compatible_Tag vcc6dp4 vcc6dp4 string [] 1 2 3 4
Output_Test_Format VIF VIF string [] 5 / VIF QSIM SIM
.

NMMT LA

```
#cell2 * nmmt la * 12 any 15360 v8r4.6.2
# "19-Sep-94 GMT" "8:21:48 GMT" "19-Sep-94 GMT" "8:09:24 GMT" amir * .la
mtbordera .
V 15 COMPASSlogicAssist
T C
L ""
I 1
B -11 31 1000 486
M 0 0 0 0
F miejn
A 2 "chip" "chip_1" HI "frequency" "15" HI
D "[mde]MDP" "nmmt" "" "0" "0" "1073791438" "1073745974" "1073791318"
"1073775416"
C 100 40 1 -95 -100 "abusd[47:32]" small LC B NSCI -100 -100 1
N 90 40 "abusd[47:32]" normal RC B
C 100 80 2 -95 -90 "accu" small LC B NSCI -100 -90 1
N 90 80 "accu" normal RC B
C 100 120 3 -95 -80 "accu_cp" small LC B NSCI -100 -80 1
N 90 120 "accu_cp" normal RC B
C 100 160 4 -95 -70 "cp" small LC B NSCI -100 -70 1
N 90 160 "cp" normal RC B
C 100 200 5 -95 -60 "en" small LC B NSCI -100 -60 1
N 90 200 "en" normal RC B
C 100 240 6 -95 -50 "en_cp" small LC B NSCI -100 -50 1
N 90 240 "en_cp" normal RC B
C 100 280 7 -95 -40 "inval[41:26]" small LC B NSCI -100 -40 1
N 90 280 "inval[41:26]" normal RC B
C 100 320 8 -95 -30 "min" small LC B NSCI -100 -30 1
N 90 320 "min" normal RC B
C 100 360 9 -95 -20 "selb[31:0]" small LC B NSCI -100 -20 1
N 90 360 "selb[31:0]" normal RC B
C 100 400 10 -95 -10 "subrt_CIN" small LC B NSCI -100 -10 1
N 90 400 "subrt_CIN" normal RC B
C 100 480 12 -95 10 "zer" small LC B NSCI -100 10 1
N 90 480 "zer" normal RC B
C 1000 80 14 75 -50 "subrt_COUT" small RC B NSCO 80 -50 1
N 990 80 "subrt_COUT" normal RC B
C 1000 120 15 75 -30 "subrt_OVR" small RC B NSCO 80 -30 1
N 990 120 "subrt_OVR" normal RC B
C 1000 160 16 75 -10 "T[41:26]" small RC B NSCO 80 -10 1
N 990 160 "T[41:26]" normal RC B
C 1000 200 17 75 -70 "accmsb[47:41]" small RC B NSCO 80 -70 1
N 990 200 "accmsb[47:41]" normal RC B
V 4 *
A 80 20 70 30 10.253 1 0
```

```
L -90 -120 70 -120 1 0
L -100 -110 -100 20 1 0
A -100 -110 -90 -120 10 0 0
A -90 30 -100 20 10 0 0
A 70 -120 80 -110 10 0 0
L -90 30 70 30 1 0
T -3 -97 "nmmt" normal CT B T
L 80 -110 80 20 1 0
F 40 10 70 25 5 0
F -90 10 -60 25 5 0
T -9 19 "DATAPATH" normal CC B *
L -11 -46 -8 -49 0 0
L -8 -49 -11 -51 0 0
L -11 -72 -2 -63 1 0
L -2 -34 -11 -25 1 0
B -33 -45 -25 -26 0 0
B -33 -72 -25 -52 0 0
L -14 -34 -14 -32 0 0
L -14 -32 -11 -35 0 0
L -11 -35 -14 -38 0 0
L -14 -38 -14 -36 1 0
L -11 -25 -11 -46 1 0
L -11 -51 -11 -72 1 0
L -14 -60 -14 -58 0 0
L -11 -61 -14 -64 0 0
L -14 -64 -14 -62 0 0
L -14 -58 -11 -61 0 0
L 10 -48 10 -46 0 0
L 10 -46 13 -49 0 0
L 13 -49 10 -52 0 0
L 10 -52 10 -50 0 0
L -2 -63 -2 -34 1 0
B 13 -61 21 -35 0 0
L -2 -48 10 -48 1 0
L 10 -50 -2 -50 1 0
L -14 -36 -25 -36 1 0
L -25 -34 -14 -34 1 0
L -14 -62 -25 -62 1 0
L -24 -60 -14 -60 1 0
T -5 -80 "@Size@" normal CC B A
T -1 -95 "w=@dx@, h=@dy@" normal CC B A
T -15 -15 "@@LABEL" normal CC B L
T -5 -5 "@@INSTNAME" normal CB B I
E
O "mtbordera" 0 0 1100 800 N
E
```

NMMT PCL

```
#cell2 * nmmt pcl * 5 any 13312 v8r4.6.2
# "22-May-94 GMT" "16:19:52 GMT" "22-May-94 GMT" "16:19:52 GMT" amir * .
# VERSION NUMBER
2
# TEMPLATE
# name date time checkSum
cdp "10-Dec-92 GMT" "21:51:41 GMT" 'H5B6542F
# CLIENT OBJECTS (generator modules, etc.)
# ID cellName cellType capabilities
1 MDP mde  Check Portable-Netlist Layout-Model-Netlist Model-Schematic
VHDL-Portable VHDL-Layout-Model Verilog-Portable Verilog-Layout-Model
2 CDP slc  CIF MCP Layout
3 dpath ese  DA
4 MDP la  icon
5 vdpath vce  Generate-Vectors
6 dphdng obj  VHDL-Model Verilog-Model
.
# PARAMETERS
# name value default type flags clientIDs / range
DP_specification [la]nmmt_dp "" string [s,Spec:LA] 1 2 3
DP_frequency 50 10.0 real [] 1 2 3 4 / 1.0 *
DP_place_method manual detail string [] 1 2 3 4 / detail quick manual
DP_place_order [txt]nmmt_dp_order * string [] 1 2 3 4
DP_vdd_size * * string [] 1 2 3 4
DP_vss_size * * string [] 1 2 3 4
DP_power_refresh * * string [] 1 2 3 4
DP_ctrl_buffers auto auto string [s] 1 2 3 4 / auto none
DP_misc false false boolean [] 1 2 3 4
->
.
+>
DP_portable_clock * * string [] 1 2 3 4
DP_layout_clock * * string [] 1 2 3 4
DP_placement_summary * * string [] 1 2 3 4
DP_statemachine "" "" string [] 1 2 3 4
DP_connectorseeds "" "" string [] 1 2 3 4
.
DP_control_misc false false boolean [] 1 2 3 4
->
.
+>
Use_VLSI_buffers true true boolean [] 1 2 3 4
->
control_buffer_family_number * * string [] 1 2 3 4
control_buffer_drive_number * * string [] 1 2 3 4
```

.
+>
DP_control_buffer_family auto auto string [] 1 2 3 4 / auto 2 3 4
DP_control_buffer_drive auto auto string [] 1 2 3 4 / auto 1 2 3 4
.
DP_control_logic_layout_option auto auto string [s] 1 2 3 4 / auto none
.
DP_third_routing_layer none none string [] 1 2 3 4 / auto none
Sim_Option Netlist Netlist string [] 1 2 3 4 / Netlist
Layout_Option Optimized Portable string [] 1 2 3 4 / Portable Optimized
HDL_Option Behavioral Behavioral string [] 1 2 3 4 / Behavioral Netlist
Compatible_Tag vcc6dp4 vcc6dp4 string [] 1 2 3 4
Output_Test_Format VIF VIF string [] 5 / VIF QSIM SIM
.

NMMT_DP LA

```
#cell2 * nmmt_dp la * 51 any 36864 v8r4.6.2
# "19-Sep-94 GMT" "8:09:10 GMT" "19-Sep-94 GMT" "8:09:10 GMT" amir * .la
dpclktgc0 dpswztopo dpswztopi dptitle00 dpnor1021 dpxnr1021 dpbuf0013 dpdff0401
dpconleft dpswzint0 dpadd001h dpbsh004h mtbordera .
V 15 COMPASSlogicAssist
T C
L ""
I 96
B 106 216 901 650
M 1073791437 1073778588 1073791438 1073745972
F micej
D "" "" "cdp:vcc4dp2" "0" "0" "0" "0" "0" "0"
C 160 290 1 5 40 "inval" small LC B NSCI 0 40 1
N 150 290 "inval" normal RC B
C 160 440 3 5 70 "abusd" small LC B NSCI 0 70 1
N 150 440 "abusd" normal RC B
V 4 *
T 95 113 "@@InstName" normal CB B I
A 180 140 170 150 10.253 1 0
L 10 0 170 0 1 0
L 0 10 0 140 1 0
A 0 10 10 0 10 0 0
A 10 150 0 140 10 0 0
A 170 0 180 10 10 0 0
L 10 150 170 150 1 0
L 180 10 180 140 1 0
T 95 30 "@@LABEL" normal CC B L
L 75 70 105 70 1 0
L 75 100 75 70 1 0
L 105 100 75 100 1 0
L 105 70 105 100 1 0
L 105 85 111 91 1 0
L 111 91 111 88 1 0
L 111 88 117 88 1 0
L 117 88 117 91 1 0
L 117 91 123 85 1 0
L 123 85 117 79 1 0
L 117 79 117 82 1 0
L 117 82 111 82 1 0
L 111 82 111 79 1 0
L 111 79 105 85 1 0
L 75 85 71 89 1 0
L 71 89 71 87 1 0
L 71 87 67 87 1 0
L 67 87 67 83 1 0
```

```
L 67 83 71 83 1 0
L 71 83 71 81 1 0
L 71 81 75 85 1 0
T 95 50 "w=@dx@, h=@dy@" small CC B A
T 93 10 "nmmt_dp" normal CC B T
F 10 130 55 145 6 0
F 130 130 170 145 6 0
E
O "mtbordera" 0 0 1100 800 N
I tbrl 8 1 400 360 0 "[la]dpbsh004h" "" 0 NC * 1 "Number_of_Shifts" "32" HLMC
I subrt 94 1 740 400 0 "[la]dpadd001h" "" 0 N * 0
I abussiz 77 1 270 440 0 "[la]dpswzint0" "" 0 * * 1 "spec" "47:32 32L" HLMC
I U75 89 1 180 440 0 "[la]dpconleft" "" 0 * * 1 "spec" "47:32" HLMC
I en 92 1 600 440 0 "[la]dpdff0401" "" 0 N * 0
I msbsswiz 81 1 350 360 0 "[la]dpswzint0" "" 0 * * 1 "spec" "11*47 11*36 11*25 15L"
HLMC
I msbswiz 76 1 240 360 0 "[la]dpswzint0" "" 0 * * 1 "spec" "47 10- 47 10- 47 10- 15-"
HLMC
I msbbuf 80 1 290 360 0 "[la]dpbuf0013" "" 0 N * 0
P 500 290 S
I initswiz 74 1 400 290 0 "[la]dpswzint0" "" 0 * * 1 "spec" "6*41 41:26 26L" HLMC
I U76 90 1 170 290 0 "[la]dpconleft" "" 0 * * 1 "spec" "41:26" HLMC
I min 67 1 530 380 0 "[la]dpxnr1021" "" 0 N * 0
I zer 66 1 610 390 0 "[la]dpnor1021" "" 0 N * 0
I U1 1 1 570 236 0 "[la]dptitle00" "" 0 * * 2 "number_of_bits" "48" HLMC "title" "Spec
schematic" HLMCI
I selbswiz 70 1 420 570 3 "[la]dpswzint0" "" 0 * * 1 "spec" "16L 31:0" HLMC
P 240 440 S
I selb 48 1 420 570 0 "[la]dpswztopi" "" 0 N * 2 "spec" "31:0" HLMC "buffered" "false"
HLMCI
P 500 440 S
I accu 87 1 670 460 0 "[la]dpdff0401" "" 0 N * 0
I accck 68 1 690 510 0 "[la]dpclktgc0" "" 0 * * 1 "clock_number" "1" HLMC
I tswiz 82 1 770 560 0 "[la]dpswzint0" "" 0 * * 1 "spec" "41:26 26-" HLMC
P 670 520 S
I enck 69 1 620 490 0 "[la]dpclktgc0" "" 0 * * 1 "clock_number" "1" HLMC
P 540 460 S
P 540 560 S
P 730 560 S
P 730 480 S
P 860 560 S
P 800 470 S
P 800 520 S
I accmsb 93 1 830 470 0 "[la]dpswztopo" "" 0 N * 2 "spec" "47:41" HLMC "buffered"
"false" HLMCI
I t 95 1 860 600 0 "[la]dpswztopo" "" 0 N * 2 "spec" "41:26" HLMC "buffered" "false"
HLMCI
J 19 selb 1 "o" 17 selbswiz 1 "i"
```

```
J 21 accu 4 "clockspec" 22 accck 1 "clockspec"
J 25 enck 1 "clockspec" 7 en 4 "clockspec"
S 20 7 en 3 "d1" 1 SH
S 3 tbrl 3 "Z" 14 min 3 "a1" 1 SH
N 520 383 "so" normal LB B
S 11 20 1 SV
S 9 msbswiz 1 "i" 18 1 SV
S 12 initswiz 2 "o" 11 1 SH
N 464 293 "invald" normal LB B
S 1 13 U76 1 "i" 1 SH
S 13 U76 1 "i" 12 initswiz 1 "i" 1 SH
S 9 msbswiz 2 "o" 10 msbbuf 1 "i" 1 SH
N 283 363 "msbb" small LB BV
S 10 msbbuf 2 "z" 8 msbsswiz 1 "i" 1 SH
N 338 363 "msbsb" small LB BV
S 8 msbsswiz 2 "o" 3 tbrl 1 "B" 1 SH
N 389 363 "sib" small LB BV
S 15 zer 4 "zn" 4 subrt 2 "B" 1 SH
N 680 403 "sob" normal LB B
S 14 min 2 "zn" 15 zer 1 "a1" 1 SH
N 600 393 "son" normal LB B
S 3 tbrl 4 "SEL" 17 selbswiz 2 "o" 1 SV
N 417 495 "selz" normal LB BV
S 2 6 U75 1 "i" 1 SH
S 5 abussiz 2 "o" 3 tbrl 2 "A" 1 SH
N 375 443 "abusdb" small LB BV
S 18 5 abussiz 1 "i" 1 SH
S 6 U75 1 "i" 18 1 SH
S 24 32 1 SH
N 717 523 "sub" normal LB B
S 28 23 tswiz 1 "i" 1 SH
N 750 563 "acc" normal LB B
S 30 34 t 1 "o" 1 SV
S 21 accu 2 "q" 29 1 SH
S 27 28 1 SH
N 708 563 "acc" normal LB B
S 7 en 2 "q" 21 accu 3 "d1" 1 SH
N 658 463 "enb" normal LB B
S 21 accu 1 "d0" 24 1 SV
S 26 27 1 SV
S 26 7 en 1 "d0" 1 SH
S 29 4 subrt 1 "A" 1 SH
S 29 28 1 SV
S 23 tswiz 2 "o" 30 1 SH
S 4 subrt 3 "SO" 31 1 SV
S 31 33 accmsb 1 "o" 1 SH
S 31 32 1 SV
E
```

NMMT_DP NLS

```
#cell2 * nmmt_dp nls * 3 any 0 v8r4.6.2
# "19-Sep-94 GMT" "8:09:11 GMT" "19-Sep-94 GMT" "8:09:11 GMT" amir * .
writer       1
file_version 1
sections     1
netlist   1:       82 nmmt_dp


B contents:  nmmt_dp
netlist       248
cells        1594
switches        0
attributes   1810
physical        0
history         0
E contents


B netlist
X 1 inval i;
X 2 abusd i;
G 3 VDD;
G 4 VSS;
G 5 BULK;
N 6 sib;
N 7 so;
N 8 msbsb;
N 9 msbb;
N 10 invald;
N 11 selz;
N 12 abusdb;
N 14 sob;
N 15 son;
N 16 sub;
N 17 enb;
N 18 acc;
M NLS dpbsh004h * ¦ A B Z SEL ¦ iioi;
M NLS dpadd001h * ¦ A B SO ¦ iio;
M NLS dpswzint0 * ¦ o i ¦ oi;
M NLS dpconleft * ¦ i ¦ u;
M NLS dpdff0401 * ¦ clockspec q d1 d0 ¦ ioii;
M NLS dpbuf0013 * ¦ i z ¦ io;
M NLS dpswztopi * ¦ o ¦ o;
M NLS dpxnr1021 * ¦ a1 zn ¦ io;
M NLS dpnor1021 * ¦ a1 zn ¦ io;
```

```
M NLS dptitle00 * ¦ ¦ ;
M NLS dpclktgc0 * ¦ clockspec ¦ o;
M NLS dpswztopo * ¦ o ¦ i;
I NLS dpbsh004h * * 1 tbrl ¦ 12 6 7 11;
I NLS dpadd001h * * 2 subrt ¦ 18 14 16;
I NLS dpswzint0 * * 3 abussiz ¦ 12 2;
I NLS dpconleft * * 4 U75 ¦ 2;
I NLS dpdff0401 * * 5 en ¦ 21 17 10 18;
I NLS dpswzint0 * * 6 msbsswiz ¦ 6 8;
I NLS dpswzint0 * * 7 msbswiz ¦ 9 2;
I NLS dpbuf0013 * * 8 msbbuf ¦ 9 8;
I NLS dpswzint0 * * 9 initswiz ¦ 10 1;
I NLS dpconleft * * 10 U76 ¦ 1;
I NLS dpswzint0 * * 11 selbswiz ¦ 11 13;
I NLS dpswztopi * * 12 selb ¦ 13;
I NLS dpxnr1021 * * 13 min ¦ 7 15;
I NLS dpnor1021 * * 14 zer ¦ 15 14;
I NLS dptitle00 * * 15 U1 ¦;
I NLS dpdff0401 * * 16 accu ¦ 19 18 17 16;
I NLS dpclktgc0 * * 17 accck ¦ 19;
I NLS dpswzint0 * * 18 tswiz ¦ 20 18;
I NLS dpclktgc0 * * 19 enck ¦ 21;
I NLS dpswztopo * * 20 accmsb ¦ 16;
I NLS dpswztopo * * 21 t ¦ 20;
E netlist


B subcells
NLS dpbsh004h *
NLS dpadd001h *
NLS dpswzint0 *
NLS dpconleft *
NLS dpdff0401 *
NLS dpbuf0013 *
NLS dpswztopi *
NLS dpxnr1021 *
NLS dpnor1021 *
NLS dptitle00 *
NLS dpclktgc0 *
NLS dpswztopo *
E subcells


B attribute_list
    1976 Number_of_Shifts
    2014 spec
    2249 buffered
    2290 number_of_bits
```

```
     2327 title
     2368 clock_number
 E attribute_list

 B A: Number_of_Shifts
 1010 32;
  1;
 E

 B A: spec
 1010 47:32 32L;
  3;
 1010 47:32;
  4;
 1010 11*47 11*36 11*25 15L;
  6;
 1010 47 10- 47 10- 47 10- 15-;
  7;
 1010 6*41 41:26 26L;
  9;
 1010 41:26;
  10 21;
 1010 16L 31:0;
  11;
 1010 31:0;
  12;
 1010 41:26 26-;
  18;
 1010 47:41;
  20;
 E

 B A: buffered
 11010 false;
  12 20 21;
 E

 B A: number_of_bits
 1010 48;
  15;
 E

 B A: title
 11010 Spec schematic;
  15;
 E

 B A: clock_number
```

1010 1;
17 19;
E

NMMTC_P NLS

```
#cell2 * nmmtc_p nls * 36 any 0 v8r4.6.3
# "21-Nov-94 GMT" "12:59:33 GMT" "21-Nov-94 GMT" "12:59:33 GMT" amir * .
writer        1
file_version  1
sections      1
netlist   1:        82 nmmtc_p


B contents:  nmmtc_p
netlist       248
cells       52357
switches        0
attributes      0
physical        0
history         0
E contents


B netlist
X 1 clk i;
X 2 clk_ i;
X 3 reset_ i;
X 4 f_en i;
X 5 rx_ck i;
X 6 ta_ck o;
X 7 ta_data o;
X 8 ta_le_ o;
X 9 t[15] i;
X 10 t[14] i;
X 11 t[13] i;
X 12 t[12] i;
X 13 t[11] i;
X 14 t[10] i;
X 15 t[9] i;
X 16 t[8] i;
X 17 t[7] i;
X 18 t[6] i;
X 19 t[5] i;
X 20 t[4] i;
X 21 t[3] i;
X 22 t[2] i;
X 23 t[1] i;
X 24 t[0] i;
X 25 ttfrz i;
X 26 ttmod[4] i;
```

```
X 27 ttmod[3] i;
X 28 ttmod[2] i;
X 29 ttmod[1] i;
X 30 ttmod[0] i;
X 31 selu1[7] o;
X 32 selu1[6] o;
X 33 selu1[5] o;
X 34 selu1[4] o;
X 35 selu1[3] o;
X 36 selu1[2] o;
X 37 selu1[1] o;
X 38 selu1[0] o;
X 39 selu0[3] o;
X 40 selu0[2] o;
X 41 selu0[1] o;
X 42 selu0[0] o;
X 43 selu0b[7] i;
X 44 selu0b[6] i;
X 45 selu0b[5] i;
X 46 selu0b[4] i;
X 47 selu0b[3] i;
X 48 selu0b[2] i;
X 49 selu0b[1] i;
X 50 selu0b[0] i;
X 51 selu1b[7] i;
X 52 selu1b[6] i;
X 53 selu1b[5] i;
X 54 selu1b[4] i;
X 55 selu1b[3] i;
X 56 selu1b[2] i;
X 57 selu1b[1] i;
X 58 selu1b[0] i;
X 59 selb[31] o;
X 60 selb[30] o;
X 61 selb[29] o;
X 62 selb[28] o;
X 63 selb[27] o;
X 64 selb[26] o;
X 65 selb[25] o;
X 66 selb[24] o;
X 67 selb[23] o;
X 68 selb[22] o;
X 69 selb[21] o;
X 70 selb[20] o;
X 71 selb[19] o;
X 72 selb[18] o;
X 73 selb[17] o;
X 74 selb[16] o;
```

X 75 selb[15] o;
X 76 selb[14] o;
X 77 selb[13] o;
X 78 selb[12] o;
X 79 selb[11] o;
X 80 selb[10] o;
X 81 selb[9] o;
X 82 selb[8] o;
X 83 selb[7] o;
X 84 selb[6] o;
X 85 selb[5] o;
X 86 selb[4] o;
X 87 selb[3] o;
X 88 selb[2] o;
X 89 selb[1] o;
X 90 selb[0] o;
X 91 accmsb[6] i;
X 92 accmsb[5] i;
X 93 accmsb[4] i;
X 94 accmsb[3] i;
X 95 accmsb[2] i;
X 96 accmsb[1] i;
X 97 accmsb[0] i;
X 98 tovr i;
X 99 tcout i;
X 100 acctck o;
X 101 enck o;
X 102 minus o;
X 103 en_sl o;
X 104 tacc_sl o;
X 105 tzero o;
X 106 bsym[1] i;
X 107 bsym[0] i;
X 108 tta_ck o;
X 109 tflgof o;
X 110 tflguf o;
G 111 VDD;
G 112 VSS;
N 113 txcnt[0];
N 114 tcnt[0];
N 115 tcnt[1];
N 116 tcnt[2];
N 117 mulnum[1];
N 118 mulnum[2];
N 119 mulnum[3];
N 120 mulnum[4];
N 121 mulnum[5];
N 122 ta_cnt[0];

N 123 ta_cnt[1];
N 124 ta_cnt[2];
N 125 ta_cnt[3];
N 126 xcnt[0];
N 127 xcnt[1];
N 128 tareg_n[0];
N 129 tareg_n[1];
N 130 tareg_n[2];
N 131 tareg_n[3];
N 132 tareg_n[4];
N 133 tareg_n[5];
N 134 tareg_n[6];
N 135 tareg_n[7];
N 136 tareg_n[8];
N 137 tareg_n[9];
N 138 tareg_n[10];
N 139 tareg_n[11];
N 140 tareg_n[12];
N 141 tareg_n[13];
N 142 tareg_n[14];
N 143 tareg_n[15];
N 144 mulbus[0];
N 145 mulbus[1];
N 146 mulbus[2];
N 147 mulbus[3];
N 148 mulbus[4];
N 149 mulbus[5];
N 150 numt[1];
N 151 numt[2];
N 152 numt[3];
N 153 mulnum2[0];
N 154 mulnum2[1];
N 155 mulnum2[2];
N 156 mulnum2[3];
N 157 tcnt_n[0];
N 158 tcnt_n[1];
N 159 tcnt_n[2];
N 160 tbus[0];
N 161 tbus[1];
N 162 tbus[2];
N 163 tbus[3];
N 164 tbus[4];
N 165 tbus[5];
N 166 tbus[6];
N 167 tbus[7];
N 168 tbus[8];
N 169 tbus[9];
N 170 tbus[10];

N 171 tbus[11];
N 172 tbus[12];
N 173 tbus[13];
N 174 tbus[14];
N 175 tbus[15];
N 176 txcnt_n[0];
N 177 txcnt_n[1];
N 178 xcnt_n[0];
N 179 xcnt_n[1];
N 180 ta_cnt_n[0];
N 181 ta_cnt_n[1];
N 182 ta_cnt_n[2];
N 183 ta_cnt_n[3];
N 184 selbd[0];
N 185 selbd[1];
N 186 selbd[2];
N 187 selbd[3];
N 188 selbd[4];
N 189 selbd[5];
N 190 selbd[6];
N 191 selbd[7];
N 192 selbd[8];
N 193 selbd[9];
N 194 selbd[10];
N 195 selbd[11];
N 196 selbd[12];
N 197 selbd[13];
N 198 selbd[14];
N 199 selbd[15];
N 200 selbd[16];
N 201 selbd[17];
N 202 selbd[18];
N 203 selbd[19];
N 204 selbd[20];
N 205 selbd[21];
N 206 selbd[22];
N 207 selbd[23];
N 208 selbd[24];
N 209 selbd[25];
N 210 selbd[26];
N 211 selbd[27];
N 212 selbd[28];
N 213 selbd[29];
N 214 selbd[30];
N 215 selbd[31];
N 216 n4;
N 217 i_1223_z;
N 218 ta00_ff_b0_qn;

N 219 i_1229_z;
N 220 i_1225_zn;
N 221 tareg_ff_b0_qn;
N 222 i_1226_zn;
N 223 i_1227_zn;
N 224 i_1228_zn;
N 225 xcnt_ff_b1_qn;
N 226 i_1230_zn;
N 227 i_1231_z;
N 228 ta_cnt_ff_b3_qn;
N 229 ta_cnt_ff_b0_qn;
N 230 ta_cnt_ff_b1_qn;
N 231 ta_cnt_ff_b2_qn;
N 232 ta00_ff_b1_qn;
N 233 tareg_ff_b1_qn;
N 234 i_1233_z;
N 235 ta00_ff_b2_qn;
N 236 tareg_ff_b2_qn;
N 237 ta00_ff_b3_qn;
N 238 tareg_ff_b3_qn;
N 239 ta00_ff_b4_qn;
N 240 tareg_ff_b4_qn;
N 241 ta00_ff_b5_qn;
N 242 tareg_ff_b5_qn;
N 243 ta00_ff_b6_qn;
N 244 tareg_ff_b6_qn;
N 245 ta00_ff_b7_qn;
N 246 tareg_ff_b7_qn;
N 247 ta00_ff_b8_qn;
N 248 tareg_ff_b8_qn;
N 249 ta00_ff_b9_qn;
N 250 tareg_ff_b9_qn;
N 251 ta00_ff_b10_qn;
N 252 tareg_ff_b10_qn;
N 253 ta00_ff_b11_qn;
N 254 tareg_ff_b11_qn;
N 255 ta00_ff_b12_qn;
N 256 tareg_ff_b12_qn;
N 257 ta00_ff_b13_qn;
N 258 tareg_ff_b13_qn;
N 259 ta00_ff_b14_qn;
N 260 tareg_ff_b14_qn;
N 261 ta00_ff_b15_qn;
N 262 tareg_ff_b15_qn;
N 263 tstt3;
N 264 tstt0;
N 265 tacc_sl_n;
N 266 mulreg_ff_b1_qn;

N 267 i_1260_zn;
N 268 i_1250_zn;
N 269 i_1252_zn;
N 270 i_1251_zn;
N 271 tstt1;
N 272 i_1253_zn;
N 273 i_1258_z;
N 274 i_1257_zn;
N 275 i_1256_zn;
N 276 i_1254_zn;
N 277 i_1255_zn;
N 278 i_1259_zn;
N 279 mulreg_ff_b2_qn;
N 280 i_1262_zn;
N 281 i_1267_zn;
N 282 mulreg_ff_b3_qn;
N 283 mulreg_ff_b4_qn;
N 284 i_1271_zn;
N 285 i_1274_zn;
N 286 mulreg_ff_b5_qn;
N 287 i_1280_z;
N 288 i_1279_z;
N 289 tcnt_ff_b0_qn;
N 290 i_1278_zn;
N 291 tstt4_ff_qn;
N 292 tstt1_ff_qn;
N 293 tcnt_ff_b1_qn;
N 294 i_1283_zn;
N 295 i_1282_z;
N 296 i_1284_zn;
N 297 i_1288_zn;
N 298 tcnt_ff_b2_qn;
N 299 i_1286_z;
N 300 i_1287_z;
N 301 tstt0_ff_qn;
N 302 tstt1d;
N 303 tstt2d;
N 304 tstt3_ff_qn;
N 305 tstt4d;
N 306 tstt5d;
N 307 i_1302_z;
N 308 i_1294_zn;
N 309 tovrd_n;
N 310 i_1297_z;
N 311 tovrd;
N 312 i_1296_z;
N 313 i_1295_zn;
N 314 tstt5_ff_qn;

```
N 315 i_1301_z;
N 316 i_1300_zn;
N 317 i_1298_zn;
N 318 i_1299_zn;
N 319 tovrd_ff_qn;
N 320 tcoutd;
N 321 tminufd;
N 322 tmaxofd_ff_qn;
N 323 i_1305_zn;
N 324 tstt2_ff_qn;
N 325 i_1304_z;
N 326 tflguf_n;
N 327 i_1306_z;
N 328 i_1307_zn;
N 329 tminufd_ff_qn;
N 330 i_1309_zn;
N 331 tflgof_n;
N 332 i_1313_z;
N 333 i_1311_z;
N 334 i_1312_z;
N 335 tstt5;
N 336 i_1315_zn;
N 337 i_1314_zn;
N 338 tstt4s;
N 339 twr00;
N 340 i_1320_z;
N 341 i_1322_z;
N 342 i_1324_z;
N 343 i_1326_z;
N 344 i_1328_z;
N 345 i_1330_z;
N 346 i_1332_z;
N 347 i_1334_z;
N 348 i_1336_z;
N 349 i_1338_z;
N 350 i_1340_z;
N 351 i_1342_z;
N 352 i_1344_z;
N 353 i_1346_z;
N 354 i_1348_zn;
N 355 i_1349_zn;
N 356 i_1351_zn;
N 357 i_1350_zn;
N 358 i_1353_zn;
N 359 i_1352_zn;
N 360 i_1354_zn;
N 361 i_1357_zn;
N 362 i_1356_zn;
```

N 363 tmaxofd_n;
N 364 tten_ff_qn;
N 365 txcnt_ff_b0_qn;
N 366 i_1360_z;
N 367 tstt15;
N 368 ttadis;
N 369 ttbs;
N 370 ttas_ff_qn;
N 371 ttdisd;
N 372 tten_n;
N 373 ten_ff_qn;
N 374 i_1366_z;
N 375 i_1368_z;
N 376 i_1369_zn;
N 377 i_1371_z;
N 378 i_1373_z;
N 379 tadis;
N 380 tas_ff_qn;
N 381 tbs;
N 382 tdisd;
N 383 ten_n;
N 384 i_1383_z;
N 385 i_1378_z;
N 386 selb_ff_b1_qn;
N 387 i_1382_z;
N 388 i_1381_z;
N 389 i_1380_z;
N 390 i_1379_z;
N 391 i_1384_zn;
N 392 i_1386_z;
N 393 selb_ff_b2_qn;
N 394 i_1387_zn;
N 395 i_1389_z;
N 396 selb_ff_b3_qn;
N 397 i_1390_zn;
N 398 i_1392_z;
N 399 selb_ff_b4_qn;
N 400 i_1394_z;
N 401 selb_ff_b5_qn;
N 402 i_1395_zn;
N 403 i_1397_z;
N 404 selb_ff_b6_qn;
N 405 i_1399_z;
N 406 selb_ff_b7_qn;
N 407 i_1401_z;
N 408 selb_ff_b8_qn;
N 409 i_1403_z;
N 410 selb_ff_b9_qn;

N 411 i_1404_zn;
N 412 i_1406_z;
N 413 selb_ff_b10_qn;
N 414 i_1408_z;
N 415 selb_ff_b11_qn;
N 416 i_1410_z;
N 417 selb_ff_b12_qn;
N 418 i_1412_z;
N 419 selb_ff_b13_qn;
N 420 i_1414_z;
N 421 selb_ff_b14_qn;
N 422 i_1416_z;
N 423 selb_ff_b15_qn;
N 424 i_1418_zn;
N 425 selb_ff_b16_qn;
N 426 i_1419_z;
N 427 i_1421_zn;
N 428 selb_ff_b17_qn;
N 429 i_1422_z;
N 430 selb_ff_b18_qn;
N 431 selb_ff_b19_qn;
N 432 selb_ff_b20_qn;
N 433 selb_ff_b21_qn;
N 434 selb_ff_b22_qn;
N 435 selb_ff_b23_qn;
N 436 selb_ff_b24_qn;
N 437 selb_ff_b25_qn;
N 438 selb_ff_b26_qn;
N 439 selb_ff_b27_qn;
N 440 selb_ff_b28_qn;
N 441 selb_ff_b29_qn;
N 442 selb_ff_b30_qn;
N 443 selb_ff_b31_qn;
N 444 acctck_n;
N 445 en_sl_n;
N 446 i_1441_z;
N 447 xcnt_ff_b0_qn;
N 448 i_1462_zn;
N 449 i_1461_zn;
N 450 i_11461_zn;
N 451 ta00_ff_b0_q;
N 452 ta00_ff_b1_q;
N 453 ta00_ff_b2_q;
N 454 ta00_ff_b3_q;
N 455 ta00_ff_b4_q;
N 456 ta00_ff_b5_q;
N 457 ta00_ff_b6_q;
N 458 ta00_ff_b7_q;

N 459 ta00_ff_b8_q;
N 460 ta00_ff_b9_q;
N 461 ta00_ff_b10_q;
N 462 ta00_ff_b11_q;
N 463 ta00_ff_b12_q;
N 464 ta00_ff_b13_q;
N 465 ta00_ff_b14_q;
N 466 ta00_ff_b15_q;
N 467 tareg_ff_b0_q;
N 468 tareg_ff_b1_q;
N 469 tareg_ff_b2_q;
N 470 tareg_ff_b3_q;
N 471 tareg_ff_b4_q;
N 472 tareg_ff_b5_q;
N 473 tareg_ff_b6_q;
N 474 tareg_ff_b7_q;
N 475 tareg_ff_b8_q;
N 476 tareg_ff_b9_q;
N 477 tareg_ff_b10_q;
N 478 tareg_ff_b11_q;
N 479 tareg_ff_b12_q;
N 480 tareg_ff_b13_q;
N 481 tareg_ff_b14_q;
N 482 tareg_ff_b15_q;
N 483 mulreg_ff_b0_q;
N 484 mulreg_ff_b1_q;
N 485 mulreg_ff_b2_q;
N 486 mulreg_ff_b3_q;
N 487 mulreg_ff_b4_q;
N 488 mulreg_ff_b5_q;
N 489 tstt2;
N 490 tstt4_ff_q;
N 491 tstt15_ff_qn;
N 492 tta_ck_;
N 493 tstt4s_ff_qn;
N 494 tcoutd_ff_qn;
N 495 tmaxofd_ff_q;
N 496 tta_ck_n;
N 497 tta_ck_n_;
N 498 ttas;
N 499 ttbs_ff_qn;
N 500 ttdisd_ff_qn;
N 501 tten_ff_q;
N 502 tas;
N 503 tbs_ff_qn;
N 504 tdisd_ff_qn;
N 505 ten_ff_q;
N 506 selb_ff_b0_qn;

N 507 acctck_ff_qn;
N 508 enck_ff_qn;
N 509 en_sl_ff_qn;
N 510 tacc_sl_ff_qn;
N 511 tflgof_ff_qn;
N 512 tflguf_ff_qn;
N 113 txcnt_ff_b0_Q[0];
N 114 tcnt_ff_b0_Q[0];
N 115 tcnt_ff_b1_Q[0];
N 116 tcnt_ff_b2_Q[0];
N 117 u103_S0[0];
N 118 u103_S1[0];
N 119 u104_S0[0];
N 120 u104_S1[0];
N 121 u104_CO[0];
N 122 ta_cnt_ff_b0_Q[0];
N 123 ta_cnt_ff_b1_Q[0];
N 124 ta_cnt_ff_b2_Q[0];
N 125 ta_cnt_ff_b3_Q[0];
N 126 xcnt_ff_b0_Q[0];
N 127 xcnt_ff_b1_Q[0];
N 128 i_1224_ZN[0];
N 129 i_1232_ZN[0];
N 130 i_1234_ZN[0];
N 131 i_1235_ZN[0];
N 132 i_1236_ZN[0];
N 133 i_1237_ZN[0];
N 134 i_1238_ZN[0];
N 135 i_1239_ZN[0];
N 136 i_1240_ZN[0];
N 137 i_1241_ZN[0];
N 138 i_1242_ZN[0];
N 139 i_1243_ZN[0];
N 140 i_1244_ZN[0];
N 141 i_1245_ZN[0];
N 142 i_1246_ZN[0];
N 143 i_1247_ZN[0];
N 144 i_1249_ZN[0];
N 145 i_1261_ZN[0];
N 146 i_1268_ZN[0];
N 147 i_1269_ZN[0];
N 148 i_1275_ZN[0];
N 149 i_1276_Z[0];
N 150 i_1265_Z[0];
N 151 i_1263_Z[0];
N 152 i_1272_Z[0];
N 153 i_1264_ZN[0];
N 154 i_1266_ZN[0];

N 155 i_1273_ZN[0];
N 156 i_1270_ZN[0];
N 157 i_1277_ZN[0];
N 158 i_1281_ZN[0];
N 159 i_1285_ZN[0];
N 160 i_1310_Z[0];
N 161 i_1319_Z[0];
N 162 i_1321_Z[0];
N 163 i_1323_Z[0];
N 164 i_1325_Z[0];
N 165 i_1327_Z[0];
N 166 i_1329_Z[0];
N 167 i_1331_Z[0];
N 168 i_1333_Z[0];
N 169 i_1335_Z[0];
N 170 i_1337_Z[0];
N 171 i_1339_Z[0];
N 172 i_1341_Z[0];
N 173 i_1343_Z[0];
N 174 i_1345_Z[0];
N 175 i_1347_ZN[0];
N 176 i_1358_Z[0];
N 177 i_1359_ZN[0];
N 178 i_1364_ZN[0];
N 179 i_1440_ZN[0];
N 180 i_1365_ZN[0];
N 181 i_1367_Z[0];
N 182 i_1370_Z[0];
N 183 i_1372_ZN[0];
N 184 i_1377_ZN[0];
N 185 i_1385_ZN[0];
N 186 i_1388_ZN[0];
N 187 i_1391_ZN[0];
N 188 i_1393_ZN[0];
N 189 i_1396_ZN[0];
N 190 i_1398_ZN[0];
N 191 i_1400_ZN[0];
N 192 i_1402_ZN[0];
N 193 i_1405_ZN[0];
N 194 i_1407_ZN[0];
N 195 i_1409_ZN[0];
N 196 i_1411_ZN[0];
N 197 i_1413_ZN[0];
N 198 i_1415_ZN[0];
N 199 i_1417_ZN[0];
N 200 i_1420_ZN[0];
N 201 i_1423_ZN[0];
N 202 i_1424_ZN[0];

N 203 i_1425_ZN[0];
N 204 i_1426_ZN[0];
N 205 i_1427_ZN[0];
N 206 i_1428_ZN[0];
N 207 i_1429_ZN[0];
N 208 i_1430_ZN[0];
N 209 i_1431_ZN[0];
N 210 i_1432_ZN[0];
N 211 i_1433_ZN[0];
N 212 i_1434_ZN[0];
N 213 i_1435_ZN[0];
N 214 i_1436_ZN[0];
N 215 i_1437_Z[0];
N 216 u103_CO[0];
N 217 i_1223_Z_1[0];
N 218 ta00_ff_b0_QN_1[0];
N 219 i_1229_Z_1[0];
N 220 i_1225_ZN_1[0];
N 221 tareg_ff_b0_QN_1[0];
N 222 i_1226_ZN_1[0];
N 223 i_1227_ZN_1[0];
N 224 i_1228_ZN_1[0];
N 225 xcnt_ff_b1_QN_1[0];
N 226 i_1230_ZN_1[0];
N 227 i_1231_Z_1[0];
N 228 ta_cnt_ff_b3_QN_1[0];
N 229 ta_cnt_ff_b0_QN_1[0];
N 230 ta_cnt_ff_b1_QN_1[0];
N 231 ta_cnt_ff_b2_QN_1[0];
N 232 ta00_ff_b1_QN_1[0];
N 233 tareg_ff_b1_QN_1[0];
N 234 i_1233_Z_1[0];
N 235 ta00_ff_b2_QN_1[0];
N 236 tareg_ff_b2_QN_1[0];
N 237 ta00_ff_b3_QN_1[0];
N 238 tareg_ff_b3_QN_1[0];
N 239 ta00_ff_b4_QN_1[0];
N 240 tareg_ff_b4_QN_1[0];
N 241 ta00_ff_b5_QN_1[0];
N 242 tareg_ff_b5_QN_1[0];
N 243 ta00_ff_b6_QN_1[0];
N 244 tareg_ff_b6_QN_1[0];
N 245 ta00_ff_b7_QN_1[0];
N 246 tareg_ff_b7_QN_1[0];
N 247 ta00_ff_b8_QN_1[0];
N 248 tareg_ff_b8_QN_1[0];
N 249 ta00_ff_b9_QN_1[0];
N 250 tareg_ff_b9_QN_1[0];

N 251 ta00_ff_b10_QN_1[0];
N 252 tareg_ff_b10_QN_1[0];
N 253 ta00_ff_b11_QN_1[0];
N 254 tareg_ff_b11_QN_1[0];
N 255 ta00_ff_b12_QN_1[0];
N 256 tareg_ff_b12_QN_1[0];
N 257 ta00_ff_b13_QN_1[0];
N 258 tareg_ff_b13_QN_1[0];
N 259 ta00_ff_b14_QN_1[0];
N 260 tareg_ff_b14_QN_1[0];
N 261 ta00_ff_b15_QN_1[0];
N 262 tareg_ff_b15_QN_1[0];
N 263 tstt3_ff_Q[0];
N 264 tstt0_ff_Q[0];
N 265 i_1248_Z[0];
N 266 mulreg_ff_b1_QN_1[0];
N 267 i_1260_ZN_1[0];
N 268 i_1250_ZN_1[0];
N 269 i_1252_ZN_1[0];
N 270 i_1251_ZN_1[0];
N 271 tstt1_ff_Q[0];
N 272 i_1253_ZN_1[0];
N 273 i_1258_Z_1[0];
N 274 i_1257_ZN_1[0];
N 275 i_1256_ZN_1[0];
N 276 i_1254_ZN_1[0];
N 277 i_1255_ZN_1[0];
N 278 i_1259_ZN_1[0];
N 279 mulreg_ff_b2_QN_1[0];
N 280 i_1262_ZN_1[0];
N 281 i_1267_ZN_1[0];
N 282 mulreg_ff_b3_QN_1[0];
N 283 mulreg_ff_b4_QN_1[0];
N 284 i_1271_ZN_1[0];
N 285 i_1274_ZN_1[0];
N 286 mulreg_ff_b5_QN_1[0];
N 287 i_1280_Z_1[0];
N 288 i_1279_Z_1[0];
N 289 tcnt_ff_b0_QN_1[0];
N 290 i_1278_ZN_1[0];
N 291 tstt4_ff_QN_1[0];
N 292 tstt1_ff_QN_1[0];
N 293 tcnt_ff_b1_QN_1[0];
N 294 i_1283_ZN_1[0];
N 295 i_1282_Z_1[0];
N 296 i_1284_ZN_1[0];
N 297 i_1288_ZN_1[0];
N 298 tcnt_ff_b2_QN_1[0];

N 299 i_1286_Z_1[0];
N 300 i_1287_Z_1[0];
N 301 tstt0_ff_QN_1[0];
N 302 i_1289_ZN[0];
N 303 i_1290_ZN[0];
N 304 tstt3_ff_QN_1[0];
N 305 i_1291_ZN[0];
N 306 i_1292_ZN[0];
N 307 i_1302_Z_1[0];
N 308 i_1294_ZN_1[0];
N 309 i_1293_ZN[0];
N 310 i_1297_Z_1[0];
N 311 tovrd_ff_Q[0];
N 312 i_1296_Z_1[0];
N 313 i_1295_ZN_1[0];
N 314 tstt5_ff_QN_1[0];
N 315 i_1301_Z_1[0];
N 316 i_1300_ZN_1[0];
N 317 i_1298_ZN_1[0];
N 318 i_1299_ZN_1[0];
N 319 tovrd_ff_QN_1[0];
N 320 tcoutd_ff_Q[0];
N 321 tminufd_ff_Q[0];
N 322 tmaxofd_ff_QN_1[0];
N 323 i_1305_ZN_1[0];
N 324 tstt2_ff_QN_1[0];
N 325 i_1304_Z_1[0];
N 326 i_1303_ZN[0];
N 327 i_1306_Z_1[0];
N 328 i_1307_ZN_1[0];
N 329 tminufd_ff_QN_1[0];
N 330 i_1309_ZN_1[0];
N 331 i_1308_ZN[0];
N 332 i_1313_Z_1[0];
N 333 i_1311_Z_1[0];
N 334 i_1312_Z_1[0];
N 335 tstt5_ff_Q[0];
N 336 i_1315_ZN_1[0];
N 337 i_1314_ZN_1[0];
N 338 tstt4s_ff_Q[0];
N 339 i_1318_Z[0];
N 340 i_1320_Z_1[0];
N 341 i_1322_Z_1[0];
N 342 i_1324_Z_1[0];
N 343 i_1326_Z_1[0];
N 344 i_1328_Z_1[0];
N 345 i_1330_Z_1[0];
N 346 i_1332_Z_1[0];

N 347 i_1334_Z_1[0];
N 348 i_1336_Z_1[0];
N 349 i_1338_Z_1[0];
N 350 i_1340_Z_1[0];
N 351 i_1342_Z_1[0];
N 352 i_1344_Z_1[0];
N 353 i_1346_Z_1[0];
N 354 i_1348_ZN_1[0];
N 355 i_1349_ZN_1[0];
N 356 i_1351_ZN_1[0];
N 357 i_1350_ZN_1[0];
N 358 i_1353_ZN_1[0];
N 359 i_1352_ZN_1[0];
N 360 i_1354_ZN_1[0];
N 361 i_1357_ZN_1[0];
N 362 i_1356_ZN_1[0];
N 363 i_1355_ZN[0];
N 364 tten_ff_QN_1[0];
N 365 txcnt_ff_b0_QN_1[0];
N 366 i_1360_Z_1[0];
N 367 tstt15_ff_Q[0];
N 368 i_1361_Z[0];
N 369 ttbs_ff_Q[0];
N 370 ttas_ff_QN_1[0];
N 371 ttdisd_ff_Q[0];
N 372 i_1362_ZN[0];
N 373 ten_ff_QN_1[0];
N 374 i_1366_Z_1[0];
N 375 i_1368_Z_1[0];
N 376 i_1369_ZN_1[0];
N 377 i_1371_Z_1[0];
N 378 i_1373_Z_1[0];
N 379 i_1375_Z[0];
N 380 tas_ff_QN_1[0];
N 381 tbs_ff_Q[0];
N 382 tdisd_ff_Q[0];
N 383 i_1376_ZN[0];
N 384 i_1383_Z_1[0];
N 385 i_1378_Z_1[0];
N 386 selb_ff_b1_QN_1[0];
N 387 i_1382_Z_1[0];
N 388 i_1381_Z_1[0];
N 389 i_1380_Z_1[0];
N 390 i_1379_Z_1[0];
N 391 i_1384_ZN_1[0];
N 392 i_1386_Z_1[0];
N 393 selb_ff_b2_QN_1[0];
N 394 i_1387_ZN_1[0];

N 395 i_1389_Z_1[0];
N 396 selb_ff_b3_QN_1[0];
N 397 i_1390_ZN_1[0];
N 398 i_1392_Z_1[0];
N 399 selb_ff_b4_QN_1[0];
N 400 i_1394_Z_1[0];
N 401 selb_ff_b5_QN_1[0];
N 402 i_1395_ZN_1[0];
N 403 i_1397_Z_1[0];
N 404 selb_ff_b6_QN_1[0];
N 405 i_1399_Z_1[0];
N 406 selb_ff_b7_QN_1[0];
N 407 i_1401_Z_1[0];
N 408 selb_ff_b8_QN_1[0];
N 409 i_1403_Z_1[0];
N 410 selb_ff_b9_QN_1[0];
N 411 i_1404_ZN_1[0];
N 412 i_1406_Z_1[0];
N 413 selb_ff_b10_QN_1[0];
N 414 i_1408_Z_1[0];
N 415 selb_ff_b11_QN_1[0];
N 416 i_1410_Z_1[0];
N 417 selb_ff_b12_QN_1[0];
N 418 i_1412_Z_1[0];
N 419 selb_ff_b13_QN_1[0];
N 420 i_1414_Z_1[0];
N 421 selb_ff_b14_QN_1[0];
N 422 i_1416_Z_1[0];
N 423 selb_ff_b15_QN_1[0];
N 424 i_1418_ZN_1[0];
N 425 selb_ff_b16_QN_1[0];
N 426 i_1419_Z_1[0];
N 427 i_1421_ZN_1[0];
N 428 selb_ff_b17_QN_1[0];
N 429 i_1422_Z_1[0];
N 430 selb_ff_b18_QN_1[0];
N 431 selb_ff_b19_QN_1[0];
N 432 selb_ff_b20_QN_1[0];
N 433 selb_ff_b21_QN_1[0];
N 434 selb_ff_b22_QN_1[0];
N 435 selb_ff_b23_QN_1[0];
N 436 selb_ff_b24_QN_1[0];
N 437 selb_ff_b25_QN_1[0];
N 438 selb_ff_b26_QN_1[0];
N 439 selb_ff_b27_QN_1[0];
N 440 selb_ff_b28_QN_1[0];
N 441 selb_ff_b29_QN_1[0];
N 442 selb_ff_b30_QN_1[0];

N 443 selb_ff_b31_QN_1[0];
N 444 i_1438_ZN[0];
N 445 i_1439_ZN[0];
N 446 i_1441_Z_1[0];
N 447 xcnt_ff_b0_QN_1[0];
N 448 i_1462_ZN_1[0];
N 449 i_1461_ZN_1[0];
N 450 i_11461_ZN_1[0];
N 451 ta00_ff_b0_Q_1[0];
N 452 ta00_ff_b1_Q_1[0];
N 453 ta00_ff_b2_Q_1[0];
N 454 ta00_ff_b3_Q_1[0];
N 455 ta00_ff_b4_Q_1[0];
N 456 ta00_ff_b5_Q_1[0];
N 457 ta00_ff_b6_Q_1[0];
N 458 ta00_ff_b7_Q_1[0];
N 459 ta00_ff_b8_Q_1[0];
N 460 ta00_ff_b9_Q_1[0];
N 461 ta00_ff_b10_Q_1[0];
N 462 ta00_ff_b11_Q_1[0];
N 463 ta00_ff_b12_Q_1[0];
N 464 ta00_ff_b13_Q_1[0];
N 465 ta00_ff_b14_Q_1[0];
N 466 ta00_ff_b15_Q_1[0];
N 467 tareg_ff_b0_Q_1[0];
N 468 tareg_ff_b1_Q_1[0];
N 469 tareg_ff_b2_Q_1[0];
N 470 tareg_ff_b3_Q_1[0];
N 471 tareg_ff_b4_Q_1[0];
N 472 tareg_ff_b5_Q_1[0];
N 473 tareg_ff_b6_Q_1[0];
N 474 tareg_ff_b7_Q_1[0];
N 475 tareg_ff_b8_Q_1[0];
N 476 tareg_ff_b9_Q_1[0];
N 477 tareg_ff_b10_Q_1[0];
N 478 tareg_ff_b11_Q_1[0];
N 479 tareg_ff_b12_Q_1[0];
N 480 tareg_ff_b13_Q_1[0];
N 481 tareg_ff_b14_Q_1[0];
N 482 tareg_ff_b15_Q_1[0];
N 483 mulreg_ff_b0_Q_1[0];
N 484 mulreg_ff_b1_Q_1[0];
N 485 mulreg_ff_b2_Q_1[0];
N 486 mulreg_ff_b3_Q_1[0];
N 487 mulreg_ff_b4_Q_1[0];
N 488 mulreg_ff_b5_Q_1[0];
N 489 tstt2_ff_Q[0];
N 490 tstt4_ff_Q_1[0];

N 491 tstt15_ff_QN_1[0];
N 492 tta_ck__buf_ZN[0];
N 493 tstt4s_ff_QN_1[0];
N 494 tcoutd_ff_QN_1[0];
N 495 tmaxofd_ff_Q_1[0];
N 496 txcnt_ff_b1_Q[0];
N 497 txcnt_ff_b1_QN[0];
N 498 ttas_ff_Q[0];
N 499 ttbs_ff_QN_1[0];
N 500 ttdisd_ff_QN_1[0];
N 501 tten_ff_Q_1[0];
N 502 tas_ff_Q[0];
N 503 tbs_ff_QN_1[0];
N 504 tdisd_ff_QN_1[0];
N 505 ten_ff_Q_1[0];
N 506 selb_ff_b0_QN_1[0];
N 507 acctck_ff_QN_1[0];
N 508 enck_ff_QN_1[0];
N 509 en_sl_ff_QN_1[0];
N 510 tacc_sl_ff_QN_1[0];
N 511 tflgof_ff_QN_1[0];
N 512 tflguf_ff_QN_1[0];
N 69 selb_ff_b21_Q[0];
N 31 i_1442_Z[0];
N 32 i_1443_Z[0];
N 33 i_1444_Z[0];
N 6 i_1222_ZN[0];
N 34 i_1445_Z[0];
N 35 i_1446_Z[0];
N 36 i_1447_Z[0];
N 37 i_1448_Z[0];
N 38 i_1449_ZN[0];
N 39 i_1450_Z[0];
N 40 i_1451_ZN[0];
N 41 i_1452_ZN[0];
N 42 i_1453_ZN[0];
N 102 i_1456_ZN[0];
N 68 selb_ff_b22_Q[0];
N 67 selb_ff_b23_Q[0];
N 8 ta_le_buf_ZN[0];
N 66 selb_ff_b24_Q[0];
N 65 selb_ff_b25_Q[0];
N 64 selb_ff_b26_Q[0];
N 63 selb_ff_b27_Q[0];
N 62 selb_ff_b28_Q[0];
N 61 selb_ff_b29_Q[0];
N 60 selb_ff_b30_Q[0];
N 59 selb_ff_b31_Q[0];

```
N 108 tta_ck_buf_ZN[0];
N 100 acctck_ff_Q[0];
N 101 enck_ff_Q[0];
N 103 en_sl_ff_Q[0];
N 104 tacc_sl_ff_Q[0];
N 109 tflgof_ff_Q[0];
N 110 tflguf_ff_Q[0];
N 90 selb_ff_b0_Q[0];
N 89 selb_ff_b1_Q[0];
N 88 selb_ff_b2_Q[0];
N 87 selb_ff_b3_Q[0];
N 86 selb_ff_b4_Q[0];
N 85 selb_ff_b5_Q[0];
N 84 selb_ff_b6_Q[0];
N 83 selb_ff_b7_Q[0];
N 82 selb_ff_b8_Q[0];
N 7 ta_data_buf_ZN[0];
N 81 selb_ff_b9_Q[0];
N 105 mulreg_ff_b0_QN[0];
N 80 selb_ff_b10_Q[0];
N 79 selb_ff_b11_Q[0];
N 78 selb_ff_b12_Q[0];
N 77 selb_ff_b13_Q[0];
N 76 selb_ff_b14_Q[0];
N 75 selb_ff_b15_Q[0];
N 74 selb_ff_b16_Q[0];
N 73 selb_ff_b17_Q[0];
N 72 selb_ff_b18_Q[0];
N 71 selb_ff_b19_Q[0];
N 70 selb_ff_b20_Q[0];
V t 15 0 ¦ 9 10 11 12 13 14 15 16 17 18 19 20 21 22 23 24;
V ttmod 4 0 ¦ 26 27 28 29 30;
V selu1 7 0 ¦ 31 32 33 34 35 36 37 38;
V selu0 3 0 ¦ 39 40 41 42;
V selu0b 7 0 ¦ 43 44 45 46 47 48 49 50;
V selu1b 7 0 ¦ 51 52 53 54 55 56 57 58;
V selb 31 0 ¦ 59 60 61 62 63 64 65 66 67 68 69 70 71 72 73 74 75 76 77 78 79 80 -
81 82 83 84 85 86 87 88 89 90;
V accmsb 6 0 ¦ 91 92 93 94 95 96 97;
V bsym 1 0 ¦ 106 107;
V txcnt 0 0 ¦ 113;
V tcnt 2 0 ¦ 116 115 114;
V mulnum 5 1 ¦ 121 120 119 118 117;
V ta_cnt 3 0 ¦ 125 124 123 122;
V xcnt 1 0 ¦ 127 126;
V tareg_n 15 0 ¦ 143 142 141 140 139 138 137 136 135 134 133 132 131 130 129 128-
;
V mulbus 5 0 ¦ 149 148 147 146 145 144;
```

V numt 3 1 ¦ 152 151 150;
V mulnum2 3 0 ¦ 156 155 154 153;
V tcnt_n 2 0 ¦ 159 158 157;
V tbus 15 0 ¦ 175 174 173 172 171 170 169 168 167 166 165 164 163 162 161 160;
V txcnt_n 1 0 ¦ 177 176;
V xcnt_n 1 0 ¦ 179 178;
V ta_cnt_n 3 0 ¦ 183 182 181 180;
V selbd 31 0 ¦ 215 214 213 212 211 210 209 208 207 206 205 204 203 202 201 200 1-
99 198 197 196 195 194 193 192 191 190 189 188 187 186 185 184;
V u103_CO 0 0 ¦ 216;
V u103_S0 0 0 ¦ 117;
V u103_S1 0 0 ¦ 118;
V u104_CO 0 0 ¦ 121;
V u104_S0 0 0 ¦ 119;
V u104_S1 0 0 ¦ 120;
V i_1222_ZN 0 0 ¦ 6;
V i_1223_Z_1 0 0 ¦ 217;
V i_1224_ZN 0 0 ¦ 128;
V i_1225_ZN_1 0 0 ¦ 220;
V i_1226_ZN_1 0 0 ¦ 222;
V i_1227_ZN_1 0 0 ¦ 223;
V i_1228_ZN_1 0 0 ¦ 224;
V i_1229_Z_1 0 0 ¦ 219;
V i_1230_ZN_1 0 0 ¦ 226;
V i_1231_Z_1 0 0 ¦ 227;
V i_1232_ZN 0 0 ¦ 129;
V i_1233_Z_1 0 0 ¦ 234;
V i_1234_ZN 0 0 ¦ 130;
V i_1235_ZN 0 0 ¦ 131;
V i_1236_ZN 0 0 ¦ 132;
V i_1237_ZN 0 0 ¦ 133;
V i_1238_ZN 0 0 ¦ 134;
V i_1239_ZN 0 0 ¦ 135;
V i_1240_ZN 0 0 ¦ 136;
V i_1241_ZN 0 0 ¦ 137;
V i_1242_ZN 0 0 ¦ 138;
V i_1243_ZN 0 0 ¦ 139;
V i_1244_ZN 0 0 ¦ 140;
V i_1245_ZN 0 0 ¦ 141;
V i_1246_ZN 0 0 ¦ 142;
V i_1247_ZN 0 0 ¦ 143;
V i_1248_Z 0 0 ¦ 265;
V i_1249_ZN 0 0 ¦ 144;
V i_1250_ZN_1 0 0 ¦ 268;
V i_1251_ZN_1 0 0 ¦ 270;
V i_1252_ZN_1 0 0 ¦ 269;
V i_1253_ZN_1 0 0 ¦ 272;
V i_1254_ZN_1 0 0 ¦ 276;

V i_1255_ZN_1 0 0 ¦ 277;
V i_1256_ZN_1 0 0 ¦ 275;
V i_1257_ZN_1 0 0 ¦ 274;
V i_1258_Z_1 0 0 ¦ 273;
V i_1259_ZN_1 0 0 ¦ 278;
V i_1260_ZN_1 0 0 ¦ 267;
V i_1261_ZN 0 0 ¦ 145;
V i_1262_ZN_1 0 0 ¦ 280;
V i_1263_Z 0 0 ¦ 151;
V i_1264_ZN 0 0 ¦ 153;
V i_1265_Z 0 0 ¦ 150;
V i_1266_ZN 0 0 ¦ 154;
V i_1267_ZN_1 0 0 ¦ 281;
V i_1268_ZN 0 0 ¦ 146;
V i_1269_ZN 0 0 ¦ 147;
V i_1270_ZN 0 0 ¦ 156;
V i_1271_ZN_1 0 0 ¦ 284;
V i_1272_Z 0 0 ¦ 152;
V i_1273_ZN 0 0 ¦ 155;
V i_1274_ZN_1 0 0 ¦ 285;
V i_1275_ZN 0 0 ¦ 148;
V i_1276_Z 0 0 ¦ 149;
V i_1277_ZN 0 0 ¦ 157;
V i_1278_ZN_1 0 0 ¦ 290;
V i_1279_Z_1 0 0 ¦ 288;
V i_1280_Z_1 0 0 ¦ 287;
V i_1281_ZN 0 0 ¦ 158;
V i_1282_Z_1 0 0 ¦ 295;
V i_1283_ZN_1 0 0 ¦ 294;
V i_1284_ZN_1 0 0 ¦ 296;
V i_1285_ZN 0 0 ¦ 159;
V i_1286_Z_1 0 0 ¦ 299;
V i_1287_Z_1 0 0 ¦ 300;
V i_1288_ZN_1 0 0 ¦ 297;
V i_1289_ZN 0 0 ¦ 302;
V i_1290_ZN 0 0 ¦ 303;
V i_1291_ZN 0 0 ¦ 305;
V i_1292_ZN 0 0 ¦ 306;
V i_1293_ZN 0 0 ¦ 309;
V i_1294_ZN_1 0 0 ¦ 308;
V i_1295_ZN_1 0 0 ¦ 313;
V i_1296_Z_1 0 0 ¦ 312;
V i_1297_Z_1 0 0 ¦ 310;
V i_1298_ZN_1 0 0 ¦ 317;
V i_1299_ZN_1 0 0 ¦ 318;
V i_1300_ZN_1 0 0 ¦ 316;
V i_1301_Z_1 0 0 ¦ 315;
V i_1302_Z_1 0 0 ¦ 307;

V i_1303_ZN 0 0 ¦ 326;
V i_1304_Z_1 0 0 ¦ 325;
V i_1305_ZN_1 0 0 ¦ 323;
V i_1306_Z_1 0 0 ¦ 327;
V i_1307_ZN_1 0 0 ¦ 328;
V i_1308_ZN 0 0 ¦ 331;
V i_1309_ZN_1 0 0 ¦ 330;
V i_1310_Z 0 0 ¦ 160;
V i_1311_Z_1 0 0 ¦ 333;
V i_1312_Z_1 0 0 ¦ 334;
V i_1313_Z_1 0 0 ¦ 332;
V i_1314_ZN_1 0 0 ¦ 337;
V i_1315_ZN_1 0 0 ¦ 336;
V i_1318_Z 0 0 ¦ 339;
V i_1319_Z 0 0 ¦ 161;
V i_1320_Z_1 0 0 ¦ 340;
V i_1321_Z 0 0 ¦ 162;
V i_1322_Z_1 0 0 ¦ 341;
V i_1323_Z 0 0 ¦ 163;
V i_1324_Z_1 0 0 ¦ 342;
V i_1325_Z 0 0 ¦ 164;
V i_1326_Z_1 0 0 ¦ 343;
V i_1327_Z 0 0 ¦ 165;
V i_1328_Z_1 0 0 ¦ 344;
V i_1329_Z 0 0 ¦ 166;
V i_1330_Z_1 0 0 ¦ 345;
V i_1331_Z 0 0 ¦ 167;
V i_1332_Z_1 0 0 ¦ 346;
V i_1333_Z 0 0 ¦ 168;
V i_1334_Z_1 0 0 ¦ 347;
V i_1335_Z 0 0 ¦ 169;
V i_1336_Z_1 0 0 ¦ 348;
V i_1337_Z 0 0 ¦ 170;
V i_1338_Z_1 0 0 ¦ 349;
V i_1339_Z 0 0 ¦ 171;
V i_1340_Z_1 0 0 ¦ 350;
V i_1341_Z 0 0 ¦ 172;
V i_1342_Z_1 0 0 ¦ 351;
V i_1343_Z 0 0 ¦ 173;
V i_1344_Z_1 0 0 ¦ 352;
V i_1345_Z 0 0 ¦ 174;
V i_1346_Z_1 0 0 ¦ 353;
V i_1347_ZN 0 0 ¦ 175;
V i_1348_ZN_1 0 0 ¦ 354;
V i_1349_ZN_1 0 0 ¦ 355;
V i_1350_ZN_1 0 0 ¦ 357;
V i_1351_ZN_1 0 0 ¦ 356;
V i_1352_ZN_1 0 0 ¦ 359;

V i_1353_ZN_1 0 0 ¦ 358;
V i_1354_ZN_1 0 0 ¦ 360;
V i_1355_ZN 0 0 ¦ 363;
V i_1356_ZN_1 0 0 ¦ 362;
V i_1357_ZN_1 0 0 ¦ 361;
V i_1358_Z 0 0 ¦ 176;
V i_1359_ZN 0 0 ¦ 177;
V i_1360_Z_1 0 0 ¦ 366;
V i_1361_Z 0 0 ¦ 368;
V i_1362_ZN 0 0 ¦ 372;
V i_1364_ZN 0 0 ¦ 178;
V i_1365_ZN 0 0 ¦ 180;
V i_1366_Z_1 0 0 ¦ 374;
V i_1367_Z 0 0 ¦ 181;
V i_1368_Z_1 0 0 ¦ 375;
V i_1369_ZN_1 0 0 ¦ 376;
V i_1370_Z 0 0 ¦ 182;
V i_1371_Z_1 0 0 ¦ 377;
V i_1372_ZN 0 0 ¦ 183;
V i_1373_Z_1 0 0 ¦ 378;
V i_1375_Z 0 0 ¦ 379;
V i_1376_ZN 0 0 ¦ 383;
V i_1377_ZN 0 0 ¦ 184;
V i_1378_Z_1 0 0 ¦ 385;
V i_1379_Z_1 0 0 ¦ 390;
V i_1380_Z_1 0 0 ¦ 389;
V i_1381_Z_1 0 0 ¦ 388;
V i_1382_Z_1 0 0 ¦ 387;
V i_1383_Z_1 0 0 ¦ 384;
V i_1384_ZN_1 0 0 ¦ 391;
V i_1385_ZN 0 0 ¦ 185;
V i_1386_Z_1 0 0 ¦ 392;
V i_1387_ZN_1 0 0 ¦ 394;
V i_1388_ZN 0 0 ¦ 186;
V i_1389_Z_1 0 0 ¦ 395;
V i_1390_ZN_1 0 0 ¦ 397;
V i_1391_ZN 0 0 ¦ 187;
V i_1392_Z_1 0 0 ¦ 398;
V i_1393_ZN 0 0 ¦ 188;
V i_1394_Z_1 0 0 ¦ 400;
V i_1395_ZN_1 0 0 ¦ 402;
V i_1396_ZN 0 0 ¦ 189;
V i_1397_Z_1 0 0 ¦ 403;
V i_1398_ZN 0 0 ¦ 190;
V i_1399_Z_1 0 0 ¦ 405;
V i_1400_ZN 0 0 ¦ 191;
V i_1401_Z_1 0 0 ¦ 407;
V i_1402_ZN 0 0 ¦ 192;

```
V i_1403_Z_1 0 0 ¦ 409;
V i_1404_ZN_1 0 0 ¦ 411;
V i_1405_ZN 0 0 ¦ 193;
V i_1406_Z_1 0 0 ¦ 412;
V i_1407_ZN 0 0 ¦ 194;
V i_1408_Z_1 0 0 ¦ 414;
V i_1409_ZN 0 0 ¦ 195;
V i_1410_Z_1 0 0 ¦ 416;
V i_1411_ZN 0 0 ¦ 196;
V i_1412_Z_1 0 0 ¦ 418;
V i_1413_ZN 0 0 ¦ 197;
V i_1414_Z_1 0 0 ¦ 420;
V i_1415_ZN 0 0 ¦ 198;
V i_1416_Z_1 0 0 ¦ 422;
V i_1417_ZN 0 0 ¦ 199;
V i_1418_ZN_1 0 0 ¦ 424;
V i_1419_Z_1 0 0 ¦ 426;
V i_1420_ZN 0 0 ¦ 200;
V i_1421_ZN_1 0 0 ¦ 427;
V i_1422_Z_1 0 0 ¦ 429;
V i_1423_ZN 0 0 ¦ 201;
V i_1424_ZN 0 0 ¦ 202;
V i_1425_ZN 0 0 ¦ 203;
V i_1426_ZN 0 0 ¦ 204;
V i_1427_ZN 0 0 ¦ 205;
V i_1428_ZN 0 0 ¦ 206;
V i_1429_ZN 0 0 ¦ 207;
V i_1430_ZN 0 0 ¦ 208;
V i_1431_ZN 0 0 ¦ 209;
V i_1432_ZN 0 0 ¦ 210;
V i_1433_ZN 0 0 ¦ 211;
V i_1434_ZN 0 0 ¦ 212;
V i_1435_ZN 0 0 ¦ 213;
V i_1436_ZN 0 0 ¦ 214;
V i_1437_Z 0 0 ¦ 215;
V i_1438_ZN 0 0 ¦ 444;
V i_1439_ZN 0 0 ¦ 445;
V i_1440_ZN 0 0 ¦ 179;
V i_1441_Z_1 0 0 ¦ 446;
V i_1442_Z 0 0 ¦ 31;
V i_1443_Z 0 0 ¦ 32;
V i_1444_Z 0 0 ¦ 33;
V i_1445_Z 0 0 ¦ 34;
V i_1446_Z 0 0 ¦ 35;
V i_1447_Z 0 0 ¦ 36;
V i_1448_Z 0 0 ¦ 37;
V i_1449_ZN 0 0 ¦ 38;
V i_1450_Z 0 0 ¦ 39;
```

V i_1451_ZN 0 0 ¦ 40;
V i_1452_ZN 0 0 ¦ 41;
V i_1453_ZN 0 0 ¦ 42;
V i_1456_ZN 0 0 ¦ 102;
V i_1461_ZN_1 0 0 ¦ 449;
V i_11461_ZN_1 0 0 ¦ 450;
V i_1462_ZN_1 0 0 ¦ 448;
V ta_le_buf_ZN 0 0 ¦ 8;
V ta00_ff_b0_Q_1 0 0 ¦ 451;
V ta00_ff_b0_QN_1 0 0 ¦ 218;
V ta00_ff_b1_Q_1 0 0 ¦ 452;
V ta00_ff_b1_QN_1 0 0 ¦ 232;
V ta00_ff_b2_Q_1 0 0 ¦ 453;
V ta00_ff_b2_QN_1 0 0 ¦ 235;
V ta00_ff_b3_Q_1 0 0 ¦ 454;
V ta00_ff_b3_QN_1 0 0 ¦ 237;
V ta00_ff_b4_Q_1 0 0 ¦ 455;
V ta00_ff_b4_QN_1 0 0 ¦ 239;
V ta00_ff_b5_Q_1 0 0 ¦ 456;
V ta00_ff_b5_QN_1 0 0 ¦ 241;
V ta00_ff_b6_Q_1 0 0 ¦ 457;
V ta00_ff_b6_QN_1 0 0 ¦ 243;
V ta00_ff_b7_Q_1 0 0 ¦ 458;
V ta00_ff_b7_QN_1 0 0 ¦ 245;
V ta00_ff_b8_Q_1 0 0 ¦ 459;
V ta00_ff_b8_QN_1 0 0 ¦ 247;
V ta00_ff_b9_Q_1 0 0 ¦ 460;
V ta00_ff_b9_QN_1 0 0 ¦ 249;
V ta00_ff_b10_Q_1 0 0 ¦ 461;
V ta00_ff_b10_QN_1 0 0 ¦ 251;
V ta00_ff_b11_Q_1 0 0 ¦ 462;
V ta00_ff_b11_QN_1 0 0 ¦ 253;
V ta00_ff_b12_Q_1 0 0 ¦ 463;
V ta00_ff_b12_QN_1 0 0 ¦ 255;
V ta00_ff_b13_Q_1 0 0 ¦ 464;
V ta00_ff_b13_QN_1 0 0 ¦ 257;
V ta00_ff_b14_Q_1 0 0 ¦ 465;
V ta00_ff_b14_QN_1 0 0 ¦ 259;
V ta00_ff_b15_Q_1 0 0 ¦ 466;
V ta00_ff_b15_QN_1 0 0 ¦ 261;
V tareg_ff_b0_Q_1 0 0 ¦ 467;
V tareg_ff_b0_QN_1 0 0 ¦ 221;
V tareg_ff_b1_Q_1 0 0 ¦ 468;
V tareg_ff_b1_QN_1 0 0 ¦ 233;
V tareg_ff_b2_Q_1 0 0 ¦ 469;
V tareg_ff_b2_QN_1 0 0 ¦ 236;
V tareg_ff_b3_Q_1 0 0 ¦ 470;
V tareg_ff_b3_QN_1 0 0 ¦ 238;

V tareg_ff_b4_Q_1 0 0 ¦ 471;
V tareg_ff_b4_QN_1 0 0 ¦ 240;
V tareg_ff_b5_Q_1 0 0 ¦ 472;
V tareg_ff_b5_QN_1 0 0 ¦ 242;
V tareg_ff_b6_Q_1 0 0 ¦ 473;
V tareg_ff_b6_QN_1 0 0 ¦ 244;
V tareg_ff_b7_Q_1 0 0 ¦ 474;
V tareg_ff_b7_QN_1 0 0 ¦ 246;
V tareg_ff_b8_Q_1 0 0 ¦ 475;
V tareg_ff_b8_QN_1 0 0 ¦ 248;
V tareg_ff_b9_Q_1 0 0 ¦ 476;
V tareg_ff_b9_QN_1 0 0 ¦ 250;
V tareg_ff_b10_Q_1 0 0 ¦ 477;
V tareg_ff_b10_QN_1 0 0 ¦ 252;
V tareg_ff_b11_Q_1 0 0 ¦ 478;
V tareg_ff_b11_QN_1 0 0 ¦ 254;
V tareg_ff_b12_Q_1 0 0 ¦ 479;
V tareg_ff_b12_QN_1 0 0 ¦ 256;
V tareg_ff_b13_Q_1 0 0 ¦ 480;
V tareg_ff_b13_QN_1 0 0 ¦ 258;
V tareg_ff_b14_Q_1 0 0 ¦ 481;
V tareg_ff_b14_QN_1 0 0 ¦ 260;
V tareg_ff_b15_Q_1 0 0 ¦ 482;
V tareg_ff_b15_QN_1 0 0 ¦ 262;
V ta_data_buf_ZN 0 0 ¦ 7;
V mulreg_ff_b0_Q_1 0 0 ¦ 483;
V mulreg_ff_b0_QN 0 0 ¦ 105;
V mulreg_ff_b1_Q_1 0 0 ¦ 484;
V mulreg_ff_b1_QN_1 0 0 ¦ 266;
V mulreg_ff_b2_Q_1 0 0 ¦ 485;
V mulreg_ff_b2_QN_1 0 0 ¦ 279;
V mulreg_ff_b3_Q_1 0 0 ¦ 486;
V mulreg_ff_b3_QN_1 0 0 ¦ 282;
V mulreg_ff_b4_Q_1 0 0 ¦ 487;
V mulreg_ff_b4_QN_1 0 0 ¦ 283;
V mulreg_ff_b5_Q_1 0 0 ¦ 488;
V mulreg_ff_b5_QN_1 0 0 ¦ 286;
V tcnt_ff_b0_Q 0 0 ¦ 114;
V tcnt_ff_b0_QN_1 0 0 ¦ 289;
V tcnt_ff_b1_Q 0 0 ¦ 115;
V tcnt_ff_b1_QN_1 0 0 ¦ 293;
V tcnt_ff_b2_Q 0 0 ¦ 116;
V tcnt_ff_b2_QN_1 0 0 ¦ 298;
V tstt0_ff_Q 0 0 ¦ 264;
V tstt0_ff_QN_1 0 0 ¦ 301;
V tstt1_ff_Q 0 0 ¦ 271;
V tstt1_ff_QN_1 0 0 ¦ 292;
V tstt2_ff_Q 0 0 ¦ 489;

V tstt2_ff_QN_1 0 0 ¦ 324;
V tstt3_ff_Q 0 0 ¦ 263;
V tstt3_ff_QN_1 0 0 ¦ 304;
V tstt4_ff_Q_1 0 0 ¦ 490;
V tstt4_ff_QN_1 0 0 ¦ 291;
V tstt5_ff_Q 0 0 ¦ 335;
V tstt5_ff_QN_1 0 0 ¦ 314;
V tstt15_ff_Q 0 0 ¦ 367;
V tstt15_ff_QN_1 0 0 ¦ 491;
V tstt4s_ff_Q 0 0 ¦ 338;
V tstt4s_ff_QN_1 0 0 ¦ 493;
V tovrd_ff_Q 0 0 ¦ 311;
V tovrd_ff_QN_1 0 0 ¦ 319;
V tcoutd_ff_Q 0 0 ¦ 320;
V tcoutd_ff_QN_1 0 0 ¦ 494;
V tminufd_ff_Q 0 0 ¦ 321;
V tminufd_ff_QN_1 0 0 ¦ 329;
V tmaxofd_ff_Q_1 0 0 ¦ 495;
V tmaxofd_ff_QN_1 0 0 ¦ 322;
V txcnt_ff_b0_Q 0 0 ¦ 113;
V txcnt_ff_b0_QN_1 0 0 ¦ 365;
V txcnt_ff_b1_Q 0 0 ¦ 496;
V txcnt_ff_b1_QN 0 0 ¦ 497;
V tta_ck_buf_ZN 0 0 ¦ 108;
V tta_ck__buf_ZN 0 0 ¦ 492;
V ttas_ff_Q 0 0 ¦ 498;
V ttas_ff_QN_1 0 0 ¦ 370;
V ttbs_ff_Q 0 0 ¦ 369;
V ttbs_ff_QN_1 0 0 ¦ 499;
V ttdisd_ff_Q 0 0 ¦ 371;
V ttdisd_ff_QN_1 0 0 ¦ 500;
V tten_ff_Q_1 0 0 ¦ 501;
V tten_ff_QN_1 0 0 ¦ 364;
V xcnt_ff_b0_Q 0 0 ¦ 126;
V xcnt_ff_b0_QN_1 0 0 ¦ 447;
V xcnt_ff_b1_Q 0 0 ¦ 127;
V xcnt_ff_b1_QN_1 0 0 ¦ 225;
V ta_cnt_ff_b0_Q 0 0 ¦ 122;
V ta_cnt_ff_b0_QN_1 0 0 ¦ 229;
V ta_cnt_ff_b1_Q 0 0 ¦ 123;
V ta_cnt_ff_b1_QN_1 0 0 ¦ 230;
V ta_cnt_ff_b2_Q 0 0 ¦ 124;
V ta_cnt_ff_b2_QN_1 0 0 ¦ 231;
V ta_cnt_ff_b3_Q 0 0 ¦ 125;
V ta_cnt_ff_b3_QN_1 0 0 ¦ 228;
V tas_ff_Q 0 0 ¦ 502;
V tas_ff_QN_1 0 0 ¦ 380;
V tbs_ff_Q 0 0 ¦ 381;

```
V tbs_ff_QN_1 0 0 ¦ 503;
V tdisd_ff_Q 0 0 ¦ 382;
V tdisd_ff_QN_1 0 0 ¦ 504;
V ten_ff_Q_1 0 0 ¦ 505;
V ten_ff_QN_1 0 0 ¦ 373;
V selb_ff_b0_Q 0 0 ¦ 90;
V selb_ff_b0_QN_1 0 0 ¦ 506;
V selb_ff_b1_Q 0 0 ¦ 89;
V selb_ff_b1_QN_1 0 0 ¦ 386;
V selb_ff_b2_Q 0 0 ¦ 88;
V selb_ff_b2_QN_1 0 0 ¦ 393;
V selb_ff_b3_Q 0 0 ¦ 87;
V selb_ff_b3_QN_1 0 0 ¦ 396;
V selb_ff_b4_Q 0 0 ¦ 86;
V selb_ff_b4_QN_1 0 0 ¦ 399;
V selb_ff_b5_Q 0 0 ¦ 85;
V selb_ff_b5_QN_1 0 0 ¦ 401;
V selb_ff_b6_Q 0 0 ¦ 84;
V selb_ff_b6_QN_1 0 0 ¦ 404;
V selb_ff_b7_Q 0 0 ¦ 83;
V selb_ff_b7_QN_1 0 0 ¦ 406;
V selb_ff_b8_Q 0 0 ¦ 82;
V selb_ff_b8_QN_1 0 0 ¦ 408;
V selb_ff_b9_Q 0 0 ¦ 81;
V selb_ff_b9_QN_1 0 0 ¦ 410;
V selb_ff_b10_Q 0 0 ¦ 80;
V selb_ff_b10_QN_1 0 0 ¦ 413;
V selb_ff_b11_Q 0 0 ¦ 79;
V selb_ff_b11_QN_1 0 0 ¦ 415;
V selb_ff_b12_Q 0 0 ¦ 78;
V selb_ff_b12_QN_1 0 0 ¦ 417;
V selb_ff_b13_Q 0 0 ¦ 77;
V selb_ff_b13_QN_1 0 0 ¦ 419;
V selb_ff_b14_Q 0 0 ¦ 76;
V selb_ff_b14_QN_1 0 0 ¦ 421;
V selb_ff_b15_Q 0 0 ¦ 75;
V selb_ff_b15_QN_1 0 0 ¦ 423;
V selb_ff_b16_Q 0 0 ¦ 74;
V selb_ff_b16_QN_1 0 0 ¦ 425;
V selb_ff_b17_Q 0 0 ¦ 73;
V selb_ff_b17_QN_1 0 0 ¦ 428;
V selb_ff_b18_Q 0 0 ¦ 72;
V selb_ff_b18_QN_1 0 0 ¦ 430;
V selb_ff_b19_Q 0 0 ¦ 71;
V selb_ff_b19_QN_1 0 0 ¦ 431;
V selb_ff_b20_Q 0 0 ¦ 70;
V selb_ff_b20_QN_1 0 0 ¦ 432;
V selb_ff_b21_Q 0 0 ¦ 69;
```

```
V selb_ff_b21_QN_1 0 0 ¦ 433;
V selb_ff_b22_Q 0 0 ¦ 68;
V selb_ff_b22_QN_1 0 0 ¦ 434;
V selb_ff_b23_Q 0 0 ¦ 67;
V selb_ff_b23_QN_1 0 0 ¦ 435;
V selb_ff_b24_Q 0 0 ¦ 66;
V selb_ff_b24_QN_1 0 0 ¦ 436;
V selb_ff_b25_Q 0 0 ¦ 65;
V selb_ff_b25_QN_1 0 0 ¦ 437;
V selb_ff_b26_Q 0 0 ¦ 64;
V selb_ff_b26_QN_1 0 0 ¦ 438;
V selb_ff_b27_Q 0 0 ¦ 63;
V selb_ff_b27_QN_1 0 0 ¦ 439;
V selb_ff_b28_Q 0 0 ¦ 62;
V selb_ff_b28_QN_1 0 0 ¦ 440;
V selb_ff_b29_Q 0 0 ¦ 61;
V selb_ff_b29_QN_1 0 0 ¦ 441;
V selb_ff_b30_Q 0 0 ¦ 60;
V selb_ff_b30_QN_1 0 0 ¦ 442;
V selb_ff_b31_Q 0 0 ¦ 59;
V selb_ff_b31_QN_1 0 0 ¦ 443;
V acctck_ff_Q 0 0 ¦ 100;
V acctck_ff_QN_1 0 0 ¦ 507;
V enck_ff_Q 0 0 ¦ 101;
V enck_ff_QN_1 0 0 ¦ 508;
V en_sl_ff_Q 0 0 ¦ 103;
V en_sl_ff_QN_1 0 0 ¦ 509;
V tacc_sl_ff_Q 0 0 ¦ 104;
V tacc_sl_ff_QN_1 0 0 ¦ 510;
V tflgof_ff_Q 0 0 ¦ 109;
V tflgof_ff_QN_1 0 0 ¦ 511;
V tflguf_ff_Q 0 0 ¦ 110;
V tflguf_ff_QN_1 0 0 ¦ 512;
M MDE ad02d1 vsc653 ¦ A0 B0 A1 B1 CI S0 S1 CO ¦ ;
M MDE in01d5 vsc653 ¦ I ZN ¦ ;
M MDE ni01d4 vsc653 ¦ I Z ¦ ;
M MDE oa01d1 vsc653 ¦ A1 A2 B1 B2 ZN ¦ ;
M MDE in01d1 vsc653 ¦ I ZN ¦ ;
M MDE nd02d1 vsc653 ¦ A1 A2 ZN ¦ ;
M MDE or02d1 vsc653 ¦ A1 A2 Z ¦ ;
M MDE an04d1 vsc653 ¦ A1 A2 A3 A4 Z ¦ ;
M MDE oa06d1 vsc653 ¦ A1 A2 B1 B2 C1 C2 ZN ¦ ;
M MDE or02d2 vsc653 ¦ A1 A2 Z ¦ ;
M MDE ao01d1 vsc653 ¦ A1 A2 B1 B2 ZN ¦ ;
M MDE oa04d1 vsc653 ¦ A1 A2 B ZN ¦ ;
M MDE ao08d1 vsc653 ¦ A1 A2 A3 B ZN ¦ ;
M MDE nr05d1 vsc653 ¦ A1 A2 A3 A4 A5 ZN ¦ ;
M MDE an03d1 vsc653 ¦ A1 A2 A3 Z ¦ ;
```

```
M MDE ao04d1 vsc653 ¦ A1 A2 B ZN ¦ ;
M MDE fn04d1 vsc653 ¦ A1 A2 B1 B2 ZN ¦ ;
M MDE mx21d1 vsc653 ¦ I0 I1 S Z ¦ ;
M MDE nr02d1 vsc653 ¦ A1 A2 ZN ¦ ;
M MDE an02d1 vsc653 ¦ A1 A2 Z ¦ ;
M MDE oa07d1 vsc653 ¦ A1 A2 A3 B1 B2 ZN ¦ ;
M MDE or04d1 vsc653 ¦ A1 A2 A3 A4 Z ¦ ;
M MDE fn01d1 vsc653 ¦ A1 B1 ZN ¦ ;
M MDE ao07d1 vsc653 ¦ A1 A2 A3 B1 B2 ZN ¦ ;
M MDE an06d1 vsc653 ¦ A1 A2 A3 A4 A5 A6 Z ¦ ;
M MDE ao05d1 vsc653 ¦ A1 A2 B C ZN ¦ ;
M MDE xn02d1 vsc653 ¦ A1 A2 ZN ¦ ;
M MDE an02d2 vsc653 ¦ A1 A2 Z ¦ ;
M MDE ao02d1 vsc653 ¦ A1 A2 A3 B1 B2 B3 ZN ¦ ;
M MDE nd06d1 vsc653 ¦ A1 A2 A3 A4 A5 A6 ZN ¦ ;
M MDE oa02d1 vsc653 ¦ A1 A2 A3 B1 B2 B3 ZN ¦ ;
M MDE nr06d1 vsc653 ¦ A1 A2 A3 A4 A5 A6 ZN ¦ ;
M MDE xo02d1 vsc653 ¦ A1 A2 Z ¦ ;
M MDE an05d1 vsc653 ¦ A1 A2 A3 A4 A5 Z ¦ ;
M MDE nr03d1 vsc653 ¦ A1 A2 A3 ZN ¦ ;
M MDE fn05d1 vsc653 ¦ A1 B1 ZN ¦ ;
M MDE in01d2 vsc653 ¦ I ZN ¦ ;
M MDE lactnb vsc653 ¦ E D CDN Q QN ¦ ;
M MDE dfctnb vsc653 ¦ D CP CDN Q QN ¦ ;
M MDE nr02d2 vsc653 ¦ A1 A2 ZN ¦ ;
M MDE dfptnb vsc653 ¦ D CP SDN Q QN ¦ ;
M MDE dfntnb vsc653 ¦ D CP Q QN ¦ ;
I MDE ad02d1 vsc653 * 1 u103 ¦ 150 153 151 154 112 117 118 216;
I MDE ad02d1 vsc653 * 2 u104 ¦ 152 155 112 156 216 119 120 121;
I MDE in01d5 vsc653 * 3 i_1222 ¦ 217 6;
I MDE ni01d4 vsc653 * 4 i_1223 ¦ 127 217;
I MDE oa01d1 vsc653 * 5 i_1224 ¦ 218 219 220 221 128;
I MDE in01d1 vsc653 * 6 i_1225 ¦ 222 220;
I MDE nd02d1 vsc653 * 7 i_1226 ¦ 223 126 222;
I MDE in01d1 vsc653 * 8 i_1227 ¦ 224 223;
I MDE in01d1 vsc653 * 9 i_1228 ¦ 225 224;
I MDE or02d1 vsc653 * 10 i_1229 ¦ 222 226 219;
I MDE in01d1 vsc653 * 11 i_1230 ¦ 227 226;
I MDE an04d1 vsc653 * 12 i_1231 ¦ 228 229 230 231 227;
I MDE oa06d1 vsc653 * 13 i_1232 ¦ 219 232 220 233 234 221 129;
I MDE or02d1 vsc653 * 14 i_1233 ¦ 227 222 234;
I MDE oa06d1 vsc653 * 15 i_1234 ¦ 219 235 220 236 234 233 130;
I MDE oa06d1 vsc653 * 16 i_1235 ¦ 219 237 220 238 234 236 131;
I MDE oa06d1 vsc653 * 17 i_1236 ¦ 219 239 220 240 234 238 132;
I MDE oa06d1 vsc653 * 18 i_1237 ¦ 219 241 220 242 234 240 133;
I MDE oa06d1 vsc653 * 19 i_1238 ¦ 219 243 220 244 234 242 134;
I MDE oa06d1 vsc653 * 20 i_1239 ¦ 219 245 220 246 234 244 135;
I MDE oa06d1 vsc653 * 21 i_1240 ¦ 219 247 220 248 234 246 136;
```

I MDE oa06d1 vsc653 * 22 i_1241 ¦ 219 249 220 250 234 248 137;
I MDE oa06d1 vsc653 * 23 i_1242 ¦ 219 251 220 252 234 250 138;
I MDE oa06d1 vsc653 * 24 i_1243 ¦ 219 253 220 254 234 252 139;
I MDE oa06d1 vsc653 * 25 i_1244 ¦ 219 255 220 256 234 254 140;
I MDE oa06d1 vsc653 * 26 i_1245 ¦ 219 257 258 220 234 256 141;
I MDE oa06d1 vsc653 * 27 i_1246 ¦ 219 259 260 220 234 258 142;
I MDE oa06d1 vsc653 * 28 i_1247 ¦ 219 261 262 220 234 260 143;
I MDE or02d2 vsc653 * 29 i_1248 ¦ 263 264 265;
I MDE oa01d1 vsc653 * 30 i_1249 ¦ 266 265 267 268 144;
I MDE ao01d1 vsc653 * 31 i_1250 ¦ 269 58 50 270 268;
I MDE in01d1 vsc653 * 32 i_1251 ¦ 269 270;
I MDE oa04d1 vsc653 * 33 i_1252 ¦ 271 264 272 269;
I MDE ao08d1 vsc653 * 34 i_1253 ¦ 273 274 275 276 272;
I MDE nr05d1 vsc653 * 35 i_1254 ¦ 30 29 27 28 277 276;
I MDE in01d1 vsc653 * 36 i_1255 ¦ 26 277;
I MDE in01d1 vsc653 * 37 i_1256 ¦ 28 275;
I MDE in01d1 vsc653 * 38 i_1257 ¦ 29 274;
I MDE an03d1 vsc653 * 39 i_1258 ¦ 278 26 30 273;
I MDE in01d1 vsc653 * 40 i_1259 ¦ 27 278;
I MDE ao04d1 vsc653 * 41 i_1260 ¦ 263 272 264 267;
I MDE fn04d1 vsc653 * 42 i_1261 ¦ 279 265 280 117 145;
I MDE in01d1 vsc653 * 43 i_1262 ¦ 267 280;
I MDE mx21d1 vsc653 * 44 i_1263 ¦ 48 56 269 151;
I MDE nr02d1 vsc653 * 45 i_1264 ¦ 268 107 153;
I MDE mx21d1 vsc653 * 46 i_1265 ¦ 49 57 269 150;
I MDE nr02d1 vsc653 * 47 i_1266 ¦ 281 107 154;
I MDE in01d1 vsc653 * 48 i_1267 ¦ 150 281;
I MDE fn04d1 vsc653 * 49 i_1268 ¦ 282 265 280 118 146;
I MDE fn04d1 vsc653 * 50 i_1269 ¦ 283 265 280 119 147;
I MDE nr02d1 vsc653 * 51 i_1270 ¦ 284 107 156;
I MDE in01d1 vsc653 * 52 i_1271 ¦ 152 284;
I MDE mx21d1 vsc653 * 53 i_1272 ¦ 47 55 269 152;
I MDE nr02d1 vsc653 * 54 i_1273 ¦ 285 107 155;
I MDE in01d1 vsc653 * 55 i_1274 ¦ 151 285;
I MDE fn04d1 vsc653 * 56 i_1275 ¦ 286 265 280 120 148;
I MDE an02d1 vsc653 * 57 i_1276 ¦ 121 280 149;
I MDE oa07d1 vsc653 * 58 i_1277 ¦ 287 114 288 289 290 157;
I MDE in01d1 vsc653 * 59 i_1278 ¦ 288 290;
I MDE an02d1 vsc653 * 60 i_1279 ¦ 291 292 288;
I MDE an03d1 vsc653 * 61 i_1280 ¦ 116 293 114 287;
I MDE oa04d1 vsc653 * 62 i_1281 ¦ 294 293 295 158;
I MDE or04d1 vsc653 * 63 i_1282 ¦ 289 288 287 115 295;
I MDE ao04d1 vsc653 * 64 i_1283 ¦ 296 289 288 294;
I MDE in01d1 vsc653 * 65 i_1284 ¦ 287 296;
I MDE oa04d1 vsc653 * 66 i_1285 ¦ 297 298 299 159;
I MDE or04d1 vsc653 * 67 i_1286 ¦ 116 300 287 288 299;
I MDE or02d1 vsc653 * 68 i_1287 ¦ 293 289 300;
I MDE ao04d1 vsc653 * 69 i_1288 ¦ 296 300 288 297;

I MDE oa04d1 vsc653 * 70 i_1289 ¦ 292 287 301 302;
I MDE nr02d1 vsc653 * 71 i_1290 ¦ 296 292 303;
I MDE oa04d1 vsc653 * 72 i_1291 ¦ 291 287 304 305;
I MDE nr02d1 vsc653 * 73 i_1292 ¦ 296 291 306;
I MDE fn01d1 vsc653 * 74 i_1293 ¦ 307 308 309;
I MDE ao07d1 vsc653 * 75 i_1294 ¦ 310 311 312 98 313 308;
I MDE in01d1 vsc653 * 76 i_1295 ¦ 310 313;
I MDE an02d1 vsc653 * 77 i_1296 ¦ 314 304 312;
I MDE or04d1 vsc653 * 78 i_1297 ¦ 315 316 25 317 310;
I MDE in01d1 vsc653 * 79 i_1298 ¦ 318 317;
I MDE ao04d1 vsc653 * 80 i_1299 ¦ 319 320 321 318;
I MDE oa04d1 vsc653 * 81 i_1300 ¦ 319 320 322 316;
I MDE an02d1 vsc653 * 82 i_1301 ¦ 292 291 315;
I MDE an06d1 vsc653 * 83 i_1302 ¦ 28 30 29 26 27 25 307;
I MDE ao05d1 vsc653 * 84 i_1303 ¦ 323 318 324 325 326;
I MDE or02d1 vsc653 * 85 i_1304 ¦ 108 113 325;
I MDE in01d1 vsc653 * 86 i_1305 ¦ 327 323;
I MDE an03d1 vsc653 * 87 i_1306 ¦ 328 329 322 327;
I MDE xn02d1 vsc653 * 88 i_1307 ¦ 311 320 328;
I MDE ao05d1 vsc653 * 89 i_1308 ¦ 330 323 324 325 331;
I MDE in01d1 vsc653 * 90 i_1309 ¦ 316 330;
I MDE or02d1 vsc653 * 91 i_1310 ¦ 332 333 160;
I MDE an02d1 vsc653 * 92 i_1311 ¦ 24 334 333;
I MDE an02d2 vsc653 * 93 i_1312 ¦ 327 335 334;
I MDE an02d1 vsc653 * 94 i_1313 ¦ 336 337 332;
I MDE in01d1 vsc653 * 95 i_1314 ¦ 334 337;
I MDE nr02d1 vsc653 * 96 i_1315 ¦ 330 314 336;
I MDE an02d1 vsc653 * 97 i_1318 ¦ 108 338 339;
I MDE or02d1 vsc653 * 98 i_1319 ¦ 332 340 161;
I MDE an02d1 vsc653 * 99 i_1320 ¦ 23 334 340;
I MDE or02d1 vsc653 * 100 i_1321 ¦ 332 341 162;
I MDE an02d1 vsc653 * 101 i_1322 ¦ 22 334 341;
I MDE or02d1 vsc653 * 102 i_1323 ¦ 332 342 163;
I MDE an02d1 vsc653 * 103 i_1324 ¦ 21 334 342;
I MDE or02d1 vsc653 * 104 i_1325 ¦ 332 343 164;
I MDE an02d1 vsc653 * 105 i_1326 ¦ 20 334 343;
I MDE or02d1 vsc653 * 106 i_1327 ¦ 332 344 165;
I MDE an02d1 vsc653 * 107 i_1328 ¦ 19 334 344;
I MDE or02d1 vsc653 * 108 i_1329 ¦ 332 345 166;
I MDE an02d1 vsc653 * 109 i_1330 ¦ 18 334 345;
I MDE or02d1 vsc653 * 110 i_1331 ¦ 332 346 167;
I MDE an02d1 vsc653 * 111 i_1332 ¦ 17 334 346;
I MDE or02d1 vsc653 * 112 i_1333 ¦ 332 347 168;
I MDE an02d1 vsc653 * 113 i_1334 ¦ 16 334 347;
I MDE or02d1 vsc653 * 114 i_1335 ¦ 332 348 169;
I MDE an02d1 vsc653 * 115 i_1336 ¦ 15 334 348;
I MDE or02d1 vsc653 * 116 i_1337 ¦ 332 349 170;
I MDE an02d1 vsc653 * 117 i_1338 ¦ 14 334 349;

I MDE or02d1 vsc653 * 118 i_1339 ¦ 332 350 171;
I MDE an02d1 vsc653 * 119 i_1340 ¦ 13 334 350;
I MDE or02d1 vsc653 * 120 i_1341 ¦ 332 351 172;
I MDE an02d1 vsc653 * 121 i_1342 ¦ 12 334 351;
I MDE or02d1 vsc653 * 122 i_1343 ¦ 332 352 173;
I MDE an02d1 vsc653 * 123 i_1344 ¦ 11 334 352;
I MDE or02d1 vsc653 * 124 i_1345 ¦ 332 353 174;
I MDE an02d1 vsc653 * 125 i_1346 ¦ 10 334 353;
I MDE in01d1 vsc653 * 126 i_1347 ¦ 354 175;
I MDE ao07d1 vsc653 * 127 i_1348 ¦ 355 335 317 334 9 354;
I MDE nr02d1 vsc653 * 128 i_1349 ¦ 334 336 355;
I MDE in01d1 vsc653 * 129 i_1350 ¦ 356 357;
I MDE ao07d1 vsc653 * 130 i_1351 ¦ 310 320 312 99 313 356;
I MDE in01d1 vsc653 * 131 i_1352 ¦ 358 359;
I MDE ao02d1 vsc653 * 132 i_1353 ¦ 360 313 91 310 312 321 358;
I MDE nd06d1 vsc653 * 133 i_1354 ¦ 95 97 93 92 94 96 360;
I MDE oa02d1 vsc653 * 134 i_1355 ¦ 361 310 91 362 313 322 363;
I MDE in01d1 vsc653 * 135 i_1356 ¦ 312 362;
I MDE nr06d1 vsc653 * 136 i_1357 ¦ 95 96 93 94 97 92 361;
I MDE xo02d1 vsc653 * 137 i_1358 ¦ 364 365 176;
I MDE xn02d1 vsc653 * 138 i_1359 ¦ 366 108 177;
I MDE or02d1 vsc653 * 139 i_1360 ¦ 364 365 366;
I MDE an03d1 vsc653 * 140 i_1361 ¦ 113 367 108 368;
I MDE oa07d1 vsc653 * 141 i_1362 ¦ 369 370 371 371 364 372;
I MDE xn02d1 vsc653 * 142 i_1364 ¦ 373 126 178;
I MDE xn02d1 vsc653 * 143 i_1365 ¦ 374 229 180;
I MDE an02d1 vsc653 * 144 i_1366 ¦ 224 126 374;
I MDE xo02d1 vsc653 * 145 i_1367 ¦ 375 230 181;
I MDE or02d1 vsc653 * 146 i_1368 ¦ 229 376 375;
I MDE in01d1 vsc653 * 147 i_1369 ¦ 374 376;
I MDE xo02d1 vsc653 * 148 i_1370 ¦ 377 231 182;
I MDE or02d1 vsc653 * 149 i_1371 ¦ 230 375 377;
I MDE xn02d1 vsc653 * 150 i_1372 ¦ 378 125 183;
I MDE or02d1 vsc653 * 151 i_1373 ¦ 231 377 378;
I MDE an05d1 vsc653 * 152 i_1375 ¦ 125 124 374 122 123 379;
I MDE oa07d1 vsc653 * 153 i_1376 ¦ 380 381 382 382 373 383;
I MDE oa01d1 vsc653 * 154 i_1377 ¦ 384 385 265 386 184;
I MDE or04d1 vsc653 * 155 i_1378 ¦ 387 388 389 390 385;
I MDE mx21d1 vsc653 * 156 i_1379 ¦ 43 51 269 390;
I MDE mx21d1 vsc653 * 157 i_1380 ¦ 44 52 269 389;
I MDE mx21d1 vsc653 * 158 i_1381 ¦ 46 54 269 388;
I MDE mx21d1 vsc653 * 159 i_1382 ¦ 45 53 269 387;
I MDE or02d1 vsc653 * 160 i_1383 ¦ 391 270 384;
I MDE in01d1 vsc653 * 161 i_1384 ¦ 265 391;
I MDE oa01d1 vsc653 * 162 i_1385 ¦ 384 392 265 393 185;
I MDE or04d1 vsc653 * 163 i_1386 ¦ 394 390 389 387 392;
I MDE in01d1 vsc653 * 164 i_1387 ¦ 388 394;
I MDE oa01d1 vsc653 * 165 i_1388 ¦ 384 395 265 396 186;

I MDE or04d1 vsc653 * 166 i_1389 ¦ 397 390 388 389 395;
I MDE in01d1 vsc653 * 167 i_1390 ¦ 387 397;
I MDE oa01d1 vsc653 * 168 i_1391 ¦ 384 398 265 399 187;
I MDE or04d1 vsc653 * 169 i_1392 ¦ 394 389 390 397 398;
I MDE oa01d1 vsc653 * 170 i_1393 ¦ 384 400 265 401 188;
I MDE or04d1 vsc653 * 171 i_1394 ¦ 402 390 388 387 400;
I MDE in01d1 vsc653 * 172 i_1395 ¦ 389 402;
I MDE oa01d1 vsc653 * 173 i_1396 ¦ 384 403 265 404 189;
I MDE or04d1 vsc653 * 174 i_1397 ¦ 394 387 390 402 403;
I MDE oa01d1 vsc653 * 175 i_1398 ¦ 384 405 265 406 190;
I MDE or04d1 vsc653 * 176 i_1399 ¦ 402 388 390 397 405;
I MDE oa01d1 vsc653 * 177 i_1400 ¦ 384 407 265 408 191;
I MDE or04d1 vsc653 * 178 i_1401 ¦ 394 397 390 402 407;
I MDE oa01d1 vsc653 * 179 i_1402 ¦ 384 409 265 410 192;
I MDE or04d1 vsc653 * 180 i_1403 ¦ 411 389 388 387 409;
I MDE in01d1 vsc653 * 181 i_1404 ¦ 390 411;
I MDE oa01d1 vsc653 * 182 i_1405 ¦ 384 412 265 413 193;
I MDE or04d1 vsc653 * 183 i_1406 ¦ 394 389 387 411 412;
I MDE oa01d1 vsc653 * 184 i_1407 ¦ 384 414 265 415 194;
I MDE or04d1 vsc653 * 185 i_1408 ¦ 397 388 389 411 414;
I MDE oa01d1 vsc653 * 186 i_1409 ¦ 384 416 265 417 195;
I MDE or04d1 vsc653 * 187 i_1410 ¦ 394 397 389 411 416;
I MDE oa01d1 vsc653 * 188 i_1411 ¦ 384 418 265 419 196;
I MDE or04d1 vsc653 * 189 i_1412 ¦ 402 388 387 411 418;
I MDE oa01d1 vsc653 * 190 i_1413 ¦ 384 420 265 421 197;
I MDE or04d1 vsc653 * 191 i_1414 ¦ 394 402 387 411 420;
I MDE oa01d1 vsc653 * 192 i_1415 ¦ 384 422 265 423 198;
I MDE or04d1 vsc653 * 193 i_1416 ¦ 402 397 388 411 422;
I MDE oa01d1 vsc653 * 194 i_1417 ¦ 424 384 265 425 199;
I MDE in01d1 vsc653 * 195 i_1418 ¦ 426 424;
I MDE an04d1 vsc653 * 196 i_1419 ¦ 388 387 389 390 426;
I MDE oa01d1 vsc653 * 197 i_1420 ¦ 427 385 265 428 200;
I MDE in01d1 vsc653 * 198 i_1421 ¦ 429 427;
I MDE an02d1 vsc653 * 199 i_1422 ¦ 265 270 429;
I MDE oa01d1 vsc653 * 200 i_1423 ¦ 427 392 265 430 201;
I MDE oa01d1 vsc653 * 201 i_1424 ¦ 427 395 265 431 202;
I MDE oa01d1 vsc653 * 202 i_1425 ¦ 427 398 265 432 203;
I MDE oa01d1 vsc653 * 203 i_1426 ¦ 427 400 265 433 204;
I MDE oa01d1 vsc653 * 204 i_1427 ¦ 427 403 265 434 205;
I MDE oa01d1 vsc653 * 205 i_1428 ¦ 427 405 265 435 206;
I MDE oa01d1 vsc653 * 206 i_1429 ¦ 427 407 265 436 207;
I MDE oa01d1 vsc653 * 207 i_1430 ¦ 427 409 265 437 208;
I MDE oa01d1 vsc653 * 208 i_1431 ¦ 427 412 265 438 209;
I MDE oa01d1 vsc653 * 209 i_1432 ¦ 427 414 265 439 210;
I MDE oa01d1 vsc653 * 210 i_1433 ¦ 427 416 265 440 211;
I MDE oa01d1 vsc653 * 211 i_1434 ¦ 427 418 265 441 212;
I MDE oa01d1 vsc653 * 212 i_1435 ¦ 427 420 265 442 213;
I MDE oa01d1 vsc653 * 213 i_1436 ¦ 427 422 265 443 214;

```
I MDE an02d1 vsc653 * 214 i_1437 ¦ 426 429 215;
I MDE nd02d1 vsc653 * 215 i_1438 ¦ 391 25 444;
I MDE nr02d1 vsc653 * 216 i_1439 ¦ 324 327 445;
I MDE xn02d1 vsc653 * 217 i_1440 ¦ 446 224 179;
I MDE or02d1 vsc653 * 218 i_1441 ¦ 373 447 446;
I MDE an03d1 vsc653 * 219 i_1442 ¦ 28 26 27 31;
I MDE an03d1 vsc653 * 220 i_1443 ¦ 275 26 27 32;
I MDE an03d1 vsc653 * 221 i_1444 ¦ 278 26 28 33;
I MDE an03d1 vsc653 * 222 i_1445 ¦ 278 275 26 34;
I MDE an03d1 vsc653 * 223 i_1446 ¦ 277 27 28 35;
I MDE an03d1 vsc653 * 224 i_1447 ¦ 277 275 27 36;
I MDE an03d1 vsc653 * 225 i_1448 ¦ 277 278 28 37;
I MDE nr03d1 vsc653 * 226 i_1449 ¦ 26 28 27 38;
I MDE an02d1 vsc653 * 227 i_1450 ¦ 29 30 39;
I MDE fn05d1 vsc653 * 228 i_1451 ¦ 29 30 40;
I MDE fn05d1 vsc653 * 229 i_1452 ¦ 30 29 41;
I MDE nr02d1 vsc653 * 230 i_1453 ¦ 30 29 42;
I MDE nr02d1 vsc653 * 231 i_1456 ¦ 106 105 102;
I MDE in01d5 vsc653 * 232 i_1461 ¦ 448 449;
I MDE in01d5 vsc653 * 233 i_11461 ¦ 448 450;
I MDE in01d2 vsc653 * 234 i_1462 ¦ 3 448;
I MDE in01d5 vsc653 * 235 ta_le_buf ¦ 5 8;
I MDE lactnb vsc653 * 236 ta00_ff_b0 ¦ 339 160 450 451 218;
I MDE lactnb vsc653 * 237 ta00_ff_b1 ¦ 339 161 450 452 232;
I MDE lactnb vsc653 * 238 ta00_ff_b2 ¦ 339 162 450 453 235;
I MDE lactnb vsc653 * 239 ta00_ff_b3 ¦ 339 163 450 454 237;
I MDE lactnb vsc653 * 240 ta00_ff_b4 ¦ 339 164 450 455 239;
I MDE lactnb vsc653 * 241 ta00_ff_b5 ¦ 339 165 450 456 241;
I MDE lactnb vsc653 * 242 ta00_ff_b6 ¦ 339 166 450 457 243;
I MDE lactnb vsc653 * 243 ta00_ff_b7 ¦ 339 167 450 458 245;
I MDE lactnb vsc653 * 244 ta00_ff_b8 ¦ 339 168 450 459 247;
I MDE lactnb vsc653 * 245 ta00_ff_b9 ¦ 339 169 449 460 249;
I MDE lactnb vsc653 * 246 ta00_ff_b10 ¦ 339 170 449 461 251;
I MDE lactnb vsc653 * 247 ta00_ff_b11 ¦ 339 171 449 462 253;
I MDE lactnb vsc653 * 248 ta00_ff_b12 ¦ 339 172 449 463 255;
I MDE lactnb vsc653 * 249 ta00_ff_b13 ¦ 339 173 449 464 257;
I MDE lactnb vsc653 * 250 ta00_ff_b14 ¦ 339 174 449 465 259;
I MDE lactnb vsc653 * 251 ta00_ff_b15 ¦ 339 175 449 466 261;
I MDE dfctnb vsc653 * 252 tareg_ff_b0 ¦ 128 1 449 467 221;
I MDE dfctnb vsc653 * 253 tareg_ff_b1 ¦ 129 1 449 468 233;
I MDE dfctnb vsc653 * 254 tareg_ff_b2 ¦ 130 1 449 469 236;
I MDE dfctnb vsc653 * 255 tareg_ff_b3 ¦ 131 1 449 470 238;
I MDE dfctnb vsc653 * 256 tareg_ff_b4 ¦ 132 1 449 471 240;
I MDE dfctnb vsc653 * 257 tareg_ff_b5 ¦ 133 1 449 472 242;
I MDE dfctnb vsc653 * 258 tareg_ff_b6 ¦ 134 1 449 473 244;
I MDE dfctnb vsc653 * 259 tareg_ff_b7 ¦ 135 1 449 474 246;
I MDE dfctnb vsc653 * 260 tareg_ff_b8 ¦ 136 1 449 475 248;
I MDE dfctnb vsc653 * 261 tareg_ff_b9 ¦ 137 1 449 476 250;
```

I MDE dfctnb vsc653 * 262 tareg_ff_b10 ¦ 138 1 449 477 252;
I MDE dfctnb vsc653 * 263 tareg_ff_b11 ¦ 139 1 449 478 254;
I MDE dfctnb vsc653 * 264 tareg_ff_b12 ¦ 140 1 449 479 256;
I MDE dfctnb vsc653 * 265 tareg_ff_b13 ¦ 141 1 449 480 258;
I MDE dfctnb vsc653 * 266 tareg_ff_b14 ¦ 142 1 449 481 260;
I MDE dfctnb vsc653 * 267 tareg_ff_b15 ¦ 143 1 449 482 262;
I MDE nr02d2 vsc653 * 268 ta_data_buf ¦ 276 262 7;
I MDE dfctnb vsc653 * 269 mulreg_ff_b0 ¦ 144 108 449 483 105;
I MDE dfctnb vsc653 * 270 mulreg_ff_b1 ¦ 145 108 449 484 266;
I MDE dfctnb vsc653 * 271 mulreg_ff_b2 ¦ 146 108 449 485 279;
I MDE dfctnb vsc653 * 272 mulreg_ff_b3 ¦ 147 108 449 486 282;
I MDE dfctnb vsc653 * 273 mulreg_ff_b4 ¦ 148 108 449 487 283;
I MDE dfctnb vsc653 * 274 mulreg_ff_b5 ¦ 149 108 449 488 286;
I MDE dfctnb vsc653 * 275 tcnt_ff_b0 ¦ 157 108 449 114 289;
I MDE dfctnb vsc653 * 276 tcnt_ff_b1 ¦ 158 108 449 115 293;
I MDE dfctnb vsc653 * 277 tcnt_ff_b2 ¦ 159 108 449 116 298;
I MDE dfctnb vsc653 * 278 tstt0_ff ¦ 367 108 449 264 301;
I MDE dfctnb vsc653 * 279 tstt1_ff ¦ 302 108 449 271 292;
I MDE dfctnb vsc653 * 280 tstt2_ff ¦ 303 108 449 489 324;
I MDE dfctnb vsc653 * 281 tstt3_ff ¦ 489 108 449 263 304;
I MDE dfctnb vsc653 * 282 tstt4_ff ¦ 305 108 449 490 291;
I MDE dfctnb vsc653 * 283 tstt5_ff ¦ 306 108 449 335 314;
I MDE dfptnb vsc653 * 284 tstt15_ff ¦ 335 108 449 367 491;
I MDE dfctnb vsc653 * 285 tstt4s_ff ¦ 306 492 449 338 493;
I MDE dfptnb vsc653 * 286 tovrd_ff ¦ 309 108 449 311 319;
I MDE dfctnb vsc653 * 287 tcoutd_ff ¦ 357 108 449 320 494;
I MDE dfctnb vsc653 * 288 tminufd_ff ¦ 359 108 449 321 329;
I MDE dfctnb vsc653 * 289 tmaxofd_ff ¦ 363 108 449 495 322;
I MDE dfctnb vsc653 * 290 txcnt_ff_b0 ¦ 176 1 449 113 365;
I MDE dfctnb vsc653 * 291 txcnt_ff_b1 ¦ 177 1 449 496 497;
I MDE in01d5 vsc653 * 292 tta_ck_buf ¦ 497 108;
I MDE in01d5 vsc653 * 293 tta_ck__buf ¦ 108 492;
I MDE dfntnb vsc653 * 294 ttas_ff ¦ 4 1 498 370;
I MDE dfntnb vsc653 * 295 ttbs_ff ¦ 498 1 369 499;
I MDE dfntnb vsc653 * 296 ttdisd_ff ¦ 368 1 371 500;
I MDE dfctnb vsc653 * 297 tten_ff ¦ 372 2 449 501 364;
I MDE dfctnb vsc653 * 298 xcnt_ff_b0 ¦ 178 1 449 126 447;
I MDE dfctnb vsc653 * 299 xcnt_ff_b1 ¦ 179 1 450 127 225;
I MDE dfctnb vsc653 * 300 ta_cnt_ff_b0 ¦ 180 1 450 122 229;
I MDE dfctnb vsc653 * 301 ta_cnt_ff_b1 ¦ 181 1 450 123 230;
I MDE dfctnb vsc653 * 302 ta_cnt_ff_b2 ¦ 182 1 450 124 231;
I MDE dfctnb vsc653 * 303 ta_cnt_ff_b3 ¦ 183 1 450 125 228;
I MDE dfntnb vsc653 * 304 tas_ff ¦ 5 1 502 380;
I MDE dfntnb vsc653 * 305 tbs_ff ¦ 502 1 381 503;
I MDE dfntnb vsc653 * 306 tdisd_ff ¦ 379 1 382 504;
I MDE dfctnb vsc653 * 307 ten_ff ¦ 383 2 450 505 373;
I MDE dfctnb vsc653 * 308 selb_ff_b0 ¦ 184 108 450 90 506;
I MDE dfctnb vsc653 * 309 selb_ff_b1 ¦ 185 108 450 89 386;

I MDE dfctnb vsc653 * 310 selb_ff_b2 ¦ 186 108 450 88 393;
I MDE dfctnb vsc653 * 311 selb_ff_b3 ¦ 187 108 450 87 396;
I MDE dfctnb vsc653 * 312 selb_ff_b4 ¦ 188 108 450 86 399;
I MDE dfctnb vsc653 * 313 selb_ff_b5 ¦ 189 108 450 85 401;
I MDE dfctnb vsc653 * 314 selb_ff_b6 ¦ 190 108 450 84 404;
I MDE dfctnb vsc653 * 315 selb_ff_b7 ¦ 191 108 450 83 406;
I MDE dfctnb vsc653 * 316 selb_ff_b8 ¦ 192 108 450 82 408;
I MDE dfctnb vsc653 * 317 selb_ff_b9 ¦ 193 108 450 81 410;
I MDE dfctnb vsc653 * 318 selb_ff_b10 ¦ 194 108 450 80 413;
I MDE dfctnb vsc653 * 319 selb_ff_b11 ¦ 195 108 450 79 415;
I MDE dfctnb vsc653 * 320 selb_ff_b12 ¦ 196 108 450 78 417;
I MDE dfctnb vsc653 * 321 selb_ff_b13 ¦ 197 108 450 77 419;
I MDE dfctnb vsc653 * 322 selb_ff_b14 ¦ 198 108 450 76 421;
I MDE dfctnb vsc653 * 323 selb_ff_b15 ¦ 199 108 450 75 423;
I MDE dfctnb vsc653 * 324 selb_ff_b16 ¦ 200 108 450 74 425;
I MDE dfctnb vsc653 * 325 selb_ff_b17 ¦ 201 108 450 73 428;
I MDE dfctnb vsc653 * 326 selb_ff_b18 ¦ 202 108 450 72 430;
I MDE dfctnb vsc653 * 327 selb_ff_b19 ¦ 203 108 450 71 431;
I MDE dfctnb vsc653 * 328 selb_ff_b20 ¦ 204 108 450 70 432;
I MDE dfctnb vsc653 * 329 selb_ff_b21 ¦ 205 108 450 69 433;
I MDE dfctnb vsc653 * 330 selb_ff_b22 ¦ 206 108 450 68 434;
I MDE dfctnb vsc653 * 331 selb_ff_b23 ¦ 207 108 450 67 435;
I MDE dfctnb vsc653 * 332 selb_ff_b24 ¦ 208 108 450 66 436;
I MDE dfctnb vsc653 * 333 selb_ff_b25 ¦ 209 108 450 65 437;
I MDE dfctnb vsc653 * 334 selb_ff_b26 ¦ 210 108 450 64 438;
I MDE dfctnb vsc653 * 335 selb_ff_b27 ¦ 211 108 450 63 439;
I MDE dfctnb vsc653 * 336 selb_ff_b28 ¦ 212 108 450 62 440;
I MDE dfctnb vsc653 * 337 selb_ff_b29 ¦ 213 108 450 61 441;
I MDE dfctnb vsc653 * 338 selb_ff_b30 ¦ 214 108 450 60 442;
I MDE dfctnb vsc653 * 339 selb_ff_b31 ¦ 215 108 450 59 443;
I MDE dfctnb vsc653 * 340 acctck_ff ¦ 444 492 450 100 507;
I MDE dfctnb vsc653 * 341 enck_ff ¦ 489 492 450 101 508;
I MDE dfctnb vsc653 * 342 en_sl_ff ¦ 445 492 450 103 509;
I MDE dfctnb vsc653 * 343 tacc_sl_ff ¦ 265 492 450 104 510;
I MDE dfctnb vsc653 * 344 tflgof_ff ¦ 331 1 450 109 511;
I MDE dfctnb vsc653 * 345 tflguf_ff ¦ 326 1 450 110 512;
E netlist B subcells
MDE ad02d1 vsc653
MDE in01d5 vsc653
MDE ni01d4 vsc653
MDE oa01d1 vsc653
MDE in01d1 vsc653
MDE nd02d1 vsc653
MDE or02d1 vsc653
MDE an04d1 vsc653

MDE oa06d1 vsc653
MDE or02d2 vsc653
MDE ao01d1 vsc653
MDE oa04d1 vsc653
MDE ao08d1 vsc653
MDE nr05d1 vsc653
MDE an03d1 vsc653
MDE ao04d1 vsc653
MDE fn04d1 vsc653
MDE mx21d1 vsc653
MDE nr02d1 vsc653
MDE an02d1 vsc653
MDE oa07d1 vsc653
MDE or04d1 vsc653
MDE fn01d1 vsc653
MDE ao07d1 vsc653
MDE an06d1 vsc653
MDE ao05d1 vsc653
MDE xn02d1 vsc653
MDE an02d2 vsc653
MDE ao02d1 vsc653
MDE nd06d1 vsc653
MDE oa02d1 vsc653
MDE nr06d1 vsc653
MDE xo02d1 vsc653
MDE an05d1 vsc653
MDE nr03d1 vsc653
MDE fn05d1 vsc653
MDE in01d2 vsc653
MDE lactnb vsc653
MDE dfctnb vsc653
MDE nr02d2 vsc653
MDE dfptnb vsc653
MDE dfntnb vsc653
E subcells

NMUX8_P NLS

#cell2 * nmux8_p nls * 33 any 0 v8r4.6.2
"5-Oct-94 GMT" "19:04:10 GMT" "5-Oct-94 GMT" "19:04:10 GMT" amir * .
writer 1
file_version 1
sections 1
netlist 1: 82 nmux8_p B contents: nmux8_p
netlist 248
cells 14764
switches 0
attributes 0
physical 0
history 0
E contents B netlist
X 1 clk i;
X 2 mclk i;
X 3 reset_ i;
X 4 tdbp i;
X 5 dxn i;
X 6 set_path i;
X 7 sym_do[5] i;
X 8 sym_do[4] i;
X 9 sym_do[3] i;
X 10 sym_do[2] i;
X 11 sym_do[1] i;
X 12 sym_do[0] i;
X 13 path_do[5] i;
X 14 path_do[4] i;
X 15 path_do[3] i;
X 16 path_do[2] i;
X 17 path_do[1] i;
X 18 path_do[0] i;
X 19 sym_2[1] o;
X 20 sym_2[0] o;
X 21 sym_1[1] o;
X 22 sym_1[0] o;
X 23 sym_0[1] o;
X 24 sym_0[0] o;
X 25 calc i;
X 26 calc_d[1] i;

X 27 calc_d[0] i;
X 28 dbestd_add[1] i;
X 29 dbestd_add[0] i;
X 30 dbestp[1] o;
X 31 dbestp[0] o;
X 32 dbestd[1] o;
X 33 dbestd[0] o;
X 34 sympath[11] i;
X 35 sympath[10] i;
X 36 sympath[9] i;
X 37 sympath[8] i;
X 38 sympath[7] i;
X 39 sympath[6] i;
X 40 sympath[5] i;
X 41 sympath[4] i;
X 42 sympath[3] i;
X 43 sympath[2] i;
X 44 sympath[1] i;
X 45 sympath[0] i;
X 46 rxqck i;
X 47 srxqck i;
X 48 tsidad i;
X 49 dsxn i;
X 50 rx_sym[1] o;
X 51 rx_sym[0] o;
G 52 VDD;
G 53 VSS;
N 54 ssym[0];
N 55 ssym[1];
N 56 path[0];
N 57 path[1];
N 58 path[2];
N 59 path[3];
N 60 path[4];
N 61 path[5];
N 62 path_d[0];
N 63 path_d[1];
N 64 path_d[2];
N 65 path_d[3];
N 66 path_d[4];
N 67 path_d[5];
N 68 rx_symp[0];
N 69 rx_symp[1];
N 70 rsym[0];
N 71 rsym[1];
N 72 xn_n[0];
N 73 xn_n[1];
N 74 xn_n[2];

N 75 xn_n[3];
N 76 xn_n[4];
N 77 xn_n[5];
N 78 i_494_z;
N 79 i_491_z;
N 80 i_488_z;
N 81 i_485_z;
N 82 i_482_z;
N 83 i_479_z;
N 84 mst_path;
N 85 i_476_zn;
N 86 i_473_z;
N 87 i_470_z;
N 88 i_467_z;
N 89 i_464_z;
N 90 i_461_z;
N 91 i_458_z;
N 92 i_455_z;
N 93 i_451_zn;
N 94 i_351_zn;
N 95 i_356_zn;
N 96 i_360_zn;
N 97 i_364_zn;
N 98 i_368_zn;
N 99 i_372_zn;
N 100 rxmux;
N 101 i_433_z;
N 102 rx_sym0;
N 103 rx_sym0_ff_qn;
N 104 i_350_zn;
N 105 i_347_zn;
N 106 i_349_zn;
N 107 i_348_z;
N 108 xn_ff_b5_qn;
N 109 i_355_zn;
N 110 i_352_zn;
N 111 i_354_zn;
N 112 i_353_z;
N 113 i_359_zn;
N 114 i_357_zn;
N 115 i_358_z;
N 116 xn_ff_b4_qn;
N 117 i_363_zn;
N 118 i_361_zn;
N 119 i_362_z;
N 120 xn_ff_b3_qn;
N 121 i_367_zn;
N 122 i_365_zn;

N 123 i_366_z;
N 124 xn_ff_b2_qn;
N 125 i_371_zn;
N 126 i_369_zn;
N 127 i_370_z;
N 128 xn_ff_b1_qn;
N 129 i_375_zn;
N 130 i_373_zn;
N 131 i_374_z;
N 132 xn_ff_b0_qn;
N 133 i_378_zn;
N 134 i_377_zn;
N 135 i_382_zn;
N 136 i_380_zn;
N 137 i_381_z;
N 138 i_385_zn;
N 139 i_384_zn;
N 140 i_389_zn;
N 141 i_387_zn;
N 142 i_388_z;
N 143 i_392_zn;
N 144 i_391_zn;
N 145 i_431_z;
N 146 i_430_zn;
N 147 i_432_zn;
N 148 i_445_zn;
N 149 i_446_zn;
N 150 i_452_zn;
N 151 path_ff_b2_qn;
N 152 ssym_ff_b0_qn;
N 153 ssym_ff_b1_qn;
N 154 path_ff_b0_qn;
N 155 path_ff_b1_qn;
N 156 path_ff_b3_qn;
N 157 path_ff_b4_qn;
N 158 xn_ff_b0_q;
N 159 xn_ff_b1_q;
N 160 xn_ff_b2_q;
N 161 xn_ff_b3_q;
N 162 xn_ff_b4_q;
N 163 xn_ff_b5_q;
N 164 rx_symp_ff_b0_qn;
N 165 rx_symp_ff_b1_qn;
N 166 rxmuxd;
N 167 rxmux_ff_qn;
N 168 rxmuxd_ff_qn;
N 169 path_ff_b5_qn;
N 54 ssym_ff_b0_Q[0];

N 55 ssym_ff_b1_Q[0];
N 56 path_ff_b0_Q[0];
N 57 path_ff_b1_Q[0];
N 58 path_ff_b2_Q[0];
N 59 path_ff_b3_Q[0];
N 60 path_ff_b4_Q[0];
N 61 path_ff_b5_Q[0];
N 62 pmux8x2_0_sym_do[0];
N 63 pmux8x2_0_sym_do[1];
N 64 pmux8x2_1_sym_do[0];
N 65 pmux8x2_1_sym_do[1];
N 66 pmux8x2_2_sym_do[0];
N 67 pmux8x2_2_sym_do[1];
N 68 rx_symp_ff_b0_Q[0];
N 69 rx_symp_ff_b1_Q[0];
N 70 rxmux8x2_sym_do[0];
N 71 rxmux8x2_sym_do[1];
N 72 i_390_ZN[0];
N 73 i_386_ZN[0];
N 74 i_383_ZN[0];
N 75 i_379_ZN[0];
N 76 i_376_ZN[0];
N 77 i_346_ZN[0];
N 78 i_494_Z_1[0];
N 79 i_491_Z_1[0];
N 80 i_488_Z_1[0];
N 81 i_485_Z_1[0];
N 82 i_482_Z_1[0];
N 83 i_479_Z_1[0];
N 84 i_434_Z[0];
N 85 i_476_ZN_1[0];
N 86 i_473_Z_1[0];
N 87 i_470_Z_1[0];
N 88 i_467_Z_1[0];
N 89 i_464_Z_1[0];
N 90 i_461_Z_1[0];
N 91 i_458_Z_1[0];
N 92 i_455_Z_1[0];
N 93 i_451_ZN_1[0];
N 94 i_351_ZN_1[0];
N 95 i_356_ZN_1[0];
N 96 i_360_ZN_1[0];
N 97 i_364_ZN_1[0];
N 98 i_368_ZN_1[0];
N 99 i_372_ZN_1[0];
N 100 rxmux_ff_Q[0];
N 101 i_433_Z_1[0];
N 102 rx_sym0_ff_Q[0];

N 103 rx_sym0_ff_QN_1[0];
N 104 i_350_ZN_1[0];
N 105 i_347_ZN_1[0];
N 106 i_349_ZN_1[0];
N 107 i_348_Z_1[0];
N 108 xn_ff_b5_QN_1[0];
N 109 i_355_ZN_1[0];
N 110 i_352_ZN_1[0];
N 111 i_354_ZN_1[0];
N 112 i_353_Z_1[0];
N 113 i_359_ZN_1[0];
N 114 i_357_ZN_1[0];
N 115 i_358_Z_1[0];
N 116 xn_ff_b4_QN_1[0];
N 117 i_363_ZN_1[0];
N 118 i_361_ZN_1[0];
N 119 i_362_Z_1[0];
N 120 xn_ff_b3_QN_1[0];
N 121 i_367_ZN_1[0];
N 122 i_365_ZN_1[0];
N 123 i_366_Z_1[0];
N 124 xn_ff_b2_QN_1[0];
N 125 i_371_ZN_1[0];
N 126 i_369_ZN_1[0];
N 127 i_370_Z_1[0];
N 128 xn_ff_b1_QN_1[0];
N 129 i_375_ZN_1[0];
N 130 i_373_ZN_1[0];
N 131 i_374_Z_1[0];
N 132 xn_ff_b0_QN_1[0];
N 133 i_378_ZN_1[0];
N 134 i_377_ZN_1[0];
N 135 i_382_ZN_1[0];
N 136 i_380_ZN_1[0];
N 137 i_381_Z_1[0];
N 138 i_385_ZN_1[0];
N 139 i_384_ZN_1[0];
N 140 i_389_ZN_1[0];
N 141 i_387_ZN_1[0];
N 142 i_388_Z_1[0];
N 143 i_392_ZN_1[0];
N 144 i_391_ZN_1[0];
N 145 i_431_Z_1[0];
N 146 i_430_ZN_1[0];
N 147 i_432_ZN_1[0];
N 148 i_445_ZN_1[0];
N 149 i_446_ZN_1[0];
N 150 i_452_ZN_1[0];

```
N 151 path_ff_b2_QN_1[0];
N 152 ssym_ff_b0_QN_1[0];
N 153 ssym_ff_b1_QN_1[0];
N 154 path_ff_b0_QN_1[0];
N 155 path_ff_b1_QN_1[0];
N 156 path_ff_b3_QN_1[0];
N 157 path_ff_b4_QN_1[0];
N 158 xn_ff_b0_Q_1[0];
N 159 xn_ff_b1_Q_1[0];
N 160 xn_ff_b2_Q_1[0];
N 161 xn_ff_b3_Q_1[0];
N 162 xn_ff_b4_Q_1[0];
N 163 xn_ff_b5_Q_1[0];
N 164 rx_symp_ff_b0_QN_1[0];
N 165 rx_symp_ff_b1_QN_1[0];
N 166 rxmuxd_ff_Q[0];
N 167 rxmux_ff_QN_1[0];
N 168 rxmuxd_ff_QN_1[0];
N 169 path_ff_b5_QN_1[0];
N 20 smux8x2_2_sym_do[0];
N 19 smux8x2_2_sym_do[1];
N 22 smux8x2_1_sym_do[0];
N 21 smux8x2_1_sym_do[1];
N 24 smux8x2_0_sym_do[0];
N 23 smux8x2_0_sym_do[1];
N 33 esmux8x2_sym_do[0];
N 32 esmux8x2_sym_do[1];
N 31 epmux8x2_sym_do[0];
N 30 epmux8x2_sym_do[1];
N 51 rx_sym0_buf_ZN[0];
N 50 rx_sym1_buf_ZN[0];
V sym_do 5 0 ¦ 7 8 9 10 11 12;
V path_do 5 0 ¦ 13 14 15 16 17 18;
V sym_2 1 0 ¦ 19 20;
V sym_1 1 0 ¦ 21 22;
V sym_0 1 0 ¦ 23 24;
V calc_d 1 0 ¦ 26 27;
V dbestd_add 1 0 ¦ 28 29;
V dbestp 1 0 ¦ 30 31;
V dbestd 1 0 ¦ 32 33;
V sympath 11 0 ¦ 34 35 36 37 38 39 40 41 42 43 44 45;
V rx_sym 1 0 ¦ 50 51;
V ssym 1 0 ¦ 55 54;
V path 5 0 ¦ 61 60 59 58 57 56;
V path_d 5 0 ¦ 67 66 65 64 63 62;
V rx_symp 1 0 ¦ 69 68;
V rsym 1 0 ¦ 71 70;
V xn_n 5 0 ¦ 77 76 75 74 73 72;
```

V pmux8x2_2_sym_do 1 0 ¦ 67 66;
V pmux8x2_1_sym_do 1 0 ¦ 65 64;
V pmux8x2_0_sym_do 1 0 ¦ 63 62;
V smux8x2_2_sym_do 1 0 ¦ 19 20;
V smux8x2_1_sym_do 1 0 ¦ 21 22;
V smux8x2_0_sym_do 1 0 ¦ 23 24;
V esmux8x2_sym_do 1 0 ¦ 32 33;
V epmux8x2_sym_do 1 0 ¦ 30 31;
V rxmux8x2_sym_do 1 0 ¦ 71 70;
V rx_sym0_ff_Q 0 0 ¦ 102;
V rx_sym0_ff_QN_1 0 0 ¦ 103;
V i_346_ZN 0 0 ¦ 77;
V i_347_ZN_1 0 0 ¦ 105;
V i_348_Z_1 0 0 ¦ 107;
V i_349_ZN_1 0 0 ¦ 106;
V i_350_ZN_1 0 0 ¦ 104;
V i_351_ZN_1 0 0 ¦ 94;
V i_352_ZN_1 0 0 ¦ 110;
V i_353_Z_1 0 0 ¦ 112;
V i_354_ZN_1 0 0 ¦ 111;
V i_355_ZN_1 0 0 ¦ 109;
V i_356_ZN_1 0 0 ¦ 95;
V i_357_ZN_1 0 0 ¦ 114;
V i_358_Z_1 0 0 ¦ 115;
V i_359_ZN_1 0 0 ¦ 113;
V i_360_ZN_1 0 0 ¦ 96;
V i_361_ZN_1 0 0 ¦ 118;
V i_362_Z_1 0 0 ¦ 119;
V i_363_ZN_1 0 0 ¦ 117;
V i_364_ZN_1 0 0 ¦ 97;
V i_365_ZN_1 0 0 ¦ 122;
V i_366_Z_1 0 0 ¦ 123;
V i_367_ZN_1 0 0 ¦ 121;
V i_368_ZN_1 0 0 ¦ 98;
V i_369_ZN_1 0 0 ¦ 126;
V i_370_Z_1 0 0 ¦ 127;
V i_371_ZN_1 0 0 ¦ 125;
V i_372_ZN_1 0 0 ¦ 99;
V i_373_ZN_1 0 0 ¦ 130;
V i_374_Z_1 0 0 ¦ 131;
V i_375_ZN_1 0 0 ¦ 129;
V i_376_ZN 0 0 ¦ 76;
V i_377_ZN_1 0 0 ¦ 134;
V i_378_ZN_1 0 0 ¦ 133;
V i_379_ZN 0 0 ¦ 75;
V i_380_ZN_1 0 0 ¦ 136;
V i_381_Z_1 0 0 ¦ 137;
V i_382_ZN_1 0 0 ¦ 135;

V i_383_ZN 0 0 ¦ 74;
V i_384_ZN_1 0 0 ¦ 139;
V i_385_ZN_1 0 0 ¦ 138;
V i_386_ZN 0 0 ¦ 73;
V i_387_ZN_1 0 0 ¦ 141;
V i_388_Z_1 0 0 ¦ 142;
V i_389_ZN_1 0 0 ¦ 140;
V i_390_ZN 0 0 ¦ 72;
V i_391_ZN_1 0 0 ¦ 144;
V i_392_ZN_1 0 0 ¦ 143;
V i_430_ZN_1 0 0 ¦ 146;
V i_431_Z_1 0 0 ¦ 145;
V i_432_ZN_1 0 0 ¦ 147;
V i_433_Z_1 0 0 ¦ 101;
V i_434_Z 0 0 ¦ 84;
V i_445_ZN_1 0 0 ¦ 148;
V i_446_ZN_1 0 0 ¦ 149;
V rx_sym0_buf_ZN 0 0 ¦ 51;
V rx_sym1_buf_ZN 0 0 ¦ 50;
V i_451_ZN_1 0 0 ¦ 93;
V i_452_ZN_1 0 0 ¦ 150;
V i_455_Z_1 0 0 ¦ 92;
V i_458_Z_1 0 0 ¦ 91;
V i_461_Z_1 0 0 ¦ 90;
V i_464_Z_1 0 0 ¦ 89;
V i_467_Z_1 0 0 ¦ 88;
V i_470_Z_1 0 0 ¦ 87;
V i_473_Z_1 0 0 ¦ 86;
V i_476_ZN_1 0 0 ¦ 85;
V i_479_Z_1 0 0 ¦ 83;
V i_482_Z_1 0 0 ¦ 82;
V i_485_Z_1 0 0 ¦ 81;
V i_488_Z_1 0 0 ¦ 80;
V i_491_Z_1 0 0 ¦ 79;
V i_494_Z_1 0 0 ¦ 78;
V ssym_ff_b0_Q 0 0 ¦ 54;
V ssym_ff_b0_QN_1 0 0 ¦ 152;
V ssym_ff_b1_Q 0 0 ¦ 55;
V ssym_ff_b1_QN_1 0 0 ¦ 153;
V path_ff_b0_Q 0 0 ¦ 56;
V path_ff_b0_QN_1 0 0 ¦ 154;
V path_ff_b1_Q 0 0 ¦ 57;
V path_ff_b1_QN_1 0 0 ¦ 155;
V path_ff_b3_Q 0 0 ¦ 59;
V path_ff_b3_QN_1 0 0 ¦ 156;
V path_ff_b4_Q 0 0 ¦ 60;
V path_ff_b4_QN_1 0 0 ¦ 157;
V xn_ff_b0_Q_1 0 0 ¦ 158;

V xn_ff_b0_QN_1 0 0 ¦ 132;
V xn_ff_b1_Q_1 0 0 ¦ 159;
V xn_ff_b1_QN_1 0 0 ¦ 128;
V xn_ff_b2_Q_1 0 0 ¦ 160;
V xn_ff_b2_QN_1 0 0 ¦ 124;
V xn_ff_b3_Q_1 0 0 ¦ 161;
V xn_ff_b3_QN_1 0 0 ¦ 120;
V xn_ff_b4_Q_1 0 0 ¦ 162;
V xn_ff_b4_QN_1 0 0 ¦ 116;
V xn_ff_b5_Q_1 0 0 ¦ 163;
V xn_ff_b5_QN_1 0 0 ¦ 108;
V rx_symp_ff_b0_Q 0 0 ¦ 68;
V rx_symp_ff_b0_QN_1 0 0 ¦ 164;
V rx_symp_ff_b1_Q 0 0 ¦ 69;
V rx_symp_ff_b1_QN_1 0 0 ¦ 165;
V rxmux_ff_Q 0 0 ¦ 100;
V rxmux_ff_QN_1 0 0 ¦ 167;
V rxmuxd_ff_Q 0 0 ¦ 166;
V rxmuxd_ff_QN_1 0 0 ¦ 168;
V path_ff_b5_Q 0 0 ¦ 61;
V path_ff_b5_QN_1 0 0 ¦ 169;
V path_ff_b2_Q 0 0 ¦ 58;
V path_ff_b2_QN_1 0 0 ¦ 151;
M NLS nmux8x2_p * ¦ add[1] add[0] sym[5] sym[4] sym[3] sym[2] sym[1] sym[0] sym_do[1] sym_do[0] calc calc_d[1] calc_d[0] ¦ iiiiiiiiooiii;
M MDE mfctnh vsc653 ¦ DA DB SA CP CDN Q QN ¦ ;
M MDE fn01d2 vsc653 ¦ A1 B1 ZN ¦ ;
M MDE ni01d3 vsc653 ¦ I Z ¦ ;
M MDE in01d1 vsc653 ¦ I ZN ¦ ;
M MDE nr02d1 vsc653 ¦ A1 A2 ZN ¦ ;
M MDE fn01d1 vsc653 ¦ A1 B1 ZN ¦ ;
M MDE in01d5 vsc653 ¦ I ZN ¦ ;
M MDE ni01d4 vsc653 ¦ I Z ¦ ;
M MDE ni01d1 vsc653 ¦ I Z ¦ ;
M MDE or02d1 vsc653 ¦ A1 A2 Z ¦ ;
M MDE mi21d1 vsc653 ¦ I0 I1 S ZN ¦ ;
M MDE in01d3 vsc653 ¦ I ZN ¦ ;
M MDE dfctnb vsc653 ¦ D CP CDN Q QN ¦ ;
M MDE dfptnh vsc653 ¦ D CP SDN Q QN ¦ ;
I NLS nmux8x2_p * * 1 pmux8x2_2 ¦ 61 60 78 79 80 81 82 83 67 66 84 52 53;
I NLS nmux8x2_p * * 2 pmux8x2_1 ¦ 59 85 78 79 80 81 82 83 65 64 84 53 52;
I NLS nmux8x2_p * * 3 pmux8x2_0 ¦ 57 56 78 79 80 81 82 83 63 62 84 53 53;
I NLS nmux8x2_p * * 4 smux8x2_2 ¦ 61 60 86 87 88 89 90 91 19 20 25 26 27;
I NLS nmux8x2_p * * 5 smux8x2_1 ¦ 59 58 86 87 88 89 90 91 21 22 25 26 27;
I NLS nmux8x2_p * * 6 smux8x2_0 ¦ 57 56 86 87 88 89 90 91 23 24 25 26 27;
I NLS nmux8x2_p * * 7 esmux8x2 ¦ 28 29 34 35 36 37 38 39 32 33 53 53 53;
I NLS nmux8x2_p * * 8 epmux8x2 ¦ 92 93 40 41 42 43 44 45 30 31 53 53 53;
I NLS nmux8x2_p * * 9 rxmux8x2 ¦ 44 45 94 95 96 97 98 99 71 70 53 53 53;

I MDE mfctnh vsc653 * 10 rx_sym0_ff ¦ 54 55 100 47 101 102 103;
I MDE fn01d2 vsc653 * 11 i_346 ¦ 104 105 77;
I MDE fn01d2 vsc653 * 12 i_347 ¦ 106 107 105;
I MDE ni01d3 vsc653 * 13 i_348 ¦ 19 107;
I MDE in01d1 vsc653 * 14 i_349 ¦ 5 106;
I MDE nr02d1 vsc653 * 15 i_350 ¦ 5 108 104;
I MDE fn01d2 vsc653 * 16 i_351 ¦ 109 110 94;
I MDE fn01d1 vsc653 * 17 i_352 ¦ 111 112 110;
I MDE ni01d3 vsc653 * 18 i_353 ¦ 34 112;
I MDE in01d1 vsc653 * 19 i_354 ¦ 4 111;
I MDE nr02d1 vsc653 * 20 i_355 ¦ 108 4 109;
I MDE fn01d2 vsc653 * 21 i_356 ¦ 113 114 95;
I MDE fn01d2 vsc653 * 22 i_357 ¦ 111 115 114;
I MDE ni01d3 vsc653 * 23 i_358 ¦ 35 115;
I MDE nr02d1 vsc653 * 24 i_359 ¦ 116 4 113;
I MDE fn01d2 vsc653 * 25 i_360 ¦ 117 118 96;
I MDE fn01d2 vsc653 * 26 i_361 ¦ 111 119 118;
I MDE ni01d3 vsc653 * 27 i_362 ¦ 36 119;
I MDE nr02d1 vsc653 * 28 i_363 ¦ 120 4 117;
I MDE fn01d2 vsc653 * 29 i_364 ¦ 121 122 97;
I MDE fn01d1 vsc653 * 30 i_365 ¦ 111 123 122;
I MDE ni01d3 vsc653 * 31 i_366 ¦ 37 123;
I MDE nr02d1 vsc653 * 32 i_367 ¦ 124 4 121;
I MDE fn01d2 vsc653 * 33 i_368 ¦ 125 126 98;
I MDE fn01d2 vsc653 * 34 i_369 ¦ 111 127 126;
I MDE ni01d3 vsc653 * 35 i_370 ¦ 38 127;
I MDE nr02d1 vsc653 * 36 i_371 ¦ 128 4 125;
I MDE fn01d2 vsc653 * 37 i_372 ¦ 129 130 99;
I MDE fn01d2 vsc653 * 38 i_373 ¦ 111 131 130;
I MDE ni01d3 vsc653 * 39 i_374 ¦ 39 131;
I MDE nr02d1 vsc653 * 40 i_375 ¦ 132 4 129;
I MDE fn01d2 vsc653 * 41 i_376 ¦ 133 134 76;
I MDE fn01d2 vsc653 * 42 i_377 ¦ 106 20 134;
I MDE nr02d1 vsc653 * 43 i_378 ¦ 5 116 133;
I MDE fn01d2 vsc653 * 44 i_379 ¦ 135 136 75;
I MDE fn01d2 vsc653 * 45 i_380 ¦ 106 137 136;
I MDE ni01d3 vsc653 * 46 i_381 ¦ 21 137;
I MDE nr02d1 vsc653 * 47 i_382 ¦ 5 120 135;
I MDE fn01d2 vsc653 * 48 i_383 ¦ 138 139 74;
I MDE fn01d2 vsc653 * 49 i_384 ¦ 106 22 139;
I MDE nr02d1 vsc653 * 50 i_385 ¦ 5 124 138;
I MDE fn01d2 vsc653 * 51 i_386 ¦ 140 141 73;
I MDE fn01d2 vsc653 * 52 i_387 ¦ 106 142 141;
I MDE ni01d3 vsc653 * 53 i_388 ¦ 23 142;
I MDE nr02d1 vsc653 * 54 i_389 ¦ 5 128 140;
I MDE fn01d2 vsc653 * 55 i_390 ¦ 143 144 72;
I MDE fn01d2 vsc653 * 56 i_391 ¦ 106 24 144;
I MDE nr02d1 vsc653 * 57 i_392 ¦ 5 132 143;

```
I MDE in01d5 vsc653 * 58 i_430 ¦ 145 146;
I MDE ni01d4 vsc653 * 59 i_431 ¦ 147 145;
I MDE in01d1 vsc653 * 60 i_432 ¦ 3 147;
I MDE ni01d1 vsc653 * 61 i_433 ¦ 146 101;
I MDE or02d1 vsc653 * 62 i_434 ¦ 6 147 84;
I MDE mi21d1 vsc653 * 63 i_445 ¦ 68 47 48 148;
I MDE mi21d1 vsc653 * 64 i_446 ¦ 69 102 48 149;
I MDE in01d5 vsc653 * 65 rx_sym0_buf ¦ 148 51;
I MDE in01d5 vsc653 * 66 rx_sym1_buf ¦ 149 50;
I MDE in01d3 vsc653 * 67 i_451 ¦ 150 93;
I MDE in01d1 vsc653 * 68 i_452 ¦ 29 150;
I MDE ni01d4 vsc653 * 69 i_455 ¦ 28 92;
I MDE ni01d4 vsc653 * 70 i_458 ¦ 12 91;
I MDE ni01d4 vsc653 * 71 i_461 ¦ 11 90;
I MDE ni01d4 vsc653 * 72 i_464 ¦ 10 89;
I MDE ni01d4 vsc653 * 73 i_467 ¦ 9 88;
I MDE ni01d4 vsc653 * 74 i_470 ¦ 8 87;
I MDE ni01d4 vsc653 * 75 i_473 ¦ 7 86;
I MDE in01d1 vsc653 * 76 i_476 ¦ 151 85;
I MDE ni01d4 vsc653 * 77 i_479 ¦ 18 83;
I MDE ni01d4 vsc653 * 78 i_482 ¦ 17 82;
I MDE ni01d4 vsc653 * 79 i_485 ¦ 16 81;
I MDE ni01d4 vsc653 * 80 i_488 ¦ 15 80;
I MDE ni01d4 vsc653 * 81 i_491 ¦ 14 79;
I MDE ni01d4 vsc653 * 82 i_494 ¦ 13 78;
I MDE mfctnh vsc653 * 83 ssym_ff_b0 ¦ 70 54 49 2 101 54 152;
I MDE mfctnh vsc653 * 84 ssym_ff_b1 ¦ 71 55 49 2 101 55 153;
I MDE dfctnb vsc653 * 85 path_ff_b0 ¦ 62 2 3 56 154;
I MDE dfctnb vsc653 * 86 path_ff_b1 ¦ 63 2 3 57 155;
I MDE dfctnb vsc653 * 87 path_ff_b3 ¦ 65 2 3 59 156;
I MDE dfctnb vsc653 * 88 path_ff_b4 ¦ 66 2 3 60 157;
I MDE dfctnb vsc653 * 89 xn_ff_b0 ¦ 72 2 146 158 132;
I MDE dfctnb vsc653 * 90 xn_ff_b1 ¦ 73 2 146 159 128;
I MDE dfctnb vsc653 * 91 xn_ff_b2 ¦ 74 2 146 160 124;
I MDE dfctnb vsc653 * 92 xn_ff_b3 ¦ 75 2 146 161 120;
I MDE dfctnb vsc653 * 93 xn_ff_b4 ¦ 76 2 146 162 116;
I MDE dfctnb vsc653 * 94 xn_ff_b5 ¦ 77 2 146 163 108;
I MDE dfctnb vsc653 * 95 rx_symp_ff_b0 ¦ 54 46 101 68 164;
I MDE dfctnb vsc653 * 96 rx_symp_ff_b1 ¦ 55 46 101 69 165;
I MDE dfctnb vsc653 * 97 rxmux_ff ¦ 166 1 101 100 167;
I MDE dfctnb vsc653 * 98 rxmuxd_ff ¦ 46 1 101 166 168;
I MDE dfptnh vsc653 * 99 path_ff_b5 ¦ 67 2 3 61 169;
I MDE dfptnh vsc653 * 100 path_ff_b2 ¦ 64 2 3 58 151;
E netlist


B subcells
NLS nmux8x2_p *
```

MDE mfctnh vsc653
MDE fn01d2 vsc653
MDE ni01d3 vsc653
MDE in01d1 vsc653
MDE nr02d1 vsc653
MDE fn01d1 vsc653
MDE in01d5 vsc653
MDE ni01d4 vsc653
MDE ni01d1 vsc653
MDE or02d1 vsc653
MDE mi21d1 vsc653
MDE in01d3 vsc653
MDE dfctnb vsc653
MDE dfptnh vsc653
E subcells

NMUX8X2_P NLS

```
#cell2 * nmux8x2_p nls * 32 any 0 v8r4.6.2
# "19-Sep-94 GMT" "13:43:54 GMT" "19-Sep-94 GMT" "13:43:54 GMT" amir * .
writer        1
file_version  1
sections      1
netlist   1:        84 nmux8x2_p


B contents:  nmux8x2_p
netlist         252
cells          1501
switches          0
attributes        0
physical          0
history           0
E contents


B netlist
X 1 add[1] i;
X 2 add[0] i;
X 3 sym[5] i;
X 4 sym[4] i;
X 5 sym[3] i;
X 6 sym[2] i;
X 7 sym[1] i;
X 8 sym[0] i;
X 9 sym_do[1] o;
X 10 sym_do[0] o;
X 11 calc i;
X 12 calc_d[1] i;
X 13 calc_d[0] i;
G 14 VDD;
G 15 VSS;
V add 1 0 ¦ 1 2;
V sym 5 0 ¦ 3 4 5 6 7 8;
V sym_do 1 0 ¦ 9 10;
V calc_d 1 0 ¦ 12 13;
M MDE fn01d2 vsc653 ¦ A1 B1 ZN ¦ ;
M MDE nd03d1 vsc653 ¦ A1 A2 A3 ZN ¦ ;
M MDE xo02d1 vsc653 ¦ A1 A2 Z ¦ ;
M MDE an02d1 vsc653 ¦ A1 A2 Z ¦ ;
M MDE ni01d1 vsc653 ¦ I Z ¦ ;
I MDE fn01d2 vsc653 * 1 i_124 ¦ 16 17 9;
I MDE fn01d2 vsc653 * 2 i_125 ¦ 11 18 17;
```

```
I MDE nd03d1 vsc653 * 3 i_126 ¦ 19 20 21 18;
I MDE fn01d2 vsc653 * 4 i_127 ¦ 22 7 21;
I MDE xo02d1 vsc653 * 5 i_128 ¦ 1 2 22;
I MDE fn01d2 vsc653 * 6 i_129 ¦ 23 5 20;
I MDE fn01d2 vsc653 * 7 i_130 ¦ 1 2 23;
I MDE fn01d2 vsc653 * 8 i_131 ¦ 24 3 19;
I MDE fn01d2 vsc653 * 9 i_132 ¦ 2 1 24;
I MDE an02d1 vsc653 * 10 i_133 ¦ 12 11 16;
I MDE fn01d2 vsc653 * 11 i_134 ¦ 25 26 10;
I MDE fn01d2 vsc653 * 12 i_135 ¦ 11 27 26;
I MDE nd03d1 vsc653 * 13 i_136 ¦ 28 29 30 27;
I MDE fn01d2 vsc653 * 14 i_137 ¦ 22 8 30;
I MDE fn01d2 vsc653 * 15 i_138 ¦ 24 4 29;
I MDE fn01d2 vsc653 * 16 i_139 ¦ 23 6 28;
I MDE an02d1 vsc653 * 17 i_140 ¦ 31 11 25;
I MDE ni01d1 vsc653 * 18 i_141 ¦ 13 31;
E netlist

B subcells
MDE fn01d2 vsc653
MDE nd03d1 vsc653
MDE xo02d1 vsc653
MDE an02d1 vsc653
MDE ni01d1 vsc653
E subcells
```

NPULSW3_P NLS

```
#cell2 * npulsw3_p nls * 4 any 0 v8r4.6.2
# "4-Oct-94 GMT" "7:35:02 GMT" "4-Oct-94 GMT" "7:35:02 GMT" amir * .
writer        1
file_version  1
sections      1
netlist   1:       84 npulsw3_p


B contents:  npulsw3_p
netlist          252
cells           2235
switches           0
attributes         0
physical           0
history            0
E contents


B netlist
X 1 wrd i;
X 2 clk i;
X 3 clk_ i;
X 4 wr_ o;
X 5 reset_ i;
G 6 VDD;
G 7 VSS;
N 8 wr0;
N 9 wr1;
N 10 wr2;
N 11 wr3;
N 12 u2_zn;
N 13 u3_zn;
N 14 wr1_n;
N 15 u5_zn;
N 16 wr12;
N 17 u6_zn;
N 18 wr32;
N 19 u7_zn;
N 20 wr12x;
N 21 u8_zn;
N 22 wr32x;
N 23 wr123;
N 24 wr123d;
N 8 wr0_1_q;
N 9 wr1_1_q;
```

```
N 9 wr2_n;
N 10 wr2_1_q;
N 10 wr3_n;
N 11 wr3_1_q;
N 12 u2_ZN_1[0];
N 13 u3_ZN_1[0];
N 14 u4_ZN[0];
N 14 wr1_1_n;
N 15 u5_ZN_1[0];
N 16 andwr12_Z[0];
N 17 u6_ZN_1[0];
N 18 andwr32_Z[0];
N 19 u7_ZN_1[0];
N 20 andwr12x_Z[0];
N 21 u8_ZN_1[0];
N 22 andwr32x_Z[0];
N 23 orwr_Z[0];
N 24 orwr1_Z[0];
N 1 wr0_n;
N 4 nandwr__ZN[0];
V u2_ZN_1 0 0 ¦ 12;
V u3_ZN_1 0 0 ¦ 13;
V u4_ZN 0 0 ¦ 14;
V u5_ZN_1 0 0 ¦ 15;
V andwr12_Z 0 0 ¦ 16;
V u6_ZN_1 0 0 ¦ 17;
V andwr32_Z 0 0 ¦ 18;
V u7_ZN_1 0 0 ¦ 19;
V andwr12x_Z 0 0 ¦ 20;
V u8_ZN_1 0 0 ¦ 21;
V andwr32x_Z 0 0 ¦ 22;
V orwr_Z 0 0 ¦ 23;
V orwr1_Z 0 0 ¦ 24;
V nandwr__ZN 0 0 ¦ 4;
M MDE in01d1 vsc653 ¦ I ZN ¦ ;
M MDE nd02d1 vsc653 ¦ A1 A2 ZN ¦ ;
M MDE an03d1 vsc653 ¦ A1 A2 A3 Z ¦ ;
M MDE an04d1 vsc653 ¦ A1 A2 A3 A4 Z ¦ ;
M MDE or02d1 vsc653 ¦ A1 A2 Z ¦ ;
M MDE an02d1 vsc653 ¦ A1 A2 Z ¦ ;
M MDE nd03d1 vsc653 ¦ A1 A2 A3 ZN ¦ ;
M MDE dfctnb vsc653 ¦ D CP CDN Q QN ¦ ;
I MDE in01d1 vsc653 * 1 u2 ¦ 10 12;
I MDE nd02d1 vsc653 * 2 u3 ¦ 12 8 13;
I MDE in01d1 vsc653 * 3 u4 ¦ 13 14;
I MDE in01d1 vsc653 * 4 u5 ¦ 9 15;
I MDE an03d1 vsc653 * 5 andwr12 ¦ 8 15 12 16;
I MDE in01d1 vsc653 * 6 u6 ¦ 11 17;
```

```
I MDE an03d1 vsc653 * 7 andwr32 ¦ 8 17 10 18;
I MDE in01d1 vsc653 * 8 u7 ¦ 18 19;
I MDE an04d1 vsc653 * 9 andwr12x ¦ 8 15 12 19 20;
I MDE in01d1 vsc653 * 10 u8 ¦ 16 21;
I MDE an04d1 vsc653 * 11 andwr32x ¦ 8 17 10 21 22;
I MDE or02d1 vsc653 * 12 orwr ¦ 20 22 23;
I MDE an02d1 vsc653 * 13 orwr1 ¦ 23 8 24;
I MDE nd03d1 vsc653 * 14 nandwr_ ¦ 24 8 5 4;
I MDE dfctnb vsc653 * 15 wr0_ff ¦ 1 2 5 8 25;
I MDE dfctnb vsc653 * 16 wr1_ff ¦ 14 3 5 9 26;
I MDE dfctnb vsc653 * 17 wr2_ff ¦ 9 2 5 10 27;
I MDE dfctnb vsc653 * 18 wr3_ff ¦ 10 3 5 11 28;
E netlist

B subcells
MDE in01d1 vsc653
MDE nd02d1 vsc653
MDE an03d1 vsc653
MDE an04d1 vsc653
MDE or02d1 vsc653
MDE an02d1 vsc653
MDE nd03d1 vsc653
MDE dfctnb vsc653
E subcells
```

NPULSW2_P NLS

#cell2 * npulsw2_p nls * 15 any 0 v8r4.6.2
"13-Sep-94 GMT" "14:02:23 GMT" "13-Sep-94 GMT" "14:02:23 GMT" amir * .
writer 1
file_version 1
sections 1
netlist 1: 84 npulsw2_p B contents: npulsw2_p
netlist 252
cells 2564
switches 0
attributes 0
physical 0
history 0
E contents B netlist
X 1 wrd i;
X 2 clk i;
X 3 clk_ i;
X 4 wr_ o;
X 5 reset_ i;
G 6 VDD;
G 7 VSS;
N 8 wr0;
N 9 wr1;
N 10 wr2;
N 11 wr3;
N 12 u2_zn;
N 13 u3_zn;
N 14 wr1_n;
N 15 wr0d;
N 16 u5_zn;
N 17 wr12;
N 18 u6_zn;
N 19 wr32;
N 20 u7_zn;
N 21 wr12x;
N 22 u8_zn;
N 23 wr32x;
N 24 wr123;
N 25 wr123d;
N 26 wrd_;

```
N 27 wrd1_;
N 8 wr0_1_q;
N 9 wr1_1_q;
N 9 wr2_n;
N 10 wr2_1_q;
N 10 wr3_n;
N 11 wr3_1_q;
N 12 u2_ZN_1[0];
N 13 u3_ZN_1[0];
N 14 u4_ZN[0];
N 14 wr1_1_n;
N 15 andwr0d_Z[0];
N 16 u5_ZN_1[0];
N 17 andwr12_Z[0];
N 18 u6_ZN_1[0];
N 19 andwr32_Z[0];
N 20 u7_ZN_1[0];
N 21 andwr12x_Z[0];
N 22 u8_ZN_1[0];
N 23 andwr32x_Z[0];
N 24 orwr_Z[0];
N 25 orwr1_Z[0];
N 26 nandwr__ZN[0];
N 27 nor_wr_ZN[0];
N 1 wr0_n;
N 4 in_wr_ZN[0];
V u2_ZN_1 0 0 ¦ 12;
V u3_ZN_1 0 0 ¦ 13;
V u4_ZN 0 0 ¦ 14;
V andwr0d_Z 0 0 ¦ 15;
V u5_ZN_1 0 0 ¦ 16;
V andwr12_Z 0 0 ¦ 17;
V u6_ZN_1 0 0 ¦ 18;
V andwr32_Z 0 0 ¦ 19;
V u7_ZN_1 0 0 ¦ 20;
V andwr12x_Z 0 0 ¦ 21;
V u8_ZN_1 0 0 ¦ 22;
V andwr32x_Z 0 0 ¦ 23;
V orwr_Z 0 0 ¦ 24;
V orwr1_Z 0 0 ¦ 25;
V nandwr__ZN 0 0 ¦ 26;
V nor_wr_ZN 0 0 ¦ 27;
V in_wr_ZN 0 0 ¦ 4;
M MDE in01d1 vsc653 ¦ I ZN ¦ ;
M MDE nd02d1 vsc653 ¦ A1 A2 ZN ¦ ;
M MDE an02d1 vsc653 ¦ A1 A2 Z ¦ ;
M MDE an03d1 vsc653 ¦ A1 A2 A3 Z ¦ ;
M MDE an04d1 vsc653 ¦ A1 A2 A3 A4 Z ¦ ;
```

```
M MDE or02d1 vsc653 ¦ A1 A2 Z ¦ ;
M MDE nd03d1 vsc653 ¦ A1 A2 A3 ZN ¦ ;
M MDE nr03d1 vsc653 ¦ A1 A2 A3 ZN ¦ ;
M MDE dfctnb vsc653 ¦ D CP CDN Q QN ¦ ;
I MDE in01d1 vsc653 * 1 u2 ¦ 10 12;
I MDE nd02d1 vsc653 * 2 u3 ¦ 12 8 13;
I MDE in01d1 vsc653 * 3 u4 ¦ 13 14;
I MDE an02d1 vsc653 * 4 andwr0d ¦ 8 6 15;
I MDE in01d1 vsc653 * 5 u5 ¦ 9 16;
I MDE an03d1 vsc653 * 6 andwr12 ¦ 15 16 12 17;
I MDE in01d1 vsc653 * 7 u6 ¦ 11 18;
I MDE an03d1 vsc653 * 8 andwr32 ¦ 15 18 10 19;
I MDE in01d1 vsc653 * 9 u7 ¦ 19 20;
I MDE an04d1 vsc653 * 10 andwr12x ¦ 15 16 12 20 21;
I MDE in01d1 vsc653 * 11 u8 ¦ 17 22;
I MDE an04d1 vsc653 * 12 andwr32x ¦ 15 18 10 22 23;
I MDE or02d1 vsc653 * 13 orwr ¦ 21 23 24;
I MDE an02d1 vsc653 * 14 orwr1 ¦ 24 15 25;
I MDE nd03d1 vsc653 * 15 nandwr_ ¦ 25 15 5 26;
I MDE nr03d1 vsc653 * 16 nor_wr ¦ 7 7 26 27;
I MDE nd02d1 vsc653 * 17 in_wr ¦ 27 5 4;
I MDE dfctnb vsc653 * 18 wr0_ff ¦ 1 2 5 8 28;
I MDE dfctnb vsc653 * 19 wr1_ff ¦ 14 3 5 9 29;
I MDE dfctnb vsc653 * 20 wr2_ff ¦ 9 2 5 10 30;
I MDE dfctnb vsc653 * 21 wr3_ff ¦ 10 3 5 11 31;
E netlist

B subcells
MDE in01d1 vsc653
MDE nd02d1 vsc653
MDE an02d1 vsc653
MDE an03d1 vsc653
MDE an04d1 vsc653
MDE or02d1 vsc653
MDE nd03d1 vsc653
MDE nr03d1 vsc653
MDE dfctnb vsc653
E subcells
```

SU_CTL_P NLS

```
#cell2 * su_ctl_p nls * 33 any 0 v8r4.6.2
# "5-Oct-94 GMT" "12:39:55 GMT" "5-Oct-94 GMT" "12:39:55 GMT" amir * .
writer        1
file_version  1
sections      1
netlist   1:        83 su_ctl_p


B contents:  su_ctl_p
netlist        250
cells        19789
switches         0
attributes       0
physical         0
history          0
E contents


B netlist
X 1 reset_ i;
X 2 srst_n i;
X 3 tsinit i;
X 4 tsfrz i;
X 5 tstst i;
X 6 tsmod i;
X 7 stict o;
X 8 tstwa i;
X 9 aadd[3] i;
X 10 aadd[2] i;
X 11 aadd[1] i;
X 12 aadd[0] i;
X 13 su_free_ o;
X 14 wr_su i;
X 15 wr_du i;
X 16 ssoid o;
X 17 sard o;
X 18 tstwb i;
X 19 badd[3] o;
X 20 badd[2] o;
X 21 badd[1] o;
X 22 badd[0] o;
X 23 su_send o;
X 24 rd_su i;
X 25 sbrd o;
X 26 swrb o;
```

X 27 clk i;
X 28 rx_ck i;
X 29 clk_ i;
X 30 smclk i;
X 31 smclk_ i;
X 32 ststu o;
X 33 samp o;
X 34 sinit o;
X 35 supd o;
X 36 srdacc o;
X 37 sid[3] o;
X 38 sid[2] o;
X 39 sid[1] o;
X 40 sid[0] o;
X 41 sazero i;
X 42 sa_rec1 o;
X 43 sa_rec3 o;
X 44 sa_rec4 o;
X 45 sa_rec5 o;
X 46 sa_rec6 o;
X 47 sa_rec7 o;
X 48 sa_rec8 o;
X 49 sa_rec9 o;
X 50 sa_reca o;
X 51 sa_recb o;
X 52 sen o;
X 53 shltd_ o;
X 54 clk_dis i;
G 55 VDD;
G 56 VSS;
N 57 spcnt[0];
N 58 sbaddrg[0];
N 59 sbaddrg[1];
N 60 sbaddrg[2];
N 61 sbaddrg[3];
N 62 sbaddrg_n[1];
N 63 sscnt_n[0];
N 64 sscnt_n[1];
N 65 sen_ff_qn;
N 66 i_784_zn;
N 67 i_783_z;
N 68 i_780_zn;
N 69 i_781_z;
N 70 sb_send_ff_qn;
N 71 i_782_z;
N 72 stt15_ff_qn;
N 73 stt15d;
N 74 stt4;

N 75 stt2_ff_qn;
N 76 i_792_z;
N 77 i_787_zn;
N 78 stt3_ff_qn;
N 79 shltdt_n;
N 80 stt4_ff_qn;
N 81 i_788_zn;
N 82 stt1d;
N 83 stt15;
N 84 i_790_zn;
N 85 stt1_ff_qn;
N 86 stt0_ff_qn;
N 87 i_791_z;
N 88 spcnt_dnp_ff_qn;
N 89 sscnt_ff_b1_qn;
N 90 sscnt_ff_b0_qn;
N 91 i_793_zn;
N 92 stt4d;
N 93 swrbx_;
N 94 i_796_z;
N 95 i_798_zn;
N 96 i_797_z;
N 97 i_799_z;
N 98 stt3;
N 99 i_801_zn;
N 100 sbaddrg_ff_b1_qn;
N 101 i_805_z;
N 102 stt2d;
N 103 i_808_z;
N 104 i_811_zn;
N 105 i_810_z;
N 106 i_813_zn;
N 107 stt0;
N 108 stt1;
N 109 i_817_z;
N 110 i_816_zn;
N 111 i_818_zn;
N 112 i_819_zn;
N 113 i_825_zn;
N 114 i_824_z;
N 115 i_823_zn;
N 116 i_821_z;
N 117 sa_rec0_n;
N 118 sa_rec0;
N 119 i_826_zn;
N 120 i_827_zn;
N 121 i_829_zn;
N 122 sdis;

N 123 shltdt;
N 124 swrbd_;
N 125 shltdr_ff_qn;
N 126 i_830_zn;
N 127 i_831_z;
N 128 sa_rec0_ff_qn;
N 129 i_832_zn;
N 130 i_836_zn;
N 131 i_834_zn;
N 132 su_send__n;
N 133 i_835_z;
N 134 su_send_;
N 135 i_839_zn;
N 136 i_838_z;
N 137 ssoid_n;
N 138 ssoid_ff_qn;
N 139 i_845_z;
N 140 i_842_zn;
N 141 i_841_z;
N 142 sampd;
N 143 i_843_z;
N 144 i_844_zn;
N 145 sallzero_ff_qn;
N 146 smodd;
N 147 spcnt_ff_b0_qn;
N 148 i_847_z;
N 149 sa_rec1_n;
N 150 i_848_zn;
N 151 i_850_zn;
N 152 sa_rec3_n;
N 153 i_852_zn;
N 154 sa_rec4_n;
N 155 i_853_zn;
N 156 sa_rec5_n;
N 157 i_856_z;
N 158 sa_rec6_n;
N 159 i_857_zn;
N 160 sa_rec7_n;
N 161 i_860_z;
N 162 sa_rec8_n;
N 163 i_861_zn;
N 164 sa_rec9_n;
N 165 i_864_z;
N 166 sa_reca_n;
N 167 sa_recb_n;
N 168 i_868_z;
N 169 sdisd;
N 170 sen_n;

N 171 i_870_zn;
N 172 i_869_z;
N 173 sbs;
N 174 sas_ff_qn;
N 175 sb_send_n;
N 176 i_873_zn;
N 177 i_875_z;
N 178 i_879_z;
N 179 spcnt_ff_b1_qn;
N 180 sallzero;
N 181 sbaddrg_ff_b3_qn;
N 182 sbaddrg_ff_b2_qn;
N 183 sbaddrg_ff_b0_qn;
N 184 shltdr_ff_q;
N 185 stt2;
N 186 smodd_ff_qn;
N 187 sb_send_ff_q;
N 188 sas;
N 189 sbs_ff_qn;
N 190 sdisd_ff_qn;
N 191 samp_ff_qn;
N 192 supd_ff_qn;
N 193 sa_rec1_ff_qn;
N 194 sa_rec3_ff_qn;
N 195 sa_rec4_ff_qn;
N 196 sa_rec5_ff_qn;
N 197 sa_rec6_ff_qn;
N 198 sa_rec7_ff_qn;
N 199 sa_rec8_ff_qn;
N 200 sa_rec9_ff_qn;
N 201 sa_reca_ff_qn;
N 202 sa_recb_ff_qn;
N 203 shltd_ff_qn;
N 57 spcnt_ff_b0_Q[0];
N 58 sbaddrg_ff_b0_Q[0];
N 59 sbaddrg_ff_b1_Q[0];
N 60 sbaddrg_ff_b2_Q[0];
N 61 sbaddrg_ff_b3_Q[0];
N 62 i_800_ZN[0];
N 63 i_806_Z[0];
N 64 i_807_Z[0];
N 65 sen_ff_QN_1[0];
N 66 i_784_ZN_1[0];
N 67 i_783_Z_1[0];
N 68 i_780_ZN_1[0];
N 69 i_781_Z_1[0];
N 70 sb_send_ff_QN_1[0];
N 71 i_782_Z_1[0];

N 72 stt15_ff_QN_1[0];
N 73 i_785_Z[0];
N 74 stt4_ff_Q[0];
N 75 stt2_ff_QN_1[0];
N 76 i_792_Z_1[0];
N 77 i_787_ZN_1[0];
N 78 stt3_ff_QN_1[0];
N 79 i_786_ZN[0];
N 80 stt4_ff_QN_1[0];
N 81 i_788_ZN_1[0];
N 82 i_789_ZN[0];
N 83 stt15_ff_Q[0];
N 84 i_790_ZN_1[0];
N 85 stt1_ff_QN_1[0];
N 86 stt0_ff_QN_1[0];
N 87 i_791_Z_1[0];
N 88 spcnt_dnp_ff_QN_1[0];
N 89 sscnt_ff_b1_QN_1[0];
N 90 sscnt_ff_b0_QN_1[0];
N 91 i_793_ZN_1[0];
N 92 i_794_ZN[0];
N 93 swrbx__ff_Q[0];
N 94 i_796_Z_1[0];
N 95 i_798_ZN_1[0];
N 96 i_797_Z_1[0];
N 97 i_799_Z_1[0];
N 98 stt3_ff_Q[0];
N 99 i_801_ZN_1[0];
N 100 sbaddrg_ff_b1_QN_1[0];
N 101 i_805_Z_1[0];
N 102 i_804_ZN[0];
N 103 i_808_Z_1[0];
N 104 i_811_ZN_1[0];
N 105 i_810_Z_1[0];
N 106 i_813_ZN_1[0];
N 107 stt0_ff_Q[0];
N 108 stt1_ff_Q[0];
N 109 i_817_Z_1[0];
N 110 i_816_ZN_1[0];
N 111 i_818_ZN_1[0];
N 112 i_819_ZN_1[0];
N 113 i_825_ZN_1[0];
N 114 i_824_Z_1[0];
N 115 i_823_ZN_1[0];
N 116 i_821_Z_1[0];
N 117 i_820_ZN[0];
N 118 sa_rec0_ff_Q[0];
N 119 i_826_ZN_1[0];

N 120 i_827_ZN_1[0];
N 121 i_829_ZN_1[0];
N 122 i_828_ZN[0];
N 123 shltdt_ff_Q[0];
N 124 shltdt_ff_QN[0];
N 125 shltdr_ff_QN_1[0];
N 126 i_830_ZN_1[0];
N 127 i_831_Z_1[0];
N 128 sa_rec0_ff_QN_1[0];
N 129 i_832_ZN_1[0];
N 130 i_836_ZN_1[0];
N 131 i_834_ZN_1[0];
N 132 i_833_ZN[0];
N 133 i_835_Z_1[0];
N 134 su_send__ff_Q[0];
N 135 i_839_ZN_1[0];
N 136 i_838_Z_1[0];
N 137 i_837_ZN[0];
N 138 ssoid_ff_QN_1[0];
N 139 i_845_Z_1[0];
N 140 i_842_ZN_1[0];
N 141 i_841_Z_1[0];
N 142 i_840_ZN[0];
N 143 i_843_Z_1[0];
N 144 i_844_ZN_1[0];
N 145 sallzero_ff_QN_1[0];
N 146 smodd_ff_Q[0];
N 147 spcnt_ff_b0_QN_1[0];
N 148 i_847_Z_1[0];
N 149 i_846_ZN[0];
N 150 i_848_ZN_1[0];
N 151 i_850_ZN_1[0];
N 152 i_849_ZN[0];
N 153 i_852_ZN_1[0];
N 154 i_851_ZN[0];
N 155 i_853_ZN_1[0];
N 156 i_854_ZN[0];
N 157 i_856_Z_1[0];
N 158 i_855_ZN[0];
N 159 i_857_ZN_1[0];
N 160 i_858_ZN[0];
N 161 i_860_Z_1[0];
N 162 i_859_ZN[0];
N 163 i_861_ZN_1[0];
N 164 i_862_ZN[0];
N 165 i_864_Z_1[0];
N 166 i_863_ZN[0];
N 167 i_865_ZN[0];

N 168 i_868_Z_1[0];
N 169 sdisd_ff_Q[0];
N 170 i_867_ZN[0];
N 171 i_870_ZN_1[0];
N 172 i_869_Z_1[0];
N 173 sbs_ff_Q[0];
N 174 sas_ff_QN_1[0];
N 175 i_871_Z[0];
N 176 i_873_ZN_1[0];
N 177 i_875_Z_1[0];
N 178 i_879_Z_1[0];
N 179 spcnt_ff_b1_QN_1[0];
N 180 sallzero_ff_Q[0];
N 181 sbaddrg_ff_b3_QN_1[0];
N 182 sbaddrg_ff_b2_QN_1[0];
N 183 sbaddrg_ff_b0_QN_1[0];
N 184 shltdr_ff_Q_1[0];
N 185 stt2_ff_Q[0];
N 186 smodd_ff_QN_1[0];
N 187 sb_send_ff_Q_1[0];
N 188 sas_ff_Q[0];
N 189 sbs_ff_QN_1[0];
N 190 sdisd_ff_QN_1[0];
N 191 samp_ff_QN_1[0];
N 192 supd_ff_QN_1[0];
N 193 sa_rec1_ff_QN_1[0];
N 194 sa_rec3_ff_QN_1[0];
N 195 sa_rec4_ff_QN_1[0];
N 196 sa_rec5_ff_QN_1[0];
N 197 sa_rec6_ff_QN_1[0];
N 198 sa_rec7_ff_QN_1[0];
N 199 sa_rec8_ff_QN_1[0];
N 200 sa_rec9_ff_QN_1[0];
N 201 sa_reca_ff_QN_1[0];
N 202 sa_recb_ff_QN_1[0];
N 203 shltd__ff_QN[0];
N 34 sinit_buf_ZN[0];
N 7 i_779_ZN[0];
N 19 u178_Z[0];
N 23 su_send__ff_QN[0];
N 16 ssoid_ff_Q[0];
N 33 samp_ff_Q[0];
N 35 supd_ff_Q[0];
N 42 sa_rec1_ff_Q[0];
N 43 sa_rec3_ff_Q[0];
N 44 sa_rec4_ff_Q[0];
N 45 sa_rec5_ff_Q[0];
N 46 sa_rec6_ff_Q[0];

```
N 47 sa_rec7_ff_Q[0];
N 48 sa_rec8_ff_Q[0];
N 49 sa_rec9_ff_Q[0];
N 38 sscnt_ff_b0_Q[0];
N 37 sscnt_ff_b1_Q[0];
N 36 i_812_Z[0];
N 50 sa_reca_ff_Q[0];
N 51 sa_recb_ff_Q[0];
N 26 swrbx__ff_QN[0];
N 17 i_872_ZN[0];
N 52 sen_ff_Q[0];
N 13 i_822_Z[0];
N 25 i_874_ZN[0];
N 32 i_876_Z[0];
N 53 shltd__ff_Q[0];
N 40 spcnt_ff_b1_Q[0];
N 39 spcnt_dnp_ff_Q[0];
N 22 u175_Z[0];
N 21 u176_Z[0];
N 20 u177_Z[0];
V aadd 3 0 ¦ 9 10 11 12;
V badd 3 0 ¦ 19 20 21 22;
V sid 3 0 ¦ 37 38 39 40;
V spcnt 0 0 ¦ 57;
V sbaddrg 3 0 ¦ 61 60 59 58;
V sbaddrg_n 1 1 ¦ 62;
V sscnt_n 1 0 ¦ 64 63;
V sinit_buf_ZN 0 0 ¦ 34;
V i_779_ZN 0 0 ¦ 7;
V i_780_ZN_1 0 0 ¦ 68;
V i_781_Z_1 0 0 ¦ 69;
V i_782_Z_1 0 0 ¦ 71;
V i_783_Z_1 0 0 ¦ 67;
V i_784_ZN_1 0 0 ¦ 66;
V i_785_Z 0 0 ¦ 73;
V i_786_ZN 0 0 ¦ 79;
V i_787_ZN_1 0 0 ¦ 77;
V i_788_ZN_1 0 0 ¦ 81;
V i_789_ZN 0 0 ¦ 82;
V i_790_ZN_1 0 0 ¦ 84;
V i_791_Z_1 0 0 ¦ 87;
V i_792_Z_1 0 0 ¦ 76;
V i_793_ZN_1 0 0 ¦ 91;
V i_794_ZN 0 0 ¦ 92;
V i_796_Z_1 0 0 ¦ 94;
V i_797_Z_1 0 0 ¦ 96;
V i_798_ZN_1 0 0 ¦ 95;
V i_799_Z_1 0 0 ¦ 97;
```

```
V i_800_ZN 0 0 ¦ 62;
V i_801_ZN_1 0 0 ¦ 99;
V i_804_ZN 0 0 ¦ 102;
V i_805_Z_1 0 0 ¦ 101;
V i_806_Z 0 0 ¦ 63;
V i_807_Z 0 0 ¦ 64;
V i_808_Z_1 0 0 ¦ 103;
V i_810_Z_1 0 0 ¦ 105;
V i_811_ZN_1 0 0 ¦ 104;
V i_812_Z 0 0 ¦ 36;
V i_813_ZN_1 0 0 ¦ 106;
V i_816_ZN_1 0 0 ¦ 110;
V i_817_Z_1 0 0 ¦ 109;
V i_818_ZN_1 0 0 ¦ 111;
V i_819_ZN_1 0 0 ¦ 112;
V i_820_ZN 0 0 ¦ 117;
V i_821_Z_1 0 0 ¦ 116;
V i_822_Z 0 0 ¦ 13;
V i_823_ZN_1 0 0 ¦ 115;
V i_824_Z_1 0 0 ¦ 114;
V i_825_ZN_1 0 0 ¦ 113;
V i_826_ZN_1 0 0 ¦ 119;
V i_827_ZN_1 0 0 ¦ 120;
V i_828_ZN 0 0 ¦ 122;
V i_829_ZN_1 0 0 ¦ 121;
V i_830_ZN_1 0 0 ¦ 126;
V i_831_Z_1 0 0 ¦ 127;
V i_832_ZN_1 0 0 ¦ 129;
V i_833_ZN 0 0 ¦ 132;
V i_834_ZN_1 0 0 ¦ 131;
V i_835_Z_1 0 0 ¦ 133;
V i_836_ZN_1 0 0 ¦ 130;
V i_837_ZN 0 0 ¦ 137;
V i_838_Z_1 0 0 ¦ 136;
V i_839_ZN_1 0 0 ¦ 135;
V i_840_ZN 0 0 ¦ 142;
V i_841_Z_1 0 0 ¦ 141;
V i_842_ZN_1 0 0 ¦ 140;
V i_843_Z_1 0 0 ¦ 143;
V i_844_ZN_1 0 0 ¦ 144;
V i_845_Z_1 0 0 ¦ 139;
V i_846_ZN 0 0 ¦ 149;
V i_847_Z_1 0 0 ¦ 148;
V i_848_ZN_1 0 0 ¦ 150;
V i_849_ZN 0 0 ¦ 152;
V i_850_ZN_1 0 0 ¦ 151;
V i_851_ZN 0 0 ¦ 154;
V i_852_ZN_1 0 0 ¦ 153;
```

```
V i_853_ZN_1 0 0 ¦ 155;
V i_854_ZN 0 0 ¦ 156;
V i_855_ZN 0 0 ¦ 158;
V i_856_Z_1 0 0 ¦ 157;
V i_857_ZN_1 0 0 ¦ 159;
V i_858_ZN 0 0 ¦ 160;
V i_859_ZN 0 0 ¦ 162;
V i_860_Z_1 0 0 ¦ 161;
V i_861_ZN_1 0 0 ¦ 163;
V i_862_ZN 0 0 ¦ 164;
V i_863_ZN 0 0 ¦ 166;
V i_864_Z_1 0 0 ¦ 165;
V i_865_ZN 0 0 ¦ 167;
V i_867_ZN 0 0 ¦ 170;
V i_868_Z_1 0 0 ¦ 168;
V i_869_Z_1 0 0 ¦ 172;
V i_870_ZN_1 0 0 ¦ 171;
V i_871_Z 0 0 ¦ 175;
V i_872_ZN 0 0 ¦ 17;
V i_873_ZN_1 0 0 ¦ 176;
V i_874_ZN 0 0 ¦ 25;
V i_875_Z_1 0 0 ¦ 177;
V i_876_Z 0 0 ¦ 32;
V i_879_Z_1 0 0 ¦ 178;
V spcnt_ff_b0_Q 0 0 ¦ 57;
V spcnt_ff_b0_QN_1 0 0 ¦ 147;
V spcnt_ff_b1_Q 0 0 ¦ 40;
V spcnt_ff_b1_QN_1 0 0 ¦ 179;
V spcnt_dnp_ff_Q 0 0 ¦ 39;
V spcnt_dnp_ff_QN_1 0 0 ¦ 88;
V sallzero_ff_Q 0 0 ¦ 180;
V sallzero_ff_QN_1 0 0 ¦ 145;
V u175_Z 0 0 ¦ 22;
V u176_Z 0 0 ¦ 21;
V u177_Z 0 0 ¦ 20;
V u178_Z 0 0 ¦ 19;
V sbaddrg_ff_b3_Q 0 0 ¦ 61;
V sbaddrg_ff_b3_QN_1 0 0 ¦ 181;
V sbaddrg_ff_b2_Q 0 0 ¦ 60;
V sbaddrg_ff_b2_QN_1 0 0 ¦ 182;
V sbaddrg_ff_b0_Q 0 0 ¦ 58;
V sbaddrg_ff_b0_QN_1 0 0 ¦ 183;
V shltdt_ff_Q 0 0 ¦ 123;
V shltdt_ff_QN 0 0 ¦ 124;
V shltdr_ff_Q_1 0 0 ¦ 184;
V shltdr_ff_QN_1 0 0 ¦ 125;
V sbaddrg_ff_b1_Q 0 0 ¦ 59;
V sbaddrg_ff_b1_QN_1 0 0 ¦ 100;
```

```
V stt0_ff_Q 0 0 ¦ 107;
V stt0_ff_QN_1 0 0 ¦ 86;
V stt1_ff_Q 0 0 ¦ 108;
V stt1_ff_QN_1 0 0 ¦ 85;
V stt2_ff_Q 0 0 ¦ 185;
V stt2_ff_QN_1 0 0 ¦ 75;
V stt3_ff_Q 0 0 ¦ 98;
V stt3_ff_QN_1 0 0 ¦ 78;
V stt4_ff_Q 0 0 ¦ 74;
V stt4_ff_QN_1 0 0 ¦ 80;
V stt15_ff_Q 0 0 ¦ 83;
V stt15_ff_QN_1 0 0 ¦ 72;
V sscnt_ff_b0_Q 0 0 ¦ 38;
V sscnt_ff_b0_QN_1 0 0 ¦ 90;
V sscnt_ff_b1_Q 0 0 ¦ 37;
V sscnt_ff_b1_QN_1 0 0 ¦ 89;
V smodd_ff_Q 0 0 ¦ 146;
V smodd_ff_QN_1 0 0 ¦ 186;
V swrbx__ff_Q 0 0 ¦ 93;
V swrbx__ff_QN 0 0 ¦ 26;
V sb_send_ff_Q_1 0 0 ¦ 187;
V sb_send_ff_QN_1 0 0 ¦ 70;
V sa_rec0_ff_Q 0 0 ¦ 118;
V sa_rec0_ff_QN_1 0 0 ¦ 128;
V sas_ff_Q 0 0 ¦ 188;
V sas_ff_QN_1 0 0 ¦ 174;
V sbs_ff_Q 0 0 ¦ 173;
V sbs_ff_QN_1 0 0 ¦ 189;
V sdisd_ff_Q 0 0 ¦ 169;
V sdisd_ff_QN_1 0 0 ¦ 190;
V su_send__ff_Q 0 0 ¦ 134;
V su_send__ff_QN 0 0 ¦ 23;
V ssoid_ff_Q 0 0 ¦ 16;
V ssoid_ff_QN_1 0 0 ¦ 138;
V samp_ff_Q 0 0 ¦ 33;
V samp_ff_QN_1 0 0 ¦ 191;
V supd_ff_Q 0 0 ¦ 35;
V supd_ff_QN_1 0 0 ¦ 192;
V sa_rec1_ff_Q 0 0 ¦ 42;
V sa_rec1_ff_QN_1 0 0 ¦ 193;
V sa_rec3_ff_Q 0 0 ¦ 43;
V sa_rec3_ff_QN_1 0 0 ¦ 194;
V sa_rec4_ff_Q 0 0 ¦ 44;
V sa_rec4_ff_QN_1 0 0 ¦ 195;
V sa_rec5_ff_Q 0 0 ¦ 45;
V sa_rec5_ff_QN_1 0 0 ¦ 196;
V sa_rec6_ff_Q 0 0 ¦ 46;
V sa_rec6_ff_QN_1 0 0 ¦ 197;
```

V sa_rec7_ff_Q 0 0 ¦ 47;
V sa_rec7_ff_QN_1 0 0 ¦ 198;
V sa_rec8_ff_Q 0 0 ¦ 48;
V sa_rec8_ff_QN_1 0 0 ¦ 199;
V sa_rec9_ff_Q 0 0 ¦ 49;
V sa_rec9_ff_QN_1 0 0 ¦ 200;
V sa_reca_ff_Q 0 0 ¦ 50;
V sa_reca_ff_QN_1 0 0 ¦ 201;
V sa_recb_ff_Q 0 0 ¦ 51;
V sa_recb_ff_QN_1 0 0 ¦ 202;
V sen_ff_Q 0 0 ¦ 52;
V sen_ff_QN_1 0 0 ¦ 65;
V shltd__ff_Q 0 0 ¦ 53;
V shltd__ff_QN 0 0 ¦ 203;
M MDE in01d5 vsc653 ¦ I ZN ¦ ;
M MDE ao04d1 vsc653 ¦ A1 A2 B ZN ¦ ;
M MDE in01d1 vsc653 ¦ I ZN ¦ ;
M MDE or02d1 vsc653 ¦ A1 A2 Z ¦ ;
M MDE ni01d1 vsc653 ¦ I Z ¦ ;
M MDE an02d1 vsc653 ¦ A1 A2 Z ¦ ;
M MDE nd04d1 vsc653 ¦ A1 A3 A4 A2 ZN ¦ ;
M MDE nr02d1 vsc653 ¦ A1 A2 ZN ¦ ;
M MDE oa04d1 vsc653 ¦ A1 A2 B ZN ¦ ;
M MDE oa07d1 vsc653 ¦ A1 A2 A3 B1 B2 ZN ¦ ;
M MDE xo02d1 vsc653 ¦ A1 A2 Z ¦ ;
M MDE ni01d3 vsc653 ¦ I Z ¦ ;
M MDE ni01d2 vsc653 ¦ I Z ¦ ;
M MDE in01d2 vsc653 ¦ I ZN ¦ ;
M MDE fn04d1 vsc653 ¦ A1 A2 B1 B2 ZN ¦ ;
M MDE an02d2 vsc653 ¦ A1 A2 Z ¦ ;
M MDE fn01d2 vsc653 ¦ A1 B1 ZN ¦ ;
M MDE ao03d1 vsc653 ¦ A1 A2 B1 B2 C ZN ¦ ;
M MDE oa01d1 vsc653 ¦ A1 A2 B1 B2 ZN ¦ ;
M MDE fn03d1 vsc653 ¦ A1 A2 B1 B2 ZN ¦ ;
M MDE ao01d1 vsc653 ¦ A1 A2 B1 B2 ZN ¦ ;
M MDE an03d1 vsc653 ¦ A1 A2 A3 Z ¦ ;
M MDE nd02d1 vsc653 ¦ A1 A2 ZN ¦ ;
M MDE or02d2 vsc653 ¦ A1 A2 Z ¦ ;
M MDE fn01d1 vsc653 ¦ A1 B1 ZN ¦ ;
M MDE mx21d1 vsc653 ¦ I0 I1 S Z ¦ ;
M MDE fn05d1 vsc653 ¦ A1 B1 ZN ¦ ;
M MDE an05d1 vsc653 ¦ A1 A2 A3 A4 A5 Z ¦ ;
M MDE ni01d4 vsc653 ¦ I Z ¦ ;
M MDE mfptnh vsc653 ¦ DA DB SA CP SDN Q QN ¦ ;
M MDE mfctnh vsc653 ¦ DA DB SA CP CDN Q QN ¦ ;
M MDE nt02d3 vsc653 ¦ I Z OEN ¦ ;
M MDE mfntnb vsc653 ¦ DA DB SA CP Q QN ¦ ;
M MDE dfctnb vsc653 ¦ D CP CDN Q QN ¦ ;

```
M MDE dfntnb vsc653 ¦ D CP Q QN ¦ ;
M MDE dfptnb vsc653 ¦ D CP SDN Q QN ¦ ;
M MDE dfntnh vsc653 ¦ D CP Q QN ¦ ;
I MDE in01d5 vsc653 * 1 sinit_buf ¦ 65 34;
I MDE ao04d1 vsc653 * 2 i_779 ¦ 66 67 68 7;
I MDE in01d1 vsc653 * 3 i_780 ¦ 69 68;
I MDE or02d1 vsc653 * 4 i_781 ¦ 70 71 69;
I MDE ni01d1 vsc653 * 5 i_782 ¦ 24 71;
I MDE or02d1 vsc653 * 6 i_783 ¦ 52 72 67;
I MDE in01d1 vsc653 * 7 i_784 ¦ 73 66;
I MDE an02d1 vsc653 * 8 i_785 ¦ 74 39 73;
I MDE nd04d1 vsc653 * 9 i_786 ¦ 75 76 77 78 79;
I MDE nd04d1 vsc653 * 10 i_787 ¦ 3 80 81 5 77;
I MDE nr02d1 vsc653 * 11 i_788 ¦ 82 83 81;
I MDE oa04d1 vsc653 * 12 i_789 ¦ 84 85 86 82;
I MDE nr02d1 vsc653 * 13 i_790 ¦ 87 88 84;
I MDE or02d1 vsc653 * 14 i_791 ¦ 89 90 87;
I MDE or02d1 vsc653 * 15 i_792 ¦ 80 39 76;
I MDE in01d1 vsc653 * 16 i_793 ¦ 81 91;
I MDE oa04d1 vsc653 * 17 i_794 ¦ 39 80 78 92;
I MDE or02d1 vsc653 * 18 i_796 ¦ 93 68 94;
I MDE or02d1 vsc653 * 19 i_797 ¦ 40 95 96;
I MDE in01d1 vsc653 * 20 i_798 ¦ 97 95;
I MDE or02d1 vsc653 * 21 i_799 ¦ 74 98 97;
I MDE oa07d1 vsc653 * 22 i_800 ¦ 88 95 94 99 100 62;
I MDE in01d1 vsc653 * 23 i_801 ¦ 94 99;
I MDE nr02d1 vsc653 * 24 i_804 ¦ 101 87 102;
I MDE or02d1 vsc653 * 25 i_805 ¦ 85 88 101;
I MDE xo02d1 vsc653 * 26 i_806 ¦ 101 90 63;
I MDE xo02d1 vsc653 * 27 i_807 ¦ 103 89 64;
I MDE or02d1 vsc653 * 28 i_808 ¦ 90 101 103;
I MDE or02d1 vsc653 * 29 i_810 ¦ 97 104 105;
I MDE in01d1 vsc653 * 30 i_811 ¦ 36 104;
I MDE ni01d3 vsc653 * 31 i_812 ¦ 106 36;
I MDE nr02d1 vsc653 * 32 i_813 ¦ 107 108 106;
I MDE in01d5 vsc653 * 33 i_816 ¦ 109 110;
I MDE ni01d2 vsc653 * 34 i_817 ¦ 111 109;
I MDE in01d1 vsc653 * 35 i_818 ¦ 2 111;
I MDE in01d2 vsc653 * 36 i_819 ¦ 109 112;
I MDE fn04d1 vsc653 * 37 i_820 ¦ 113 114 115 116 117;
I MDE an02d1 vsc653 * 38 i_821 ¦ 13 110 116;
I MDE an02d2 vsc653 * 39 i_822 ¦ 118 106 13;
I MDE in01d1 vsc653 * 40 i_823 ¦ 14 115;
I MDE or02d1 vsc653 * 41 i_824 ¦ 11 12 114;
I MDE fn01d2 vsc653 * 42 i_825 ¦ 10 119 113;
I MDE nr02d1 vsc653 * 43 i_826 ¦ 120 9 119;
I MDE fn01d2 vsc653 * 44 i_827 ¦ 111 14 120;
I MDE nr02d1 vsc653 * 45 i_828 ¦ 121 66 122;
```

I MDE ao03d1 vsc653 * 46 i_829 ¦ 69 123 124 125 126 121;
I MDE in01d1 vsc653 * 47 i_830 ¦ 127 126;
I MDE or02d1 vsc653 * 48 i_831 ¦ 128 125 127;
I MDE in01d1 vsc653 * 49 i_832 ¦ 121 129;
I MDE oa01d1 vsc653 * 50 i_833 ¦ 130 69 123 131 132;
I MDE in01d1 vsc653 * 51 i_834 ¦ 133 131;
I MDE or02d1 vsc653 * 52 i_835 ¦ 71 134 133;
I MDE ao04d1 vsc653 * 53 i_836 ¦ 133 127 134 130;
I MDE nr02d1 vsc653 * 54 i_837 ¦ 135 136 137;
I MDE ni01d1 vsc653 * 55 i_838 ¦ 111 136;
I MDE fn03d1 vsc653 * 56 i_839 ¦ 35 138 138 15 135;
I MDE ao01d1 vsc653 * 57 i_840 ¦ 139 140 85 141 142;
I MDE or02d1 vsc653 * 58 i_841 ¦ 128 86 141;
I MDE oa04d1 vsc653 * 59 i_842 ¦ 143 57 6 140;
I MDE an03d1 vsc653 * 60 i_843 ¦ 144 145 146 143;
I MDE in01d1 vsc653 * 61 i_844 ¦ 4 144;
I MDE or02d1 vsc653 * 62 i_845 ¦ 147 38 139;
I MDE nr02d1 vsc653 * 63 i_846 ¦ 113 148 149;
I MDE or02d1 vsc653 * 64 i_847 ¦ 11 150 148;
I MDE in01d1 vsc653 * 65 i_848 ¦ 12 150;
I MDE nr02d1 vsc653 * 66 i_849 ¦ 113 151 152;
I MDE nd02d1 vsc653 * 67 i_850 ¦ 12 11 151;
I MDE nr02d1 vsc653 * 68 i_851 ¦ 153 114 154;
I MDE fn01d2 vsc653 * 69 i_852 ¦ 155 119 153;
I MDE in01d1 vsc653 * 70 i_853 ¦ 10 155;
I MDE nr02d1 vsc653 * 71 i_854 ¦ 153 148 156;
I MDE nr02d1 vsc653 * 72 i_855 ¦ 153 157 158;
I MDE or02d1 vsc653 * 73 i_856 ¦ 12 159 157;
I MDE in01d1 vsc653 * 74 i_857 ¦ 11 159;
I MDE nr02d1 vsc653 * 75 i_858 ¦ 153 151 160;
I MDE nr02d1 vsc653 * 76 i_859 ¦ 161 114 162;
I MDE or02d2 vsc653 * 77 i_860 ¦ 163 120 161;
I MDE fn01d1 vsc653 * 78 i_861 ¦ 10 9 163;
I MDE nr02d1 vsc653 * 79 i_862 ¦ 161 148 164;
I MDE nr02d1 vsc653 * 80 i_863 ¦ 161 165 166;
I MDE or02d1 vsc653 * 81 i_864 ¦ 12 159 165;
I MDE nr02d1 vsc653 * 82 i_865 ¦ 161 151 167;
I MDE nr02d1 vsc653 * 83 i_867 ¦ 168 169 170;
I MDE mx21d1 vsc653 * 84 i_868 ¦ 171 65 172 168;
I MDE or02d1 vsc653 * 85 i_869 ¦ 173 174 172;
I MDE fn05d1 vsc653 * 86 i_870 ¦ 54 5 171;
I MDE or02d1 vsc653 * 87 i_871 ¦ 26 68 175;
I MDE nr02d1 vsc653 * 88 i_872 ¦ 138 8 17;
I MDE fn01d2 vsc653 * 89 i_873 ¦ 18 24 176;
I MDE nr02d1 vsc653 * 90 i_874 ¦ 177 70 25;
I MDE ni01d1 vsc653 * 91 i_875 ¦ 176 177;
I MDE an05d1 vsc653 * 92 i_876 ¦ 5 75 3 72 95 32;
I MDE ni01d4 vsc653 * 93 i_879 ¦ 1 178;

I MDE mfptnh vsc653 * 94 spcnt_ff_b0 ¦ 39 57 105 30 110 57 147;
I MDE mfctnh vsc653 * 95 spcnt_ff_b1 ¦ 57 40 105 30 110 40 179;
I MDE mfctnh vsc653 * 96 spcnt_dnp_ff ¦ 40 39 105 30 110 39 88;
I MDE mfctnh vsc653 * 97 sallzero_ff ¦ 41 180 98 31 110 180 145;
I MDE nt02d3 vsc653 * 98 u175 ¦ 58 22 176;
I MDE nt02d3 vsc653 * 99 u176 ¦ 59 21 176;
I MDE nt02d3 vsc653 * 100 u177 ¦ 60 20 176;
I MDE nt02d3 vsc653 * 101 u178 ¦ 61 19 176;
I MDE mfntnb vsc653 * 102 sbaddrg_ff_b3 ¦ 61 97 94 27 61 181;
I MDE mfntnb vsc653 * 103 sbaddrg_ff_b2 ¦ 60 95 94 27 60 182;
I MDE mfntnb vsc653 * 104 sbaddrg_ff_b0 ¦ 58 96 94 27 58 183;
I MDE dfctnb vsc653 * 105 shltdt_ff ¦ 79 30 110 123 124;
I MDE dfctnb vsc653 * 106 shltdr_ff ¦ 91 30 110 184 125;
I MDE dfntnb vsc653 * 107 sbaddrg_ff_b1 ¦ 62 27 59 100;
I MDE dfctnb vsc653 * 108 stt0_ff ¦ 83 30 2 107 86;
I MDE dfctnb vsc653 * 109 stt1_ff ¦ 82 30 2 108 85;
I MDE dfctnb vsc653 * 110 stt2_ff ¦ 102 30 110 185 75;
I MDE dfctnb vsc653 * 111 stt3_ff ¦ 185 30 110 98 78;
I MDE dfctnb vsc653 * 112 stt4_ff ¦ 92 30 110 74 80;
I MDE dfptnb vsc653 * 113 stt15_ff ¦ 73 30 110 83 72;
I MDE dfctnb vsc653 * 114 sscnt_ff_b0 ¦ 63 30 112 38 90;
I MDE dfctnb vsc653 * 115 sscnt_ff_b1 ¦ 64 30 112 37 89;
I MDE dfctnb vsc653 * 116 smodd_ff ¦ 6 28 178 146 186;
I MDE dfptnb vsc653 * 117 swrbx__ff ¦ 124 31 110 93 26;
I MDE dfctnb vsc653 * 118 sb_send_ff ¦ 175 27 178 187 70;
I MDE dfctnb vsc653 * 119 sa_rec0_ff ¦ 117 27 178 118 128;
I MDE dfntnb vsc653 * 120 sas_ff ¦ 28 27 188 174;
I MDE dfntnb vsc653 * 121 sbs_ff ¦ 188 27 173 189;
I MDE dfntnb vsc653 * 122 sdisd_ff ¦ 122 27 169 190;
I MDE dfptnb vsc653 * 123 su_send__ff ¦ 132 29 110 134 23;
I MDE dfctnb vsc653 * 124 ssoid_ff ¦ 137 27 178 16 138;
I MDE dfntnb vsc653 * 125 samp_ff ¦ 142 29 33 191;
I MDE dfctnb vsc653 * 126 supd_ff ¦ 185 31 110 35 192;
I MDE dfntnb vsc653 * 127 sa_rec1_ff ¦ 149 27 42 193;
I MDE dfntnb vsc653 * 128 sa_rec3_ff ¦ 152 27 43 194;
I MDE dfntnh vsc653 * 129 sa_rec4_ff ¦ 154 27 44 195;
I MDE dfntnb vsc653 * 130 sa_rec5_ff ¦ 156 27 45 196;
I MDE dfntnb vsc653 * 131 sa_rec6_ff ¦ 158 27 46 197;
I MDE dfntnb vsc653 * 132 sa_rec7_ff ¦ 160 27 47 198;
I MDE dfntnb vsc653 * 133 sa_rec8_ff ¦ 162 27 48 199;
I MDE dfntnb vsc653 * 134 sa_rec9_ff ¦ 164 27 49 200;
I MDE dfntnb vsc653 * 135 sa_reca_ff ¦ 166 27 50 201;
I MDE dfntnb vsc653 * 136 sa_recb_ff ¦ 167 27 51 202;
I MDE dfctnb vsc653 * 137 sen_ff ¦ 170 29 1 52 65;
I MDE dfntnb vsc653 * 138 shltd__ff ¦ 129 29 53 203;
E netlist B subcells
MDE in01d5 vsc653
MDE ao04d1 vsc653
MDE in01d1 vsc653
MDE or02d1 vsc653
MDE ni01d1 vsc653
MDE an02d1 vsc653
MDE nd04d1 vsc653
MDE nr02d1 vsc653
MDE oa04d1 vsc653
MDE oa07d1 vsc653
MDE xo02d1 vsc653
MDE ni01d3 vsc653
MDE ni01d2 vsc653
MDE in01d2 vsc653
MDE fn04d1 vsc653
MDE an02d2 vsc653
MDE fn01d2 vsc653
MDE ao03d1 vsc653
MDE oa01d1 vsc653
MDE fn03d1 vsc653
MDE ao01d1 vsc653
MDE an03d1 vsc653
MDE nd02d1 vsc653
MDE or02d2 vsc653
MDE fn01d1 vsc653
MDE mx21d1 vsc653
MDE fn05d1 vsc653
MDE an05d1 vsc653
MDE ni01d4 vsc653
MDE mfptnh vsc653
MDE mfctnh vsc653
MDE nt02d3 vsc653
MDE mfntnb vsc653
MDE dfctnb vsc653
MDE dfntnb vsc653
MDE dfptnb vsc653
MDE dfntnh vsc653
E subcells

SU_P NLS

#cell2 * su_p nls * 36 any 0 v8r4.6.2
"5-Oct-94 GMT" "12:58:37 GMT" "5-Oct-94 GMT" "12:58:37 GMT" amir * .
writer 1
file_version 1
sections 1
netlist 1: 79 su_p B contents: su_p
netlist 242
cells 7772
switches 0
attributes 0
physical 0
history 0
E contents B netlist
X 1 reset_ i;
X 2 tsinit i;
X 3 tsfrz i;
X 4 tstst i;
X 5 tsmod i;
X 6 stict o;
X 7 ttfrz i;
X 8 ttmod[4] i;
X 9 ttmod[3] i;
X 10 ttmod[2] i;
X 11 ttmod[1] i;
X 12 ttmod[0] i;
X 13 clk i;
X 14 rx_ck i;
X 15 wr_su i;
X 16 wr_du i;
X 17 aadd[3] i;
X 18 aadd[2] i;
X 19 aadd[1] i;
X 20 aadd[0] i;
X 21 rd_su i;
X 22 tstwb i;
X 23 tstwa i;
X 24 abus[15] o;
X 25 abus[14] o;
X 26 abus[13] o;

X 27 abus[12] o;
X 28 abus[11] o;
X 29 abus[10] o;
X 30 abus[9] o;
X 31 abus[8] o;
X 32 abus[7] o;
X 33 abus[6] o;
X 34 abus[5] o;
X 35 abus[4] o;
X 36 abus[3] o;
X 37 abus[2] o;
X 38 abus[1] o;
X 39 abus[0] o;
X 40 su_free_ o;
X 41 bbus[15] o;
X 42 bbus[14] o;
X 43 bbus[13] o;
X 44 bbus[12] o;
X 45 bbus[11] o;
X 46 bbus[10] o;
X 47 bbus[9] o;
X 48 bbus[8] o;
X 49 bbus[7] o;
X 50 bbus[6] o;
X 51 bbus[5] o;
X 52 bbus[4] o;
X 53 bbus[3] o;
X 54 bbus[2] o;
X 55 bbus[1] o;
X 56 bbus[0] o;
X 57 badd[3] o;
X 58 badd[2] o;
X 59 badd[1] o;
X 60 badd[0] o;
X 61 su_send o;
X 62 ssoid o;
X 63 quality o;
X 64 ta_ck o;
X 65 ta_data o;
X 66 ta_le_ o;
X 67 tflgof o;
X 68 tflguf o;
X 69 clk_dis i;
G 70 VDD;
G 71 VSS;
N 72 sid[0];
N 73 sid[1];
N 74 sid[2];

```
N 75 sid[3];
N 76 srst_n;
N 77 srst_ndp;
N 78 smclk;
N 79 smclk_;
N 80 smclkdp;
N 81 smclkdp_;
N 82 clk_;
N 83 sawr;
N 84 sen;
N 85 shltd_;
N 86 sa_rec1;
N 87 sa_rec3;
N 88 sa_rec4;
N 89 sa_rec5;
N 90 sa_rec6;
N 91 sa_rec7;
N 92 sa_rec8;
N 93 sa_rec9;
N 94 sa_reca;
N 95 sa_recb;
N 96 squt_we;
N 97 smod_we;
N 98 smod00_we;
N 99 smod01_we;
N 100 smod10_we;
N 101 smod11_we;
N 102 smod12_we;
N 103 smod13_we;
N 104 sinval_we;
N 105 sf_we;
N 106 supd;
N 107 sasoid;
N 108 sard;
N 109 samp;
N 110 sinit;
N 111 srdacc;
N 112 ststu;
N 113 swrb;
N 114 sbrd;
N 115 sazero;
N 116 i_14_z;
N 72 su_ctl_sid[0];
N 73 su_ctl_sid[1];
N 74 su_ctl_sid[2];
N 75 su_ctl_sid[3];
N 76 sugr_srst_n[0];
N 77 sugr_srst_ndp[0];
```

N 78 sugr_smclk[0];
N 79 sugr_smclk_[0];
N 80 sugr_smclkdp[0];
N 81 sugr_smclkdp_[0];
N 82 sugr_clk_[0];
N 83 sugr_sawr[0];
N 84 su_ctl_sen[0];
N 85 su_ctl_shltd_[0];
N 86 su_ctl_sa_rec1[0];
N 87 su_ctl_sa_rec3[0];
N 88 su_ctl_sa_rec4[0];
N 89 su_ctl_sa_rec5[0];
N 90 su_ctl_sa_rec6[0];
N 91 su_ctl_sa_rec7[0];
N 92 su_ctl_sa_rec8[0];
N 93 su_ctl_sa_rec9[0];
N 94 su_ctl_sa_reca[0];
N 95 su_ctl_sa_recb[0];
N 96 sugr_squt_we[0];
N 97 sugr_smod_we[0];
N 98 sugr_smod00_we[0];
N 99 sugr_smod01_we[0];
N 100 sugr_smod10_we[0];
N 101 sugr_smod11_we[0];
N 102 sugr_smod12_we[0];
N 103 sugr_smod13_we[0];
N 104 sugr_sinval_we[0];
N 105 sugr_sf_we[0];
N 106 su_ctl_supd[0];
N 107 sugr_sasoid[0];
N 108 su_ctl_sard[0];
N 109 su_ctl_samp[0];
N 110 su_ctl_sinit[0];
N 111 su_ctl_srdacc[0];
N 112 su_ctl_ststu[0];
N 113 su_ctl_swrb[0];
N 114 su_ctl_sbrd[0];
N 115 smm_azero[0];
N 116 i_14_Z_1[0];
N 39 smm_abus[0];
N 38 smm_abus[1];
N 37 smm_abus[2];
N 36 smm_abus[3];
N 35 smm_abus[4];
N 34 smm_abus[5];
N 33 smm_abus[6];
N 32 smm_abus[7];
N 31 smm_abus[8];

```
N 30 smm_abus[9];
N 29 smm_abus[10];
N 28 smm_abus[11];
N 27 smm_abus[12];
N 26 smm_abus[13];
N 25 smm_abus[14];
N 24 smm_abus[15];
N 56 smm_bbus[0];
N 55 smm_bbus[1];
N 54 smm_bbus[2];
N 53 smm_bbus[3];
N 52 smm_bbus[4];
N 51 smm_bbus[5];
N 50 smm_bbus[6];
N 49 smm_bbus[7];
N 48 smm_bbus[8];
N 47 smm_bbus[9];
N 46 smm_bbus[10];
N 45 smm_bbus[11];
N 44 smm_bbus[12];
N 43 smm_bbus[13];
N 42 smm_bbus[14];
N 41 smm_bbus[15];
N 63 smm_quality[0];
N 64 smm_ta_ck[0];
N 65 smm_ta_data[0];
N 66 smm_ta_le_[0];
N 67 smm_tflgof[0];
N 68 smm_tflguf[0];
N 6 su_ctl_stict[0];
N 40 su_ctl_su_free_[0];
N 62 su_ctl_ssoid[0];
N 60 su_ctl_badd[0];
N 59 su_ctl_badd[1];
N 58 su_ctl_badd[2];
N 57 su_ctl_badd[3];
N 61 su_ctl_su_send[0];
V ttmod 4 0 ¦ 8 9 10 11 12;
V aadd 3 0 ¦ 17 18 19 20;
V abus 15 0 ¦ 24 25 26 27 28 29 30 31 32 33 34 35 36 37 38 39;
V bbus 15 0 ¦ 41 42 43 44 45 46 47 48 49 50 51 52 53 54 55 56;
V badd 3 0 ¦ 57 58 59 60;
V sid 3 0 ¦ 75 74 73 72;
V sugr_srst_n 0 0 ¦ 76;
V sugr_srst_ndp 0 0 ¦ 77;
V sugr_smclk 0 0 ¦ 78;
V sugr_smclk_ 0 0 ¦ 79;
V sugr_smclkdp 0 0 ¦ 80;
```

V sugr_smclkdp_ 0 0 ¦ 81;
V sugr_clk_ 0 0 ¦ 82;
V sugr_sawr 0 0 ¦ 83;
V sugr_squt_we 0 0 ¦ 96;
V sugr_smod_we 0 0 ¦ 97;
V sugr_smod00_we 0 0 ¦ 98;
V sugr_smod01_we 0 0 ¦ 99;
V sugr_smod10_we 0 0 ¦ 100;
V sugr_smod11_we 0 0 ¦ 101;
V sugr_smod12_we 0 0 ¦ 102;
V sugr_smod13_we 0 0 ¦ 103;
V sugr_sinval_we 0 0 ¦ 104;
V sugr_sf_we 0 0 ¦ 105;
V sugr_sasoid 0 0 ¦ 107;
V smm_abus 15 0 ¦ 24 25 26 27 28 29 30 31 32 33 34 35 36 37 38 39;
V smm_bbus 15 0 ¦ 41 42 43 44 45 46 47 48 49 50 51 52 53 54 55 56;
V smm_azero 0 0 ¦ 115;
V smm_quality 0 0 ¦ 63;
V smm_ta_ck 0 0 ¦ 64;
V smm_ta_data 0 0 ¦ 65;
V smm_ta_le_ 0 0 ¦ 66;
V smm_tflgof 0 0 ¦ 67;
V smm_tflguf 0 0 ¦ 68;
V su_ctl_stict 0 0 ¦ 6;
V su_ctl_su_free_ 0 0 ¦ 40;
V su_ctl_ssoid 0 0 ¦ 62;
V su_ctl_sard 0 0 ¦ 108;
V su_ctl_badd 3 0 ¦ 57 58 59 60;
V su_ctl_su_send 0 0 ¦ 61;
V su_ctl_sbrd 0 0 ¦ 114;
V su_ctl_swrb 0 0 ¦ 113;
V su_ctl_ststu 0 0 ¦ 112;
V su_ctl_samp 0 0 ¦ 109;
V su_ctl_sinit 0 0 ¦ 110;
V su_ctl_supd 0 0 ¦ 106;
V su_ctl_srdacc 0 0 ¦ 111;
V su_ctl_sid 3 0 ¦ 75 74 73 72;
V su_ctl_sa_rec1 0 0 ¦ 86;
V su_ctl_sa_rec3 0 0 ¦ 87;
V su_ctl_sa_rec4 0 0 ¦ 88;
V su_ctl_sa_rec5 0 0 ¦ 89;
V su_ctl_sa_rec6 0 0 ¦ 90;
V su_ctl_sa_rec7 0 0 ¦ 91;
V su_ctl_sa_rec8 0 0 ¦ 92;
V su_ctl_sa_rec9 0 0 ¦ 93;
V su_ctl_sa_reca 0 0 ¦ 94;
V su_ctl_sa_recb 0 0 ¦ 95;
V su_ctl_sen 0 0 ¦ 84;

V su_ctl_shltd_ 0 0 ¦ 85;
V i_14_Z_1 0 0 ¦ 116;
M NLS sugr_p * ¦ srst_n srst_ndp smclk smclk_ smclkdp smclkdp_ clk_ sawr wr_su t-stst tsinit reset_ clk sen shltd_ sa_rec1 sa_rec3 sa_rec4 sa_rec5 sa_rec6 sa_rec-7 sa_rec8 sa_rec9 sa_reca sa_recb squt_we smod_we smod00_we smod01_we smod10_we -
smod11_we smod12_we smod13_we sinval_we sf_we supd sasoid ¦ ooooooooiiiiiiiiiii-iiiiioooooooooooio;
M NLS nmm_p * ¦ reset_ clk clk_ srst_n mclk mclk_ rx_ck abus[15] abus[14] abus[1-3] abus[12] abus[11] abus[10] abus[9] abus[8] abus[7] abus[6] abus[5] abus[4] ab-us[3] abus[2] abus[1] abus[0] awr asoid ard samp init id[3] id[2] id[1] id[0] up-d rdacc tstu mod_we qut_we wrb brd bbus[15] bbus[14] bbus[13] bbus[12] bbus[11] -bbus[10] bbus[9] bbus[8] bbus[7] bbus[6] bbus[5] bbus[4] bbus[3] bbus[2] bbus[1]-bbus[0] azero quality mod00_we mod01_we mod10_we mod11_we mod12_we mod13_we inv-
al_we f_we f_en ttfrz ttmod[4] ttmod[3] ttmod[2] ttmod[1] ttmod[0] ta_ck ta_data-ta_le_ tflgof tflguf ¦ iiiiiibbbbbbbbbbbbbbbbiiiiiiiiiiiiiiiooooooooooooooooo-oiiiiiiiiiiiiiiiooooo;
M NLS su_ctl_p * ¦ reset_ srst_n tsinit tsfrz tstst tsmod stict tstwa aadd[3] aa-dd[2] aadd[1] aadd[0] su_free_ wr_su wr_du ssoid sard tstwb badd[3] badd[2] badd-[1] badd[0] su_send rd_su sbrd swrb clk rx_ck clk_ smclk smclk_ ststu samp sinit-supd srdacc sid[3] sid[2] sid[1] sid[0] sazero sa_rec1 sa_rec3 sa_rec4 sa_rec5 -sa_rec6 sa_rec7 sa_rec8 sa_rec9 sa_reca sa_recb sen shltd_ clk_dis ¦ iiiiiioiiii-ioiiooioooooiooiiiiioooooooooioooooooooooooi;
M MDE ni01d4 vsc653 ¦ I Z ¦ ;
I NLS sugr_p * * 1 sugr ¦ 76 77 78 79 80 81 82 83 15 4 2 1 13 84 85 86 87 88 89 -90 91 92 93 94 95 96 97 98 99 100 101 102 103 104 105 106 107;
I NLS nmm_p * * 2 smm ¦ 1 13 82 77 80 81 14 24 25 26 27 28 29 30 31 32 33 34 35 -36 37 38 39 83 107 108 109 110 75 74 73 72 106 111 112 97 96 113 114 41 42 43 44-45 46 47 48 49 50 51 52 53 54 55 56 115 63 98 99 100 101 102 103 104 105 88 7 8-9 10 11 12 64 65 66 67 68;
I NLS su_ctl_p * * 3 su_ctl ¦ 116 76 2 3 4 5 6 23 17 18 19 20 40 15 16 62 108 22-57 58 59 60 61 21 114 113 13 14 82 78 79 112 109 110 106 111 75 74 73 72 115 86-87 88 89 90 91 92 93 94 95 84 85 69;
I MDE ni01d4 vsc653 * 4 i_14 ¦ 1 116;
E netlist B subcells
NLS sugr_p *
NLS nmm_p *
NLS su_ctl_p *
MDE ni01d4 vsc653
E subcells

SUGR_P NLS

```
#cell2 * sugr_p nls * 5 any 0 v8r4.6.2
# "11-Oct-94 GMT" "11:20:53 GMT" "11-Oct-94 GMT" "11:20:53 GMT" amir * .
writer        1
file_version  1
sections      1
netlist   1:        81 sugr_p


B contents:  sugr_p
netlist        246
cells         4380
switches         0
attributes       0
physical         0
history          0
E contents


B netlist
X 1 srst_n o;
X 2 srst_ndp o;
X 3 smclk o;
X 4 smclk_ o;
X 3 smclkdp o;
X 4 smclkdp_ o;
X 5 clk_ o;
X 6 sawr o;
X 7 wr_su i;
X 8 tstst i;
X 9 tsinit i;
X 10 reset_ i;
X 11 clk i;
X 12 sen i;
X 13 shltd_ i;
X 14 sa_rec1 i;
X 15 sa_rec3 i;
X 16 sa_rec4 i;
X 17 sa_rec5 i;
X 18 sa_rec6 i;
X 19 sa_rec7 i;
X 20 sa_rec8 i;
X 21 sa_rec9 i;
X 22 sa_reca i;
X 23 sa_recb i;
X 24 squt_we o;
```

```
X 25 smod_we o;
X 26 smod00_we o;
X 27 smod01_we o;
X 28 smod10_we o;
X 29 smod11_we o;
X 30 smod12_we o;
X 31 smod13_we o;
X 32 sinval_we o;
X 33 sf_we o;
X 34 supd i;
X 35 sasoid o;
G 36 VDD;
G 37 VSS;
N 38 i_378_zn;
N 39 i_377_zn;
N 40 srst_nd;
N 41 wr_sud;
N 42 i_83_z;
N 43 i_383_zn;
N 44 i_382_zn;
N 45 i_387_zn;
N 46 i_389_zn;
N 47 i_391_zn;
N 48 i_393_zn;
N 49 i_395_zn;
N 50 i_397_zn;
N 51 i_399_zn;
N 52 i_401_zn;
N 53 i_403_zn;
N 54 i_405_zn;
N 55 wr_sud_ff_qn;
N 38 i_378_ZN_1[0];
N 39 i_377_ZN_1[0];
N 40 i_376_ZN[0];
N 41 wr_sud_ff_Q[0];
N 42 i_83_Z_1[0];
N 43 i_383_ZN_1[0];
N 44 i_382_ZN_1[0];
N 45 i_387_ZN_1[0];
N 46 i_389_ZN_1[0];
N 47 i_391_ZN_1[0];
N 48 i_393_ZN_1[0];
N 49 i_395_ZN_1[0];
N 50 i_397_ZN_1[0];
N 51 i_399_ZN_1[0];
N 52 i_401_ZN_1[0];
N 53 i_403_ZN_1[0];
N 54 i_405_ZN_1[0];
```

```
N 55 wr_sud_ff_QN_1[0];
N 1 srst_n_buf_Z[0];
N 2 srst_ndp_buf_Z[0];
N 6 i_379_Z[0];
N 5 i_380_ZN[0];
N 4 i_381_ZN[0];
N 3 i_384_ZN[0];
N 24 i_386_ZN[0];
N 25 i_388_ZN[0];
N 26 i_390_ZN[0];
N 27 i_392_ZN[0];
N 28 i_394_ZN[0];
N 29 i_396_ZN[0];
N 30 i_398_ZN[0];
N 31 i_400_ZN[0];
N 32 i_402_ZN[0];
N 33 i_404_ZN[0];
N 35 i_406_Z[0];
V i_376_ZN 0 0 ¦ 40;
V srst_n_buf_Z 0 0 ¦ 1;
V srst_ndp_buf_Z 0 0 ¦ 2;
V i_377_ZN_1 0 0 ¦ 39;
V i_378_ZN_1 0 0 ¦ 38;
V i_379_Z 0 0 ¦ 6;
V i_83_Z_1 0 0 ¦ 42;
V i_380_ZN 0 0 ¦ 5;
V i_381_ZN 0 0 ¦ 4;
V i_382_ZN_1 0 0 ¦ 44;
V i_383_ZN_1 0 0 ¦ 43;
V i_384_ZN 0 0 ¦ 3;
V i_386_ZN 0 0 ¦ 24;
V i_387_ZN_1 0 0 ¦ 45;
V i_388_ZN 0 0 ¦ 25;
V i_389_ZN_1 0 0 ¦ 46;
V i_390_ZN 0 0 ¦ 26;
V i_391_ZN_1 0 0 ¦ 47;
V i_392_ZN 0 0 ¦ 27;
V i_393_ZN_1 0 0 ¦ 48;
V i_394_ZN 0 0 ¦ 28;
V i_395_ZN_1 0 0 ¦ 49;
V i_396_ZN 0 0 ¦ 29;
V i_397_ZN_1 0 0 ¦ 50;
V i_398_ZN 0 0 ¦ 30;
V i_399_ZN_1 0 0 ¦ 51;
V i_400_ZN 0 0 ¦ 31;
V i_401_ZN_1 0 0 ¦ 52;
V i_402_ZN 0 0 ¦ 32;
V i_403_ZN_1 0 0 ¦ 53;
```

```
V i_404_ZN 0 0 ¦ 33;
V i_405_ZN_1 0 0 ¦ 54;
V i_406_Z 0 0 ¦ 35;
V wr_sud_ff_Q 0 0 ¦ 41;
V wr_sud_ff_QN_1 0 0 ¦ 55;
M MDE ao04d2 vsc653 ¦ A1 A2 B ZN ¦ ;
M MDE ni01d4 vsc653 ¦ I Z ¦ ;
M MDE in01d2 vsc653 ¦ I ZN ¦ ;
M MDE an03d1 vsc653 ¦ A1 A2 A3 Z ¦ ;
M MDE ni01d1 vsc653 ¦ I Z ¦ ;
M MDE in01d1 vsc653 ¦ I ZN ¦ ;
M MDE in01d5 vsc653 ¦ I ZN ¦ ;
M MDE fn01d2 vsc653 ¦ A1 B1 ZN ¦ ;
M MDE nd02d1 vsc653 ¦ A1 A2 ZN ¦ ;
M MDE nr02d1 vsc653 ¦ A1 A2 ZN ¦ ;
M MDE an02d1 vsc653 ¦ A1 A2 Z ¦ ;
M MDE lanfnb vsc653 ¦ D EN Q QN ¦ ;
I MDE ao04d2 vsc653 * 1 i_376 ¦ 9 38 39 40;
I MDE ni01d4 vsc653 * 2 srst_n_buf ¦ 40 1;
I MDE ni01d4 vsc653 * 3 srst_ndp_buf ¦ 40 2;
I MDE in01d2 vsc653 * 4 i_377 ¦ 10 39;
I MDE in01d2 vsc653 * 5 i_378 ¦ 8 38;
I MDE an03d1 vsc653 * 6 i_379 ¦ 41 11 1 6;
I MDE ni01d1 vsc653 * 7 i_83 ¦ 11 42;
I MDE in01d1 vsc653 * 8 i_380 ¦ 42 5;
I MDE in01d5 vsc653 * 9 i_381 ¦ 3 4;
I MDE fn01d2 vsc653 * 10 i_382 ¦ 43 11 44;
I MDE nd02d1 vsc653 * 11 i_383 ¦ 12 13 43;
I MDE in01d5 vsc653 * 12 i_384 ¦ 44 3;
I MDE nr02d1 vsc653 * 13 i_386 ¦ 11 45 24;
I MDE in01d1 vsc653 * 14 i_387 ¦ 14 45;
I MDE nr02d1 vsc653 * 15 i_388 ¦ 11 46 25;
I MDE in01d1 vsc653 * 16 i_389 ¦ 15 46;
I MDE nr02d1 vsc653 * 17 i_390 ¦ 11 47 26;
I MDE in01d1 vsc653 * 18 i_391 ¦ 18 47;
I MDE nr02d1 vsc653 * 19 i_392 ¦ 11 48 27;
I MDE in01d1 vsc653 * 20 i_393 ¦ 19 48;
I MDE nr02d1 vsc653 * 21 i_394 ¦ 11 49 28;
I MDE in01d1 vsc653 * 22 i_395 ¦ 20 49;
I MDE nr02d1 vsc653 * 23 i_396 ¦ 11 50 29;
I MDE in01d1 vsc653 * 24 i_397 ¦ 21 50;
I MDE nr02d1 vsc653 * 25 i_398 ¦ 11 51 30;
I MDE in01d1 vsc653 * 26 i_399 ¦ 22 51;
I MDE nr02d1 vsc653 * 27 i_400 ¦ 11 52 31;
I MDE in01d1 vsc653 * 28 i_401 ¦ 23 52;
I MDE nr02d1 vsc653 * 29 i_402 ¦ 11 53 32;
I MDE in01d1 vsc653 * 30 i_403 ¦ 17 53;
I MDE nr02d1 vsc653 * 31 i_404 ¦ 11 54 33;
```

```
I MDE in01d1 vsc653 * 32 i_405 ¦ 16 54;
I MDE an02d1 vsc653 * 33 i_406 ¦ 34 11 35;
I MDE lanfnb vsc653 * 34 wr_sud_ff ¦ 7 11 41 55;
E netlist

B subcells
MDE ao04d2 vsc653
MDE ni01d4 vsc653
MDE in01d2 vsc653
MDE an03d1 vsc653
MDE ni01d1 vsc653
MDE in01d1 vsc653
MDE in01d5 vsc653
MDE fn01d2 vsc653
MDE nd02d1 vsc653
MDE nr02d1 vsc653
MDE an02d1 vsc653
MDE lanfnb vsc653
E subcells
```

TCRAM32X24 LA

```
#cell2 * tcram32x24 la * 3 any 13312 v8r4.6.2
# "10-Jul-94 GMT" "14:19:08 GMT" "10-Jul-94 GMT" "14:19:08 GMT" amir * .la
mtbordera .
V 15 COMPASSlogicAssist
T C
L ""
I 1
B 23 31 1000 206
M 0 0 0 0
F miejn
A 2 "chip" "chip_1" HI "frequency" "15" HI
D "[mde]tcram2" "tcram32x24" "" "0" "0" "0" "0" "1073791364" "1073754986"
C 100 40 1 -95 -90 "AR[4:0]" small LC B NSCI -100 -90 1
N 90 40 "AR[4:0]" normal RC B
C 100 80 2 -95 -70 "AW[4:0]" small LC B NSCI -100 -70 1
N 90 80 "AW[4:0]" normal RC B
C 100 120 3 -95 -50 "CLB" small LC B NSCI -100 -50 1
N 90 120 "CLB" normal RC B
C 100 160 4 -95 -30 "DI[23:0]" small LC B NSCI -100 -30 1
N 90 160 "DI[23:0]" normal RC B
C 100 200 5 -95 -10 "WEB" small LC B NSCI -100 -10 1
N 90 200 "WEB" normal RC B
C 1000 40 6 75 -50 "DO[23:0]" small RC B NSCO 80 -50 1
N 990 40 "DO[23:0]" normal RC B
V 4 *
A 80 20 70 30 10.253 1 0
L -90 -120 70 -120 1 0
L -100 -110 -100 20 1 0
A -100 -110 -90 -120 10 0 0
A -90 30 -100 20 10 0 0
A 70 -120 80 -110 10 0 0
L -90 30 70 30 1 0
L 80 -110 80 20 1 0
T -3 -97 "tcram32x24" normal CT B T
T -7 19 "RAM" normal CC B *
T -5 -10 "@@INSTNAME" normal CB B I
L 5 -20 -25 -20 1 0
L -25 -50 5 -50 1 0
L 9 -32 9 -29 1 0
L 9 -29 15 -35 1 0
L 15 -35 9 -41 1 0
L 9 -41 9 -38 1 0
L 5 -32 9 -32 1 0
L 5 -38 9 -38 1 0
L 5 -50 5 -20 1 0
```

```
L -25 -25 -29 -21 1 0
L -29 -21 -29 -23 1 0
L -29 -23 -33 -23 1 0
L -33 -23 -33 -27 1 0
L -33 -27 -29 -27 1 0
L -29 -29 -25 -25 1 0
L -25 -33 -29 -29 1 0
L -29 -31 -29 -27 1 0
L -29 -31 -33 -31 1 0
L -33 -31 -33 -35 1 0
L -33 -35 -29 -35 1 0
L -29 -35 -29 -37 1 0
L -29 -37 -25 -33 1 0
L -31 -40 -31 -37 1 0
L -31 -37 -25 -43 1 0
L -25 -43 -31 -49 1 0
L -31 -49 -31 -46 1 0
L -35 -40 -31 -40 1 0
L -35 -46 -31 -46 1 0
L -25 -50 -25 -20 1 0
L -35 -46 -35 -40 1 0
T -44 -43 "di" small CC B *
T -44 -33 "ar" small CC B *
T -45 -25 "aw" small CC B *
T 22 -35 "do" small CC B *
F 20 10 70 25 3 0
F -90 10 -35 25 3 0
T -9 -35 "tcram2" small CC B *
T -5 -90 "@@LABEL" small CC B L
T -5 -61 "w=@dx@, h=@dy@" small CC B A
T -7 -75 "@power@" small CC B A
E
O "mtbordera" 0 0 1100 800 N
E
```

TCRAM32X24 PCL

```
#cell2 * tcram32x24 pcl * 3 any 8192 v8r4.6.2
# "7-Jul-94 GMT" "10:39:22 GMT" "7-Jul-94 GMT" "10:39:22 GMT" amir * .
# VERSION NUMBER
2
# TEMPLATE
# name date time checkSum
tcram2 "1-May-92 GMT" "19:56:26 GMT" 'HE6D3CF15
# CLIENT OBJECTS (generator modules, etc.)
# ID cellName cellType capabilities
1 tcram2 slc  MCP CIF
2 tcram2 mde  Model
3 tcram2 nc  Transistor-Netlist pmd DA Model-schematic
4 tcram2 la  Icon
5 tc2vec vce  Vectors
6 dice ese  dummy
7 tc2vhd obj  VHDL-Model
8 tc2ver obj  Verilog-Model
.
# PARAMETERS
# name value default type flags clientIDs / range
TCRAM2_WORD_DEPTH 32 128 integer [s] 1 2 3 4 5 6 7 8 / 8 2048
TCRAM2_WORD_WIDTH 24 8 integer [s] 1 2 3 4 5 6 7 8 / 1 128
TCRAM2_FOLD_AXIS X X string [] 1 2 3 4 5 6 7 8 / X Y
TCRAM2_CLEAR_BITS 24 0 integer [s] 1 2 3 4 5 6 7 8 / 0 128
Sim_Option vlsiModel vlsiModel string [] / vlsiModel
Layout_Option optimized optimized string [] / optimized
Compatible_Tag vcc650 vcc650 string [] 2 3 7 8
HDL_Option behavioral behavioral string [] 7 8 / behavioral
Output_Test_Format VIF VIF string [] 5 / VIF SIM QSIM WVS WVS(ar=aw)
.
```

TCRAM40X12 LA

```
#cell2 * tcram40x12 la * 3 any 13312 v8r4.6.2
# "10-Jul-94 GMT" "14:19:13 GMT" "10-Jul-94 GMT" "14:19:13 GMT" amir * .la
mtbordera .
V 15 COMPASSlogicAssist
T C
L ""
I 1
B 30 31 1000 206
M 0 0 0 0
F miejn
A 2 "chip" "chip_1" HI "frequency" "15" HI
D "[mde]tcram2" "tcram40x12" "" "0" "0" "0" "0" "1073791364" "1073754964"
C 100 40 1 -95 -90 "AR[5:0]" small LC B NSCI -100 -90 1
N 90 40 "AR[5:0]" normal RC B
C 100 80 2 -95 -70 "AW[5:0]" small LC B NSCI -100 -70 1
N 90 80 "AW[5:0]" normal RC B
C 100 120 3 -95 -50 "CLB" small LC B NSCI -100 -50 1
N 90 120 "CLB" normal RC B
C 100 160 4 -95 -30 "DI[11:0]" small LC B NSCI -100 -30 1
N 90 160 "DI[11:0]" normal RC B
C 100 200 5 -95 -10 "WEB" small LC B NSCI -100 -10 1
N 90 200 "WEB" normal RC B
C 1000 40 6 75 -50 "DO[11:0]" small RC B NSCO 80 -50 1
N 990 40 "DO[11:0]" normal RC B
V 4 *
A 80 20 70 30 10.253 1 0
L -90 -120 70 -120 1 0
L -100 -110 -100 20 1 0
A -100 -110 -90 -120 10 0 0
A -90 30 -100 20 10 0 0
A 70 -120 80 -110 10 0 0
L -90 30 70 30 1 0
L 80 -110 80 20 1 0
T -3 -97 "tcram40x12" normal CT B T
T -7 19 "RAM" normal CC B *
T -5 -10 "@@INSTNAME" normal CB B I
L 5 -20 -25 -20 1 0
L -25 -50 5 -50 1 0
L 9 -32 9 -29 1 0
L 9 -29 15 -35 1 0
L 15 -35 9 -41 1 0
L 9 -41 9 -38 1 0
L 5 -32 9 -32 1 0
L 5 -38 9 -38 1 0
L 5 -50 5 -20 1 0
```

```
L -25 -25 -29 -21 1 0
L -29 -21 -29 -23 1 0
L -29 -23 -33 -23 1 0
L -33 -23 -33 -27 1 0
L -33 -27 -29 -27 1 0
L -29 -29 -25 -25 1 0
L -25 -33 -29 -29 1 0
L -29 -31 -29 -27 1 0
L -29 -31 -33 -31 1 0
L -33 -31 -33 -35 1 0
L -33 -35 -29 -35 1 0
L -29 -35 -29 -37 1 0
L -29 -37 -25 -33 1 0
L -31 -40 -31 -37 1 0
L -31 -37 -25 -43 1 0
L -25 -43 -31 -49 1 0
L -31 -49 -31 -46 1 0
L -35 -40 -31 -40 1 0
L -35 -46 -31 -46 1 0
L -25 -50 -25 -20 1 0
L -35 -46 -35 -40 1 0
T -44 -43 "di" small CC B *
T -44 -33 "ar" small CC B *
T -45 -25 "aw" small CC B *
T 22 -35 "do" small CC B *
F 20 10 70 25 3 0
F -90 10 -35 25 3 0
T -9 -35 "tcram2" small CC B *
T -5 -90 "@@LABEL" small CC B L
T -5 -61 "w=@dx@, h=@dy@" small CC B A
T -7 -75 "@power@" small CC B A
E
O "mtbordera" 0 0 1100 800 N
E
```

TCRAM40X12 PCL

```
#cell2 * tcram40x12 pcl * 3 any 29696 v8r4.6.2
# "7-Jul-94 GMT" "10:39:00 GMT" "7-Jul-94 GMT" "10:39:00 GMT" amir * .
# VERSION NUMBER
2
# TEMPLATE
# name date time checkSum
tcram2 "1-May-92 GMT" "19:56:26 GMT" 'HE6D3CF15
# CLIENT OBJECTS (generator modules, etc.)
# ID cellName cellType capabilities
1 tcram2 slc  MCP CIF
2 tcram2 mde  Model
3 tcram2 nc  Transistor-Netlist pmd DA Model-schematic
4 tcram2 la  Icon
5 tc2vec vce  Vectors
6 dice ese  dummy
7 tc2vhd obj  VHDL-Model
8 tc2ver obj  Verilog-Model
.
# PARAMETERS
# name value default type flags clientIDs / range
TCRAM2_WORD_DEPTH 40 128 integer [s] 1 2 3 4 5 6 7 8 / 8 2048
TCRAM2_WORD_WIDTH 12 8 integer [s] 1 2 3 4 5 6 7 8 / 1 128
TCRAM2_FOLD_AXIS X X string [] 1 2 3 4 5 6 7 8 / X Y
TCRAM2_CLEAR_BITS 12 0 integer [s] 1 2 3 4 5 6 7 8 / 0 128
Sim_Option vlsiModel vlsiModel string [] / vlsiModel
Layout_Option optimized optimized string [] / optimized
Compatible_Tag vcc650 vcc650 string [] 2 3 7 8
HDL_Option behavioral behavioral string [] 7 8 / behavioral
Output_Test_Format VIF VIF string [] 5 / VIF SIM QSIM WVS WVS(ar=aw)
.
```

TCRAM40X24 LA

```
#cell2 * tcram40x24 la * 3 any 13312 v8r4.6.2
# "10-Jul-94 GMT" "14:19:12 GMT" "10-Jul-94 GMT" "14:19:12 GMT" amir * .la
mtbordera .
V 15 COMPASSlogicAssist
T C
L ""
I 1
B 23 31 1000 206
M 0 0 0 0
F miejn
A 2 "chip" "chip_1" HI "frequency" "15" HI
D "[mde]tcram2" "tcram40x24" "" "0" "0" "0" "0" "1073791364" "1073754973"
C 100 40 1 -95 -90 "AR[5:0]" small LC B NSCI -100 -90 1
N 90 40 "AR[5:0]" normal RC B
C 100 80 2 -95 -70 "AW[5:0]" small LC B NSCI -100 -70 1
N 90 80 "AW[5:0]" normal RC B
C 100 120 3 -95 -50 "CLB" small LC B NSCI -100 -50 1
N 90 120 "CLB" normal RC B
C 100 160 4 -95 -30 "DI[23:0]" small LC B NSCI -100 -30 1
N 90 160 "DI[23:0]" normal RC B
C 100 200 5 -95 -10 "WEB" small LC B NSCI -100 -10 1
N 90 200 "WEB" normal RC B
C 1000 40 6 75 -50 "DO[23:0]" small RC B NSCO 80 -50 1
N 990 40 "DO[23:0]" normal RC B
V 4 *
A 80 20 70 30 10.253 1 0
L -90 -120 70 -120 1 0
L -100 -110 -100 20 1 0
A -100 -110 -90 -120 10 0 0
A -90 30 -100 20 10 0 0
A 70 -120 80 -110 10 0 0
L -90 30 70 30 1 0
L 80 -110 80 20 1 0
T -3 -97 "tcram40x24" normal CT B T
T -7 19 "RAM" normal CC B *
T -5 -10 "@@INSTNAME" normal CB B I
L 5 -20 -25 -20 1 0
L -25 -50 5 -50 1 0
L 9 -32 9 -29 1 0
L 9 -29 15 -35 1 0
L 15 -35 9 -41 1 0
L 9 -41 9 -38 1 0
L 5 -32 9 -32 1 0
L 5 -38 9 -38 1 0
L 5 -50 5 -20 1 0
```

```
L -25 -25 -29 -21 1 0
L -29 -21 -29 -23 1 0
L -29 -23 -33 -23 1 0
L -33 -23 -33 -27 1 0
L -33 -27 -29 -27 1 0
L -29 -29 -25 -25 1 0
L -25 -33 -29 -29 1 0
L -29 -31 -29 -27 1 0
L -29 -31 -33 -31 1 0
L -33 -31 -33 -35 1 0
L -33 -35 -29 -35 1 0
L -29 -35 -29 -37 1 0
L -29 -37 -25 -33 1 0
L -31 -40 -31 -37 1 0
L -31 -37 -25 -43 1 0
L -25 -43 -31 -49 1 0
L -31 -49 -31 -46 1 0
L -35 -40 -31 -40 1 0
L -35 -46 -31 -46 1 0
L -25 -50 -25 -20 1 0
L -35 -46 -35 -40 1 0
T -44 -43 "di" small CC B *
T -44 -33 "ar" small CC B *
T -45 -25 "aw" small CC B *
T 22 -35 "do" small CC B *
F 20 10 70 25 3 0
F -90 10 -35 25 3 0
T -9 -35 "tcram2" small CC B *
T -5 -90 "@@LABEL" small CC B L
T -5 -61 "w=@dx@, h=@dy@" small CC B A
T -7 -75 "@power@" small CC B A
E
O "mtbordera" 0 0 1100 800 N
E
```

TCRAM40X24 PCL

```
#cell2 * tcram40x24 pcl * 3 any 8192 v8r4.6.2
# "7-Jul-94 GMT" "10:39:09 GMT" "7-Jul-94 GMT" "10:39:09 GMT" amir * .
# VERSION NUMBER
2
# TEMPLATE
# name date time checkSum
tcram2 "1-May-92 GMT" "19:56:26 GMT" 'HE6D3CF15
# CLIENT OBJECTS (generator modules, etc.)
# ID cellName cellType capabilities
1 tcram2 slc  MCP CIF
2 tcram2 mde  Model
3 tcram2 nc  Transistor-Netlist pmd DA Model-schematic
4 tcram2 la  Icon
5 tc2vec vce  Vectors
6 dice ese  dummy
7 tc2vhd obj  VHDL-Model
8 tc2ver obj  Verilog-Model
.
# PARAMETERS
# name value default type flags clientIDs / range
TCRAM2_WORD_DEPTH 40 128 integer [s] 1 2 3 4 5 6 7 8 / 8 2048
TCRAM2_WORD_WIDTH 24 8 integer [s] 1 2 3 4 5 6 7 8 / 1 128
TCRAM2_FOLD_AXIS X X string [] 1 2 3 4 5 6 7 8 / X Y
TCRAM2_CLEAR_BITS 24 0 integer [s] 1 2 3 4 5 6 7 8 / 0 128
Sim_Option vlsiModel vlsiModel string [] / vlsiModel
Layout_Option optimized optimized string [] / optimized
Compatible_Tag vcc650 vcc650 string [] 2 3 7 8
HDL_Option behavioral behavioral string [] 7 8 / behavioral
Output_Test_Format VIF VIF string [] 5 / VIF SIM QSIM WVS WVS(ar=aw)
.
```

TCRAM32X16 LA

```
#cell2 * tcram32x16 la * 3 any 13312 v8r4.6.2
# "10-Jul-94 GMT" "14:19:10 GMT" "10-Jul-94 GMT" "14:19:10 GMT" amir * .la
mtbordera .
V 15 COMPASSlogicAssist
T C
L ""
I 1
B 27 31 1000 206
M 0 0 0 0
F miejn
A 2 "chip" "chip_1" HI "frequency" "15" HI
D "[mde]tcram2" "tcram32x16" "" "0" "0" "0" "0" "1073791364" "1073754992"
C 100 40 1 -95 -90 "AR[4:0]" small LC B NSCI -100 -90 1
N 90 40 "AR[4:0]" normal RC B
C 100 80 2 -95 -70 "AW[4:0]" small LC B NSCI -100 -70 1
N 90 80 "AW[4:0]" normal RC B
C 100 120 3 -95 -50 "CLB" small LC B NSCI -100 -50 1
N 90 120 "CLB" normal RC B
C 100 160 4 -95 -30 "DI[15:0]" small LC B NSCI -100 -30 1
N 90 160 "DI[15:0]" normal RC B
C 100 200 5 -95 -10 "WEB" small LC B NSCI -100 -10 1
N 90 200 "WEB" normal RC B
C 1000 40 6 75 -50 "DO[15:0]" small RC B NSCO 80 -50 1
N 990 40 "DO[15:0]" normal RC B
V 4 *
A 80 20 70 30 10.253 1 0
L -90 -120 70 -120 1 0
L -100 -110 -100 20 1 0
A -100 -110 -90 -120 10 0 0
A -90 30 -100 20 10 0 0
A 70 -120 80 -110 10 0 0
L -90 30 70 30 1 0
L 80 -110 80 20 1 0
T -3 -97 "tcram32x16" normal CT B T
T -7 19 "RAM" normal CC B *
T -5 -10 "@@INSTNAME" normal CB B I
L 5 -20 -25 -20 1 0
L -25 -50 5 -50 1 0
L 9 -32 9 -29 1 0
L 9 -29 15 -35 1 0
L 15 -35 9 -41 1 0
L 9 -41 9 -38 1 0
L 5 -32 9 -32 1 0
L 5 -38 9 -38 1 0
L 5 -50 5 -20 1 0
```

```
L -25 -25 -29 -21 1 0
L -29 -21 -29 -23 1 0
L -29 -23 -33 -23 1 0
L -33 -23 -33 -27 1 0
L -33 -27 -29 -27 1 0
L -29 -29 -25 -25 1 0
L -25 -33 -29 -29 1 0
L -29 -31 -29 -27 1 0
L -29 -31 -33 -31 1 0
L -33 -31 -33 -35 1 0
L -33 -35 -29 -35 1 0
L -29 -35 -29 -37 1 0
L -29 -37 -25 -33 1 0
L -31 -40 -31 -37 1 0
L -31 -37 -25 -43 1 0
L -25 -43 -31 -49 1 0
L -31 -49 -31 -46 1 0
L -35 -40 -31 -40 1 0
L -35 -46 -31 -46 1 0
L -25 -50 -25 -20 1 0
L -35 -46 -35 -40 1 0
T -44 -43 "di" small CC B *
T -44 -33 "ar" small CC B *
T -45 -25 "aw" small CC B *
T 22 -35 "do" small CC B *
F 20 10 70 25 3 0
F -90 10 -35 25 3 0
T -9 -35 "tcram2" small CC B *
T -5 -90 "@@LABEL" small CC B L
T -5 -61 "w=@dx@, h=@dy@" small CC B A
T -7 -75 "@power@" small CC B A
E
O "mtbordera" 0 0 1100 800 N
E
```

TCRAM32X16 PCL

```
#cell2 * tcram32x16 pcl * 3 any 8192 v8r4.6.2
# "7-Jul-94 GMT" "10:39:28 GMT" "7-Jul-94 GMT" "10:39:28 GMT" amir * .
# VERSION NUMBER
2
# TEMPLATE
# name date time checkSum
tcram2 "1-May-92 GMT" "19:56:26 GMT" 'HE6D3CF15
# CLIENT OBJECTS (generator modules, etc.)
# ID cellName cellType capabilities
1 tcram2 slc  MCP CIF
2 tcram2 mde  Model
3 tcram2 nc  Transistor-Netlist pmd DA Model-schematic
4 tcram2 la  Icon
5 tc2vec vce  Vectors
6 dice ese  dummy
7 tc2vhd obj  VHDL-Model
8 tc2ver obj  Verilog-Model
.
# PARAMETERS
# name value default type flags clientIDs / range
TCRAM2_WORD_DEPTH 32 128 integer [s] 1 2 3 4 5 6 7 8 / 8 2048
TCRAM2_WORD_WIDTH 16 8 integer [s] 1 2 3 4 5 6 7 8 / 1 128
TCRAM2_FOLD_AXIS X X string [] 1 2 3 4 5 6 7 8 / X Y
TCRAM2_CLEAR_BITS 16 0 integer [s] 1 2 3 4 5 6 7 8 / 0 128
Sim_Option vlsiModel vlsiModel string [] / vlsiModel
Layout_Option optimized optimized string [] / optimized
Compatible_Tag vcc650 vcc650 string [] 2 3 7 8
HDL_Option behavioral behavioral string [] 7 8 / behavioral
Output_Test_Format VIF VIF string [] 5 / VIF SIM QSIM WVS WVS(ar=aw)
.
```

We claim:

1. A vector decoder for detecting symbols transmitted along a communication channel, the decoder comprising:

at least two pairs of decision feedback equalizers and noise predictors operating on a plurality M of vectors of symbols being detected, wherein the vectors are ordered in accordance with quality levels and therein each noise predictor estimates the noise associated with its associated vector;

a path storage unit for storing M of ordered vectors, each vector being of length L;

a metric determiner connected to the output of all of said decision feedback equalizers and said noise predictors, wherein said metric determiner produces a performance metric for each of Q branches extending from each vector, where each branch is associated with one of Q possible symbol values;

a sorter, connected to the output of said metric determiner, wherein said sorter sorts data, formed of a) the symbol values and b) the vectors which they extend, in accordance with their performance metrics and orders, from the M*Q performance metrics, the data having the M best performance metrics;

a path builder, connected to the output of said sorter, wherein said path builder associates ordered data with the appropriate ones of previously stored ordered vectors, wherein said path storage unit comprises M group of columns and L rows, where the groups of columns are ordered in accordance with said quality levels and wherein, for each row n, each group of columns stores a) the symbol, added at time n, which is associated with the quality level of said group of columns and b) the vector from which said symbols branched.

2. A decoder according to claim 1 and wherein M is three, L ranges from 20–60 and Q is four.

3. A decoder according to claim 1 and wherein said at least one pair of decision feedback equalizers and noise predictors comprises M pairs of decision feedback equalizers and noise predictors, wherein each pair operates on a single vector of symbols being detected.

4. A path storage unit for use in path sequence estimators which determine quality levels for each of M paths of having L symbols therein, said path storage unit comprising:

M groups of columns; and

L rows, wherein the groups of columns are ordered in accordance with said quality levels and wherein, for each row n, each group of columns stores a) the symbol, added at time n, which is associated with the quality level of said group of columns and b) the vector from which said symbols branched.

* * * * *